(12) United States Patent
Yoshida et al.

(10) Patent No.: US 8,766,906 B2
(45) Date of Patent: Jul. 1, 2014

(54) LIQUID CRYSTAL DISPLAY DEVICE AND DRIVING METHOD THEREOF

(71) Applicant: Semiconductor Energy Laboratory Co., Ltd., Kanagawa-ken (JP)

(72) Inventors: Yasunori Yoshida, Kanagawa (JP); Hajime Kimura, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 13/677,963

(22) Filed: Nov. 15, 2012

(65) Prior Publication Data

US 2013/0070174 A1   Mar. 21, 2013

Related U.S. Application Data

(63) Continuation of application No. 11/947,525, filed on Nov. 29, 2007, now abandoned.

(30) Foreign Application Priority Data

Dec. 5, 2006  (JP) ................................ 2006-328670

(51) Int. Cl.
  *G09G 3/36*  (2006.01)
(52) U.S. Cl.
  USPC ............... 345/102; 345/89; 345/94; 345/100; 345/204
(58) Field of Classification Search
  USPC ............................. 345/89, 94, 100, 102, 204
  See application file for complete search history.

(56) References Cited

U.S. PATENT DOCUMENTS

| | | | |
|---|---|---|---|
| 6,392,620 B1 | 5/2002 | Mizutani et al. |
| 6,614,415 B2 | 9/2003 | Mizutani et al. |
| 7,002,540 B2 | 2/2006 | Aoki |
| 7,113,163 B2 | 9/2006 | Nitta et al. |
| 7,280,103 B2 | 10/2007 | Taoka et al. |
| 7,505,026 B2 | 3/2009 | Baba et al. |
| 7,538,749 B2 | 5/2009 | Chung et al. |
| 7,554,535 B2 | 6/2009 | Sasaki |
| 7,564,439 B2 | 7/2009 | Hsieh et al. |
| 7,911,430 B2 | 3/2011 | Fujine |

(Continued)

FOREIGN PATENT DOCUMENTS

| | | |
|---|---|---|
| CN | 1519620 A | 8/2004 |
| CN | 001577471 A | 2/2005 |

(Continued)

OTHER PUBLICATIONS

Den Boer, W., "Chapter 5—Performance Characteristics," *Active Matrix Liquid Crystal Displays*, 2005, pp. 113-137.

(Continued)

*Primary Examiner* — Premal Patel
(74) *Attorney, Agent, or Firm* — Husch Blackwell LLP

(57) ABSTRACT

To provide a hold-type display device without a problem of motion blur and a driving method thereof. The length of a period for displaying a blanking image in one frame period is controlled in accordance with a control parameter showing the degree of motion blur, and the level of a signal supplied to a display element is changed in accordance with the length of the period for displaying the blanking image. Accordingly, the hold-type display device without a problem of motion blur and the driving method thereof can be provided.

12 Claims, 102 Drawing Sheets

(56) References Cited

U.S. PATENT DOCUMENTS

| | | | |
|---|---|---|---|
| 7,982,706 | B2 | 7/2011 | Ichikawa et al. |
| 8,125,473 | B2 | 2/2012 | Chung et al. |
| 8,223,091 | B2 | 7/2012 | Ishihara et al. |
| 8,451,209 | B2 | 5/2013 | Sugino et al. |
| 2002/0003520 | A1 | 1/2002 | Aoki |
| 2002/0057238 | A1 | 5/2002 | Nitta et al. |
| 2004/0222956 | A1 | 11/2004 | Shih |
| 2005/0140626 | A1 | 6/2005 | Doyen et al. |
| 2005/0162360 | A1 | 7/2005 | Ishihara et al. |
| 2005/0200619 | A1* | 9/2005 | Adachi et al. ............... 345/204 |
| 2005/0259064 | A1 | 11/2005 | Sugino et al. |
| 2006/0092117 | A1 | 5/2006 | Kubota et al. |
| 2006/0145992 | A1 | 7/2006 | Hsieh et al. |
| 2006/0220572 | A1 | 10/2006 | Seki |
| 2006/0238135 | A1 | 10/2006 | Kimura |
| 2006/0279523 | A1 | 12/2006 | Nitta et al. |
| 2007/0146299 | A1 | 6/2007 | Kim et al. |
| 2007/0279374 | A1 | 12/2007 | Kimura et al. |
| 2012/0307161 | A1 | 12/2012 | Ishihara et al. |

FOREIGN PATENT DOCUMENTS

| | | |
|---|---|---|
| CN | 001694148 A | 11/2005 |
| CN | 001776497 A | 5/2006 |
| CN | 1841472 A | 10/2006 |
| EP | 1 494 196 A2 | 1/2005 |
| EP | 1 536 407 A2 | 6/2005 |
| EP | 1 571 644 A1 | 9/2005 |
| EP | 1 600 928 A1 | 11/2005 |
| EP | 1 675 097 A2 | 6/2006 |
| EP | 2 175 437 A1 | 4/2010 |
| EP | 2 175 438 A1 | 4/2010 |
| JP | 4-302289 | 10/1992 |
| JP | 9-325715 | 12/1997 |
| JP | 2000-200063 | 7/2000 |
| JP | 2002-23707 | 1/2002 |
| JP | 2002-91400 | 3/2002 |
| JP | 2002-156950 | 5/2002 |
| JP | 2003-149626 | 5/2003 |
| JP | 2003-298879 | 10/2003 |
| JP | 2004-62134 | 2/2004 |
| JP | 2004-177575 | 6/2004 |
| JP | 2004-226594 | 8/2004 |
| JP | 2004-240317 | 8/2004 |
| JP | 2004-355017 | 12/2004 |
| JP | 2005-122121 | 5/2005 |
| JP | 2005-122201 | 5/2005 |
| JP | 2005-134724 | 5/2005 |
| JP | 2005-268912 | 9/2005 |
| JP | 2006-30834 | 2/2006 |
| JP | 2006-178488 | 7/2006 |
| JP | 2006-189661 | 7/2006 |
| JP | 2006-286773 | 10/2006 |
| JP | 2006-323376 | 11/2006 |
| KR | 10-2005-0044796 A | 5/2005 |
| TW | 200425036 | 11/2004 |
| TW | 200525487 | 8/2005 |
| TW | I252350 B | 4/2006 |
| TW | I256035 B | 6/2006 |
| WO | WO 03/032288 A1 | 4/2003 |
| WO | WO 2004/053826 A1 | 6/2004 |
| WO | WO 2004/111985 A1 | 12/2004 |

OTHER PUBLICATIONS

Office Action re European application No. EP 07023479.4, dated Oct. 8, 2012.

Onac, G.-E. et al., "11.2: Scanning Backlight for Mobile Displays," SID Digest '07: SID International Symposium Digest of Technical Papers, vol. 38, May 22, 2007, pp. 131-133.

Park, J.-H. et al., "61.1: Motion-Compensated Impulsive Driving Technique for LCD-TV," SID Digest '07: SID International Symposium Digest of Technical Papers, vol. 38, May 22, 2007, pp. 1717-1720.

Kimura, N. et al, "60.2: Invited Paper: New Technologies for Large-Sized High-Quality LCD TV," SID Digest '05: SID International Symposium Digest of Technical Papers, vol. 36, May 24, 2005, pp. 1734-1737.

Lee, J.-W. et al, "69.4: Amorphous Silicon Based 40" LCD TV Using Ultra Fast OCB Mode," SID Digest '06: SID International Symposium Digest of Technical Papers, vol. 37, Jun. 6, 2006, pp. 1950-1953.

Ono, K. et al, "69.5: Invited Paper: Progress of IPS-Pro Technology for LCD-TVs," SID Digest '06: SID International Symposium Digest of Technical Papers, vol. 37, Jun. 6, 2006, pp. 1954-1957.

Itoh, G. et al., "8.2: Picture Adaptive Display System Using TFT-LCD and LED Bacldight for High Quality Motion Picture," Conference Record of the 2006 IDRC (International Display Research Conference), Sep. 18, 2006, pp. 96-99.

Office Action re Chinese application No. CN 200710196487.5, dated Sep. 27, 2010 (with English translation).

European Search Report re application No. EP 07023479.4, dated Feb. 9, 2011.

Office Action re Taiwanese application No. TW 096146143, dated Nov. 27, 2013 (with English translation).

Korean Office Action re Application No. KR 10-2007-0125258, dated Jan. 15, 2014.

Chinese Office Action re Application No. CN 201210432083.2, dated Mar. 3, 2014.

* cited by examiner

FIG. 6A FIG. 6B FIG. 6C FIG. 6D
FIG. 6E FIG. 6F FIG. 6G FIG. 6H
FIG. 6I FIG. 6J FIG. 6K FIG. 6L
FIG. 6M FIG. 6N FIG. 6O FIG. 6P data writing
image display period or blanking interval data writing
image display period or blanking interval data writing
image display period or blanking interval FIG. 18A
1801
1802
FIG. 18B
1803
1804
FIG. 18C
1805
1806
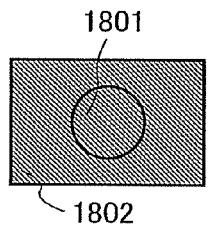
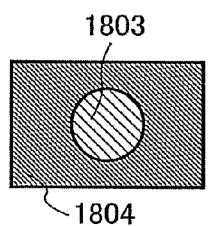
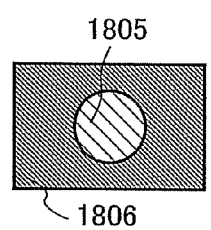
FIG. 18D
1811
1812
FIG. 18E
1813
1814
FIG. 18F
1815
1816
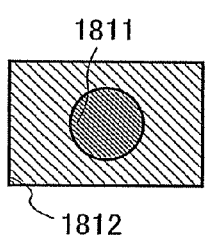
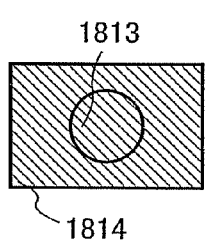
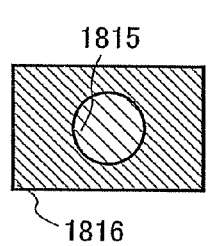
FIG. 18G
1821
1822
FIG. 18H
1823
1824
FIG. 18I
1825
1826
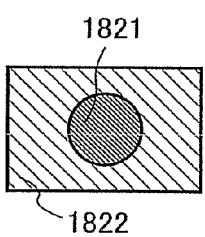
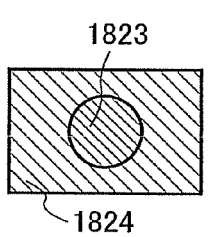
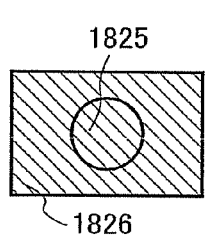
FIG. 18J
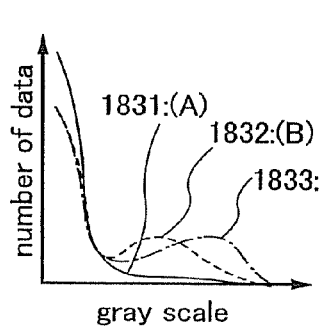
1831:(A)
1832:(B)
1833:(C)
FIG. 18K
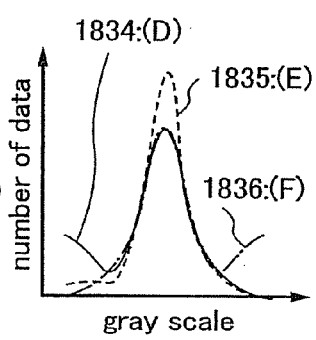
1834:(D)
1835:(E)
1836:(F)
FIG. 18L
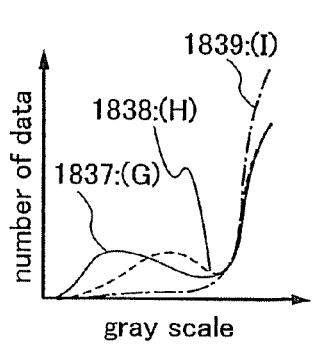
1839:(I)
1838:(H)
1837:(G)

FIG. 34A
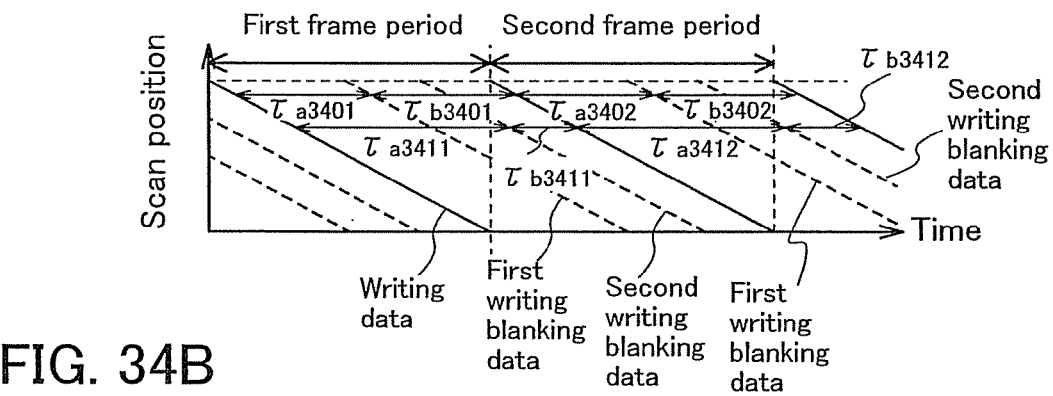
FIG. 34B
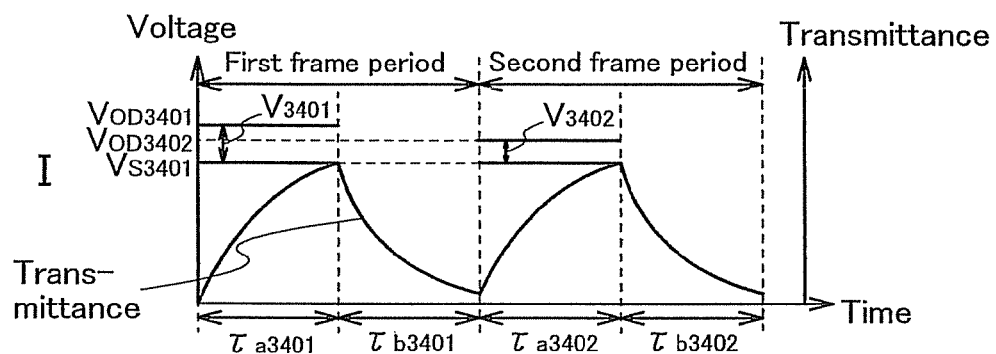
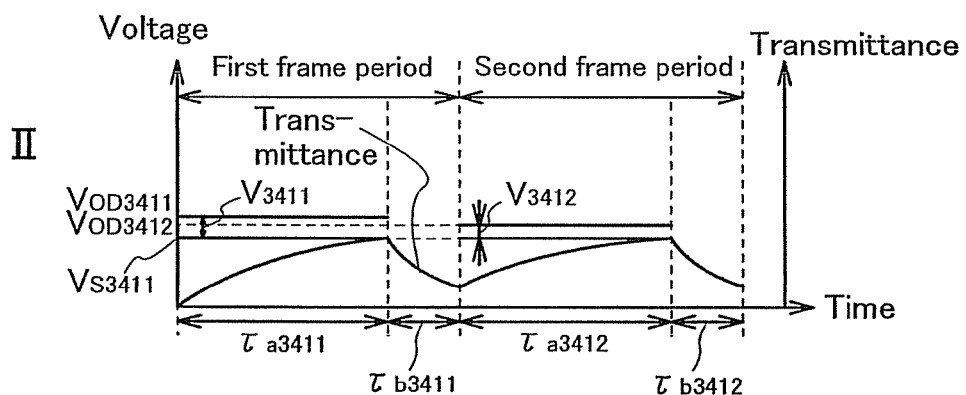

FIG. 35A
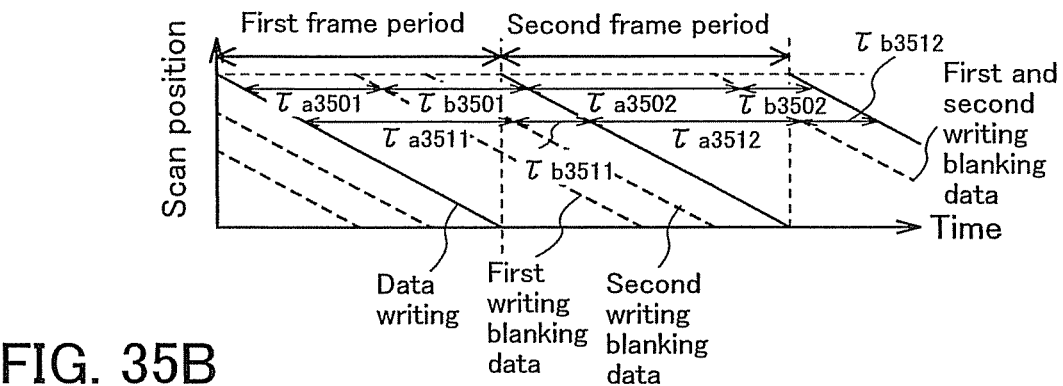
FIG. 35B
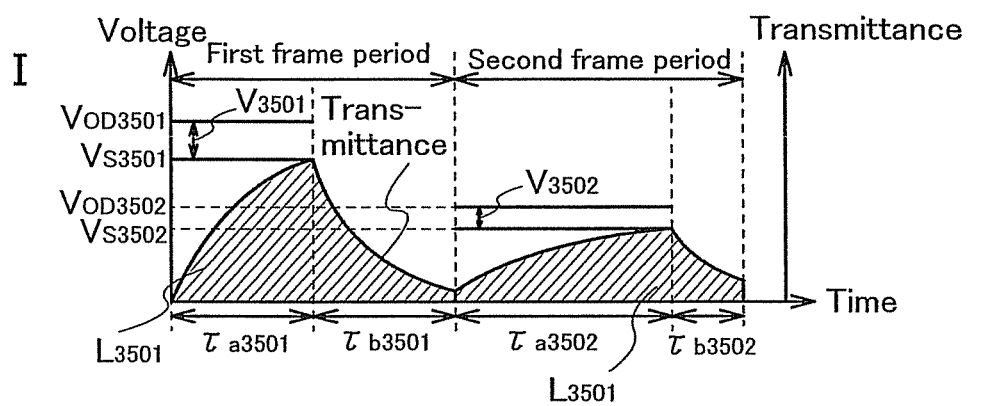
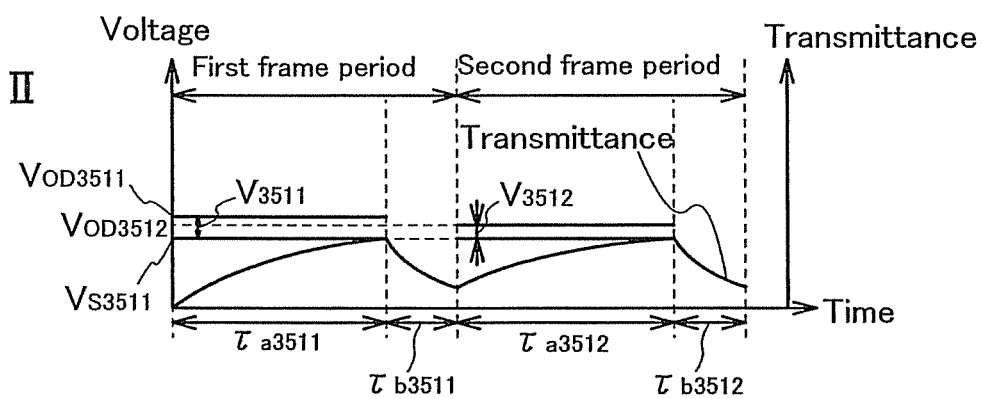

FIG. 36A
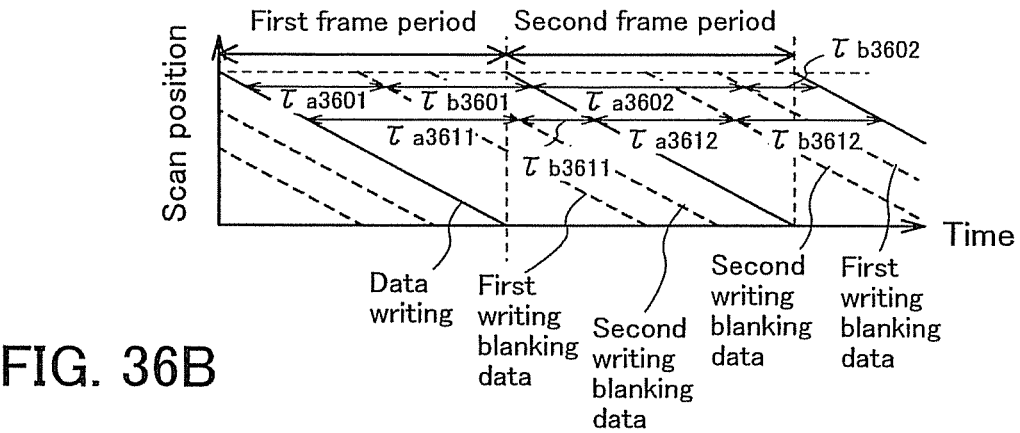
FIG. 36B
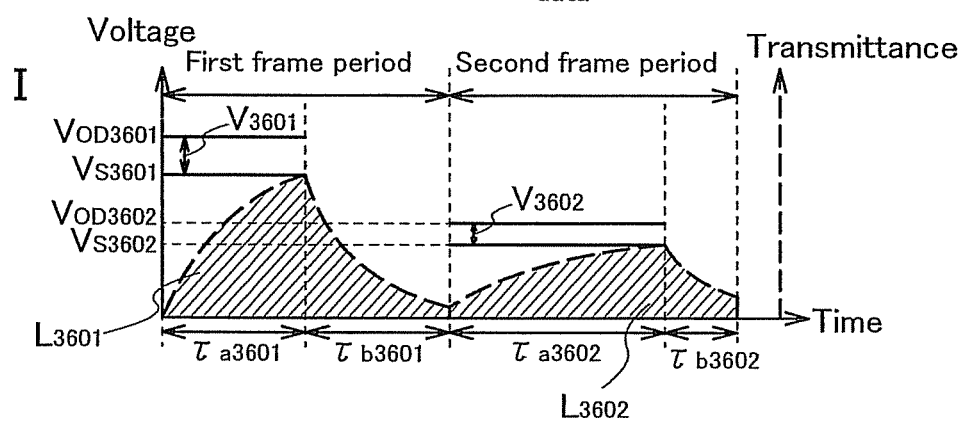
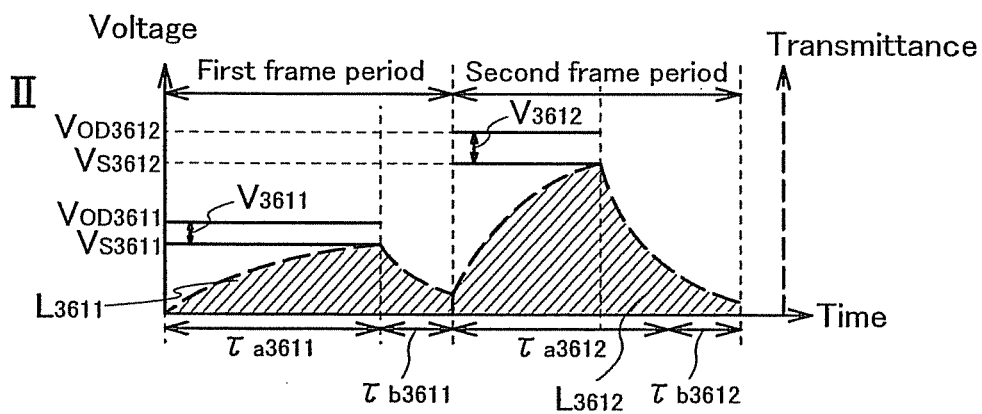

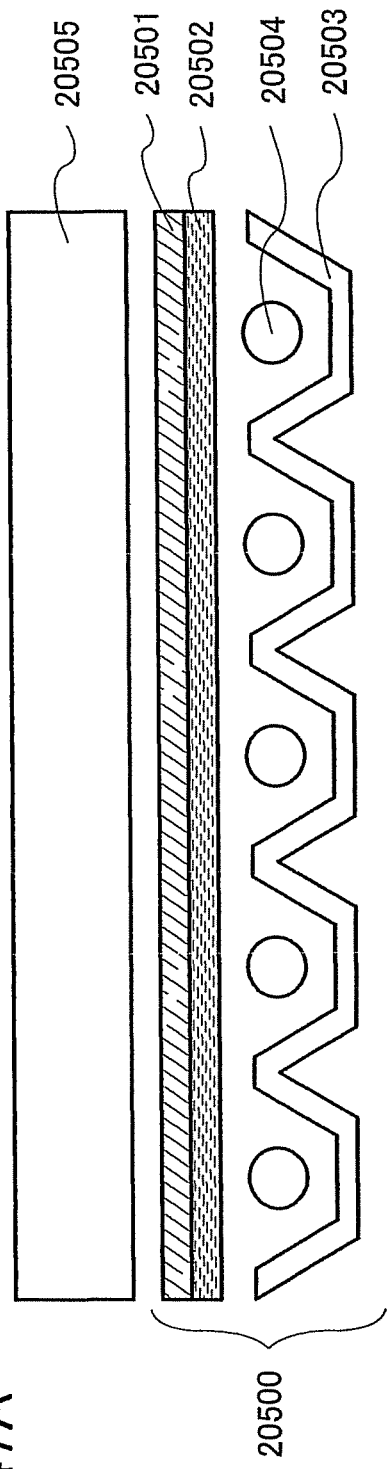
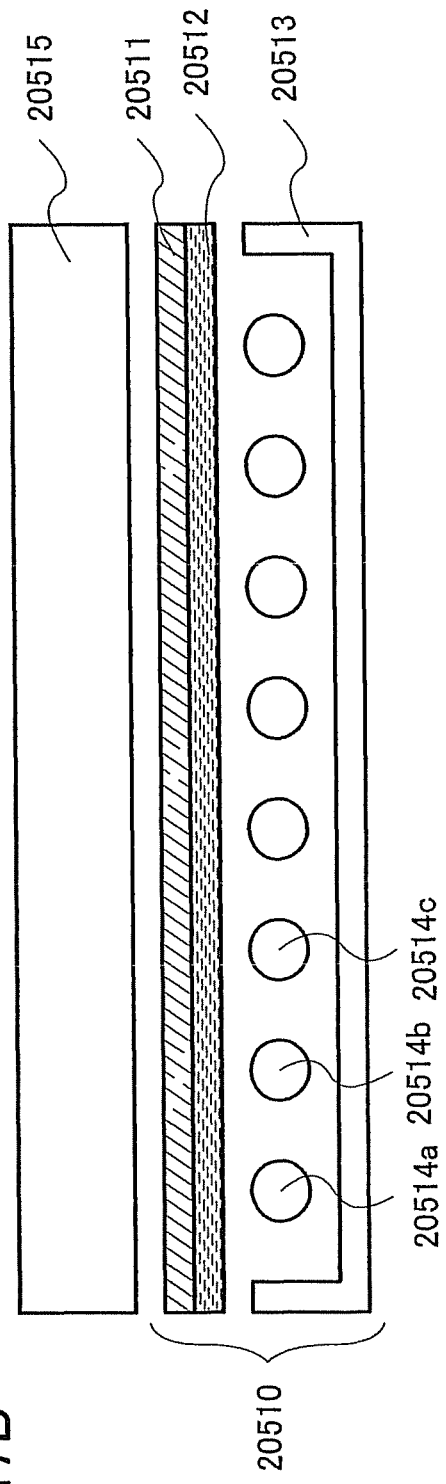
FIG. 47A
FIG. 47B 50601  50602

50611  50612

50621  50622

50631  50632

Semiconductor Layer
Gate Metal
Wiring
Transparent Conductive Film

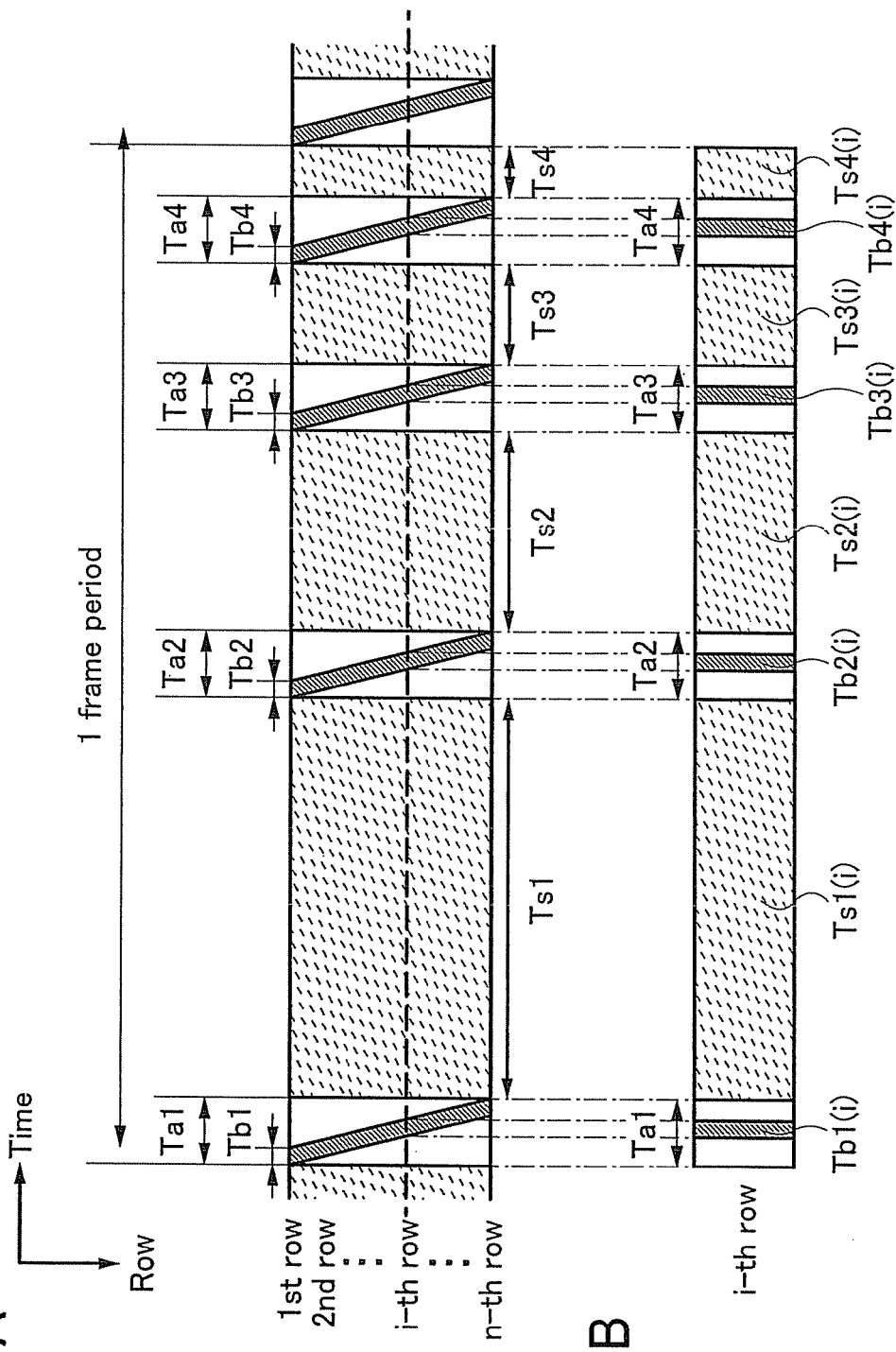

LIQUID CRYSTAL DISPLAY DEVICE AND DRIVING METHOD THEREOF

This application is a divisional of copending application Ser. No. 11/947,525 filed on Nov. 29, 2007.

BACKGROUND OF THE INVENTION

1. Field of the Invention

The present invention relates to a display device and an operating method, of the display device. In particular, the present invention relates to a method for improving quality of a moving image of a hold-type display device.

2. Description of the Related Art

In recent years, there have been growing interests in thin display devices. Liquid crystal displays, plasma displays, projection displays, and the like have been developed and becoming popular instead of CRT displays. Further, field emission displays, inorganic electroluminescence displays, organic electroluminescence displays, electronic paper, and the like have been developed as next-generation display devices.

In a display portion which is provided in the above-described display device, pixels which are minimum units for forming an image are arranged. Each of the pixels emits light with desired luminance by being supplied with a signal generated by image data. Accordingly, an image is displayed in the display portion.

In addition, the signal supplied to the pixel is updated (refreshed) at a constant period. An inverse number of this period is referred to as a frame rate. Further, time after the signal is updated once and before the signal is updated next is referred to as one frame period. Display of a moving image in the display portion is realized by supplying a signal which is different from the signal supplied before to the pixel when the signal is updated. On the other hand, display of a still image in the display portion is realized by supplying a signal which is the same as the signal supplied before to the pixel when the signal is updated.

Further, driving methods of display devices can be classified by temporal distribution of luminance of a pixel in one frame period. In hold-type display devices which are used for active matrix display devices, a pixel continuously emits light in one frame period. On the other hand, in impulsive-type display devices typified by CRTs, a pixel immediately attenuates and does not emit light after the pixel strongly emits light once in one frame period. In impulsive-type display devices, most one frame period is a non-light emitting state.

It has become obvious that hold-type display devices have a problem such that a moving object seems to leave traces when a moving image is displayed and part of an image is moved or the entire image blurs when the entire image is moved (motion blur). This is characteristics of hold-type display devices and a problem of motion blur does not occur in impulsive-type display devices.

As a method for solving a problem of motion blur in hold-type display devices, the following two methods have been mainly proposed (see Reference 1). A first method is a method of providing a period during which the original image is displayed and a period during which a black image is displayed in one frame period. Thus, display can be made closer to that of impulsive-type display devices, so that quality of a moving image can be improved (see References 2 and 3). A second method is a method in which display is performed by shortening the length of one frame period (increasing a frame rate) and generating a temporally compensated image with respect to an increased frame at the same time. Thus, quality of a moving image can be improved (see Reference 4). In addition, as an improvement technology of the first method, it is disclosed that quality of a moving image can be improved by displaying a darker image than the original image instead of a black image (see References 5, 6, 9, 10, and 11). Further, a method of changing driving methods in accordance with conditions is also disclosed (see Reference 7 and 8).

[Reference 1] Japanese Published Patent Application No. H04-302289
[Reference 2] Japanese Published Patent Application No. H09-325715
[Reference 3] Japanese Published Patent Application No. 2000-200063
[Reference 4] Japanese Published Patent Application No. 2005-268912
[Reference 5] Japanese Published Patent Application No. 2002-23707
[Reference 6] Japanese Published Patent Application No. 2004-240317
[Reference 7] Japanese Published Patent Application No. 2002-91400
[Reference 8] Japanese Published Patent Application No. 2004-177575
[Reference 9] Society For Information Display '05 DIGEST, 60.2, pp. 1734 to 1737, (2005)
[Reference 10] Society For Information Display '06 DIGEST, 69.4, pp. 1950 to 1953, (2006)
[Reference 11] Society For Information Display '06 DIGEST, 69.5, pp. 1954 to 1957, (2006)

SUMMARY OF THE INVENTION

Although various methods for solving a problem of motion blur in hold-type display devices have been considered, advantageous effects thereof are not sufficient in some cases. In addition, other troubles are increased by using the methods in some cases. For example, a flicker increases in a method in which display is made closer to that of impulsive-type display devices by displaying a black image. In addition, by displaying the black image, luminance of an image decreases compared with the case of not inserting a black image. In that case, in order to obtain luminance which is equal to that of the case of not inserting a black image, it is necessary to increase luminance instantaneously. Accordingly, loads on display devices are increased to decrease reliability or increase power consumption, which becomes problematic.

In a method of increasing a frame rate, a driver circuit which can process data at high speed is necessary because data processing becomes complicated, so that manufacturing cost increases, heat is generated in accordance with data processing, and power consumption increases, which become problematic. In addition, in a method in which a new image is generated by compensating image data, it is difficult to obtain high-quality compensated image, and on the contrary, quality of a moving image decreases in some cases by displaying an image by insertion of compensated data.

Further, when the above-described method for solving a problem of motion blur is applied to a liquid crystal display device, there is a problem in that speed during which transmittance of a liquid crystal is change is slow and it is difficult to sufficiently follow change in signals. Furthermore, there is a problem in that degree of light emission of a pixel is changed depending on viewing angles.

The present invention has been made in view of the foregoing problems. It is an object of the present invention to provide a hold-type display device without a problem of motion blur and a driving method of thereof. It is another object of the present invention to provide a display device with low power consumption and a driving method of thereof. In addition, it is another object of the present invention to provide a display device with improved quality for still images and moving images and a driving method of thereof. Further, it is another object of the present invention to provide a display device with a wider viewing angle and a driving method of thereof. Furthermore, it is an object of the present invention to provide a display device with improved response speed of a liquid crystal and a driving method of thereof.

One aspect of the present invention is a driving method of a liquid crystal display device in which an image is displayed by applying signal voltage $V_i$ in accordance with an image signal to a liquid crystal element. One frame period is divided into a first subframe period and a second subframe period. When the length of the first subframe period is denoted by $\tau_a$, first voltage which is applied to the liquid crystal element in the first subframe period is denoted by $V_a$, and second voltage which is applied to the liquid crystal element in the second subframe period is denoted by $V_b$, the first voltage $V_a$ is determined in accordance with a difference between the second voltage $V_b$ and the signal voltage $V_i$, and the length of the first subframe period $\tau_a$. The second voltage $V_b$ is voltage at which the liquid crystal element performs black display.

Another aspect of the present invention is a driving method of a liquid crystal display device in which an image is displayed by applying signal voltage $V_i$ in accordance with an image signal to a liquid crystal element. The liquid crystal display device includes a backlight. When the length of a backlight lighting period in one frame period is denoted by $\tau_a$, first voltage which is applied to the liquid crystal element in one frame period is denoted by $V_a$, and initialization voltage which is applied to the liquid crystal element right before one frame period is denoted by $V_0$, the first voltage $V_a$ is determined in accordance with a difference between the initialization voltage $V_0$ and the signal voltage $V_i$, and the length of the backlight lighting period $\tau_a$.

Another aspect of the present invention is a driving method of a liquid crystal display device in which an image is displayed by applying signal voltage $V_i$ in accordance with an image signal to a liquid crystal element. The liquid crystal display device includes a backlight. The backlight is divided into a plurality of light-emitting regions in a display region and is sequentially scanned to emit light. When the length of a lighting period of each of a plurality of light-emitting regions in one frame period is denoted by $\tau_a$, first voltage which is applied to the liquid crystal element in one frame period is denoted by $V_a$, and initialization voltage which is applied to the liquid crystal element right before one frame period is denoted by $V_0$, the first voltage $V_a$ is determined in accordance with a difference between the initialization voltage $V_0$ and the signal voltage $V_i$, and the length of the lighting period $\tau_a$ of each of the plurality of light-emitting regions.

Another aspect of the present invention is a driving method of a liquid crystal display device in which an image is displayed by applying signal voltage $V_i$ in accordance with an image signal to a liquid crystal element. The liquid crystal display device includes a backlight. One frame period is divided into a first subframe period and a second subframe period. When the length of a backlight lighting period in one frame period is denoted by $\tau_{a1}$, the length of the first subframe period is denoted by $\tau_{a2}$, first voltage which is applied to the liquid crystal element in the first subframe period is denoted by $V_a$, and second voltage which is applied to the liquid crystal element in the second subframe period is denoted by $V_b$, the first voltage $V_a$ is determined in accordance with a difference between the second voltage $V_b$ and the signal voltage $V_i$, the length of the backlight lighting period $\tau_{a1}$, and the length of the first subframe period $\tau_{a2}$. The second voltage $V_b$ is voltage at which the liquid crystal element performs black display.

Another aspect of the present invention is a driving method of a liquid crystal display device in which an image is displayed by applying signal voltage $V_i$ in accordance with an image signal to a liquid crystal element. The liquid crystal display device includes a backlight. The backlight is divided into a plurality of light-emitting regions in a display region and is sequentially scanned to emit light. One frame period is divided into a first subframe period and a second subframe period. When the length of a lighting period of each of a plurality of light-emitting regions in one frame period is denoted by $\tau_{a1}$, the length of the first subframe period is denoted by $\tau_{a2}$, first voltage which is applied to the liquid crystal element in the first subframe period is denoted by $V_a$, and second voltage which is applied to the liquid crystal element in the second subframe period is denoted by $V_b$, the first voltage $V_a$ is determined in accordance with a difference between the second voltage $V_b$ and the signal voltage $V_i$, the length of the lighting period $\tau_{a1}$ of each of the plurality of light-emitting regions, and the length of the first subframe period $\tau_{a2}$. The second voltage $V_b$ is voltage at which the liquid crystal element performs black display.

Another aspect of the present invention is a liquid crystal display device in which an image is displayed by applying signal voltage $V_i$ in accordance with an image signal to a liquid crystal element. One frame period is divided into a first subframe period and a second subframe period. When the length of the first subframe period is denoted by $\tau_a$, first voltage which is applied to the liquid crystal element in the first subframe period is denoted by $V_a$, and second voltage which is applied to the liquid crystal element in the second subframe period is denoted by $V_b$, the first voltage $V_a$ is determined in accordance with a difference between the second voltage $V_b$ and the signal voltage $V_i$, and the length of the first subframe period $\tau_a$. The second voltage $V_b$ is voltage at which the liquid crystal element performs black display.

Another aspect of the present invention is a liquid crystal display device in which an image is displayed by applying signal voltage $V_i$ in accordance with an image signal to a liquid crystal display device. The liquid crystal display device includes a backlight. When the length of a backlight lighting period in one frame period is denoted by $\tau_a$, first voltage which is applied to the liquid crystal element in one frame period is denoted by $V_a$, and initialization voltage which is applied to the liquid crystal element right before one frame period is denoted by $V_0$, the first voltage $V_a$ is determined in accordance with a difference between the initialization voltage $V_0$ and the signal voltage $V_i$, and the length of the backlight lighting period $\tau_a$.

Another aspect of the present invention is a liquid crystal display device in which an image is displayed by applying signal voltage $V_i$ in accordance with an image signal to a liquid crystal element. The liquid crystal display device includes a backlight. The backlight is divided into a plurality of light-emitting regions in a display region and is sequentially scanned to emit light. When the length of a lighting period of each of a plurality of light-emitting regions in one frame period is denoted by $\tau_a$, first voltage which is applied to the liquid crystal element in one frame period is denoted by $V_a$, and initialization voltage which is applied to the liquid crystal element right before one frame period is denoted by $V_0$, the first voltage $V_a$ is determined in accordance with a difference between the initialization voltage $V_0$ and the signal voltage $V_i$, and the length of the lighting period $\tau_a$ of each of the plurality of light-emitting regions.

Another aspect of the present invention is a liquid crystal display device in which an image is displayed by applying signal voltage $V_i$ in accordance with an image signal to a liquid crystal element. The liquid crystal display device includes a backlight. One frame period is divided into a first subframe period and a second subframe period. When the length of a backlight lighting period in one frame period is denoted by $\tau_{a1}$, the length of the first subframe period is denoted by $\tau_{a2}$, first voltage which is applied to the liquid crystal element in the first subframe period is denoted by $V_a$, and second voltage which is applied to the liquid crystal element in the second subframe period is denoted by $V_b$, the first voltage $V_a$ is determined in accordance with a difference between the second voltage $V_b$ and the signal voltage $V_i$, the length of the backlight lighting period $\tau_{a1}$, and the length of the first subframe period $\tau_{a2}$. The second voltage $V_b$ is voltage at which the liquid crystal element performs black display.

Another aspect of the present invention is a liquid crystal display device in which an image is displayed by applying signal voltage $V_i$ in accordance with an image signal to a liquid crystal element. The liquid crystal display device includes a backlight. The backlight is divided into a plurality of light-emitting regions in a display region and is sequentially scanned to emit light. One frame period is divided into a first subframe period and a second subframe period. When the length of a lighting period of each of a plurality of light-emitting regions in one frame period is denoted by $\tau_{a1}$, the length of the first subframe period is denoted by $\tau_{a2}$, first voltage which is applied to the liquid crystal element in the first subframe period is denoted by $V_a$, and second voltage which is applied to the liquid crystal element in the second subframe period is denoted by $V_b$, the first voltage $V_a$ is determined in accordance with a difference between the second voltage $V_b$ and the signal voltage $V_i$, the length of the lighting period $\tau_{a1}$ of each of the plurality of light-emitting regions, and the length of the first subframe period $\tau_{a2}$. The second voltage $V_b$ is voltage at which the liquid crystal element performs black display.

Note that in this specification, a condition where the darkest gray scale among gray scales which can be displayed is displayed even a slight amount of light is emitted is described that "luminance is 0" in some cases in addition to a condition where light is not emitted at all.

Note that various types of switches can be used as a switch shown in this document (a specification, a claim, a drawing, and the like). An electrical switch, a mechanical switch, and the like are given as examples. That is, any element can be used as long as it can control a current flow, without limiting to a certain element. For example, a transistor (e.g., a bipolar transistor or a MOS transistor), a diode (e.g., a PN diode, a PIN diode, a Schottky diode, a MIM (metal insulator metal) diode, a MIS (metal insulator semiconductor) diode, or a diode-connected transistor), a thyristor, or the like can be used as a switch. Alternatively, a logic circuit in which such elements are combined can be used as a switch.

In the case of using a transistor as a switch, polarity (a conductivity type) of the transistor is not particularly limited because it operates just as a switch. However, a transistor of polarity with smaller off-current is preferably used when off-current is to be suppressed. A transistor provided with an LDD region, a transistor with a multi-gate structure, and the like are given as examples of a transistor with smaller off-current. In addition, it is preferable that an N-channel transistor be used when a potential of a source terminal of the transistor which is operated as a switch is closer to a potential of a low-potential-side power supply (e.g., Vss, GND, or 0V), while a P-channel transistor be used when the potential of the source terminal is closer to a potential of a high-potential-side power supply (e.g., Vdd). This is because the absolute value of gate-source voltage can be increased when the potential of the source terminal of the transistor which is operated as the switch is closer to a potential of a low-potential-side power supply in an N-channel transistor and when the potential of the source terminal of the transistor which is operated as the switch is closer to a potential of a high-potential-side power supply in a P-channel transistor, so that the transistor is useful to be operated as a switch. This is also because the transistor does not often perform a source follower operation, so that reduction in output voltage does not often occur.

Note that a CMOS switch using both N-channel and P-channel transistors may be used. By using a CMOS switch, the switch can easily operate as a switch because current can flow when the P-channel transistor or the N-channel transistor is turned on. For example, voltage can be appropriately output regardless of whether voltage of an input signal of the switch is high or low. In addition, since a voltage amplitude value of a signal for turning on or off the switch can be made small, power consumption can be reduced.

Note also that when a transistor is used as a switch, the switch includes an input terminal (one of a source terminal and a drain terminal), an output terminal (the other of the source terminal and the drain terminal), and a terminal for controlling electrical conduction (a gate electrode). On the other hand, when a diode is used as a switch, the switch does not have a terminal for controlling electrical conduction in some cases. Therefore, when a diode is used as a switch, the number of wirings for controlling terminals can be more reduced than the case of using a transistor as a switch.

Note that in this document (the specification, the claim, the drawing, and the like), when it is explicitly described that "A and B are connected", the case where elements are electrically connected, the case where elements are functionally connected, and the case where elements are directly connected are included therein. Here, each of A and B corresponds to an object (e.g., a device, an element, a circuit, a wiring, an electrode, a terminal, a conductive film, or a layer). Accordingly, in structures disclosed in this document (the specification, the claim, the drawing, and the like), another element may be interposed between elements having a connection relation shown in drawings and texts, without limiting to a predetermined connection relation, for example, the connection relation shown in the drawings and the texts.

For example, in the case where A and B are electrically connected, one or more elements which enable electrical connection of A and B (e.g., a switch, a transistor, a capacitor, an inductor, a resistor, and/or a diode) may be provided between A and B. In addition, in the case where A and B are functionally connected, one or more circuits which enable functional connection of A and B (e.g., a logic circuit such as an inverter, a NAND circuit, or a NOR circuit, a signal converter circuit such as a DA converter circuit, an AD converter circuit, or a gamma correction circuit, a potential level converter circuit such as a power supply circuit (e.g., a boosting circuit or a voltage lower control circuit) or a level shifter circuit for changing a potential level of a signal, a voltage source, a current source, a switching circuit, or an amplifier circuit such as a circuit which can increase signal amplitude, the amount of current, or the like (e.g., an operational amplifier, a differential amplifier circuit, a source follower circuit, or a buffer circuit), a signal generating circuit, a memory circuit, and/or a control circuit) may be provided between A and B. Alternatively, in the case where A and B are directly connected, A and B may be directly connected without interposing another element or another circuit therebetween.

Note that when it is explicitly described that "A and B are directly connected", the case where A and B are directly connected (i.e., the case where A and B are connected without interposing another element or another circuit therebetween) and the case where A and B are electrically connected (i.e., the case where A and B are connected by interposing another element or another circuit therebetween) are included therein.

Note that when it is explicitly described that "A and B are electrically connected", the case where A and B are electrically connected (i.e., the case where A and B are connected by interposing another element or another circuit therebetween), the case where A and B are functionally connected (i.e., the case where A and B are functionally connected by interposing another circuit therebetween), and the case where A and B are directly connected (i.e., the case where A and B are connected without interposing another element or another circuit therebetween) are included therein. That is, when it is explicitly described that "A and B are electrically connected", the description is the same as the case where it is explicitly only described that "A and B are connected".

Note that a display element, a display device which is a device having a display element, a light-emitting element, and a light-emitting device which is a device having a light-emitting element can use various types and can include various elements. For example, as a display element, a display device, a light-emitting element, and a light-emitting device, whose a display medium, contrast, luminance, reflectivity, transmittivity, or the like changes by an electromagnetic action, such as an EL element (e.g., an EL element including organic and inorganic materials, an organic EL element, or an inorganic EL element), an electron emitter, a liquid crystal element, electronic ink, an electrophoresis element, a grating light valve (GLV), a plasma display panel (PDP), a digital micromirror device (DMD), a piezoelectric ceramic display, or a carbon nanotube can be used. Note that display devices using an EL element include an EL display; display devices using an electron emitter include a field emission display (FED), an SED-type flat panel display (SED: Surface-conduction Electron-emitter Display), and the like; display devices using a liquid crystal element include a liquid crystal display (e.g., a transmissive liquid crystal display, a semi-transmissive liquid crystal display, a reflective liquid crystal display, a direct-view liquid crystal display, or a projection liquid crystal display); and display devices using electronic ink include electronic paper.

Note that by using a catalyst (e.g., nickel) in the case of forming microcrystalline silicon, crystallinity can be further improved and a transistor having excellent electric characteristics can be formed. At this time, crystallinity can be improved by performing heat treatment without using a laser. Accordingly, a gate driver circuit (e.g., a scan line driver circuit) and part of a source driver circuit (e.g., an analog switch) can be formed over the same substrate. In addition, in the case of not using a laser for crystallization, crystallinity unevenness of silicon can be suppressed. Therefore, an image having high quality can be displayed.

Note also that polycrystalline silicon and microcrystalline silicon can be formed without using a catalyst (e.g., nickel).

In addition, a transistor can be formed by using a semiconductor substrate, an SOI substrate, or the like. In that case, a MOS transistor, a junction transistor, a bipolar transistor, or the like can be used as a transistor described in this specification. Therefore, a transistor with few variations in characteristics, sizes, shapes, or the like, with high current supply capacity, and with a small size can be formed. By using such a transistor, power consumption of a circuit can be reduced or a circuit can be highly integrated.

In addition, a transistor including a compound semiconductor or a oxide semiconductor such as ZnO, a-InGaZnO, SiGe, GaAs, IZO, indium tin oxide (ITO), or SnO, and a thin film transistor or the like obtained by thinning such a compound semiconductor or a oxide semiconductor can be used. Therefore, manufacturing temperature can be lowered and for example, such a transistor can be formed at room temperature. Accordingly, the transistor can be formed directly on a substrate having low heat resistance such as a plastic substrate or a film substrate. Note that such a compound semiconductor or an oxide semiconductor can be used for not only a channel portion of the transistor but also other applications. For example, such a compound semiconductor or an oxide semiconductor can be used as a resistor, a pixel electrode, or a light-transmitting electrode. Further, since such an element can be formed at the same time as the transistor, cost can be reduced.

A transistor or the like formed by using an inkjet method or a printing method can also be used. Accordingly, a transistor can be formed at room temperature, can be formed at a low vacuum, or can be formed using a large substrate. In addition, since the transistor can be formed without using a mask (a reticle), layout of the transistor can be easily changed. Further, since it is not necessary to use a resist, material cost is reduced and the number of steps can be reduced. Furthermore, since a film is formed only in a necessary portion, a material is not wasted compared with a manufacturing method in which etching is performed after the film is formed over the entire surface, so that cost can be reduced.

Further, a transistor or the like including an organic semiconductor or a carbon nanotube can be used. Accordingly, such a transistor can be formed using a substrate which can be bent. Therefore, a device using a transistor or the like including an organic semiconductor or a carbon nanotube can resist a shock.

Furthermore, transistors with various structures can be used. For example, a MOS transistor, a junction transistor, a bipolar transistor, or the like can be used as a transistor described in this document (the specification, the claim, the drawing, and the like). By using a MOS transistor, the size of the transistor can be reduced. Thus, a plurality of transistors can be mounted. By using a bipolar transistor, large current can flow. Thus, a circuit can be operated at high speed.

A MOS transistor, a bipolar transistor, and the like may be formed over one substrate. Thus, reduction in power consumption, reduction in size, high speed operation, and the like can be realized.

Furthermore, various transistors can be used.

A transistor can be formed using various types of substrates. The type of a substrate where a transistor is formed is not limited to a certain type. For example, a single crystalline substrate, an SOI substrate, a glass substrate, a quartz substrate, a plastic substrate, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, a stainless steel substrate, a substrate including a stainless steel foil, or the like can be used as a substrate where the transistor is formed. Alternatively, a skin (e.g., epidermis or corium) or hypodermal tissue of an animal such as a human being can be used as a substrate where the transistor is formed. In addition, the transistor may be formed using one substrate, and then, the transistor may be transferred to another substrate. A single crystalline substrate, an SOI substrate, a glass substrate, a quartz substrate, a plastic substrate, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, a stainless steel substrate, a substrate including a stainless steel foil, or the like can be used as a substrate to which the transistor is transferred. Alternatively, a skin (e.g., epidermis or corium) or hypodermal tissue of an animal such as a human being can be used as a substrate to which the transistor is transferred. Further alternatively, the transistor may be formed using one substrate and the substrate may be thinned by polishing. A single crystalline substrate, an SOI substrate, a glass substrate, a quartz substrate, a plastic substrate, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, a stainless steel substrate, a substrate including a stainless steel foil, or the like can be used as a substrate to be polished. Alternatively, a skin (e.g., epidermis or corium) or hypodermal tissue of an animal such as a human being can be used as a substrate to be polished. By using such a substrate, a transistor with excellent properties or a transistor with low power consumption can be formed, a device with high durability or high heat resistance can be formed, or reduction in weight or thickness can be achieved.

A structure of a transistor can be various modes without limiting to a certain structure. For example, a multi-gate structure having two or more gate electrodes may be used. When the multi-gate structure is used, a structure where a plurality of transistors are connected in series is provided because a structure where channel regions are connected in series is provided. By using the multi-gate structure, off-current can be reduced or the withstand voltage of the transistor can be increased to improve reliability. Alternatively, by using the multi-gate structure, drain-source current does not fluctuate very much even if drain-source voltage fluctuates when the transistor operates in a saturation region, so that a flat slope of voltage-current characteristics can be obtained. By utilizing the flat slope of the voltage-current characteristics, an ideal current source circuit or an active load having a high resistance value can be realized. Accordingly, a differential circuit or a current mirror circuit having excellent properties can be realized. In addition, a structure where gate electrodes are formed above and below a channel may be used. By using the structure where gate electrodes are formed above and below the channel, a channel region is enlarged, so that the amount of current flowing therethrough can be increased or a depletion layer can be easily formed to decrease an S value. When the gate electrodes are formed above and below the channel, a structure where a plurality of transistors are connected in parallel is provided.

Further, a structure where a gate electrode is formed above a channel, a structure where a gate electrode is formed below a channel, a staggered structure, an inversely staggered structure, a structure where a channel region is divided into a plurality of regions, or a structure where channel regions are connected in parallel or in series can be used. In addition, a source electrode or a drain electrode may overlap with a channel region (or part of it). By using the structure where the source electrode or the drain electrode may overlap with the channel region (or part of it), the case can be prevented in which electric charges are accumulated in part of the channel region, which would result in an unstable operation. Further, an LDD region may be provided. By providing the LDD region, off-current can be reduced or the withstand voltage of the transistor can be increased to improve reliability. Alternatively, drain-source current does not fluctuate very much even if drain-source voltage fluctuates when the transistor operates in the saturation region, so that a flat slope of voltage-current characteristics can be obtained.

Note that various types of transistors can be used for a transistor in this document (the specification, the claim, the drawing, and the like) and the transistor can be formed using various types of substrates. Accordingly, all of circuits which are necessary to realize a predetermined function may be formed using the same substrate. For example, all of the circuits which are necessary to realize the predetermined function may be formed using a glass substrate, a plastic substrate, a single crystalline substrate, an SOI substrate, or any other substrate. When all of the circuits which are necessary to realize the predetermined function are formed using the same substrate, cost can be reduced by reduction in the number of component parts or reliability can be improved by reduction in the number of connections to circuit components. Alternatively, part of the circuits which are necessary to realize the predetermined function may be formed using one substrate and another part of the circuits which are necessary to realize the predetermined function may be formed using another substrate. That is, not all of the circuits which are necessary to realize the predetermined function are required to be formed using the same substrate. For example, part of the circuits which are necessary to realize the predetermined function may be formed with transistors using a glass substrate and another part of the circuits which are necessary to realize the predetermined function may be formed using a single crystalline substrate, so that an IC chip formed by a transistor using the single crystalline substrate may be connected to the glass substrate by COG (chip on glass) and the IC chip may be provided over the glass substrate. Alternatively, the IC chip may be connected to the glass substrate by TAB (tape automated bonding) or a printed wiring board. When part of the circuits are formed using the same substrate in this manner, cost can be reduced by reduction in the number of component parts or reliability can be improved by reduction in the number of connections to circuit components. In addition, for example, by forming a portion with high driving voltage or a portion with high driving frequency, which consumes large power, using a single crystalline substrate and using an IC chip formed by the circuit instead of forming such a portion using the same substrate, increase in power consumption can be prevented.

Note also that one pixel corresponds to one element whose brightness can be controlled in this document (the specification, the claim, the drawing, and the like). For example, one pixel corresponds to one color element which expresses brightness. Therefore, in the case of a color display device having color elements of R (Red), G (Green), and B (Blue), a minimum unit of an image is formed of three pixels of an R pixel, a G pixel, and a B pixel. Note that the color elements are not limited to three colors, and color elements of more than three colors may be used or a color other than RGB may be added. For example, RGBW may be used by adding W (white). In addition, RGB plus one or more colors of yellow, cyan, magenta emerald green, vermilion, and the like may be used. Further, a color similar to at least one of R, G, and B may be added to RGB. For example, R, G, B1, and B2 may be used. Although both B1 and B2 are blue, they have slightly different frequency. Similarly, R1, R2, G, and B may be used, for example. By using such color elements, display which is closer to the real object can be performed. Alternatively, by using such color elements, power consumption can be reduced. Furthermore, as another example, in the case of controlling brightness of one color element by using a plurality of regions, one region may correspond to one pixel. For example, in the case of performing area ratio gray scale display or in the case of including a subpixel, a plurality of regions which control brightness are provided in each color element and gray scales are expressed with the whole regions. In this case, one region which controls brightness may correspond to one pixel. Thus, in that case, one color element includes a plurality of pixels. Alternatively, even when the plurality of regions which control brightness are provided in one color element, these regions may be collected as one pixel. Thus, in that case, one color element includes one pixel. In that case, one color element includes one pixel. In the case where brightness is controlled in a plurality of regions in each color element, regions which contribute to display have different area dimensions depending on pixels in some cases. In addition, in the plurality of regions which control brightness in each color element, signals supplied to each of the plurality of regions may be slightly varied to widen a viewing angle. That is, potentials of pixel electrodes included in the plurality of regions provided in each color element may be different from each other. Accordingly, voltage applied to liquid crystal molecules are varied depending on the pixel electrodes. Therefore, the viewing angle can be widened.

Note that when it is explicitly described that "one pixel (for three colors)", it corresponds to the case where three pixels of R, G, and B are considered as one pixel. Meanwhile, when it is explicitly described that "one pixel (for one color)", it corresponds to the case where the plurality of regions are provided in each color element and collectively considered as one pixel.

Note also that in this document (the specification, the claim, the drawing, and the like), pixels are provided (arranged) in matrix in some cases. Here, description that pixels are provided (arranged) in matrix includes the case where the pixels are arranged in a straight line and the case where the pixels are arranged in a jagged line, in a longitudinal direction or a lateral direction. Therefore, in the case of performing full color display with three color elements (e.g., RGB), the following cases are included therein: the case where the pixels are arranged in stripes and the case where dots of the three color elements are arranged in a delta pattern. In addition, the case is also included therein in which dots of the three color elements are provided in Bayer arrangement. Note that the color elements are not limited to three colors, and color elements of more than three colors may be used. RGBW, RGB plus one or more of yellow, cyan, magenta, and the like, or the like is given as an example. Further, the sizes of display regions may be different between respective dots of color elements. Thus, power consumption can be reduced or the life of a display element can be prolonged.

Note also that in this document (the specification, the claim, the drawing, and the like), an active matrix method in which an active element is included in a pixel or a passive matrix method in which an active element is not included in a pixel can be used.

In the active matrix method, as an active element (a non-linear element), not only a transistor but also various active elements (non-linear elements) can be used. For example, a MIM (metal insulator metal), a TFD (thin film diode), or the like can also be used. Since such an element has few number of manufacturing steps, manufacturing cost can be reduced or yield can be improved. Further, since the size of the element is small, an aperture ratio can be improved, so that power consumption can be reduced or high luminance can be achieved.

As a method other than the active matrix method, the passive matrix method in which an active element (a non-linear element) is not used can also be used. Since an active element (a non-linear element) is not used, manufacturing steps is few, so that manufacturing cost can be reduced or the yield can be improved. Further, since an active element (a non-linear element) is not used, the aperture ratio can be improved, so that power consumption can be reduced or high luminance can be achieved.

Note that a transistor is an element having at least three terminals of a gate, a drain, and a source. The transistor has a channel region between a drain region and a source region, and current can flow through the drain region, the channel region, and the source region. Here, since the source and the drain of the transistor may change depending on the structure, the operating condition, and the like of the transistor, it is difficult to define which is a source or a drain. Therefore, in this document (the specification, the claim, the drawing, and the like), a region functioning as a source and a drain may not be called the source or the drain. In such a case, for example, one of the source and the drain may be referred to as a first terminal and the other thereof may be referred to as a second terminal. Alternatively, one of the source and the drain may be referred to as a first electrode and the other thereof may be referred to as a second electrode. Further alternatively, one of the source and the drain may be referred to as a source region and the other thereof may be called a drain region.

Note also that a transistor may be an element having at least three terminals of a base, an emitter, and a collector. In this case also, one of the emitter and the collector may be similarly called a first terminal and the other terminal may be called a second terminal.

A gate corresponds to all or part of a gate electrode and a gate wiring (also referred to as a gate line, a gate signal line, a scan line, a scan signal line, or the like). A gate electrode corresponds to a conductive film which overlaps with a semiconductor which forms a channel region with a gate insulating film interposed therebetween. Note that part of the gate electrode overlaps with an LDD (lightly doped drain) region, the source region, or the drain region with the gate insulating film interposed therebetween in some cases. Agate wiring corresponds to a wiring for connecting a gate electrode of each transistor to each other, a wiring for connecting a gate electrode of each pixel to each other, or a wiring for connecting a gate electrode to another wiring.

However, there is a portion (a region, a conductive film, a wiring, or the like) which functions as both a gate electrode and a gate wiring. Such a portion (a region, a conductive film, a wiring, or the like) may be called either a gate electrode or a gate wiring. That is, there is a region where a gate electrode and a gate wiring cannot be clearly distinguished from each other. For example, in the case where a channel region overlaps with part of an extended gate wiring, the overlapped portion (region, conductive film, wiring, or the like) functions as both a gate wiring and a gate electrode. Accordingly, such a portion (a region, a conductive film, a wiring, or the like) may be called either a gate electrode or a gate wiring.

In addition, a portion (a region, a conductive film, a wiring, or the like) which is formed of the same material as a gate electrode, forms the same island as the gate electrode, and is connected to the gate electrode may also be called a gate electrode. Similarly, a portion (a region, a conductive film, a wiring, or the like) which is formed of the same material as a gate wiring, forms the same island as the gate wiring, and is connected to the gate wiring may also be called a gate wiring. In a strict sense, such a portion (a region, a conductive film, a wiring, or the like) does not overlap with a channel region or does not have a function of connecting the gate electrode to another gate electrode in some cases. However, there is a portion (a region, a conductive film, a wiring, or the like) which is formed of the same material as a gate electrode or a gate wiring, forms the same island as the gate electrode or the gate wiring, and is connected to the gate electrode or the gate wiring because of conditions in a manufacturing step. Thus, such a portion (a region, a conductive film, a wiring, or the like) may also be called either a gate electrode or a gate wiring.

In a multi-gate transistor, for example, a gate electrode is often connected to another gate electrode by using a conductive film which is formed of the same material as the gate electrode. Since such a portion (a region, a conductive film, a wiring, or the like) is a portion (a region, a conductive film, a wiring, or the like) for connecting the gate electrode to another gate electrode, it may be called a gate wiring, and it may also be called a gate electrode because a multi-gate transistor can be considered as one transistor. That is, a portion (a region, a conductive film, a wiring, or the like) which is formed of the same material as a gate electrode or a gate wiring, forms the same island as the gate electrode or the gate wiring, and is connected to the gate electrode or the gate wiring may be called either a gate electrode or a gate wiring. In addition, for example, part of a conductive film which connects the gate electrode and the gate wiring and is formed of a material which is different from that of the gate electrode or the gate wiring may also be called either a gate electrode or a gate wiring.

Note that a gate terminal corresponds to part of a portion (a region, a conductive film, a wiring, or the like) of a gate electrode or a portion (a region, a conductive, film, a wiring, or the like) which is electrically connected to the gate electrode.

Note that when a wiring is called a gate wiring, a gate line, a gate signal line, a scan line, a scan signal line, there is the case in which a gate of a transistor is not connected to a wiring. In this case, the gate wiring, the gate line, the gate signal line, the scan line, or the scan signal line corresponds to a wiring formed in the same layer as the gate of the transistor, a wiring formed of the same material of the gate of the transistor, or a wiring formed at the same time as the gate of the transistor in some cases. As examples, a wiring for storage capacitance, a power supply line, a reference potential supply line, and the like can be given.

Note also that a source corresponds to all or part of a source region, a source electrode, and a source wiring (also referred to as a source line, a source signal line, a data line, a data signal line, or the like). A source region corresponds to a semiconductor region including a large amount of p-type impurities (e.g., boron or gallium) or n-type impurities (e.g., phosphorus or arsenic). Therefore, a region including a small amount of p-type impurities or n-type impurities, namely, an LDD (lightly doped drain) region is not included in the source region. A source electrode is part of a conductive layer formed of a material different from that of a source region, and electrically connected to the source region. However, there is the case where a source electrode and a source region are collectively called a source electrode. A source wiring is a wiring for connecting a source electrode of each transistor to each other, a wiring for connecting a source electrode of each pixel to each other, or a wiring for connecting a source electrode to another wiring.

However, there is a portion (a region, a conductive film, a wiring, or the like) functioning as both a source electrode and a source wiring. Such a portion (a region, a conductive film, a wiring, or the like) may be called either a source electrode or a source wiring. That is, there is a region where a source electrode and a source wiring cannot be clearly distinguished from each other. For example, in the case where a source region overlaps with part of an extended source wiring, the overlapped portion (region, conductive film, wiring, or the like) functions as both a source wiring and a source electrode. Accordingly, such a portion (a region, a conductive film, a wiring, or the like) may be called either a source electrode or a source wiring.

In addition, a portion (a region, a conductive film, a wiring, or the like) which is formed of the same material as a source electrode, forms the same island as the source electrode, and is connected to the source electrode, or a portion (a region, a conductive film, a wiring, or the like) which connects a source electrode and another source electrode may also be called a source electrode. Further, a portion which overlaps with a source region may be called a source electrode. Similarly, a portion (a region, a conductive film, a wiring, or the like) which is formed of the same material as a source wiring, forms the same island as the source wiring, and is connected to the source wiring may also be called a source wiring. In a strict sense, such a portion (a region, a conductive film, a wiring, or the like) does not have a function of connecting the source electrode to another source electrode in some cases. However, there is a portion (a region, a conductive film, a wiring, or the like) which is formed of the same material as a source electrode or a source wiring, forms the same island as the source electrode or the source wiring, and is connected to the source electrode or the source wiring because of conditions in a manufacturing step. Thus, such a portion (a region, a conductive film, a wiring, or the like) may also be called either a source electrode or a source wiring.

In addition, for example, part of a conductive film which connects a source electrode and a source wiring and is formed of a material which is different from that of the source electrode or the source wiring may be called either a source electrode or a source wiring.

Note that a source terminal corresponds to part of a source region, a source electrode, or a portion (a region, a conductive film, a wiring, or the like) which is electrically connected to the source electrode.

Note that when a wiring is called a source wiring, a source line, a source signal line, a data line, a data signal line, there is the case in which a source (a drain) of a transistor is not connected to a wiring. In this case, the source wiring, the source line, the source signal line, the data line, or the data signal line corresponds to a wiring formed in the same layer as the source (the drain) of the transistor, a wiring formed of the same material of the source (the drain) of the transistor, or a wiring formed at the same time as the source (the drain) of the transistor in some cases. As examples, a wiring for storage capacitance, a power supply line, a reference potential supply line, and the like can be given.

Note also that the same can be said for a drain.

Note also that a semiconductor device corresponds to a device having a circuit including a semiconductor element (e.g., a transistor, a diode, or thyristor). The semiconductor device may also include all devices that can function by utilizing semiconductor characteristics.

Note also that a display element corresponds to an optical modulation element, a liquid crystal element, a light-emitting element, an EL element (an organic EL element, an inorganic EL element, or an EL element including organic and inorganic materials), an electron emitter, an electrophoresis element, a discharging element, a light-reflective element, a light diffraction element, a digital micro device (DMD), or the like. Note that the present invention is not limited to this.

In addition, a display device corresponds to a device having a display element. Note that the display device may also corresponds to a display panel itself where a plurality of pixels including display elements are formed over the same substrate as a peripheral driver circuit for driving the pixels. In addition, the display device may also include a peripheral driver circuit provided over a substrate by wire bonding or bump bonding, namely, an IC chip connected by chip on glass (COG) or an IC chip connected by TAB or the like. Further, the display device may also include a flexible printed circuit (FPC) to which an IC chip, a resistor, a capacitor, an inductor, a transistor, or the like is attached. Note also that the display device includes a printed wiring board (PWB) which is connected through a flexible printed circuit (FPC) and to which an IC chip, a resistor, a capacitor, an inductor, a transistor, or the like is attached. The display device may also include an optical sheet such as a polarizing plate or a retardation plate. The display device may also include a lighting device, a housing, an audio input and output device, a light sensor, or the like. Here, a lighting device such as a backlight unit may include a light guide plate, a prism sheet, a diffusion sheet, a reflective sheet, a light source (e.g., an LED or a cold cathode fluorescent lamp), a cooling device (e.g., a water cooling device or an air cooling device), or the like.

Moreover, a lighting device corresponds to a device having a backlight unit, a light guide plate, a prism sheet, a diffusion sheet, a reflective sheet, or a light source (e.g., an LED, a cold cathode fluorescent lamp, or a hot cathode fluorescent lamp), a cooling device, or the like.

In addition, a light-emitting device corresponds to a device having a light-emitting element and the like. In the case of including a light-emitting element as a display element, the light-emitting device is one of specific examples of a display device.

Note that a reflective device corresponds to a device having a light-reflective element, a light diffraction element, light-reflective electrode, or the like.

A liquid crystal display device corresponds to a display device including a liquid crystal element. Liquid crystal display devices include a direct-view liquid crystal display, a projection liquid crystal display, a transmissive liquid crystal display, a reflective liquid crystal display, a semi-transmissive liquid crystal display, and the like.

Note also that a driving device corresponds to a device having a semiconductor element, an electric circuit, or an electronic circuit. For example, a transistor which controls input of a signal from a source signal line to a pixel (also referred to as a selection transistor, a switching transistor, or the like), a transistor which supplies voltage or current to a pixel electrode, a transistor which supplies voltage or current to a light-emitting element, and the like are examples of the driving device. A circuit which supplies a signal to a gate signal line (also referred to as a gate driver, a gate line driver circuit, or the like), a circuit which supplies a signal to a source signal line (also referred to as a source driver, a source line driver circuit or the like) are also examples of the driving device.

Note also that a display device, a semiconductor device, a lighting device, a cooling device, a light-emitting device, a reflective device, a driving device, and the like overlap with each other in some cases. For example, a display device includes a semiconductor device and a light-emitting device in some cases. Alternatively, a semiconductor device includes a display device and a driving device in some cases.

In this document (the specification, the claim, the drawing, and the like), when it is explicitly described that "B is formed on A" or "B is formed over A", it does not necessarily mean that B is formed in direct contact with A. The description includes the case where A and B are not in direct contact with each other, i.e., the case where another object is interposed between A and B. Here, each of A and B corresponds to an object (e.g., a device, an element, a circuit, a wiring, an electrode, a terminal, a conductive film, or a layer).

Accordingly, for example, when it is explicitly described that a layer B is formed on (or over) a layer A, it includes both the case where the layer B is formed in direct contact with the layer A, and the case where another layer (e.g., a layer C or a layer D) is formed in direct contact with the layer A and the layer B is formed in direct contact with the layer C or D. Note that another layer (e.g., a layer C or a layer D) may be a single layer or a plurality of layers.

Similarly, when it is explicitly described that B is formed above A, it does not necessarily mean that B is formed in direct contact with A, and another object may be interposed therebetween. Accordingly, for example, when it is explicitly described that a layer B is formed above a layer A, it includes both the case where the layer B is formed in direct contact with the layer A, and the case where another layer (e.g., a layer C or a layer D) is formed in direct contact with the layer A and the layer B is formed in direct contact with the layer C or D. Note that another layer (e.g., a layer C or a layer D) may be a single layer or a plurality of layers.

Note that when it is explicitly described that B is formed in direct contact with A, it includes not the case where another object is interposed between A and B but the case where B is formed in direct contact with A.

Note that the same can be said when it is explicitly described that B is formed below or under A.

By using the present invention, a hold-type display device without a problem of motion blur and a driving method thereof can be provided. In addition, by using the present invention, a display device with low power consumption and a driving method thereof can be provided. Further, by using the present invention, a display device with improved quality for still images and moving images and a driving method thereof can be provided. Furthermore, by using the present invention, a display device with a wider viewing angle and a driving method thereof can be provided. Moreover, by using the present invention, a display device with improved response speed of a liquid crystal and a driving method thereof can be provided.

BRIEF DESCRIPTION OF THE DRAWINGS

In the accompanying drawings:

FIGS. 6A to 6P are diagrams each illustrating an example of a condition of a lighting ratio with respect to control parameters in accordance with the present invention;

FIGS. 18A to 18I are views each illustrating an example of control parameters in accordance with the present invention, and FIGS. 18J to 18L are diagrams in which histograms of images shown in FIGS. 18A to 18I are compared with each other;

FIGS. 34A to 34BII are diagrams each illustrating an example of a timing chart of a semiconductor device in accordance with the present invention;

FIGS. 35A to 35BII are diagrams each illustrating an example of a timing chart of a semiconductor device in accordance with the present invention;

FIGS. 36A to 36BII are diagrams each illustrating an example of a timing chart of a semiconductor device in accordance with the present invention;

FIGS. 47A and 47B are views each illustrating an example of a cross-sectional view of a semiconductor device in accordance with the present invention;

FIGS. 64A and 64B are diagrams each illustrating an example of a timing chart of a semiconductor device in accordance with the present invention;

DETAILED DESCRIPTION OF THE INVENTION

Figure 1A:
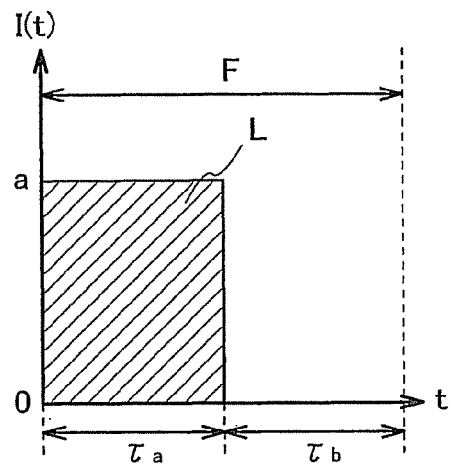
FIGS. 1A to 1C are diagrams each illustrating definitions of words and signs in accordance with the present invention.

Hereinafter, the present invention will be described by way of embodiment modes with reference to the drawings. However, the present invention can be implemented in various different ways and it will be easily understood by those skilled in the art that various changes and modifications are possible. Unless such changes and modifications depart from the spirit and the scope of the present invention, they should be construed as being included therein. Therefore, the present invention should not be construed as being limited to the description of the embodiment modes.

Embodiment Mode 1

In this embodiment mode, words relating to a driving method of a display device, such as instantaneous luminance, integrated luminance, a lighting ratio, and average luminance used in this document (the specification, the claim, the drawing, and the like), and control modes thereof are described.

First, meanings of words and signs used in this document are described. First, words about time and signs thereof, i.e., t, F, $\tau_a$, $\tau_b$, and R are described. The sign t expresses time. The sign F expresses one frame period and the length thereof. One frame period F is divided into a plurality of subframe periods, and each of the subframe periods are classified into an image display period or a blanking interval. Here, the image display period is a period during which original luminance of an image is mainly displayed. The blanking interval is a period during which an image displayed in the image display period can be reset by human eyes. Note that the subframe period may be a period other than the image display period and the blanking interval. The sign $\tau_a$ expresses the image display period and the length thereof. The sign $\tau_b$ expresses the blanking interval and the length thereof. Note also that periods other than the image display period $\tau_a$ in the one frame period F each correspond to the blanking interval $\tau_b$. The sign R expresses a lighting ratio. Here, the lighting ratio is a value obtained by dividing the image display period $\tau_a$ by the one frame period F. That is, the lighting ratio R is a ratio of the image display period $\tau_a$ in the one frame period F.

Next, words relating to luminance and signs thereof, i.e., I (t), L, and B are described. The sign I (t) shows instantaneous luminance. Here, instantaneous luminance is instantaneous emission intensity of a pixel. The sign L expresses integrated luminance. Here, the integrated luminance is a value obtained by integrating the instantaneous luminance I (t) by time in a range of the one frame period F. The sign B expresses average luminance. Here, the average luminance is a value obtained by dividing the integrated luminance L by the image display period $\tau_a$. That is, the average luminance B expresses luminance of a pixel when it is assumed that the luminance of the pixel is constant in the image display period $\tau_a$.

When the above-described relations are represented by formulas, the relations can be represented by Formula 1 to Formula 4.

$$R = \frac{\tau_a}{F} \qquad \text{[Formula 1]}$$

$$\tau_b = F - \tau_a \qquad \text{[Formula 2]}$$

$$L = \int_F I(t)\,dt \qquad \text{[Formula 3]}$$

$$B = \frac{L}{\tau_a} \qquad \text{[Formula 4]}$$

Hereinafter, when the above-described signs are used without notice in this document, meanings thereof may be considered that they follow the above-described definitions.

Note that an actual relationship between the words which are defined in this document and display conditions of a display device are described. As for the lighting ratio R, driving becomes closer to hold-type driving as R increases, and driving becomes closer to impulsive driving as R decreases. As for the integrated luminance L, luminance perceived by human eyes increases as L increases, and luminance perceived by human eyes decreases as L decreases. As for the instantaneous luminance I (t), either increase or decrease in the integrated luminance I (t) does not have a direct relation that luminance perceived by human eyes increases or decreased. This is because human eyes cannot perceive fluctuation in light, brightness of which fluctuates with high frequency and perceives the light as constant light.

At this time, brightness perceived by human eyes is not fluctuation in brightness itself but light having a frequency of a value obtained by integrating brightness by time in a certain range. In addition, limit frequency in which human eyes perceive fluctuation in brightness is approximately 50 Hz to 60 Hz. This frequency is almost the same value as a frame rate of a general display device. Further, the average luminance B is an amount used for convenience to describe control modes in this document; however, the average luminance B is similar to the integrated luminance L in that luminance perceived by human eyes increases as B increases, and luminance perceived by human eyes decreases as B decreases.

Figure 1B:
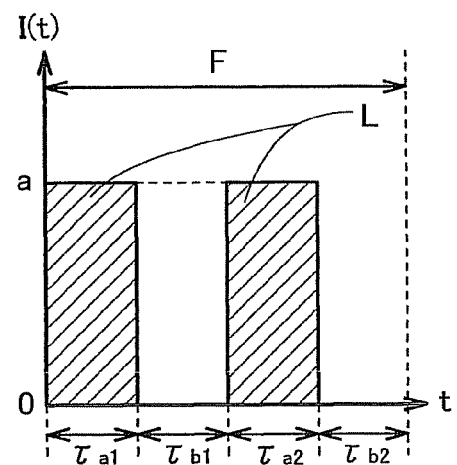
Figure 1C:
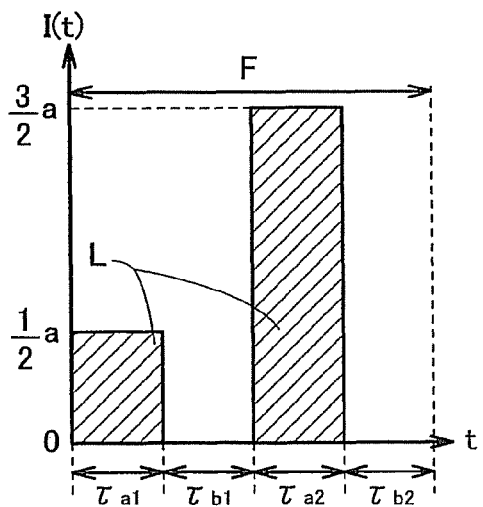

Next, the words in this document are described in detail with reference to FIGS. 1A to 1C. Here, one of pixels included in a display device is focused on, and instantaneous luminance I (t) of the pixel is schematically shown in FIGS. 1A to 1C. A horizontal axis represents time t and a vertical axis represents luminance.

FIG. 1A is an example of the case in which one frame period is divided into two subframe periods, a first subframe period corresponds to an image display period $\tau_a$, and a second subframe period corresponds to a blanking interval $\tau_b$. In FIG. 1A, each of the image display period $\tau_a$ and the blanking interval $\tau_b$ is half of one frame period F ($\tau_a = \tau_b = F/2$ is satisfied). In addition, instantaneous luminance I (t) in the image display period $\tau_a$ is constant and a value thereof is a. Instantaneous luminance I (t) in the blanking interval $\tau_b$ is constant and a value thereof is 0. At this time, as for lighting ratio R, R=($\tau_a$/F)=½ is satisfied. As for integrated luminance L, L=a×(F/2)=(aF/2) is satisfied. Therefore, as for average luminance B, B=(L/$\tau_a$)=a is satisfied.

FIG. 1B is a diagram showing the case in which there are a plurality of image display periods $\tau_a$ and a plurality of blanking intervals $\tau_b$. In this manner, the image display period $\tau_a$ and the blanking interval $\tau_b$ can be divided into a plurality of sub-image display periods and sub-blanking intervals. That is, when there are n (n is a positive integer) pieces of sub-image display periods in one frame period, the sub-image display periods are denoted by $\tau_{a1}$, $\tau_{a2}$, $\tau_{a3}$, . . . , and $\tau_{an}$ and the image display period $\tau_a$ is the sum thereof. Similarly, when there are n (n is a positive integer) pieces of sub-blanking intervals in one frame period, the sub-blanking intervals are denoted by $\tau_{b1}$, $\tau_{b2}$, $\tau_{b3}$, . . . , and $\tau_b$ and the blanking interval $\tau_b$ is the sum thereof. That is, when there are n pieces of sub-image display periods and sub-blanking intervals in one frame period, the image display period $\tau_a$ and the blanking interval $\tau_b$ can be represented by Formula 5 and Formula 6 when j and k are positive integers.

$$\tau_a = \sum_{j=1}^{n} \tau_{aj}$$ [Formula 5]

$$\tau_b = \sum_{k=1}^{n} \tau_{bk}$$ [Formula 6]

In FIG. 1B, as for the sub-image display period, $\tau_{a1} = \tau_{a2} = F/4$ is satisfied, and as for the sub-blanking interval, $\tau_{b1} = \tau_{b2} = F/4$ is satisfied. Therefore, as for the image display period $\tau_a$ and the blanking interval $\tau_b$, $\tau_a = \tau_b = F/2$ is satisfied. Instantaneous luminance I (t) in the image display period $\tau_a$ is constant and a value thereof is a. Instantaneous luminance I (t) in the blanking interval $\tau_b$ is constant and a value thereof is 0. At this time, as for lighting ratio R, R=($\tau_a$/F)=½ is satisfied. As for integrated luminance L, L=a×(F/4)+a(F/4)=(aF/2) is satisfied. Therefore, as for average luminance B, B=(L/$\tau_a$)=a is satisfied.

FIG. 1C shows the case in which there are a plurality of image display periods $\tau_a$ and a plurality of blanking intervals $\tau_b$, and instantaneous luminance is different in each of the sub-image display period. In FIG. 1C, as for the sub-image display period, $\tau_{a1} = \tau_{a2} = F/4$ is satisfied, and as for the sub-blanking interval, $\tau_{b1} = \tau_{b2} = F/4$ is satisfied. Therefore, as for the image display period $\tau_a$ and the blanking interval $\tau_b$, $\tau_a = \tau_b = F/2$ is satisfied. Instantaneous luminance I (t) in the sub-image display period $\tau_{a1}$ is constant and a value thereof is a/2. Instantaneous luminance I (t) in the sub-image display period $\tau_{a2}$ is constant and a value thereof is 3a/2. Instantaneous luminance I (t) in the blanking interval $\tau_b$ is constant and a value thereof is 0. At this time, as for lighting ratio R, R=($\tau_a$/F)=½ is satisfied. As for integrated luminance L, L=(a/2) (F/4)+(3a/2) (F/4)=(aF/2) is satisfied. Therefore, as for average luminance B, B=(L/$\tau_a$)=a is satisfied.

The lighting ratio R, the integrated luminance L, and the average luminance B, which are values used in this document, are the same between the examples shown in FIGS. 1A to 1C, although the instantaneous luminance I (t) is a different condition in each of FIGS. 1A to 1C. That is, this embodiment mode mainly describes how the lighting ratio R, the integrated luminance L, and the average luminance B are controlled; however, here, it is emphasized that even when the lighting ratio R, the integrated luminance L, and the average luminance B are the same, instantaneous luminance I (t) with respect to them can be varied.

Figure 2A:
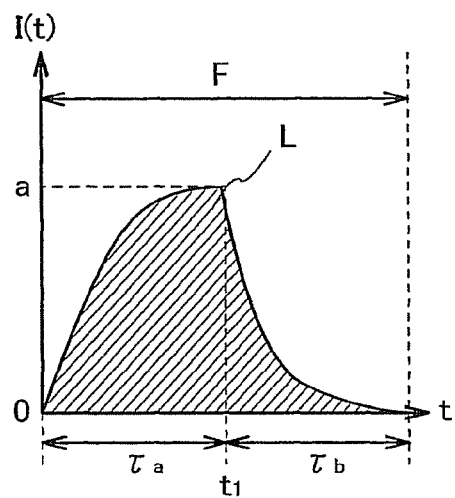
FIGS. 2A to 2C are diagrams each illustrating definitions of words and signs in accordance with the present invention.
Figure 2B:
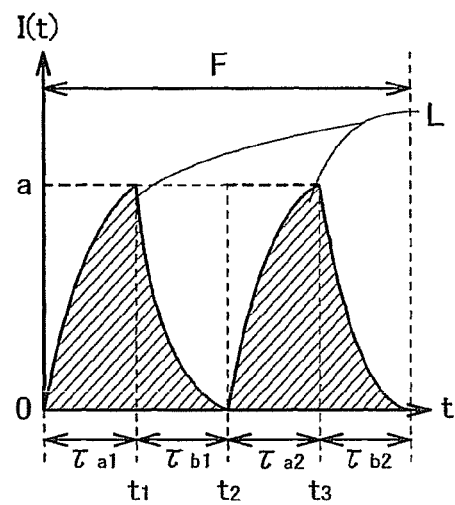
Figure 2C:
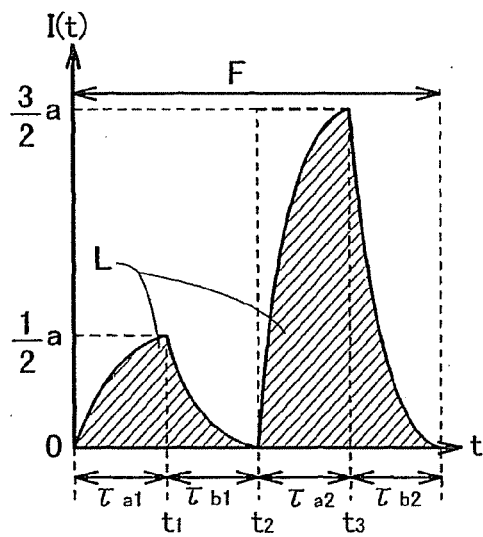

FIGS. 2A to 2C are diagrams each schematically showing instantaneous luminance I (t) of the case of a display device using an element having characteristics which change slowly in response to a signal (e.g., a liquid crystal element). Even when a signal controlling the element is input similarly to FIGS. 1A to 1C, instantaneous luminance I (t) of the case of the display device using the element having characteristics which change slowly in response to the signal with delay.

However, in accordance with the definitions of this document, the lighting ratio R, the integrated luminance L, and the average luminance B can be calculated without a problem even in such a case.

The image display period $\tau_a$ and the blanking interval $\tau_b$ may be determined based on a period during which a signal controlling luminance is input or may be determined based on the instantaneous luminance I (t). When the image display period $\tau_a$ and the blanking interval $\tau_b$ are determined based on the period during which the signal controlling the luminance is input, the time when the signal is updated is a boundary between the periods. When the image display period $\tau_a$ and the blanking interval $\tau_b$ are determined based on the instantaneous luminance I (t), the time at which change in the instantaneous luminance I (t) is drastic is a boundary between the periods. More specifically, the time t at which a primary function is discontinuous is a boundary between the periods. For example, in the case of FIG. 2A, the image display period $\tau_a$ and the blanking interval $\tau_b$ are determined by setting time $t_1$ at which increase in the instantaneous luminance I (t) begins to decrease as a boundary between the periods. In the case of FIG. 2B, the image display period $\tau_a$ and the blanking interval $\tau_b$ are determined by setting time $t_1$ at which increase in the instantaneous luminance I (t) begins to decrease as a first boundary of the periods, setting time $t_2$ at which decrease in the instantaneous luminance I (t) begins to increase as a second boundary of the periods, and setting time $t_3$ at which decrease in the instantaneous luminance I (t) begins to increase again as a third boundary of the periods. FIG. 2C is similar to the case of FIG. 2B. When the image display period $\tau_a$ and the blanking interval $\tau_b$ are determined, the lighting ratio R can be calculated by Formula 1.

The integrated luminance L can be calculated by Formula 3 from conditions of the instantaneous luminance I (t). In this manner, the integrated luminance L can be calculated by Formula 3 even when the instantaneous luminance I (t) is a given function.

The average luminance B can be calculated by Formula 4 from the image display period $\tau_a$ and the instantaneous luminance I (t) calculated by the above-described method.

The blanking interval $\tau_b$ is provided in one frame period so that quality of a moving image displayed by a display device is improved. Therefore, as far as quality of a moving image displayed by a display device is improved in a period, the period can be considered as the blanking interval $\tau_b$ regardless of luminance of a pixel in the period.

Luminance of a pixel in the blanking interval $\tau_b$ is preferably luminance in which luminance of the pixel in the image display period $\tau_a$ can be reset by human eyes. Therefore, the luminance of the pixel in the blanking interval $\tau_b$ is preferably lower than the luminance of the pixel in the image display period $\tau_a$. More preferably, the luminance of the pixel in the blanking interval $\tau_b$ is the lowest luminance within display capability of the display device.

Next, control modes of the values used in this document are described. In this embodiment mode, change in the integrated luminance L, the lighting ratio R, and the average luminance B by a control parameter P are particularly described.

Although various parameters can be given as the control parameter P, details of the control parameter P is not described in this embodiment mode. Details of the control parameter P is described in another embodiment mode, and this embodiment mode describes how the integrated luminance L, the lighting ratio R, and the average luminance B are changed simply in accordance with increase and decrease in the control parameter P.

Note that when change in the integrated luminance L, the lighting ratio R, and the average luminance B with respect to change in the control parameter P is described, it is assumed that luminance of pixels perceived by human eyes is the same.

Figure 3A:
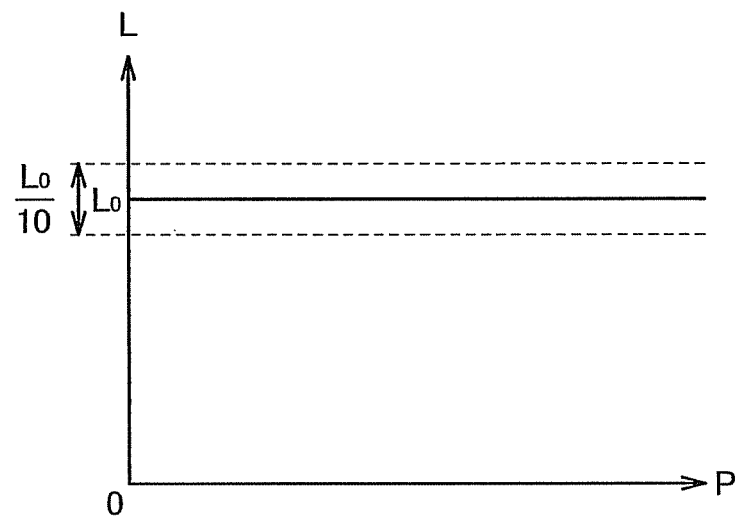
FIGS. 3A and 3B are diagrams each illustrating an example of a condition of integrated luminance with respect to control parameters in accordance with the present invention.

First, change in the integrated luminance L with respect to change in the control parameter P is described with reference to FIGS. 3A and 3B. Change in the integrated luminance L with respect to change in the control parameter P can be described in detail by a graph in which a horizontal axis represents the control parameter P and a vertical axis represents the integrated luminance L, as in FIGS. 3A and 3B.

The integrated luminance L is preferably almost constant with respect to increase in the control parameter P. This is because change in the integrated luminance L corresponds to change in luminance, which is perceived by human eyes, and drastic change in the integrated luminance L cannot be allowed under the assumption that luminance of the pixels, which is perceived by human eyes is the same. This condition can be understood with reference to FIG. 3A. In a graph shown in FIG. 3A, $L=L_0$ when P=0, and $L=L_0$ is always satisfied even when P becomes larger than 0.

Here, when the integrated luminance L is considered as a function particularly with respect to the control parameter P, the integrated luminance L is referred to as integrated luminance L (P). That is, when the graph shown in FIG. 3A is represented by a formula, $L(P)=L(0)=L_0$.

Note that actually, it is not necessary that $L(P)=L_0$ be strictly satisfied, and there may be a certain range. This condition can also be understood with reference to FIG. 3A. In the graph shown in FIG. 3A, a fluctuation range of the integrated luminance L, which can be allowed, is shown by two broken lines. A formula of the broken like is $L(P)=L_0\pm(L_0/20)$. That is, it is only necessary that the integrated luminance L be within a range having a central value of $L_0$ and a width of $L_0/10$ with respect to change in the control parameter P. When fluctuation of the integrated luminance L is in the range, fluctuation of the integrated luminance L can be allowed. This is because when fluctuation of the integrated luminance L is small, it is not perceived as fluctuation in luminance, and fluctuation of the integrated luminance L is extremely small even when fluctuation of the integrated luminance L is perceived as fluctuation in luminance.

In addition, the integrated luminance L may be increased slowly with respect to increase in the control parameter P. This is because when change in the integrated luminance L is small, this change is allowed, and display can be emphasized in accordance with increase in the control parameter P when the integrated luminance increases slowly with respect to increase in the control parameter P. This condition can be understood with reference to FIG. 3B. In a graph shown in FIG. 3B, $L=L_0$ when P=0, and $L=L_0$ is gradually increased as P increases from 0.

Figure 3B:
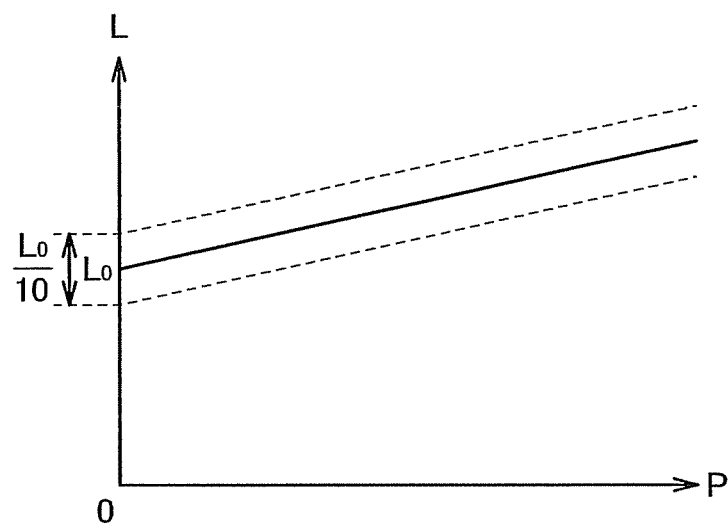

Here, when the graph shown in FIG. 3B is represented by a formula, $L(P)=\alpha P+L_0$. $\alpha$ is a proportional constant and a positive number which is larger than 0. In addition, the proportional constant $\alpha$ is preferably smaller than 1. This is because change in the integrated luminance L is small when the proportional constant $\alpha$ is small, and change in the integrated luminance L can be allowed.

Note that it is not necessary that $L(P)=\alpha P+L_0$ be strictly satisfied, and there may be a certain range. This condition can also be understood with reference to FIG. 3B. In the graph shown in FIG. 3B, a fluctuation range of the integrated luminance L, which can be allowed, is shown by two broken lines. A formula of the broken like is $L(P)=\alpha P+L_0\pm(L_0/20)$. That is, it is only necessary that the integrated luminance L be within a range having a central value of $\alpha P+L_0$ and a width of $L_0/10$ with respect to change in the control parameter P. When fluctuation of the integrated luminance L is in the range, fluctuation of the integrated luminance L can be allowed. This is because when fluctuation of the integrated luminance L is small, it is not perceived as fluctuation in luminance, and fluctuation of the integrated luminance L is extremely small even when fluctuation of the integrated luminance L is perceived as fluctuation in luminance.

Next, change in the lighting ratio R and the average luminance B with respect to the control parameter P is described with reference to FIGS. 4A to 4H. Change in the lighting ratio R and the average luminance B with respect to the control parameter P can be described in detail by a graph in which a horizontal axis represents the control parameter P and a vertical axis represents the lighting ratio R or the average luminance B. FIGS. 4A, 4C, 4E, and 4G are graphs each showing change in lighting ratio R with respect to the control parameter P. FIGS. 4B, 4D, 4F, and 4H are graphs each showing change in the average luminance B with respect to the control parameter P.

Figure 4A:
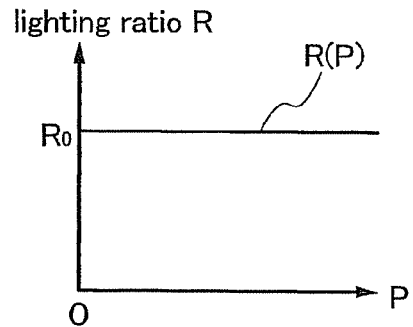
FIGS. 4A, 4C, 4E, and 4G are diagrams each illustrating an example of a condition of a lighting ratio with respect to control parameters in accordance with the present invention.

FIG. 4A shows the case where the lighting ratio R is almost constant with respect to increase in the control parameter P. Change in the lighting ratio R corresponds to how a ratio of the image display period $\tau_a$ in the one frame period F is changed. This is because on a condition that the integrated luminance L is constant with respect to the control parameter P, the lighting ratio R is almost constant with respect to the control parameter P when the average luminance B is almost constant with respect to the control parameter P. This condition can be understood with reference to the following description and FIG. 4A.

The fluctuation range of the integrated luminance L with respect to the control parameter P, which can be allowed, is extremely small, which has been already described. Future discussions will be proceeded on a condition that the integrated luminance L is almost constant with respect to the control parameter P.

When Formula 1 and Formula 4 are transformed to be organized, Formula 7 can be obtained.

$$BR = \frac{L}{F}$$ [Formula 7]

Here, the integrated luminance L is almost constant with respect to the control parameter P. In addition, when the one frame period F is also almost constant with respect to the control parameter P, the right side of Formula 7 is almost constant with respect to the control parameter P. Therefore, a product of the lighting ratio R and the average luminance B is almost constant with respect to the control parameter P.

Thus, from the fact that the product of the lighting ratio R and the average luminance B is almost constant with respect to the control parameter P, a conclusion that the lighting ratio R is almost constant with respect to increase in the control parameter P when the average luminance B is almost constant with respect to the control parameter P can be obtained.

Change in the lighting ratio R with respect to increase in the control parameter P is described with reference to FIG. 4A. When the lighting ratio R is considered as a function particularly with respect to the control parameter P, the lighting ratio R is referred to as lighting ratio R (P). In addition, $R=R_0$ when $P=0$. That is, when the graph shown in FIG. 4A is represented by a formula, $R(P)=R(0)=R_0$.

Note that actually, it is only necessary that R (P) be in a range of approximately $R_0/10$ setting $R_o$ as a certain value even when $R(P)=R_0$ is not strictly satisfied.

Figure 4B:
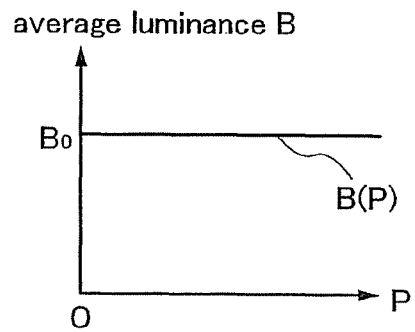
FIGS. 4B, 4D, 4F, and 4H are diagrams each illustrating an example of a condition of average luminance with respect to control parameters in accordance with the present invention.

Change in the average luminance B with respect to the control parameter P is described with reference to FIG. 4B. When the average luminance B is considered as a function particularly with respect to the control parameter P, the average luminance B is referred to as average luminance B (P). In addition, $B=B_0$ when $P=0$. That is, when the graph shown in FIG. 4B is represented by a formula, $B(P)=B(0)=B_0$.

Note that actually, it is only necessary that B (P) be in a range of approximately $B_0/10$ setting $B_o$ as a certain value even when $B(P)=B_0$ is not strictly satisfied.

Next, the lighting ratio R can be simply decreased with respect to increase in the control parameter P. This is because when on a condition that the product of the lighting ratio R and the average luminance B is almost constant with respect to the control parameter P, the lighting ratio R monotonously decreases with respect to the control parameter P when the average luminance B monotonously increases with respect to the control parameter P. This condition can be understood with reference to FIGS. 4C to 4H.

Figure 4C:
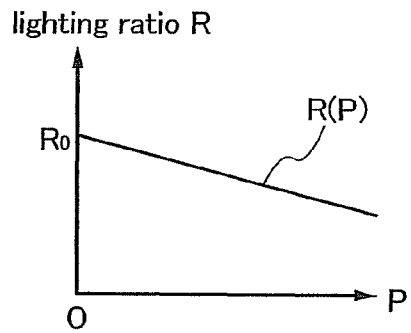
Figure 4D:
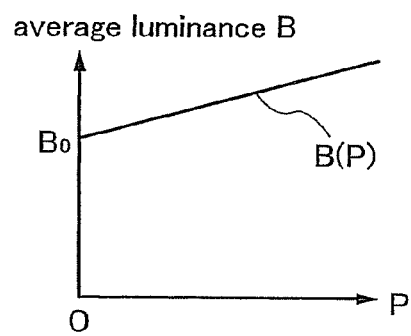
Figure 4E:
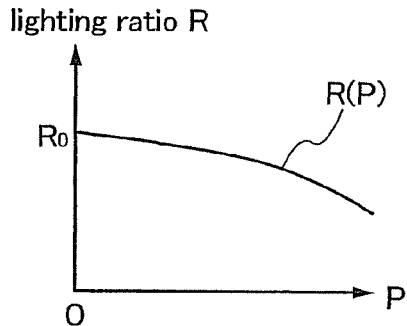
Figure 4F:
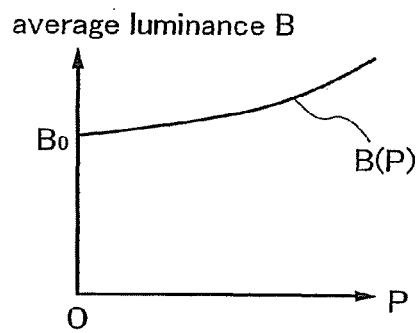
Figure 4G:
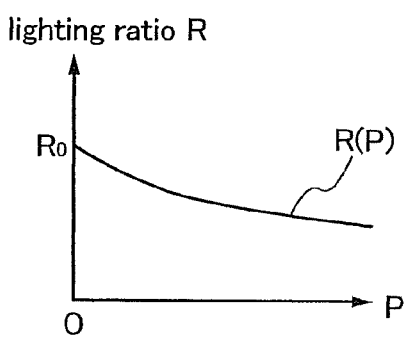

In each of graphs shown in FIGS. 4C, 4E, and 4G, the lighting ratio R is simply decreased with respect to the control parameter P. As in the graph shown in FIG. 4C, the lighting ratio R may decrease linearly with respect to the control parameter P. Alternatively, as in the graph shown in FIG. 4E, the lighting ratio R may decrease as shown by an upward curving line with respect to the control parameter P. Further alternatively, as in the graph shown in FIG. 4G, the lighting ratio R may decrease as shown by a downward curving line with respect to the control parameter P.

When the lighting ratio R decreases linearly with respect to the control parameter P, the average luminance B increases linearly with respect to the control parameter P as in a graph shown in FIG. 4D.

When the lighting ratio R decreases as shown by an upward curving line with respect to with respect to the control parameter P, the average luminance B increases as shown by a downward curving line with respect to the control parameter P as in a graph shown in FIG. 4F.

Figure 4H:
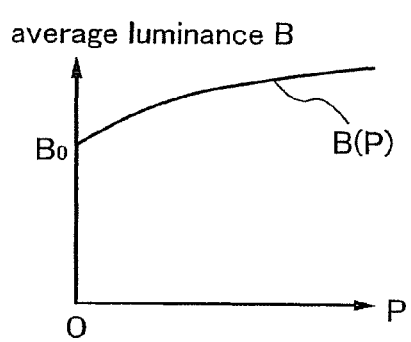

When the lighting ratio R decreases as shown by a downward curving line with respect to with respect to the control parameter P, the average luminance B increases as shown by an upward curving line with respect to the control parameter P as in a graph shown in FIG. 4H.

When a value of the lighting ratio R is constant, it is not necessary that the control modes be changed precisely with respect to change in the control parameter P. Accordingly, since algorithm which determines a display method and a peripheral circuit which makes many control modes to be selected are not needed, manufacturing cost of the display device can be reduced. In addition, since the size of a circuit and frequency of operation can be reduced, power consumption can be reduced.

When a value of the lighting ratio R decreases linearly, the control modes can be changed precisely with respect to change in the control parameter P. Accordingly, by using algorithm which determines a display method and a peripheral circuit which makes many control modes to be selected, suitable control modes in accordance with the control parameter P can be realized. Therefore, high-quality display with little motion blur and little flicker can be obtained.

When a value of the lighting ratio R decreases as shown by an upward curving line, the control modes can be changed precisely with respect to change in the control parameter P. In addition, the amount of change in the lighting ratio R can be increased as the control parameter P becomes larger. Accordingly, by using algorithm which determines a display method and a peripheral circuit which makes many control modes to be selected, more suitable control modes in accordance with the control parameter P can be realized. Therefore, higher-quality display with little motion blur and little flicker can be obtained.

When a value of the lighting ratio R decreases as shown by a downward curving line, the control modes can be changed finely with respect to change in the control parameter P. In addition, the amount of change in the lighting ratio R can be decreased as the control parameter P becomes larger. Accordingly, by using algorithm which determines a display method and a peripheral circuit which makes many control modes to be selected, more suitable control modes in accordance with the control parameter P can be realized. Therefore, higher-quality display with few motion blur and flicker can be obtained.

Here, change in the lighting ratio R and the average luminance B with respect to the control parameter P is summarized. When a condition that the product of the lighting ratio R and the average luminance B is constant is satisfied, graphs shown in FIGS. 5A to 5D each describe a relationship between the lighting ratio R and the average luminance B.

Figure 5A:
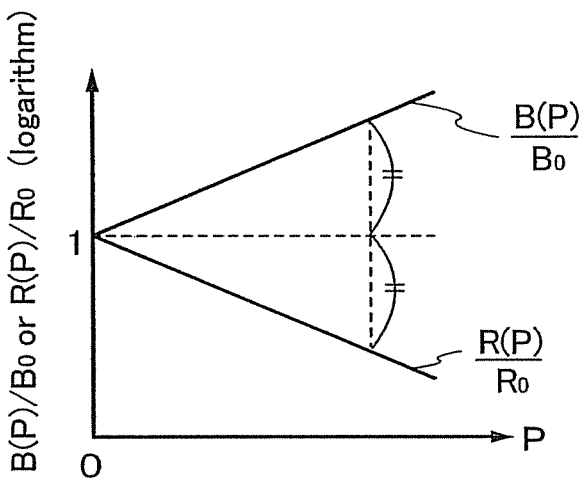
FIGS. 5A to 5C are diagrams each illustrating an example of conditions of a lighting ratio and average luminance with respect to control parameters in accordance with the present invention.
Figure 5B:
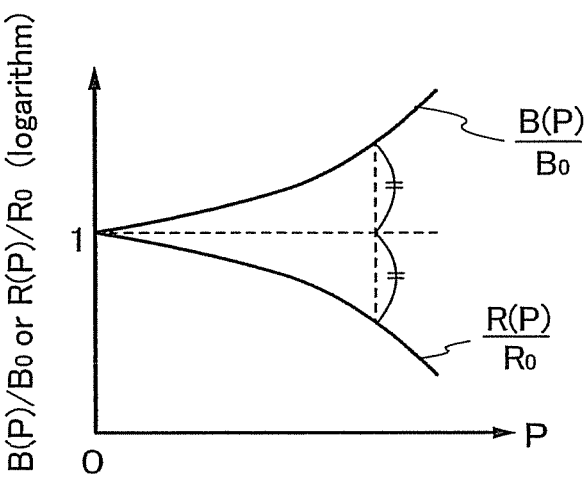
Figure 5C:
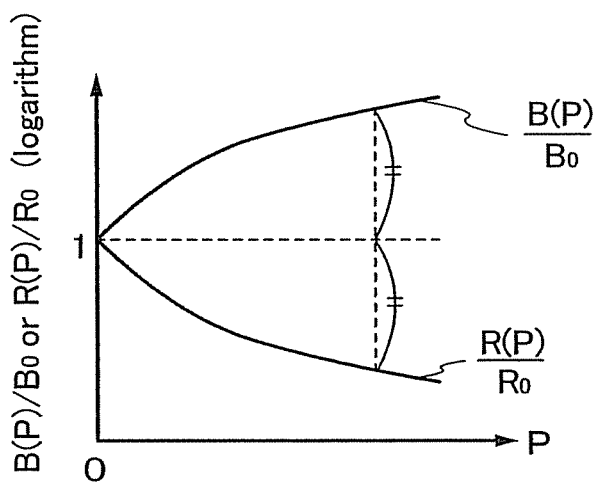

Each of FIGS. 5A to 5C is a graph in which a horizontal axis represents the control parameter P and a vertical axis logarithmically shows a ratio of the lighting ratio R with respect to $R_0$ or a ratio of the average luminance B with respect to $B_0$. Here, $R_0$ and $B_0$ are values of R $(P)/R_0$ and B $(P)/B_0$ when $P=0$. When R $(P)/R_0$ and B $(P)/B_0$ are expressed by a graph in which such axes are used, R (P)/$R_0$ and B (P)/$B_0$ have symmetric shapes about a linear line corresponding to 1 in the vertical axis. That is, a product of R (P)/$R_0$ and B (P)/$B_0$ is 1 regardless of a value of the control parameter P. This can be led from the fact that the product of R (P)/$R_0$ and B (P)/$B_0$ is $R_0 B_0$ and is constant regardless of P when P=0.

The above-described characteristics are briefly described below. For example, the case in which a value of R ($P_X$)/$R_0$ is $10^X$ is considered (X is a real number). At this time, a value of B ($P_X$)/$B_0$ is $1/10^X = 10^{-X}$. Here, R ($P_X$)/$R_0$ and B ($P_X$)/$B_0$ are plotted in a graph of a logarithmic axis. At this time, when it is noted that a location in the logarithmic axis is just a value of an exponent, as for a location at which $10^X$ is plotted and a location at which $10^{-X}$ is plotted, a distance of both positions from $10^0 = 1$ is the absolute value of X. That is, a midpoint of line segments combining R ($P_X$)/$R_0$ and B ($P_X$)/$B_0$ is 1. Since this characteristic is applied to all P, it can be concluded that R (P)/$R_0$ and B (P)/$B_0$ have symmetric shapes about the linear line corresponding to 1 in the vertical axis.

FIG. 5A is a graph showing the case where the lighting ratio R decreases linearly with respect to the control parameter P. At this time, the average luminance B increases linearly with respect to the control parameter P. In addition, R (P)/$R_0$ and B (P)/$B_0$ have symmetric shapes about a linear line of R (P)/$R_0$ = B (P)/$B_0$ = 1.

FIG. 5B is a graph showing the case where the lighting ratio R decreases as shown by an upward curving line with respect to the control parameter P. At this time, the average luminance B increases as shown by a downward curving line with respect to the control parameter P. In addition, R (P)/$R_0$ and B (P)/$B_0$ have symmetric shapes centering on a linear line of R (P)/$R_0$ = B (P)/$B_0$ = 1.

FIG. 5C is a graph showing the case where the lighting ratio R decreases as shown by a downward curving line with respect to the control parameter P. At this time, the average luminance B increases as shown by an upward curving line with respect to the control parameter P. In addition, R (P)/$R_0$ and B (P)/$B_0$ have symmetric shapes about a linear line of R (P)/$R_0$ = B (P)/$B_0$ = 1.

From the condition that the product of the lighting ratio R and the average luminance B in this embodiment mode is always constant in this manner, the graph where change in the lighting ratio R and the average luminance B with respect to the control parameter P has a symmetric shape about 1 in a symmetric axis. Thus, fluctuation in the integrated luminance L can be decreased, so that it is not perceived as fluctuation in luminance by human eyes even when the control parameter is greatly changed. Therefore, a display device with little flicker can be obtained.

Next, another control modes of the lighting ratio R and the average luminance B are described with reference to FIGS. 6A to 6P. Here, since the control mode of the average luminance B can be almost unambiguously determined by the control mode of the lighting ratio R, description of the control mode of the average luminance B is omitted hereinafter and the control mode of the lighting ratio R is only described. Note that although the description is omitted, it is preferable that the average luminance B also be controlled by the above-described method.

FIGS. 6A to 6P each show a method in which the control parameter P is divided into two regions (a region 1 and a region 2) and the lighting ratio R is controlled by the above-described mode in each region. Here, a region where the control parameter P is small is referred to as the region 1 and a region where the control parameter P is large is referred to as the region 2.

First, the case where a value of the lighting ratio R is constant in the region 1 is described. In this case, R (P)=$R_0$ is satisfied in the region 1. This is because P=0 and R (0)=$R_0$ is satisfied in the region 1. In addition, in this case, at least four control modes are conceivable in the region 2. That is, the four control modes correspond to the case where R (P) in the region 2 is constant (see FIG. 6A), the case where R (P) in the region 2 decreases linearly (see FIG. 6B), the case where R (P) in the region 2 decreases as shown by an upward curving line (see FIG. 6C), and the case where R (P) in the region 2 decreases as shown by a downward curving line (see FIG. 6D).

Next, the case where a value of the lighting ratio R decreases linearly in the region 1 is described. In this case, the value of the lighting ratio R decreases linearly from R (0)=$R_0$ as a starting point in the region 1. In addition, in this case, at least four control modes are conceivable in the region 2. That is, the four control modes correspond to the case where R (P) in the region 2 is constant (see FIG. 6E), the case where R (P) in the region 2 decreases linearly (see FIG. 6F), the case where R (P) in the region 2 decreases as shown by an upward curving line (see FIG. 6G), and the case where R (P) in the region 2 decreases as shown by a downward curving line (see FIG. 6H).

Next, the case where a value of the lighting ratio R decreases as shown by an upward curving line in the region 1 is described. In this case, the value of the lighting ratio R decreases as shown by the upward curving line from R (0)=$R_0$ as a starting point in the region 1. In addition, in this case, at least four control modes are conceivable in the region 2. That is, the four control modes correspond to the case where R (P) in the region 2 is constant (see FIG. 6I), the case where R (P) in the region 2 decreases linearly (see FIG. 6J), the case where R (P) in the region 2 decreases as shown by an upward curving line (see FIG. 6K), and the case where R (P) in the region 2 decreases as shown by a downward curving line (see FIG. 6L).

Next, the case where a value of the lighting ratio R decreases as shown by a downward curving line in the region 1 is described. In this case, the value of the lighting ratio R decreases as shown by the downward curving line from R (0)=$R_0$ as a starting point in the region 1. In addition, in this case, at least four control modes are conceivable in the region 2. That is, the four control modes correspond to the case where R (P) in the region 2 is constant (see FIG. 6M), the case where R (P) in the region 2 decreases linearly (see FIG. 6N), the case where R (P) in the region 2 decreases as shown by an upward curving line (see FIG. 6O), and the case where R (P) in the region 2 decreases as shown by a downward curving line (see FIG. 6P).

When a value of the lighting ratio R is constant in each region, it is not necessary that the control modes be changed precisely with respect to change in the control parameter P. Accordingly, since algorithm which determines a display method and a peripheral circuit which makes many control modes to be selected are not needed, manufacturing cost of the display device can be reduced. In addition, since the size of a circuit and frequency of operation can be reduced, power consumption can be reduced.

When a value of the lighting ratio R decreases linearly in each region, the control modes can be changed precisely with respect to change in the control parameter P. Accordingly, by using algorithm which determines a display method and a peripheral circuit which makes many control modes to be selected, suitable control modes in accordance with the control parameter P can be realized. Therefore, high-quality display with little motion blur and little flicker can be obtained.

When a value of the lighting ratio R decreases as shown by an upward curving line in each region, the control modes can changed finely with respect to change in the control parameter P. In addition, the amount of change in the lighting ratio R can be increased as the control parameter P becomes larger. Accordingly, by using algorithm which determines a display method and a peripheral circuit which makes many control modes to be selected, more suitable control modes in accordance with the control parameter P can be realized. Therefore, higher-quality display with little motion blur and flicker can be obtained.

When a value of the lighting ratio R decreases as shown by a downward curving line in each region, the control modes can be changed precisely with respect to change in the control parameter P. In addition, the amount of change in the lighting ratio R can be decreased as the control parameter P becomes larger Accordingly, by using algorithm which determines a display method and a peripheral circuit which makes many control modes to be selected, more suitable control modes in accordance with the control parameter P can be realized. Therefore, higher-quality display with little motion blur and little flicker can be obtained.

In the control mode where the control parameter P is divided into the two regions (the region 1 and the region 2), it is important that R (P) can have discontinuous values at a boundary between different regions. When a difference in values at the boundary between the different regions is small, the control mode has an advantage in that a display defect (e.g., an unnatural contour or a flicker) due to drastic change in the control mode hardly occurs because change in R (P) with respect to change in P at the vicinity of the boundary is small.

When a difference in values at the boundary between the different regions is large, the control mode has an advantage in that an emphatic effect on display due to drastic change in the control mode is large and sharp display can be performed because change in R (P) with respect to change in P in the vicinity of the boundary is large.

Here, the number of regions obtained by dividing the control parameter may be more than two. For example, the control parameter P may be divided into three regions or may be divided into three or more regions. By dividing the control parameter P into three or more regions, more various control modes can be realized. In particular, R (P) can have discontinuous values and the number of boundaries of different regions is increased, which is important. That is, in each region, more various control modes can be realized in the case where R (P) decreases linearly with respect to the control parameter P, the case where R (P) decreases as shown by an upward curving line with respect to the control parameter P, and the case where R (P) decreases as shown by a downward curving line with respect to the control parameter P. In addition to this, even in the case where R (P) is constant with respect to the control parameter P in each region, it is particularly advantageous that a certain number of control modes can be obtained. That is, advantages of a simple circuit (e.g., reduction in manufacturing cost and reduction in power consumption) and advantages of realization of various control modes are compatible.

Figure 7A:
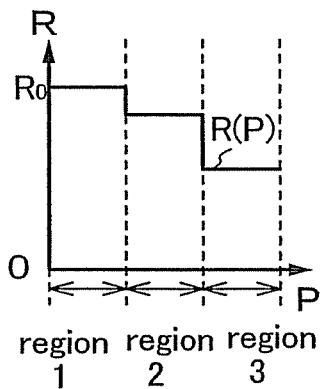
FIGS. 7A to 7E are diagrams each illustrating an example of a condition of a lighting ratio with respect to control parameters in accordance with the present invention.

This mode can be understood with reference to FIGS. 7A to 7E. FIG. 7A shows the case where the control parameter P are divided into three regions (a region 1, a region 2, and a region 3) and R (P) is constant in each region.

Figure 7B:
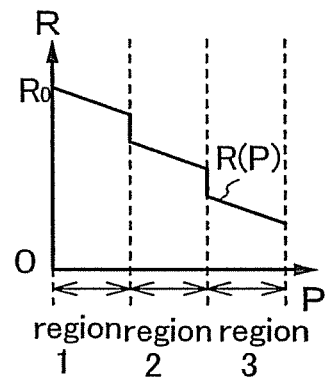

FIG. 7B shows the case where the control parameter P are divided into three regions (a region 1, a region 2, and a region 3) and R (P) decreases linearly in each region.

Figure 7C:
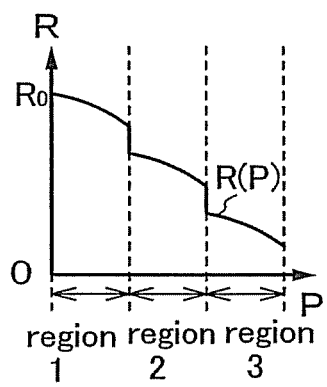

FIG. 7C shows the case where the control parameter P are divided into three regions (a region 1, a region 2, and a region 3) and R (P) decreases as shown by an upward curving line in each region.

Figure 7D:
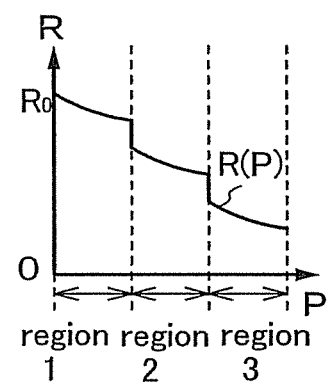

FIG. 7D shows the case where the control parameter P are divided into three regions (a region 1, a region 2, and a region 3) and R (P) decreases as shown by a downward curving line in each region.

Here, it is obvious that combinations of modes of R (P) in each region are not limited to the combinations shown in FIGS. 7A to 7E. Needles to say, these combinations are included in the control modes in this embodiment mode; however, the combinations are omitted here, and the case where the modes of R (P) in each region are the same is typically described.

Figure 7E:
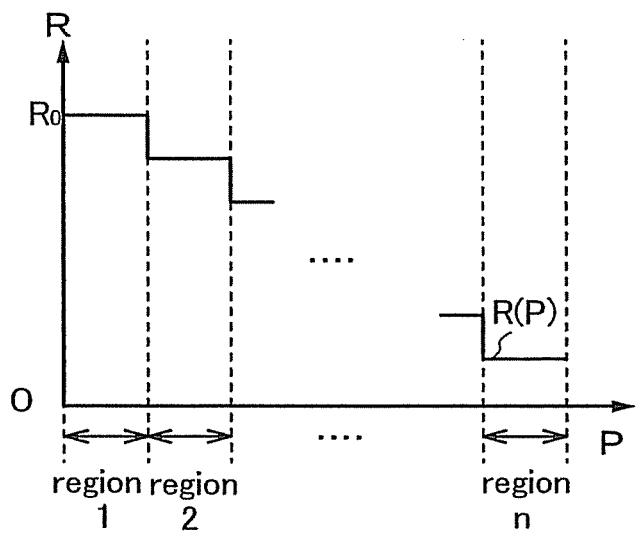

FIG. 7E shows the case where the control parameter P is divided into n (n is a positive integer) pieces of regions (a region 1, a region 2, a region 3, . . . , and a region n) and R (P) is constant in each region. When n is a certain number (approximately 5 to 15), advantages of a simple circuit (e.g., reduction in manufacturing cost and reduction in power consumption) and advantages of realization of various control modes, which are described above, are compatible.

Note that a mode where the lighting ratio R and the average luminance B are changed with respect to the control parameter P may be a mode which can be selected from a plurality of kinds. That is, a plurality of different R (P) and B (P) may be prepared in advance, and a second control parameter Q which is prepared separately from the control parameter P may determine which R (P) and B (P) to be used. At this time, the lighting ratio R and the average luminance B are denoted by $R_Q$ (P) and $B_Q$ (P) respectively, and the control parameter P is referred to as a first parameter for convenience. For example, when the second parameter Q is an integer ranging from 1 to n, the lighting ratio R and the average luminance B are referred to as $R_1$ (P), $R_2$ (P), . . . , and $R_n$ (P), and $B_1$ (P), $B_2$ (P), . . . , and $B_n$ (P).

Figure 8A:
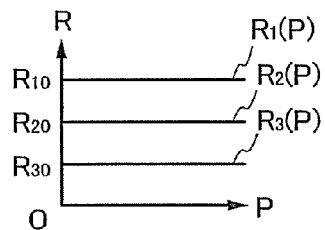
FIGS. 8A to 8G are diagrams each illustrating an example of a condition of a lighting ratio with respect to control parameters in accordance with the present invention.

This mode can be understood with reference to FIGS. 8A to 8G. In FIGS. 8A to 8G, the second parameter Q is an integer ranging from 1 to 3. FIG. 8A shows the case where each of $R_1$ (P), $R_2$ (P), and $R_3$ (P) is constant with respect to the first parameter P. When the first control parameter P is 0, $R_1$ (0)=$R_{10}$, $R_2$ (0)=$R_{20}$, and $R_3$ (0)=$R_{30}$ are satisfied. In this manner, in each mode of the lighting ratio R with respect to the second control parameter Q, the lighting ratio R can have different values from each other when the first control parameter P is 0. Thus, advantages of a simple circuit (e.g., reduction in manufacturing cost and reduction in power consumption) and advantages of realization of various control modes are compatible.

Note that since the mode of the average luminance B can be determined based on the mode of the lighting ratio R in some degree similarly to another description in this embodiment mode, description thereof is omitted here.

In another example in which the modes of the lighting ratio R and the average luminance B are controlled by the first control parameter P and the second control parameter Q, $R_1$ (P) is constant with respect to the first parameter P, $R_2$ (P) decreases linearly with respect to the first control parameter P, and $R_3$ (P) decreases linearly with respect to the first control parameter P. Here, a gradient of linear decrease is preferably changed in accordance with the second control parameter Q. In addition, in each mode of the lighting ratio R with respect to the second control parameter Q, the lighting ratio R can have different values from each other when the first control parameter P is 0.

Figure 8B:
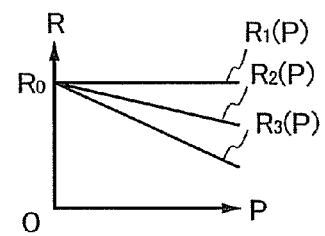

This mode can be understood with reference to FIG. 8B. By controlling in this manner, more various control modes can be realized compared with the case where the number of control parameters is 1.

In another example in which the modes of the lighting ratio R and the average luminance B are controlled by the first control parameter P and the second control parameter Q, $R_1$ (P) is constant with respect to the first parameter P, $R_2$ (P) decreases linearly with respect to the first control parameter P, and $R_3$ (P) decreases as shown by an upward curving line with respect to the first control parameter P. Here, a ratio of decrease is preferably changed in accordance with the second control parameter Q. In addition, in each mode of the lighting ratio R with respect to the second control parameter Q, the lighting ratio R can have different values from each other when the first control parameter P is 0.

Figure 8C:
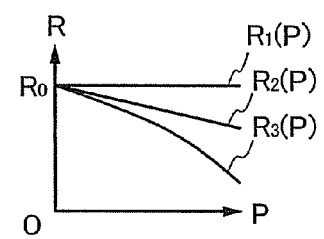

This mode can be understood with reference to FIG. 8C. By controlling in this manner, more various control modes can be realized compared with the case where the number of control parameters is 1.

In another example in which the modes of the lighting ratio R and the average luminance B are controlled by the first control parameter P and the second control parameter Q, $R_1$ (P) decreases linearly with respect to the first parameter P, $R_2$ (P) decreases linearly with respect to the first control parameter P, and $R_3$ (P) decreases linearly with respect to the first control parameter P. Here, a gradient of linear decrease is preferably changed in accordance with the second control parameter Q. In addition, in each mode of the lighting ratio R with respect to the second control parameter Q, the lighting ratio R can have different values from each other when the first control parameter P is 0.

Figure 8D:
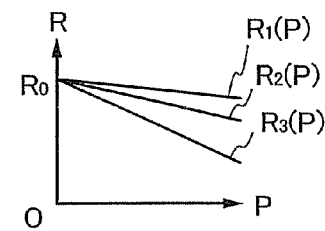

This mode can be understood with reference to FIG. 8D. By controlling in this manner, more various control modes can be realized compared with the case where the number of control parameters is 1.

In another example in which the modes of the lighting ratio R and the average luminance B are controlled by the first control parameter P and the second control parameter Q, $R_1$ (P) decreases as shown by an upward curving line with respect to the first control parameter P, $R_2$ (P) decreases as shown by an upward curving line with respect to the first control parameter P, and $R_3$ (P) decreases as shown by an upward curving line with respect to the first control parameter P. Here, a ratio of decrease is preferably changed in accordance with the second control parameter Q. In addition, in each mode of the lighting ratio R with respect to the second control parameter Q, the lighting ratio R can have different values from each other when the first control parameter P is 0.

Figure 8E:
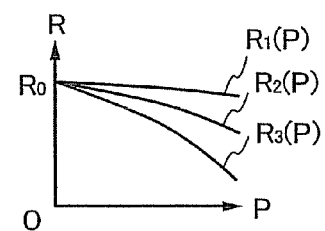

This mode can be understood with reference to FIG. 8E. By controlling in this manner, more various control modes can be realized compared with the case where the number of control parameters is 1.

In another example in which the modes of the lighting ratio R and the average luminance B are controlled by the first control parameter P and the second control parameter Q, $R_1$ (P) decreases as shown by an upward curving line with respect to the first control parameter P, $R_2$ (P) decreases as shown by an upward curving line with respect to the first control parameter P, and $R_3$ (P) decreases linearly with respect to the first control parameter P. Here, a ratio of decrease is preferably changed in accordance with the second control parameter Q. In addition, in each mode of the lighting ratio R with respect to the second control parameter Q, the lighting ratio R can have different values from each other when the first control parameter P is 0.

Figure 8F:
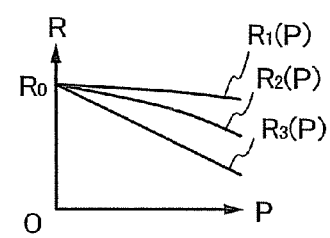

This mode can be understood with reference to FIG. 8F. By controlling in this manner, more various control modes can be realized compared with the case where the number of control parameters is 1.

Note that only typical combinations are described in description of the method in which the first control parameter P and the second control parameter Q are used. However, various modes described in this embodiment mode can be used for the lighting ratio R and the average luminance B.

Figure 8G:
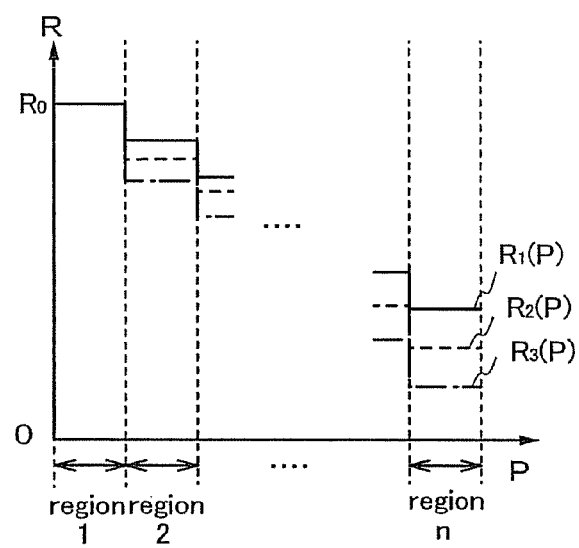

For example, as shown in FIG. 8G, the first control parameter P is divided into n (n is a positive integer) pieces of regions (a region 1, a region 2, a region 3, . . . , and a region n), and the lighting ratio R and the average luminance B can be combined with a method in which R (P) is constant in each region. A value of R (P) in each region is preferably small as the second control parameter Q becomes larger. Thus, advantages of a simple circuit (e.g., reduction in manufacturing cost and reduction in power consumption) and advantages of realization of various control modes are compatible.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 2

In this embodiment mode, among methods in each of which the lighting ratio R is changed under a condition that luminance perceived by human eyes is constant and methods in each of which luminance perceived by human eyes is changed, some typical examples are described.

First, an example of a control method of the lighting ratio R is described. As a control method of the lighting ratio R, (1) a method of directly writing blanking data to each pixel, (2) a method of blinking the whole backlight, and (3) a method of sequentially blinking a backlight which is divided by areas can be mainly given.

The method (1) can be applied to both the case where a display element included in a display device is a self-luminous element typified by an element included in an EL display, a PDP, or an EFD and the case where a display element included in a display device is a non-light emitting element typified by an element included in a liquid crystal display. The methods (2) and (3) can be applied to the case where a display element included in a display device is a non-light emitting element.

Before the control method of the lighting ratio R is described, a structure of pixels included in an active matrix display device is described. FIG. 9G shows a structural example of a pixel included in an active matrix display device.

The pixel included in the active matrix display device includes a pixel region, a switching means, a display element, a signal holding means, a signal transmitting means, and a switch controlling means. A pixel region 900, a switching means 901, a display element 902, a signal holding means 904, a signal transmitting means 906, and a switch controlling means 907 are included in the structural example of the pixel shown in FIG. 9G. However, the invention is not limited to this, and various structures can be used for the display device. For example, a structure such as a passive matrix structure, an MIM (metal insulator metal) structure, or a TFD (thin film diode) structure may be used.

In FIG. 9G, more specifically, the switching means 901 is a transistor. The display element 902 is a liquid crystal element (hereinafter also referred to as the liquid crystal element 902). The signal holding means 904 is a capacitor (hereinafter also referred to as the capacitor 904). The signal transmitting means 906 is a data line (also referred to as a source line) (hereinafter referred to as the data line 906). The switch controlling means 907 is a scan line (also referred to as a gate line) (hereinafter referred to as the scan line 907). Note that a counter electrode 903 for controlling the liquid crystal element 902 and a common line 905 for fixing a potential of one of electrodes of the capacitor 904 may be provided as necessary. Note also that the common line may be shared with another scan line.

In a display portion of the display device, the pixel regions 900 are arranged in matrix. At this time, when the pixel regions 900 arranged in a row sideways are focused, the scan lines 907 thereof are common. Similarly, when the pixel regions 900 arranged in tandem are focused, the data lines 906 thereof are common.

That is, the number of wirings can be reduced when the data lines 906 thereof are common. On the other hand, different signals cannot be written to the pixel regions 900 arranged in tandem concurrently. Here, the data lines 906 are used by being divided in terms of time by sequentially scanning the scan lines 907 which are common in the pixel regions 900 arranged in the row sideways, so that a different data signal can be written to each pixel.

Figure 9A:
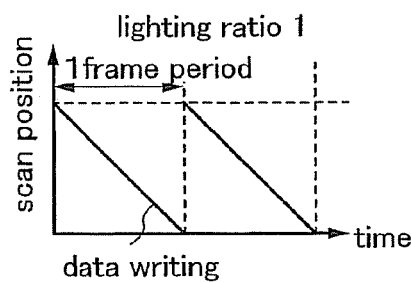
FIGS. 9A to 9F are diagrams each illustrating an example of a timing chart of a semiconductor device in accordance with the present invention.

A mode of this sequential scanning can be understood with reference to FIG. 9A. The graph shown in FIG. 9A shows a mode of sequential scanning of the display device, in which a horizontal axis represents time and a vertical axis represents a scanning direction of the pixel. Solid lines in the graph show positions in which a plurality of scan lines included in the display device are selected. That is, in the graph shown in FIG. 9A, scanning is performed sequentially from an upper scan line to a lower scan line in the vertical axis when one frame period is started, and scanning of all the scan lines are completed at timing at which one frame period is completed. Note that a scanning order is not limited to this and scanning may be performed sequentially from a lower scan line to an upper scan line in the vertical axis; however, the case where scanning is performed sequentially from an upper scan line to a lower scan line is described typically in this embodiment mode.

The mode of sequential scanning shown in FIG. 9A corresponds to the case where a data signal is written to each pixel once in one frame period. At this time, all the pixels continuously emit light with luminance in accordance with the written data signals in one frame period. That is, the image display period $\tau_a$=F (F is length of one frame period). Therefore, the lighting ratio R at this time is 1 from Formula 1.

Next, a mode of sequential scanning when the lighting ratio R is smaller than 1 is described. As for a method of directly writing blanking data to each pixel, after a specific data signal is written to each pixel, it is necessary that the signal written to the pixel be rewritten into a signal in accordance with blanking data at appropriate timing.

Figure 9B:
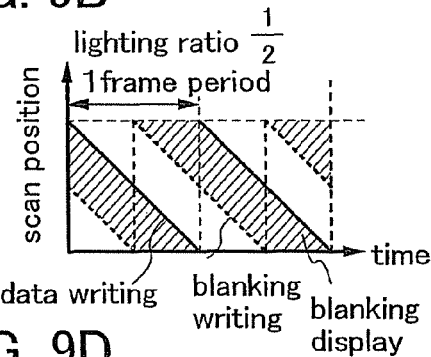
Figure 9C:
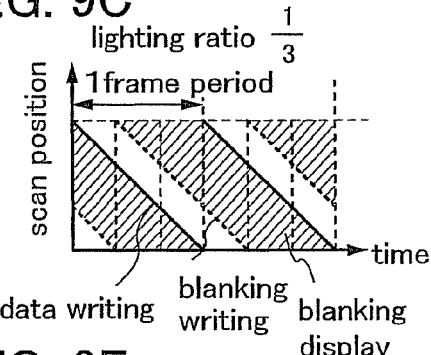
Figure 9D:
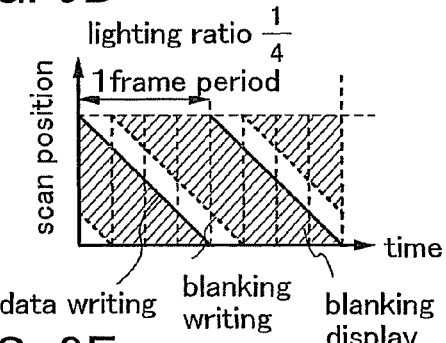
Figure 9E:
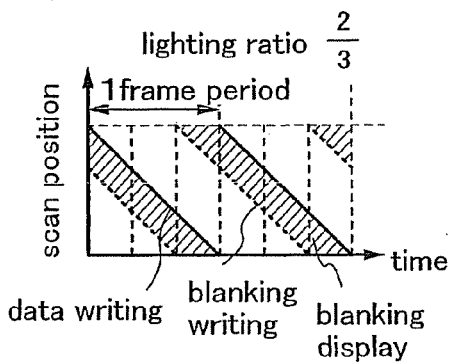
Figure 9F:
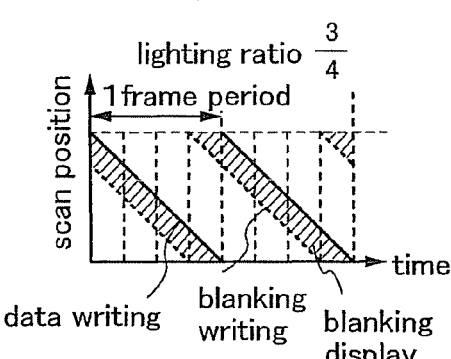
Figure 9G:
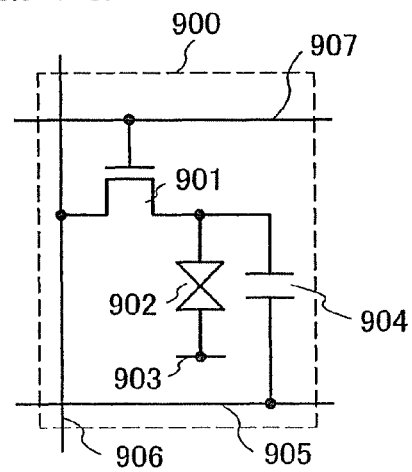
FIGS. 9G and 9H are diagrams each illustrating an example of a pixel circuit of a semiconductor device in accordance with the present invention.

A mode of sequential scanning at this time can be understood with reference to FIGS. 9B to 9F. The graph shown in FIG. 9B shows a mode of sequential scanning of the display device when the lighting ratio R=½. Solid lines in the diagram show timing of data writing scanning for writing a specific data signal to each pixel. In addition, broken lines in the diagram show timing of blanking writing scanning for controlling the lighting ratio R. When the lighting ratio R=½ is realized in this manner, it is only necessary to start blanking writing scanning when time of F/2 passes from timing at which data writing scanning is started. Then, a period after blanking writing scanning is performed and until data writing scanning of the next frame is performed corresponds to a blanking display period.

Similarly, when the lighting ratio R=⅓ is realized in this manner, it is only necessary to start blanking writing scanning when time of F/3 passes from timing at which data writing scanning is started. At this time, since the display period $\tau_a$=F/3, the lighting ratio R at this time is ⅓ from Formula 1. A mode of sequential scanning at this time can be understood with reference to FIG. 9C.

Similarly, when the lighting ratio R=¼ is realized in this manner, it is only necessary to start blanking writing scanning when time of F/4 passes from timing at which data writing scanning is started. At this time, since the display period $\tau_a$=F/4, the lighting ratio R at this time is ¼ from Formula 1. A mode of sequential scanning at this time can be understood with reference to FIG. 9D.

Similarly, when the lighting ratio R=⅔ is realized in this manner, it is only necessary to start blanking writing scanning when time of 2F/3 passes from timing at which data writing scanning is started. At this time, since the display period $\tau_a$=2F/3, the lighting ratio R at this time is ⅔ from Formula 1. A mode of sequential scanning at this time can be understood with reference to FIG. 9E.

Similarly, when the lighting ratio R=¾ is realized in this manner, it is only necessary to start blanking writing scanning when time of 3F/4 passes from timing at which data writing scanning is started. At this time, since the display period $\tau_a$=3F/4, the lighting ratio R at this time is ¾ from Formula 1. A mode of sequential scanning at this time can be understood with reference to FIG. 9F.

Values of the lighting ratio R can be set variously in accordance with writing timing of blanking data in this manner.

Here, it should be noted that when the lighting ratio R is controlled by performing blanking writing at specific timing after data writing scanning is performed, there is a period during which data writing scanning and blanking writing scanning are performed at the same time. That is, when certain time of each of the graphs shown in FIGS. 9B to 9F is focused, data writing scanning and blanking writing scanning coincide at different positions.

Even when data writing scanning and blanking writing scanning coincide at different positions in this manner, there are a plurality of methods for accurately writing a signal in each scanning. For example, there is a method in which a period during which one scan line is selected (one gate election period) is further divided into a plurality of periods and data writing scanning and blanking writing scanning are assigned to each period. The structure shown in FIG. 9G can be used for a structure of the pixel region included in the display device at this time. Therefore, the lighting ratio R can be controlled variously without changing the pixel structure.

Figure 9H:
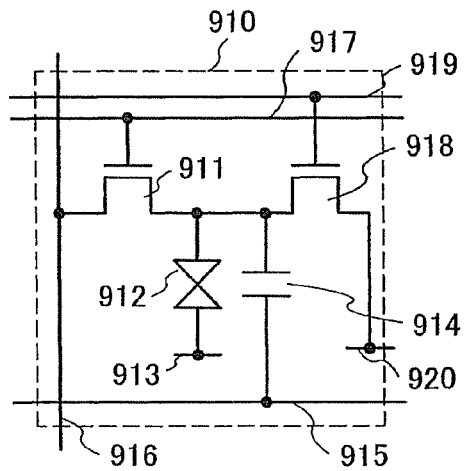

As another method, there is a method of adding a signal line and a switching element which are dedicated for blanking writing scanning to the pixel region. By using this method, signals can be written accurately by each scanning without dividing one gate selection period. FIG. 9H shows a structural example of a pixel included in such an active matrix display device.

The pixel included in the active matrix display device to which the signal line and the switching element which are dedicated for blanking writing scanning are added includes a pixel region, a first switching means, a second switching means, a display element, a signal holding means, a first signal transmitting means, a second signal transmitting means, a first switch controlling means, and a second switch controlling means. A pixel region 910, a first switching means 911, a second switching means 918, a display element 912, a signal holding means 914, a first signal transmitting means 916, a second signal transmitting means 920, a first switch controlling means 917, and a second switch controlling means 919 are included in the structural example of the pixel shown in FIG. 9H.

In FIG. 9H, more specifically, the first switching means 911 and the second switching means 918 are transistors. The display element 912 is a liquid crystal element (hereinafter also referred to as the liquid crystal element 912). The signal holding means 914 is a capacitor (hereinafter also referred to as the capacitor 914). The first signal transmitting means 916 is a data line (also referred to as a source line). The second signal transmitting means 920 is a blanking signal line (hereinafter also referred to as the blanking signal line 920). The first switch controlling means 917 is a writing scan line. The second switch controlling means 919 is a blanking scan line. Note that a counter electrode 913 for controlling the liquid crystal element 912 and a common line 915 for fixing a potential of one of electrodes of the capacitor 914 may be provided as necessary. Note also that the blanking signal line may be shared with the common line, a writing scan line of another pixel, and the blanking scan line.

In addition, a driving method of a display device in accordance with this document can be used for both the case where a liquid crystal element is normally black and the case where a liquid crystal element is normally white. Here, normally black corresponds to a mode where a black image is displayed when voltage is not applied to a liquid crystal element. Normally white is a mode where a white image is displayed when voltage is not applied to a liquid crystal element. Note that a method in accordance with this document can also be applied to a normally-white liquid crystal element by inverting polarity of signal voltage even when the signal voltage is shown as normally black.

By using the pixel structure to which the signal line and a switching element which are dedicated for blanking writing scanning are added in this manner, a signal can be written accurately by each scanning without dividing one gate selection period. Therefore, driving frequency of a peripheral circuit can be suppressed low, so that power consumption can be reduced.

Next, specific operating methods of the method in which one gate election period is further divided into a plurality of periods and data writing scanning and blanking writing scanning are assigned to each period, and the method of adding the signal line and a switching element which are dedicated for blanking writing scanning are described.

First, the method in which one gate election period is divided into a plurality of regions and data writing scanning and blanking writing scanning are assigned to each period is described with reference to FIG. 10A.

Figure 10A:
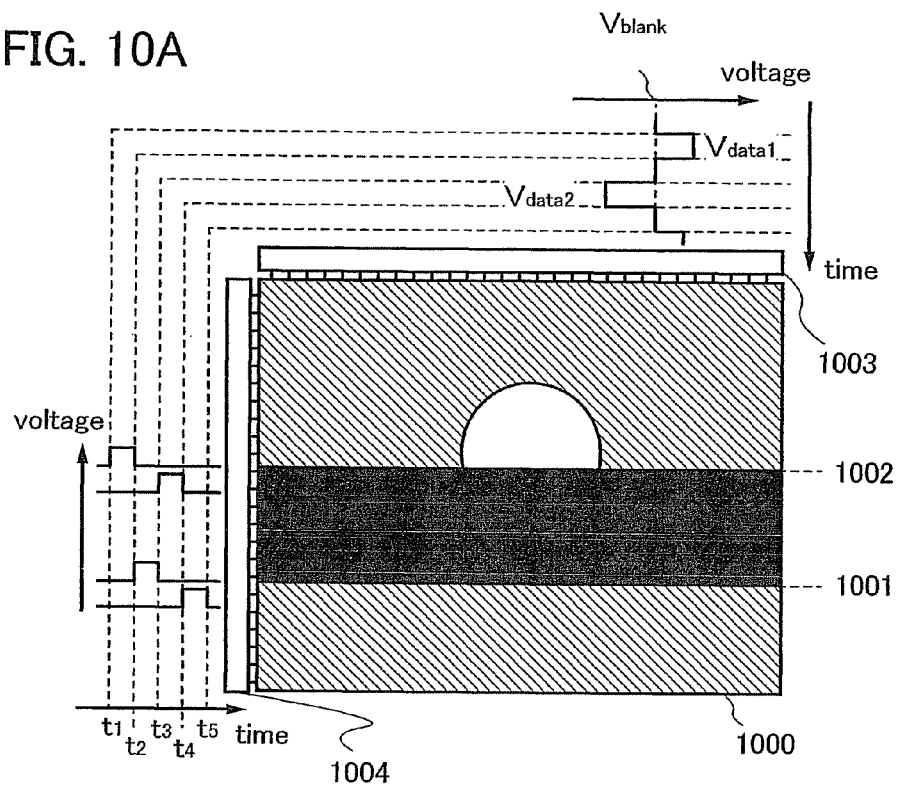
FIGS. 10A and 10B are diagrams each illustrating examples of a timing chart and a display condition of a semiconductor device in accordance with the present invention.

FIG. 10A is a diagram for describing driving conditions of a data line and a scan line in connection with a display condition of a display portion of a display device. A display portion 1000 includes pixel regions arranged in matrix and performs various kinds of display. The pixel regions in FIG. 10A are similar to the structure shown in FIG. 9G. A scan line 1001 is a scan line which performs blanking writing at timing shown in FIG. 10A. A scan line 1002 is a scan line which performs data writing at timing shown in FIG. 10A. A data line driver 1003 is a circuit which generates a signal written to each pixel in accordance with a data signal. In FIG. 10A, the signal written to each pixel is a voltage signal, and a specific example of the voltage signal is shown above the data line driver 1003. A scan line driver 1004 is a circuit for driving a plurality of scan lines. Waveforms of voltage input to the scan line 1001 and the scan line 1002 from the scan line driver 1004 are shown on the left of the scan line driver 1004.

Timing for driving the scan line 1002 by the scan line driver 1004 shown in FIG. 10A is a period from time $t_1$ to time $t_2$. At this time, the data line outputs voltage $V_{data1}$. The voltage $V_{data1}$ is voltage which should be written to a pixel selected by the scan line 1002 at timing shown in FIG. 10A.

The scan line driver 1004 drives the scan line 1001 from the time $t_2$ to time $t_3$. At this time, the data line outputs voltage $V_{blank}$. The voltage $V_{blank}$ is voltage supplying luminance which should be displayed in a blanking interval.

A period from the time $t_1$ to the time $t_3$ in the description heretofore corresponds to one gate selection period under a driving condition of the lighting ratio R=1 without providing a blanking interval. That is, one gate selection period (a period from the time $t_1$ to the time $t_3$) is divided into two periods (a period from the time $t_1$ to the time $t_2$ and a period from the time $t_2$ to the time $t_3$) and data writing scanning and blanking writing scanning are assigned to each period.

The scan line driver 1004 drives a scan line which is next to the scan line 1002 from the time $t_3$ to time $t_4$. At this time, the data line outputs voltage $V_{data2}$. The voltage $V_{data2}$ is voltage which should be written to a pixel selected by the scan line which is next to the scan line 1002 at timing shown in FIG. 10A.

The scan line driver 1004 drives a scan line which is next to the scan line 1001 from the time $t_4$ to time $t_5$. At this time, the data line outputs voltage $V_{blank}$. The voltage $V_{blank}$ is voltage supplying luminance which should be displayed in the blanking interval.

By repeating driving which is described above, signals can be accurately written in each scanning even when data writing scanning and blanking writing scanning coincide at different positions.

Note that voltage of the data line is an example for describing the driving method, and voltage of $V_{blank}$, $V_{data1}$, and $V_{data2}$ is not limited to the voltage shown in FIG. 10A and can have various values.

Next, the method of adding a signal line and a switching element which are dedicated for blanking writing scanning to the pixel region is described with reference to FIG. 10B.

Figure 10B:
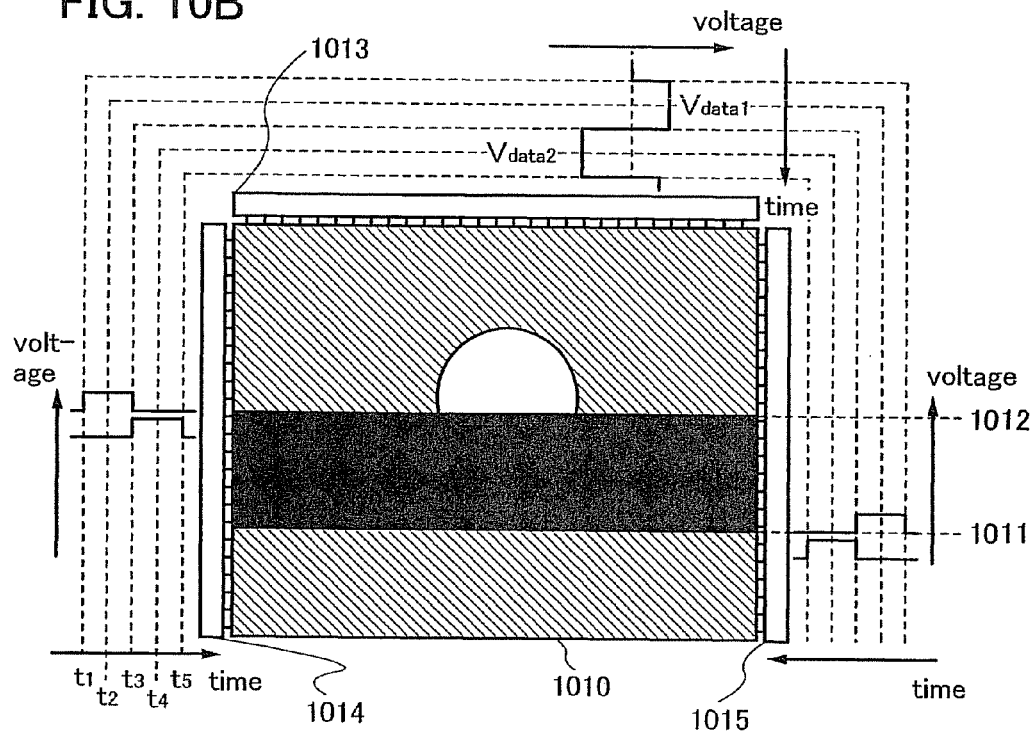
Figure 11A:
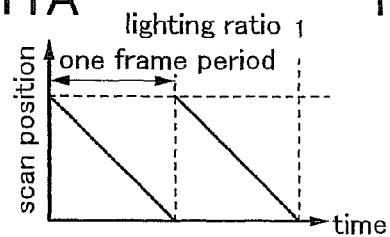
FIGS. 11A to 11J are diagrams each illustrating an example of a timing chart of a semiconductor device in accordance with the present invention.
Figure 11B:
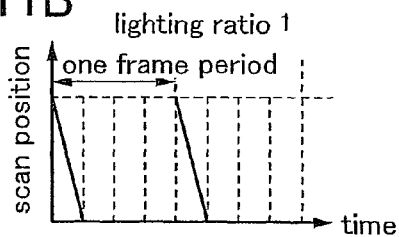
Figure 11C:
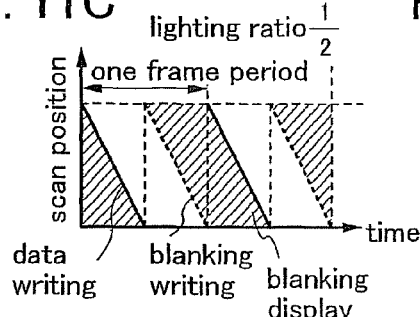
Figure 11D:
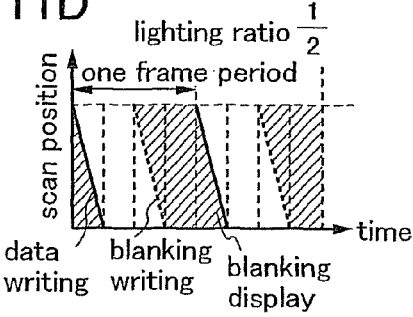
Figure 11E:
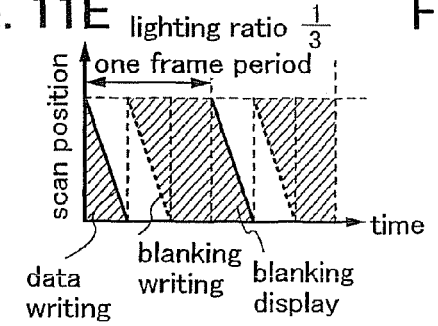
Figure 11F:
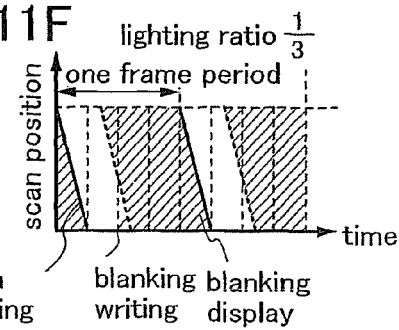
Figure 11G:
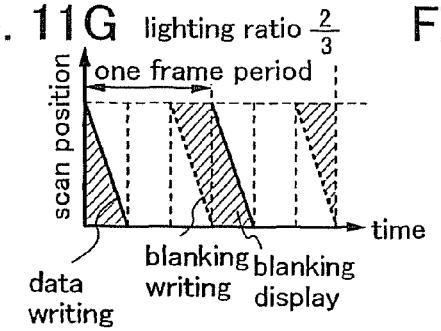
Figure 11H:
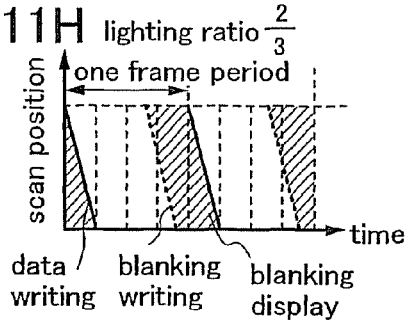
Figure 11I:
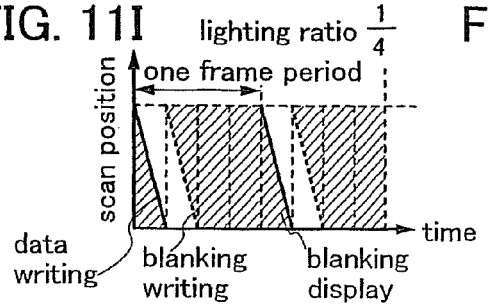
Figure 11J:
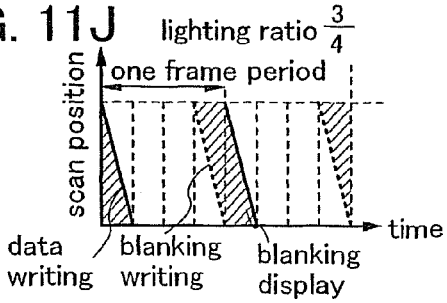

FIG. 10B is a diagram for describing driving conditions of a data line and a scan line in connection with a display condition of a display portion of a display device. A display portion 1010 includes pixel regions arranged in matrix and performs various kinds of display. The pixel regions in FIG. 10B are similar to the structure shown in FIG. 9H. A blanking scan line 1011 is a blanking scan line which performs blanking writing at timing shown in FIG. 10B. A writing scan line 1012 is a scan line which performs data writing at timing shown in FIG. 10B. A data line driver 1013 is a circuit which generates a signal written to each pixel in accordance with a data signal. In FIG. 10B, the signal written to each pixel is a voltage signal, and a specific example of the voltage signal is shown above the data line driver 1013. A writing scan line driver 1014 is a circuit for driving a plurality of writing scan lines. Waveforms of voltage input to the writing scan line 1012 from the writing scan line driver 1014 are shown on the left of the writing scan line driver 1014. A blanking scan line driver 1015 is a circuit for driving a plurality of blanking scan lines. Waveforms of voltage input to the blanking scan line 1011 from the blanking scan line driver 1015 are shown on the right of the blanking scan line driver 1015.

Timing for driving the writing scan line 1012 by the writing scan line driver 1014 shown in FIG. 10B is a period from time $t_1$ to time $t_2$. At this time, the data line outputs voltage $V_{data1}$. The voltage $V_{data1}$ is voltage which should be written to a pixel selected by the writing scan line 1012 at timing shown in FIG. 10B.

The blanking scan line driver 1015 operates concurrently and drives the blanking scan line 1011 from the time $t_1$ to the time $t_3$. At this time, a signal written to a pixel selected by the blanking scan line 1011 at timing shown in FIG. 10B follows the voltage $V_{blank}$ which is supplied to the blanking signal line 920 in the pixel structure shown in FIG. 9H.

The writing scan line driver 1014 drives a writing scan line which is next to the writing scan line 1012 from the time $t_3$ to time $t_5$. At this time, the data line outputs voltage $V_{data2}$. The voltage $V_{data2}$ is voltage which should be written to a pixel selected by the writing scan line which is next to the writing scan line 1012 at timing shown in FIG. 10B.

The blanking scan line driver 1015 operates concurrently and drives a blanking scan line which is next to the blanking scan line 1011 from the time $t_3$ to the time $t_5$. At this time, a signal written to a pixel selected by the blanking scan line which is next to the blanking scan line 1011 at timing shown in FIG. 10B follows the voltage $V_{blank}$ which is supplied to the blanking signal line 920 in the pixel structure shown in FIG. 9H.

A period from the time $t_1$ to the time $t_3$ in the description heretofore corresponds to one gate selection period under a driving condition of the lighting ratio R=1 without providing a blanking interval. That is, data writing scanning and blanking writing scanning can be performed concurrently without dividing one gate selection period into two periods.

By repeating driving which is described above, a signal can be accurately written in each scanning even when data writing scanning and blanking writing scanning coincide at different positions.

Note that voltage of the data line is an example for describing the driving method, and voltage of $V_{data1}$ and $V_{data2}$ is not limited to the voltage shown in FIG. 10B and can have various values.

Next, another mode of sequential driving when the lighting ratio R is smaller than 1 is described. As for a method of directly writing blanking data to each pixel, after a specific data signal is written to each pixel, it is necessary that the signal written to the pixel be rewritten to a signal in accordance with blanking data at appropriate timing. Therefore, in the methods shown in FIGS. 9A to 9H, and FIGS. 10A and 10B, it is necessary that writing scanning and blanking scanning be performed concurrently by adding a signal line and a switching element to a pixel region, or one gate selection period be divided into a plurality of periods and data writing and blanking writing be assigned to each period.

A method shown below is a method in which writing scanning and blanking scanning are completed in time shorter than one frame period F. By using this method, data writing scanning and blanking writing scanning can be performed without either dividing one gate selection period or adding a signal line and a switching element to a pixel region.

There are a plurality of modes of the method in which writing scanning and blanking scanning are completed in time shorter than the one frame period F. One mode is a mode in which a period during which writing scanning and blanking scanning are completed is changed in accordance with a value of the lighting ratio R. Here, a period during which writing scanning and blanking scanning are completed is referred to as $\tau_w$.

In the mode in which $\tau_w$ is changed in accordance with a value of the lighting ratio R, $\tau_w$ is conformed to a period having a smaller value between the image display period $\tau_a$ and the blanking interval $\tau_b$, which lead the lighting ratio R. A mode of sequential scanning in this method can be understood with reference to FIGS. 11A, 11C, 11E, 11G, 11I and 11J. Here, each of graphs shown in FIGS. 11A to 11J shows a mode of sequential scanning of the display device, in which a horizontal axis represents time and a vertical axis represents a scanning direction of a pixel. A form of the graphs is similar to those of FIGS. 9A to 9F.

When the blanking interval $\tau_b$ is 0, blanking scanning is not performed. A mode of sequential scanning at this time can be understood with reference to FIG. 11A. That is, sequential scanning is performed by setting $\tau_w$ as F. At this time, the lighting ratio R is 1.

When $\tau_a=\tau_b=F/2$, sequential scanning is performed by setting $\tau_w$ as F/2. A mode of sequential scanning at this time can be understood with reference to FIG. 11C. That is, blanking scanning is started right after writing scanning is completed in a period of F/2, and blanking scanning is completed when one frame period is completed. At this time, the lighting ratio R is ½.

When $\tau_a=F/3$ and $\tau_b=2F/3$, sequential scanning is performed by setting $\tau_w$ as F/3. A mode of sequential scanning at this time can be understood with reference to FIG. 11E. That is, blanking scanning is started right after writing scanning is completed in a period of F/3, and blanking scanning is completed at time 2F/3. At this time, the lighting ratio R is ⅓.

When $\tau_a=2F/3$ and $\tau_b=F/3$, sequential scanning is performed by setting $\tau_w$ as F/3. A mode of sequential scanning at this time can be understood with reference to FIG. 11G. That is, blanking scanning is started at the time 2F/3 in the period of F/3 after writing scanning is completed in the period of F/3. Then, blanking scanning is completed when one frame period is completed. At this time, the lighting ratio R is ⅔.

When $\tau_a=F/4$ and $\tau_b=3F/4$, sequential scanning is performed by setting $\tau_w$ as F/4. A mode of sequential scanning at this time can be understood with reference to FIG. 11I. That is, blanking scanning is started right after writing scanning is completed in a period of F/4, and blanking scanning is completed at time F/2. At this time, the lighting ratio R is ¼.

When $\tau_a=3F/4$ and $\tau_b=F/4$, sequential scanning is performed by setting $\tau_w$ as F/3. A mode of sequential scanning at this time can be understood with reference to FIG. 11J. That is, blanking scanning is started at time 3F/4 in the period of F/2 after writing scanning is completed in the period of F/4. Then, blanking scanning is completed when one frame period is completed. At this time, the lighting ratio R is ¾.

The mode in which $\tau_W$ is changed in accordance with a value of the lighting ratio R can be realized by conforming $\tau_W$ to a period having a smaller value between the image display period $\tau_a$ and the blanking interval $\tau_b$, which lead the lighting ratio R in this manner. Since $\tau_w$ can be set to a suitable period in accordance with the value of the lighting ratio R in this manner, operating frequency of a peripheral circuit such as a scan line driver or a data line driver can also be set to a suitable value which is in accordance with the value of the lighting ratio R. Accordingly, power consumption can be reduced.

Among the plurality of modes of the method in which writing scanning and blanking scanning are completed in time shorter than the one frame period F, a mode which is different from the above-described mode is a mode in which the period $\tau_w$ during which writing scanning and blanking scanning are completed is completed rapidly without depending on the value of the lighting ratio R.

In the mode in which the period $\tau_w$ during which writing scanning and blanking scanning are completed is completed earlier without depending on the value of the lighting ratio R, $\tau_w$ is shortened as much as possible. For example, $\tau_w$ is set to F/4 which is ¼ of the one frame period F. A mode of sequential scanning at this time can be understood with reference to FIGS. 11B, 11D, 11F, 11H, 11I, and 11J.

When the blanking interval $\tau_b$ is 0, blanking scanning is not performed. A mode of sequential scanning at this time can be understood with reference to FIG. 11B. That is, sequential scanning is performed by setting $\tau_w$ as F/4. At this time, the lighting ratio R is 1.

When $\tau_a=\tau_b=F/2$, sequential scanning is performed also by setting $\tau_w$ as F/4. A mode of sequential scanning at this time can be understood with reference to FIG. 11D. That is, blanking scanning is started at the time F/2 in the period of F/4 after writing scanning is completed in the period of F/4. Then, blanking scanning is completed at the time 3F/4. At this time, the lighting ratio R is ½.

When $\tau_a=F/3$ and $\tau_b=2F/3$, sequential scanning is performed also by setting $\tau_w$ as F/4. A mode of sequential scanning at this time can be understood with reference to FIG. 11F. That is, blanking scanning is started at the time F/3 in a period of F/12 after writing scanning is completed in the period of F/4. T blanking scanning is completed at time 7F/12. At this time, the lighting ratio R is ⅓.

When $\tau_a=2F/3$ and $\tau_b=F/3$, sequential scanning is performed also by setting $\tau_w$ as F/4. A mode of sequential scanning at this time can be understood with reference to FIG. 11H. That is, blanking scanning is started at the time 2F/3 in a period of 5F/12 after writing scanning is completed in the period of F/4. Then, blanking scanning is completed at time 11F/12. At this time, the lighting ratio R is ⅔.

When $\tau_a=F/4$ and $\tau_b=3F/4$, sequential scanning is performed also by setting $\tau_w$ as F/4. The mode of sequential scanning at this time can be understood with reference to FIG. 11I. That is, blanking scanning is started right after writing scanning is completed in the period of F/4. Then, blanking scanning is completed at the time F/2. At this time, the lighting ratio R is ¼.

When $\tau_a=3F/4$ and $\tau_b=F/4$, sequential scanning is performed also by setting $\tau_w$ as F/3. The mode of sequential scanning at this time can be understood with reference to FIG. 11J. That is, blanking scanning is started at time 3F/4 in the period of F/2 after writing scanning is completed in the period of F/4. Then, blanking scanning is completed when one frame period is completed. At this time, the lighting ratio R is ¾.

Here, in the mode in which $\tau_w$ is completed earlier without depending on the value of the lighting ratio R, a mode with a lighting ratio other than those shown in FIGS. 11B, 11D, 11F, 11H, 11I, and 11J can be easily realized. That is, a period at which blanking scanning is started can be set freely, so that a mode with a lighting ratio corresponding to it can be realized. In addition, a range of the image display period $\tau_a$ which can be set is equal to or greater than $\tau_w$ and equal to or less than $1-\tau_w$. For example, in an example in which $\tau_w$ is set as F/4, the lighting ratio R can be freely selected in a range of equal to or greater than ¼ and equal to or less than ¾.

Note that the mode in which the period $\tau_w$ during which writing scanning and blanking scanning are completed is changed in accordance with the value of the lighting ratio R and the mode in which $\tau_w$ is completed earlier without depending on the value of the lighting ratio R can be combined. For example, when the lighting ratio R can be freely selected in a range of equal to or greater than ⅓ and equal to or less than ⅔, $\tau_w$ is set as F/3. Then, when the lighting ratio R is needed to be selected in a range of greater than that, $\tau_w$ is set to be smaller than F/3. For example, when $\tau_w$ is set as F/4, the lighting ratio R in a range of equal to or greater than ¼ and equal to or less than ⅓ and the lighting ratio R in a range of equal to or greater than ⅔ and equal to or less than ¾, which cannot be selected when $\tau_w$ is set as F/3, can be selected. Since the value of the lighting ratio R can be selected in a certain range in this manner and operating frequency of the peripheral circuit such as a scan line driver or a data line driver can be set to a suitable value which is in accordance with the range of the value of the lighting ratio R, power consumption can be reduced, which is extremely advantageous.

(1) a method of directly writing blanking data to each pixel, (2) a method of blinking the whole backlight, and (3) a method of sequentially blinking a backlight which is divided by areas can be mainly given as a control method of the lighting ratio R, which has been described at the beginning of this embodiment mode. The driving method which is described heretofore is a method which can be used for the method (1).

The method (1) can be applied to both of the case where a display element included in a display device is a self-luminous element typified by an element included in an EL display, a PDP, or an EFD and the case where a display element included in a display device is a non-light emitting element typified by an element included in a liquid crystal display. Next, driving methods of the methods (2) and (3) are described.

The method (2) where the whole backlight is blinked can be used when a display device includes a member called a backlight. A backlight corresponds to a light source provided on the back of a display portion of a display device. In particular, a backlight is advantageous when a display portion of a display device includes a non-light emitting display element. As such a display element, a transmissive liquid crystal element and a semi-transmissive liquid crystal element can be given, for example. Note that a display device may include a front light projector, a rear and front projector, or a light source for a projector without limiting to a backlight.

In the case of a non-light emitting display element, a light source is necessary in addition to the display element because the display element does not emit light by itself. At this time, a backlight is used in some cases. A backlight is usually a surface light source which uniformly illuminates a display portion of a display device. At this time, the display element has a function of determining how much light of this light source transmits. Accordingly, increase and decrease in luminance of the backlight corresponds to increase and decrease in brightness of the whole image.

That is, in a display device which includes a backlight, a blanking interval can be provided by changing luminance of the backlight without writing a blanking signal to a display element. Further, the lighting ratio R can be controlled by controlling the length of a period during which the luminance of the backlight is changed.

Figure 12A:
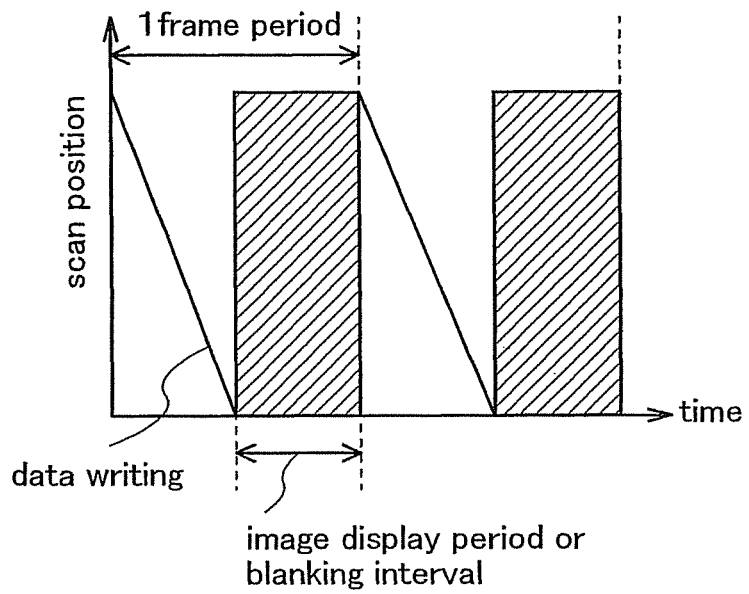
FIGS. 12A and 12B are diagrams each illustrating an example of a timing chart of a semiconductor device in accordance with the present invention.
Figure 12B:
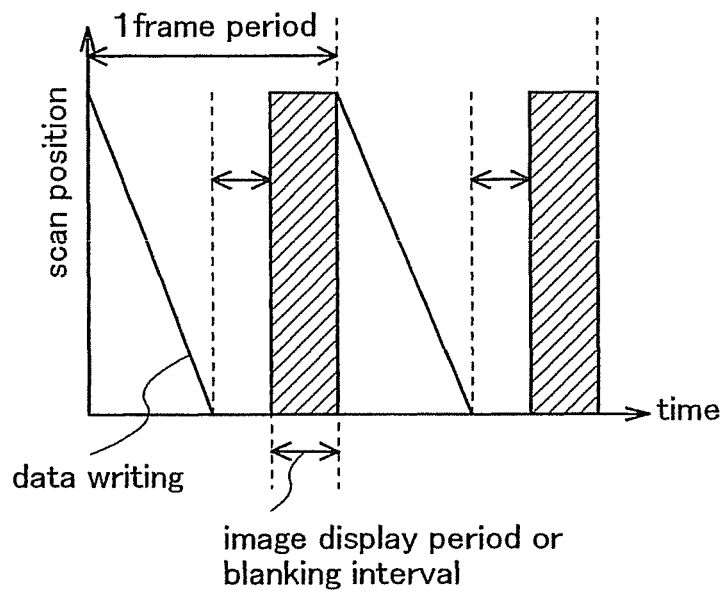

FIGS. 12A and 12B each show a mode of a method in which the lighting ratio R is controlled by controlling luminance of a backlight. Each of graphs shown in FIGS. 12A and 12B shows a mode of sequential scanning of a display device and timing at which the backlight is controlled at the same time, in which a horizontal axis represents time and a vertical axis represents a scanning direction of a pixel. Solid lines in the graphs show positions in which a plurality of scan lines included in the display device are selected.

In the method in which the lighting ratio R is controlled by controlling the luminance of the backlight, switching of the luminance of the backlight and writing scanning are preferably controlled at timing which is different in terms of time. This is because by controlling switching of the luminance of the backlight and writing scanning at timing which is different in terms of time, all the pixels are classified into pixels which do not emit light before data is written and do not emit light right after data is written or pixels which emit light before data is written and continuously emit light when data is written. Therefore, since pixels in different conditions are not displayed concurrently in the display portion, a problem such as display unevenness can be reduced. This mode can be understood with reference to the graph shown in FIG. 12A. In FIG. 12A, a period during which the luminance of the backlight is changed right after writing scanning is completed is provided in one frame period. The period corresponds to a region shown by a slanted line in FIG. 12A. When an image is displayed by lighting the backlight in the period, the period corresponds to an image display period. Alternatively, when blanking is displayed by turning out the backlight or reducing light of the backlight in the period, the period corresponds to a blanking interval.

In addition, the length of the period during which the luminance of the backlight is changed may be changed. FIG. 12B shows an example thereof. In FIG. 12B, a period during which luminance of a backlight is changed is shorter than a similar period in FIG. 12A. In this manner, the lighting ratio R can be controlled by the length of the period during which the luminance of the backlight is changed.

When the lighting ratio R is controlled by the method of blinking the whole backlight, the backlight is turned out or light of the backlight is reduced in the blanking interval, so that there is an advantage in that power consumption can be reduced to a corresponding extent. In addition, since a structure of a circuit is simple, manufacturing cost can be reduced.

Next, among the control methods of the lighting ratio R, the method (3) in which a backlight which is divided by areas is sequentially blinked is described. Here, an example in which the backlight is divided by areas in a direction which is parallel to a scan line is described.

Figure 13A:
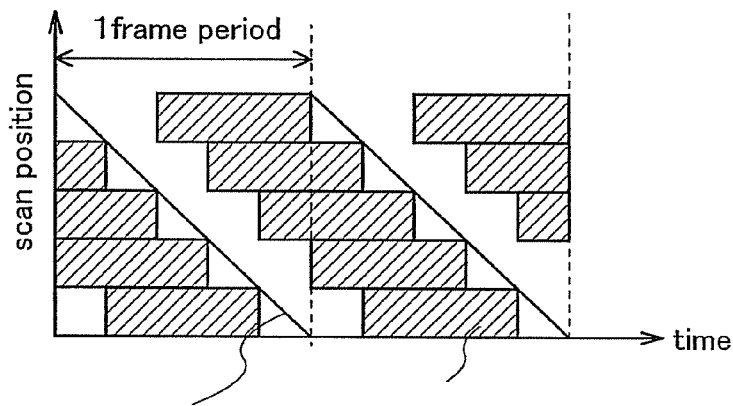
FIGS. 13A to 13C are diagrams each illustrating an example of a timing chart of a semiconductor device in accordance with the present invention.
Figure 13B:
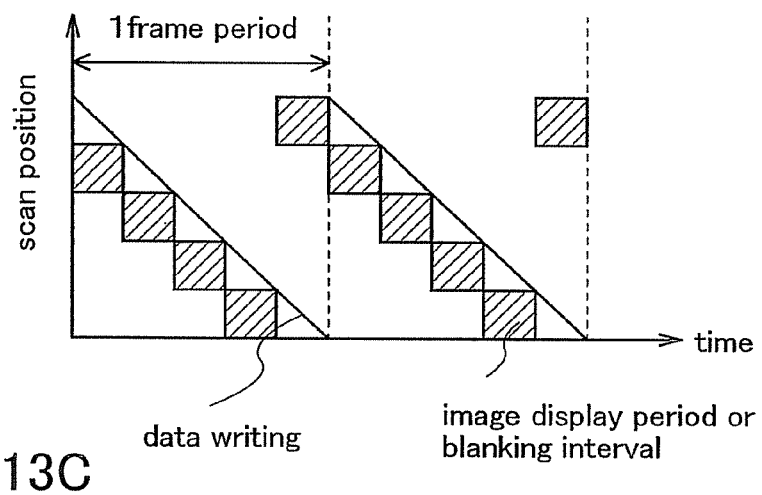
Figure 13C:
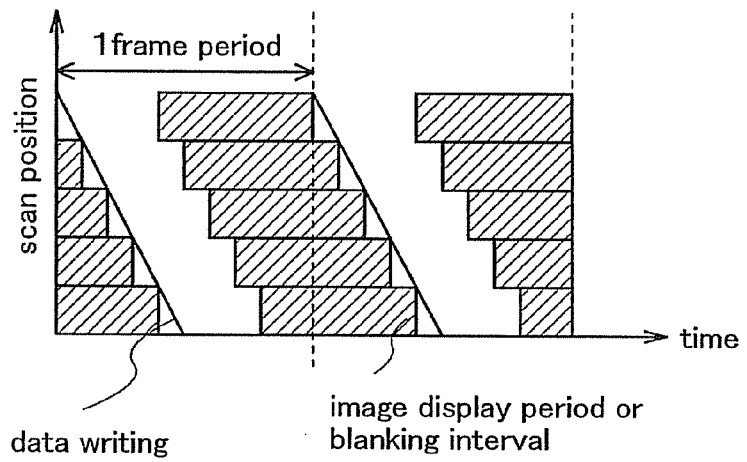

FIGS. 13A to 13C each show a mode of a method in which the lighting ratio R is controlled by controlling luminance of a backlight which is divided by areas. Each of graphs shown in FIGS. 13A to 13C shows a mode of sequential scanning of a display device and timing at which the backlight is controlled at the same time, in which a horizontal axis represents time and a vertical axis represents a scanning direction of a pixel. Solid lines in the graphs show positions in which a plurality of scan lines included in the display device are selected.

In the method in which the lighting ratio R is controlled by controlling the luminance of the backlight which is divided by areas, switching of the luminance of the backlight and writing scanning are preferably controlled at timing which is different in terms of time. This is because by controlling switching of the luminance of the backlight and writing scanning at timing which is different in terms of time, all the pixels are classified into pixels which do not emit light before data is written and do not emit light right after data is written or pixels which emit light before data is written and continuously emit light when data is written. Therefore, since pixels in different conditions are not displayed at the same time in the display portion, a problem such as display unevenness can be reduced. This mode can be understood with reference to the graphs shown in FIG. 13A to 13C.

In FIG. 13A, the case is described in which a ratio of a period during which the luminance of the backlight is changed to one frame period is approximately ⅔. The period corresponds to a region shown by a slanted line. When an image is displayed by lighting the backlight in the period, the period corresponds to an image display period. Alternatively, when blanking is displayed by turning out the backlight or reducing light of the backlight in the period, the period corresponds to a blanking interval.

By using the backlight which is divided by areas, a period during which the luminance of the backlight is changed in each area can be varied. In FIG. 13A, the backlight is divided into five areas and luminance of each area is sequentially controlled.

In addition, the length of the period during which the luminance of the backlight which is divided by areas is changed may be changed. FIG. 13B shows an example thereof. In FIG. 13B, a period during which luminance of a backlight is changed is shorter than a similar period in FIG. 13A. In this manner, the lighting ratio R can be controlled by the length of the period during which the luminance of the backlight is changed.

In addition, when the backlight which is divided by areas is used, control can be performed such that switching of the luminance of the backlight and writing scanning do not overlap with each other in terms of time without increasing scan speed of writing scanning. For example, in FIG. 13A or FIG. 13B, the period during which the luminance of the backlight is changed can be provided even when writing scanning is performed in the whole one frame period. Thus, operating frequency of a peripheral circuit such as a scan line driver or a data line driver can be set small regardless of a value of the lighting ratio R. Accordingly, power consumption can be reduced.

Note that even when the backlight which is divided by areas is used, scan speed of writing scanning may be increased. Thus, a display trouble caused by variation in light-emitting time between areas can be reduced. This point can be understood with reference to the graph shown in FIG. 13C. The graph shown in FIG. 13C shows an example of the case where scan speed of writing scanning is increased. From the graph shown in FIG. 13C, it can be seen that variation in light-emitting time between adjacent areas is less than that of the case where scan speed of writing scanning is not high (FIG. 13A or FIG. 13B) when scan speed of writing scanning is increased. When variation in light-emitting time between the adjacent areas is little, a display trouble caused by variation in light-emitting time between areas can be reduced.

As a display trouble caused by variation in light-emitting time between areas, increase of false light emission caused by light leakage from the areas, increase of visibility of a boundary between the areas, or the like can be given, for example.

When the lighting ratio R is controlled by the method of controlling the luminance of the backlight which is divided by areas, the backlight is turned out or light of the backlight is reduced in the blanking interval, so that there is an advantage in that power consumption can be reduced to a corresponding extent.

Heretofore, a method of controlling the lighting ratio R is described under a condition that luminance perceived by human eyes (L/F) is constant. A method for changing luminance perceived by human eyes is described below.

In order to change luminance perceived by human eyes, there are a method of changing the integrated luminance L and a method of changing the lighting ratio R. Here, when it is assumed that the lighting ratio R is constant, the integrated luminance L should be changed in order to change the luminance perceived by human eyes.

The integrated luminance L is luminance obtained by time integrating the instantaneous luminance I (t) as shown in Formula 3. That is, it is necessary that the instantaneous luminance I (t) be changed in order to change the integrated luminance L.

Here, in the case where a display element included in a display device is a self-luminous element such as an element included in an EL display, a PDP, or an EFD, luminance of the display element itself changes the instantaneous luminance I (t). That is, the instantaneous luminance I (t) can be changed by writing a predetermined signal to each display element.

On the other hand, luminance of a display element itself changes the instantaneous luminance I (t) even in the case where the display element included in a display device is a non-light emitting element; however, the luminance of the display element itself can be divided into a plurality of elements in the case where the display element is a non-light emitting element. That is, the plurality of factors correspond to backlight luminance $B_L$ and transmittance T of the display element. Therefore, the luminance of the display element is a product of the backlight luminance $B_L$ and the transmittance T. The luminance of the display element also corresponds to the instantaneous luminance I (t). When the description is summarized, it can be represented as Formula 8.

$$I(t)=B_L(t)T(t) \quad \text{[Formula 8]}$$

Here, Formula 8 is assigned to Formula 3 which leads the integrated luminance L. Note that when the backlight luminance $B_L$ and the transmittance T are not dependent on the time t for simplification, Formula 9 is obtained.

$$\frac{L}{F} = B_L T \quad \text{[Formula 9]}$$

A left-hand side of Formula 9 shows the luminance perceived by human eyes (L/F). Therefore, when the backlight luminance $B_L$ and the transmittance T are constant, the product of $B_L$ and T represents the luminance perceived by human eyes.

In a display device using a liquid crystal element, the transmittance T is usually controlled by voltage written to a pixel and the luminance perceived by human eyes is controlled. A numeric value in which a degree of the luminance perceived by human eyes is represented by a positive integer is called a gray scale. In addition, G is used as a sign which represents the gray scale. For example, when brightness between the darkest brightness and the brightest brightness is classified into 256 stages, a gray scale 0 expresses the darkest brightness and a gray scale 255 expresses the brightest brightness. An intermediate gray scale expresses intermediate brightness of the two gray scales.

It should be noted that when a gray scale is dealt, brightness expressed by the gray scale dose not necessarily have a linear relation with physical luminance. That is, when a relation between a gray scale and luminance is expressed by a graph, the gray scale and the luminance can be in connection with each other by a curve having various shapes. This curve showing a relationship between a gray scale and luminance is called a gamma curve.

Figure 14A:
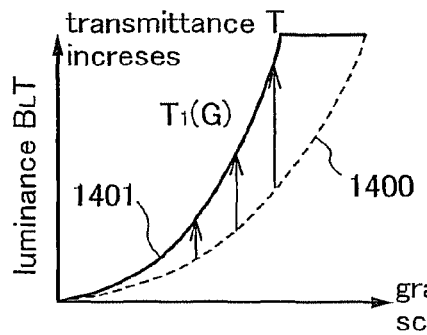
FIGS. 14A, 14B, 14E, and 14F are diagrams each showing an example of luminance with respect to a gray scale of a semiconductor device in accordance with the present invention.

A Typical gamma curve is described with reference to FIG. 14A. FIG. 14A is a graph showing a relation between a gray scale and luminance, i.e., a gamma curve. A horizontal axis represents a gray scale and a vertical axis represents luminance. Here, luminance corresponds to luminance perceived by human eyes (L/F). That is, from Formula 9, the vertical axis represents the amount expressed by the product of $B_L$ and T. A curve 1400 shown in FIG. 14A is a gamma curve when brightness perceived by human eyes is changed almost linearly. In this manner, an ideal gamma curve is a curve having convexity below.

When luminance $B_L T$ is changed by changing a gray scale G, transmittance T is usually changed. This is because although the transmittance T can be individually controlled by changing voltage written to each pixel, it is difficult to individually control the backlight luminance $B_L$ because the backlight luminance $B_L$ is shared with a plurality of pixels.

Next, a method of displaying an image normally even when the backlight luminance $B_L$ decreases by controlling the transmittance T and the backlight luminance $B_L$ is described. Since the luminance $B_L T$ is the product of the transmittance T and the backlight luminance $B_L$, various gamma curves can be realized by changing the transmittance T and the backlight luminance $B_L$.

A curve 1401 shown in FIG. 14A is a curve in which the transmittance T of the curve 1400 increases in each gray scale G and is represented as a function $\tau_1$ (G). In FIG. 14A, since the backlight luminance $B_L$ is not changed, the luminance $B_L T$ is higher than the luminance of the curve 1400. In addition, since the transmittance T has the maximum value and cannot be made larger than that, the curve 1401 is saturated in a certain gray scale.

Figure 14B:
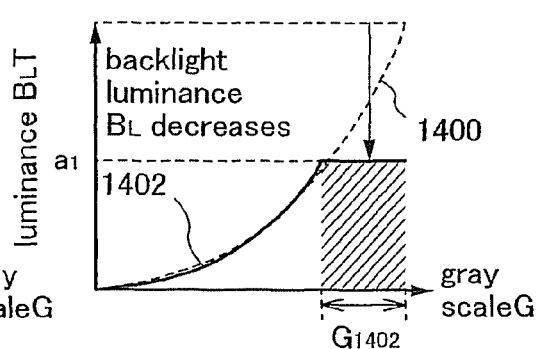

A curve 1402 shown in FIG. 14B is a gamma curve at the time when the transmittance T increases as in the curve 1401 shown in FIG. 14A and the backlight luminance $B_L$ decreases. At this time, in a region $G_{1402}$ of a gray scale, the transmittance T of which is saturated, there is no difference in luminance and the curve 1402 is saturated. Luminance at this time is denoted by $a_1$. In gray scale regions other than the gray scale region $G_{1402}$, a shape of the curve 1402 preferably corresponds to that of the curve 1400. Thus, even when power consumption is reduced by decreasing the backlight luminance $B_L$, display which is similar to display at the time when the backlight luminance $B_L$ is not decreased can be performed in the gray scale regions other than the gray scale region $G_{1402}$.

Note that an advantage of the method in this document is that the backlight luminance $B_L$ can be decreased by controlling the lighting ratio R. Thus, power consumption of a backlight can be reduced and a blanking interval can be provided, so that motion blur can be reduced.

Here, an adverse effect on image display at the time when display is performed in accordance with a gamma curve in which luminance is saturated as in the curve 1402 shown in FIG. 14B is described. When image display is performed in accordance with a gamma curve in which luminance is saturated as in the curve 1402, needless to say, all the grays scales included in the gray scale region $G_{1402}$ have the same luminance. At this time, as an adverse effect on image display, a condition in which there is no bright gray scale, i.e., a condition called blown-out highlights can be given.

Figure 14C:
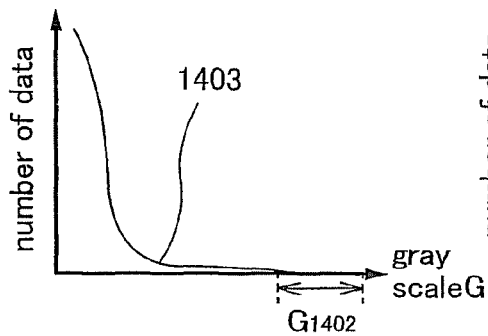
FIGS. 14C, 14D, 14G, and 14H are diagrams each showing an example of the number of data with respect to a gray scale of a semiconductor device in accordance with the present invention.

However, not all the images cause blown-out highlights. In a graph shown in FIG. 14C, a horizontal axis represents the gray scale G and a vertical axis represents the number of data included in the pixels. Such a graph is called a histogram. In a histogram 1403 shown in FIG. 14C, there is almost no data in the gray scale region $G_{1402}$. That is, as for an image originally having no data in the gray scale region $G_{1402}$, blown-out highlights do not occur even when the curve 1402 shown in FIG. 14B is used as a gamma curve.

Figure 14D:
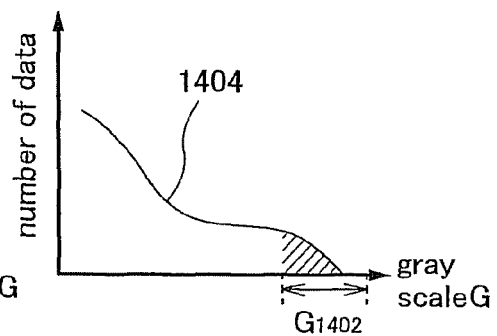

On the other hand, a histogram 1404 shown in FIG. 14D shows the case of an image having a certain number of data in the gray scale region $G_{1402}$. At this time, a certain degree of blown-out highlights occurs at the time when the curve 1402 shown in FIG. 14B is used as a gamma curve. However, when the number of data included in the gray scale region $G_{1402}$ is equal to or less than ⅒ of the total number of data, blown-out highlights are hardly perceived.

In this manner, the method in this document analyzes a histogram of an image and determines whether the number of data of an image included in a gray scale region in which luminance is saturated is equal to or less than ⅒ of the total number of data. When the number of data of the image included in the gray scale region in which the luminance is saturated is equal to or less than ⅒ of the total number of data, the transmittance T increases such that the graph has a gamma curve which is in accordance with the function $T_1(G)$, and the backlight luminance $B_L$ decreases. In addition, the backlight luminance $B_L$ is preferably decreased by controlling the lighting ratio R. Thus, power consumption of a backlight can be reduced and a blanking interval can be provided, so that motion blur can be reduced.

Next, the case is described in which the histogram of the image is analyzed and the number of data of the image included in the gray scale region in which the luminance is saturated is equal to or greater than ⅒ of the total number of data.

In the case where the histogram of the image is analyzed and the number of data of the image included in the gray scale region in which the luminance is saturated is equal to or greater than ⅒ of the total number of data, the curve 1400 is not a curve represented by the function $T_1(G)$ but a curve represented by another function when the transmittance T of the curve 1400 increases in each of the gray scales G.

Figure 14E:
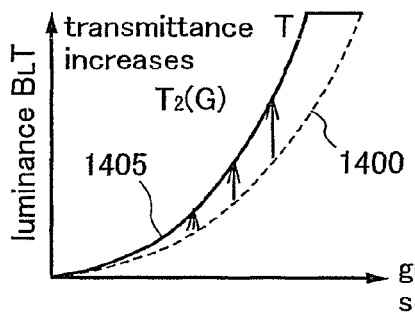

A curve 1405 shown in FIG. 14E is a curve in which the transmittance T of the curve 1400 increases in each of the gray scales G and is represented as a function $T_2(G)$. In FIG. 14E, since the backlight luminance $B_L$ is not changed, the luminance $B_L T$ is higher than the luminance of the curve 1400. In addition, since the transmittance T has the maximum value and cannot be made larger than that, the curve 1405 is saturated in a certain gray scale. Here, as for a relation between the function $T_1(G)$ and the function $T_2(G)$, $T_1(G) > T_2(G)$ is satisfied in a gray scale region in which the transmittance T is not saturated and $T_1(G) = T_2(G)$ is satisfied in a gray scale region in which the transmittance T is saturated.

Figure 14F:
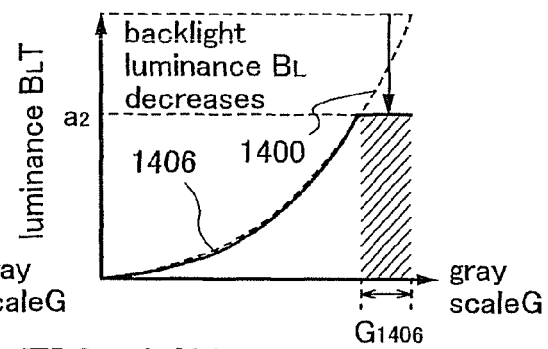

A curve 1406 shown in FIG. 14F is a gamma curve at the time when the transmittance T increases as in the curve 1405 shown in FIG. 14E and the backlight luminance $B_L$ decreases. At this time, in a region $G_{1406}$ of a gray scale, the transmittance T of which is saturated, there is no difference in luminance and the curve 1406 is saturated. Luminance at this time is denoted by $a_2$. In gray scale regions other than the gray scale region $G_{1406}$, a shape of the curve 1406 preferably corresponds to that of the curve 1400. Thus, even when power consumption is reduced by decreasing the backlight luminance $B_L$, display which is similar to display at the time when the backlight luminance $B_L$ is not decreased can be performed in the gray scale regions other than the gray scale region $G_{1406}$.

As for the gamma curve 1406 in which the transmittance T is changed in accordance with not the function $T_1(G)$ but the function $T_2(G)$ and the luminance is made to be $a_2$ by decreasing the backlight luminance $B_L$, the luminance is saturated in a certain gray scale region similarly to the gamma curve 1402. However, the size of a gray scale region in which luminance is saturated is different between the gray scale region $G_{1406}$ in which the luminance is saturated in the gamma curve 1406 and the gray scale region $G_{1402}$ in which the luminance is saturated in the gamma curve 1402. In addition, luminance in a gray scale region in which the luminance is saturated is different from each other. That is, $G_{1402} > G_{1406}$ and $a_1 < a_2$ are satisfied.

Figure 14G:
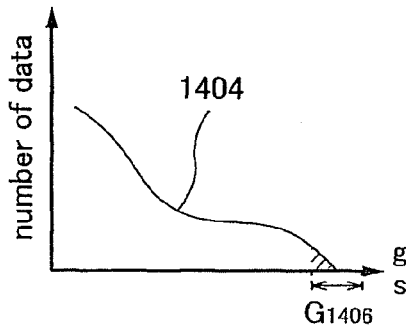

An advantageous effect on a displayed image due to a difference in the size of the gray scale regions is described. Although the histogram 1404 shown in FIG. 14G is similar to the histogram 1404 shown in FIG. 14D, a displayed gray scale region is not $G_{1402}$ but $G_{1406}$. When FIGS. 14D and 14G are compared with each other, it is apparent that the histogram 1404 has a certain number of data in the gray scale region $G_{1402}$ but the histogram 1404 has almost no data in the gray scale region $G_{1406}$. Therefore, it can be said that an image having a data distribution represented by the histogram 1404 has a lower degree of blown-out highlights in the case where the image is displayed in accordance with the gamma curve 1406 than the case where the image is displayed in accordance with the gamma curve 1402.

Therefore, if the number of data included in the gray scale region $G_{1402}$ is equal to or greater than ⅒ of the total number of data in the image displayed by the histogram 1404, a degree of blown-out highlights in image display can be made not to be perceived by changing a gamma curve used for display from the gamma curve represented by the curve 1402 to the curve represented by the curve 1406.

In this manner, the method in this document analyzes a histogram of an image and determines whether the number of data of an image included in a gray scale region in which luminance is saturated is equal to or less than ⅒ of the total number of data. When the number of data of the image included in the gray scale region in which the luminance is saturated is equal to or greater than ⅒ of the total number of data, the transmittance T increases such that the graph has a gamma curve which is in accordance with the function $T_2(G)$ supplying luminance which is lower than that of the function $T_1(G)$, and the backlight luminance $B_L$ decreases. In addition, the backlight luminance $B_L$ is preferably decreased by controlling the lighting ratio R. Thus, power consumption of a backlight can be reduced and a blanking interval can be provided, so that motion blur can be reduced.

Figure 14H:
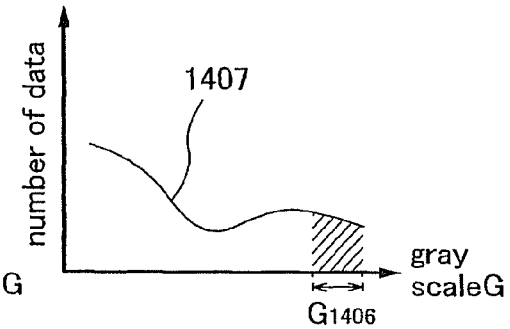

Note that even in the case of the gamma curve which is in accordance with the function $T_2(G)$ supplying the luminance which is lower than that of the function $T_1(G)$, display with a lower degree of blown-out highlights can be performed by not using the function $T_2(G)$ but separately preparing a function supplying luminance which is lower than that of the function $T_2(G)$ in the case of an image having a histogram in which the number of data included in the gray scale region $G_{1406}$ in which the luminance is saturated is equal to or greater than ⅒ of the total number of data (e.g., a histogram shown in FIG. 14H).

Next, a method in which peak luminance can be improved by controlling the transmittance T and the backlight luminance $B_L$ is described. Peak luminance corresponds to the highest luminance which can be displayed by a display device. When peak luminance is high, expressive power of an image is improved. For example, an image where stars twinkle in the night sky, an image where light is reflected by a car body, or the like can be displayed as expression which is closer to real objects.

The highest luminance can be simply increased by just increasing the backlight luminance. However, luminance on a lower gray scale side is also increased at the same time when the backlight luminance is just increased, and a condition where luminance of a portion displaying black increases (i.e., black blurring) is caused. Thus, expressive power of an image is not improved. In order to improve expressive power of an image, it is important to increase the highest luminance without causing black blurring. In this document, description "peak luminance is improved" may mean that the highest luminance increases without causing black blurring.

Figure 15A:
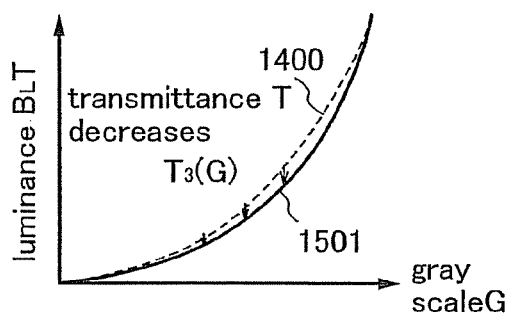
FIGS. 15A and 15B are diagrams each showing an example of luminance with respect to a gray scale of a semiconductor device in accordance with the present invention.

A curve 1501 shown in FIG. 15A is a curve in which the transmittance T of the curve 1400 decreases in each gray scale G and is represented as a function $T_3$ (G). In FIG. 15A, since the backlight luminance $B_L$ is not changed, the luminance $B_L T$ is lower than the luminance of the curve 1400. In addition, the transmittance T in the highest gray scale is the maximum value which can be obtained by a display element.

Figure 15B:
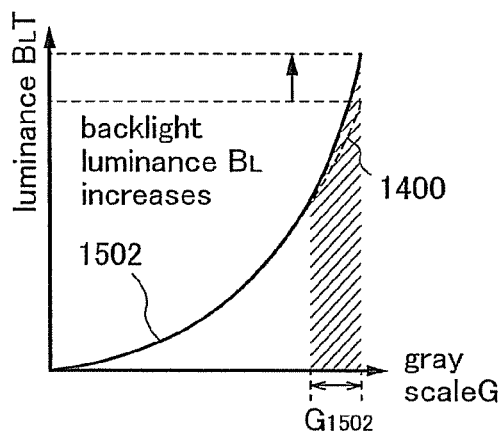

A curve 1502 shown in FIG. 15B is a gamma curve at the time when the transmittance T decreases as in the curve 1501 shown in FIG. 15A and the backlight luminance $B_L$ increases. At this time, a region of a gray scale where luminance of the curve 1502 is higher than the luminance of the curve 1400 corresponds to a gray scale region $G_{1502}$. The highest luminance is denoted by $a_3$. In gray scale regions other than the gray scale region $G_{1502}$, a shape of the curve 1502 preferably corresponds to that of the curve 1400. Thus, even when the backlight luminance $B_L$ increases, display which is similar to display when the backlight luminance $B_L$ is not increased can be performed in the gray scale regions other than the gray scale region $G_{1502}$. Therefore, black blurring can be suppressed.

When image display is performed by using the curve 1502 as a gamma curve, the highest luminance can be increased without causing black blurring in a low gray scale region. That is, peak luminance can be improved. Thus, expressive power of an image can be improved.

Note that an advantage of the method in this document is that the backlight luminance $B_L$ can be decreased by controlling the lighting ratio R. Thus, a suitable blanking interval can be set, so that a flicker can be reduced and motion blur can be reduced optimally.

Figure 15C:
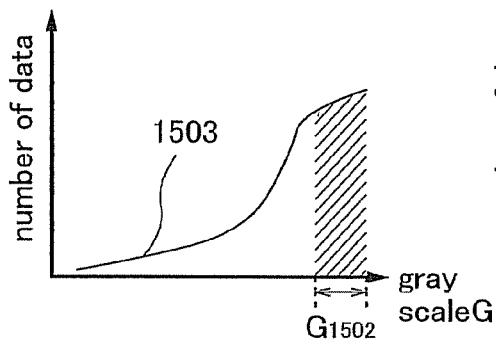
FIGS. 15C and 15D are diagrams each showing an example of the number of data with respect to a gray scale of a semiconductor device in accordance with the present invention.
Figure 15D:
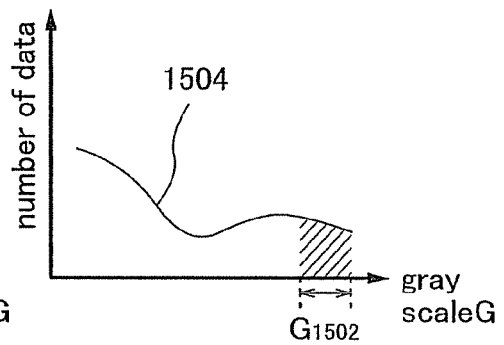

Here, when a curve represented by the curve 1502 shown in FIG. 15B is used as a gamma curve, an image having the large number of data included in the gray scale region $G_{1502}$ as in a histogram 1503 shown in FIG. 15C has a larger effect on improvement in peak luminance. Specifically, when the number of data included in the gray scale region $G_{1502}$ is equal to or greater than $\frac{1}{3}$ of the total number of data, it is more effective. Note that even when the number of data included in the gray scale region $G_{1502}$ is small, a portion displayed in accordance with data included in the gray scale region $G_{1502}$ is further enhanced when the image is an image (e.g., an image where stars twinkle in the night sky) having a histogram where the number of data in the low gray scale region is considerably large (e.g., a histogram 1504 shown in FIG. 15D), so that it is effective to use the curve represented by the curve 1502 shown in FIG. 15B as a gamma curve. Specifically, when the whole gray scale regions are divided equally into a low gray scale region, an intermediate gray scale region, and a high gray scale region, it is particularly effective to use the curve represented by the curve 1502 shown in FIG. 15B as a gamma curve when data of equal to or greater than $\frac{1}{2}$ of the total number of data is included in the low gray scale region.

Next, another method of displaying an image normally even when the backlight luminance $B_L$ decreases by controlling the transmittance T and the backlight luminance $B_L$ is described. Since the luminance $B_L T$ is the product of the transmittance T and the backlight luminance $B_L$, various gamma curves can be realized by changing the transmittance T and the backlight luminance $B_L$.

Figure 16A:
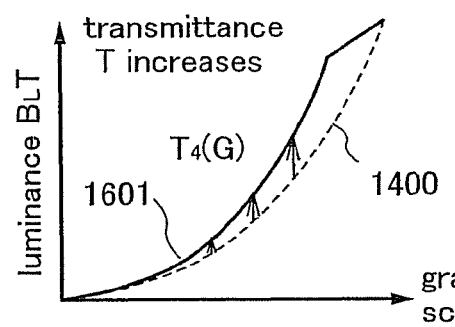
FIGS. 16A to 16D are diagrams each showing an example of luminance with respect to a gray scale of a semiconductor device in accordance with the present invention.

A curve 1601 shown in FIG. 16A is a curve in which the transmittance T of the curve 1400 increases in each gray scale G and is represented as a function $T_4$ (G). In FIG. 16A, since the backlight luminance $B_L$ is not changed, the luminance $B_L T$ is higher than the luminance of the curve 1400. In addition, although the curve 1401 shown in FIG. 14A and the curve 1405 shown in FIG. 14E are each saturated in a certain gray scale, the curve 1601 shown in FIG. 16A is not saturated and has a gradient in the gray scale region in which luminance is saturated in the curve 1401 and the curve 1405.

Figure 16B:
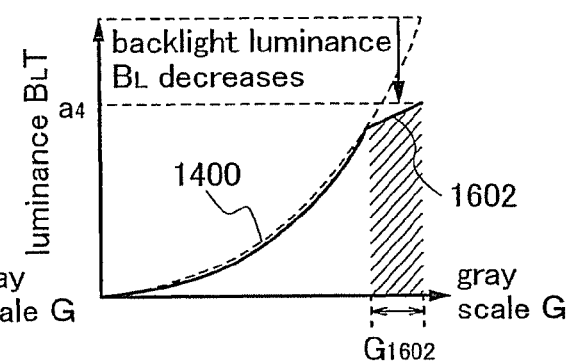

A curve 1602 shown in FIG. 16B is a gamma curve at the time when the transmittance T increases as in the curve 1601 shown in FIG. 16A and the backlight luminance $B_L$ decreases. Here, a shape of the curve 1602 preferably corresponds to that of the curve 1400 in gray scale regions other than part of a high gray scale region. At this time, a gray scale region where the curve 1602 and the curve 1400 do not correspond to each other is denoted by a gray scale region $G_{1602}$. In addition, the highest luminance of the curve 1602 is denoted by $a_4$. Thus, even when power consumption is reduced by decreasing the backlight luminance $B_L$, display which is similar to display at the time when the backlight luminance $B_L$ is not decreased can be performed in gray scale regions other than the gray scale region $G_{1602}$. Further, since a certain degree of difference in luminance can be obtained also in display of gray scales included in the gray scale region $G_{1602}$, blown-out highlights of a displayed image can be suppressed.

Figure 16C:
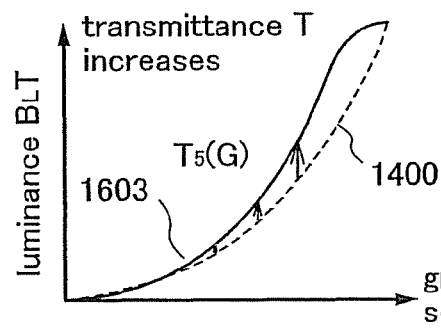

A curve 1603 shown in FIG. 16C is a curve in which the transmittance T of the curve 1400 increases in each of the gray scales G and is represented as a function $T_5$ (G). In FIG. 16C, since the backlight luminance $B_L$ is not changed, the luminance $B_L T$ is higher than the luminance of the curve 1400. In addition, since the curve 1601 shown in FIG. 16A has the gradient in part of the high gray scale region, a primary differential function of the function $T_4$ (G) is discontinuous at a boundary between regions having different shapes; however, as for the curve 1603 shown in FIG. 16C, a primary differential function of the function $T_5$ (G) is continuous at the boundary between regions having different shapes and the curve 1603 is smooth.

Figure 16D:
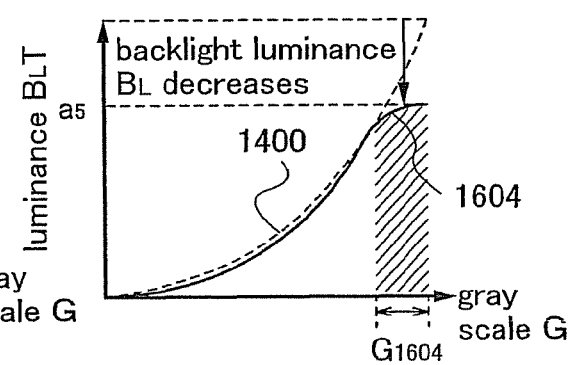

A curve 1604 shown in FIG. 16D is a gamma curve at the time when the transmittance T increases as in the curve 1603 shown in FIG. 16C and the backlight luminance $B_L$ decreases. Here, a shape of the curve 1604 preferably corresponds to that of the curve 1400 in gray scale regions other than part of a high gray scale region. At this time, a gray scale region where the curve 1604 and the curve 1400 do not correspond to each other is denoted by a gray scale region $G_{1604}$. In addition, the highest luminance of the curve 1604 is denoted by $a_5$. Thus, even when power consumption is reduced by decreasing the backlight luminance $B_L$, display which is similar to display at the time when the backlight luminance $B_L$ is not decreased can be performed in gray scale regions other than the gray scale region $G_{1604}$. Further, since a certain degree of difference in luminance can be obtained also in display of gray scales included in the gray scale region $G_{1604}$, blown-out highlights of a displayed image can be suppressed. Furthermore, since a boundary between a gray scale region where the curve 1604 and the curve 1400 correspond to each other and the gray scale region where the curve 1604 and the curve 1400 do not correspond to each other is smooth, there is an advantage in that a visual boarder line in a Mach band image (a false contour perceived by human physiology and psychology) cannot be seen.

Note that an advantage of the method in this document is that the backlight luminance $B_L$ can be decreased by controlling the lighting ratio R. Thus, power consumption of a backlight can be reduced and a blanking interval can be provided, so that motion blur can be reduced.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 3

In this embodiment mode, specific examples of the control parameter P or Q described in Embodiment Mode 1 are described. In addition, in this embodiment mode, P is used as a sign showing a control parameter.

Here, in this document, there is not a particular distinction between the case where the sign showing the control parameter is P, the case where the sign showing the control parameter is Q, and the case where the sign showing the control parameter is other than P and Q. The sign showing the control parameter is just determined for convenience. Therefore, among a plurality of specific examples of the control parameter, which are described below, any of the specific examples may be used as the control parameter P, or any of the specific examples may be used as the control parameter Q. In addition, the number of the control parameters is not particularly limited.

First, the case is described in which the control parameter P is determined by numerically analyzing image data which is displayed on a display device.

The displayed image is divided into an object and a background by analyzing image data which is input to the display device. Here, the object corresponds to a portion of the image where the control parameter P is determined. In addition, the background corresponds to portions other than the object.

Figure 17A:
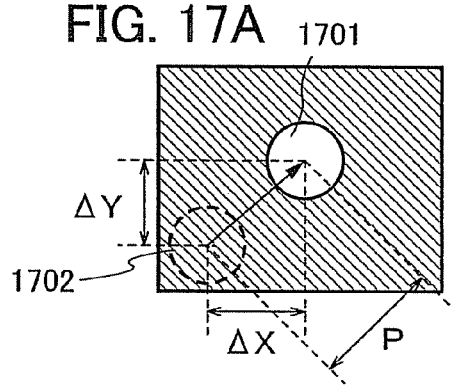
FIGS. 17A to 17L are views each illustrating an example of control parameters in accordance with the present invention.

FIG. 17A is a view showing a calculation method of the control parameter P when the control parameter P is determined by a distance of an object in the case where the object moves on the screen. In FIG. 17A, a region shown by a sign 1701 shows an object of a current frame. In addition, a region shown by a sign 1702 shows an object of a previous frame. That is, the control parameter P is determined by a distance in which the object moves when a displayed image is changed from the previous frame to the current frame. Here, ΔX in FIG. 17A shows a component in a horizontal direction of the distance in which the object moves. ΔY in FIG. 17A shows a component in a vertical direction of the distance in which the object moves. A square root of the sum of a square of ΔX and ΔY is the distance in which the object moves, and the control parameter P is determined by the size thereof. Here, as the distance in which the object moves becomes larger and the object moves faster, a degree of motion blur increases. Therefore, as the object moves faster, the control parameter P is preferably increased. This is because the lighting ratio R is controlled such that motion blur is further reduced as the control parameter P becomes larger in Embodiment Mode 1.

Figure 17B:
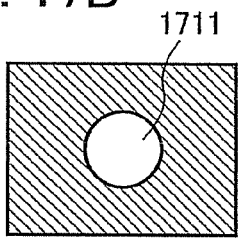
Figure 17C:
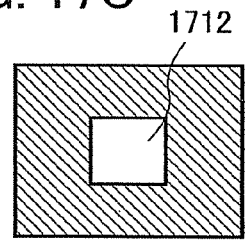
Figure 17D:
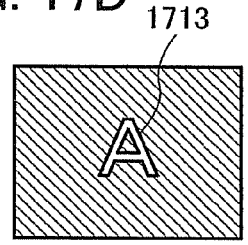

FIGS. 17B to 17D are views each showing the case where a shape of an object is used as the control parameter P. An object 1711 in FIG. 17B is an object having a shape with no corner such as a circle or an oval. An object 1712 in FIG. 17C is an object having a relatively simple shape with several corners such as a quadrangle or a triangle. An object 1713 in FIG. 17D is an object having a complicated shape such as hiragana (Japanese syllabary characters), katakana (square phonetic Japanese syllabary), alphabet, or Chinese character. Here, as the shape of the object becomes complicated, a degree of motion blur increases. Therefore, as the shape of the object becomes complicated, the control parameter P is preferably increased. This is because the lighting ratio R is controlled such that motion blur is further reduced as the control parameter P becomes larger in Embodiment Mode 1.

Figure 17E:
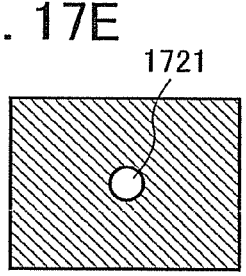
Figure 17F:
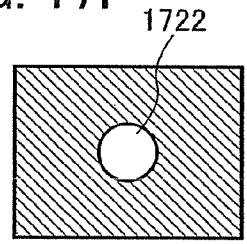
Figure 17G:
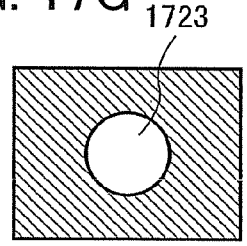

FIGS. 17E to 17G are views each showing the case where the size of an object is used as the control parameter P. An object 1721 in FIG. 17E is an object having a size of approximately 1/100 of an area of a display portion of a display device. An object 1722 in FIG. 17F is an object having a size of approximately 1/100 to approximately 1/10 of the area of the display portion of the display device. An object 1723 in FIG. 17G is an object having a size of approximately 1/10 or more of the area of the display portion of the display device. Here, as the size of the object becomes larger, a degree of motion blur increases. Therefore, as the size of the object becomes larger, the control parameter P is preferably increased. This is because the lighting ratio R is controlled such that motion blur is further reduced as the control parameter P becomes larger in Embodiment Mode 1.

Figure 17H:
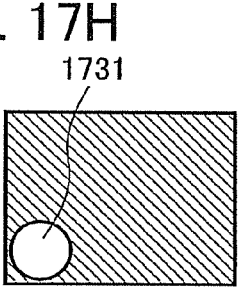
Figure 17I:
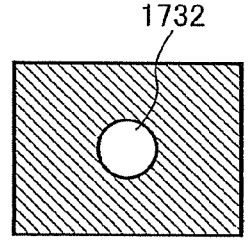

FIGS. 17H and 17I are views each showing the case where a position of an object on a display portion is used as the control parameter P. An object 1731 in FIG. 17H is an object having a certain distance from the center of a display portion of a display device. An object 1732 in FIG. 17I is an object located almost in the center of the display portion of the display device. Here, as the position of the object becomes closer to the center, a degree of motion blur increases because the object is noticeable for a user. Therefore, as the position of the object becomes closer to the center, the control parameter P is preferably increased. This is because the lighting ratio R is controlled such that motion blur is further reduced as the control parameter P becomes larger in Embodiment Mode 1.

Figure 17J:
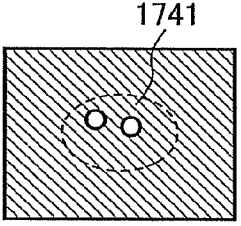
Figure 17K:
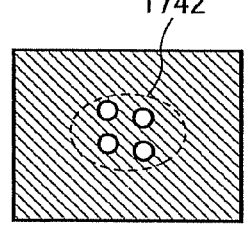
Figure 17L:
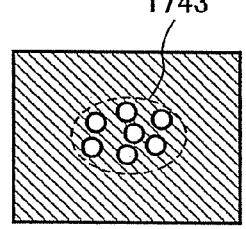

FIGS. 17J to 17L are views each showing the case where density of objects is used as the control parameter P. A region 1741 in FIG. 17J is a group of objects in a certain range of a display portion of a display device. FIG. 17J shows the case where density of the objects in the region 1741 is low. A region 1742 in FIG. 17K is a group of objects in a certain range of the display portion of the display device. FIG. 17K shows the case where density of the objects in the region 1742 is intermediate. A region 1743 in FIG. 17L is a group of objects in a certain range of the display portion of the display device. FIG. 17L shows the case where density of the objects in the region 1743 is high. Here, as density of the objects becomes higher, a degree of motion blur increases. Therefore, as density of the objects becomes higher, the control parameter P is preferably increased. This is because the lighting ratio R is controlled such that motion blur is further reduced as the control parameter P becomes larger in Embodiment Mode 1.

FIGS. 18A to 18I are views each showing the case where a difference in luminance between an object and a background is used as the control parameter P. In addition, FIGS. 18J to 18L are diagrams in which histograms of images shown in FIGS. 18A to 18I are compared with each other.

FIGS. 18A to 18C are views showing images at the time when luminance of backgrounds 1802, 1804, and 1806 is luminance in a low gray scale region. FIG. 18A shows the case where luminance of an object 1801 is luminance in the low gray scale region. FIG. 18B shows the case where luminance of an object 1803 is luminance in an intermediate gray scale region. FIG. 18C shows the case where luminance of an object 1805 is luminance in a high gray scale region. In addition, histograms of respective images are shown by a curve 1831, a curve 1832, and a curve 1833 in FIG. 18J.

In each of FIGS. 18A to 18C, as the difference in luminance between the object and the background becomes larger, a degree of motion blur increases because a difference between the object and the background stands out. That is, the degree of motion blur in the image shown in FIG. 18C is the largest and the degree of motion blur in the image shown in FIG. 18A is the smallest. The degree of motion blur in the image shown in FIG. 18B is intermediate therebetween. When this is described with reference to FIG. 18J, it can be said that a degree of motion blur increases as a difference in gray scales of the image between a portion showing luminance distribution of the background and a portion showing luminance distribution of the object becomes larger. Therefore, as the difference in gray scales of the image between the portion showing the luminance distribution of the background and the portion showing the luminance distribution of the object becomes larger, the control parameter P is preferably increased. This is because the lighting ratio R is controlled such that motion blur is further reduced as the control parameter P becomes larger in Embodiment Mode 1.

FIGS. 18D to 18F are views showing images at the time when luminance of backgrounds 1812, 1814, and 1816 is luminance in an intermediate gray scale region. FIG. 18D shows the case where luminance of an object 1811 is luminance in the low gray scale region. FIG. 18E shows the case where luminance of an object 1813 is luminance in an intermediate gray scale region. FIG. 18F shows the case where luminance of an object 1815 is luminance in a high gray scale region. In addition, histograms of respective images are shown by a curve 1834, a curve 1835, and a curve 1836 in FIG. 18K.

In each of FIGS. 18D to 18F, as the difference in luminance between the object and the background becomes larger, a degree of motion blur increases because a difference between the object and the background stands out. That is, the degree of motion blur in the images shown in FIGS. 18D and 18F is the largest and the degree of motion blur in the image shown in FIG. 18E is the smallest. Note that the degree of motion blur in the images shown in FIGS. 18D and 18F is similar to the degree of motion blur in the image shown in FIG. 18B. This is because the difference in luminance between the object and the background in the images shown in FIGS. 18D and 18F is similar to the difference in luminance between the object and the background in the image shown in FIG. 18B. When this is described with reference to FIG. 18K, it can be said that a degree of motion blur increases as a difference in gray scales of the image between a portion showing luminance distribution of the background and a portion showing luminance distribution of the object becomes larger. Therefore, as the difference in gray scales of the image between the portion showing the luminance distribution of the background and the portion showing the luminance distribution of the object becomes larger, the control parameter P is preferably increased. This is because the lighting ratio R is controlled such that motion blur is further reduced as the control parameter P becomes larger in Embodiment Mode 1.

FIGS. 18G to 18I are views showing images at the time when luminance of backgrounds 1822, 1824, and 1826 is luminance in a high gray scale region. FIG. 18G shows the case where luminance of an object 1821 is luminance in the low gray scale region. FIG. 18H shows the case where luminance of an object 1823 is luminance in an intermediate gray scale region. FIG. 18I shows the case where luminance of an object 1825 is luminance in a high gray scale region. In addition, histograms of respective images are shown by a curve 1837, a curve 1838, and a curve 1839 in FIG. 18L.

In each of FIGS. 18G to 18I, as the difference in luminance between the object and the background becomes larger, a degree of motion blur increases because a difference between the object and the background stands out. That is, the degree of motion blur in the image shown in FIG. 18G is the largest and the degree of motion blur in the image shown in FIG. 18I is the smallest. The degree of motion blur in the image shown in FIG. 18H is intermediate therebetween. When this is described with reference to FIG. 18L, it can be said that a degree of motion blur increases as a difference in gray scales of the image between a portion showing luminance distribution of the background and a portion showing luminance distribution of the object becomes larger. Therefore, as the difference in gray scales of the image between the portion showing the luminance distribution of the background and the portion showing the luminance distribution of the object becomes larger, the control parameter P is preferably increased. This is because the lighting ratio R is controlled such that motion blur is further reduced as the control parameter P becomes larger in Embodiment Mode 1.

In this manner, a difference in luminance between an object and a background is analyzed by a histogram, and the control parameter P increases (the lighting ratio R decreases) as a difference between luminance distribution of the object and luminance distribution of the background becomes larger. Therefore, motion blur can be reduced.

Note that the control parameter P can be determined by not only the difference in luminance between the object and the background, but also sharpness of change in luminance at a boundary between the object and the background. That is, the control parameter P may be determined by a value obtained by secondarily differentiating a function which corresponds to luminance with respect to a position in a display portion of a display device on a line including the boundary between the object and the background. Here, as the secondary differential value at the boundary between the object and the background becomes larger, a degree of motion blur increases because an image is an image where the boundary between the object and the background stands out. Therefore, as the secondary differential value at the boundary between the object and the background becomes larger, the control parameter P is preferably increased. This is because the lighting ratio R is controlled such that motion blur is further reduced as the control parameter P becomes larger in Embodiment Mode 1.

Next, the case is described in which the control parameter P is determined by a method other than the method of numerically analyzing image data which is displayed on a display device.

As a method of determining the control parameter P other than the method of numerically analyzing image data which is displayed on a display device, a method of collecting data on environment where a display device is set can be given.

Figure 19A:
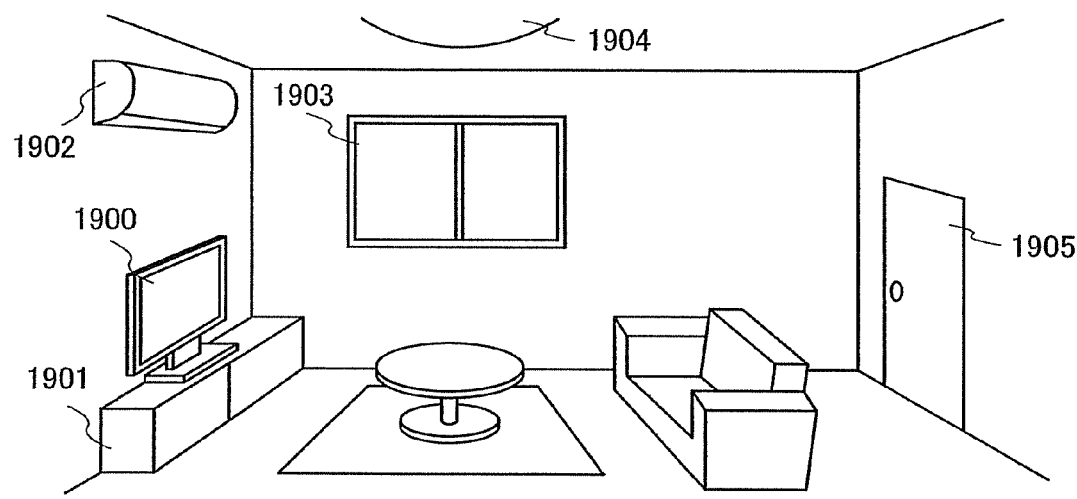
FIGS. 19A to 19C are views each illustrating an example of control parameters in accordance with the present invention.

For example, a display device 1900 described in this document is set in a room as shown in FIG. 19A. The display device 1900 is set on a board 1901. A temperature and humidity control device 1902 is provided on a wall surface which is an upper part of the display device 1900. A window 1903 is provided on a wall surface which is a left part seeing from a display device 1900 side. A lighting device 1904 is provided an upper part of front seeing from the display device 1900 side. An entrance 1905 is provided on a wall surface of front seeing from the display device 1900 side. Particularly important items as data on environment where the display device 1900 is set are heat and light.

In the environment where the display device 1900 is set, some change in temperature due to various factors always occurs. For example, when some kind of electronic and electric device is put inside the board 1901 or the board 1901 itself is some kind of electronic and electric device, change in temperature in the display device 1900 due to heat from a lower part is inevitable. In addition, when air delivered from the temperature and humidity control device 1902 directly or indirectly flows to the display device 1900, change in temperature in the display device 1900 due to heat or cool air from an upper part is inevitable. The same can be said for the window 1903 and the entrance 1905.

When temperature of the environment where the display device 1900 is set is changed, characteristics of a display element is changed. For example, in the case of a liquid crystal element, response speed is quickened when temperature is high and the response speed decreases when the temperature is low. Therefore, as the temperature of the environment becomes lower, the control parameter P is preferably increased.

In this manner, the control parameter P which determines a control condition of the display device 1900 may be determined in accordance with change in the temperature of the environment where the display device 1900 is set. Therefore, the display device 1900 may include a temperature sensor.

In addition, light which shines on a display portion of the display device 1900 greatly affects a display condition of the display device 1900. As light which shines on a display portion of the display device 1900, light from the lighting device 1904 or penetration of external light from the window 1903 can be given in environment shown in FIG. 19A.

When light shines on the display portion of the display device 1900, contrast of an image decreases by reflected light of the light. That is, when the contrast of the image decreases by increase in the reflected light, a degree of motion blur decreases. Therefore, as reflected light by the light which shines on the display portion of the display device 1900 becomes less, the control parameter P is preferably increased.

In this manner, the control parameter P which determines the control condition of the display device 1900 may be determined in accordance with change in brightness of the environment where the display device 1900 is set. Therefore, the display device 1900 may include a photo sensor.

Next, as a method of determining the control parameter P other than the method of numerically analyzing image data which is displayed on a display device, a method of determining the control parameter P by contents displayed by a display device can be given.

Figure 19B:
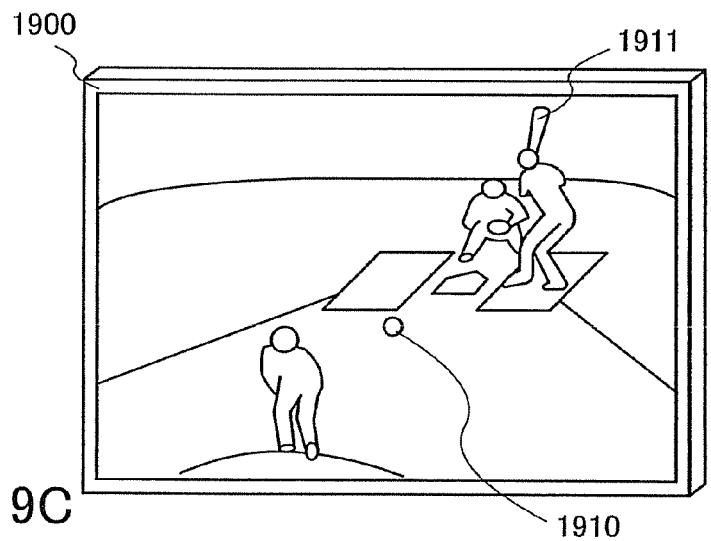

A view shown in FIG. 19B shows the case where the display device 1900 displays a baseball game. In addition, a view shown in FIG. 19C shows the case where the display device 1900 displays a soccer game.

When the display device 1900 displays a baseball game, an object which is used for determining the control parameter P is a baseball ball 1910, a bat 1911 of a batter, or the like. When the display device 1900 displays a soccer game, an object which is used for determining the control parameter P is a soccer ball 1920, a movement of the whole image by a pan operation on a imaging device side, or the like. In each case, a kind of the object is extremely limited.

In addition, conditions such as speed of a movement when the object is displayed, the shape, the size, the position, density, the difference in luminance of the background, and the sharpness of change in the luminance at the boundary between the object and the background are hardly changed during which the contents are displayed. That is, when a value of the control parameter P, which should be set, is determined in advance depending on kinds of the contents, a suitable control parameter P can be determined without analyzing data on an image which is displayed on the display device every frame.

Figure 19C:
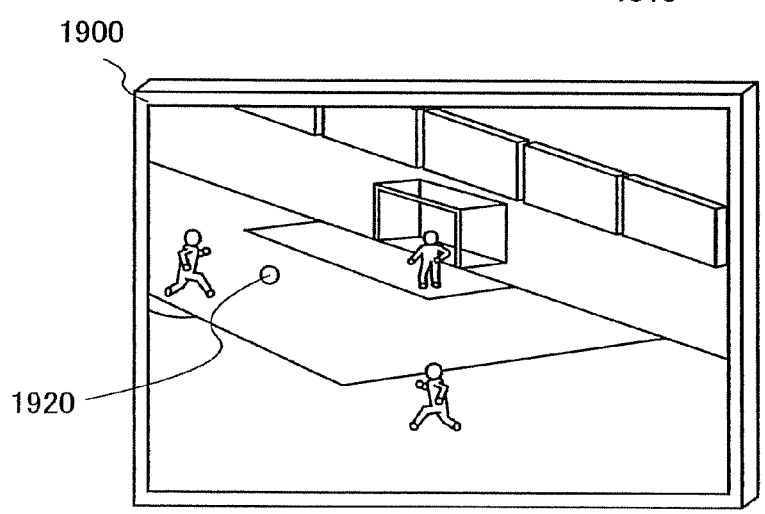

As kinds of the contents other than those shown in FIGS. 19B and 19C, various kinds of contents such as sports other than baseball and soccer, movies, cooking programs, news programs, variety programs, music programs, and animations can be given. The control parameter P can be set in advance depending on various kinds of contents.

In this manner, when a suitable control parameter P can be set in advance depending on kinds of the contents, a suitable control parameter P can be determined without analyzing data on an image which is displayed on the display device every frame.

Note that as a method for determining kinds of the contents, information from an electronic program guide (an EPG) may be used as well as analyzing data on the image which is displayed on the display device.

Next, as a method of determining the control parameter P other than the method of numerically analyzing image data which is displayed on a display device, a method of determining the control parameter P by age of the user can be given.

When the control parameter P is determined by age of the user of the display device, the control parameter P can be determined by setting a tendency of kinds of contents displayed very often depending on age in advance.

In addition, when the control parameter P is determined by age of the user of the display device, luminance of a backlight can be set suitably by age of the user of the display device in order to reduce burden on eyes of the user. At this time, luminance of the backlight may be controlled by controlling the lighting ratio R. Thus, burden on eyes can be reduced and motion blur can be reduced.

Further, all the methods for determining the control parameter P, which are described in this embodiment mode, may be means which can be set by the user of the display device.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 4

In this embodiment mode, a method for increasing response speed of a display element when a display element in which response to a signal input (response speed) is low, such as a liquid crystal element and an electrophoretic element, is used as a display element provided in a display device is described. In particular, a method effective for the case where a lighting ratio R is changed is described.

There are various kinds of methods for a display element using a liquid crystal element. A method which is most widely used is a method in which a liquid crystal element is controlled by analog voltage, such as a TN mode, a VA mode, and an IPS mode. In these methods, response time (also referred to as response speed) of a liquid crystal element is several to several tens of ms. One frame period in the NTSC system is 16.7 ms, and response time of a liquid crystal element in these modes is often longer than one frame period. Since one of causes of motion blur is that response time of a display element is longer than one frame period, the response time of the display element is preferably at least shorter than one frame period. Accordingly, for a display element using a liquid crystal element, a method is used in which voltage $V_{OD}$ (voltage providing desired transmittance at or around the time when predetermined time has passed) which is different from original voltage $V_S$ (voltage providing desired transmittance after enough time passes) is applied to the liquid crystal element in order to reduce response time of the liquid crystal element. This method is referred to as overdrive in this document. Note that the voltage $V_{OD}$ is referred to as overdrive voltage.

Here, in at least one of driving methods of a display device according to this document, a blanking interval is provided in one frame period. Accordingly, response time of a display element is preferably shorter than an image display period $\tau_a$ and a blanking interval $\tau_b$. Note that when a liquid crystal element or the like is used as the display element, response time is not always shorter than the image display period $\tau_a$ and the blanking interval $\tau_b$. In this embodiment mode, a method is described in which response time of a liquid crystal element or the like in accordance with the length of the image display period $\tau_a$ and the blanking interval $\tau_b$ is obtained by using overdrive.

In this document, there are several methods of providing the blanking interval $\tau_b$ (methods of controlling the lighting ratio R) as described above, that is, (1) the method where blanking data is directly written to each pixel, (2) the method where the whole backlight blinks, and (3) the method where a backlight divided into areas sequentially blinks. First, in (1) the method where blanking data is directly written to each pixel, a method where response time of a liquid crystal element or the like in accordance with the length of the image display period $\tau_a$ and the blanking interval $\tau_b$ is obtained is described with reference to FIGS. 20A to 20C.

The length of the blanking interval $\tau_b$ can be changed as appropriate in order to directly write blanking data to each pixel, as shown in Embodiment Modes 1 and 2. Further, when the length of the blanking interval $\tau_b$ is changed in accordance with the control parameters P and Q described in Embodiment Mode 3, driving in accordance with a state of an image and an environment can be realized. For example, in the case such that movement of an object displayed in an image is large or where luminance difference between a background and an object displayed in an image is large, motion blur is likely to be seen. Motion blur can be reduced by increasing the length of the blanking interval $\tau_b$. In addition, in the case such that movement of an object displayed in an image is small or where luminance difference between a background and an object displayed in an image is small, motion blur is not likely to be seen. A flicker can be reduced by reducing the length of the blanking interval $\tau_b$.

Figure 20A:
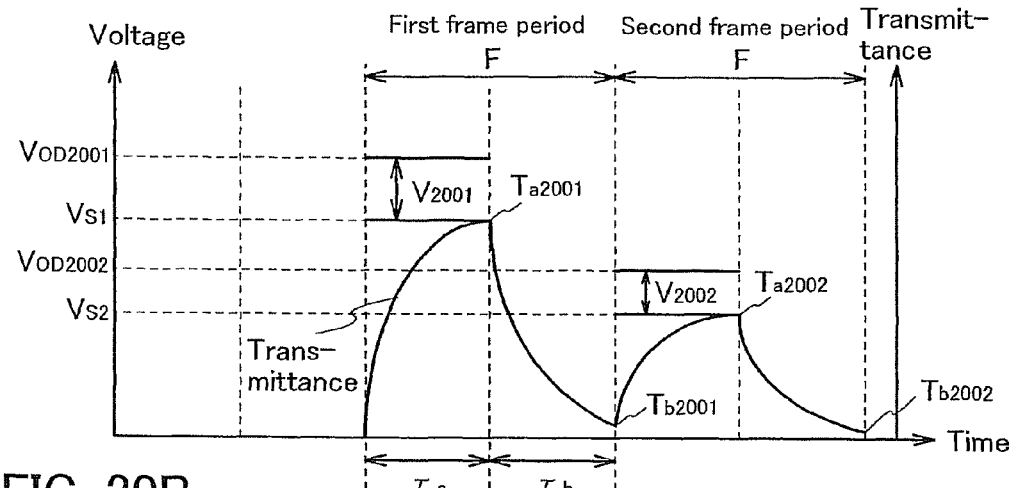
FIGS. 20A to 20C are diagrams each illustrating an example of a timing chart of a semiconductor device in accordance with the present invention.
Figure 20B:
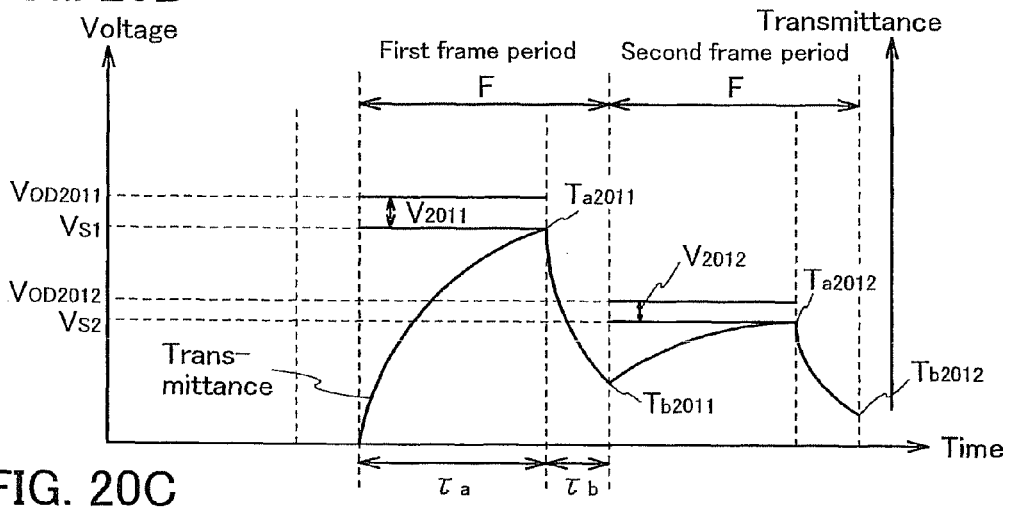
Figure 20C:
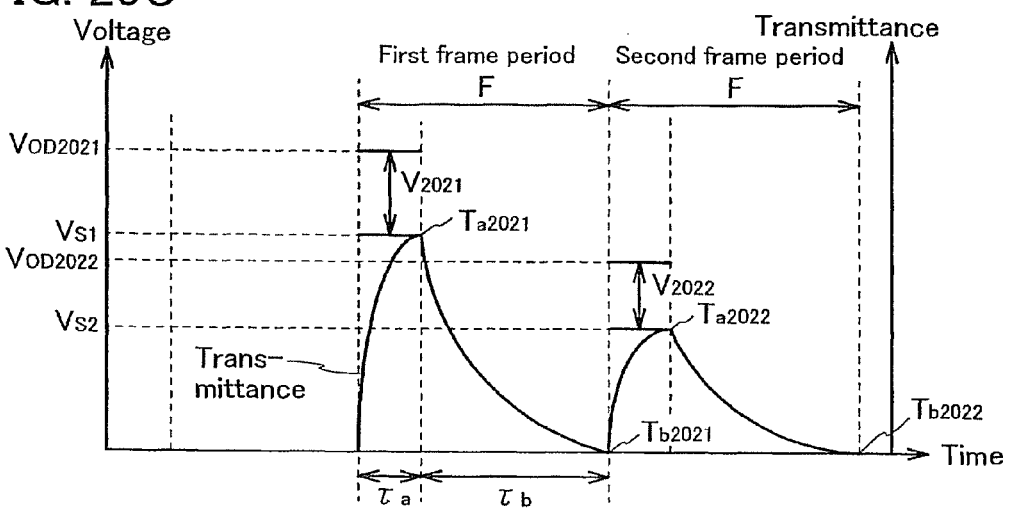

In each graph shown in FIGS. 20A to 20C, a horizontal axis represents time, and a vertical axis represents voltage and transmittance of a liquid crystal element. Voltage is shown by a solid line, and transmittance is shown by a dashed line. Note that in this embodiment mode, the voltage refers to voltage in the case of a positive signal when voltage of a counter electrode is 0 V. In the case of a negative signal, polarity of voltage is inverted. Therefore, the voltage in the graph may be considered as an absolute value of voltage applied to the liquid crystal element. A range of time used for description is a first frame period and a second frame period. That is, the graphs shown in FIGS. 20A to 20C show change in voltage and transmittance over time in a range of two frame periods.

A value of the voltage applied to the liquid crystal element is described. Voltage $V_{S1}$ and voltage $V_{S2}$ are original voltages which should be applied in the first frame period and the second frame period, respectively. Note that the voltages $V_{S1}$ and $V_{S2}$ have the same value in all graphs in FIGS. 20A to 20C. Voltages $V_{OD2001}$ and $V_{OD2002}$, voltages $V_{OD2011}$ and $V_{OD2012}$, and voltages $V_{OD2021}$ and $V_{OD2022}$ are overdrive voltages in the first frame period and the second frame period, respectively. The overdrive voltages are preferably different from each other in the graphs shown in FIGS. 20A to 20C. Note that in a frame period before the first frame period, voltage applied to the liquid crystal element in an image display period and voltage applied in a blanking interval are determined as appropriate, and they are equal, for example.

Overdrive intensity refers to difference (an absolute value) between overdrive voltage and original voltage. First overdrive intensity refers to overdrive intensity in the first frame period. Second overdrive intensity refers to overdrive intensity in the second frame period.

First, with reference to FIG. 20A, a relation between voltage applied to the liquid crystal element and transmittance in each frame period is described in the case where values of the image display period $\tau_a$ and the blanking interval $\tau_b$ are the same, that is, in the case where $\tau_a = \tau_b = F/2$ is satisfied.

In the image display period in the first frame period, the overdrive voltage $V_{OD2001}$ is applied at or around the end of the image display period in the first frame period so that transmittance of the liquid crystal element becomes transmittance $Ta_{2001}$ corresponding to the original voltage $V_{S1}$. Thus, the transmittance of the liquid crystal element becomes the transmittance $Ta_{2001}$ at or around the end of the image display period in the first frame period. At this time, the first overdrive intensity is $V_{2001}$, and $V_{2001}=V_{OD2001}-V_{S1}$ is satisfied.

In the blanking interval in the first frame period, it is preferable that the transmittance of the liquid crystal element become transmittance for providing luminance in the blanking interval, at or around the end of the blanking interval in the first frame period at the latest. However, because of characteristics of the liquid crystal element, it is difficult to apply overdrive voltage in a shorter time, which is for reaching transmittance corresponding to voltage applied to the liquid crystal element of approximately 0 V. Thus, at or around the end of the blanking interval in the first frame period, the transmittance of the liquid crystal element is not necessary to be transmittance for providing the luminance in the blanking interval. Instead, it is preferable that transmittance $Tb_{2001}$ at the end of the blanking interval in the first frame period can be estimated from the transmittance $Ta_{2001}$ at the end of the image display period in the first frame period and the length of the blanking interval $\tau_b$, which can be estimated from a plurality of experiments performed in advance. When the data is stored in a memory such as a lookup table, the data can be utilized for adjusting a value of voltage applied to the liquid crystal element.

In the image display period in the second frame period, the overdrive voltage $V_{OD2002}$ is applied at or around the end of the image display period in the second frame period so that the transmittance of the liquid crystal element becomes transmittance $Ta_{2002}$ corresponding to the original voltage $V_{S2}$. Thus, the transmittance of the liquid crystal element becomes the transmittance $Ta_{2002}$ at or around the end of the image display period in the second frame period. At this time, the second overdrive intensity is $V_{2002}$, and $V_{2002}=V_{OD2002}-V_{S2}$ is satisfied.

The image display period in the first frame period is different from the image display period in the second frame period in the following ways: the transmittance of the liquid crystal element is the transmittance for providing the luminance in the blanking interval at or around the start of the image display period in the first frame period, whereas the transmittance of the liquid crystal element is not always the transmittance for providing the luminance in the blanking interval at or around the start of the image display period in the second frame period. In that case, the transmittance $Ta_{2002}$ depends on not only the voltage $V_{OD2002}$ applied in the image display period in the second frame period but also the transmittance $Tb_{2001}$ at the end of the blanking interval in the first frame period, so that appropriate transmittance cannot be obtained.

In this case, it is extremely useful in the first frame period that the transmittance $Tb_{2001}$ at the end of the blanking interval in the first frame period can be estimated from the transmittance $Ta_{2001}$ at the end of the image display period in the first frame period and the length of the blanking interval $\tau_b$. This is because even when the transmittance of the liquid crystal element is not the transmittance for providing the luminance in the blanking interval at or around the start of the image display period in the second frame period, the transmittance $Tb_{2001}$ at that time is estimated; thus, the voltage $V_{OD2002}$ applied in the image display period in the second frame period can be adjusted in accordance with the level of the transmittance $Tb_{2001}$.

In the blanking interval in the second frame period, similar to the blanking interval in the first frame period, it is preferable that transmittance $Tb_{2002}$ at the end of the blanking interval in the second frame period can be estimated from the transmittance $Ta_{2002}$ at the end of the image display period in the second frame period and the length of the blanking interval $\tau_b$. Accordingly, desired transmittance can be accurately obtained also at the end of an image display period in a frame period next to the second frame period.

The length of the blanking interval $\tau_b$ can be changed as appropriate in accordance with the control parameters P and Q described in Embodiment Mode 3. With reference to FIG. 20B, a relation between voltage applied to the liquid crystal element and transmittance in each frame period is described in the case where the image display period $\tau_a$ is longer than the blanking interval $\tau_b$, that is, in the case where $\tau_a>\tau_b$ is satisfied.

In the image display period in the first frame period, the overdrive voltage $V_{OD2011}$ is applied at or around the end of the image display period in the first frame period so that the transmittance of the liquid crystal element becomes transmittance $Ta_{2011}$ corresponding to the original voltage $V_{S1}$. Thus, the transmittance of the liquid crystal element becomes the transmittance $Ta_{2011}$ at or around the end of the image display period in the first frame period. At this time, the first overdrive intensity is $V_{2011}$, and $V_{2011}=V_{OD2011}-V_{S1}$ is satisfied.

In the driving method of a display device according to this document, it is extremely useful that the first overdrive intensity $V_{2001}$ in the case where $\tau_a=\tau_b=F/2$ is satisfied shown in FIG. 20A and the first overdrive intensity $V_{2011}$ in the case where $\tau_a>\tau_b$ is satisfied shown in FIG. 20B are different and $V_{2001}>V_{2011}$ is satisfied. This is because the image display period $\tau_a$ is longer in the case where $\tau_a>\tau_b$ is satisfied, so that a longer period of time can be allowed to reach desired transmittance. Accordingly, desired transmittance can be accurately obtained by applying overdrive voltage which varies depending on the lighting ratio R even with the same original voltage $V_{S1}$. Note that increase in length of the image display period $\tau_a$ or reduction in length of the blanking interval $\tau_b$ is preferably determined in accordance with the control parameters P and Q described in Embodiment Mode 3. This is because when it is estimated by the control parameters P and Q that motion blur is not likely to be seen from a state of an image (e.g., the case where movement of an object displayed in the image is small or the case where luminance difference between a background and an object displayed in the image is small) and an environment, driving by which a flicker or the like can be reduced by reducing the length of the blanking interval $\tau_b$ can be realized.

In the blanking interval in the first frame period, it is preferable that the transmittance of the liquid crystal element become transmittance for providing luminance in the blanking interval, at the end of the blanking interval in the first frame period at the latest or at the time close thereto. However, because of characteristics of the liquid crystal element, it is difficult to apply overdrive voltage in a shorter time, which is for reaching transmittance corresponding to voltage applied to the liquid crystal element of approximately 0 V. Thus, at or around the end of the blanking interval in the first frame period, the transmittance of the liquid crystal element is not necessary to be transmittance for providing the luminance in the blanking interval. Instead, it is preferable that transmittance $Tb_{2011}$ at the end of the blanking interval in the first frame period can be estimated from the transmittance $Ta_{2011}$ at the end of the image display period in the first frame period and the length of the blanking interval $\tau_b$, which can be estimated from a plurality of experiments performed in advance. When the data is stored in a memory such as a lookup table, the data can be utilized for adjusting a value of voltage applied to the liquid crystal element.

Note that as shown in FIG. 20B, the blanking interval is further reduced in the case where $\tau_a>\tau_b$ is satisfied, so that difference between the transmittance $Tb_{2011}$ at the end of the blanking interval in the first frame period and transmittance providing the luminance in the blanking interval is further increased. Accordingly, it is very important that the transmittance $Tb_{2011}$ at the end of the blanking interval in the first frame period can be estimated.

In the image display period in the second frame period, the overdrive voltage $V_{OD2012}$ is applied at or around the end of the image display period in the second frame period so that the transmittance of the liquid crystal element becomes transmittance $Ta_{2012}$ corresponding to the original voltage $V_{S2}$. Thus, the transmittance of the liquid crystal element becomes the transmittance $Ta_{2012}$ at or around the end of the image display period in the second frame period. At this time, the second overdrive intensity is $V_{2012}$, and $V_{2012}=V_{OD2012}-V_{S2}$ is satisfied.

The image display period in the first frame period is different from the image display period in the second frame period in the following ways: the transmittance of the liquid crystal element is the transmittance for providing the luminance in the blanking interval at or around the start of the image display period in the first frame period, whereas the transmittance of the liquid crystal element is not always the transmittance for providing the luminance in the blanking interval at or around the start of the image display period in the second frame period. In that case, the transmittance $Ta_{2012}$ depends on not only the voltage $V_{OD2012}$ applied in the image display period in the second frame period but also the transmittance $Tb_{2011}$ at the end of the blanking interval in the first frame period, so that appropriate transmittance cannot be obtained.

In this case, it is extremely useful in the first frame period that the transmittance $Tb_{2011}$ at the end of the blanking interval in the first frame period can be estimated from the transmittance $Ta_{2011}$ at the end of the image display period in the first frame period and the length of the blanking interval $\tau_b$. This is because even when the transmittance of the liquid crystal element is not the transmittance for providing the luminance in the blanking interval at or around the start of the image display period in the second frame period, the transmittance $Tb_{2011}$ at that time is estimated; thus, the voltage $V_{OD2012}$ applied in the image display period in the second frame period can be adjusted in accordance with the level of the transmittance $Tb_{2011}$.

In the driving method of a display device according to this document, it is extremely useful that the second overdrive intensity $V_{2002}$ in the case where $\tau_a=\tau_b=F/2$ is satisfied shown in FIG. 20A and the second overdrive intensity $V_{2012}$ in the case where $\tau_a>\tau_b$ is satisfied shown in FIG. 20B are different and $V_{2002}>V_{2012}$ is satisfied. This is because the image display period $\tau_a$ is longer in the case where $\tau_a>\tau_b$ is satisfied, so that a longer period of time can be allowed to reach desired transmittance. Accordingly, desired transmittance can be accurately obtained by applying overdrive voltage which varies depending on the lighting ratio R even with the same original voltage $V_{S2}$. Note that increase in length of the image display period $\tau_a$ or reduction in length of the blanking interval $\tau_b$ is preferably determined in accordance with the control parameters P and Q described in Embodiment Mode 3. This is because when it is estimated by the control parameters P and Q that motion blur is not likely to be seen from a state of an image (e.g., the case where movement of an object displayed in the image is small or the case where luminance difference between a background and an object displayed in the image is small) and an environment, driving by which a flicker or the like can be reduced by reducing the length of the blanking interval $\tau_b$ can be realized.

In addition, the second overdrive intensity $V_{2012}$ is preferably further reduced in the case where $\tau_a>\tau_b$ is satisfied because the transmittance $Tb_{2011}$ at the start of the second frame period is larger than the transmittance $Tb_{2001}$ at the start of the second frame period in the case where $\tau_a=\tau_b$ is satisfied. That is, the second overdrive intensity $V_{2012}$ in the case where $\tau_a>\tau_b$ is satisfied is preferably smaller than the second overdrive intensity $V_{2002}$ in the case where $\tau_a=\tau_b$ is satisfied not only because of increase in the image display period $\tau_a$ but also because of increase in the transmittance $Tb_{2011}$ at the start of the second frame period.

In the blanking interval in the second frame period, similar to the blanking interval in the first frame period, it is preferable that transmittance $Tb_{2012}$ at the end of the blanking interval in the second frame period can be estimated from the transmittance $Ta_{2012}$ at the end of the image display period in the second frame period and the length of the blanking interval $\tau_b$. Accordingly, desired transmittance can be accurately obtained also at the end of an image display period in a frame period next to the second frame period.

Next, with reference to FIG. 20C, a relation between voltage applied to the liquid crystal element and transmittance in each frame period is described in the case where the image display period $\tau_a$ is shorter than the blanking interval $\tau_b$, that is, in the case where $\tau_a<\tau_b$ is satisfied.

In the image display period in the first frame period, the overdrive voltage $V_{OD2021}$ is applied at or around the end of the image display period in the first frame period so that the transmittance of the liquid crystal element becomes transmittance $Ta_{2021}$ corresponding to the original voltage $V_{S1}$. Thus, the transmittance of the liquid crystal element becomes the transmittance $Ta_{2021}$ at or around the end of the image display period in the first frame period. At this time, the first overdrive intensity is $V_{2021}$, and $V_{2021}=V_{OD2021}-V_{S1}$ is satisfied.

In the driving method of a display device according to this document, it is extremely useful that the first overdrive intensity $V_{2001}$ in the case where $\tau_a=\tau_b=F/2$ is satisfied shown in FIG. 20A and the first overdrive intensity $V_{2021}$ in the case where $\tau_a<\tau_b$ is satisfied shown in FIG. 20C are different and $V_{2001}<V_{2021}$ is satisfied. This is because the image display period $\tau_a$ is shorter in the case where $\tau_a<\tau_b$ is satisfied, so that a shorter period of time needs to be allowed to reach desired transmittance. Accordingly, desired transmittance can be accurately obtained by applying overdrive voltage which varies depending on the lighting ratio R even with the same original voltage $V_{S1}$. Note that reduction in length of the image display period $\tau_a$ or increase in length of the blanking interval $\tau_b$ is preferably determined in accordance with the control parameters P and Q described in Embodiment Mode 3. This is because when it is estimated by the control parameters P and Q that motion blur is likely to be seen from a state of an image (e.g., the case where movement of an object displayed in the image is large or the case where luminance difference between a background and an object displayed in the image is large) and an environment, driving by which motion blur can be reduced by increasing the length of the blanking interval $\tau_b$ can be realized.

In the blanking interval in the first frame period, it is preferable that the transmittance of the liquid crystal element become transmittance for providing luminance in the blanking interval, at the end of the blanking interval in the first frame period at the latest or at the time close thereto. However, because of characteristics of the liquid crystal element, it is difficult to apply overdrive voltage in a shorter time, which is for reaching transmittance corresponding to voltage applied to the liquid crystal element of approximately 0 V. Thus, at or around the end of the blanking interval in the first frame period, the transmittance of the liquid crystal element is not necessary to be transmittance for providing the luminance in the blanking interval. Instead, it is preferable that transmittance $Tb_{2021}$ at the end of the blanking interval in the first frame period can be estimated from the transmittance $Ta_{2021}$ at the end of the image display period in the first frame period and the length of the blanking interval $\tau_b$.

Note that as shown in FIG. 20C, the blanking interval is further increased in the case where $\tau_a < \tau_b$ is satisfied, so that difference between the transmittance $Tb_{2021}$ at the end of the blanking interval in the first frame period and transmittance providing the luminance in the blanking interval is reduced. Accordingly, the transmittance $Tb_{2021}$ at the end of the blanking interval in the first frame period may be estimated or the estimate may be omitted.

In the image display period in the second frame period, the overdrive voltage $V_{OD2022}$ is applied at or around the end of the image display period in the second frame period so that the transmittance of the liquid crystal element becomes transmittance $Ta_{2022}$ corresponding to the original voltage $V_{S2}$. Thus, the transmittance of the liquid crystal element becomes the transmittance $Ta_{2022}$ at or around the end of the image display period in the second frame period. At this time, the second overdrive intensity is $V_{2022}$, and $V_{2022} = V_{OD2022} - V_{S2}$ is satisfied.

The image display period in the first frame period is different from the image display period in the second frame period in the following ways: the transmittance of the liquid crystal element is the transmittance for providing the luminance in the blanking interval at or around the start of the image display period in the first frame period, whereas the transmittance of the liquid crystal element is not always the transmittance for providing the luminance in the blanking interval at or around the start of the image display period in the second frame period. In that case, the transmittance $Ta_{2022}$ depends on not only the voltage $V_{OD2022}$ applied in the image display period in the second frame period but also the transmittance $Tb_{2021}$ at the end of the blanking interval in the first frame period, so that appropriate transmittance cannot be obtained.

In this case, in the first frame period, the transmittance $Tb_{2021}$ at the end of the blanking interval in the first frame period may be estimated from the transmittance $Ta_{2021}$ at the end of the image display period in the first frame period and the length of the blanking interval $\tau_b$. This is because even when the transmittance of the liquid crystal element is not the transmittance for providing the luminance in the blanking interval at or around the start of the image display period in the second frame period, the transmittance $Tb_{2021}$ at that time is estimated; thus, the voltage $V_{OD2022}$ applied in the image display period in the second frame period can be adjusted in accordance with the level of the transmittance $Tb_{2021}$.

In the driving method of a display device according to this document, it is extremely useful that the second overdrive intensity $V_{2002}$ in the case where $\tau_a = \tau_b = F/2$ is satisfied shown in FIG. 20A and the second overdrive intensity $V_{2022}$ in the case where $\tau_a < \tau_b$ is satisfied shown in FIG. 20C are different and $V_{2002} < V_{2022}$ is satisfied. This is because the image display period $\tau_a$ is shorter in the case where $\tau_a < \tau_b$ is satisfied, so that a shorter period of time needs to be allowed to reach desired transmittance. Accordingly, desired transmittance can be accurately obtained by applying overdrive voltage which varies depending on the lighting ratio R even with the same original voltage $V_{S2}$. Note that reduction in length of the image display period $\tau_a$ or increase in length of the blanking interval $\tau_b$ is preferably determined in accordance with the control parameters P and Q described in Embodiment Mode 3. This is because when it is estimated by the control parameters P and Q that motion blur is likely to be seen from a state of an image (e.g., the case where movement of an object displayed in the image is large or the case where luminance difference between a background and an object displayed in the image is large) and an environment, driving by which motion blur can be reduced by increasing the length of the blanking interval $\tau_b$ can be realized.

In addition, the second overdrive intensity $V_{2022}$ is preferably further increased in the case where $\tau_a < \tau_b$ is satisfied because the transmittance $Tb_{2021}$ at the start of the second frame period is smaller than the transmittance $Tb_{2001}$ at the start of the second frame period in the case where $\tau_a = \tau_b$ is satisfied. That is, the second overdrive intensity $V_{2022}$ in the case where $\tau_a < \tau_b$ is satisfied is preferably larger than the second overdrive intensity $V_{2002}$ in the case where $\tau_a = \tau_b$ is satisfied not only because of reduction in the image display period $\tau_a$ but also because of reduction in the transmittance $Tb_{2021}$ at the start of the second frame period.

In the blanking interval in the second frame period, similar to the blanking interval in the first frame period, it is preferable that transmittance $Tb_{2022}$ at the end of the blanking interval in the second frame period can be estimated from the transmittance $Ta_{2022}$ at the end of the image display period in the second frame period and the length of the blanking interval $\tau_b$. Accordingly, desired transmittance can be accurately obtained also at the end of an image display period in a frame period next to the second frame period.

Note that in the case where $\tau_a < \tau_b$ is satisfied, difference between the transmittance $Tb_{2022}$ at the end of the blanking interval in the second frame period and transmittance providing the luminance in the blanking interval is smaller. Accordingly, the transmittance $Tb_{2022}$ at the end of the blanking interval in the second frame period may be estimated or the estimate may be omitted.

In the method where blanking data is directly written to each pixel, backlight luminance may be changed. For example, when the level of a data signal written to a pixel is the same, luminance which human eyes perceive becomes lower as the image display period $\tau_a$ becomes shorter and the blanking interval $\tau_b$ becomes longer. Accordingly, in accordance with the length of the image display period $\tau_a$ and the length of the blanking interval $\tau_b$ (i.e., the lighting ratio R), the backlight luminance is reduced when the lighting ratio R is high, whereas the backlight luminance is increased when the lighting ratio R is low. Thus, luminance which human eyes perceive can be constant. Further, the lighting ratio R preferably depends on the control parameters P and Q described in Embodiment Mode 3. This is because the lighting ratio R can be controlled as appropriate by perceivability of motion blur in an image to be displayed.

Next, in (2) the method where the whole backlight blinks among the methods of controlling the lighting ratio R, a method where response time of a liquid crystal element is increased is described.

In (2) the method where the whole backlight blinks, a period when data written to a pixel is updated is referred to as one frame period. At this time, in the case where overdrive is used to increase response speed of a liquid crystal element, the overdrive voltage $V_{OD}$ is applied to the liquid crystal element so that the liquid crystal element has desired transmittance at or around the time when one frame period passes after voltage is applied to the liquid crystal element.

However, in (2) the method where the whole backlight blinks, timing when voltage is applied to the liquid crystal element in a backlight lighting period varies depending on a scan position. Accordingly, even when the same overdrive voltage $V_{OD}$ is applied to the liquid crystal element, luminance varies depending on a position of a scan line to which the liquid crystal element is connected. Accordingly, in (2) the method where the whole backlight blinks, it is effective to determine the overdrive voltage $V_{OD}$ in consideration of this point. Further, luminance can be corrected by correcting a gray scale to be displayed depending on a position of a scan line, other than by a method of controlling the overdrive voltage $V_{OD}$.

Figure 21A:
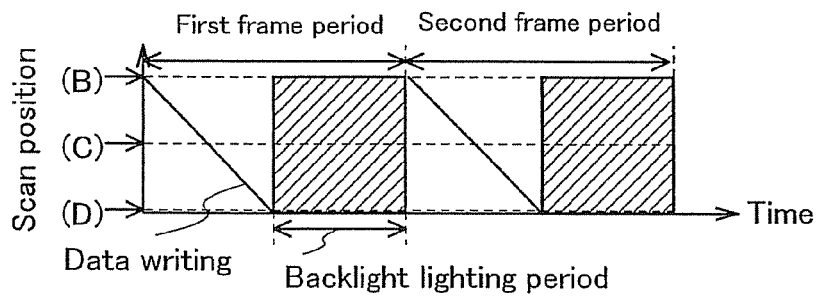
FIGS. 21A to 21D are diagrams each illustrating an example of a timing chart of a semiconductor device in accordance with the present invention.

This is described with reference to FIGS. 21A to 21F. FIG. 21A is a graph showing timing of writing data and timing of blinking the whole backlight on the same time axis with respect to a position of a scan line.

In the method shown in FIG. 21A, at or around the start of one frame period, data writing starts sequentially from a pixel connected to a scan line in the first row. Then, writing to pixels connected to all scan lines ends at or around the time when a half of one frame period passes. Then, the backlight is lit when writing to the pixels connected to all the scan lines ends or at the time close thereto, and the backlight is turned off when one frame period ends or at the time close thereto.

Figure 21B:
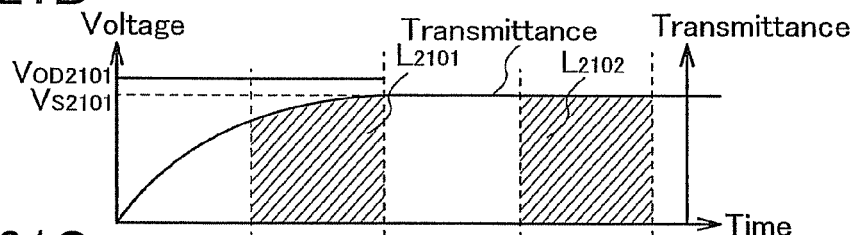

FIG. 21B is a graph showing change in voltage applied to the liquid crystal element and transmittance in the pixel connected to the scan line in the first row (a position described as (B) in FIG. 21A). Note that a time axis of the graph of FIG. 21B corresponds to that of the graph of FIG. 21A. Voltage $V_{OD2101}$ (original voltage $V_{S2101}$) is applied in a first frame period, and the voltage $V_{S2101}$ is applied in a second frame period.

In the first frame period, the transmittance in the graph of FIG. 21B gradually changes from the time when data is written, and the transmittance becomes desired transmittance when one frame period passes or at the time close thereto. At this time, the backlight lighting period starts before change in transmittance ends and the backlight lighting period ends when change in transmittance ends. Here, luminance which human eyes perceive in the first frame period depends on the area of a portion $L_{2101}$ shown by oblique lines in the first frame period.

In the second frame period, the transmittance in the graph of FIG. 21B is already desired transmittance before data is written. At this time, the transmittance dose not change in the backlight lighting period. Luminance which human eyes perceive in the second frame period depends on the area of a portion $L_{2102}$ shown by oblique lines in the second frame period.

Desired luminance for display is the same in the first frame period and the second frame period. However, the area of the oblique line portion $L_{2101}$ and the area of the oblique line portion $L_{2102}$ are different from each other, so that luminance which human eyes perceive is different in the first frame period and the second frame period.

In (2) the method where the whole backlight blinks, the original voltage $V_{S2101}$ in the first frame period may be changed to correct luminance difference between frames. That is, luminance difference between frames can be corrected by correcting gray scale data itself to be written to each pixel. Luminance difference between frames which may cause color shading in displaying a moving image and motion blur can be reduced by the method according to this document.

Figure 23A:
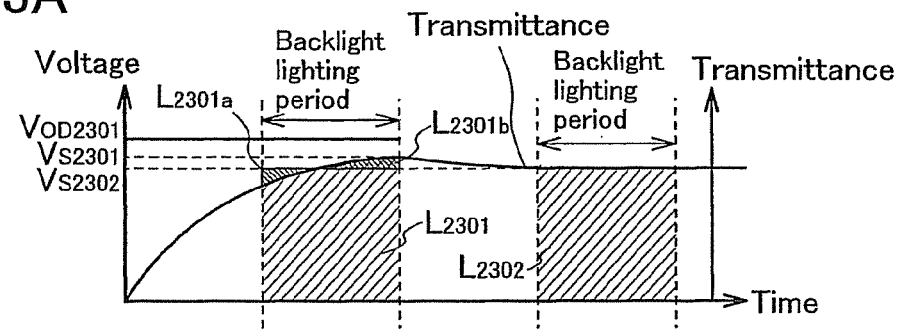
FIGS. 23A to 23D are diagrams each illustrating an example of a timing chart of a semiconductor device in accordance with the present invention.

As a method for correcting data, a method shown in FIG. 23A can be used, for example. In the method shown in FIG. 23A, the original voltage in the first frame period is corrected from $V_{S2302}$ to $V_{S2301}$ in order that the area of oblique line regions $L_{2301}$ and $L_{2302}$, which represent luminance in the first frame period and the second frame period, are the same.

At this time, as overdrive voltage $V_{OD2301}$ written to each pixel, voltage calculated from the original voltage $V_{S2301}$ after correction by using a normal method can be used. By the original voltage $V_{S2302}$ after correction, the area of oblique line region $L_{2301}$ and the area of oblique line region $L_{2302}$ are corrected to be the same. That is, the original voltage $V_{S2301}$ is determined so that the area of two regions $L_{2301a}$ and $L_{2301b}$ which are surrounded by an actual transmittance curve changed by the overdrive voltage $V_{OD2301}$ and a straight line representing transmittance in saturation when the original voltage $V_{S2302}$ is applied have approximately the same area. Note that it is preferable to correct gray scale data so that luminance of a pixel connected to a scan line in which timing of writing is lower becomes higher. That is, it is preferable to increase the amount of correction of the gray scale data gradually in accordance with sequential scanning so that luminance of a pixel connected to a scan line in the last row is the highest.

Description is made with reference to the graph of FIG. 21B again. In (2) the method where the whole backlight blinks, the overdrive voltage $V_{OD2101}$ in the first frame period may be changed in order to correct luminance difference between frames. In general, overdrive voltage is only for making transmittance when next writing starts in a pixel closer to desired transmittance. In the method according to this document, overdrive voltage can also be used for correcting luminance difference between frames. Luminance difference between frames which may cause color shading in displaying a moving image and motion blur can be reduced by the method according to this document.

Figure 23B:
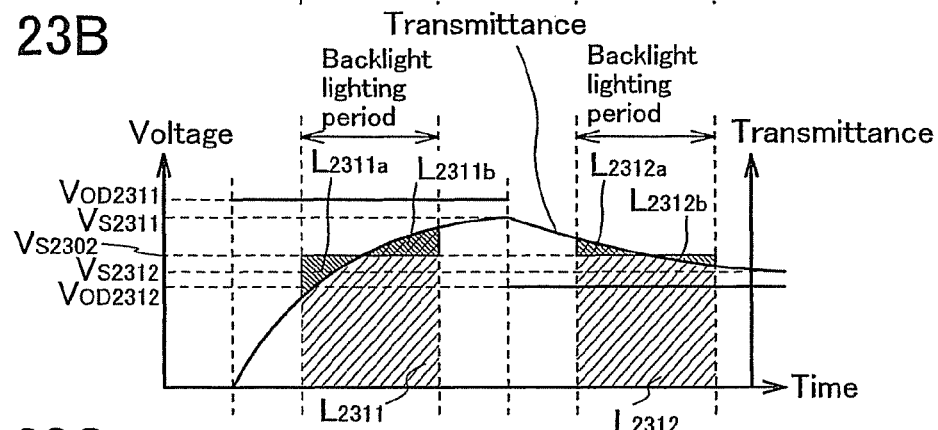
Figure 23C:
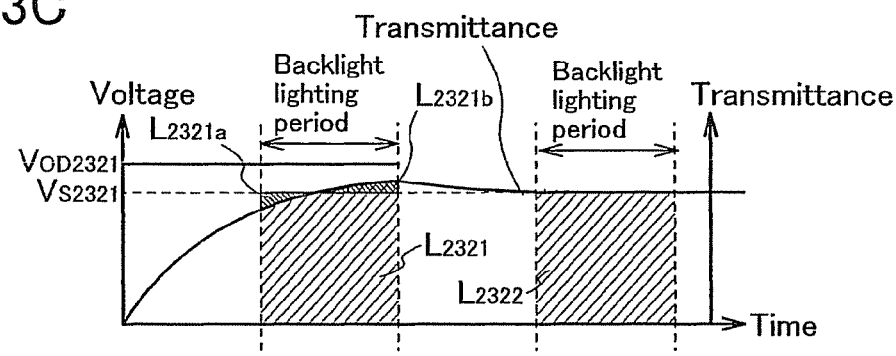

As a method for correcting overdrive voltage, a method shown in FIG. 23C can be used, for example. In the method shown in FIG. 23C, the overdrive voltage is corrected to $V_{OD2321}$ in order that the area of oblique line regions $L_{2321}$ and $L_{2322}$, which represent luminance in the first frame period and the second frame period, are the same. At this time, as the overdrive voltage $V_{OD2321}$, voltage obtained from a special lookup table considering correction can be used. By the overdrive voltage $V_{OD2321}$ after correction, the area of oblique line region $L_{2321}$ and the area of oblique line region $L_{2322}$ are corrected to be the same. That is, the overdrive voltage $V_{OD2321}$ is determined so that the area of two regions $L_{2321a}$ and $L_{2321b}$ which are surrounded by an actual transmittance curve changed by the overdrive voltage $V_{OD2321}$ and a straight line representing transmittance in saturation when original voltage $V_{S2321}$ is applied have approximately the same area. Note that it is preferable to correct overdrive voltage so that luminance of a pixel connected to a scan line in which timing of writing is lower becomes higher. That is, it is preferable to increase the amount of correction of the overdrive voltage gradually in accordance with sequential scanning so that luminance of a pixel connected to a scan line in the last row is the highest.

Figure 21C:
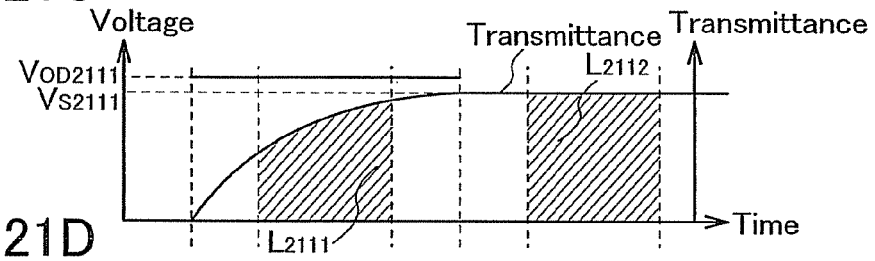

Next, change in voltage applied to a liquid crystal element and transmittance in a pixel connected to the scan line near the center (a position described as (C) in FIG. 21A) is described with reference to the graph shown in FIG. 21C. Note that a time axis of the graph of FIG. 21C corresponds to that of the graph of FIG. 21A. Voltage $V_{OD2111}$ (original voltage $V_{S2111}$) is applied in a first frame period, and the voltage $V_{S2111}$ is applied in a second frame period In the first frame period, the transmittance in the graph of FIG. 21C gradually changes from the time when data is written, and the transmittance becomes desired transmittance when one frame period passes or at the time close thereto. At this time, the backlight lighting period starts before change in transmittance ends and the backlight lighting period ends before change in transmittance ends. Here, luminance which human eyes perceive in the first frame period depends on the area of a portion $L_{2111}$ shown by oblique lines in the first frame period.

Here, since timing when writing starts is different depending on a position of the scan line, it should be noted that the area of the oblique line portion $L_{2111}$ in the first frame period is different from the area of an oblique line portion in the first frame period in another scan line. This is why luminance varies depending on a position of a scan line to which the liquid crystal element is connected even when the same overdrive voltage $V_{OD}$ is applied to the liquid crystal element.

Variation in luminance depending on a scan position is perceived as luminance unevenness in a display portion as it is, so that it is a significant image defect and should be improved with priority. Accordingly, in (2) the method where the whole backlight blinks, the original voltage $V_{S2111}$ in the first frame period may be changed in order to correct luminance difference depending on a scan position. That is, luminance difference depending on a scan position can be corrected by correcting gray scale data itself to be written to each pixel.

As a method for correcting data, a method shown in FIG. 23B can be used, for example. In the method shown in FIG. 23B, the original voltage in the first frame period is corrected from $V_{S2302}$ to $V_{S2311}$ in order that the area of oblique line regions $L_{2311}$ and $L_{2312}$, which represent luminance in the first frame period and the second frame period, are the same and each integrated luminance of pixels connected to a different scan line in the same frame period is the same. At this time, as overdrive voltage $V_{OD2311}$ written to each pixel, voltage calculated from the original voltage $V_{S2311}$ after correction by using a normal method can be used. By the original voltage $V_{S2311}$ after correction, the area of oblique line region $L_{2311}$ and the area of oblique line region $L_{2312}$ are corrected to be the same. That is, the original voltage $V_{S2311}$ is determined so that the areas of two regions $L_{2311a}$ and $L_{2311b}$ which are surrounded by an actual transmittance curve changed by the overdrive voltage $V_{OD2311}$ and a straight line representing transmittance in saturation when the original voltage $V_{S2302}$ is applied are approximately the same. Further, in order to prevent increase in area of the region shown by the oblique lines in the second frame period as the overdrive voltage $V_{OD2311}$ in the first frame period increases, the original voltage in the second frame period may also be corrected in a similar manner. At this time, corrected original voltage is $V_{S2312}$, and overdrive voltage obtained from the corrected original voltage $V_{S2312}$ is $V_{OD2312}$. In the second frame period also, the original voltage $V_{S2312}$ is determined so that the areas of two regions $L_{2311a}$ and $L_{2311b}$ are approximately the same, similarly in the first frame period. Note that it is preferable to correct gray scale data so that luminance of a pixel connected to a scan line in which timing of writing is lower becomes higher. That is, it is preferable to increase the amount of correction of the gray scale data gradually in accordance with sequential scanning so that luminance of a pixel connected to a scan line in the last row is the highest.

Description is made with reference to the graph of FIG. 21C again. In (2) the method where the whole backlight blinks, the overdrive voltage $V_{OD2111}$ in the first frame period may be changed in order to correct luminance difference depending on a scan position. In general, overdrive voltage is only for making transmittance at the start of next writing in a pixel closer to desired transmittance. In the method according to this document, overdrive voltage can also be used for correcting luminance difference depending on a scan position. Accordingly, luminance difference depending on a scan position can be corrected by correcting overdrive voltage for a gray scale to be written to each pixel.

Figure 23D:
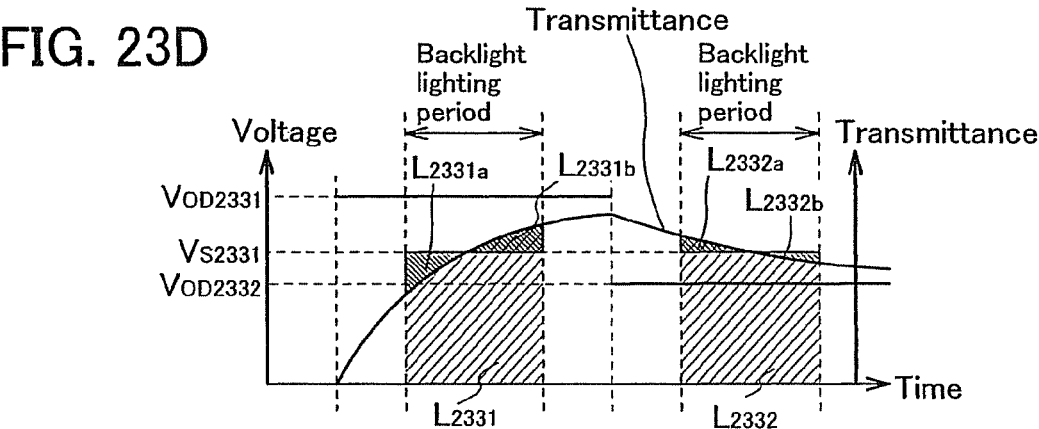

As a method for correcting overdrive voltage, a method shown in FIG. 23D can be used, for example. In the method shown in FIG. 23D, the overdrive voltage in the first frame period is corrected to $V_{OD2331}$ in order that the area of oblique line regions L2331 and L2332, which represent luminance in the first frame period and the second frame period, are the same and each integrated luminance of pixels connected to a different r scan line in the same frame period is the same. At this time, as the overdrive voltage $V_{OD2331}$ which is written to each pixel, voltage obtained from a special lookup table considering correction can be used. By the overdrive voltage $V_{OD2331}$ after correction, the area of oblique line region $L_{2331}$ and the area of oblique line region $L_{2332}$ are corrected to be the same. That is, the overdrive voltage $V_{OD2331}$ is determined so that the areas of two regions $L_{2331a}$ and $L_{2331b}$ which are surrounded by an actual transmittance curve changed by the overdrive voltage $V_{OD2331}$ and a straight line representing transmittance in saturation when original voltage $V_{S2331}$ is applied are approximately the same. Further, in order to prevent increase in area of the region shown by the oblique lines in the second frame period as the overdrive voltage $V_{OD2331}$ in the first frame period increases, the original voltage in the second frame period may also be corrected in a similar manner. At this time, corrected overdrive voltage is $V_{OD2332}$. In the second frame period also, the overdrive voltage $V_{OD2332}$ is determined so that the areas of two regions $L_{2331a}$ and $L_{2331b}$ are approximately the same, similarly in the first frame period. Note that it is preferable to correct gray scale data so that luminance of a pixel connected to a scan line in which timing of writing is lower becomes higher. That is, it is preferable to increase the amount of correction of the gray scale data gradually in accordance with sequential scanning so that luminance of a pixel connected to a scan line in the last row is the highest.

Description is made with reference to the graph of FIG. 21C again. In the second frame period, the transmittance in the graph of FIG. 21C is already desired transmittance before data is written. At this time, the transmittance dose not change in the backlight lighting period. Luminance which human eyes perceive in the second frame period depends on the area of a portion $L_{2112}$ shown by oblique lines in the second frame period.

Desired luminance for display is the same in the first frame period and the second frame period. However, the area of the oblique line portion $L_{2111}$ and the area of the oblique line portion $L_{2112}$ are different from each other, so that luminance which human eyes perceive is different in the first frame period and the second frame period.

In (2) the method where the whole backlight blinks, the original voltage $V_{S2111}$ in the first frame period may be changed to correct luminance difference between frames. That is, luminance difference between frames can be corrected by correcting gray scale data itself to be written to each pixel. Luminance difference between frames which may cause color shading in displaying a moving image and motion blur can be reduced by the method according to this document. As a method for correcting data, the method shown in FIG. 23B can be used.

In addition, in (2) the method where the whole backlight blinks, the overdrive voltage $V_{OD2111}$ in the first frame period may be changed in order to correct luminance difference between frames. In general, overdrive voltage is only for making transmittance when next writing starts in a pixel closer to desired transmittance. In the method according to this document, overdrive voltage can also be used for correcting luminance difference between frames. Luminance difference between frames which may cause color shading in displaying a moving image and motion blur can be reduced by the method according to this document. As a method for correcting overdrive voltage, the method shown in FIG. 23D can be used.

Next, change in voltage applied to a liquid crystal element and transmittance in a pixel connected to the scan line at the bottom (a position described as (D) in FIG. 21A) is described with reference to a graph shown in FIG. 21D. Note that a time axis of the graph of FIG. 21D corresponds to that of the graph of FIG. 21A. Voltage $V_{OD2121}$ (original voltage $V_{S2121}$) is applied in a first frame period, and the voltage $V_{S2121}$ is applied in a second frame period.

Figure 21D:
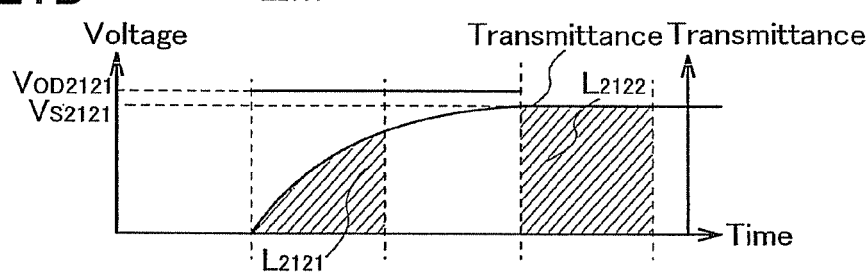

In the first frame period, the transmittance in the graph of FIG. 21D gradually changes from the time when data is written, and the transmittance becomes desired transmittance when one frame period passes or at the time close thereto. At this time, the backlight lighting period starts when change in transmittance starts and the backlight lighting period ends long before change in transmittance ends. Luminance which human eyes perceive in the first frame period depends on the area of a portion $L_{2121}$ shown by oblique lines in the first frame period.

Here, since timing when writing starts is different depending on a position of the scan line, it should be noted that the area of the oblique line portion $L_{2111}$ in the first frame period is different from the area of an oblique line portion in another scan line. This is why luminance varies depending on a position of a scan line to which the liquid crystal element is connected even when the same overdrive voltage $V_{OD}$ is applied to the liquid crystal element.

Variation in luminance depending on a scan position is perceived as luminance unevenness in a display portion as it is, so that it is a significant image defect and should be improved with priority. Therefore, in (2) the method where the whole backlight blinks, the original voltage $V_{S2121}$ in the first frame period may be changed in order to correct luminance difference depending on a scan position. That is, luminance difference depending on a scan position can be corrected by correcting gray scale data itself to be written to each pixel. As a method for correcting data, the method shown in FIG. 23B can be used.

In addition, in (2) the method where the whole backlight blinks, the overdrive voltage $V_{OD2121}$ in the first frame period may be changed in order to correct luminance difference depending on a scan position. In general, overdrive voltage is only for making transmittance when next writing starts in a pixel closer to desired transmittance. In the method according to this document, overdrive voltage can also be used for correcting luminance difference depending on a scan position. Accordingly, luminance difference depending on a scan position can be corrected by correcting overdrive voltage for a gray scale to be written to each pixel. As a method for correcting overdrive voltage, the method shown in FIG. 23D can be used.

Luminance difference depending on a scan position increases as positions of scan lines are distant from each other. Accordingly, both in a method of changing original voltage $V_S$ and in a method of changing overdrive voltage $V_{OD}$, it is effective to increase the amount of change in voltage as the positions of scan lines are distant from each other.

In the second frame period, the transmittance in the graph of FIG. 21D is already desired transmittance before data is written. At this time, the transmittance dose not change in the backlight lighting period. Luminance which human eyes perceive in the second frame period depends on the area of a portion $L_{2122}$ shown by oblique lines in the second frame period.

Desired luminance for display is the same in the first frame period and the second frame period. However, the area of the oblique line portion $L_{2121}$ and the area of the oblique line portion $L_{2122}$ are different from each other, so that luminance which human eyes perceive is different in the first frame period and the second frame period.

In (2) the method where the whole backlight blinks, the original voltage $V_{S2121}$ in the first frame period may be changed to correct luminance difference between frames. That is, luminance difference between frames can be corrected by correcting gray scale data itself to be written to each pixel. Luminance difference between frames which may cause color shading in displaying a moving image and motion blur can be reduced by the method according to this document. As a method for correcting data, the method shown in FIG. 23B can be used.

In addition, in (2) the method where the whole backlight blinks, the overdrive voltage $V_{OD2121}$ in the first frame period may be changed in order to correct luminance difference between frames. In general, overdrive voltage is only for making transmittance when next writing starts in a pixel closer to desired transmittance. In the method according to this document, overdrive voltage can also be used for correcting luminance difference between frames. Luminance difference between frames which may cause color shading in displaying a moving image and motion blur can be reduced by the method according to this document. As a method for correcting overdrive voltage, the method shown in FIG. 23D can be used.

Luminance difference depending on a scan position increases as positions of scan lines are distant from each other. Accordingly, both in a method of changing the original voltage $V_S$ and in a method of changing the overdrive voltage $V_{OD}$, it is effective to increase the amount of change in voltage as the positions of scan lines are distant from each other.

Figure 21E:
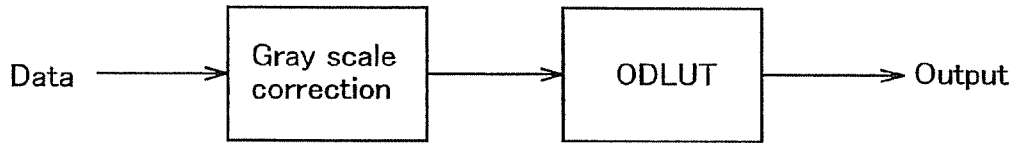
FIGS. 21E and 21F are diagrams each illustrating an example of a driver circuit of a semiconductor device in accordance with the present invention.

Note that the method of changing the original voltage $V_S$ can be realized by the flow of data processing shown in FIG. 21E. First, a gray scale of data input is corrected by a gray scale correction portion which corrects a gray scale depending on a scan position. Thereafter, the corrected data is output to a pixel as the overdrive voltage $V_{OD}$ by a lookup table (ODLUT) which performs normal overdrive.

Figure 21F:
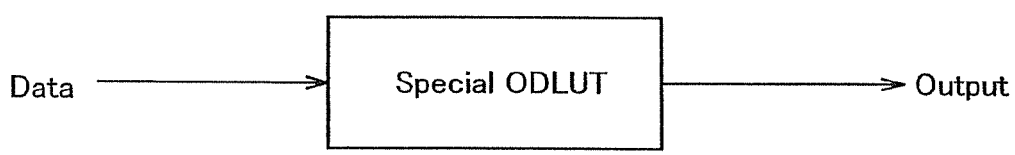

Note that the method of changing the overdrive voltage $V_{OD}$ can be realized by the flow of data processing shown in FIG. 21F. That is, data input is processed by a special lookup table (ODLUT), which can also correct a gray scale depending on a scan position at the same time, and thereafter, is output to a pixel as the overdrive voltage $V_{OD}$.

Next, in (3) the method where a backlight divided into areas sequentially blinks among the methods of controlling the lighting ratio R, a method where response time of a liquid crystal element or the like is increased is described. Note that areas of a backlight in this embodiment mode may be one-dimensionally or two-dimensionally divided. When a backlight is one-dimensionally divided, a linear light source such as a cold cathode fluorescent lamp (CCFL) or a hot cathode fluorescent lamp (HSFL) can be used, and the backlight can be arranged in parallel or perpendicular to a scan line. When a backlight is two-dimensionally divided, a point light source such as an LED or a sheet light source such as EL can be used, and the light source can be arranged in matrix, honeycomb arrangement, Bayer arrangement, or the like. Further, a structure may be employed in which light sources for respective colors such as RGB are provided and the backlight can be controlled for each color.

In the (3) the method where a backlight divided into areas sequentially blinks, a period when data written to a pixel is updated is referred to as one frame period. At this time, in the case where overdrive is used to increase response speed of a liquid crystal element, the overdrive voltage $V_{OD}$ is applied to the liquid crystal element so that the liquid crystal element has desired transmittance at or around the time when one frame period passes after voltage is applied to the liquid crystal element.

However, in (3) the method where a backlight divided into areas sequentially blinks, timing when voltage is applied to the liquid crystal element in a backlight lighting period in the areas varies depending on a scan position. Accordingly, even when the same overdrive voltage $V_{OD}$ is applied to the liquid crystal element, luminance varies depending on a position of a scan line to which the liquid crystal element is connected. Accordingly, in (3) the method where a backlight divided into areas sequentially blinks, it is effective to determine the overdrive voltage $V_{OD}$ in consideration of this point. Further, luminance can be corrected by correcting a gray scale to be displayed depending on a position of a scan line, other than by the method of controlling the overdrive voltage $V_{OD}$.

Large difference between (3) the method where a backlight divided into areas sequentially blinks and (2) the method where the whole backlight blinks is whether there are a plurality of areas with different luminance in a display portion. That is, in (3) the method where a backlight divided into areas sequentially blinks, pixels with different luminance are adjacent to each other at a boundary between a certain area and an area adjacent thereto. Thus, luminance difference in the display portion is extremely easily perceived. That is, luminance difference depending on a scan position in (3) the method where a backlight divided into areas sequentially blinks causes more serious image quality degradation than luminance difference depending on a scan position in (2) the method where the whole backlight blinks. Accordingly, the method according to this document in (3) the method where a backlight divided into areas sequentially blinks is very effective in improving image quality.

Figure 22A:
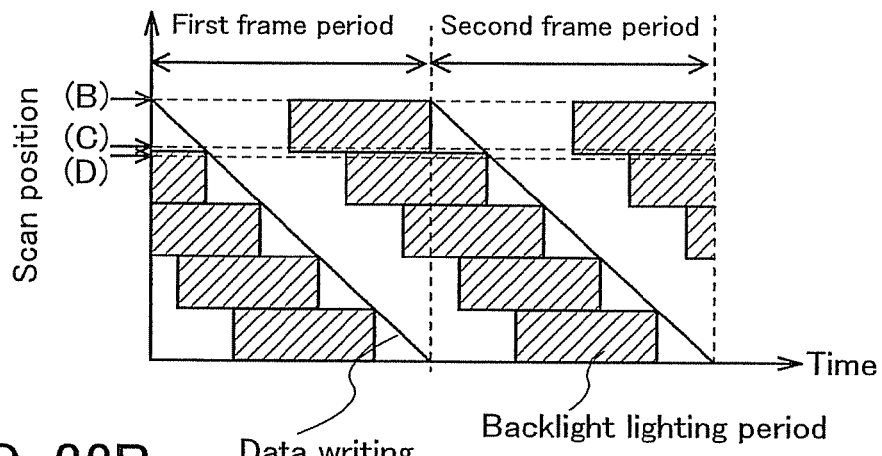
FIGS. 22A to 22D are diagrams each illustrating an example of a timing chart of a semiconductor device in accordance with the present invention.

This is described with reference to FIGS. 22A to 22D. FIG. 22A is a graph showing timing of writing data with respect to a position of a scan line and timing of sequentially blinking a backlight divided into areas on the same time axis.

In a method shown in FIG. 22A, at or around the start of one frame period, data writing starts sequentially from a pixel connected to a scan line in the first row. Then, the top area of the backlight is lit at or around the time when a half of one frame period passes. Thereafter, the backlight in each area sequentially starts lighting while the other pixels are sequentially scanned and data is written to the pixels. Then, the top area of the backlight is turned off when one frame period ends or at the time close thereto. After that, the backlight in each area is sequentially turned off while writing and scanning of next frame start and data is written to pixels from the top.

Figure 22B:
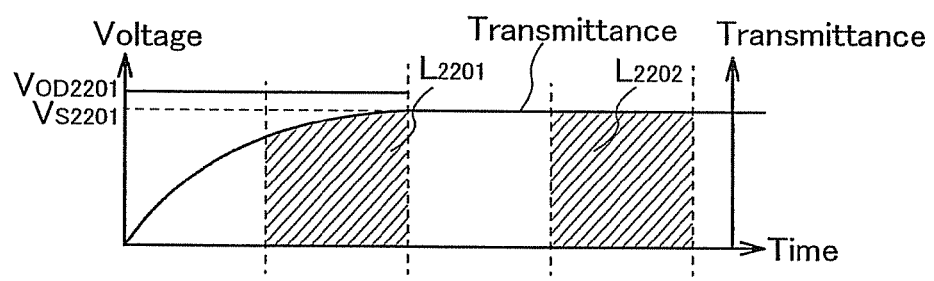

FIG. 22B is a graph showing change in voltage applied to the liquid crystal element and transmittance in the pixel connected to the scan line in the first row (a position described as (B) in FIG. 22A). Note that a time axis of the graph of FIG. 22B corresponds to that of the graph of FIG. 22A. Voltage $V_{OD2201}$ (original voltage $V_{S2201}$) is applied in a first frame period, and the voltage $V_{S2201}$ is applied in a second frame period.

In the first frame period, the transmittance in the graph of FIG. 22B gradually changes from the time when data is written, and the transmittance becomes desired transmittance when one frame period passes or at the time close thereto. At this time, the backlight lighting period starts before change in transmittance ends and the backlight lighting period ends when change in transmittance ends. Here, luminance which human eyes perceive in the first frame period depends on the area of a portion $L_{2201}$ shown by oblique lines in the first frame period.

In the second frame period, the transmittance in the graph of FIG. 22B is already desired transmittance before data is written. At this time, the transmittance dose not change in the backlight lighting period. Luminance which human eyes perceive in the second frame period depends on the area of a portion $L_{2202}$ shown by oblique lines in the second frame period.

Desired luminance for display is the same in the first frame period and the second frame period. However, the area of the oblique line portion $L_{2201}$ and the area of the oblique line portion $L_{2202}$ are different from each other, so that luminance which human eyes perceive is different in the first frame period and the second frame period.

In (3) the method where a backlight divided into areas sequentially blinks, the original voltage $V_{S2201}$ in the first frame period may be changed to correct luminance difference between frames. That is, luminance difference between frames can be corrected by correcting gray scale data itself to be written to each pixel. Luminance difference between frames which may cause color shading in displaying a moving image and motion blur can be reduced by the method according to this document. As a method for correcting data, the method shown in FIG. 23A can be used.

In addition, in (3) the method where a backlight divided into areas sequentially blinks, the overdrive voltage $V_{OD2201}$ in the first frame period may be changed in order to correct luminance difference between frames. In general, overdrive voltage is only for making transmittance when next writing starts in a pixel closer to desired transmittance. In the method according to this document, overdrive voltage can also be used for correcting luminance difference between frames. Luminance difference between frames which may cause color shading in displaying a moving image and motion blur can be reduced by the method according to this document. As a method for correcting overdrive voltage, the method shown in FIG. 23C can be used.

Next, change in voltage applied to a liquid crystal element and transmittance in a pixel connected to the scan line at the bottom (a position described as (C) in FIG. 22A) among pixels belonging to the top area of the backlight is described with reference to a graph shown in FIG. 22C. Note that a time axis of the graph of FIG. 22C corresponds to that of the graph of FIG. 22A. Voltage $V_{OD2211}$ (original voltage $V_{S2211}$) is applied in a first frame period, and the voltage $V_{S2211}$ is applied in a second frame period.

Figure 22C:
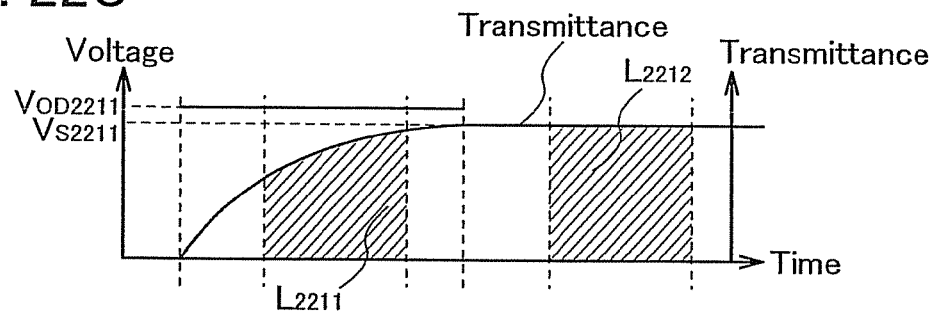

In the first frame period, the transmittance in the graph of FIG. 22C gradually changes from the time when data is written, and the transmittance becomes desired transmittance when one frame period passes or at the time close thereto. At this time, the backlight lighting period starts before change in transmittance ends and the backlight lighting period ends before change in transmittance ends. Further, luminance which human eyes perceive in the first frame period depends on the area of a portion $L_{2211}$ shown by oblique lines in the first frame period.

Here, since timing when writing starts is different depending on a position of the scan line, it should be noted that the area of the oblique line portion $L_{2211}$ in the first frame period is different from the area of an oblique line portion in another scan line belonging to the same area. This is why luminance varies depending on a position of a scan line to which the liquid crystal element is connected even when the same overdrive voltage $V_{OD}$ is applied to the liquid crystal element.

Variation in luminance depending on a scan position is perceived as luminance unevenness in a display portion as it is, so that it is a significant image defect and should be improved with priority. Accordingly, in (3) the method where a backlight divided into areas sequentially blinks, the original voltage $V_{S2211}$ in the first frame period may be changed in order to correct luminance difference depending on a scan position. That is, luminance difference depending on a scan position can be corrected by correcting gray scale data itself to be written to each pixel. As a method for correcting data, the method shown in FIG. 23B can be used.

In addition, in (3) the method where a backlight divided into areas sequentially blinks, the overdrive voltage $V_{OD2211}$ in the first frame period may be changed in order to correct luminance difference depending on a scan position. In general, overdrive voltage is only for making transmittance when next writing starts in a pixel closer to desired transmittance. In the method according to this document, overdrive voltage can also be used for correcting luminance difference depending on a scan position. Accordingly, luminance difference depending on a scan position can be corrected by correcting gray scale data itself to be written to each pixel. As a method for correcting overdrive voltage, the method shown in FIG. 23D can be used.

In the second frame period, the transmittance in the graph of FIG. 22C is already desired transmittance before data is written. At this time, the transmittance dose not change in the backlight lighting period. Luminance which human eyes perceive in the second frame period depends on the area of a portion $L_{2212}$ shown by oblique lines in the second frame period.

Desired luminance for display is the same in the first frame period and the second frame period. However, the area of the oblique line portion $L_{2211}$ and the area of the oblique line portion $L_{2212}$ are different from each other, so that luminance which human eyes perceive is different in the first frame period and the second frame period.

In (3) the method where a backlight divided into areas sequentially blinks, the original voltage $V_{S2211}$ in the first frame period may be changed to correct luminance difference between frames. That is, luminance difference between frames can be corrected by correcting gray scale data itself to be written to each pixel. Luminance difference between frames which may cause color shading in displaying a moving image and motion blur can be reduced by the method according to this document. As a method for correcting data, the method shown in FIG. 23B can be used.

In addition, in (3) the method where a backlight divided into areas sequentially blinks, the overdrive voltage $V_{OD2211}$ in the first frame period may be changed in order to correct luminance difference between frames. In general, overdrive voltage is only for making transmittance when next writing starts in a pixel closer to desired transmittance. In the method according to this document, overdrive voltage can also be used for correcting luminance difference between frames. Luminance difference between frames which may cause color shading in displaying a moving image and motion blur can be reduced by the method according to this document. As a method for correcting overdrive voltage, the method shown in FIG. 23D can be used.

Next, change in voltage applied to a liquid crystal element and transmittance in a pixel connected to the scan line in the first row (a position described as (D) in FIG. 22A) among pixels belonging to the second top area of the backlight is described with reference to a graph shown in FIG. 22D. Note that a time axis of the graph of FIG. 22D corresponds to that of the graph of FIG. 22A. Voltage $V_{OD2221}$ (original voltage $V_{S2221}$) is applied in a first frame period, and the voltage $V_{S2221}$ is applied in a second frame period.

Figure 22D:
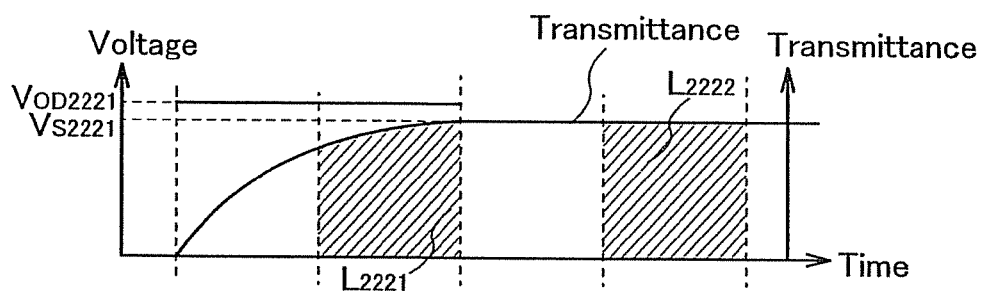

In the first frame period, the transmittance in the graph of FIG. 22D gradually changes from the time when data is written, and the transmittance becomes desired transmittance when one frame period passes or at the time close thereto. At this time, the backlight lighting period starts before change in transmittance ends and the backlight lighting period ends when change in transmittance ends. Here, luminance which human eyes perceive in the first frame period depends on the area of a portion $L_{2221}$ shown by oblique lines in the first frame period.

In the second frame period, the transmittance in the graph of FIG. 22D is already desired transmittance before data is written. At this time, the transmittance dose not change in the backlight lighting period. Luminance which human eyes perceive in the second frame period depends on the area of a portion $L_{2222}$ shown by oblique lines in the second frame period.

Desired luminance for display is the same in the first frame period and the second frame period. However, the area of the oblique line portion $L_{2221}$ and the area of the oblique line portion $L_{2222}$ are different from each other, so that luminance which human eyes perceive is different in the first frame period and the second frame period.

In (3) the method where a backlight divided into areas sequentially blinks, the original voltage $V_{S2221}$ in the first frame period may be changed to correct luminance difference between frames. That is, luminance difference between frames can be corrected by correcting gray scale data itself to be written to each pixel. Luminance difference between frames which may cause color shading in displaying a moving image and motion blur can be reduced by the method according to this document. As a method for correcting data, the method shown in FIG. 23A can be used.

In addition, in (3) the method where a backlight divided into areas sequentially blinks, the overdrive voltage $V_{OD2221}$ in the first frame period may be changed in order to correct luminance difference between frames. In general, overdrive voltage is only for making transmittance when next writing starts in a pixel closer to desired transmittance. In the method according to this document, overdrive voltage can also be used for correcting luminance difference between frames. Luminance difference between frames which may cause color shading in displaying a moving image and motion blur can be reduced by the method according to this document. As a method for correcting overdrive voltage, the method shown in FIG. 23C can be used.

As described above, in the pixel shown in FIG. 22B, which is connected to the scan line in the first row (the position described as (B) in FIG. 22A) in the top area, and the pixel shown in FIG. 22D, which is connected to the scan line in the first row (the position described as (D) in FIG. 22A) in the second top area, timing when voltage is written is different; however, the length of the time from when voltage is written to when a backlight lighting period starts is the same. Accordingly, the areas of both of the oblique line portions ($L_{2201}$ and $L_{2221}$), which represent integrated luminance, are equal, so that luminance of both pixels which human eyes perceive is equal.

That is, it can be said that luminance which human eyes perceive is determined by the time from when voltage is written to when a backlight lighting period starts. The luminance which human eyes perceive is increased as time from when voltage is written to when a backlight lighting period starts is longer, whereas the luminance which human eyes perceive is decreased as the time from when voltage is written to when a backlight lighting period starts is shorter.

Here, in the example of FIGS. 21A to 21D, which describe (2) the method where the whole backlight blinks, time from when voltage is written to when a backlight lighting period starts in the scan line in the first row is a half of one frame period, whereas time from when voltage is written to when a backlight lighting period starts in the scan line at the bottom is approximately 0. That is, in the example of FIGS. 21A to 21D, which describe (2) the method where the whole backlight blinks, the maximum length of the time between when voltage is written and when a backlight lighting period starts is a half of one frame period.

On the other hand, in the example of FIGS. 22A to 22D, which describe (3) the method where a backlight divided into areas sequentially blinks, the maximum length of the time from when voltage is written to when a backlight lighting period starts is a half of one frame period, which is the same as the example of FIGS. 21A to 21D, which describe (2) the method where the whole backlight blinks. Meanwhile, even when the time from when voltage is written to when a backlight lighting period starts is the shortest (in the scan line at the bottom in each area), it does not become 0. Accordingly, in the example of FIGS. 22A to 22D, which describe (3) the method where a backlight divided into areas sequentially blinks, the maximum value of difference between when voltage is written and when a backlight lighting period starts is less than a half of one frame period.

Accordingly, when the lighting ratio R is the same in (2) the method where the whole backlight blinks and (3) the method where a backlight divided into areas sequentially blinks, (3) the method where a backlight divided into areas sequentially blinks has a smaller maximum value of luminance difference depending on a scan position.

However, as a factor in deciding image quality of a display device, not only the maximum value of luminance difference depending on a scan position but also a distribution of luminance difference is important. In the example of FIGS. 21A to 21F, which describe (2) the method where the whole backlight blinks, the maximum value of luminance difference depending on a scan position is large, and a distribution of luminance difference is gradual. Thus, luminance difference gently appears in the whole image. For example, when display is performed with uniform luminance in all of pixels and after that, the same amount of luminance is changed in all of the pixels all at once, luminance difference with gradation from an upper side to a lower side of a display portion is observed in a transient state.

On the other hand, in the example of FIG. 22A to 22D, which describe (3) the method where a backlight divided into areas sequentially blinks, the maximum value of luminance difference depending on a scan position is small, and a distribution of luminance difference is sharp at a boundary between different areas. Further, a distribution of luminance difference within each area is gradual. For example, when display is performed with uniform luminance in all of pixels and after that, the same amount of luminance is changed in all of the pixels all at once, luminance difference with gradation from an upper side to a lower side of each area appears in a transient state. The luminance difference with gradation is the same in each area. Accordingly, sharp luminance difference appears at a boundary of each area. The sharp luminance difference can be extremely easily perceived as compared with the case where luminance difference with gradation appears in the whole display portion, and thus causes significant reduction in image quality.

By the method according to this document, a problem of reduction in image quality in (3) the method where a backlight divided into areas sequentially blinks can be reduced. The original voltage $V_S$ may be changed in order to correct luminance difference depending on a scan position. That is, luminance difference depending on a scan position can be corrected by correcting gray scale data itself to be written to each pixel. In particular, the amount of correction of original voltage in a pixel to which data is written at the end of each area is made to be the largest in the area to which the pixel belongs, so that sharp luminance difference at a boundary of areas can be corrected.

In addition, the overdrive voltage $V_{OD}$ may be changed in order to correct luminance difference depending on a scan position. In general, overdrive voltage is only for making transmittance when next writing starts in a pixel closer to desired transmittance. In the method according to this document, overdrive voltage can also be used for correcting luminance difference depending on a scan position. Accordingly, luminance difference depending on a scan position can be corrected by correcting gray scale data itself to be written to each pixel. In particular, the amount of correction of overdrive voltage in a pixel to which data is written at the end of each area is made to be the largest in the area to which the pixel belongs, so that sharp luminance difference at a boundary of areas can be corrected.

Next, in a method of changing the lighting ratio R which is one of methods of controlling a display device according to this document, a method of controlling a display device in frame periods before and after the lighting ratio R is changed is described in detail. Here, as described in Embodiment Modes 1 and 2, changing the lighting ratio R refers to changing the length of the blanking interval $\tau_b$ as appropriate. Further, driving in accordance with a state of an image and an environment can be realized by changing the length of the blanking interval $\tau_b$ in accordance with the control parameters P and Q described in Embodiment Mode 3. For example, in the case such that movement of an object displayed in an image is large or where luminance difference between a background and an object displayed in an image is large, motion blur is likely to be seen. Motion blur can be reduced by increasing the length of the blanking interval $\tau_b$. In addition, in the case such that movement of an object displayed in an image is small or where luminance difference between a background and an object displayed in an image is small, motion blur is not likely to be seen. Accordingly, a flicker can be reduced by reducing the length of the blanking interval $\tau_b$. Note that here described is a purpose of preventing luminance which human eyes perceive from being changed in frame periods before and after the lighting ratio R is changed, even when the lighting ratio R is changed.

Methods for preventing luminance which human eyes perceive from being changed in frame periods before and after the lighting ratio R is changed are broadly classified into two methods: a method where voltage written to a pixel is controlled under a condition that backlight luminance is constant when a backlight is lit; and a method where backlight luminance is changed.

In each method, a controlling method of a display device is different depending on a method for providing the blanking interval $\tau_b$ (a method of controlling the lighting ratio R). Accordingly, in this document, the case where a method of controlling the lighting ratio R is different in each method is also individually described in detail.

Note that as the method for providing the blanking interval $\tau_b$ (the method of controlling the lighting ratio R), (1) a method where blanking data is directly written to each pixel, (2) a method where the whole backlight blinks, (3) a method where a backlight divided into areas sequentially blinks, and a combination of these methods can be used.

First, the case of using (1) the method where blanking data is directly written to each pixel among the methods where voltage written to a pixel is controlled under a condition that backlight luminance is constant when a backlight is lit is described with reference to FIGS. 24A and 24B.

Figure 24A:
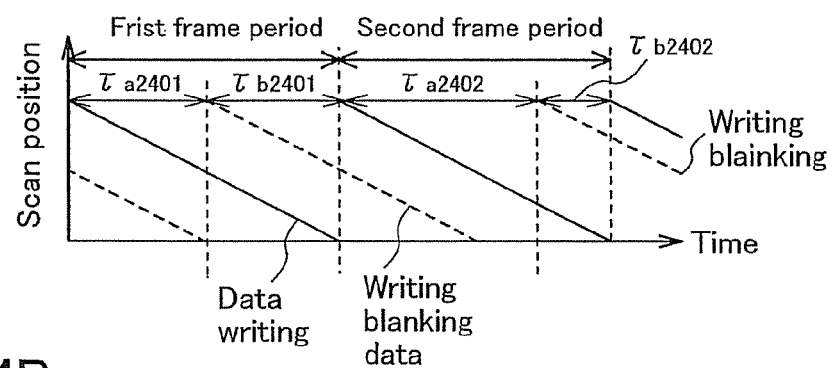
FIGS. 24A and 24B are diagrams each illustrating an example of a timing chart of a semiconductor device in accordance with the present invention.

FIG. 24A is a graph showing timing of writing data and timing of writing blanking data on the same time axis with respect to a position of a scan line when the lighting ratio R is different in the first frame period and the second frame period. Here, for explanation, an image display period and a blanking interval in the first frame period are denoted by $\tau_{a2401}$ and $\tau_{b2401}$, and an image display period and a blanking interval in the second frame period are denoted by $\tau_{a2402}$ and $\tau_{b2402}$.

Figure 24B:
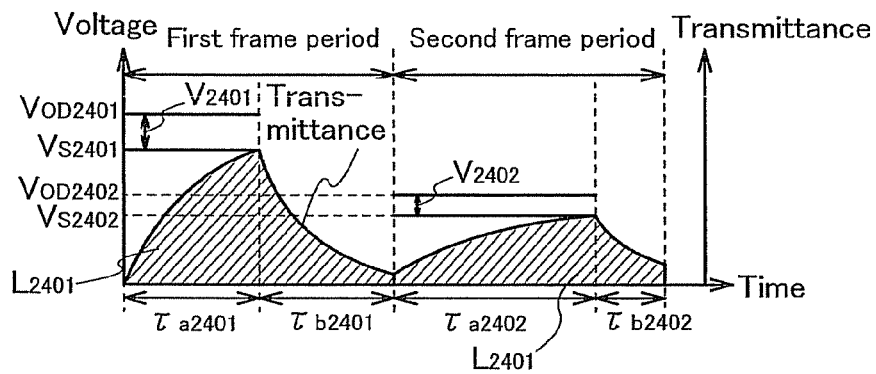

FIG. 24B is a graph showing original voltages $V_{S2401}$ and $V_{S2402}$ and overdrive voltages $V_{OD2401}$ and $V_{OD2402}$ written to each pixel, and transmittance with respect to each voltage on the same time axis when the lighting ratio R is different in the first frame period and the second frame period. Here, the image display period and the blanking interval in the first frame period and the image display period and the blanking interval in the second frame period are similar to those in FIG. 24A. Each area of oblique line regions $L_{2401}$ and $L_{2402}$ represents the level of luminance which human eyes perceive (integrated luminance). Each of voltage $V_{2401}$ and voltage $V_{2402}$ is overdrive intensity in the image display periods in the first frame period and the second frame period, and $V_{2401}=V_{OD2401}-V_{S2401}$ and $V_{2402}=V_{OD2402}-V_{S2402}$ are satisfied.

In the case of using (1) the method where blanking data is directly written to each pixel among the methods where voltage written to a pixel is controlled under a condition that backlight luminance when the backlight is lit is constant before and after the lighting ratio R is changed, driving can be realized by changing timing of writing blanking data in the first frame period and the second frame period, as shown in FIG. 24A. In addition, a relation between the voltage written to each pixel at this time and transmittance can be understood with reference to FIG. 24B.

When the overdrive voltage $V_{OD2401}$ is applied to each pixel at or around the start of the image display period in the first frame period, transmittance of a display element becomes transmittance corresponding to the original voltage $V_{S2401}$ at the time when the image display period in the first frame period ends or at the time close thereto. Thereafter, blanking writing is performed. Thus, integrated luminance in the first frame period is represented by the area of the oblique line region $L_{2401}$.

Then, when the overdrive voltage $V_{OD2402}$ is applied to each pixel at or around the start of the image display period in the second frame period, the transmittance of the display element becomes transmittance corresponding to the original voltage $V_{S2402}$ at the time when the image display period in the second frame period ends or at the time close thereto. Thereafter, blanking writing is performed. Thus, integrated luminance in the second frame period is represented by the area of the oblique line region $L_{2402}$.

At this time, it is important that values of the voltages applied to a pixel vary in the first frame period and the second frame period. That is, in the case where the lighting ratio R is changed under a condition that backlight luminance is constant when a backlight is lit, it is preferable to write different voltage in the first frame period and the second frame period, not the same voltage, if luminance of the pixel which human eyes perceive is not desired to be changed.

Accordingly, in one of methods according to this document, the original voltage and the overdrive voltage are changed in accordance with the lighting ratio R in order that the area of the oblique line region $L_{2401}$ in the first frame period and the area of the oblique line region $L_{2402}$ in the second frame period are approximately the same. Specifically, it is preferable to reduce the original voltage and the overdrive voltage as the lighting ratio R increases. In addition, in one of the methods according to this document, the overdrive intensity $V_{2401}$ in the first frame period and the overdrive intensity $V_{2402}$ in the second frame period may be changed in accordance with the lighting ratio R. Specifically, it is preferable to reduce the overdrive intensity as the lighting ratio R increases. This is because increase in the lighting ratio R means increase in length of the image display period $\tau_a$, and increase in length of the image display period $\tau_a$ can be allowed to have a longer period of time for reaching intended transmittance of a liquid crystal element. Moreover, when the length of the image display period $\tau_a$ is increased, intended transmittance of a liquid crystal element itself can be reduced, so that the original voltage $V_S$ is reduced, and further, the overdrive intensity can be reduced.

By driving a display device in such a manner, backlight luminance can be constant even in the case where luminance of the pixel which human eyes perceive is not desired to be changed when the lighting ratio R is changed. Thus, a structure of a circuit for driving a backlight is simplified, so that manufacturing cost can be reduced. Further, luminance unevenness and a flicker in displaying an image can be reduced. Moreover, provision of the blanking interval $\tau_b$ can reduce motion blur, and image quality of a moving image can be improved.

Next, the case of using (2) the method where the whole backlight blinks among the methods where voltage written to a pixel is controlled under a condition that backlight luminance is constant when the backlight is lit is described with reference to FIGS. 25A to 25C.

Figure 25A:
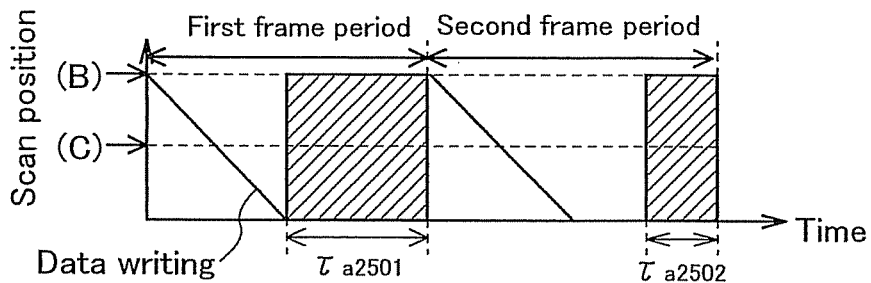
FIGS. 25A to 25C are diagrams each illustrating an example of a timing chart of a semiconductor device in accordance with the present invention.

FIG. 25A is a graph showing timing of writing data and timing of blinking a backlight on the same time axis with respect to a position of a scan line when the lighting ratio R is different in the first frame period and the second frame period. Here, for explanation, a backlight lighting period in the first frame period is denoted by $\tau_{a2501}$, and a backlight lighting period in the second frame period is denoted by $\tau_{a2502}$.

Figure 25B:
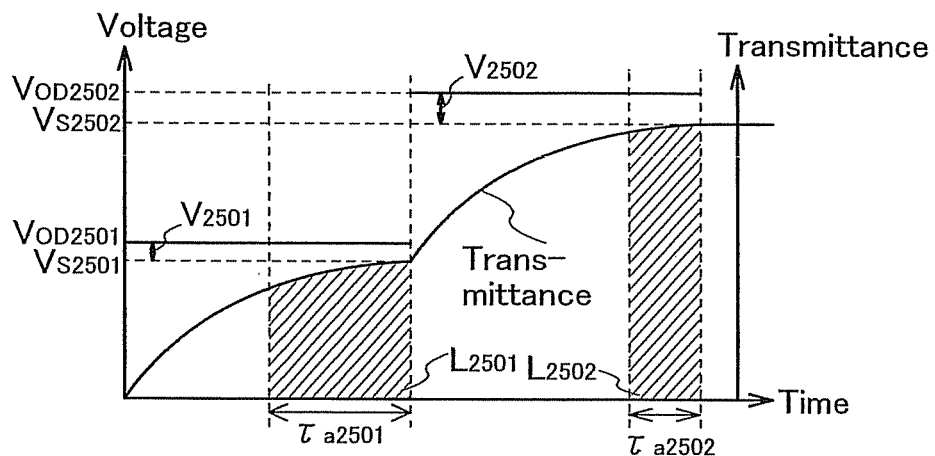

FIG. 25B is a graph showing original voltages $V_{S2501}$ and $V_{S2502}$ and overdrive voltages $V_{OD2501}$ and $V_{OD2502}$ written to each pixel, and transmittance with respect to each voltage on the same time axis when the lighting ratio R is different in the first frame period and the second frame period. Here, the backlight lighting periods in the first frame period and the second frame period are similar to those in FIG. 25A. Each area of oblique line regions $l_{2501}$ and $l_{2502}$ represents the level of luminance which human eyes perceive (integrated luminance). Each of voltage $V_{2501}$ and voltage $V_{2502}$ is overdrive intensity in the first frame period and the second frame period, and $V_{2501}=V_{OD2501}-V_{S2501}$ and $V_{2502}=V_{OD2502}-V_{S2502}$ are satisfied.

In the case of using (2) the method where the whole backlight blinks among the methods where voltage written to a pixel is controlled under a condition that backlight luminance is constant when the backlight is lit before and after the lighting ratio R is changed, driving can be realized by changing the length and timing of the backlight lighting period in the first frame period and the second frame period, as shown in FIG. 25A. In addition, a relation between the voltage written to each pixel at this time and transmittance can be understood with reference to FIG. 25B.

When the overdrive voltage $V_{OD2501}$ is written to a pixel by data writing scanning in the first frame period, transmittance of a display element becomes transmittance corresponding to the original voltage $V_{S2501}$ at the time when the next data is written by data writing scanning in the second frame period or at the time close thereto. In that period, a backlight lighting period is provided in all pixels all at once. Thus, integrated luminance in the first frame period is represented by the area of the oblique line region $L_{2501}$, which is surrounded by the backlight lighting period and the transmittance.

Then, when the overdrive voltage $V_{OD2502}$ is written to the pixel by data writing scanning in the second frame period, the transmittance of the display element becomes transmittance corresponding to the original voltage $V_{S2502}$ at the time when the next data is written by data writing scanning in the next frame period or at the time close thereto. In that period, a backlight lighting period is provided in all the pixels all at once. Thus, integrated luminance in the second frame period is represented by the area of the oblique line region $L_{2502}$, which is surrounded by the backlight lighting period and the transmittance.

At this time, it is important that values of the voltages applied to a pixel vary in the first frame period and the second frame period. That is, in the case where the lighting ratio R is changed under a condition that backlight luminance is constant when a backlight is lit, it is preferable to write different voltage in the first frame period and the second frame period, not the same voltage, if luminance of the pixel which human eyes perceive is not desired to be changed.

Accordingly, in one of methods according to this document, the original voltage and the overdrive voltage are changed in accordance with the lighting ratio R in order that the area of the oblique line region $L_{2501}$ in the first frame period and the area of the oblique line region $L_{2502}$ in the second frame period are approximately the same. Specifically, it is preferable to reduce the original voltage and the overdrive voltage as the lighting ratio R increases. In addition, in one of the methods according to this document, the overdrive intensity $V_{2501}$ in the first frame period and the overdrive intensity $V_{2502}$ in the second frame period may be changed in accordance with the lighting ratio R. Specifically, it is preferable to reduce the overdrive intensity as the lighting ratio R increases. This is because increase in the lighting ratio R means increase in length of the image display period $\tau_a$, and increase in length of the image display period $\tau_a$ can be allowed to have a longer period of time for reaching intended transmittance of a liquid crystal element. Moreover, when the length of the image display period $\tau_a$ is increased, intended transmittance of a liquid crystal element itself can be reduced, so that the original voltage $V_S$ is reduced, and further, the overdrive intensity can be reduced.

By driving a display device in such a manner, backlight luminance can be constant even in the case where luminance of the pixel which human eyes perceive is not desired to be changed when the lighting ratio R is changed. Thus, a structure of a circuit for driving a backlight is simplified, so that manufacturing cost can be reduced. Further, luminance unevenness and a flicker in displaying an image can be reduced. Moreover, provision of the blanking interval $\tau_b$ can reduce motion blur, and image quality of a moving image can be improved.

Figure 25C:
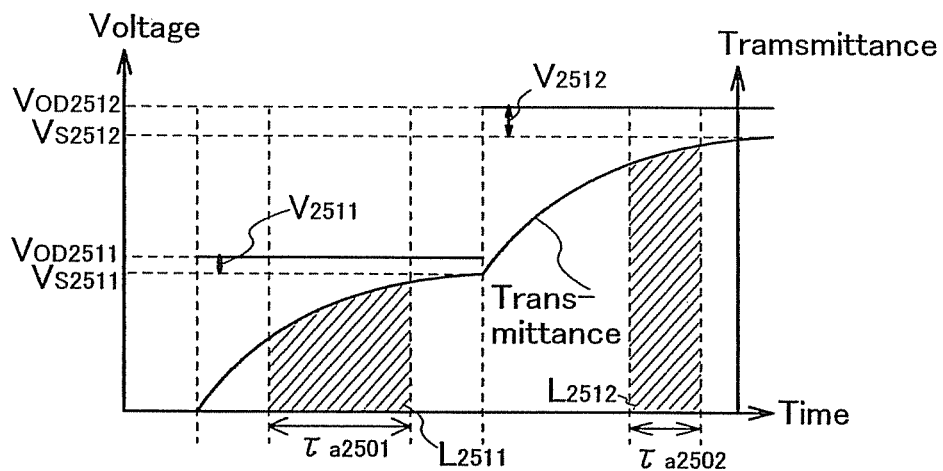

FIG. 25C is a graph showing original voltages $V_{S2511}$ and $V_{S2512}$ and overdrive voltages $V_{OD2511}$ and $V_{OD2512}$ written to each pixel, and transmittance with respect to each voltage on the same time axis in a pixel connected to a scan line different from that shown in FIG. 25B when the lighting ratio R is different in the first frame period and the second frame period. Here, the backlight lighting periods in the first frame period and the second frame period are similar to those in FIG. 25A. Each area of oblique line regions $L_{2511}$ and $L_{2512}$ represents the level of luminance which human eyes perceive (integrated luminance). Each of voltage $V_{2511}$ and voltage $V_{2512}$ is overdrive intensity in the first frame period and the second frame period, and $V_{2511}=V_{OD2511}-V_{S2511}$ and $V_{2512}=V_{OD2512}-V_{S2512}$ are satisfied.

Although details of a controlling method shown in FIG. 25C are similar to those shown in FIG. 25B, the length of time from when data is written to when a backlight lighting period starts is different. Thus, each area of the oblique line regions $L_{2511}$ and $L_{2512}$, which represents integrated luminance, is different from each area of the oblique line regions $L_{2501}$ and $L_{2502}$ in FIG. 25B. Accordingly, the original voltage and overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Next, the case of using (3) the method where a backlight divided into areas sequentially blinks among the methods where voltage written to a pixel is controlled under a condition that backlight luminance is constant when the backlight is lit is described with reference to FIGS. 26A to 26C.

Figure 26A:
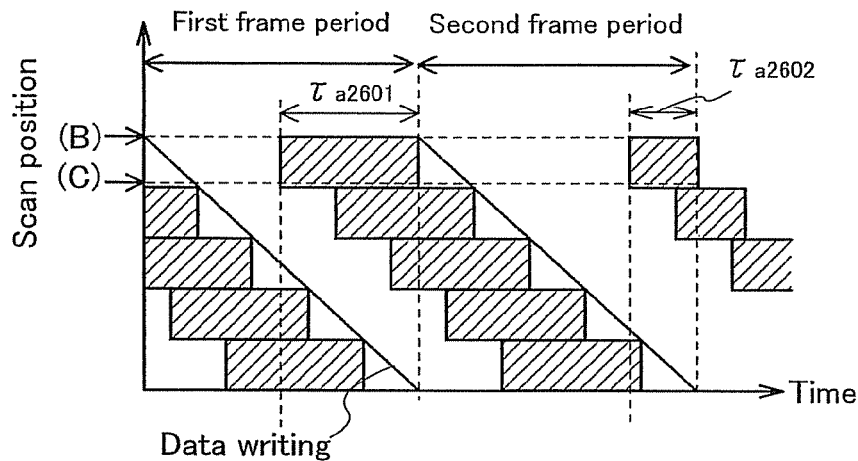
FIGS. 26A to 26C are diagrams each illustrating an example of a timing chart of a semiconductor device in accordance with the present invention.

FIG. 26A is a graph showing timing of writing data and timing of sequentially blinking a backlight on the same time axis with respect to a position of a scan line when the lighting ratio R is different in the first frame period and the second frame period. Here, for explanation, a backlight lighting period in the first frame period is denoted by $\tau_{a2601}$, and a backlight lighting period in the second frame period is denoted by $\tau_{a2602}$.

Figure 26B:
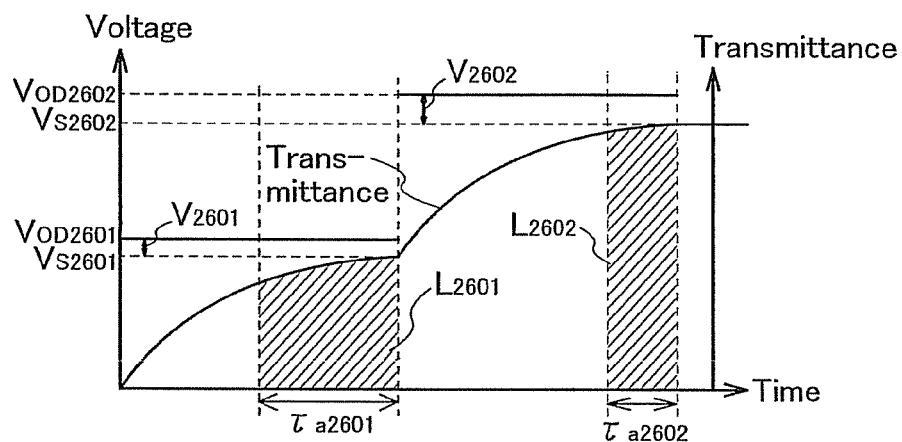

FIG. 26B is a graph showing original voltages $V_{S2601}$ and $V_{S2602}$ and overdrive voltages $V_{OD2601}$ and $V_{OD2602}$ written to each pixel, and transmittance with respect to each voltage on the same time axis when the lighting ratio R is different in the first frame period and the second frame period. Here, the backlight lighting periods in the first frame period and the second frame period are similar to those in FIG. 26A. Each area of oblique line regions $L_{2601}$ and $L_{2602}$ represents the level of luminance which human eyes perceive (integrated luminance). Each of voltage $V_{2601}$ and voltage $V_{2602}$ is overdrive intensity in the first frame period and the second frame period, and $V_{2601}=V_{OD2601}-V_{S2601}$ and $V_{2602}=V_{OD2602}-V_{S2602}$ are satisfied.

In the case of using (3) the method where a backlight divided into areas sequentially blinks among the methods where voltage written to a pixel is controlled under a condition that backlight luminance is constant when the backlight is lit before and after the lighting ratio R is changed, driving can be realized by changing the length and timing of the backlight lighting period in the first frame period and the second frame period, as shown in FIG. 26A. In addition, a relation between the voltage written to each pixel at this time and transmittance can be understood with reference to FIG. 26B.

When the overdrive voltage $V_{OD2601}$ is written to a pixel by data writing scanning in the first frame period, transmittance of a display element becomes transmittance corresponding to the original voltage $V_{S2601}$ at the time when the next data is written by data writing scanning in the second frame period or at the time close thereto. In that period, a backlight lighting period is sequentially provided for each area. Thus, integrated luminance in the top area in the first frame period is represented by the area of the oblique line region $L_{2601}$, which is surrounded by the backlight lighting period and the transmittance.

Then, when the overdrive voltage $V_{OD2602}$ is written to the pixel by data writing scanning in the second frame period, the transmittance of the display element becomes transmittance corresponding to the original voltage $V_{S2602}$ at the time when the next data is written by data writing scanning in the next frame period or at the time close thereto. In that period, a backlight lighting period is sequentially provided for each area. Thus, integrated luminance in the top area in the second frame period is represented by the area of the oblique line region $L_{2602}$, which is surrounded by the backlight lighting period and the transmittance.

At this time, it is important that values of the voltages applied to a pixel vary in the first frame period and the second frame period. That is, in the case where the lighting ratio R is changed under a condition that backlight luminance is constant when a backlight is lit, it is preferable to write different voltage in the first frame period and the second frame period, not the same voltage, if luminance of the pixel which human eyes perceive is not desired to be changed.

Accordingly, in one of methods according to this document, the original voltage and the overdrive voltage are changed in accordance with the lighting ratio R in order that the area of the oblique line region $L_{2601}$ in the first frame period and the area of the oblique line region $L_{2602}$ in the second frame period are approximately the same. Specifically, it is preferable to reduce the original voltage and the overdrive voltage as the lighting ratio R increases. In addition, in one of the methods according to this document, the overdrive intensity $V_{2601}$ in the first frame period and the overdrive intensity $V_{2602}$ in the second frame period may be changed in accordance with the lighting ratio R. Specifically, it is preferable to reduce the overdrive intensity as the lighting ratio R increases. This is because increase in the lighting ratio R means increase in length of the image display period $\tau_a$, and increase in length of the image display period $\tau_a$ can be allowed to have a longer period of time for reaching intended transmittance of a liquid crystal element. Moreover, when the length of the image display period $\tau_a$ is increased, intended transmittance of a liquid crystal element itself can be reduced, so that the original voltage $V_S$ is reduced, and further, the overdrive intensity can be reduced.

By driving a display device in such a manner, backlight luminance can be constant even in the case where luminance of the pixel which human eyes perceive is not desired to be changed when the lighting ratio R is changed. Thus, a structure of a circuit for driving a backlight is simplified, so that manufacturing cost can be reduced. Further, luminance unevenness and a flicker in displaying an image can be reduced. Moreover, provision of the blanking interval $\tau_b$ can reduce motion blur, and image quality of a moving image can be improved.

Figure 26C:
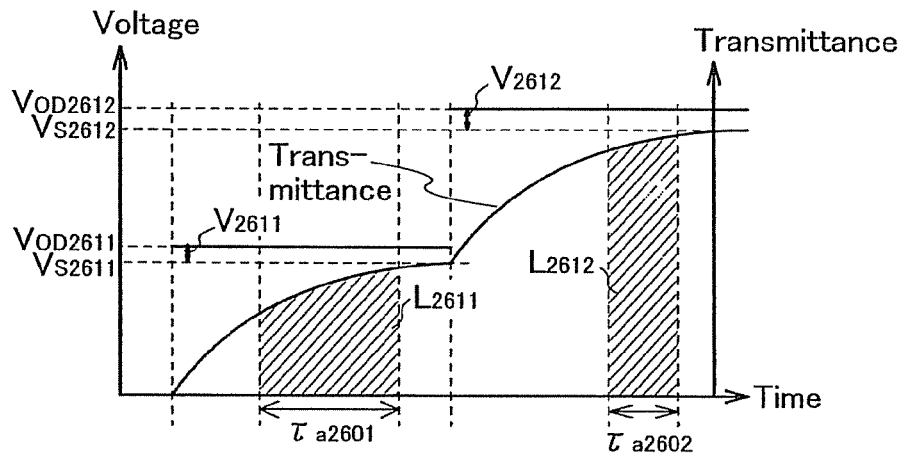

FIG. 26C is a graph showing original voltages $V_{S2611}$ and $V_{S2612}$ and overdrive voltages $V_{OD2611}$ and $V_{OD2612}$ written to each pixel, and transmittance with respect to each voltage on the same time axis in a pixel connected to a scan line different from that shown in FIG. 26B when the lighting ratio R is different in the first frame period and the second frame period. Here, the backlight lighting periods in the first frame period and the second frame period are similar to those in FIG. 26A. Each area of oblique line regions $L_{2611}$ and $L_{2612}$ represents the level of luminance which human eyes perceive (integrated luminance). Each of voltage $V_{2611}$ and voltage $V_{2612}$ is overdrive intensity in the first frame period and the second frame period, and $V_{2611}=V_{OD2611}-V_{S2611}$ and $V_{2612}=V_{OD2612}-V_{S2612}$ are satisfied.

Although details of a controlling method shown in FIG. 26C are similar to those shown in FIG. 26B, the length of time from when data is written to when a backlight lighting period starts is different. Thus, each area of the oblique line regions $L_{2611}$ and $L_{2612}$, which represents integrated luminance, is different from each area of the oblique line regions $L_{2601}$ and $L_{2602}$ in FIG. 26B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Note that the driving methods shown in FIGS. 26B and 26C are similar in other areas. At this time, the amount of correction of the original voltage and the overdrive voltage in a pixel to which data is written at the end of each area is made to be the largest in the area to which the pixel belongs, so that sharp luminance difference at a boundary of areas can be corrected.

Next, the case of a combination of (2) the method where the whole backlight blinks and (1) the method where blanking data is directly written to each pixel among the methods where voltage written to a pixel is controlled under a condition that backlight luminance is constant when the backlight is lit is described with reference to FIGS. 27A to 27C.

Figure 27A:
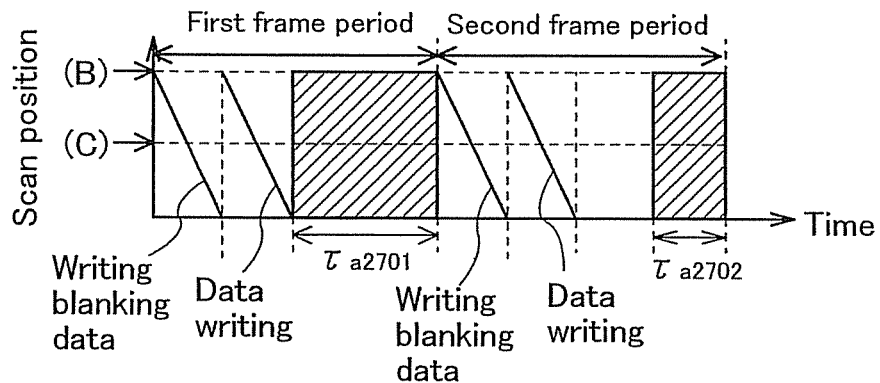
FIGS. 27A to 27C are diagrams each illustrating an example of a timing chart of a semiconductor device in accordance with the present invention.

FIG. 27A is a graph showing timing of writing data, timing of blinking a backlight, and timing of writing blanking date on the same time axis with respect to a position of a scan line when the lighting ratio R is different in the first frame period and the second frame period. Here, for explanation, a backlight lighting period in the first frame period is denoted by $\tau_{a2701}$, and a backlight lighting period in the second frame period is denoted by $\tau_{a2702}$.

Figure 27B:
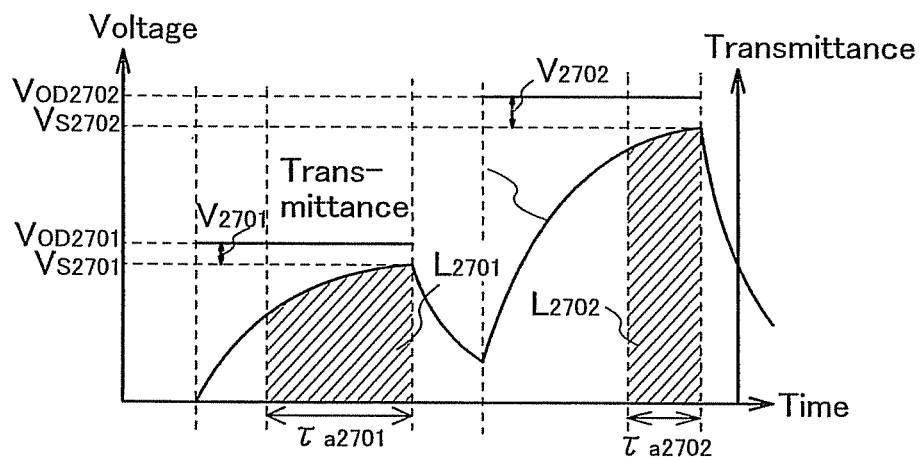

FIG. 27B is a graph showing original voltages $V_{S2701}$ and $V_{S2702}$ and overdrive voltages $V_{OD2701}$ and $V_{OD2702}$ written to each pixel, and transmittance with respect to each voltage on the same time axis when the lighting ratio R is different in the first frame period and the second frame period. Here, the backlight lighting periods in the first frame period and the second frame period are similar to those in FIG. 27A. Each area of oblique line regions $L_{2701}$ and $L_{2702}$ represents the level of luminance which human eyes perceive (integrated luminance). Each of voltage $V_{2701}$ and voltage $V_{2702}$ is overdrive intensity in the image display periods in the first frame period and the second frame period, and $V_{2701}=V_{OD2701}-V_{S2701}$ and $V_{2702}=V_{OD2702}-V_{S2702}$ are satisfied.

In the case of the combination of (2) the method where the whole backlight blinks and (1) the method where blanking data is directly written to each pixel among the methods where voltage written to a pixel is controlled under a condition that backlight luminance is constant when the backlight is lit before and after the lighting ratio R is changed, driving can be realized by changing the length and timing of the backlight lighting period in the first frame period and the second frame period and performing blanking writing scanning in addition to data writing scanning, as shown in FIG. 27A. Here, although the case is shown in which data writing scanning and blanking writing scanning are performed at the same timing in each frame period, a driving method according to this document is not limited thereto, and various types of writing timing can be used. For example, data writing scanning may be changed in accordance with the lighting ratio R. As a method where data writing scanning is changed in accordance with the lighting ratio R, the length of time from blanking writing scanning to data writing scanning in the same frame period may be increased as the lighting ratio R is decreased. A relation between the voltage written to each pixel at this time and transmittance can be understood with reference to FIG. 27B.

When the overdrive voltage $V_{OD2701}$ is written to a pixel by data writing scanning in the first frame period, transmittance of a display element becomes transmittance corresponding to the original voltage $V_{S2701}$ at the time when the next data is written by blanking writing scanning in the second frame period or at the time close thereto. In that period, a backlight lighting period is provided in all pixels all at once. Thus, integrated luminance in the first frame period is represented by the area of the oblique line region $L_{2701}$, which is surrounded by the backlight lighting period and the transmittance.

Then, when the overdrive voltage $V_{OD2702}$ is written to the pixel by data writing scanning in the second frame period after blanking writing scanning in the second frame period, the transmittance of the display element becomes transmittance corresponding to the original voltage $V_{S2702}$ at the time when the next data is written by blanking writing scanning in the next frame period or at the time close thereto. In that period, a backlight lighting period is provided in all the pixels all at once. Thus, integrated luminance in the second frame period is represented by the area of the oblique line region $L_{2702}$, which is surrounded by the backlight lighting period and the transmittance.

At this time, it is important that values of the voltages applied to a pixel vary in the first frame period and the second frame period. That is, in the case where the lighting ratio R is changed under a condition that backlight luminance is constant when a backlight is lit, it is preferable to write different voltage in the first frame period and the second frame period, not the same voltage, if luminance of the pixel which human eyes perceive is not desired to be changed.

Accordingly, in one of methods according to this document, the original voltage and the overdrive voltage are changed in accordance with the lighting ratio R in order that the area of the oblique line region $L_{2701}$ in the first frame period and the area of the oblique line region $L_{2702}$ in the second frame period are approximately the same. Specifically, it is preferable to reduce the original voltage and the overdrive voltage as the lighting ratio R increases. In addition, in one of the methods according to this document, the overdrive intensity $V_{2701}$ in the first frame period and the overdrive intensity $V_{2702}$ in the second frame period may be changed in accordance with the lighting ratio R. Specifically, it is preferable to reduce the overdrive intensity as the lighting ratio R increases. This is because increase in the lighting ratio R means increase in length of the image display period $\tau_a$, and increase in length of the image display period $\tau_a$ can be allowed to have a longer period of time for reaching intended transmittance of a liquid crystal element. Moreover, when the length of the image display period $\tau_a$ is increased, intended transmittance of a liquid crystal element itself can be reduced, so that the original voltage $V_S$ is reduced, and further, the overdrive intensity can be reduced.

By driving a display device in such a manner, backlight luminance can be constant even in the case where luminance of the pixel which human eyes perceive is not desired to be changed when the lighting ratio R is changed. Thus, a structure of a circuit for driving a backlight is simplified, so that manufacturing cost can be reduced. Further, luminance unevenness and a flicker in displaying an image can be reduced. Moreover, provision of the blanking interval $\tau_b$ can reduce motion blur, and image quality of a moving image can be improved. Furthermore, since blanking writing is performed in a period other than the backlight lighting period, light leakage can be reduced. Thus, black blurring in displaying an image can be reduced, so that a contrast ratio of the display device can be improved.

Figure 27C:
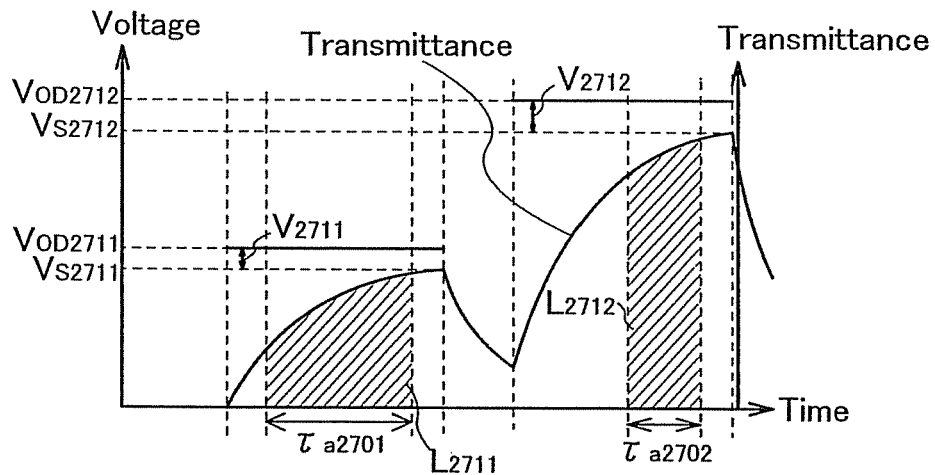

FIG. 27C is a graph showing original voltages $V_{S2711}$ and $V_{S2712}$ and overdrive voltages $V_{OD2711}$ and $V_{OD2712}$ written to each pixel, and transmittance with respect to each voltage on the same time axis in a pixel connected to a scan line different from that shown in FIG. 27B when the lighting ratio R is different in the first frame period and the second frame period. Here, the backlight lighting periods in the first frame period and the second frame period are similar to those in FIG. 27A. Each area of oblique line regions $L_{2711}$ and $L_{2712}$ represents the level of luminance which human eyes perceive (integrated luminance). Each of voltage $V_{2711}$ and voltage $V_{2712}$ is overdrive intensity in the first frame period and the second frame period, and $V_{2711}=V_{OD2711}-V_{S2711}$ and $V_{2712}=V_{OD2712}-V_{S2712}$ are satisfied.

Although details of a controlling method shown in FIG. 27C are similar to those shown in FIG. 27B, the length of time from when data is written to when a backlight lighting period starts is different. Thus, each area of the oblique line regions $L_{2711}$ and $L_{2712}$, which represents integrated luminance, is different from each area of the oblique line regions $L_{2701}$ and $L_{2702}$ in FIG. 27B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Next, the case of a combination of (3) the method where a backlight divided into areas sequentially blinks and (1) the method where blanking data is directly written to each pixel among the methods where voltage written to a pixel is controlled under a condition that backlight luminance is constant when the backlight is lit is described with reference to FIGS. 28A to 28C.

Figure 28A:
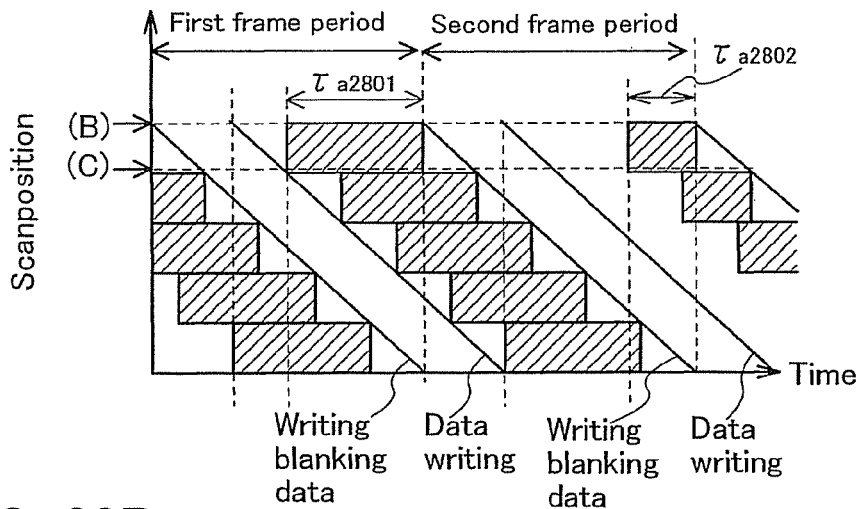
FIGS. 28A to 28C are diagrams each illustrating an example of a timing chart of a semiconductor device in accordance with the present invention.

FIG. 28A is a graph showing timing of writing data, timing of writing blank data, and timing of sequentially blinking a backlight on the same time axis with respect to a position of a scan line when the lighting ratio R is different in the first frame period and the second frame period. Here, for explanation, a backlight lighting period in the first frame period is denoted by $\tau_{a2801}$, and a backlight lighting period in the second frame period is denoted by $\tau_{a2802}$.

Figure 28B:
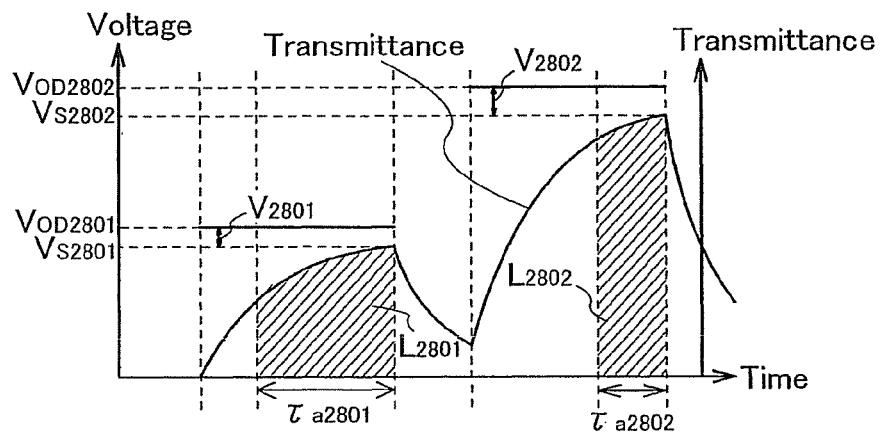

FIG. 28B is a graph showing original voltages $V_{S2801}$ and $V_{S2802}$ and overdrive voltages $V_{OD2801}$ and $V_{OD2802}$ written to each pixel, and transmittance with respect to each voltage on the same time axis when the lighting ratio R is different in the first frame period and the second frame period. Here, the backlight lighting periods in the first frame period and the second frame period are similar to those in FIG. 28A. Each area of oblique line regions $L_{2801}$ and $L_{2802}$ represents the level of luminance which human eyes perceive (integrated luminance). Each of voltage $V_{2801}$ and voltage $V_{2802}$ is overdrive intensity in the image display periods in the first frame period and the second frame period, and $V_{2801}=V_{OD2801}-V_{S2801}$ and $V_{2802}=V_{OD2802}-V_{S2802}$ are satisfied.

In the case of the combination of (3) the method where a backlight divided into areas sequentially blinks and (1) the method where blanking data is directly written to each pixel among the methods where voltage written to a pixel is controlled under a condition that backlight luminance is constant when the backlight is lit before and after the lighting ratio R is changed, driving can be realized by changing the length and timing of the backlight lighting period in the first frame period and the second frame period and performing blanking writing scanning in addition to data writing scanning, as shown in FIG. 28A. Here, although the case is shown in which data writing scanning and blanking writing scanning are performed at the same timing in each frame period, a driving method according to this document is not limited thereto, and various types of writing timing can be used. For example, data writing scanning may be changed in accordance with the lighting ratio R. As a method where data writing scanning is changed in accordance with the lighting ratio R, the length of time from blanking writing scanning to data writing scanning in the same frame period may be increased as the lighting ratio R is decreased. A relation between the voltage written to each pixel at this time and transmittance can be understood with reference to FIG. 28B.

When the overdrive voltage $V_{OD2801}$ is written to a pixel by data writing scanning in the first frame period, transmittance of a display element becomes transmittance corresponding to the original voltage $V_{S2801}$ at the time when the next data is written by blanking writing scanning in the second frame period or at the time close thereto. In that period, a backlight lighting period is sequentially provided for each area. Thus, integrated luminance in the top area in the first frame period is represented by the area of the oblique line region $L_{2801}$, which is surrounded by the backlight lighting period and the transmittance.

Then, when the overdrive voltage $V_{OD2802}$ is written to the pixel by data writing scanning in the second frame period after blanking writing scanning in the second frame period, the transmittance of the display element becomes transmittance corresponding to the original voltage $V_{S2802}$ at the time when the next data is written by data writing scanning in the next frame period or at the time close thereto. In that period, a backlight lighting period is sequentially provided for each area. Thus, integrated luminance in the top area in the second frame period is represented by the area of the oblique line region $L_{2802}$, which is surrounded by the backlight lighting period and the transmittance.

At this time, it is important that values of the voltages applied to a pixel vary in the first frame period and the second frame period. That is, in the case where the lighting ratio R is changed under a condition that backlight luminance is constant when a backlight is lit, it is preferable to write different voltage in the first frame period and the second frame period, not the same voltage, if luminance of the pixel which human eyes perceive is not desired to be changed.

Accordingly, in one of methods according to this document, the original voltage and the overdrive voltage are changed in accordance with the lighting ratio R in order that the area of the oblique line region $L_{2801}$ in the first frame period and the area of the oblique line region $L_{2802}$ in the second frame period are approximately the same. Specifically, it is preferable to reduce the original voltage and the overdrive voltage as the lighting ratio R increases. In addition, in one of the methods according to this document, the overdrive intensity $V_{2801}$ in the first frame period and the overdrive intensity $V_{2802}$ in the second frame period may be changed in accordance with the lighting ratio R. Specifically, it is preferable to reduce the overdrive intensity as the lighting ratio R increases. This is because increase in the lighting ratio R means increase in length of the image display period $\tau_a$, and increase in length of the image display period $\tau_a$ can be allowed to have a longer period of time for reaching intended transmittance of a liquid crystal element. Moreover, when the length of the image display period $\tau_a$ is increased, intended transmittance of a liquid crystal element itself can be reduced, so that the original voltage $V_S$ is reduced, and further, the overdrive intensity can be reduced.

By driving a display device in such a manner, backlight luminance can be constant even in the case where luminance of the pixel which human eyes perceive is not desired to be changed when the lighting ratio R is changed. Thus, a structure of a circuit for driving a backlight is simplified, so that manufacturing cost can be reduced. Further, luminance unevenness and a flicker in displaying an image can be reduced. Moreover, provision of the blanking interval $\tau_b$ can reduce motion blur, and image quality of a moving image can be improved. Furthermore, since blanking writing is performed in a period other than the backlight lighting period, light leakage in a non-lighting period of the backlight can be reduced. Thus, black blurring in displaying an image can be reduced, so that a contrast ratio of the display device can be improved.

Figure 28C:
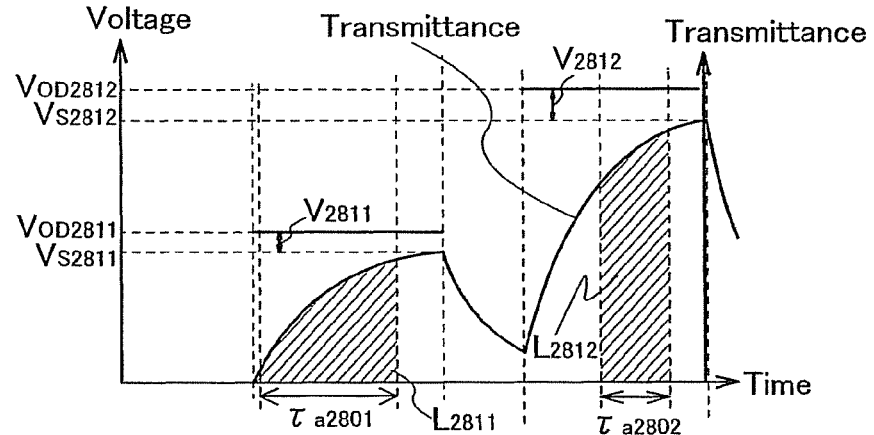

FIG. 28C is a graph showing original voltages $V_{S2811}$ and $V_{S2812}$ and overdrive voltages $V_{OD2811}$ and $V_{OD2812}$ written to each pixel, and transmittance with respect to each voltage on the same time axis in a pixel connected to a scan line different from that shown in FIG. 28B when the lighting ratio R is different in the first frame period and the second frame period. Here, the backlight lighting periods in the first frame period and the second frame period are similar to those in FIG. 28A. Each area of oblique line regions $L_{2811}$ and $L_{2812}$ represents the level of luminance which human eyes perceive (integrated luminance). Each of voltage $V_{2811}$ and voltage $V_{2812}$ is overdrive intensity in the first frame period and the second frame period, and $V_{2811}=V_{OD2811}-V_{S2811}$ and $V_{2812}=V_{OD2812}-V_{S2812}$ are satisfied.

Although details of a controlling method shown in FIG. 28C are similar to those shown in FIG. 28B, the length of time from when data is written to when a backlight lighting period starts is different. Thus, each area of the oblique line regions $L_{2811}$ and $L_{2812}$, which represents integrated luminance, is different from each area of the oblique line regions $L_{2801}$ and $L_{2802}$ in FIG. 28B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Note that the driving methods shown in FIGS. 28B and 28C are similar in other areas. At this time, the amount of correction of the original voltage and the overdrive voltage in a pixel to which data is written at the end of each area is made to be the largest in the area to which the pixel belongs, so that sharp luminance difference at a boundary of areas can be corrected.

Next, in a method of changing backlight luminance, the case where the method for providing the blanking interval $\tau_b$ (the method of controlling the lighting ratio R) is different is individually described in detail. Note that in the method of changing backlight luminance, by controlling transmittance of a display element, backlight luminance can have extremely various values in order to prevent change in luminance which human eyes perceive in frame periods before and after the lighting ratio R is changed. Here, the case where voltage written to each pixel is not changed when the lighting ratio R is changed is described. This is because this can provide a beneficial effect in driving a display device.

First, the case of using (2) the method where the whole backlight blinks among the methods of changing backlight luminance is described with reference to FIGS. 29A to 29C.

Figure 29A:
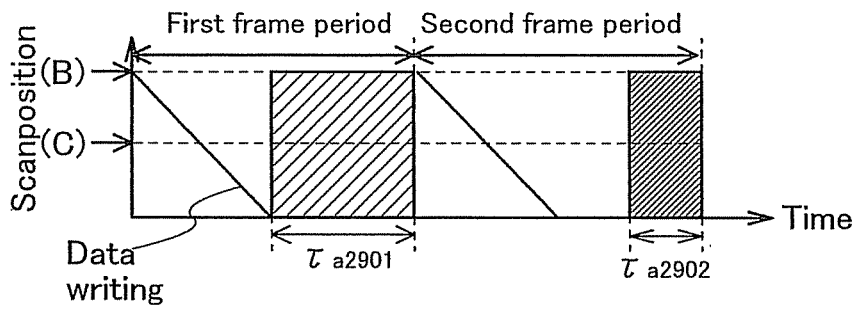
FIGS. 29A to 29C are diagrams each illustrating an example of a timing chart of a semiconductor device in accordance with the present invention.

FIG. 29A is a graph showing timing of writing data and timing of blinking a backlight on the same time axis with respect to a position of a scan line when the lighting ratio R is different in the first frame period and the second frame period. Here, for explanation, a backlight lighting period in the first frame period is denoted by $\tau_{a2901}$, and a backlight lighting period in the second frame period is denoted by $\tau_{a2902}$.

Figure 29B:
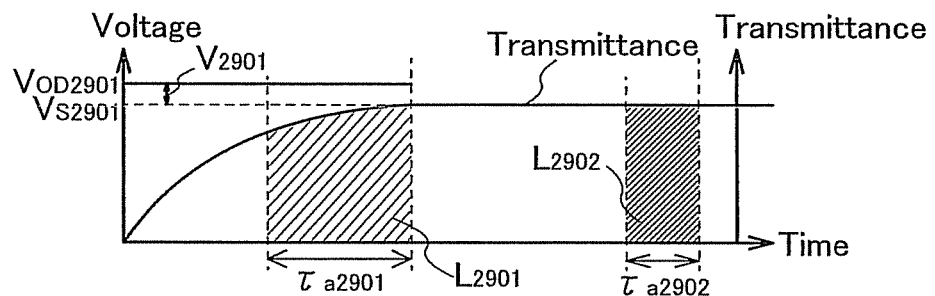

FIG. 29B is a graph showing original voltage $V_{S2901}$ and overdrive voltage $V_{OD2901}$ written to each pixel, and transmittance with respect to each voltage on the same time axis when the lighting ratio R is different in the first frame period and the second frame period. Here, the backlight lighting periods in the first frame period and the second frame period are similar to those in FIG. 29A. Each area of oblique line regions $L_{2901}$ and $L_{2902}$ represents the level of luminance which human eyes perceive (integrated luminance). Voltage $V_{2901}$ is overdrive intensity in the first frame period, and $V_{2901} = V_{OD2901} - V_{S2901}$ is satisfied.

In the case of using (2) the method where the whole backlight blinks among the methods of changing backlight luminance before and after the lighting ratio R is changed, driving can be realized by changing backlight luminance and the length and timing of the backlight lighting period, as shown in FIG. 29A. A relation between the voltage written to each pixel at this time and transmittance can be understood with reference to FIG. 29B.

When the overdrive voltage $V_{OD2901}$ is written to a pixel by data writing scanning in the first frame period, transmittance of a display element becomes transmittance corresponding to the original voltage $V_{S2901}$ at the time when the next data is written by data writing scanning in the second frame period or at the time close thereto. In that period, a backlight lighting period is provided in all pixels all at once. Thus, integrated luminance in the first frame period is represented by the area of the oblique line region $L_{2901}$, which is surrounded by the backlight lighting period and the transmittance.

In the second frame period, the transmittance in the graph of FIG. 29B is already desired transmittance before data is written. At this time, the transmittance dose not change in the backlight lighting period. Luminance which human eyes perceive in the second frame period depends on the area of the oblique line region $L_{2902}$ in the second frame period.

At this time, it is important that luminance in the backlight lighting periods varies in the first frame period and the second frame period. That is, when the lighting ratio R is changed, display can be performed without change in luminance of a pixel which human eyes perceive by changing backlight luminance even in the case where luminance of the pixel is not desired to be changed.

Accordingly, in one of methods according to this document, backlight luminance in the backlight lighting period is determined by difference between the area of the oblique line region $L_{2901}$ in the first frame period and the area of the oblique line region $L_{2902}$ in the second frame period. Specifically, when the lighting ratio R is changed and the backlight lighting period in the second frame period is 1/X (X is a positive number) of the backlight lighting period in the first frame period, it is preferable that backlight luminance be X times as high as that in the first frame period. Then, in one of the methods according to this document, it is preferable that the original voltage $V_{S2901}$ in the first frame period be approximately the same in the first frame period and the second frame period.

By driving a display device in such a manner, when the lighting ratio R is changed, the original voltage $V_{S2901}$ can be approximately the same in the first frame period and the second frame period even in the case where luminance of the pixel which human eyes perceive is not desired to be changed. Thus, a structure of a circuit which processes image data and is included in the display device is simplified, so that manufacturing cost and power consumption of the display device can be reduced. Further, in the case where the same luminance is desired to be displayed when the lighting ratio R is changed, voltage written to each pixel does not have to be changed from that in the previous frame; thus, power consumption in writing data can be reduced.

Note that overdrive voltage and overdrive intensity do not have to be approximately the same in the first frame period and the second frame period. This is because overdrive voltage and overdrive intensity are obtained from original voltages and transmittance in one frame and the previous frame; thus, when original voltage and transmittance in each previous frame are different in the first frame period and the second frame period, various values are obtained as a matter of course.

Figure 29C:
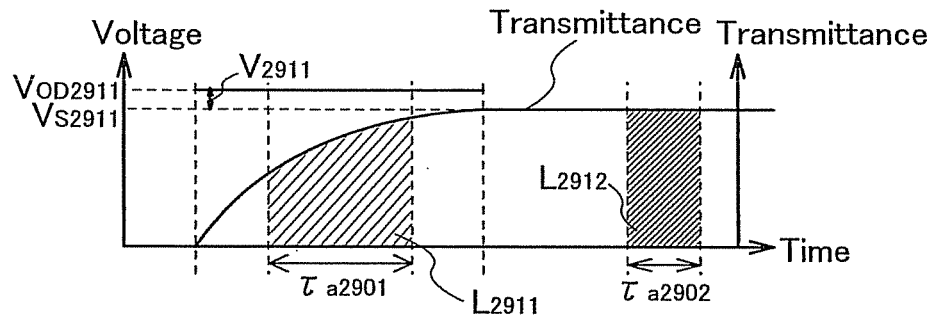

FIG. 29C is a graph showing original voltage $V_{S2911}$ and overdrive voltage $V_{OD2911}$ written to each pixel, and transmittance with respect to each voltage on the same time axis in a pixel connected to a scan line different from that shown in FIG. 29B when the lighting ratio R is different in the first frame period and the second frame period. Here, the backlight lighting periods in the first frame period and the second frame period are similar to those in FIG. 29A. Each area of oblique line regions $L_{2911}$ and $L_{2912}$ represents the level of luminance which human eyes perceive (integrated luminance). Voltage $V_{2911}$ is overdrive intensity in the first frame period, and $V_{2911} = V_{OD2911} - V_{S2911}$ is satisfied.

Although details of a controlling method shown in FIG. 29C are similar to those shown in FIG. 29B, the length of time from when data is written to when a backlight lighting period starts is different. Thus, each area of the oblique line regions $L_{2911}$ and $L_{2912}$, which represents integrated luminance, is different from each area of the oblique line regions $L_{2901}$ and $L_{2902}$ in FIG. 29B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Next, the case of using (3) the method where a backlight divided into areas sequentially blinks among the methods of changing backlight luminance is described with reference to FIGS. 30A to 30C.

Figure 30A:
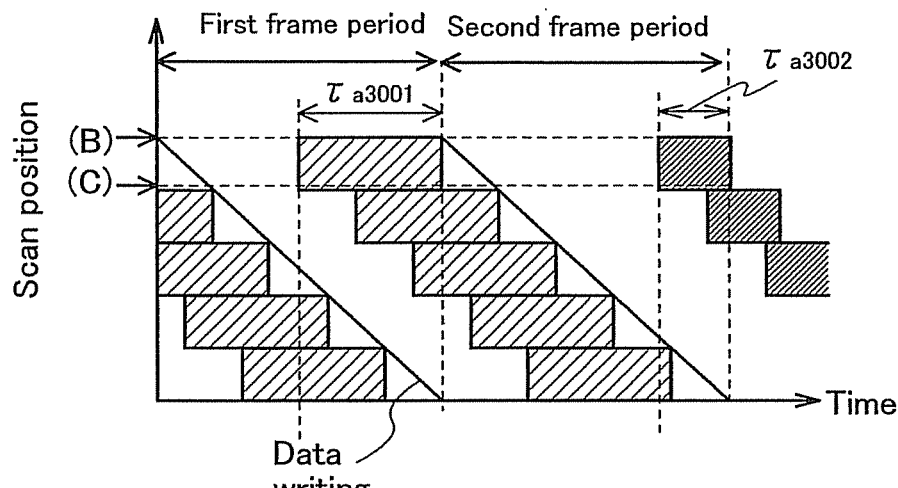
FIGS. 30A to 30C are diagrams each illustrating an example of a timing chart of a semiconductor device in accordance with the present invention.

FIG. 30A is a graph showing timing of writing data and timing of sequentially blinking a backlight on the same time axis with respect to a position of scan lines when the lighting ratio R is different in the first frame period and the second frame period. Here, for explanation, a backlight lighting period in the first frame period is denoted by $\tau_{a3001}$, and a backlight lighting period in the second frame period is denoted by $\tau_{a3002}$.

Figure 30B:
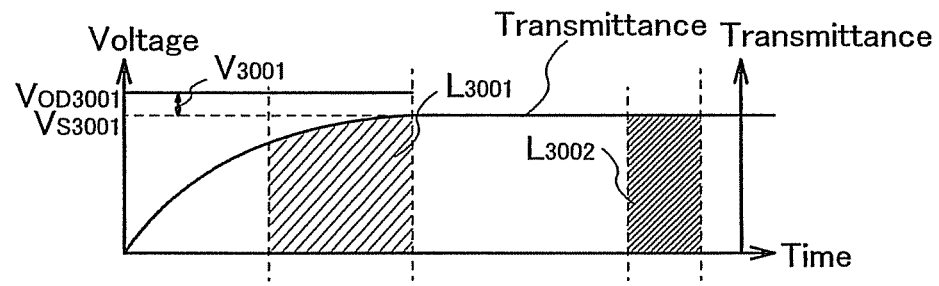

FIG. 30B is a graph showing original voltage $V_{S3001}$ and overdrive voltage $V_{OD3001}$ written to each pixel, and transmittance with respect to each voltage on the same time axis when the lighting ratio R is different in the first frame period and the second frame period. Here, the backlight lighting periods in the first frame period and the second frame period are similar to those in FIG. 30A. Each area of oblique line regions $L_{3001}$ and $L_{3002}$ represents the level of luminance which human eyes perceive (integrated luminance). Voltage $V_{3001}$ is overdrive intensity in the first frame period, and $V_{3001}=V_{OD3001}-V_{S3001}$ is satisfied.

In the case of using (3) the method where a backlight divided into areas sequentially blinks among the methods of changing backlight luminance before and after the lighting ratio R is changed, driving can be realized by changing backlight luminance and the length and timing of the backlight lighting period, as shown in FIG. 30A. A relation between the voltage written to each pixel at this time and transmittance can be understood with reference to FIG. 30B.

When the overdrive voltage $V_{OD3001}$ is written to a pixel by data writing scanning in the first frame period, transmittance of a display element becomes transmittance corresponding to the original voltage $V_{S3001}$ at the time when the next data is written by data writing scanning in the second frame period or at the time close thereto. In that period, a backlight lighting period is sequentially provided for each area. Thus, integrated luminance in the top area in the first frame period is represented by the area of the oblique line region $L_{3001}$, which is surrounded by the backlight lighting period and the transmittance.

In the second frame period, the transmittance in the graph of FIG. 30B is already desired transmittance before data is written. At this time, the transmittance dose not change in the backlight lighting period. Luminance which human eyes perceive in the second frame period depends on the area of the oblique line region $L_{3002}$ in the second frame period.

At this time, it is important that luminance in the backlight lighting periods varies in the first frame period and the second frame period. That is, when the lighting ratio R is changed, display can be performed without change in luminance of a pixel which human eyes perceive by changing backlight luminance even in the case where luminance of the pixel is not desired to be changed.

Accordingly, in one of methods according to this document, backlight luminance in the backlight lighting period is determined by difference between the area of the oblique line region $L_{3001}$ in the first frame period and the area of the oblique line region $L_{3002}$ in the second frame period. Specifically, when the lighting ratio R is changed and the backlight lighting period in the second frame period is 1/X (X is a positive number) of the backlight lighting period in the first frame period, it is preferable that backlight luminance be X times as high as that in the first frame period. Then, in one of the methods according to this document, it is preferable that the original voltage $V_{S3001}$ in the first frame period be approximately the same in the first frame period and the second frame period.

By driving a display device in such a manner, when the lighting ratio R is changed, the original voltage $V_{S3001}$ can be approximately the same in the first frame period and the second frame period even in the case where luminance of the pixel which human eyes perceive is not desired to be changed. Thus, a structure of a circuit which processes image data and is included in the display device is simplified, so that manufacturing cost and power consumption of the display device can be reduced. Further, in the case where the same luminance is desired to be displayed when the lighting ratio R is changed, voltage written to each pixel does not have to be changed from that in the previous frame; thus, power consumption in writing data can be reduced.

Note that overdrive voltage and overdrive intensity do not have to be approximately the same in the first frame period and the second frame period. This is because overdrive voltages and overdrive intensity are obtained from original voltages and transmittance in one frame and the previous frame; thus, when original voltage and transmittance in each previous frame are different in the first frame period and the second frame period, various values are obtained as a matter of course.

Figure 30C:
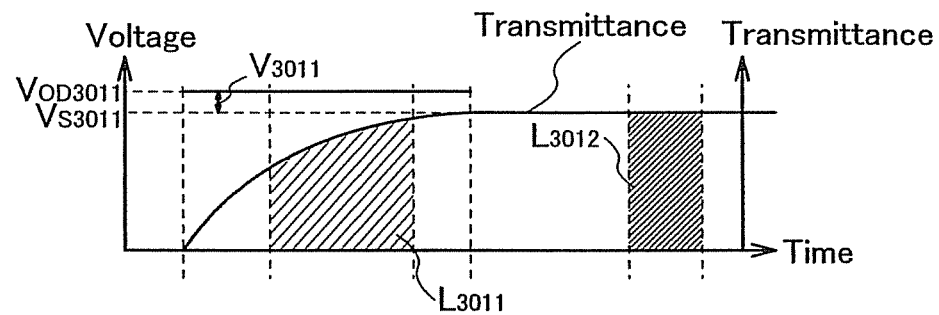

FIG. 30C is a graph showing original voltage $V_{S3011}$ and overdrive voltage $V_{OD3011}$ written to each pixel, and transmittance with respect to each voltage on the same time axis in a pixel connected to a scan line different from that shown in FIG. 30B when the lighting ratio R is different in the first frame period and the second frame period. Here, the backlight lighting periods in the first frame period and the second frame period are similar to those in FIG. 30A. Each area of oblique line regions $L_{3011}$ and $L_{3012}$ represents the level of luminance which human eyes perceive (integrated luminance). Voltage $V_{3011}$ is overdrive intensity in the first frame period, and $V_{3011}=V_{OD3011}-V_{S3011}$ is satisfied.

Although details of a controlling method shown in FIG. 30C are similar to those shown in FIG. 30B, the length of time from when data is written to when a backlight lighting period starts is different. Thus, each area of the oblique line regions $L_{3011}$ and $L_{3012}$, which represents integrated luminance, is different from each area of the oblique line regions $L_{3001}$ and $L_{3002}$ in FIG. 30B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Note that the driving methods shown in FIGS. 30B and 30C are similar in other areas. At this time, the amount of correction of the original voltage and the overdrive voltage in a pixel to which data is written at the end of each area is made to be the largest in the area to which the pixel belongs, so that sharp luminance difference at a boundary of areas can be corrected.

Next, the case of a combination of (2) the method where the whole backlight blinks and (1) the method where blanking data is directly written to each pixel among the methods of changing backlight luminance is described with reference to FIGS. 31A to 31C.

Figure 31A:
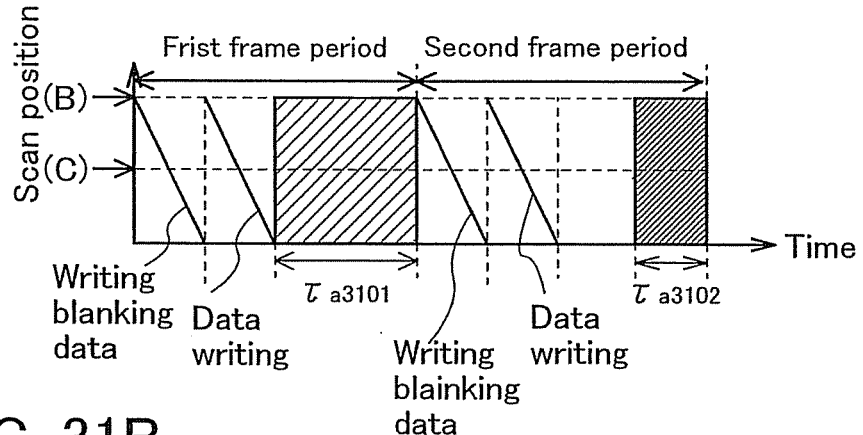
FIGS. 31A to 31C are diagrams each illustrating an example of a timing chart of a semiconductor device in accordance with the present invention.

FIG. 31A is a graph showing timing of writing data, timing of writing blank data, and timing of blinking a backlight on the same time axis with respect to a position of a scan line when the lighting ratio R is different in the first frame period and the second frame period. Here, for explanation, a backlight lighting period in the first frame period is denoted by $\tau_{a3101}$ and a backlight lighting period in the second frame period is denoted by $\tau_{a3102}$.

Figure 31B:
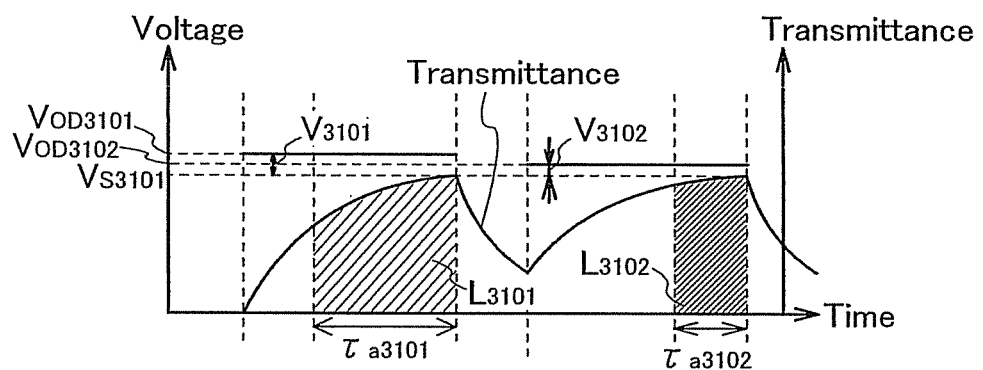

FIG. 31B is a graph showing original voltage $V_{S3101}$ and overdrive voltages $V_{OD3101}$ and $V_{OD3102}$ written to each pixel, and transmittance with respect to each voltage on the same time axis when the lighting ratio R is different in the first frame period and the second frame period. Here, the backlight lighting periods in the first frame period and the second frame period are similar to those in FIG. 31A. Each area of oblique line regions $L_{3101}$ and $L_{3102}$ represents the level of luminance which human eyes perceive (integrated luminance). Each of voltage $V_{3101}$ and voltage $V_{3102}$ is overdrive intensity in image display periods in the first frame period and the second frame period, and $V_{3101}=V_{OD3101}-V_{S3101}$ and $V_{3102}=V_{OD3102}-V_{S3101}$ are satisfied.

In the case of the combination of (2) the method where the whole backlight blinks and (1) the method where blanking data is directly written to each pixel among the methods of changing backlight luminance before and after the lighting ratio R is changed, driving can be realized by changing backlight luminance and the length and timing of the backlight lighting period, and performing blanking writing scanning in addition to data writing scanning, as shown in FIG. 31A. Here, although the case is shown in which data writing scanning and blanking writing scanning are performed at the same timing in each frame period, a driving method according to this document is not limited thereto, and various types of writing timing can be used. For example, data writing scanning may be changed in accordance with the lighting ratio R. As a method where data writing scanning is changed in accordance with the lighting ratio R, the length of time from blanking writing scanning to data writing scanning in the same frame period may be increased as the lighting ratio R is decreased. A relation between the voltage written to each pixel at this time and transmittance can be understood with reference to FIG. 31B.

When the overdrive voltage $V_{OD3101}$ is written to a pixel by data writing scanning in the first frame period, transmittance of a display element becomes transmittance corresponding to the original voltage $V_{S3101}$ at the time when the next data is written by blanking writing scanning in the second frame period or at the time close thereto. In that period, a backlight lighting period is provided in all pixels all at once. Thus, integrated luminance in the first frame period is represented by the area of the oblique line region $L_{3101}$, which is surrounded by the backlight lighting period and the transmittance.

Then, when the overdrive voltage $V_{OD3102}$ is written to the pixel by data writing scanning in the second frame period after blanking writing scanning in the second frame period, the transmittance of the display element becomes transmittance corresponding to the original voltage $V_{S3101}$ at the time when the next data is written by blanking writing scanning in the next frame period or at the time close thereto. In that period, a backlight lighting period is provided in all the pixel all at once. Thus, integrated luminance in the second frame period is represented by the area of the oblique line region $L_{3102}$, which is surrounded by the backlight lighting period and the transmittance.

At this time, it is important that luminance in the backlight lighting periods varies in the first frame period and the second frame period. That is, when the lighting ratio R is changed, display can be performed without change in luminance of a pixel which human eyes perceive by changing backlight luminance even in the case where luminance of the pixel is not desired to be changed.

Accordingly, in one of methods according to this document, backlight luminance in the backlight lighting period is determined by difference between the area of the oblique line region $L_{3101}$ in the first frame period and the area of the oblique line region $L_{3102}$ in the second frame period. Specifically, when the lighting ratio R is changed and the backlight lighting period in the second frame period is 1/X (X is a positive number) of the backlight lighting period in the first frame period, it is preferable that backlight luminance be X times as high as that in the first frame period. Then, in one of the methods according to this document, it is preferable that the original voltage $V_{S3101}$ in the first frame period be approximately the same in the first frame period and the second frame period.

By driving a display device in such a manner, the original voltage $V_{S3101}$ can be the same in the first frame period and the second frame period even in the case where luminance of the pixel which human eyes perceive is not desired to be changed when the lighting ratio R is changed. Thus, a structure of a circuit which processes image data, which is included in the display device, is simplified, so that manufacturing cost and power consumption of the display device can be reduced. Further, since blanking writing is performed in a period other than the backlight lighting period, light leakage in a non-lighting period of the backlight can be reduced. Thus, black blurring in displaying an image can be reduced, so that a contrast ratio of the display device can be improved.

Note that overdrive voltage and overdrive intensity do not have to be approximately the same in the first frame period and the second frame period. This is because overdrive voltage and overdrive intensity are obtained from original voltages and transmittance in one frame and the previous frame; thus, when original voltage and transmittance in each previous frame are different in the first frame period and the second frame period, various values are obtained as a matter of course.

Figure 31C:
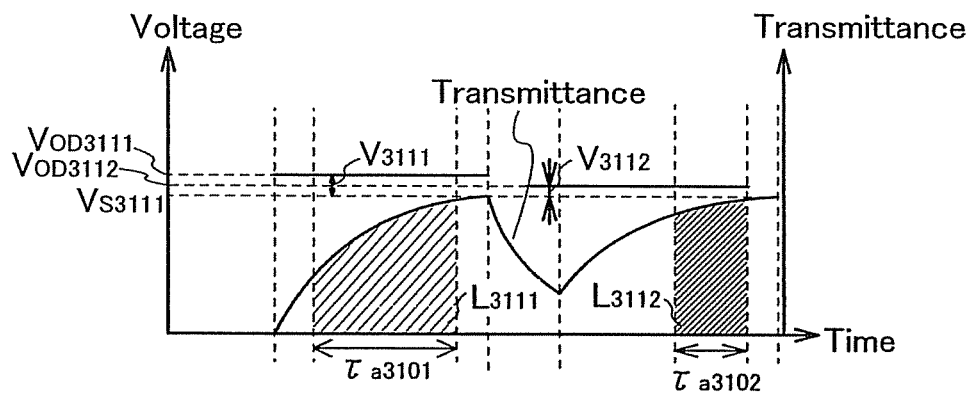

FIG. 31C is a graph showing original voltage $V_{S3111}$ and overdrive voltages $V_{OD3111}$ and $V_{OD3111}$ written to each pixel, and transmittance with respect to each voltage on the same time axis in a pixel connected to a scan line different from that shown in FIG. 31B when the lighting ratio R is different in the first frame period and the second frame period. Here, the backlight lighting periods in the first frame period and the second frame period are similar to those in FIG. 31A. Each area of oblique line regions $L_{3111}$ and $L_{3112}$ represents the level of luminance which human eyes perceive (integrated luminance). Each of voltage $V_{3111}$ and voltage $V_{3112}$ is overdrive intensity in the first frame period and the second frame period, and $V_{3111}=V_{OD3111}-V_{S3111}$ and $V_{3112}=V_{OD3112}-V_{S3111}$ are satisfied.

Although details of a controlling method shown in FIG. 31C are similar to those shown in FIG. 31B, the length of time from when data is written to when a backlight lighting period starts is different. Thus, each area of the oblique line regions $L_{3111}$ and $L_{3112}$, which represents integrated luminance, is different from each area of the oblique line regions $L_{3101}$ and $L_{3102}$ in FIG. 31B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Next, the case of a combination of (3) the method where a backlight divided into areas sequentially blinks and (1) the method where blanking data is directly written to each pixel among the methods of changing backlight luminance is described with reference to FIGS. 32A to 32C.

Figure 32A:
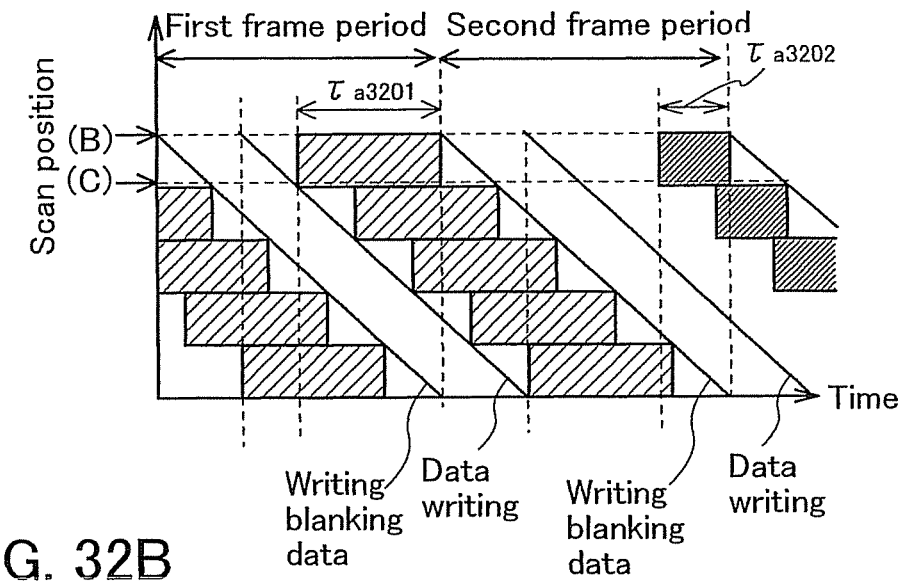
FIGS. 32A to 32C are diagrams each illustrating an example of a timing chart of a semiconductor device in accordance with the present invention.

FIG. 32A is a graph showing timing of writing data, timing of writing blank data, and timing of sequentially blinking a backlight on the same time axis with respect to a position of a scan line when the lighting ratio R is different in the first frame period and the second frame period. Here, for explanation, a backlight lighting period in the first frame period is denoted by $\tau_{a3201}$, and a backlight lighting period in the second frame period is denoted by $\tau_{a3202}$.

Figure 32B:
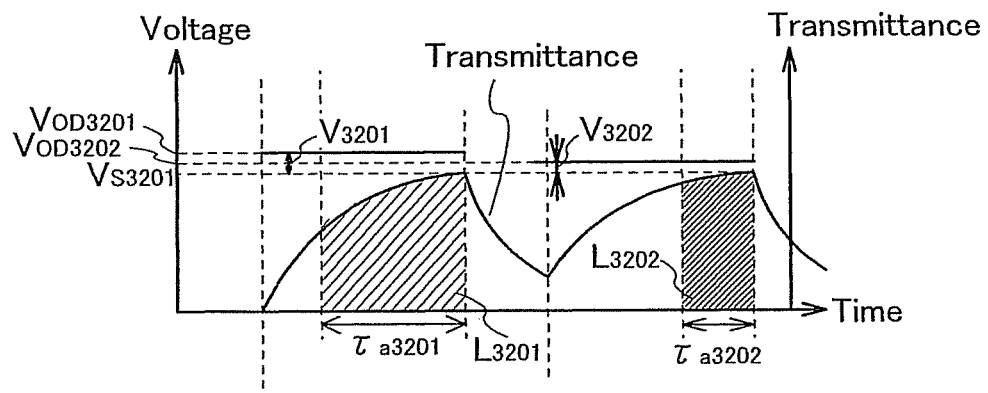

FIG. 32B is a graph showing original voltage $V_{S3201}$ and overdrive voltages $V_{OD3201}$ and $V_{OD3202}$ written to each pixel, and transmittance with respect to each voltage on the same time axis when the lighting ratio R is different in the first frame period and the second frame period. Here, the backlight lighting periods in the first frame period and the second frame period are similar to those in FIG. 32A. Each area of oblique line regions $L_{3201}$ and $L_{3202}$ represents the level of luminance which human eyes perceive (integrated luminance). Each of voltage $V_{3201}$ and voltage $V_{3202}$ is overdrive intensity in image display periods in the first frame period and the second frame period, and $V_{3201}=V_{OD3201}-V_{S3201}$ and $V_{3202}=V_{OD3202}-V_{S3201}$ are satisfied.

In the case of the combination of (3) the method where a backlight divided into areas sequentially blinks and (1) the method where blanking data is directly written to each pixel among the methods of changing backlight luminance before and after the lighting ratio R is changed, driving can be realized by changing backlight luminance and the length and timing of the backlight lighting period, and performing blanking writing scanning in addition to data writing scanning, as shown in FIG. 32A. Here, although the case is shown in which data writing scanning and blanking writing scanning are performed at the same timing in each frame period, a driving method according to this document is not limited thereto, and various types of writing timing can be used. For example, data writing scanning may be changed in accordance with the lighting ratio R. As a method where data writing scanning is changed in accordance with the lighting ratio R, the length of time from blanking writing scanning to data writing scanning in the same frame period may be increased as the lighting ratio R is decreased. A relation between the voltage written to each pixel at this time and transmittance can be understood with reference to FIG. 32B. In addition, although timing of data writing scanning and blanking writing scanning does not overlap with the backlight lighting period in the graph of FIG. 32A, a method according to this document is not limited thereto, and the timing thereof may overlap with the backlight lighting period. For example, writing scanning and blanking scanning at all scan positions may overlap with the backlight lighting periods. In this case, the backlight is already lit when data is written or at the time close thereto, and at or around the time when blanking data is written, a blanking interval starts even when the backlight is lit. Accordingly, time from when writing is performed to when the backlight lighting period starts is the same at all the scan positions, so that luminance difference of pixels depending on a scan position disappears, and luminance unevenness in displaying an image can be reduced. Further, since a period when the backlight is not lit is in the blanking interval, light leakage in the blanking interval can be reduced. Thus, black blurring in displaying an image can be reduced, so that a contrast ratio of the display device can be improved. Moreover, the length of the blanking interval $\tau_b$ can be controlled by changing timing of blanking writing, instead of changing a state of sequential scanning of the backlight so that the length of the backlight lighting period is changed. At this time, since timing of blanking writing can be changed in each one gate selection period, the length of the blanking interval $\tau_b$ can be finely adjusted, and the degree of reduction in motion blur can be finely changed. Accordingly, the lighting ratio R depending on the control parameters P and Q can be further optimally controlled.

When the overdrive voltage $V_{OD3201}$ is written to a pixel by data writing scanning in the first frame period, transmittance of a display element becomes transmittance corresponding to the original voltage $V_{S3201}$ at the time when the next data is written by blanking writing scanning in the second frame period or at the time close thereto. In that period, a backlight lighting period is sequentially provided for each area. Thus, integrated luminance in the top area in the first frame period is represented by the area of the oblique line region $L_{3201}$, which is surrounded by the backlight lighting period and the transmittance.

Then, when the overdrive voltage $V_{OD3202}$ is written to the pixel by data writing scanning in the second frame period after blanking writing scanning in the second frame period, the transmittance of the display element becomes transmittance corresponding to the original voltage $V_{S3201}$ at the time when the next data is written by blanking writing scanning in the next frame period or at the time close thereto. In that period, a backlight lighting period is sequentially provided for each area. Thus, integrated luminance in the top area in the second frame period is represented by the area of the oblique line region $L_{3202}$, which is surrounded by the backlight lighting period and the transmittance.

At this time, it is important that luminance in the backlight lighting periods varies in the first frame period and the second frame period. That is, when the lighting ratio R is changed, display can be performed without change in luminance of a pixel which human eyes perceive by changing backlight luminance even in the case where luminance of the pixel is not desired to be changed.

Accordingly, in one of methods according to this document, backlight luminance in a backlight lighting period is determined by difference between the area of the oblique line region $L_{3201}$ in the first frame period and the area of the oblique line region $L_{3202}$ in the second frame period. Specifically, when the lighting ratio R is changed and the backlight lighting period in the second frame period is 1/X (X is a positive number) of the backlight lighting period in the first frame period, it is preferable that backlight luminance be X times as high as that in the first frame period. Then, in one of the methods according to this document, it is preferable that the original voltage $V_{S3201}$ in the first frame period be approximately the same in the first frame period and the second frame period.

By driving a display device in such a manner, the original voltage $V_{S3201}$ can be the same in the first frame period and the second frame period even in the case where luminance of the pixel which human eyes perceive is not desired to be changed when the lighting ratio R is changed. Thus, a structure of a circuit which processes image data, which is included in the display device, is simplified, so that manufacturing cost and power consumption of the display device can be reduced. Further, since blanking writing is performed in a period other than the backlight lighting period, light leakage in a non-lighting period of the backlight can be reduced. Thus, black blurring in displaying an image can be reduced, so that a contrast ratio of the display device can be improved.

Note that overdrive voltage and overdrive intensity do not have to be approximately the same in the first frame period and the second frame period. This is because overdrive voltage and overdrive intensity are obtained from original voltages and transmittance in one frame and the previous frame; thus, when original voltage and transmittance in each previous frame are different in the first frame period and the second frame period, various values are obtained as a matter of course.

Figure 32C:
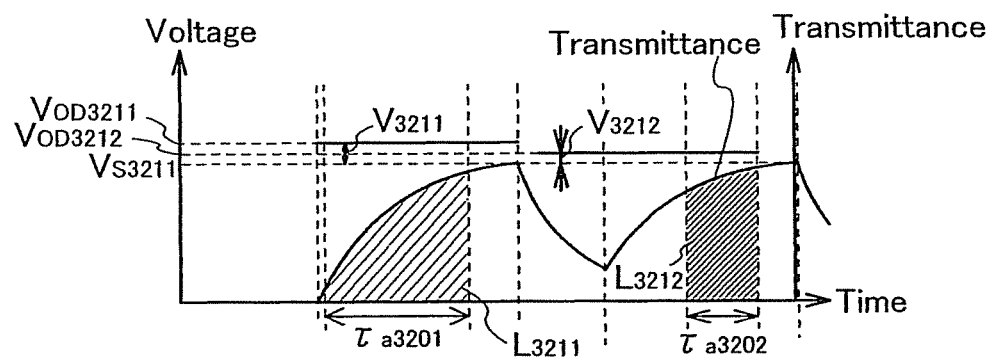

FIG. 32C is a graph showing original voltage $V_{S3211}$ and overdrive voltages $V_{OD3211}$ and $V_{OD3212}$ written to each pixel, and transmittance with respect to each voltage on the same time axis in a pixel connected to a scan line different from that shown in FIG. 32B when the lighting ratio R is different in the first frame period and the second frame period. Here, the backlight lighting periods in the first frame period and the second frame period are similar to those in FIG. 32A. Each area of oblique line regions $L_{3211}$ and $L_{3212}$ represents the level of luminance which human eyes perceive (integrated luminance). Each of voltage $V_{3211}$ and voltage $V_{3212}$ is overdrive intensity in the first frame period and the second frame period, and $V_{3211}=V_{OD3211}-V_{S3211}$ and $V_{3212}=V_{OD3212}-V_{S3211}$ are satisfied.

Although details of a controlling method shown in FIG. 32C are similar to those shown in FIG. 32B, the length of time from when data is written to when a backlight lighting period starts is different. Thus, each area of the oblique line regions $L_{3211}$ and $L_{3212}$, which represents integrated luminance, is different from each area of the oblique line regions $L_{3201}$ and $L_{3202}$ in FIG. 32B. Accordingly, the original voltage and the overdrive voltage V may be changed in order to correct luminance difference depending on a scan position. As a method for correcting original voltage, the method shown in FIG. 23B can be used. As a method for correcting overdrive voltage, the method shown in FIG. 23D can be used. Thus, color shading and motion blur in displaying a moving image can be reduced.

Note that the driving methods shown in FIGS. 32B and 32C are similar in other areas. At this time, the amount of correction of the original voltage and the overdrive voltage in a pixel to which data is written at the end of each area is made to be the largest in the area to which the pixel belongs, so that sharp luminance difference at a boundary of areas can be corrected.

At least one of the methods of driving a display device according to this document can be used when a pixel provided in the display device includes a plurality of subpixels. At this time, reduction in display quality, such as motion blur, can be further reduced by driving with the lighting ratio R different in each subpixel.

When a pixel includes a plurality of subpixels, a function of the pixel can be extended, and properties of a display device can be improved. For example, the number of gray scales which the pixel can display can be increased by changing luminance in each subpixel and combining such luminance (i.e., area gray scale). In addition, when a display element is a liquid crystal element, there are problems such as reduction in contrast of display, color shift, and luminance inversion depending on an angle at which a display portion of the display device is seen (i.e., a narrow viewing angle). When the pixel includes a plurality of subpixels and voltages slightly different from each other are applied to each subpixel, a viewing angle of the display device can be increased. Accordingly, various beneficial effects can be obtained by a structure where each pixel provided in the display device includes a plurality of subpixels, and properties of the display device can be further improved by using the method described in this embodiment mode.

An example of a pixel including a plurality of subpixels is described with reference to FIG. 33A. A pixel 3350 shown in FIG. 33A includes a first subpixel 3351 and a second subpixel 3352. Here, the first subpixel 3351 and the second subpixel 3352 are also referred to as a subpixel I and a subpixel II.

A plurality of wirings are connected to the first subpixel 3351 and the second subpixel 3352, and various connection methods can be used. As a structure example of wirings connected to a plurality of subpixels, a structure shown in FIG. 33A can be used, for example. In the structure shown in FIG. 33A, a data line DATA which is a signal line for transmitting a data signal is connected to the plurality of subpixels in common. Further, scan lines $GATEI_n$ and $GATEII_n$ which are signal lines for selecting the subpixel I and the subpixel II are separately connected to respective subpixels. Here, n is a positive integer representing the number of scan lines.

Figure 33A:
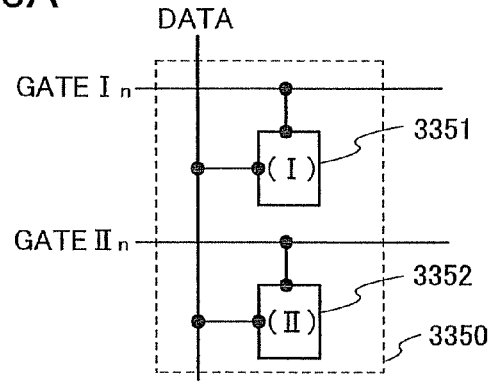
FIG. 33A is a diagram illustrating an example of a circuit structure of a semiconductor device in accordance with the present invention.

For a pixel structure, various structures other than the structure shown in FIG. 33A can be used. For example, the data lines DATA may be separately connected to a plurality of subpixels, and a scan line GATE may be connected to the plurality of subpixels in common. Alternatively, both the data lines DATA and the scan lines GATE may be separately connected to a plurality of subpixels. Here, description of structures other than the structure shown in FIG. 33A is omitted.

Note that the structures shown in FIGS. 9G and 9H can be used for the inside of the first subpixel 3351 and the second subpixel 3352.

As a method where a data signal is written to each subpixel, sequential scanning is usually performed. That is, $GATEI_1$, $GATEII_1$, $GATEI_2$, and $GATEII_2$ are sequentially selected, $GATEI_X$ and $GATEII_X$ are selected, and scanning finishes. Here, X represents the number of pixels in a perpendicular direction. This sequential scanning may be performed when writing scanning and blanking scanning are performed.

Figure 33B:
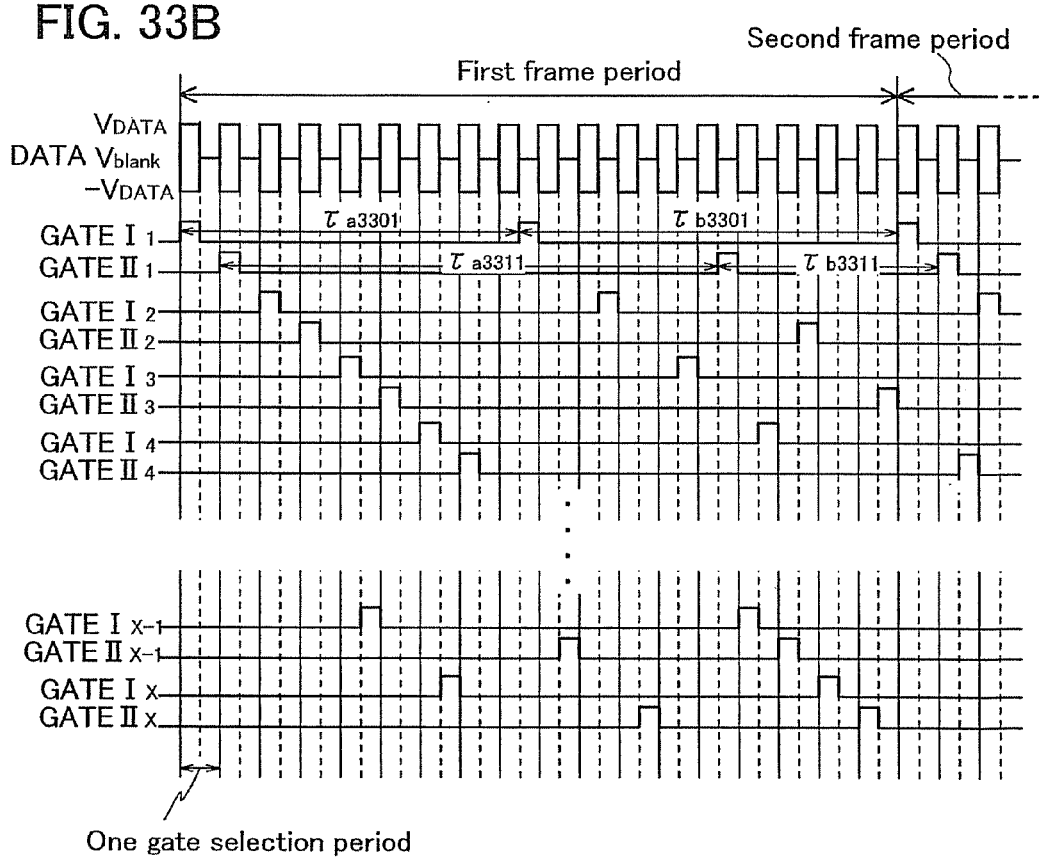
FIG. 33B is a diagram of an example of a timing chart of a semiconductor device in accordance with the present invention.

When writing scanning and blanking scanning are performed by a scanning method shown in FIG. 33B, driving with the lighting ratio R different in each subpixel can be realized.

FIG. 33B is a timing chart with a horizontal axis representing time and a vertical axis representing voltage with respect to each signal line. The data line DATA represents voltage written to a pixel. The scan lines $GATEI_n$ and $GATEII_n$ represent a non-selected state when at low level and a selected state when at high level.

In the scanning method shown in FIG. 33B, one gate selection period is divided into two periods, and the first half of one gate selection period represents a period in which a data signal is written to a pixel and the latter half thereof represents a period in which blanking data is written. In the first half of one gate selection period, a data signal is written to each pixel by sequentially scanning scan lines, whereas in the latter half of one gate selection period, the scan lines may be scanned with timing depending on the lighting ratio R of each subpixel without sequential scanning of the scan lines.

Specifically, after a data signal is written to $GATEI_1$, a data signal is written to $GATEII_1$ in the first half of the next gate selection period. Next, $GATEI_2$ and $GATEII_2$ are sequentially selected and scanned. Then, at the time when an image display period of $GATEI_1$ ends, blanking data is written to $GATEI_1$ in the latter half of the gate selection period. Then, at the time when an image display period of $GATEII_1$ ends, blanking data is written to $GATEII_1$ in the latter half of the gate selection period. In such a manner, writing scanning is sequentially performed and temporally-discrete blanking scanning is performed on each subpixel, so that driving with the lighting ratio R different in each subpixel can be realized. Further, an image display period $\tau_{a3301}$ of the scan line $GAIEI_n$ at this time is a period from writing scanning to blanking scanning, and a blanking interval $\tau_{b3301}$ is a period from blanking scanning to writing scanning in the next frame. Similarly, an image display period $\tau_{a3311}$ of the scan line $GATEII_n$ is a period from writing scanning to blanking scanning, and a blanking interval $\tau_{b3311}$ is a period from blanking scanning to writing scanning in the next frame.

Here, a data signal is written to a pixel in the first half of one gate selection period, and blanking data is written to the pixel in the latter half thereof; on the contrary, blanking data may be written to a pixel in the first half of one gate selection period and a data signal may be written to the pixel in the latter half thereof.

Voltage $V_{blank}$ of blanking data may vary in a period when blanking data is written to the subpixel I and a period when blanking data is written to the subpixel II. Accordingly, luminance of a pixel in the blanking interval may freely vary in each subpixel.

In particular, a method where the lighting ratio R can vary in each subpixel is beneficial to a display device in which a viewing angle is increased by displaying a bright image in one of subpixels and a dark image in the other of the subpixels. This is because an effect of reducing motion blur can be obtained in a bright pixel in which motion blur is likely to be seen and a gray scale on the lower gray scale level can be sufficiently displayed in a dark pixel in which a gray scale on the lower gray scale level is likely to be damaged, by reducing the lighting ratio R in a subpixel for displaying a bright image and increasing the lighting ratio R in a subpixel for displaying a dark image.

As an example where the lighting ratio R freely varies in each subpixel, the length of image display periods $\tau_{a3401}$ and $\tau_{a3402}$ of the subpixel I can be different from the length of image display periods $\tau_{a3411}$ and $\tau_{a3412}$ of the subpixel II, as shown in FIGS. 34A and 34B. Accordingly, an effect of reducing motion blur can be obtained in a bright pixel in which motion blur is likely to be seen and a gray scale on the lower gray scale level can be sufficiently displayed in a dark pixel in which a gray scale on the lower gray scale level is likely to be damaged.

FIG. 34A is a graph showing timing of writing data and timing of writing blanking date in the first frame period and the second frame period on the same time axis with respect to a position of a scan line. The image display periods of the subpixel I in the first frame period and the second frame period are denoted by $\tau_{a3401}$ and $\tau_{a3402}$. Blanking intervals of the subpixel I in the first frame period and the second frame period are denoted by $\tau_{b3401}$ and $\tau_{b3402}$. The image display periods of the subpixel II in the first frame period and the second frame period are denoted by $\tau_{a3411}$ and $\tau_{a3412}$. Blanking intervals of the subpixel II in the first frame period and the second frame period are denoted by $\tau_{b3411}$ and $\tau_{b3412}$.

FIG. 34BI is a graph showing original voltage $V_{S3401}$ and overdrive voltages $V_{OD3401}$ and $V_{OD3402}$ written to each pixel, and transmittance with respect to each voltage in the first frame period and the second frame period on the same time axis. Here, the image display periods and the blanking intervals in the first frame period and the second frame period are similar to those in FIG. 34A. Each of voltage $V_{3401}$ and voltage $V_{3402}$ is overdrive intensity in the image display periods in the first frame period and the second frame period, and $V_{3401}=V_{OD3401}-V_{S3401}$ and $V_{3402}=V_{OD3402}-V_{S3401}$ are satisfied.

FIG. 34BII is a graph showing original voltage $V_{S3411}$ and overdrive voltages $V_{OD3411}$ and $V_{OD3412}$ written to each pixel, and transmittance with respect to each voltage in the first frame period and the second frame period on the same time axis. Here, the image display periods and the blanking intervals in the first frame period and the second frame period are similar to those in FIG. 34A. Each of voltage $V_{3411}$ and voltage $V_{3412}$ is overdrive intensity in the image display periods in the first frame period and the second frame period, and $V_{3411}=V_{OD3411}-V_{S3411}$ and $V_{3412}=V_{OD3412}-V_{S3411}$ are satisfied.

As shown in FIG. 34B, when the lighting ratio R varies in the subpixel I and the subpixel II, it is preferable to reduce the overdrive intensity in each frame as the lighting ratio R increases. This is because increase in the lighting ratio R means increase in length of the image display period $\tau_a$, and increase in length of the image display period $\tau_a$ can be allowed to have a longer period of time for reaching intended transmittance of a liquid crystal element. Moreover, when the length of the image display period $\tau_a$ is increased, intended transmittance of a liquid crystal element itself can be reduced, so that the original voltage $V_S$ is reduced, and further, the overdrive intensity can be reduced.

Note that transmittance at or around the time when each frame ends changes depending on the length of the blanking interval. Specifically, the transmittance at or around the time when each frame ends increases as the blanking interval is reduced. Thus, it is preferable to further reduce overdrive intensity of one frame as the blanking interval of the previous frame is shorter.

In addition, difference in the lighting ratio R of the subpixels I and II is preferably determined in accordance with the control parameter P. Specifically, it is preferable to increase difference in the lighting ratio R of the subpixels I and II as the control parameter P increases. This is because an effect of reducing motion blur can be obtained in a bright pixel in which motion blur is likely to be seen, whereas a gray scale on the lower gray scale level can be sufficiently displayed in a dark pixel in which a gray scale on the lower gray scale level is likely to be damaged.

Other examples of a method where the lighting ratio R can vary between subpixels include a method where the lighting ratio R is changed in one of subpixels and not changed in the other of the subpixels in accordance with the magnitude of the control parameters P and Q (see FIGS. 35A and 35B), and a method where the lighting ratio R is changed in one of subpixels and is also changed in the other of the subpixels in accordance with the magnitude of the control parameters P and Q (see FIGS. 36A and 36B). Thus, an optimal driving method in accordance with a state of an image can be set. Specifically, since a bright subpixel can increase the whole luminance and has a property that motion blur is likely to be seen, it is preferable to reduce the lighting ratio R as the control parameter P increases. Since a dark subpixel cannot sufficiently display a gray scale on the lower gray scale level and has a property that motion blur is not likely to be seen, motion blur is hardly seen even when the control parameter P increases. Thus, when the control parameter P increases, the lighting ratio R can be increased. By increasing the lighting ratio R, a gray scale on the lower gray scale level can be sufficiently displayed in a dark pixel in which a gray scale on the lower gray scale level is likely to be damaged. Accordingly, it is very beneficial to optimally control the lighting ratio R with respect to the control parameter P depending on properties of each subpixel.

Note that optimal driving can also be realized by changing backlight luminance at this time. For example, when the level of a data signal written to a pixel is the same, luminance which human eyes perceive becomes lower as the image display period $\tau_a$ becomes shorter and the blanking interval $\tau_b$ becomes longer. Accordingly, in accordance with the length of the image display period $\tau_a$ and the length of the blanking interval $\tau_b$ (i.e., the lighting ratio R), the backlight luminance is reduced when the lighting ratio R is high, whereas the backlight luminance is increased when the lighting ratio R is low; thus, luminance which human eyes perceive can be constant. Further, the lighting ratio R preferably depends on the control parameters P and Q described in Embodiment Mode 3. This is because the lighting ratio R can be controlled as appropriate by perceivability of motion blur in an image to be displayed.

FIG. 35A is a graph showing timing of writing data and timing of writing blanking data in the first frame period and the second frame period on the same time axis with respect to a position of a scan line. Image display periods of the subpixel I in the first frame period and the second frame period are denoted by $\tau_{a3501}$ and $\tau_{a3502}$. Blanking intervals of the subpixel I in the first frame period and the second frame period are denoted by $\tau_{b3501}$ and $T_{b3502}$. Image display periods of the subpixel II in the first frame period and the second frame period are denoted by $\tau_{a3511}$ and $\tau_{a3512}$. Blanking intervals of the subpixel II in the first frame period and the second frame period are denoted by $\tau_{b3511}$ and $\tau_{b3512}$.

FIG. 35BI is a graph showing original voltages $V_{S3501}$ and $V_{S3502}$ and overdrive voltages $V_{OD3501}$ and $V_{OD3502}$ written to each pixel, and transmittance with respect to each voltage on the same time axis when the lighting ratio R is different in the first frame period and the second frame period. Here, image display periods and blanking intervals in the first frame period and the second frame period are similar to those in FIG. 35A. Each area of oblique line regions $L_{3501}$ and $L_{3502}$ represents the level of luminance which human eyes perceive (integrated luminance). Each of voltage $V_{3501}$ and voltage $V_{3502}$ is overdrive intensity in the image display periods in the first frame period and the second frame period, and $V_{3501}=V_{OD3501}-V_{S3501}$ and $V_{3502}=V_{OD3502}-V_{S3502}$ are satisfied.

FIG. 35BII is a graph showing original voltage $V_{S3511}$ and overdrive voltages $V_{OD3511}$ and $V_{OD3512}$ written to each pixel, and transmittance with respect to each voltage in the first frame period and the second frame period on the same time axis. Here, image display periods and blanking intervals in the first frame period and the second frame period are similar to those in FIG. 35A. Each of voltage $V_{3511}$ and voltage $V_{3512}$ is overdrive intensity in the image display periods in the first frame period and the second frame period, and $V_{3511}=V_{OD3511}-V_{S3511}$ and $V_{3512}=V_{OD3512}-V_{S3511}$ are satisfied.

In FIG. 35BI, the area of the oblique line region $L_{3501}$ and the area of the oblique line region $L_{3502}$ are made approximately the same by controlling the original voltage and the overdrive voltage as appropriate, so that luminance which human eyes perceive can be approximately the same even when the lighting ratio R is different.

FIG. 36A is a graph showing timing of writing data and timing of writing blanking data in the first frame period and the second frame period on the same time axis with respect to a position of a scan line. Image display periods of the subpixel I in the first frame period and the second frame period are denoted by $\tau_{a3601}$ and $\tau_{a3602}$. Blanking intervals of the subpixel I in the first frame period and the second frame period are denoted by $\tau_{b3601}$ and $\tau_{b3602}$. Image display periods of the subpixel II in the first frame period and the second frame period are denoted by $\tau_{a3611}$ and $\tau_{a3612}$. Blanking intervals of the subpixel II in the first frame period and the second frame period are denoted by $\tau_{b3611}$ and $\tau_{b3612}$.

FIG. 36BI is a graph showing original voltages $V_{S3601}$ and $V_{S3602}$ and overdrive voltages $V_{OD3601}$ and $V_{OD3602}$ written to each pixel, and transmittance with respect to each voltage on the same time axis when the lighting ratio R is different in the first frame period and the second frame period. Here, image display periods and blanking intervals in the first frame period and the second frame period are similar to those in FIG. 36A. Each area of oblique line regions $L_{3601}$ and $L_{3602}$ represents the level of luminance which human eyes perceive (integrated luminance). Each of voltage $V_{3601}$ and voltage $V_{3602}$ is overdrive intensity in the image display periods in the first frame period and the second frame period, and $V_{3601}=V_{OD3601}-V_{S3601}$ and $V_{3602}=V_{OD3602}-V_{S3602}$ are satisfied.

FIG. 36BII is a graph showing original voltages $V_{S3611}$ and $V_{S3612}$ and overdrive voltages $V_{OD3611}$ and $V_{OD3612}$ written to each pixel, and transmittance with respect to each voltage on the same time axis when the lighting ratio R is different in the first frame period and the second frame period. Here, backlight lighting periods and blanking intervals in the first frame period and the second frame period are similar to those in FIG. 36A. Each area of oblique line regions $L_{3611}$ and $L_{3612}$ represents the level of luminance which human eyes perceive (integrated luminance). Each of voltage $V_{3611}$ and voltage $V_{3612}$ is overdrive intensity in image display periods in the first frame period and the second frame period, and $V_{3611}=V_{OD3611}-V_{S3611}$ and $V_{3612}=V_{OD3612}-V_{S3612}$ are satisfied.

In FIG. 36BI, the area of the oblique line region $L_{3601}$ and the area of the oblique line region $L_{3602}$ are made approximately the same by controlling the original voltage and the overdrive voltage as appropriate, so that luminance which human eyes perceive can be approximately the same even when the lighting ratio R is different.

In FIG. 36BII also, the area of the oblique line region $L_{3611}$ and the area of the oblique line region $L_{3612}$ are made approximately the same by controlling the original voltage and the overdrive voltage as appropriate, so that luminance which human eyes perceive can be approximately the same even when the lighting ratio R is different.

Note that the methods shown in FIGS. 35A, 35B, 36A, and 36B, it is effective to combine the method where the lighting ratio R freely varies between subpixels with the control parameter P described in another embodiment mode. For example, by increasing difference between the lighting ratios R of the subpixels as the control parameter P increases, an effect of reducing motion blur can be obtained in a bright pixel in which motion blur is likely to be seen and a gray scale on the lower gray scale level can be sufficiently displayed in a dark pixel in which a gray scale on the lower gray scale level is likely to be damaged.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 5

In this embodiment mode, a pixel structure of a display device is described. In particular, a pixel structure of a liquid crystal display device is described.

A pixel structure in the case where each liquid crystal mode and a transistor are combined is described with reference to cross-sectional views of a pixel.

Note that as the transistor, a thin film transistor (a TFT) or the like including a non-single crystalline semiconductor layer typified by amorphous silicon, polycrystalline silicon, micro crystalline (also referred to as semi-amorphous) silicon, or the like can be used.

As a structure of the transistor, a top-gate structure, a bottom-gate structure, or the like can be used. Note that a channel-etched transistor, a channel-protective transistor, or the like can be used as a bottom-gate transistor.

Figure 37:
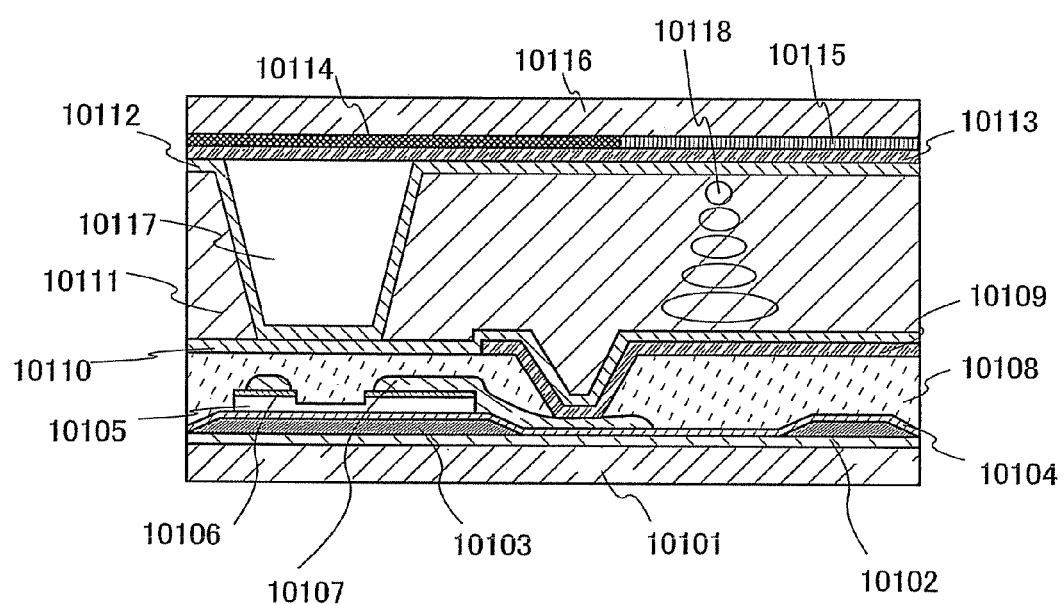
FIG. 37 is a view illustrating an example of a cross-sectional view of a semiconductor device in accordance with the present invention.

FIG. 37 is an example of a cross-sectional view of a pixel in the case where a TN mode and a transistor are combined. By applying the pixel structure shown in FIG. 37 to a liquid crystal display device, a liquid crystal display device can be formed at low cost.

Features of the pixel structure shown in FIG. 37 are described. Liquid crystal molecules 10118 shown in FIG. 37 are long and narrow molecules each having a major axis and a minor axis. In FIG. 37, a direction of each of the liquid crystal molecules 10118 is expressed by the length thereof. That is, the direction of the major axis of the liquid crystal molecule 10118, which is expressed as long, is parallel to the page, and as the liquid crystal molecule 10118 is expressed to be shorter, the direction of the major axis becomes closer to a normal direction of the page. That is, among the liquid crystal molecules 10118 shown in FIG. 37, the direction of the major axis of the liquid crystal molecule 10118 which is close to the first substrate 10101 and the direction of the major axis of the liquid crystal molecule 10118 which is close to the second substrate 10116 are different from each other by 90 degrees, and the directions of the major axes of the liquid crystal molecules 10118 located therebetween are arranged so as to link the above two directions smoothly. That is, the liquid crystal molecules 10118 shown in FIG. 37 are aligned to be twisted by 90 degrees between the first substrate 10101 and the second substrate 10116.

Here, the case is described in which a bottom-gate transistor using an amorphous semiconductor is used as the transistor. In the case where a transistor using an amorphous semiconductor is used, a liquid crystal display device can be formed at low cost by using a large substrate.

A liquid crystal display device includes a basic portion displaying images, which is called a liquid crystal panel. The liquid crystal panel is manufactured as follows: two processed substrates are attached to each other with a gap of several μm therebetween, and a liquid crystal material is injected into a space between the two substrates. In FIG. 37, the two substrates correspond to the first substrate 10101 and the second substrate 10116. A transistor and a pixel electrode are formed over the first substrate. A light-shielding film 10114, a color filter 10115, a fourth conductive layer 10113, a spacer 10117, and a second alignment film 10112 are formed on the second substrate.

The light-shielding film 10114 is not necessarily formed on the second substrate 10116. When the light-shielding film 10114 is not formed, the number of steps is reduced, so that manufacturing cost can be reduced. In addition, since a structure is simple, yield can be improved. On the other hand, when the light-shielding film 10114 is formed, a display device with little light leakage at the time of black display can be obtained.

The color filter 10115 is not necessarily formed on the second substrate 10116. When the color filter 10115 is not formed, the number of steps is reduced, so that manufacturing cost can be reduced. In addition, since a structure is simple, yield can be improved. Note that even when the color filter 10115 is not formed, a display device which can perform color display can be obtained by field sequential driving. On the other hand, needless to say, when the color filter 10115 is formed, a display device which can perform color display can be obtained.

Spherical spacers may be dispersed on the second substrate 10116 instead of forming the spacer 10117. When the spherical spacers are dispersed, the number of steps is reduced, so that manufacturing cost can be reduced. In addition, since a structure is simple, yield can be improved. On the other hand, when the spacer 10117 is formed, a distance between the two substrates can be uniform because a position of the spacer is not varied, so that a display device with little display unevenness can be obtained.

Subsequently, a process to be performed to the first substrate 10101 is described.

First, a first insulating film 10102 is formed over the first substrate 10101 by sputtering, a printing method, a coating method, or the like. The first insulating film 10102 has a function of preventing change in characteristics of the transistor due to an impurity from the substrate which affects a semiconductor layer. Note that the first insulating film 10102 is not necessarily formed.

Next, a first conductive layer 10103 is formed over the first insulating film 10102 by photolithography, a laser direct writing method, an inkjet method, or the like.

Next, a second insulating film 10104 is formed over the entire surface by sputtering, a printing method, a coating method, or the like. The second insulating film 10104 has a function of preventing change in characteristics of the transistor due to an impurity from the substrate which affects the semiconductor layer.

Next, a first semiconductor layer 10105 and a second semiconductor layer 10106 are formed. Note that the first semiconductor layer 10105 and the second semiconductor layer 10106 are formed sequentially and shapes thereof are processed at the same time.

Next, a second conductive layer 10107 is formed by photolithography, a laser direct writing method, an inkjet method, or the like. Note that as a method for etching which processes a shape of the second conductive layer 10107, dry etching is preferable. Note that as the second conductive layer 10107, a light-transmitting material may be used or a reflective material may be used.

Next, a channel region of the transistor is formed. Here, an example of a step thereof is described. The second semiconductor layer 10106 is etched by using the second conductive layer 10107 as a mask. Alternatively, the second semiconductor layer 10106 is etched by using a mask for processing the shape of the second conductive layer 10107. Then, the first conductive layer 10103 at a position where the second semiconductor layer 10106 is removed serves as the channel region of the transistor. Thus, the number of masks can be reduced, so that manufacturing cost can be reduced.

Next, a third insulating film 10108 is formed and a contact hole is selectively formed in the third insulating film 10108. Note that a contact hole may be formed also in the second insulating film 10104 at the same time as forming the contact hole in the third insulating film 10108. Note also that a surface of the third insulating film 10108 is preferably as even as possible. This is because alignment of the liquid crystal molecules are affected by unevenness of a surface with which the liquid crystal is in contact.

Next, a third conductive layer 10109 is formed by photolithography, a laser direct writing method, an inkjet method, or the like.

Next, a first alignment film 10110 is formed. Note that after the first alignment film 10110 is formed, rubbing may be performed so as to control the alignment of the liquid crystal molecules. Rubbing is a step of forming stripes on an alignment film by rubbing the alignment film with a cloth. By performing rubbing, the alignment film can have alignment properties.

The first substrate 10101 which is manufactured as described above and the second substrate 10116 on which the light-shielding film 10114, the color filter 10115, the fourth conductive layer 10113, the spacer 10117, and the second alignment film 10112 are formed are attached to each other by a sealant with a gap of several μm therebetween. Then, liquid crystals 10111 which include the liquid crystal molecules 10118 are injected into a space between the two substrates. Note that in the TN mode, the fourth conductive layer 10113 is formed over the entire surface of the second substrate 10116.

Figure 38A:
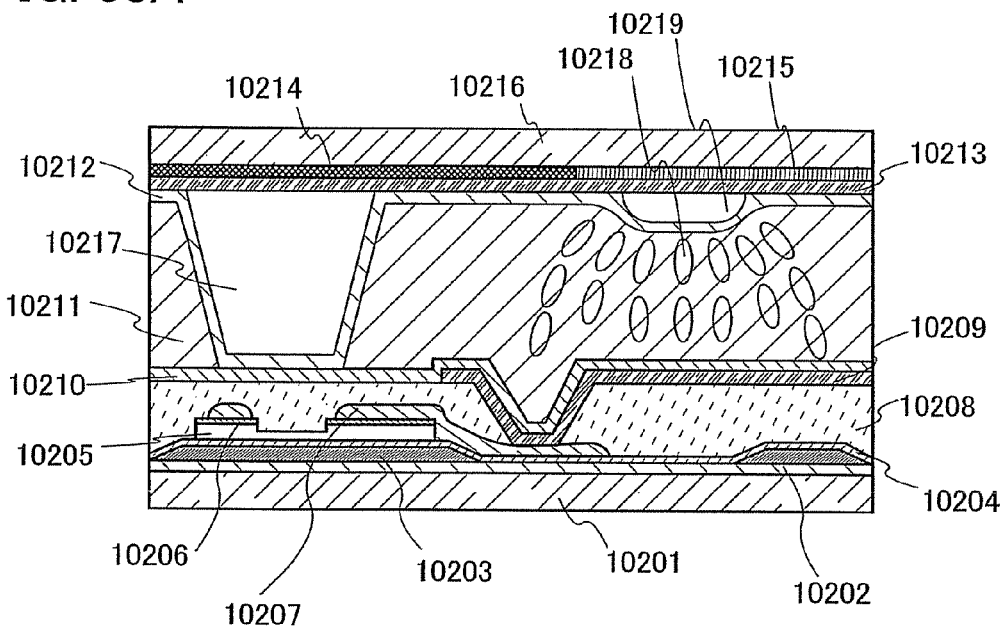
FIGS. 38A and 38B are views each illustrating an example of a cross-sectional view of a semiconductor device in accordance with the present invention.

FIG. 38A is an example of a cross-sectional view of a pixel in the case where an MVA (Multi-domain Vertical Alignment) mode and a transistor are combined. By applying the pixel structure shown in FIG. 38A to a liquid crystal display device, a liquid crystal display device having a wide viewing angle, high response speed, and high contrast can be obtained.

Features of the pixel structure of an MVA-mode liquid crystal panel shown in FIG. 38A are described. Liquid crystal molecules 10218 shown in FIG. 38A are long and narrow molecules each having a major axis and a minor axis. In FIG. 38A, a direction of each of the liquid crystal molecules 10218 is expressed by the length thereof. That is, the direction of the major axis of the liquid crystal molecule 10218, which is expressed as long, is parallel to the page, and as the liquid crystal molecule 10218 is expressed to be shorter, the direction of the major axis becomes closer to a normal direction of the page. That is, the liquid crystal molecules 10218 shown in FIG. 38A are aligned such that the direction of the major axis is normal to the alignment film. Thus, the liquid crystal molecules 10218 at a position where an alignment control projection 10219 is formed are aligned radially with the alignment control projection 10219 as a center. With this state, a liquid crystal display device having a wide viewing angle can be obtained.

Here, the case is described in which a bottom-gate transistor using an amorphous semiconductor is used as the transistor. In the case where a transistor using an amorphous semiconductor is used, a liquid crystal display device can be formed at low cost by using a large substrate.

A liquid crystal display device includes a basic portion displaying images, which is called a liquid crystal panel. The liquid crystal panel is manufactured as follows: two processed substrates are attached to each other with a gap of several μm therebetween, and a liquid crystal material is injected into a space between the two substrates. In FIG. 38A, the two substrates correspond to the first substrate 10201 and the second substrate 10216. A transistor and a pixel electrode are formed over the first substrate. A light-shielding film 10214, a color filter 10215, a fourth conductive layer 10213, a spacer 10217, a second alignment film 10212, and an alignment control projection 10219 are formed on the second substrate.

The light-shielding film 10214 is not necessarily formed on the second substrate 10216. When the light-shielding film 10214 is not formed, the number of steps is reduced, so that manufacturing cost can be reduced. In addition, since a structure is simple, yield can be improved. On the other hand, when the light-shielding film 10214 is formed, a display device with little light leakage at the time of black display can be obtained.

The color filter 10215 is not necessarily formed on the second substrate 10216. When the color filter 10215 is not formed, the number of steps is reduced, so that manufacturing cost can be reduced. In addition, since a structure is simple, yield can be improved. Note that even when the color filter 10215 is not formed, a display device which can perform color display can be obtained by field sequential driving. On the other hand, needless to say, when the color filter 10215 is formed, a display device which can perform color display can be obtained.

Spherical spacers may be dispersed on the second substrate 10216 instead of forming the spacer 10217. When the spherical spacers are dispersed, the number of steps is reduced, so that manufacturing cost can be reduced. In addition, since a structure is simple, yield can be improved. On the other hand, when the spacer 10217 is formed, a distance between the two substrates can be uniform because a position of the spacer is not varied, so that a display device with little display unevenness can be obtained.

Subsequently, a process to be performed to the first substrate 10201 is described.

First, a first insulating film 10202 is formed over the first substrate 10201 by sputtering, a printing method, a coating method, or the like. The first insulating film 10202 has a function of preventing change in characteristics of the transistor due to an impurity from the substrate which affects a semiconductor layer. Note that the first insulating film 10202 is not necessarily formed.

Next, a first conductive layer 10203 is formed over the first insulating film 10202 by photolithography, a laser direct writing method, an inkjet method, or the like.

Next, a second insulating film 10204 is formed over the entire surface by sputtering, a printing method, a coating method, or the like. The second insulating film 10204 has a function of preventing change in characteristics of the transistor due to an impurity from the substrate which affects the semiconductor layer.

Next, a first semiconductor layer 10205 and a second semiconductor layer 10206 are formed. Note that the first semiconductor layer 10205 and the second semiconductor layer 10206 are formed sequentially and shapes thereof are processed at the same time.

Next, a second conductive layer 10207 is formed by photolithography, a laser direct writing method, an inkjet method, or the like. Note that as a method for etching which processes a shape of the second conductive layer 10207, dry etching is preferable. Note that as the second conductive layer 10207, a light-transmitting material may be used or a reflective material may be used.

Next, a channel region of the transistor is formed. Here, an example of a step thereof is described. The second semiconductor layer 10206 is etched by using the second conductive layer 10207 as a mask. Alternatively, the second semiconductor layer 10206 is etched by using a mask for processing the shape of the second conductive layer 10207. Then, the first conductive layer 10203 at a position where the second semiconductor layer 10206 is removed serves as the channel region of the transistor. Thus, the number of masks can be reduced, so that manufacturing cost can be reduced.

Next, a third insulating film 10208 is formed and a contact hole is selectively formed in the third insulating film 10208. Note that a contact hole may be formed also in the second insulating film 10204 at the same time as forming the contact hole in the third insulating film 10208.

Next, a third conductive layer 10209 is formed by photolithography, a laser direct writing method, an inkjet method, or the like.

Next, a first alignment film 10210 is formed. Note that after the first alignment film 10210 is formed, rubbing may be performed so as to control the alignment of the liquid crystal molecules. Rubbing is a step of forming stripes on an alignment film by rubbing the alignment film with a cloth. By performing rubbing, the alignment film can have alignment properties.

The first substrate 10201 which is manufactured as described above and the second substrate 10216 on which the light-shielding film 10214, the color filter 10215, the fourth conductive layer 10213, the spacer 10217, and the second alignment film 10212 are manufactured are attached to each other by a sealant with a gap of several μm therebetween. Then, liquid crystals 10211 which include the liquid crystal molecules 10218 are injected into a space between the two substrates. Note that in the MVA mode, the fourth conductive layer 10213 is formed over the entire surface of the second substrate 10216. In addition, the alignment control projection 10219 is formed so as to be in contact with the fourth conductive layer 10213. The alignment control projection 10219 preferably has a shape with a smooth curved surface. Thus, since alignment of the adjacent liquid crystal molecules 10218 is extremely similar, an alignment defect can be reduced. Further, a defect of the alignment film caused by breaking of the alignment film can be reduced.

Figure 38B:
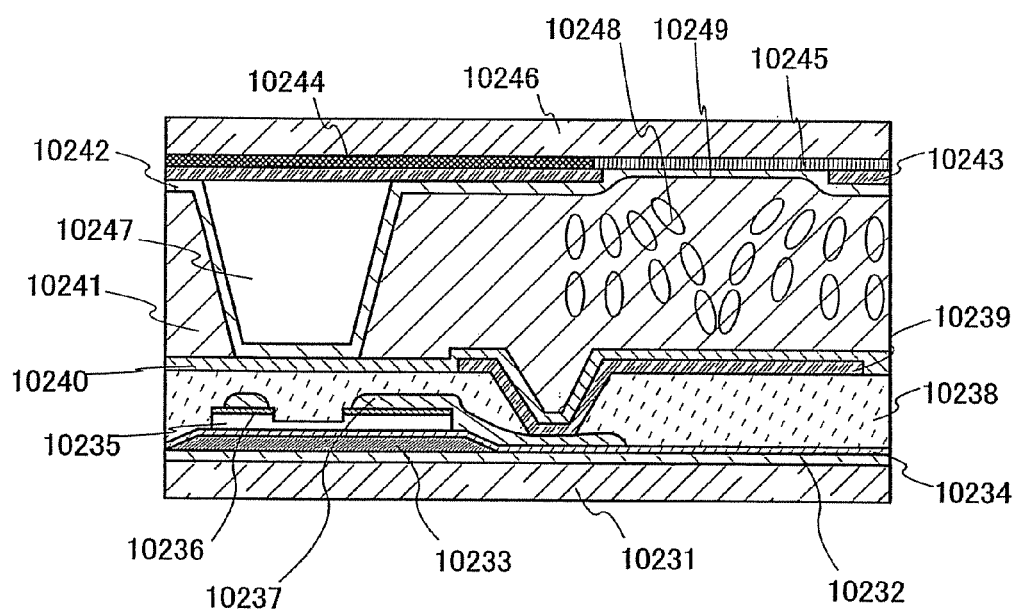

FIG. 38B is an example of a cross-sectional view of a pixel in the case where a PVA (Patterned Vertical Alignment) mode and a transistor are combined. By applying the pixel structure shown in FIG. 38B to a liquid crystal display device, a liquid crystal display device having a wide viewing angle, high response speed, and high contrast can be obtained.

Features of the pixel structure shown in FIG. 38B are described. Liquid crystal molecules 10248 shown in FIG. 38B are long and narrow molecules each having a major axis and a minor axis. In FIG. 38B, direction of each of the liquid crystal molecules 10248 is expressed by the length thereof. That is, the direction of the major axis of the liquid crystal molecule 10248, which is expressed as long, is parallel to the page, and as the liquid crystal molecule 10248 is expressed to be shorter, the direction of the major axis becomes closer to a normal direction of the page. That is, the liquid crystal molecules 10248 shown in FIG. 38B are aligned such that the direction of the major axis is normal to the alignment film. Thus, the liquid crystal molecules 10248 at a position where an electrode cutout portion 10249 is formed are aligned radially with a boundary of the electrode cutout portion 10249 and the fourth conductive layer 10243 as a center. With this state, a liquid crystal display device having a wide viewing angle can be obtained.

Here, the case is described in which a bottom-gate transistor using an amorphous semiconductor is used as the transistor. In the case where a transistor using an amorphous semiconductor is used, a liquid crystal display device can be formed at low cost by using a large substrate.

A liquid crystal display device includes a basic portion displaying images, which is called a liquid crystal panel. The liquid crystal panel is manufactured as follows: two processed substrates are attached to each other with a gap of several μm therebetween, and a liquid crystal material is injected into a space between the two substrates. In FIG. 38B, the two substrates correspond to the first substrate 10231 and the second substrate 10246. A transistor and a pixel electrode are formed over the first substrate. A light-shielding film 10244, a color filter 10245, a fourth conductive layer 10243, a spacer 10247, and a second alignment film 10242 are formed on the second substrate.

The light-shielding film 10244 is not necessarily formed on the second substrate 10246. When the light-shielding film 10244 is not formed, the number of steps is reduced, so that manufacturing cost can be reduced. In addition, since a structure is simple, yield can be improved. On the other hand, when the light-shielding film 10244 is formed, a display device with little light leakage at the time of black display can be obtained.

The color filter 10245 is not necessarily formed on the second substrate 10246. When the color filter 10245 is not formed, the number of steps is reduced, so that manufacturing cost can be reduced. In addition, since a structure is simple, yield can be improved. Note that even when the color filter 10245 is not formed, a display device which can perform color display can be obtained by field sequential driving. On the other hand, needless to say, when the color filter 10245 is formed, a display device which can perform color display can be obtained.

Spherical spacers may be dispersed on the second substrate 10246 instead of forming the spacer 10247. When the spherical spacers are dispersed, the number of steps is reduced, so that manufacturing cost can be reduced. In addition, since a structure is simple, yield can be improved. On the other hand, when the spacer 10247 is formed, a distance between the two substrates can be uniform because a position of the spacer is not varied, so that a display device with little display unevenness can be obtained.

Subsequently, a process to be performed to the first substrate 10231 is described.

First, a first insulating film 10232 is formed over the first substrate 10231 by sputtering, a printing method, a coating method, or the like. The first insulating film 10232 has a function of preventing change in characteristics of the transistor due to an impurity from the substrate which affects a semiconductor layer. Note that the first insulating film 10232 is not necessarily formed.

Next, a first conductive layer 10233 is formed over the first insulating film 10232 by photolithography, a laser direct writing method, an inkjet method, or the like.

Next, a second insulating film 10234 is formed over the entire surface by sputtering, a printing method, a coating method, or the like. The second insulating film 10234 has a function of preventing change in characteristics of the transistor due to an impurity from the substrate which affects the semiconductor layer.

Next, a first semiconductor layer 10235 and a second semiconductor layer 10236 are formed. Note that the first semiconductor layer 10235 and the second semiconductor layer 10236 are formed sequentially and shapes thereof are processed at the same time.

Next, a second conductive layer 10237 is formed by photolithography, a laser direct writing method, an inkjet method, or the like. Note that as a method for etching which processes a shape of the second conductive layer 10237, dry etching is preferable. Note that as the second conductive layer 10237, a light-transmitting material may be used or a reflective material may be used.

Next, a channel region of the transistor is formed. Here, an example of a step thereof is described. The second semiconductor layer 10236 is etched by using the second conductive layer 10237 as a mask. Alternatively, the second semiconductor layer 10236 is etched by using a mask for processing the shape of the second conductive layer 10237. Then, the first conductive layer 10233 at a position where the second semiconductor layer 10236 is removed serves as the channel region of the transistor. Thus, the number of masks can be reduced, so that manufacturing cost can be reduced.

Next, a third insulating film 10238 is formed and a contact hole is selectively formed in the third insulating film 10238. Note that a contact hole may be formed also in the second insulating film 10234 at the same time as forming the contact hole in the third insulating film 10238. Note also that a surface of the third insulating film 10238 is preferably as even as possible. This is because alignment of the liquid crystal molecules are affected by unevenness of a surface with which the liquid crystal is in contact.

Next, a third conductive layer 10239 is formed by photolithography, a laser direct writing method, an inkjet method, or the like.

Next, a first alignment film 10240 is formed. Note that after the first alignment film 10240 is formed, rubbing may be performed so as to control the alignment of the liquid crystal molecules. Rubbing is a step of forming stripes on an alignment film by rubbing the alignment film with a cloth. By performing rubbing, the alignment film can have alignment properties.

The first substrate 10231 which is manufactured as described above and the second substrate 10246 on which the light-shielding film 10244, the color filter 10245, the fourth conductive layer 10243, the spacer 10247, and the second alignment film 10242 are manufactured are attached to each other by a sealant with a gap of several μm therebetween. Then, liquid crystals 10241 which include the liquid crystal molecules 10248 are injected into a space between the two substrates. Note that in the PVA mode, the fourth conductive layer 10243 is patterned and is provided with the electrode cutout portion 10249. Although a shape of the electrode cutout portion 10249 is not particularly limited, the electrode cutout portion 10249 preferably has a shape in which a plurality of rectangles having different directions are combined. Thus, since a plurality of regions having different alignment can be formed, a liquid crystal display device having a wide viewing angle can be obtained. Note that the fourth conductive layer 10243 at the boundary between the electrode cutout portion 10249 and the fourth conductive layer 10243 preferably has a shape with a smooth curved surface. Thus, since alignment of the adjacent liquid crystal molecules 10248 is extremely similar, an alignment defect is reduced. Further, a defect of the alignment film caused by breaking of the second alignment film 10242 by the electrode cutout portion 10249 can be prevented.

Figure 39A:
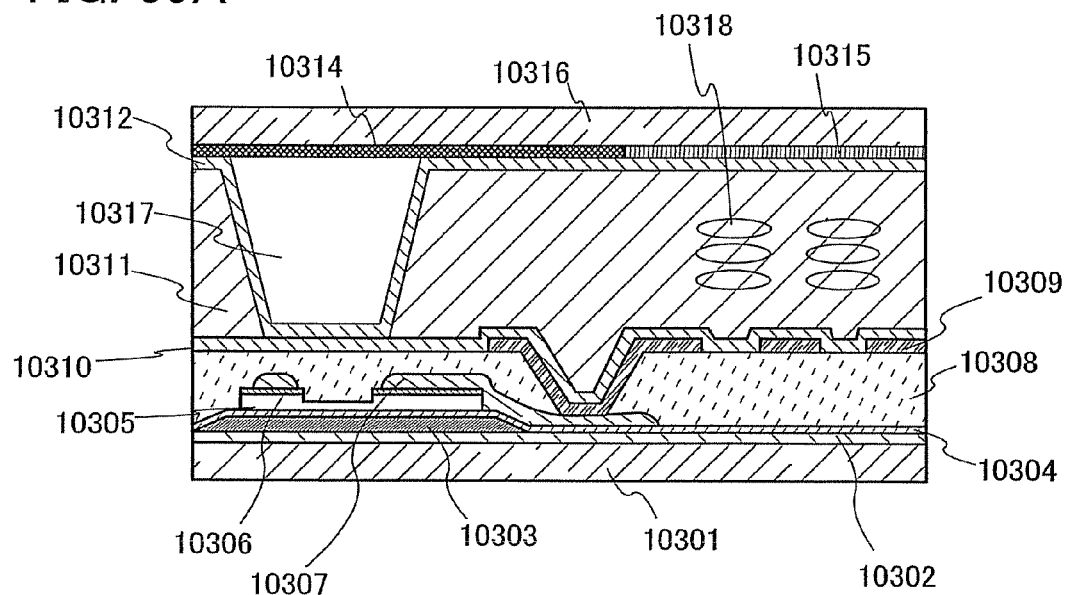
FIGS. 39A and 39B are views each illustrating an example of a cross-sectional view of a semiconductor device in accordance with the present invention.

FIG. 39A is an example of a cross-sectional view of a pixel in the case where an IPS (In-Plane-Switching) mode and a transistor are combined. By applying the pixel structure shown in FIG. 39A to a liquid crystal display device, a liquid crystal display device theoretically having a wide viewing angle and response speed which has low dependency on a gray scale can be obtained.

Features of the pixel structure shown in FIG. 39A are described. Liquid crystal molecules 10318 shown in FIG. 39A are long and narrow molecules each having a major axis and a minor axis. In FIG. 39A, a direction of each of the liquid crystal molecules 10318 is expressed by the length thereof. That is, the direction of the major axis of the liquid crystal molecule 10318, which is expressed as long, is parallel to the page, and as the liquid crystal molecule 10318 is expressed to be shorter, the direction of the major axis becomes closer to a normal direction of the page. Each of the liquid crystal molecules 10318 shown in FIG. 39A is aligned so that the direction of the major axis thereof is always horizontal to the substrate. Although FIG. 39A shows alignment with no electric field, when an electric field is applied to each of the liquid crystal molecules 10318, each of the liquid crystal molecules 10318 rotates in a horizontal plane as the direction of the major axis thereof is always horizontal to the substrate. With this state, a liquid crystal display device having a wide viewing angle can be obtained.

Here, the case is described in which a bottom-gate transistor using an amorphous semiconductor is used as the transistor. In the case where a transistor using an amorphous semiconductor is used, a liquid crystal display device can be formed at low cost by using a large substrate.

A liquid crystal display device includes a basic portion displaying images, which is called a liquid crystal panel. The liquid crystal panel is manufactured as follows: two processed substrates are attached to each other with a gap of several μm therebetween, and a liquid crystal material is injected into a space between the two substrates. In FIG. 39A, the two substrates correspond to the first substrate 10301 and the second substrate 10316. A transistor and a pixel electrode are formed over the first substrate. A light-shielding film 10314, a color filter 10315, a fourth conductive layer 10313, a spacer 10317, and a second alignment film 10312 are formed on the second substrate.

The light-shielding film 10314 is not necessarily formed on the second substrate 10316. When the light-shielding film 10314 is not formed, the number of steps is reduced, so that manufacturing cost can be reduced. In addition, since a structure is simple, yield can be improved. On the other hand, when the light-shielding film 10314 is formed, a display device with little light leakage at the time of black display can be obtained.

The color filter 10315 is not necessarily formed on the second substrate 10316. When the color filter 10315 is not formed, the number of steps is reduced, so that manufacturing cost can be reduced. In addition, since a structure is simple, yield can be improved. Note that even when the color filter 10315 is not formed, a display device which can perform color display can be obtained by field sequential driving. On the other hand, needless to say, when the color filter 10315 is formed, a display device which can perform color display can be obtained.

Spherical spacers may be dispersed on the second substrate 10316 instead of forming the spacer 10317. When the spherical spacers are dispersed, the number of steps is reduced, so that manufacturing cost can be reduced. In addition, since a structure is simple, yield can be improved. On the other hand, when the spacer 10317 is formed, a distance between the two substrates can be uniform because a position of the spacer is not varied, so that a display device with little display unevenness can be obtained.

Subsequently, a process to be performed to the first substrate 10301 is described.

First, a first insulating film 10302 is formed over the first substrate 10301 by sputtering, a printing method, a coating method, or the like. The first insulating film 10302 has a function of preventing change in characteristics of the transistor due to an impurity from the substrate which affects a semiconductor layer. Note that the first insulating film 10302 is not necessarily formed.

Next, a first conductive layer 10303 is formed over the first insulating film 10302 by photolithography, a laser direct writing method, an inkjet method, or the like.

Next, a second insulating film 10304 is formed over the entire surface by sputtering, a printing method, a coating method, or the like. The second insulating film 10304 has a function of preventing change in characteristics of the transistor due to an impurity from the substrate which affects the semiconductor layer.

Next, a first semiconductor layer 10305 and a second semiconductor layer 10306 are formed. Note that the first semiconductor layer 10305 and the second semiconductor layer 10306 are formed sequentially and shapes thereof are processed at the same time.

Next, a second conductive layer 10307 is formed by photolithography, a laser direct writing method, an inkjet method, or the like. Note that as a method for etching which processes a shape of the second conductive layer 10307, dry etching is preferable. Note that as the second conductive layer 10307, a light-transmitting material may be used or a reflective material may be used.

Next, a channel region of the transistor is formed. Here, an example of a step thereof is described. The second semiconductor layer 10306 is etched by using the second conductive layer 10307 as a mask. Alternatively, the second semiconductor layer 10306 is etched by using a mask for processing the shape of the second conductive layer 10307. Then, the first conductive layer 10303 at a position where the second semiconductor layer 10306 is removed serves as the channel region of the transistor. Thus, the number of masks can be reduced, so that manufacturing cost can be reduced.

Next, a third insulating film 10308 is formed and a contact hole is selectively formed in the third insulating film 10308. Note that a contact hole may be formed also in the second insulating film 10304 at the same time as forming the contact hole in the third insulating film 10308.

Next, a third conductive layer 10309 is formed by photolithography, a laser direct writing method, an inkjet method, or the like. Here, the third conductive layer 10309 has a shape in which two comb-shaped electrodes engage with each other. One of the comb-shaped electrodes is electrically connected to one of a source electrode and a drain electrode of the transistor, and the other of the comb-shaped electrodes is electrically connected to a common electrode. Thus, a lateral electric field can be effectively applied to the liquid crystal molecules 10318.

Next, a first alignment film 10310 is formed. Note that after the first alignment film 10310 is formed, rubbing may be performed so as to control the alignment of the liquid crystal molecules. Rubbing is a step of forming stripes on an alignment film by rubbing the alignment film with a cloth. By performing rubbing, the alignment film can have alignment properties.

The first substrate 10301 which is manufactured as described above and the second substrate 10316 on which the light-shielding film 10314, the color filter 10315, the spacer 10317, and the second alignment film 10312 are formed are attached to each other by a sealant with a gap of several μm therebetween. Then, liquid crystals 10311 which include the liquid crystal molecules 10318 are injected into a space between the two substrates.

Figure 39B:
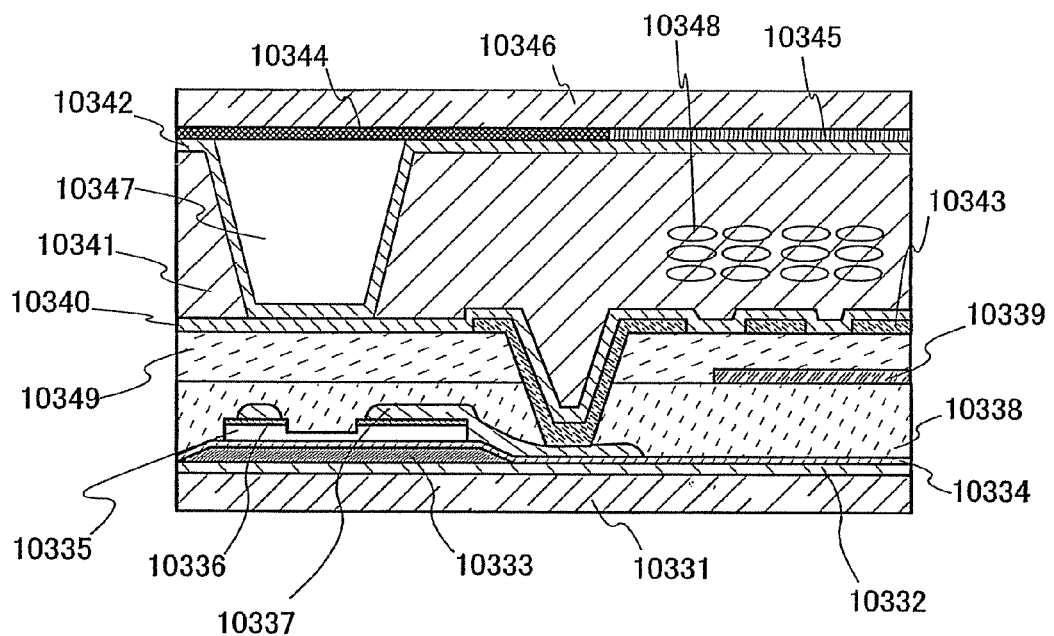

FIG. 39B is an example of a cross-sectional view of a pixel in the case where an FFS (Fringe Field Switching) mode and a transistor are combined. By applying the pixel structure shown in FIG. 39B to a liquid crystal display device, a liquid crystal display device theoretically having a wide viewing angle and response speed which has low dependency on a gray scale can be obtained.

Features of the pixel structure shown in FIG. 39B are described. Liquid crystal molecules 10348 shown in FIG. 39B are long and narrow molecules each having a major axis and a minor axis. In FIG. 39B, direction of each of the liquid crystal molecules 10348 is expressed by the length thereof. That is, the direction of the major axis of the liquid crystal molecule 10348, which is expressed as long, is parallel to the page, and as the liquid crystal molecule 10348 is expressed to be shorter, the direction of the major axis becomes closer to a normal direction of the page. Each of the liquid crystal molecules 10348 shown in FIG. 39B is aligned so that the direction of the major axis thereof is always horizontal to the substrate. Although FIG. 39B shows alignment with no electric field, when an electric field is applied to each of the liquid crystal molecules 10348, each of the liquid crystal molecules 10348 rotates in a horizontal plane as the direction of the major axis thereof is always horizontal to the substrate. With this state, a liquid crystal display device having a wide viewing angle can be obtained.

Here, the case is described in which a bottom-gate transistor using an amorphous semiconductor is used as the transistor. In the case where a transistor using an amorphous semiconductor is used, a liquid crystal display device can be formed at low cost by using a large substrate.

A liquid crystal display device includes a basic portion displaying images, which is called a liquid crystal panel. The liquid crystal panel is manufactured as follows: two processed substrates are attached to each other with a gap of several μm therebetween, and a liquid crystal material is injected into a space between the two substrates. In FIG. 39B, the two substrates correspond to the first substrate 10331 and the second substrate 10346. A transistor and a pixel electrode are formed over the first substrate. A light-shielding film 10344, a color filter 10345, a spacer 10347, and a second alignment film 10342 are formed on the second substrate.

The light-shielding film 10344 is not necessarily formed on the second substrate 10346. When the light-shielding film 10344 is not formed, the number of steps is reduced, so that manufacturing cost can be reduced. In addition, since a structure is simple, yield can be improved. On the other hand, when the light-shielding film 10344 is formed, a display device with little light leakage at the time of black display can be obtained.

The color filter 10345 is not necessarily formed on the second substrate 10346. When the color filter 10345 is not formed, the number of steps is reduced, so that manufacturing cost can be reduced. In addition, since a structure is simple, yield can be improved. Note that even when the color filter 10345 is not formed, a display device which can perform color display can be obtained by field sequential driving. On the other hand, needless to say, when the color filter 10345 is formed, a display device which can perform color display can be obtained.

Spherical spacers may be dispersed on the second substrate 10346 instead of forming the spacer 10347. When the spherical spacers are dispersed, the number of steps is reduced, so that manufacturing cost can be reduced. In addition, since a structure is simple, yield can be improved. On the other hand, when the spacer 10347 is formed, a distance between the two substrates can be uniform because a position of the spacer is not varied, so that a display device with little display unevenness can be obtained.

Subsequently, a process to be performed to the first substrate 10331 is described.

First, a first insulating film 10332 is formed over the first substrate 10331 by sputtering, a printing method, a coating method, or the like. The first insulating film 10332 has a function of preventing change in characteristics of the transistor due to an impurity from the substrate which affects a semiconductor layer. Note that the first insulating film 10332 is not necessarily formed.

Next, a first conductive layer 10333 is formed over the first insulating film 10332 by photolithography, a laser direct writing method, an inkjet method, or the like.

Next, a second insulating film 10334 is formed over the entire surface by sputtering, a printing method, a coating method, or the like. The second insulating film 10334 has a function of preventing change in characteristics of the transistor due to an impurity from the substrate which affects the semiconductor layer.

Next, a first semiconductor layer 10335 and a second semiconductor layer 10336 are formed. Note that the first semiconductor layer 10335 and the second semiconductor layer 10336 are formed sequentially and shapes thereof are processed at the same time.

Next, a second conductive layer 10337 is formed by photolithography, a laser direct writing method, an inkjet method, or the like. Note that as a method for etching which processes a shape of the second conductive layer 10337, dry etching is preferable. Note that as the second conductive layer 10337, a light-transmitting material may be used or a reflective material may be used.

Next, a channel region of the transistor is formed. Here, an example of a step thereof is described. The second semiconductor layer 10336 is etched by using the second conductive layer 10337 as a mask. Alternatively, the second semiconductor layer 10336 is etched by using a mask for processing the shape of the second conductive layer 10337. Then, the first conductive layer 10333 at a position where the second semiconductor layer 10336 is removed serves as the channel region of the transistor. Thus, the number of masks can be reduced, so that manufacturing cost can be reduced.

Next, a third insulating film 10338 is formed and a contact hole is selectively formed in the third insulating film 10338.

Next, a fourth conductive layer 10343 is formed by photolithography, a laser direct writing method, an inkjet method, or the like.

Next, a fourth insulating film 10349 is formed and a contact hole is selectively formed in the fourth insulating film 10349. Note that a surface of the fourth insulating film 10349 is preferably as even as possible. This is because alignment of the liquid crystal molecules are affected by unevenness of a surface with which the liquid crystal is in contact.

Next, a third conductive layer 10339 is formed by photolithography, a laser direct writing method, an inkjet method, or the like. Here, the third conductive layer 10339 is comb-shaped.

Next, a first alignment film 10340 is formed. Note that after the first alignment film 10340 is formed, rubbing may be performed so as to control the alignment of the liquid crystal molecules. Rubbing is a step of forming stripes on an alignment film by rubbing the alignment film with a cloth. By performing rubbing, the alignment film can have alignment properties.

The first substrate 10331 which is manufactured as described above and the second substrate 10346 on which the light-shielding film 10344, the color filter 10345, the spacer 10347, and the second alignment film 10342 are formed are attached to each other by a sealant with a gap of several μm therebetween. Then, liquid crystals 10341 which include the liquid crystal molecules 10348 are injected into a space between the two substrates. Therefore, a liquid crystal panel can be manufactured.

Here, materials which can be used for conductive layers or insulating films are described.

As the first insulating film 10102 in FIG. 37, the first insulating film 10202 in FIG. 38A, the first insulating film 10232 in FIG. 38B, the first insulating film 10302 in FIG. 39A, or the first insulating film 10332 in FIG. 39B, an insulating film such as a silicon oxide film, a silicon nitride film, or a silicon oxynitride film can be used. Alternatively, an insulating film having a stacked-layer structure in which two or more of a silicon oxide film, a silicon nitride film, a silicon oxynitride film, and the like are combined can be used.

As the first conductive layer 10103 in FIG. 37, the first conductive layer 10203 in FIG. 38A, the first conductive layer 10233 in FIG. 38B, the first conductive layer 10303 in FIG. 39A, or the first conductive layer 10333 in FIG. 39B, Mo, Ti, Al, Nd, Cr, or the like can be used. Alternatively, a stacked-layer structure in which two or more of Mo, Ti, Al, Nd, Cr, and the like are combined can be used.

As the second insulating film 10104 in FIG. 37, the second insulating film 10204 in FIG. 38A, the second insulating film 10234 in FIG. 38B, the second insulating film 10304 in FIG. 39A, or the second insulating film 10334 in FIG. 39B, a thermal oxide film, a silicon oxide film, a silicon nitride film, a silicon oxynitride film, or the like can be used. Alternatively, a stacked-layer structure in which two or more of a thermal oxide film, a silicon oxide film, a silicon nitride film, a silicon oxynitride film, and the like are combined can be used. Note that a silicon oxide film is preferable in a portion which is in contact with a semiconductor layer. This is because a trap level at an interface with the semiconductor layer decreases when a silicon oxide film is used. Note also that a silicon nitride film is preferable in a portion which is in contact with Mo. This is because a silicon nitride film does not oxidize Mo.

As the first semiconductor layer 10105 in FIG. 37, the first semiconductor layer 10205 in FIG. 38A, the first semiconductor layer 10235 in FIG. 38B, the first semiconductor layer 10305 in FIG. 39A, or the first semiconductor layer 10335 in FIG. 39B, silicon, silicon germanium, or the like can be used.

As the second semiconductor layer 10106 in FIG. 37, the second semiconductor layer 10206 in FIG. 38A, the second semiconductor layer 10236 in FIG. 38B, the second semiconductor layer 10306 in FIG. 39A, or the second semiconductor layer 10336 in FIG. 39B, silicon or the like including phosphorus can be used, for example.

As a light-transmitting material of the second conductive layer 10107 and the third conductive layer 10109 in FIG. 37; the second conductive layer 10207 and the third conductive layer 10209 in FIG. 38A; the second conductive layer 10237 and a third conductive layer 10239 in FIG. 38B; the second conductive layer 10307 and a third conductive layer 10309 in FIG. 39A; or the second conductive layer 10337, the third conductive layer 10339, and the fourth conductive layer 10343 in FIG. 39B, an indium tin oxide film formed by mixing tin oxide into indium oxide, an indium tin silicon oxide film formed by mixing silicon oxide into indium tin oxide, an indium zinc oxide film formed by mixing zinc oxide into indium oxide, a zinc oxide film, a tin oxide film, or the like can be used. Note that indium zinc oxide is a light-transmitting conductive material formed by sputtering using a target in which zinc oxide is mixed into indium tin oxide at 2 to 20 wt %.

As a reflective material of the second conductive layer 10107 and the third conductive layer 10109 in FIG. 37; the second conductive layer 10207 and the third conductive layer 10209 in FIG. 38A; the second conductive layer 10237 and the third conductive layer 10239 in FIG. 38B; the second conductive layer 10307 and the third conductive layer 10309 in FIG. 39A; or the second conductive layer 10337, the third conductive layer 10339, and the fourth conductive layer 10343 in FIG. 39B, Ti, Mo, Ta, Cr, W, Al, or the like can be used. Alternatively, a two-layer structure in which Al and Ti, Mo, Ta, Cr, or W are stacked, or a three-layer structure in which Al is interposed between metals such as Ti, Mo, Ta, Cr, and W may be used.

As the third insulating film 10108 in FIG. 37, the third insulating film 10208 in FIG. 38A, the third insulating film 10238 in FIG. 38B, the third insulating film 10308 in FIG. 39A, or the third insulating film 10338 and the fourth insulating film 10349 in FIG. 39B, an inorganic material (e.g., silicon oxide, silicon nitride, or silicon oxynitride), an organic compound material having a low dielectric constant (e.g., a photosensitive or nonphotosensitive organic resin material), or the like can be used. Alternatively, a material including siloxane can be used. Note that siloxane is a material in which a basic structure is formed by a bond of silicon (Si) and oxygen (O). As a substituent, an organic group including at least hydrogen (e.g., an alkyl group or an aryl group) is used. Alternatively, a fluoro group may be used as the substituent. Further alternatively, the organic group including at least hydrogen and the fluoro group may be used as the substituent.

As the first alignment film 10110 in FIG. 37, the first alignment film 10210 in FIG. 38A, the first alignment film 10240 in FIG. 38B, the first alignment film 10310 in FIG. 39A, or the first alignment film 10340 in FIG. 39B, a film of a high molecular compound such as polyimide can be used.

Next, the pixel structure in the case where each liquid crystal mode and the transistor are combined is described with reference to a top plan view (a layout diagram) of the pixel.

Note that as a liquid crystal mode, a TN (twisted nematic) mode, an IPS (in-plane-switching) mode, an FFS (fringe field switching) mode, an MVA (multi-domain vertical alignment) mode, a PVA (patterned vertical alignment) mode, an ASM (axially symmetric aligned micro-cell) mode, an OCB (optical compensated birefringence) mode, an FLC (ferroelectric liquid crystal) mode, an AFLC (antiferroelectric liquid crystal) mode, or the like can be used.

As the transistor, a thin film transistor (a TFT) including a non-single crystalline semiconductor film typified by amorphous silicon, polycrystalline silicon, microcrystalline (also referred to as semi-amorphous) silicon, or the like can be used.

As a structure of the transistor, a top-gate structure, a bottom-gate structure, or the like can be used. A channel-etched transistor, a channel-protective transistor, or the like can be used as a bottom-gate transistor.

Figure 40:
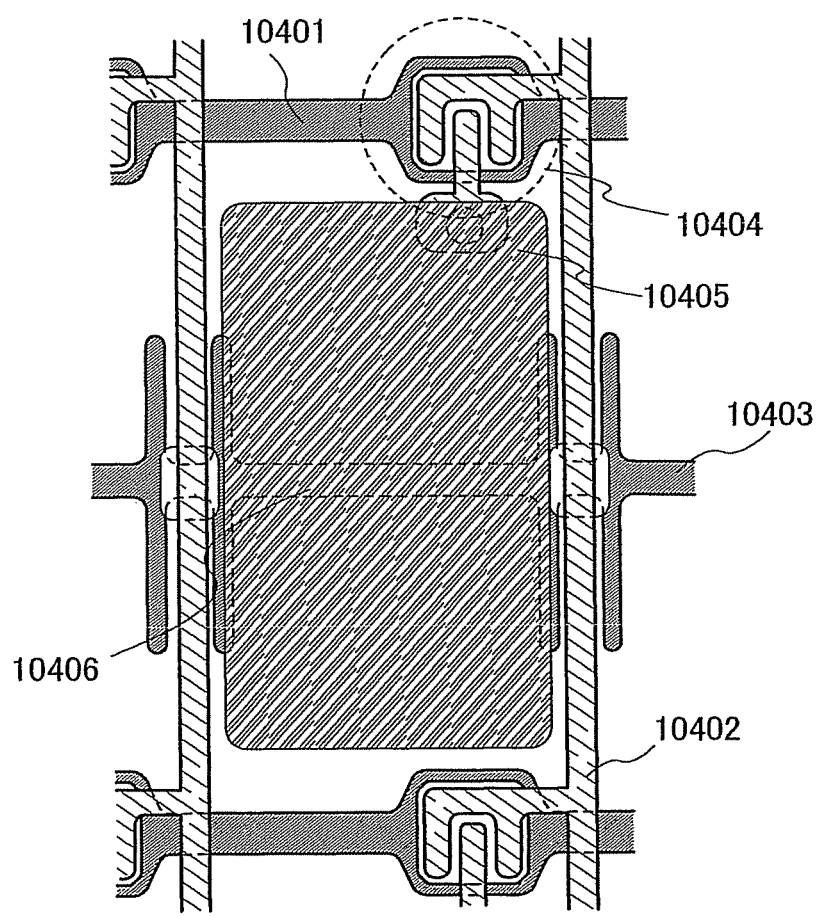
FIG. 40 is a view illustrating an example of a pixel layout of a semiconductor device in accordance with the present invention.

FIG. 40 is an example of a top plan view of a pixel in the case where a TN mode and a transistor are combined. By applying the pixel structure shown in FIG. 40 to a liquid crystal display device, a liquid crystal display device can be formed at low cost.

The pixel shown in FIG. 40 includes a scan line 10401, an image signal line 10402, a capacitor line 10403, a transistor 10404, a pixel electrode 10405, and a pixel capacitor 10406.

The scan line 10401 has a function of transmitting a signal (a scan signal) to the pixel. The image signal line 10402 has a function for transmitting a signal (an image signal) to the pixel. Note that since the scan line 10401 and the image signal line 10402 are arranged in matrix, they are formed of conductive layers in different layers. Note also that a semiconductor layer may be provided at an intersection of the scan line 10401 and the image signal line 10402. Thus, intersection capacitance between the scan line 10401 and the image signal line 10402 can be reduced.

The capacitor line 10403 is provided in parallel to the pixel electrode 10405. A portion where the capacitor line 10403 and the pixel electrode 10405 overlap with each other corresponds to the pixel capacitor 10406. Note that part of the capacitor line 10403 is extended along the image signal line 10402 so as to surround the image signal line 10402. Thus, crosstalk can be reduced. Crosstalk is a phenomenon in which a potential of an electrode, which should hold the potential, is changed in accordance with change in potential of the image signal line 10402. Note also that intersection capacitance can be reduced by providing a semiconductor layer between the capacitor line 10403 and the image signal line 10402. Note also that the capacitor line 10403 is formed of a material which is similar to that of the scan line 10401.

The transistor 10404 has a function as a switch which turns on the image signal line 10402 and the pixel electrode 10405. Note that one of a source region and a drain region of the transistor 10404 is provided so as to be surrounded by the other of the source region and the drain region of the transistor 10404. Thus, the channel width of the transistor 10404 increases, so that switching capability can be improved. Note also that a gate electrode of the transistor 10404 is provided so as to surround the semiconductor layer.

The pixel electrode 10405 is electrically connected to one of a source electrode and a drain electrode of the transistor 10404. The pixel electrode 10405 is an electrode for applying signal voltage which is transmitted by the image signal line 10402 to a liquid crystal element. Note that the pixel electrode 10405 is rectangular. Thus, an aperture ratio can be improved. Note also that as the pixel electrode 10405, a light-transmitting material may be used or a reflective material may be used. Alternatively, the pixel electrode 10405 may be formed by combining a light-transmitting material and a reflective material.

Figure 41A:
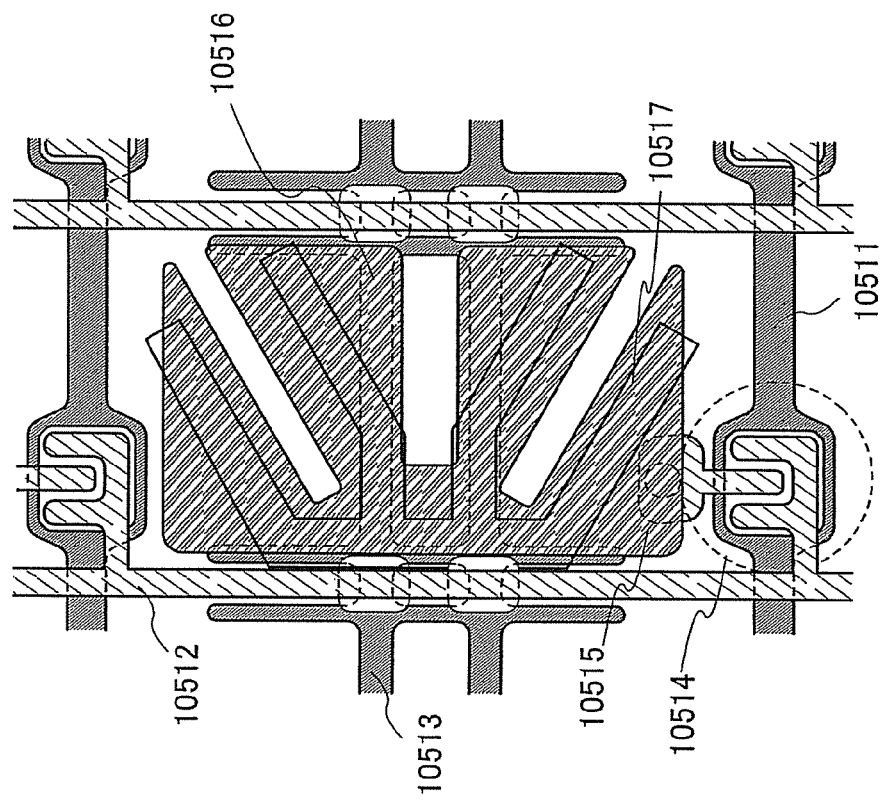
FIGS. 41A and 41B are views each illustrating an example of a pixel layout of a semiconductor device in accordance with the present invention.

FIG. 41A is an example of a top plan view of a pixel in the case where an MVA mode and a transistor are combined. By applying the pixel structure shown in FIG. 41A to a liquid crystal display device, a liquid crystal display device having a wide viewing angle, high response speed, and high contrast can be obtained.

The pixel shown in FIG. 41A includes a scan line 10501, a video signal line 10502, a capacitor line 10503, a transistor 10504, a pixel electrode 10505, a pixel capacitor 10506, and an alignment control projection 10507.

The scan line 10501 has a function of transmitting a signal (a scan signal) to the pixel. The image signal line 10502 has a function for transmitting a signal (an image signal) to the pixel. Note that since the scan line 10501 and the image signal line 10502 are arranged in matrix, they are formed of conductive layers in different layers. Note also that a semiconductor layer may be provided at an intersection of the scan line 10501 and the image signal line 10502. Thus, intersection capacitance between the scan line 10501 and the image signal line 10502 can be reduced.

The capacitor line 10503 is provided in parallel to the pixel electrode 10505. A portion where the capacitor line 10503 and the pixel electrode 10505 overlap with each other corresponds to the pixel capacitor 10506. Note that part of the capacitor line 10503 is extended along the image signal line 10502 so as to surround the image signal line 10502. Thus, crosstalk can be reduced. Crosstalk is a phenomenon in which a potential of an electrode, which should hold the potential, is changed in accordance with change in potential of the image signal line 10502. Note also that intersection capacitance can be reduced by providing a semiconductor layer between the capacitor line 10503 and the image signal line 10502. Note also that the capacitor line 10503 is formed of a material which is similar to that of the scan line 10501.

The transistor 10504 has a function as a switch which turns on the image signal line 10502 and the pixel electrode 10505. Note that one of a source region and a drain region of the transistor 10504 is provided so as to be surrounded by the other of the source region and the drain region of the transistor 10504. Thus, the channel width of the transistor 10504 increases, so that switching capability can be improved. Note also that a gate electrode of the transistor 10504 is provided so as to surround the semiconductor layer.

The pixel electrode 10505 is electrically connected to one of a source electrode and a drain electrode of the transistor 10504. The pixel electrode 10505 is an electrode for applying signal voltage which is transmitted by the image signal line 10502 to a liquid crystal element. Note that the pixel electrode 10505 is rectangular. Thus, an aperture ratio can be improved.

Note also that as the pixel electrode 10505, a light-transmitting material may be used or a reflective material may be used. Alternatively, the pixel electrode 10505 may be formed by combining a light-transmitting material and a reflective material.

The alignment control projection 10507 is formed on a counter substrate. The alignment control projection 10507 has a function of aligning liquid crystal molecules radially. Note that a shape of the alignment control projection 10507 is not particularly limited. For example, the alignment control projection 10507 may be a dogleg shape. Thus, a plurality of regions having different alignment of the liquid crystal molecules can be formed, so that a viewing angle can be improved.

Figure 41B:
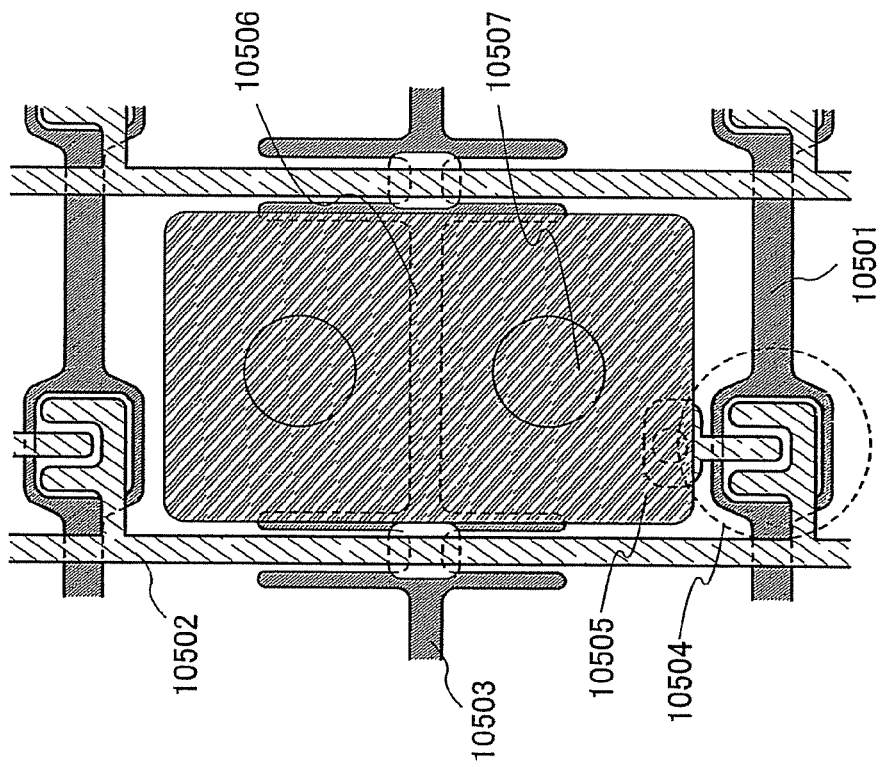

FIG. 41B is an example of a top plan view of a pixel in the case where a PVA mode and a transistor are combined. By applying the pixel structure shown in FIG. 41B to a liquid crystal display device, a liquid crystal display device having a wide viewing angle, high response speed, and high contrast can be obtained.

The pixel shown in FIG. 41B includes a scan line 10511, a video signal line 10512, a capacitor line 10513, a transistor 10514, a pixel electrode 10515, a pixel capacitor 10516, and an electrode cutout portion 10517.

The scan line 10511 has a function of transmitting a signal (a scan signal) to the pixel. The image signal line 10512 has a function for transmitting a signal (an image signal) to the pixel. Note that since the scan line 10511 and the image signal line 10512 are arranged in matrix, they are formed of conductive layers in different layers. Note also that a semiconductor layer may be provided at an intersection of the scan line 10511 and the image signal line 10512. Thus, intersection capacitance between the scan line 10511 and the image signal line 10512 can be reduced.

The capacitor line 10513 is provided in parallel to the pixel electrode 10515. A portion where the capacitor line 10513 and the pixel electrode 10515 overlap with each other corresponds to the pixel capacitor 10516. Note that part of the capacitor line 10513 is extended along the image signal line 10512 so as to surround the image signal line 10512. Thus, crosstalk can be reduced. Crosstalk is a phenomenon in which a potential of an electrode, which should hold the potential, is changed in accordance with change in potential of the image signal line 10512. Note also that intersection capacitance can be reduced by providing a semiconductor layer between the capacitor line 10513 and the image signal line 10512. Note also that the capacitor line 10513 is formed of a material which is similar to that of the scan line 10511.

The transistor 10514 has a function as a switch which turns on the image signal line 10512 and the pixel electrode 10515. Note that one of a source region and a drain region of the transistor 10514 is provided so as to be surrounded by the other of the source region and the drain region of the transistor 10514. Thus, the channel width of the transistor 10514 increases, so that switching capability can be improved. Note also that a gate electrode of the transistor 10514 is provided so as to surround the semiconductor layer.

The pixel electrode 10515 is electrically connected to one of a source electrode and a drain electrode of the transistor 10514. The pixel electrode 10515 is an electrode for applying signal voltage which is transmitted by the image signal line 10512 to a liquid crystal element. Note that the pixel electrode 10515 has a shape which is formed in accordance with a shape of the electrode cutout portion 10517. Specifically, the pixel electrode 10515 has a shape in which a portion where the pixel electrode 10515 is cut is formed in a portion where the electrode cutout portion 10517 is not formed. Thus, since a plurality of regions having different alignment of the liquid crystal molecules can be formed, a viewing angle can be improved. Note also that as the pixel electrode 10515, a light-transmitting material or a reflective material may be used. Alternatively, the pixel electrode 10515 may be formed by combining a light-transmitting material and a reflective material.

Figure 42A:
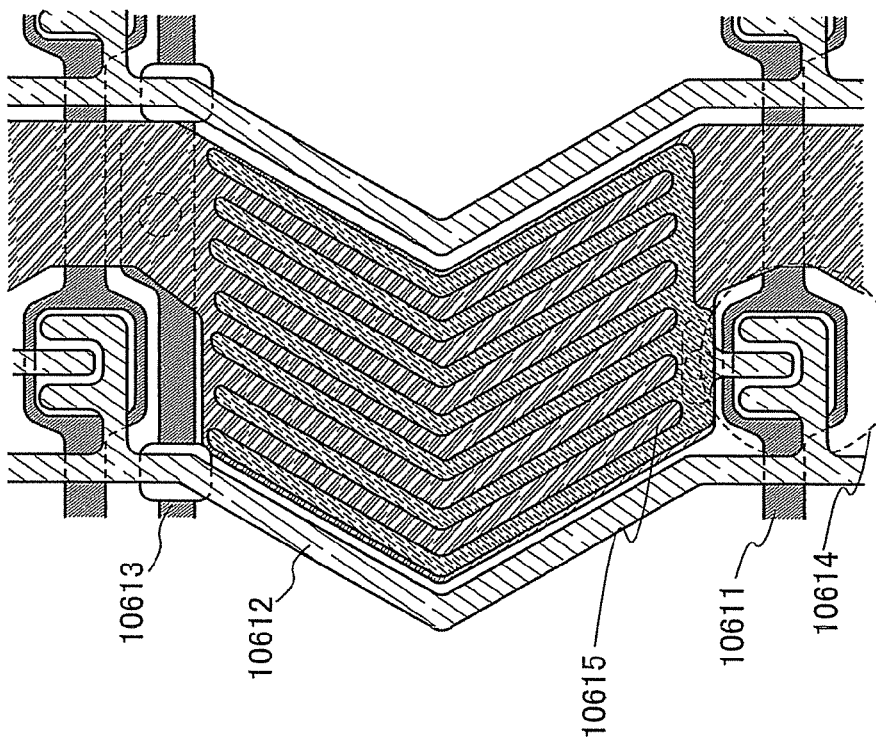
FIGS. 42A and 42B are views each illustrating an example of a pixel layout of a semiconductor device in accordance with the present invention.

FIG. 42A is an example of a top plan view of a pixel in the case where an IPS mode and a transistor are combined. By applying the pixel structure shown in FIG. 42A to a liquid crystal display device, a liquid crystal display device theoretically having a wide viewing angle and response speed which has low dependency on a gray scale can be obtained.

The pixel shown in FIG. 42A includes a scan line 10601, a video signal line 10602, a common electrode 10603, a transistor 10604, and a pixel electrode 10605.

The scan line 10601 has a function of transmitting a signal (a scan signal) to the pixel. The image signal line 10602 has a function of transmitting a signal (an image signal) to the pixel. Note that since the scan line 10601 and the image signal line 10602 are arranged in matrix, they are formed of conductive layers in different layers. Note also that a semiconductor layer may be provided at an intersection of the scan line 10601 and the image signal line 10602. Thus, intersection capacitance between the scan line 10601 and the image signal line 10602 can be reduced. Note also that the image signal line 10602 is formed in accordance with a shape of the pixel electrode 10605.

The common electrode 10603 is provided in parallel to the pixel electrode 10605. The common electrode 10603 is an electrode for generating a lateral electric field. Note that the common electrode 10603 is bent comb-shaped. Note also that part of the common electrode 10603 is extended along the image signal line 10602 so as to surround the image signal line 10602. Thus, crosstalk can be reduced. Crosstalk is a phenomenon in which a potential of an electrode, which should hold the potential, is changed in accordance with change in potential of the image signal line 10602. Note also that intersection capacitance can be reduced by providing a semiconductor layer between the common electrode 10603 and the image signal line 10602. Part of the common electrode 10603, which is provided in parallel to the scan line 10601, is formed of a material which is similar to that of the scan line 10601. Part of the common electrode 10603, which is provided in parallel to the pixel electrode 10605, is formed of a material which is similar to that of the pixel electrode 10605.

The transistor 10604 has a function as a switch which turns on the image signal line 10602 and the pixel electrode 10605. Note that one of a source region and a drain region of the transistor 10604 is provided so as to be surrounded by the other of the source region and the drain region of the transistor 10604. Thus, the channel width of the transistor 10604 increases, so that switching capability can be improved. Note also that a gate electrode of the transistor 10604 is provided so as to surround the semiconductor layer.

The pixel electrode 10605 is electrically connected to one of a source electrode and a drain electrode of the transistor 10604. The pixel electrode 10605 is an electrode for applying signal voltage which is transmitted by the image signal line 10602 to a liquid crystal element. Note that the pixel electrode 10605 is bent comb-shaped. Thus, a lateral electric field can be applied to liquid crystal molecules. In addition, since a plurality of regions having different alignment of the liquid crystal molecules can be formed, a viewing angle can be improved. Note also that as the pixel electrode 10605, a light-transmitting material or a reflective material may be used. Alternatively, the pixel electrode 10605 may be formed by combining a light-transmitting material and a reflective material.

Note that a comb-shaped portion in the common electrode 10603 and the pixel electrode 10605 may be formed of different conductive layers. For example, the comb-shaped portion in the common electrode 10603 may be formed of a conductive layer which is the same as that of the scan line 10601 or the image signal line 10602. Similarly, the pixel electrode 10605 may be formed of a conductive layer which is the same as that of the scan line 10601 or the image signal line 10602.

Figure 42B:
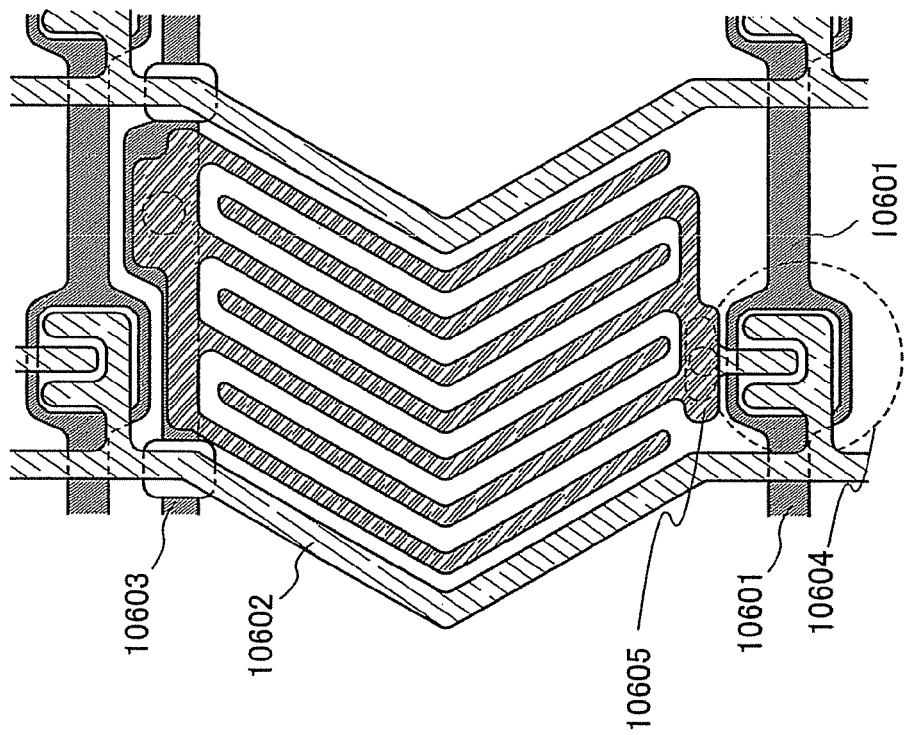

FIG. 42B is an example of a top plan view of a pixel in the case where an FFS mode and a transistor are combined. By applying the pixel structure shown in FIG. 42B to a liquid crystal display device, a liquid crystal display device theoretically having a wide viewing angle and response speed which has low dependency on a gray scale can be obtained.

The pixel shown in FIG. 42B includes a scan line 10611, a video signal line 10612, a common electrode 10613, a transistor 10614, and a pixel electrode 10615.

The scan line 10611 has a function of transmitting a signal (a scan signal) to the pixel. The image signal line 10612 has a function of transmitting a signal (an image signal) to the pixel. Note that since the scan line 10611 and the image signal line 10612 are arranged in matrix, they are formed of conductive layers in different layers. Note also that a semiconductor layer may be provided at an intersection of the scan line 10611 and the image signal line 10612. Thus, intersection capacitance between the scan line 10611 and the image signal line 10612 can be reduced. Note also that the image signal line 10612 is formed in accordance with a shape of the pixel electrode 10615.

The common electrode 10613 is formed uniformly below the pixel electrode 10615 and below and between the pixel electrodes 10615. Note that as the common electrode 10613, a light-transmitting material or a reflective material may be used. Alternatively, the common electrode 10613 may be formed by combining a material in which a light-transmitting material and a reflective material.

The transistor 10614 has a function as a switch which turns on the image signal line 10612 and the pixel electrode 10615. Note that one of a source region and a drain region of the transistor 10614 is provided so as to be surrounded by the other of the source region and the drain region of the transistor 10614. Thus, the channel width of the transistor 10614 increases, so that switching capability can be improved. Note also that a gate electrode of the transistor 10614 is provided so as to surround the semiconductor layer.

The pixel electrode 10615 is electrically connected to one of a source electrode and a drain electrode of the transistor 10614. The pixel electrode 10615 is an electrode for applying signal voltage which is transmitted by the image signal line 10612 to a liquid crystal element. Note that the pixel electrode 10615 is bent comb-shaped. The comb-shaped pixel electrode 10615 is provided to be closer to a liquid crystal layer than a uniform portion of the common electrode 10613. Thus, a lateral electric field can be applied to liquid crystal molecules. In addition, a plurality of regions having different alignment of the liquid crystal molecules can be formed, so that a viewing angle can be improved. Note also that as the pixel electrode 10615, a light-transmitting material or a reflective material may be used. Alternatively, the pixel electrode 10615 may be formed by combining a light-transmitting material and a reflective material.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 6

In this embodiment mode, a peripheral portion of a liquid crystal panel is described.

Figure 43:
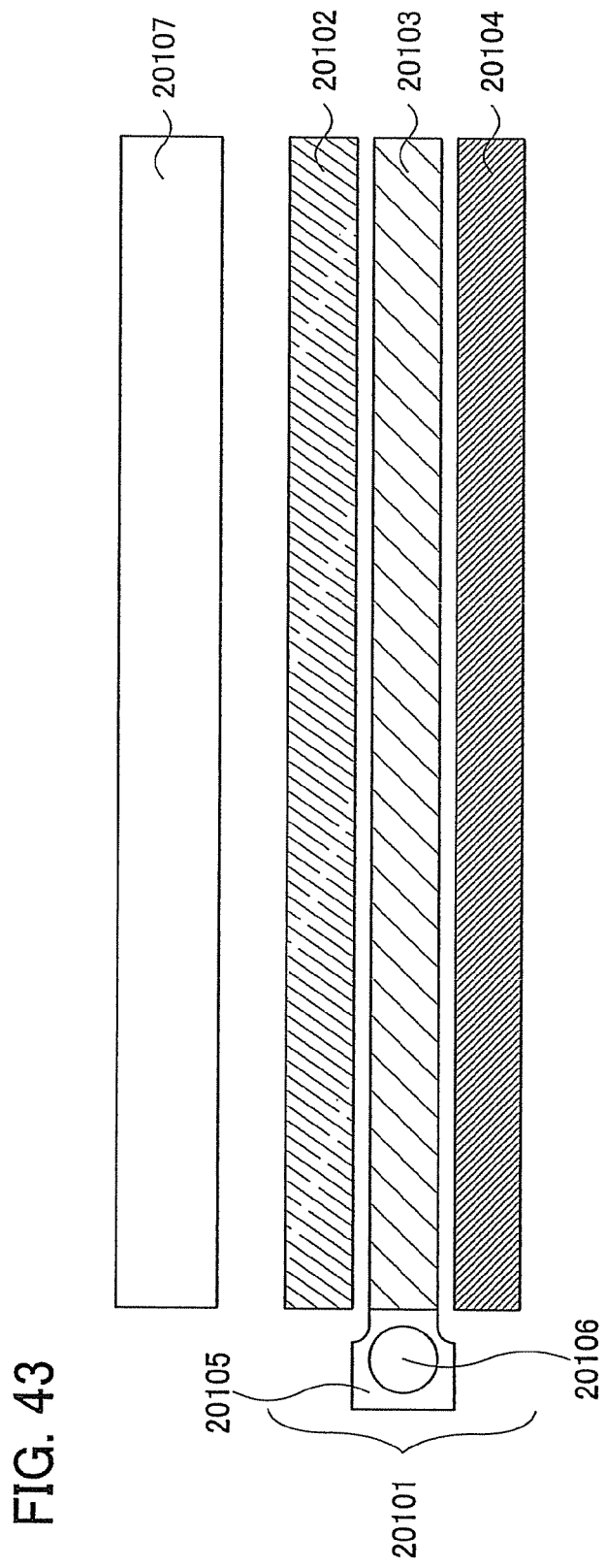
FIG. 43 is a view illustrating an example of a cross-sectional view of a semiconductor device in accordance with the present invention.

FIG. 43 is a cross-sectional view showing an example of a liquid crystal display device including a so-called edge-light type backlight unit 20101 and a liquid crystal panel 20107. An edge-light type corresponds to a type in which a light source is provided at an end of a backlight unit and fluorescence of the light source is emitted from the entire light-emitting surface. The edge-light type backlight unit is thin and can save power.

The backlight unit 20101 includes a diffusion plate 20102, a light guide plate 20103, a reflection plate 20104, a lamp reflector 20105, and a light source 20106.

The light source 20106 has a function of emitting light as necessary. For example, as the light source 20106, a cold cathode fluorescent lamp, a hot cathode fluorescent lamp, a light-emitting diode, an inorganic EL element, an organic EL element, or the like is used. The lamp reflector 20105 has a function of efficiently guiding fluorescence from the light source 20106 to the light guide plate 20103. The light guide plate 20103 has a function of guiding light to the entire surface by total reflection of fluorescence. The diffusion plate 20102 has a function of reducing variations in brightness. The reflection plate 20104 has a function of reflecting light which is leaked from the light guide plate 20103 downward (a direction which is opposite to the liquid crystal panel 20107) to be reused.

A control circuit for controlling luminance of the light source 20106 is connected to the backlight unit 20101. By using this control circuit, luminance of the light source 20106 can be controlled.

FIGS. 44A to 44D are views each showing a detailed structure of the edge-light type backlight unit. Note that description of a diffusion plate, a light guide plate, a reflection plate, and the like is omitted.

Figure 44A:
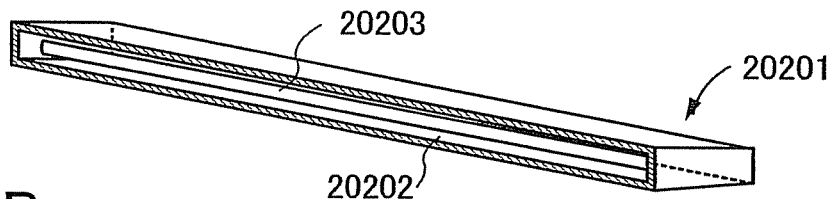
FIGS. 44A to 44D are views each illustrating an example of a peripheral component of a semiconductor device in accordance with the present invention.

A backlight unit 20201 shown in FIG. 44A has a structure in which a cold cathode fluorescent lamp 20203 is used as a light source. In addition, a lamp reflector 20202 is provided to efficiently reflect light from the cold cathode fluorescent lamp 20203. Such a structure is often used for a large display device because luminance from the cold cathode fluorescent lamp is high.

Figure 44B:
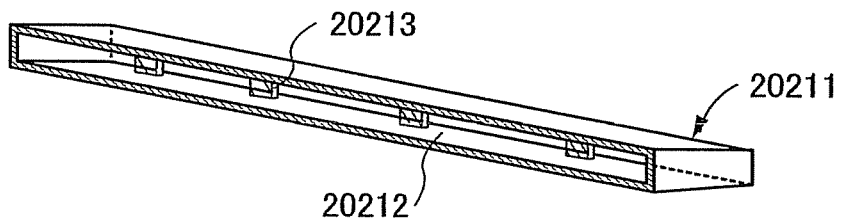

A backlight unit 20211 shown in FIG. 44B has a structure in which light-emitting diodes (LEDs) 20213 are used as light sources. For example, the light-emitting diodes (LEDs) 20213 which emit white light are provided at a predetermined interval. In addition, a lamp reflector 20212 is provided to efficiently reflect light from the light-emitting diodes (LEDs) 20213.

Since luminance of light-emitting diodes is high, a structure using light-emitting diodes is suitable for a large display device. In addition, since light-emitting diodes are excellent in color reproductivity, an arrangement area can be reduced. Therefore, a frame of a display device can be narrowed.

Note that in the case where light-emitting diodes are mounted on a large display device, the light-emitting diodes can be provided on a back side of the substrate. The light-emitting diodes of R, and B are sequentially provided at a predetermined interval. By providing the light-emitting diodes, color reproductivity can be improved.

Figure 44C:
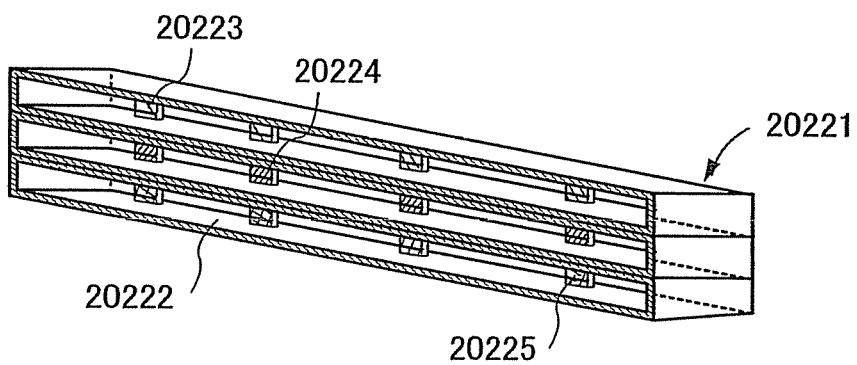

A backlight unit 20221 shown in FIG. 44C has a structure in which light-emitting diodes (LEDs) 20223, light-emitting diodes (LEDs) 20224, and light-emitting diodes (LEDs) 20225 of R, G, and B are used as light sources. The light-emitting diodes (LEDs) 20223, the light-emitting diodes (LEDs) 20224, and the light-emitting diodes (LEDs) 20225 of R, and B are each provided at a predetermined interval. By using the light-emitting diodes (LEDs) 20223, the light-emitting diodes (LEDs) 20224, and the light-emitting diodes (LEDs) 20225 of R, and B, color reproductivity can be improved. In addition, a lamp reflector 20222 is provided to efficiently reflect light from the light-emitting diodes.

Since luminance of light-emitting diodes is high, a structure using light-emitting diodes is suitable for a large display device. In addition, since light-emitting diodes are excellent in color reproductivity, an arrangement area can be reduced. Therefore, a frame of a display device can be narrowed.

By sequentially making the light-emitting diodes of R, G, and B emit light in accordance with time, color display can be performed. This is a so-called field sequential mode.

In addition, a light-emitting diode which emits white light can be combined with the light-emitting diodes (LEDs) 20223, the light-emitting diodes (LEDs) 20224, and the light-emitting diodes (LEDs) 20225 of R, G, and B.

Note that in the case where light-emitting diodes are mounted on a large display device, the light-emitting diodes can be provided on a back side of the substrate. The light-emitting diodes of R, G, and B are sequentially provided at a predetermined interval. By providing the light-emitting diodes, color reproductivity can be improved.

Figure 44D:
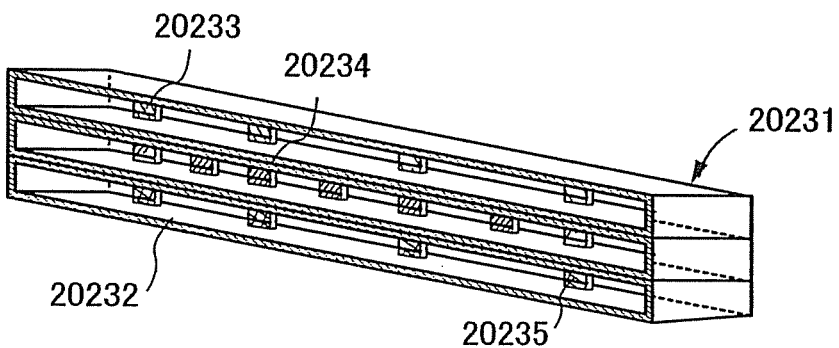

A backlight unit 20231 shown in FIG. 44D has a structure in which light-emitting diodes (LEDs) 20233, light-emitting diodes (LEDs) 20234, and light-emitting diodes (LEDs) 20235 of R, G, and B are used as light sources. For example, among the light-emitting diodes (LEDs) 20233, the light-emitting diodes (LEDs) 20234, and the light-emitting diodes (LEDs) 20235 of R, G, and B, the light-emitting diodes of a color with low emission intensity (e.g., green) are provided more than other light-emitting diodes. By using the light-emitting diodes (LEDs) 20233, the light-emitting diodes (LEDs) 20234, and the light-emitting diodes (LEDs) 20235 of R, G, and B, color reproductivity can be improved. In addition, a lamp reflector 20232 is provided to efficiently reflect light from the light-emitting diodes.

Since luminance of light-emitting diodes is high, a structure using light-emitting diodes is suitable for a large display device. In addition, since light-emitting diodes are excellent in color reproductivity, an arrangement area can be reduced. Therefore, a frame of a display device can be narrowed.

By sequentially making the light-emitting diodes of R, G, and B emit light in accordance with time, color display can be performed. This is a so-called field sequential mode.

In addition, a light-emitting diode which emits white light can be combined with the light-emitting diodes (LEDs) 20233, the light-emitting diodes (LEDs) 20234, and the light-emitting diodes (LEDs) 20235 of R, G, and B.

Note that in the case where light-emitting diodes are mounted on a large display device, the light-emitting diodes can be provided on a back side of the substrate. The light-emitting diodes of R, G, and B are sequentially provided at a predetermined interval. By providing the light-emitting diodes, color reproductivity can be improved.

FIG. 47A is a cross-sectional view showing an example of a liquid crystal display device including a so-called direct-type backlight unit and a liquid crystal panel. A direct type corresponds to a type in which a light source is provided directly under a light-emitting surface and fluorescence of the light source is emitted from the entire light-emitting surface. The direct-type backlight unit can efficiently utilize the amount of emitted light.

A backlight unit 20500 includes a diffusion plate 20501, a light-shielding plate 20502, a lamp reflector 20503, and a light source 20504. In addition, a reference numeral 20505 denotes a liquid crystal panel.

The light source 20504 has a function of emitting light as necessary. For example, as the light source 20505, a cold cathode fluorescent lamp, a hot cathode fluorescent lamp, a light-emitting diode, an inorganic EL element, an organic EL element, or the like is used. The lamp reflector 20503 has a function of efficiently guiding fluorescence from the light source 20504 to the diffusion plate 20501 and the light-shielding plate 20502. The light-shielding plate 20502 has a function of reducing variations in brightness by shielding much light as light becomes intense in accordance with provision of the light source 20504. The diffusion plate 20501 also has a function of reducing variations in brightness.

A control circuit for controlling luminance of the light source 20504 is connected to the backlight unit 20501. By using this control circuit, luminance of the light source 20504 can be controlled.

FIG. 47B is also a cross-sectional view showing an example of a liquid crystal display device including a so-called direct-type backlight unit and a liquid crystal panel.

A backlight unit 20510 includes a diffusion plate 20511; a light-shielding plate 20512; a lamp reflector 20513; and a light source (R) 20514a, a light source (G) 20514b, and a light source (B) 20514c of R, Q and B. In addition, a reference numeral 20515 denotes a liquid crystal panel.

Each of the light source (R) 20514a, the light source (G) 20514b, and the light source (B) 20514c of R, G, and B has a function of emitting light as necessary. For example, as each of the light source (R) 20514a, the light source (G) 20514b, and the light source (B) 20514c, a cold cathode fluorescent lamp, a hot cathode fluorescent lamp, a light-emitting diode, an inorganic EL element, an organic EL element, or the like is used. The lamp reflector 20513 has a function of efficiently guiding fluorescence from the light sources 20514a to 20514c to the diffusion plate 20511 and the light-shielding plate 20512. The light-shielding plate 20512 has a function of reducing variations in brightness by shielding much light as light becomes intense in accordance with provision of the light sources 20514a to 20514c. The diffusion plate 20511 also has a function of reducing variations in brightness.

A control circuit for controlling luminance of the light source (R) 20514a, the light source (G) 20514b, and the light source (B) 20514c of R, Q and B is connected to the backlight unit 20511. By using this control circuit, luminance of the light source (R) 20514*a*, the light source (G) 20514*b*, and the light source (B) 20514*c* of R, G, and B can be controlled.

Figure 45:
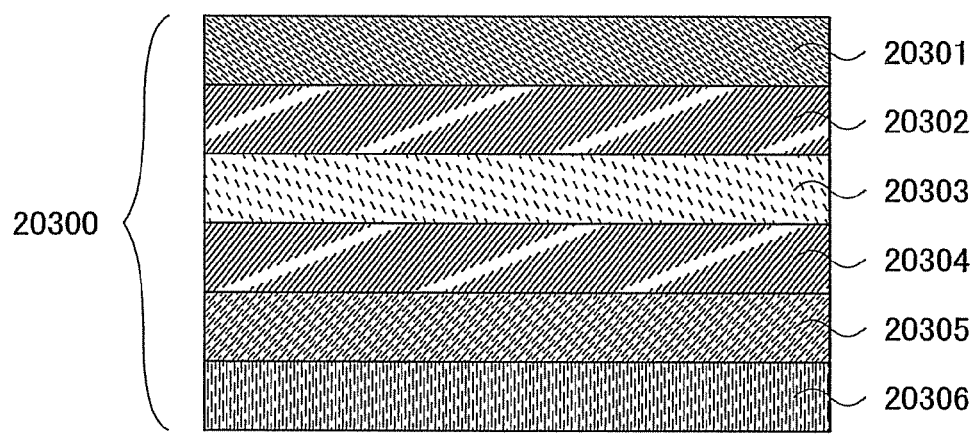
FIG. 45 is a view illustrating an example of a peripheral component of a semiconductor device in accordance with the present invention.

FIG. 45 is a cross-sectional view showing an example of a structure of a polarizing plate (also referred to as a polarizing film).

A polarizing film 20300 includes a protective film 20301, a substrate film 20302, a PVA polarizing film 20303, a substrate film 20304, an adhesive layer 20305, and a mold release film 20306.

The PVA polarizing film 20303 has a function of generating light in only a certain vibration direction (linear polarized light). Specifically, the PVA polarizing film 20303 includes molecules (polarizers) in which lengthwise electron density and widthwise electron density are greatly different from each other. The PVA polarizing film 20303 can generate linear polarized light by uniforming directions of the molecules in which lengthwise electron density and widthwise electron density are greatly different from each other.

For example, a high molecular film of polyvinyl alcohol is doped with an iodine compound and a PVA film is pulled in a certain direction, so that a film in which iodine molecules are aligned in a certain direction can be obtained as the PVA polarizing film 20303. In this film, light which is parallel to a major axis of the iodine molecule is absorbed by the iodine molecule. Note that a dichroism dye may be used instead of iodine for high durability use and high heat resistance use. Note also that it is preferable that the dye be used for a liquid crystal display device which needs to have durability and heat resistance, such as an in-car LCD or an LCD for a projector.

When the PVA polarizing film 20303 is sandwiched by films to be base materials (the substrate film 20302 and the substrate film 20304) from both sides, reliability can be improved. Note that the PVA polarizing film 20303 may be sandwiched by triacetylcellulose (TAC) films with high transparency and high durability. Note also that each of the substrate films and the TAC films function as protective films of polarizer included in the PVA polarizing film 20303.

The adhesive layer 20305 which is to be attached to a glass substrate of the liquid crystal panel is attached to one of the substrate films (the substrate film 20304). Note that the adhesive layer 20305 is formed by applying an adhesive to one of the substrate films (the substrate film 20304). The mold release film 20306 (a separate film) is provided to the adhesive layer 20305.

The protective film 20301 is provided to the other one of the substrates films (the substrate film 20302).

A hard coating scattering layer (an anti-glare layer) may be provided on a surface of the polarizing film 20300. Since the surface of the hard coating scattering layer has minute unevenness formed by AG treatment and has an anti-glare function which scatters external light, reflection of external light in the liquid crystal panel can be prevented. Surface reflection can also be prevented.

Note also that a treatment in which plurality of optical thin film layers having different refractive indexes are layered (also referred to as anti-reflection treatment or AR treatment) may be performed on the surface of the polarizing film 20300. The plurality of layered optical thin film layers having different refractive indexes can reduce reflectivity on the surface by an interference effect of light.

Figure 46A:
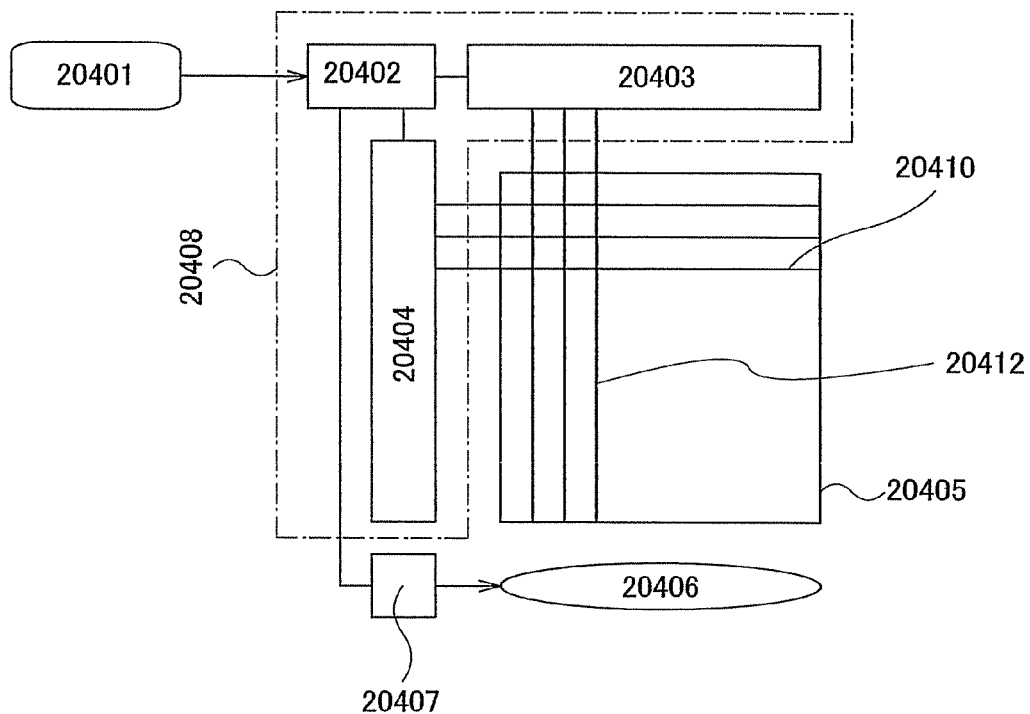
FIGS. 46A to 46C are diagrams each showing an example of a circuit structure of a panel of a semiconductor device in accordance with the present invention.
Figure 46B:
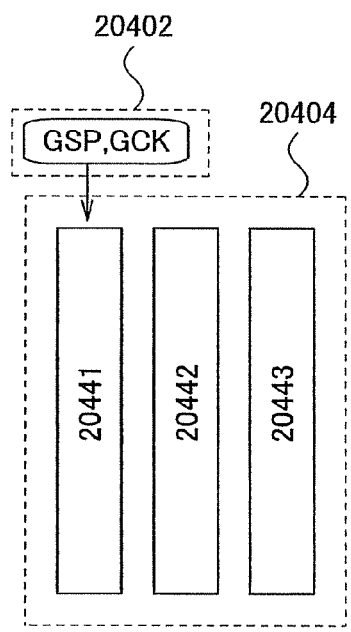
Figure 46C:
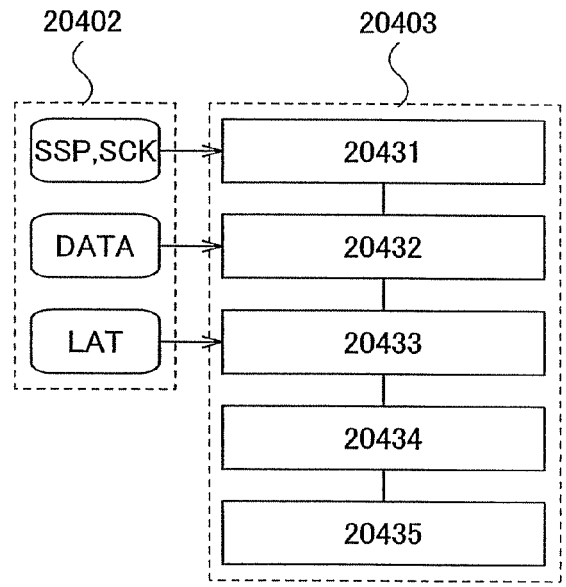

FIGS. 46A to 46C are diagrams each showing an example of a system block of the liquid crystal display device.

In a pixel portion 20405, signal lines 20412 which are extended from a signal line driver circuit 20403 are provided. In addition, in the pixel portion 20405, scan lines 20410 which are extended from a scan line driver circuit 20404 are also provided. In addition, a plurality of pixels are arranged in matrix in cross regions of the signal lines 20412 and the scan lines 20410. Note that each of the plurality of pixels includes a switching element. Therefore, voltage for controlling inclination of liquid crystal molecules can be separately input to each of the plurality of pixels. A structure in which a switching element is provided in each cross region in this manner is referred to as an active matrix type. Note also that the present invention is not limited to such an active matrix type and a structure of a passive matrix type may be used. Since the passive matrix type does not have a switching element in each pixel, a process is simple.

A driver circuit portion 20408 includes a control circuit 20402, the signal line driver circuit 20403, and the scan line driver circuit 20404. An image signal 20401 is input to the control circuit 20402. The signal line driver circuit 20403 and the scan line driver circuit 20404 are controlled by the control circuit 20402 in accordance with this image signal 20401. That is, the control circuit 20402 inputs a control signal to each of the signal line driver circuit 20403 and the scan line driver circuit 20404. Then, in accordance with this control signal, the signal line driver circuit 20403 inputs a video signal to each of the signal lines 20412 and the scan line driver circuit 20404 inputs a scan signal to each of the scan lines 20410. Then, the switching element included in the pixel is selected in accordance with the scan signal and the video signal is input to a pixel electrode of the pixel.

Note that the control circuit 20402 also controls a power source 20407 in accordance with the image signal 20401. The power source 20407 includes a unit for supplying power to a lighting unit 20406. As the lighting unit 20406, an edge-light type backlight unit or a direct-type backlight unit can be used. Note also that a front light may be used as the lighting unit 20406. A front light corresponds to a plate-like lighting unit including a luminous body and a light conducting body, which is attached to the front surface side of a pixel portion and illuminates the whole area. By using such a lighting unit, the pixel portion can be uniformly illuminated at low power consumption.

As shown in FIG. 46B, the scan line driver circuit 20404 includes a shift register 20441, a level shifter 20442, and a circuit functioning as a buffer 20443. A signal such as a gate start pulse (GSP) or a gate clock signal (GCK) is input to the shift register 20441.

As shown in FIG. 46C, the signal line driver circuit 20403 includes a shift register 20431, a first latch 20432, a second latch 20433, a level shifter 20434, and a circuit functioning as a buffer 20435. The circuit functioning as the buffer 20435 corresponds to a circuit which has a function of amplifying a weak signal and includes an operational amplifier or the like. A signal such as a start pulse (SSP) is input to the level shifter 20434 and data (DATA) such as a video signal is input to the first latch 20432. A latch (LAT) signal can be temporally held in the second latch 20433 and is simultaneously input to the pixel portion 20405. This is referred to as line sequential driving. Therefore, when a pixel is used in which not line sequential driving but dot sequential driving is performed, the second latch can be omitted.

Note that in this embodiment mode, a known liquid crystal panel can be used for the liquid crystal panel. For example, a structure in which a liquid crystal layer is sealed between two substrates can be used as the liquid crystal panel. A transistor, a capacitor, a pixel electrode, an alignment film, or the like is formed over one of the substrates. A polarizing plate, a retardation plate, or a prism sheet may be provided on the surface opposite to a top surface of the one of the substrates. A color filter, a black matrix, a counter electrode, an alignment film, or the like is provided on the other one of the substrates. A polarizing plate or a retardation plate may be provided on the surface opposite to a top surface of the other one of the substrates. The color filter and the black matrix may be formed over the top surface of the one of the substrates. Note also that three-dimensional display can be performed by providing a slit (a grid) on the top surface side of the one of the substrates or the surface opposite to the top surface side of the one of the substrates.

Each of the polarizing plate, the retardation plate, and the prism sheet can be provided between the two substrates. Alternatively, each of the polarizing plate, the retardation plate, and the prism sheet can be integrated with one of the two substrates.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 7

In this embodiment mode, a driving method of a display device is described. In particular, a driving method of a liquid crystal display device is described.

Figure 48A:
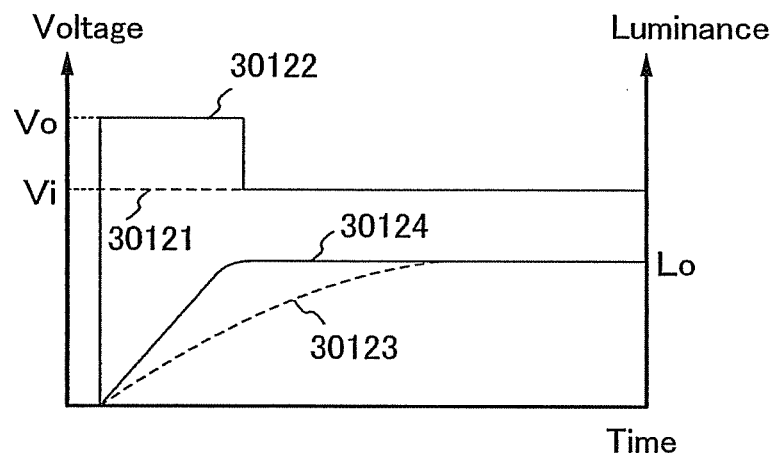
FIGS. 48A to 48C are diagrams each illustrating an example of a driving method of a semiconductor device in accordance with the present invention.
Figure 48B:
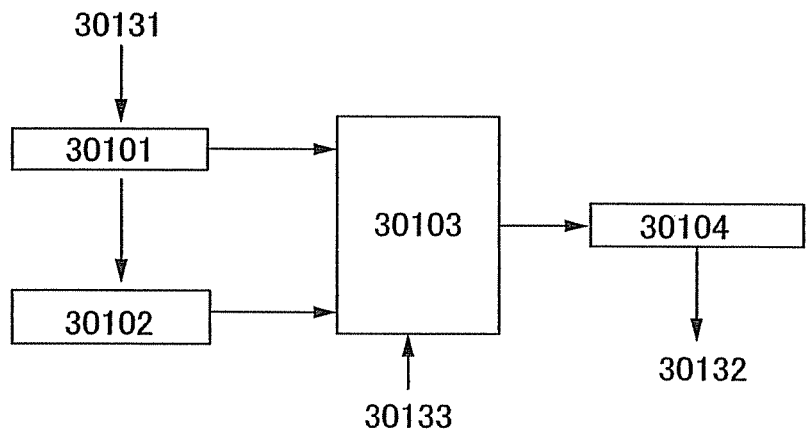
Figure 48C:
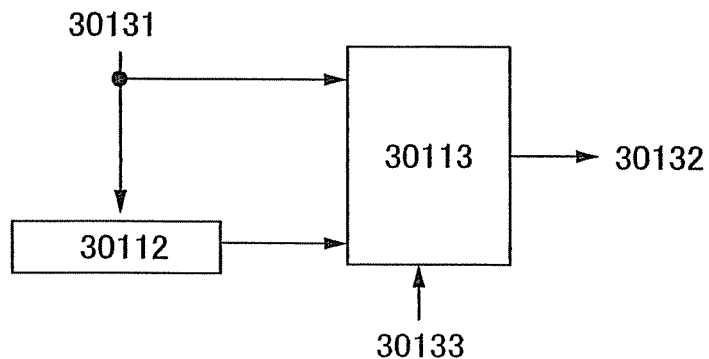

First, overdriving is described with reference to FIGS. 48A to 48C. FIG. 48A shows time change in output luminance of a display element with respect to input voltage. Time change in output luminance of the display element with respect to input voltage 30121 represented by a dashed line 30121 is as shown by output luminance 30123 represented by a dashed line similarly. That is, although voltage for obtaining intended output luminance Lo is Vi, time in accordance with response speed of the element is necessary before output luminance reaches the intended output luminance Lo when Vi is directly input as input voltage.

Overdriving is a technique for increasing this response speed. Specifically, this is a method as follows: first, Vo which is larger voltage than Vi is applied to the element for a certain time to increase response speed of the element and output luminance is made close to the intended output luminance Lo, and then, the input voltage is returned to Vi. The input voltage and the output luminance at this time are as shown by input voltage 30122 and output voltage 30124, respectively. In the graph of the output luminance 30124, time for reaching the intended output luminance Lo is shorter than that of the output luminance 30123.

Note that although the case where output luminance is changed positively with respect to input voltage is described in FIG. 48A, this embodiment mode also includes the case where output luminance is changed negatively with respect to input voltage.

A circuit for realizing such driving is described with reference to FIGS. 48B and 48C. First, the case where an input image signal 30131 is a signal having an analog value (may be a discrete value) and an output image signal 30132 is also a signal having an analog value is described with reference to FIG. 48B. An overdriving circuit shown in FIG. 48B includes an encoding circuit 30101, a frame memory 30102, a correction circuit 30103, and a D/A converter circuit 30104.

First, the input image signal 30131 is input to the encoding circuit 30101 and encoded. That is, the input image signal 30131 is converted from an analog signal into a digital signal with an appropriate bit number. After that, the converted digital signal is input to each of the frame memory 30102 and the correction circuit 30103. An image signal of the previous frame which is held in the frame memory 30102 is input to the correction circuit 30103 at the same time. Then, in the correction circuit 30103, an image signal corrected using an image signal of a frame and the image signal of the previous frame is output in accordance with a numeric value table which is prepared in advance. At this time, an output switching signal 30133 may be input to the correction circuit 30103 and the corrected image signal and the image signal of the frame may be switched to be output. Next, the corrected image signal or the image signal of the frame is input to the D/A converter circuit 30104. Then, the output image signal 30132 which is an analog signal having a value in accordance with the corrected image signal or the image signal of the frame is output. In this manner, overdriving is realized.

Next, the case where the input image signal 30131 is a signal having a digital value and the output image signal 30132 is also a signal having a digital value is described with reference to FIG. 48C. An overdriving circuit shown in FIG. 48C includes a frame memory 30112 and a correction circuit 30113.

First, the input image signal 30131 is a digital signal and is input to each of the frame memory 30112 and the correction circuit 30113. An image signal of the previous frame which is held in the frame memory 30112 is input to the correction circuit 30113 at the same time. Then, in the correction circuit 30113, an image signal corrected using an image signal of a frame and the image signal of the previous frame is output in accordance with a numeric value table which is prepared in advance. At this time, the output switching signal 30133 may be input to the correction circuit 30113 and the corrected image signal and the image signal of the frame may be switched to be output. In this manner, overdriving is realized.

Note that the case where the input image signal 30131 is an analog signal and the output image signal 30132 is a digital signal is included in the overdriving circuit in this embodiment mode. At this time, it is only necessary to omit the D/A converter circuit 30104 from the circuit shown in FIG. 48B. In addition, the case where the input image signal 30131 is a digital signal and the output image signal 30132 is an analog signal is included in the overdriving circuit in this embodiment mode. At this time, it is only necessary to omit the encoding circuit 30101 from the circuit shown in FIG. 48B.

Figure 49A:
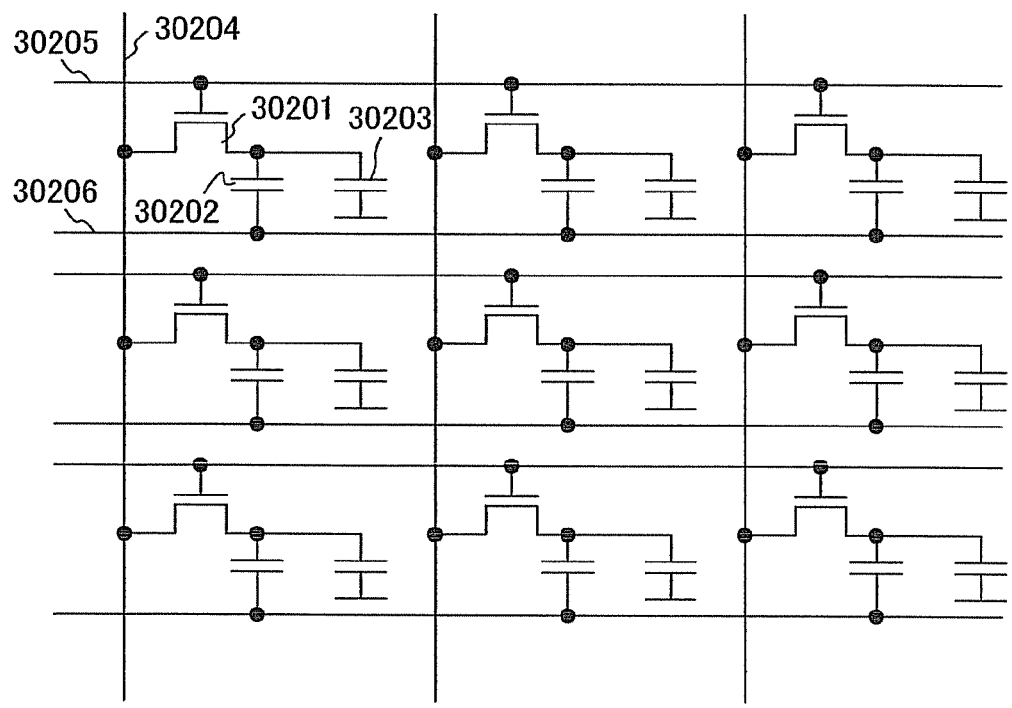
FIGS. 49A and 49B are diagrams each illustrating an example of a circuit structure of a semiconductor device in accordance with the present invention.

Driving which controls a potential of a common line is described with reference to FIGS. 49A and 49B. FIG. 49A is a diagram showing a plurality of pixel circuits in which one common line is provided with respect to one scan line in a display device using a display element which has capacitive properties like a liquid crystal element. Each of the pixel circuits shown in FIG. 49A includes a transistor 30201, an auxiliary capacitor 30202, a display element 30203, a video signal line 30204, a scan line 30205, and a common line 30206.

A gate electrode of the transistor 30201 is electrically connected to the scan line 30205; one of a source electrode and a drain electrode of the transistor 30201 is electrically connected to the video signal line 30204; and the other of the source electrode and the drain electrode of the transistor 30201 is electrically connected to one of electrodes of the auxiliary capacitor 30202 and one of electrodes of the display element 30203. In addition, the other of the electrodes of the auxiliary capacitor 30202 is electrically connected to the common line 30206.

First, in each of pixels selected by the scan line 30205, voltage corresponding to an image signal is applied to the display element 30203 and the auxiliary capacitor 30202 through the video signal line 30204 because the transistor 30201 is turned on. At this time, when the image signal is a signal which makes all of pixels connected to the common line 30206 display a minimum gray scale or when the image signal is a signal which makes all of the pixels connected to the common line 30206 display a maximum gray scale, it is not necessary that the image signal be written in each of the pixels through the video signal line 30204. Voltage applied to the display element 30203 can be changed by changing a potential of the common line 30206 instead of writing the image signal through the video signal line 30204.

Figure 49B:
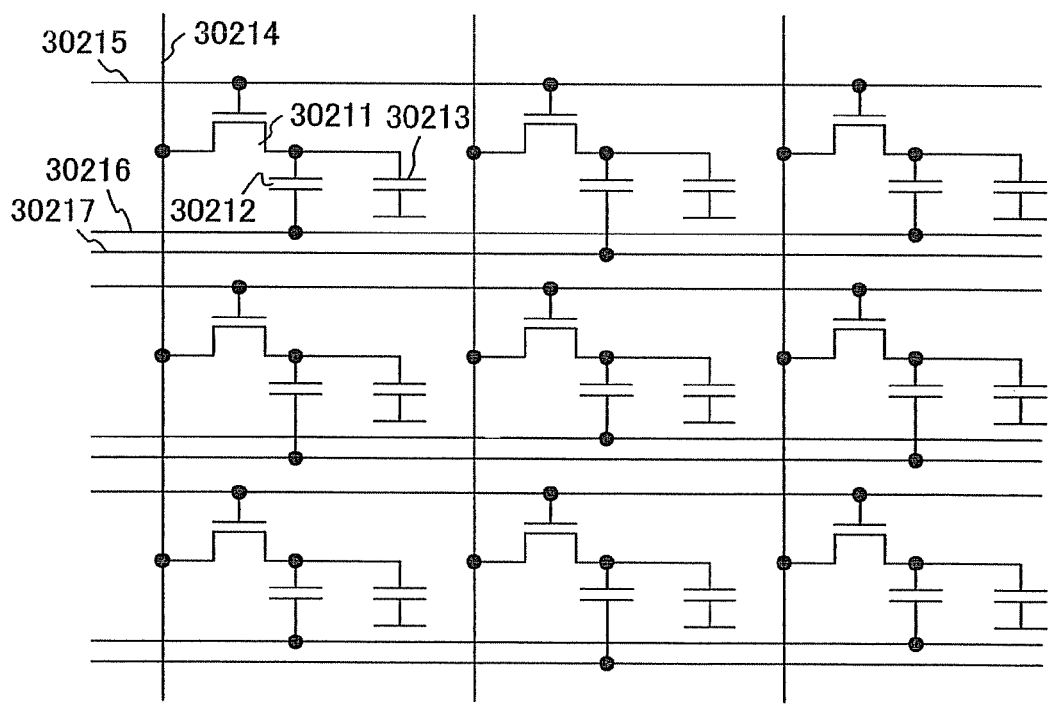

Next, FIG. 49B is a diagram showing a plurality of pixel circuits in which two common lines are provided with respect to one scan line in a display device using a display element which has capacitive properties like a liquid crystal element. Each of the pixel circuits shown in FIG. 49B includes a transistor 30211, an auxiliary capacitor 30212, a display element 30213, a video signal line 30214, a scan line 30215, a first common line 30216, and a second common line 30217.

A gate electrode of the transistor 30211 is electrically connected to the scan line 30215; one of a source electrode and a drain electrode of the transistor 30211 is electrically connected to the video signal line 30214; and the other of the source electrode and the drain electrode of the transistor 30211 is electrically connected to one of electrodes of the auxiliary capacitor 30212 and one of electrodes of the display element 30213. In addition, the other of the electrodes of the auxiliary capacitor 30212 is electrically connected to the first common line 30216. Further, in a pixel which is adjacent to the pixel, the other of the electrodes of the auxiliary capacitor 30212 is electrically connected to the second common line 30217.

In the pixel circuits shown in FIG. 49B, the number of pixels which are electrically connected to one common line is small. Therefore, by changing a potential of the first common line 30216 or the second common line 30217 instead of writing an image signal through the video signal line 30214, frequency of changing voltage applied to the display element 30213 is significantly increased. In addition, source inversion driving or dot inversion driving can be performed. By performing source inversion driving or dot inversion driving, reliability of the element can be improved and a flicker can be suppressed.

Figure 50A:
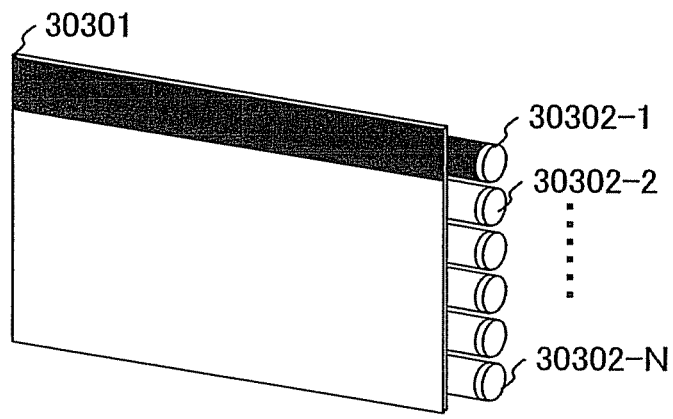
FIGS. 50A to 50C are diagrams each illustrating an example of a peripheral component of a semiconductor device in accordance with the present invention.
Figure 50B:
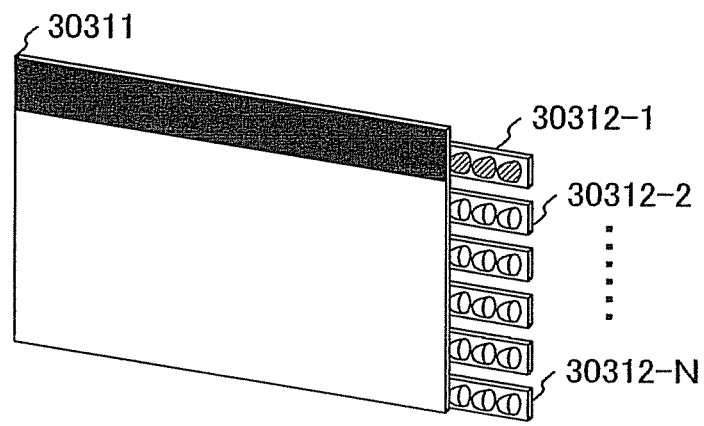

A scanning backlight is described with reference to FIGS. 50A to 50C. FIG. 50A is a view showing a scanning backlight in which cold cathode fluorescent lamps are arranged. The scanning backlight shown in FIG. 50A includes a diffusion plate 30301 and N pieces of cold cathode fluorescent lamps 30302-1 to 30302-N. The N pieces of the cold cathode fluorescent lamps 30302-1 to 30302-N are arranged on the back side of the diffusion plate 30301, so that the N pieces of the cold cathode fluorescent lamps 30302-1 to 30302-N can be scanned while luminance thereof is changed.

Change in luminance of each of the cold cathode fluorescent lamps in scanning is described with reference to FIG. 50C. First, luminance of the cold cathode fluorescent lamp 30302-1 is changed for a certain period. After that, luminance of the cold cathode fluorescent lamp 30302-2 which is provided adjacent to the cold cathode fluorescent lamp 30302-1 is changed for the same period. In this manner, luminance is changed sequentially from the cold cathode fluorescent lamp 30302-1 to the cold cathode fluorescent lamp 30302-N. Although luminance which is changed for a certain period is set to be lower than original luminance in FIG. 50C, it may also be higher than original luminance. In addition, although scanning is performed from the cold cathode fluorescent lamps 30302-1 to 30302-N, scanning may also be performed from the cold cathode fluorescent lamps 30302-N to 30302-1, which is in a reversed order.

Figure 50C:
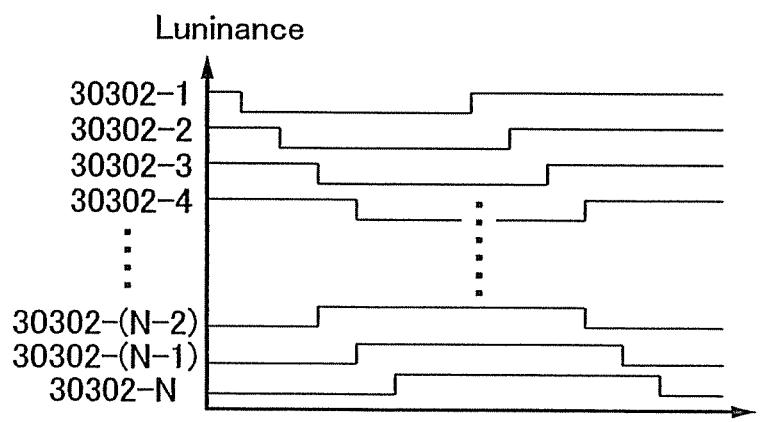

By performing driving as in FIG. 50C, average luminance of the backlight can be decreased. Therefore, power consumption of the backlight, which mainly takes up power consumption of the liquid crystal display device, can be reduced.

Note that an LED may be used as a light source of the scanning backlight. The scanning backlight in that case is as shown in FIG. 50B. The scanning backlight shown in FIG. 50B includes a diffusion plate 30311 and light sources 30312-1 to 30312-N, in each of which LEDs are arranged. When the LED is used as the light source of the scanning backlight, there is an advantage in that the backlight can be thin and lightweight. In addition, there is also an advantage that a color reproduction area can be widened. Further, since the LEDs which are arranged in each of the light sources 30312-1 to 30312-N can be similarly scanned, a dot scanning backlight can also be obtained. By using the dot scanning backlight, quality of a moving image can be further improved.

Note that when the LED is used as the light source of the backlight, driving can be performed by changing luminance as shown in FIG. 50C.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 8

In this embodiment mode, a pixel structure and an operation of a pixel which can be applied to a liquid crystal display device are described.

In this embodiment mode, as an operation mode of a liquid crystal element, a TN (twisted nematic) mode, an IPS (in-plane-switching) mode, an FFS (fringe field switching) mode, an MVA (multi-domain vertical alignment) mode, a PVA (patterned vertical alignment) mode, an ASM (axially symmetric aligned micro-cell) mode, an OCB (optical compensated birefringence) mode; an FLC (ferroelectric liquid crystal) mode, an AFLC (antiferroelectric liquid crystal) mode, or the like can be used.

Figure 51A:
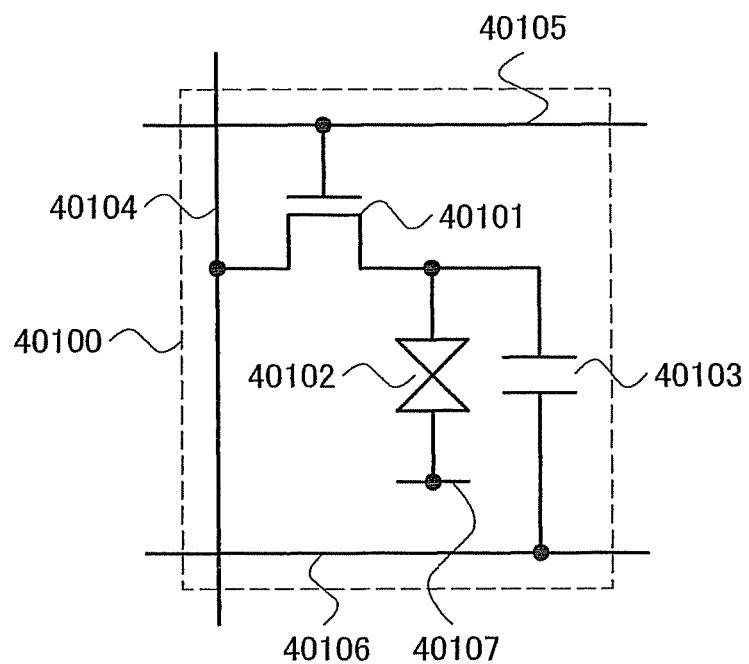
FIGS. 51A and 51B are diagrams each illustrating an example of a circuit structure of a semiconductor device in accordance with the present invention.

FIG. 51A is a diagram showing an example of a pixel structure which can be applied to the liquid crystal display device.

A pixel 40100 includes a transistor 40101, a liquid crystal element 40102, and a capacitor 40103. A gate electrode of the transistor 40101 is connected to a wiring 40105. A first electrode of the transistor 40101 is connected to a wiring 40104. A second electrode of the transistor 40101 is connected to a first electrode of the liquid crystal element 40102 and a first electrode of the capacitor 40103. A second electrode of the liquid crystal element 40102 corresponds to a counter electrode 40107. A second electrode of the capacitor 40103 is connected to a wiring 40106.

The wiring 40104 functions as a signal line. The wiring 40105 functions as a scan line. The wiring 40106 functions as a capacitor line. The transistor 40101 functions as a switch. The capacitor 40103 functions as a storage capacitor.

It is only necessary that the transistor 40101 function as a switch, and the transistor 40101 may be a P-channel transistor or an N-channel transistor.

A video signal is input to the wiring 40104. A scan signal is input to the wiring 40105. A constant potential is supplied to the wiring 40106. Note that the scan signal is an H-level or L-level digital voltage signal. In the case where the transistor 40101 is an N-channel transistor, an H level of the scan signal is a potential which can turn on the transistor 40101 and an L level of the scan signal is a potential which can turn off the transistor 40101. Alternatively, in the case where the transistor 40101 is a P-channel transistor, the H level of the scan signal is a potential which can turn off the transistor 40101 and the L level of the scan signal is a potential which can turn on the transistor 40101. Note that the video signal has analog voltage. The video signal is a potential which is lower than the H level of the scan signal and higher than the L level of the scan signal. Note also that the constant potential supplied to the wiring 40106 is preferably equal to a potential of the counter electrode 40107.

Operations of the pixel 40100 are described by diving the whole operations into the case where the transistor 40101 is on and the case where the transistor 40101 is off.

In the case where the transistor 40101 is on, the wiring 40104 is electrically connected to the first electrode (a pixel electrode) of the liquid crystal element 40102 and the first electrode of the capacitor 40103. Therefore, the video signal is input to the first electrode (the pixel electrode) of the liquid crystal element 40102 and the first electrode of the capacitor 40103 from the wiring 40104 through the transistor 40101. In addition, the capacitor 40103 holds a potential difference between a potential of the video signal and the potential supplied to the wiring 40106.

In the case where the transistor 40101 is off, the wiring 40104 is not electrically connected to the first electrode (the pixel electrode) of the liquid crystal element 40102 and the first electrode of the capacitor 40103. Therefore, each of the first electrode of the liquid crystal element 40102 and the first electrode of the capacitor 40103 is set in a floating state. Since the capacitor 40103 holds the potential difference between the potential of the video signal and the potential supplied to the wiring 40106, each of the first electrode of the liquid crystal element 40102 and the first electrode of the capacitor 40103 holds a potential which is the same as or corresponds to the video signal. Note that the liquid crystal element 40102 has transmittance in accordance with the video signal.

Figure 51B:
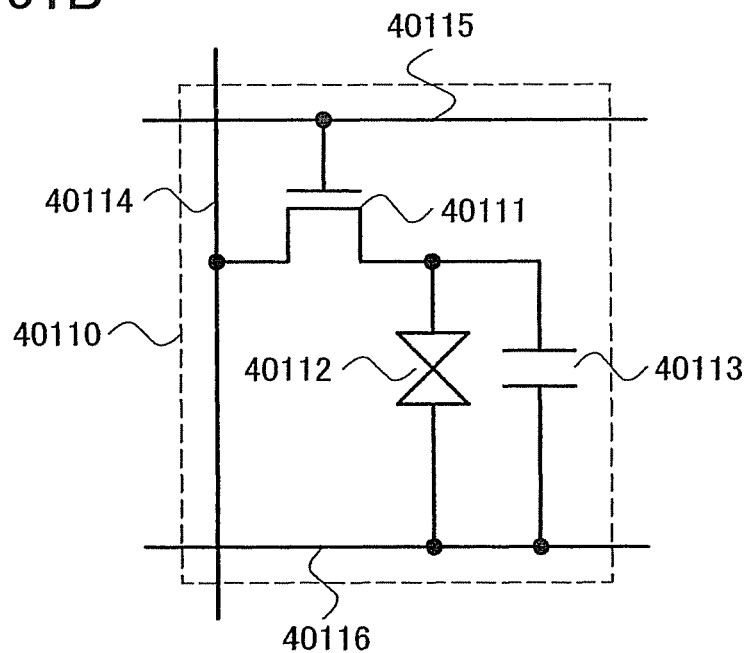

FIG. 51B is a diagram showing an example of a pixel structure which can be applied to the liquid crystal display device. In particular, FIG. 51B is a diagram showing an example of a pixel structure which can be applied to a liquid crystal display device suitable for a lateral electric field mode (including an IPS mode and an FPS mode).

A pixel 40110 includes a transistor 40111, a liquid crystal element 40112, and a capacitor 40113. A gate electrode of the transistor 40111 is connected to a wiring 40115. A first electrode of the transistor 40111 is connected to a wiring 40114. A second electrode of the transistor 40111 is connected to a first electrode of the liquid crystal element 40112 and a first electrode of the capacitor 40113. A second electrode of the liquid crystal element 40112 is connected to a wiring 40116. A second electrode of the capacitor 40113 is connected to the wiring 40116.

The wiring 40114 functions as a signal line. The wiring 40115 functions as a scan line. The wiring 40116 functions as a capacitor line. The transistor 40111 functions as a switch. The capacitor 40113 functions as a storage capacitor.

It is only necessary that the transistor 40111 function as a switch, and the transistor 40111 may be a P-channel transistor or an N-channel transistor.

A video signal is input to the wiring 40114. A scan signal is input to the wiring 40115. A constant potential is supplied to the wiring 40116. Note that the scan signal is an H-level or L-level digital voltage signal. In the case where the transistor 40111 is an N-channel transistor, an H level of the scan signal is a potential which can turn on the transistor 40111 and an L level of the scan signal is a potential which can turn off the transistor 40111. Alternatively, in the case where the transistor 40111 is a P-channel transistor, the H level of the scan signal is a potential which can turn off the transistor 40111 and the L level of the scan signal is a potential which can turn on the transistor 40111. Note that the video signal has analog voltage. The video signal is a potential which is lower than the H level of the scan signal and higher than the L level of the scan signal.

Operations of the pixel 40110 are described by diving the whole operations into the case where the transistor 40111 is on and the case where the transistor 40111 is off.

In the case where the transistor 40111 is on, the wiring 40114 is electrically connected to the first electrode (a pixel electrode) of the liquid crystal element 40112 and the first electrode of the capacitor 40113. Therefore, the video signal is input to the first electrode (the pixel electrode) of the liquid crystal element 40112 and the first electrode of the capacitor 40113 from the wiring 40114 through the transistor 40111. In addition, the capacitor 40113 holds a potential difference between a potential of the video signal and the potential supplied to the wiring 40116.

In the case where the transistor 40111 is off, the wiring 40114 is not electrically connected to the first electrode (the pixel electrode) of the liquid crystal element 40112 and the first electrode of the capacitor 40113. Therefore, each of the first electrode of the liquid crystal element 40112 and the first electrode of the capacitor 40113 is set in a floating state. Since the capacitor 40113 holds the potential difference between the potential of the video signal and the potential supplied to the wiring 40116, each of the first electrode of the liquid crystal element 40112 and the first electrode of the capacitor 40113 holds a potential which is the same as or corresponds to the video signal. Note that the liquid crystal element 40112 has transmittance in accordance with the video signal.

Figure 52:
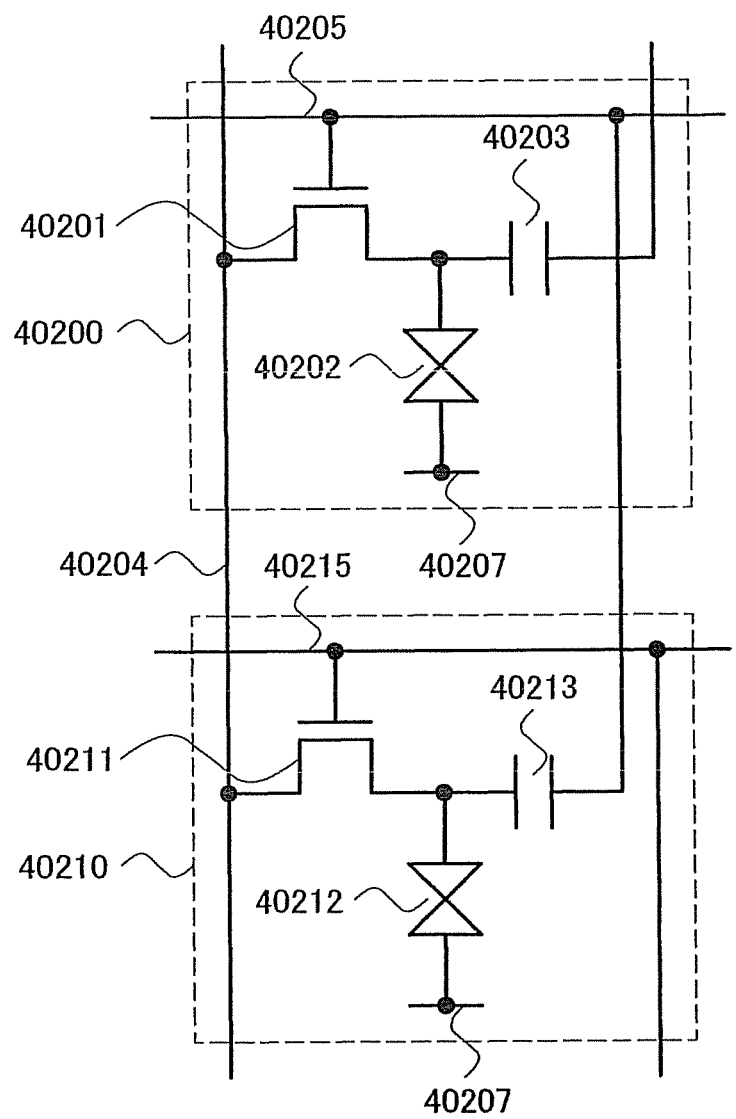
FIG. 52 is a diagram illustrating an example of a circuit structure of a semiconductor device in accordance with the present invention.

FIG. 52 is a diagram showing an example of a pixel structure which can be applied to the liquid crystal display device. In particular, FIG. 52 is a diagram showing an example of a pixel structure in which an aperture ratio of a pixel can be increased by reducing the number of wirings.

FIG. 52 shows two pixels which are provided in the same column direction (a pixel 40200 and a pixel 40210). For example, when the pixel 40200 is provided in an N-th row, the pixel 40210 is provided in an (N+1)th row.

A pixel 40200 includes a transistor 40201, a liquid crystal element 40202, and a capacitor 40203. A gate electrode of the transistor 40201 is connected to a wiring 40205. A first electrode of the transistor 40201 is connected to a wiring 40204. A second electrode of the transistor 40201 is connected to a first electrode of the liquid crystal element 40202 and a first electrode of the capacitor 40203. A second electrode of the liquid crystal element 40202 corresponds to a counter electrode 40207. A second electrode of the capacitor 40203 is connected to a wiring which is the same as a wiring connected to a gate electrode of a transistor of the previous row.

A pixel 40210 includes a transistor 40211, a liquid crystal element 40212, and a capacitor 40213. A gate electrode of the transistor 40211 is connected to a wiring 40215. A first electrode of the transistor 40211 is connected to the wiring 40204. A second electrode of the transistor 40211 is connected to a first electrode of the liquid crystal element 40212 and a first electrode of the capacitor 40213. A second electrode of the liquid crystal element 40212 corresponds to the counter electrode 40207. A second electrode of the capacitor 40213 is connected to the wiring which is the same as the wiring connected to the gate electrode of the transistor of the previous row (the wiring 40205).

The wiring 40204 functions as a signal line. The wiring 40205 functions as a scan line of the N-th row. The wiring 40205 also functions as a capacitor line of the (N+1)th row. The transistor 40201 functions as a switch. The capacitor 40203 functions as a storage capacitor.

The wiring 40215 functions as a scan line of the (N+1)th row. The wiring 40215 also functions as a capacitor line of an (N+2)th row. The transistor 40211 functions as a switch. The capacitor 40213 functions as a storage capacitor.

It is only necessary that each of the transistor 40201 and the transistor 40211 function as a switch, and each of the transistor 40201 and the transistor 40211 may be a P-channel transistor or an N-channel transistor.

A video signal is input to the wiring 40204. A scan signal (of an N-th row) is input to the wiring 40205. A scan signal (of an (N+1)th row) is input to the wiring 40215.

The scan signal is an H-level or L-level digital voltage signal. In the case where the transistor 40201 (or the transistor 40211) is an N-channel transistor, an H level of the scan signal is a potential which can turn on the transistor 40201 (or the transistor 40211) and an L level of the scan signal is a potential which can turn off the transistor 40201 (or the transistor 40211). Alternatively, in the case where the transistor 40201 (or the transistor 40211) is a P-channel transistor, the H level of the scan signal is a potential which can turn off the transistor 40201 (or the transistor 40211) and the L level of the scan signal is a potential which can turn on the transistor 40201 (or the transistor 40211). Note that the video signal has analog voltage. The video signal is a potential which is lower than the H level of the scan signal and higher than the L level of the scan signal.

Operations of the pixel 40200 are described by diving the whole operations into the case where the transistor 40201 is on and the case where the transistor 40201 is off.

In the case where the transistor 40201 is on, the wiring 40204 is electrically connected to the first electrode (a pixel electrode) of the liquid crystal element 40202 and the first electrode of the capacitor 40203. Therefore, the video signal is input to the first electrode (the pixel electrode) of the liquid crystal element 40202 and the first electrode of the capacitor 40203 from the wiring 40204 through the transistor 40201. In addition, the capacitor 40203 holds a potential difference between a potential of the video signal and a potential supplied to the wiring which is the same as the wiring connected to the gate electrode of the transistor of the previous row.

In the case where the transistor 40201 is off, the wiring 40204 is not electrically connected to the first electrode (the pixel electrode) of the liquid crystal element 40202 and the first electrode of the capacitor 40203. Therefore, each of the first electrode of the liquid crystal element 40202 and the first electrode of the capacitor 40203 is set in a floating state. Since the capacitor 40203 holds the potential difference between the potential of the video signal and the potential of the wiring which is the same as the wiring connected to the gate electrode of the transistor of the previous row, each of the first electrode of the liquid crystal element 40202 and the first electrode of the capacitor 40203 holds a potential which is the same as or corresponds to the video signal. Note that the liquid crystal element 40202 has transmittance in accordance with the video signal.

Operations of the pixel 40210 are described by diving the whole operations into the case where the transistor 40211 is on and the case where the transistor 40211 is off.

In the case where the transistor 40211 is on, the wiring 40204 is electrically connected to the first electrode (a pixel electrode) of the liquid crystal element 40212 and the first electrode of the capacitor 40213. Therefore, the video signal is input to the first electrode (the pixel electrode) of the liquid crystal element 40212 and the first electrode of the capacitor 40213 from the wiring 40204 through the transistor 40211. In addition, the capacitor 40213 holds a potential difference between a potential of the video signal and a potential supplied to a wiring which is the same as the wiring connected to the gate electrode of the transistor of the previous row (the wiring 40205).

In the case where the transistor 40211 is off, the wiring 40214 is not electrically connected to the first electrode (the pixel electrode) of the liquid crystal element 40212 and the first electrode of the capacitor 40213. Therefore, each of the first electrode of the liquid crystal element 40212 and the first electrode of the capacitor 40213 is set in a floating state. Since the capacitor 40213 holds the potential difference between the potential of the video signal and the potential of the wiring which is the same as the wiring connected to the gate electrode of the transistor of the previous row (the wiring 40215), each of the first electrode (the pixel electrode) of the liquid crystal element 40212 and the first electrode of the capacitor 40213 holds a potential which is the same as or corresponds to the video signal. Note that the liquid crystal element 40212 has transmittance in accordance with the video signal.

Figure 53:
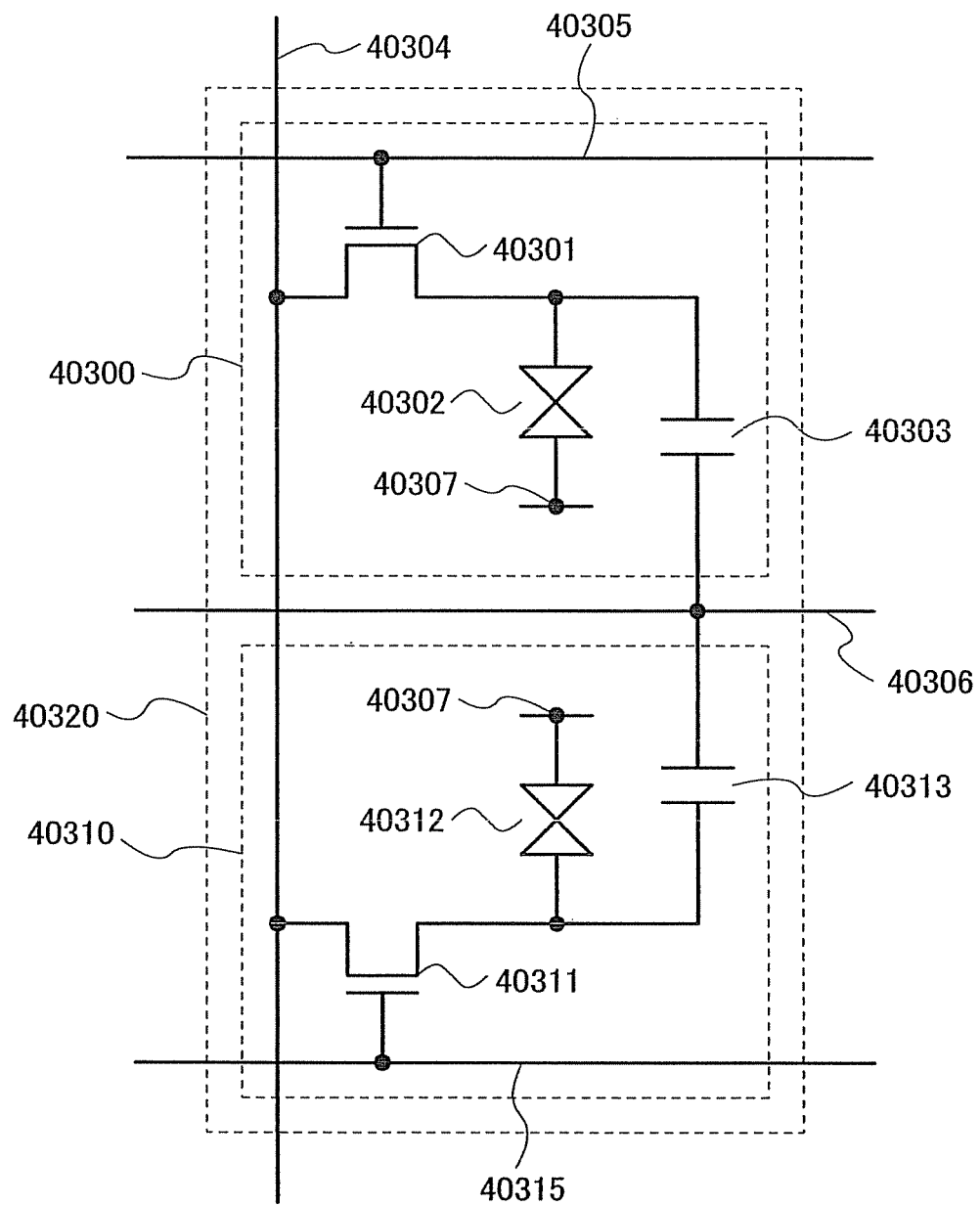
FIG. 53 is a diagram illustrating an example of a circuit structure of a semiconductor device in accordance with the present invention.

FIG. 53 is a diagram showing an example of a pixel structure which can be applied to the liquid crystal display device. In particular, FIG. 53 is a diagram showing an example of a pixel structure in which a viewing angle can be improved by using a subpixel.

A pixel 40320 includes a subpixel 40300 and a subpixel 40310. Although the case in which the pixel 40320 includes two subpixels is described below, the pixel 40320 may include three or more subpixels.

The subpixel 40300 includes a transistor 40301, a liquid crystal element 40302, and a capacitor 40303. A gate electrode of the transistor 40301 is connected to a wiring 40305. A first electrode of the transistor 40301 is connected to a wiring 40304. A second electrode of the transistor 40301 is connected to a first electrode of the liquid crystal element 40302 and a first electrode of the capacitor 40303. A second electrode of the liquid crystal element 40302 corresponds to a counter electrode 40307. A second electrode of the capacitor 40303 is connected to a wiring 40306.

The subpixel 40310 includes a transistor 40311, a liquid crystal element 40312, and a capacitor 40313. A gate electrode of the transistor 40311 is connected to a wiring 40315. A first electrode of the transistor 40311 is connected to the wiring 40304. A second electrode of the transistor 40311 is connected to a first electrode of the liquid crystal element 40312 and a first electrode of the capacitor 40313. A second electrode of the liquid crystal element 40312 corresponds to the counter electrode 40307. A second electrode of the capacitor 40313 is connected to a wiring 40306.

The wiring 40304 functions as a signal line. Each of the wiring 40305 and the wiring 40315 functions as a scan line. The wiring 40306 functions as a capacitor line. Each of the transistor 40301 and the transistor 40311 functions as a switch. Each of the capacitor 40303 and the capacitor 40313 functions as a storage capacitor.

It is only necessary that each of the transistor 40301 and the transistor 40311 function as a switch, and each of the transistor 40301 and the transistor 40311 may be a P-channel transistor or an N-channel transistor.

A video signal is input to the wiring 40304. A scan signal is input to the wiring 40305 and the wiring 40315. A constant potential is supplied to the wiring 40306.

The scan signal is an H-level or L-level digital voltage signal. In the case where the transistor 40301 (or the transistor 40311) is an N-channel transistor, an H level of the scan signal is a potential which can turn on the transistor 40301 (or the transistor 40311) and an L level of the scan signal is a potential which can turn off the transistor 40301 (or the transistor 40311). Alternatively, in the case where the transistor 40301 (or the transistor 40311) is a P-channel transistor, the H level of the scan signal is a potential which can turn off the transistor 40301 (or the transistor 40311) and the L level of the scan signal is a potential which can turn on the transistor 40301 (or the transistor 40311). Note that the video signal has analog voltage. The video signal is a potential which is lower than the H level of the scan signal and higher than the L level of the scan signal. Note also that the constant potential supplied to the wiring 40306 is preferably equal to a potential of the counter electrode 40307.

Operations of the pixel 40320 are described by diving the whole operations into the case where the transistor 40301 is on and the transistor 40311 is off, the case where the transistor 40301 is off and the transistor 40311 is on, and the case where the transistor 40301 and the transistor 40311 are off.

In the case where the transistor 40301 is on and the transistor 40311 is off, the wiring 40304 is electrically connected to the first electrode (a pixel electrode) of the liquid crystal element 40302 and the first electrode of the capacitor 40303 in the subpixel 40300. Therefore, the video signal is input to the first electrode (the pixel electrode) of the liquid crystal element 40302 and the first electrode of the capacitor 40303 from the wiring 40304 through the transistor 40301. In addition, the capacitor 40303 holds a potential difference between a potential of the video signal and a potential supplied to the wiring 40306. At this time, the wiring 40304 is not electrically connected to the first electrode (the pixel electrode) of the liquid crystal element 40312 and the first electrode of the capacitor 40313 in the subpixel 40310. Therefore, the video signal is not input to the subpixel 40310.

In the case where the transistor 40301 is off and the transistor 40311 is on, the wiring 40304 is not electrically connected to the first electrode (the pixel electrode) of the liquid crystal element 40302 and the first electrode of the capacitor 40303 in the subpixel 40300. Therefore, each of the first electrode of the liquid crystal element 40302 and the first electrode of the capacitor 40303 is set in a floating state. Since the capacitor 40303 holds the potential difference between the potential of the video signal and the potential supplied to the wiring 40306, each of the first electrode of the liquid crystal element 40302 and the first electrode of the capacitor 40303 holds a potential which is the same as or corresponds to the video signal. At this time, the wiring 40304 is electrically connected to the first electrode (the pixel electrode) of the liquid crystal element 40312 and the first electrode of the capacitor 40313 in the subpixel 40310. Therefore, the video signal is input to the first electrode (the pixel electrode) of the liquid crystal element 40312 and the first electrode of the capacitor 40313 from the wiring 40304 through the transistor 40311. In addition, the capacitor 40313 holds a potential difference between a potential of the video signal and a potential supplied to the wiring 40306.

In the case where the transistor 40301 and the transistor 40311 are off, the wiring 40304 is not electrically connected to the first electrode (the pixel electrode) of the liquid crystal element 40302 and the first electrode of the capacitor 40303 in the subpixel 40300. Therefore, each of the first electrode of the liquid crystal element 40302 and the first electrode of the capacitor 40303 is set in a floating state. Since the capacitor 40303 holds the potential difference between the potential of the video signal and the potential supplied to the wiring 40306, each of the first electrode of the liquid crystal element 40302 and the first electrode of the capacitor 40303 holds a potential which is the same as or corresponds to the video signal. Note that the liquid crystal element 40302 has transmittance in accordance with the video signal. At this time, the wiring 40304 is not electrically connected to the first electrode (the pixel electrode) of the liquid crystal element 40312 and the first electrode of the capacitor 40313 similarly in the subpixel 40310. Therefore, each of the first electrode of the liquid crystal element 40312 and the first electrode of the capacitor 40313 is set in a floating state. Since the capacitor 40313 holds the potential difference between the potential of the video signal and the potential of the wiring 40306, each of the first electrode of the liquid crystal element 40312 and the first electrode of the capacitor 40313 holds a potential which is the same as or corresponds to the video signal. Note that the liquid crystal element 40312 has transmittance in accordance with the video signal.

A video signal input to the subpixel 40300 may be a value which is different from that of a video signal input to the subpixel 40310. In this case, the viewing angle can be widened because alignment of liquid crystal molecules of the liquid crystal element 40302 and alignment of liquid crystal molecules of the liquid crystal element 40312 can be varied from each other.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 9

In this embodiment mode, various liquid crystal modes are described.

First, various liquid crystal modes are described with reference to cross-sectional views.

Figure 54A:
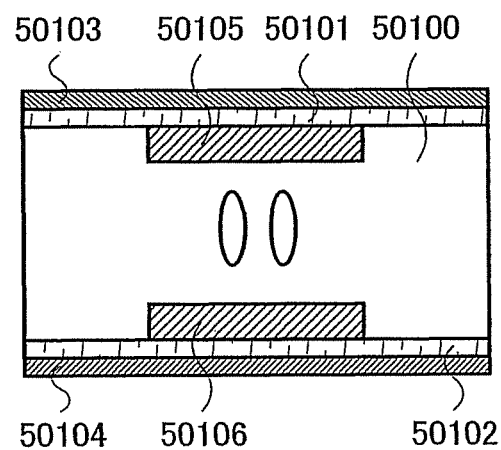
FIGS. 54A and 54B are views each illustrating an example of a cross-sectional view of a semiconductor device in accordance with the present invention.
Figure 54B:
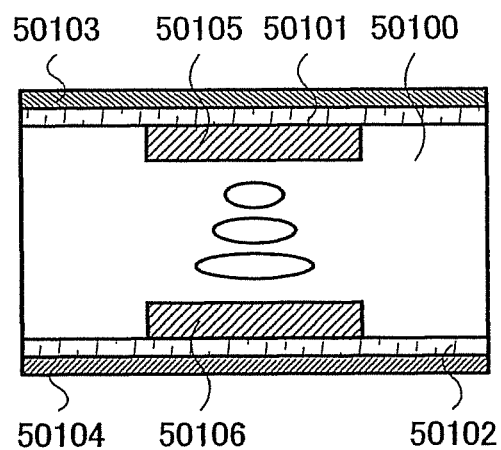

FIGS. 54A and 54B are schematic views of cross sections of a TN mode.

A liquid crystal layer 50100 is held between a first substrate 50101 and a second substrate 50102 which are provided so as to be opposite to each other. A first electrode 50105 is formed on a top surface of the first substrate 50101. A second electrode 50106 is formed on a top surface of the second substrate 50102. A first polarizing plate 50103 is provided on a surface of the first substrate 50101, which does not face the liquid crystal layer. A second polarizing plate 50104 is provided on a surface of the second substrate 50102, which does not face the liquid crystal layer. Note that the first polarizing plate 50103 and the second polarizing plate 50104 are provided so as to be in a cross nicol state.

The first polarizing plate 50103 may be provided on the top surface of the first substrate 50101. The second polarizing plate 50104 may be provided on the top surface of the second substrate 50102.

It is only necessary that at least one of the first electrode 50105 and the second electrode 50106 have transparency (a transmissive or reflective liquid crystal display device). Alternatively, both the first electrode 50105 and the second electrode 50106 may have transparency, and part of one of the electrodes may have reflectivity (a semi-transmissive liquid crystal display device).

FIG. 54A is a schematic view of a cross section in the case where voltage is applied to the first electrode 50105 and the second electrode 50106 (referred to as a vertical electric field mode). Since liquid crystal molecules are aligned longitudinally, light emitted from a backlight is not affected by birefringence of the liquid crystal molecules. In addition, since the first polarizing plate 50103 and the second polarizing plate 50104 are provided so as to be in a cross nicol state, light emitted from the backlight cannot pass through the substrate. Therefore, black display is performed.

Note that by controlling voltage applied to the first electrode 50105 and the second electrode 50106, conditions of the liquid crystal molecules can be controlled. Therefore, since the amount of light emitted from the backlight passing through the substrate can be controlled, predetermined image display can be performed.

FIG. 54B is a schematic view of a cross section in the case where voltage is not applied to the first electrode 50105 and the second electrode 50106. Since the liquid crystal molecules are aligned laterally and rotated in a plane, light emitted from a backlight is affected by birefringence of the liquid crystal molecules. In addition, since the first polarizing plate 50103 and the second polarizing plate 50104 are provided so as to be in a cross nicol state, light emitted from the backlight passes through the substrate. Therefore, white display is performed. This is a so-called normally white mode.

A liquid crystal display device having a structure shown in FIG. 54A or FIG. 54B can perform full-color display by being provided with a color filter. The color filter can be provided over a first substrate 50101 side or a second substrate 50102 side.

It is only necessary that a known material be used for a liquid crystal material used for a TN mode.

Figure 55A:
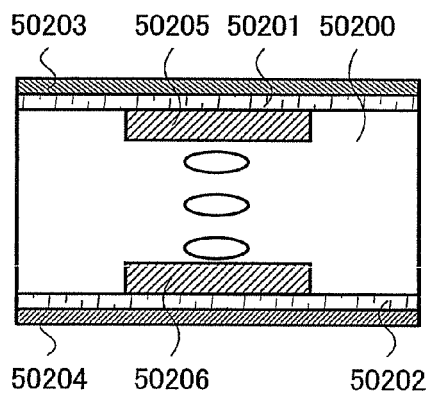
FIGS. 55A to 55D are views each illustrating an example of a cross-sectional view of a semiconductor device in accordance with the present invention.
Figure 55B:
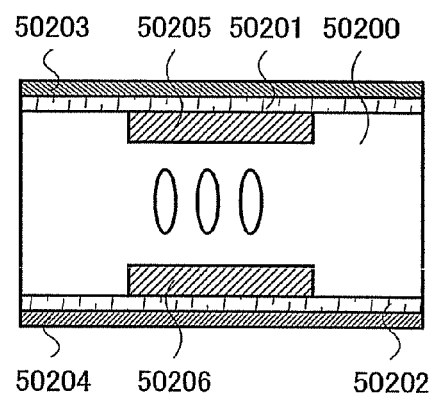

FIGS. 55A and 55B are schematic views of cross sections of a VA mode. In the VA mode, liquid crystal molecules are aligned such that they are vertical to a substrate when there is no electric field.

A liquid crystal layer 50200 is held between a first substrate 50201 and a second substrate 50202 which are provided so as to be opposite to each other. A first electrode 50205 is formed on a top surface of the first substrate 50201. A second electrode 50206 is formed on a top surface of the second substrate 50202. A first polarizing plate 50203 is provided on a surface of the first substrate 50201, which does not face the liquid crystal layer. A second polarizing plate 50204 is provided on a surface of the second substrate 50202, which does not face the liquid crystal layer. Note that the first polarizing plate 50203 and the second polarizing plate 50204 are provided so as to be in a cross nicol state.

The first polarizing plate 50203 may be provided on the top surface of the first substrate 50201. The second polarizing plate 50204 may be provided on the top surface of the second substrate 50202.

It is only necessary that at least one of the first electrode 50205 and the second electrode 50206 have transparency (a transmissive or reflective liquid crystal display device). Alternatively, both the first electrode 50205 and the second electrode 50206 may have transparency, and part of one of the electrodes may have reflectivity (a semi-transmissive liquid crystal display device).

FIG. 55A is a schematic view of a cross section in the case where voltage is applied to the first electrode 50205 and the second electrode 50206 (referred to as a vertical electric field mode). Since liquid crystal molecules are aligned laterally, light emitted from a backlight is affected by birefringence of the liquid crystal molecules. In addition, since the first polarizing plate 50203 and the second polarizing plate 50204 are provided so as to be in a cross nicol state, light emitted from the backlight passes through the substrate. Therefore, white display is performed.

Note that by controlling voltage applied to the first electrode 50205 and the second electrode 50206, conditions of the liquid crystal molecules can be controlled. Therefore, since the amount of light emitted from the backlight passing through the substrate can be controlled, predetermined image display can be performed.

FIG. 55B is a schematic view of a cross section in the case where voltage is not applied to the first electrode 50205 and the second electrode 50206. Since liquid crystal molecules are aligned longitudinally, light emitted from a backlight is not affected by birefringence of the liquid crystal molecules. In addition, since the first polarizing plate 50203 and the second polarizing plate 50204 are provided so as to be in a cross nicol state, light emitted from the backlight does not pass through the substrate. Therefore, black display is performed. This is a so-called normally black mode.

A liquid crystal display device having a structure shown in FIG. 55A or FIG. 55B can perform full-color display by being provided with a color filter. The color filter can be provided over a first substrate 50201 side or a second substrate 50202 side.

It is only necessary that a known material be used for a liquid crystal material used for a VA mode.

Figure 55C:
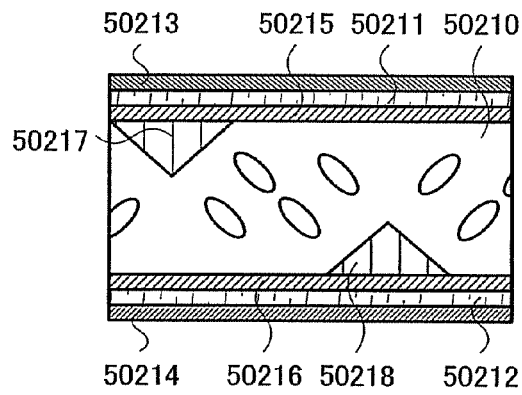
Figure 55D:
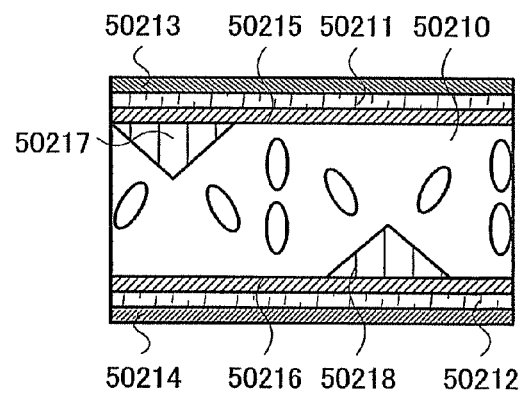

FIGS. 55C and 55D are schematic views of cross sections of an MVA mode. In the MVA mode, viewing angle dependency of each portion is compensated by each other.

A liquid crystal layer 50210 is held between a first substrate 50211 and a second substrate 50212 which are provided so as to be opposite to each other. A first electrode 50215 is formed on a top surface of the first substrate 50211. A second electrode 50216 is formed on a top surface of the second substrate 50212. A first protrusion 50217 for controlling alignment is formed on the first electrode 50215. A second protrusion 50218 for controlling alignment is formed over the second electrode 50216. A first polarizing plate 50213 is provided on a surface of the first substrate 50211, which does not face the liquid crystal layer. A second polarizing plate 50214 is provided on a surface of the second substrate 50212, which does not face the liquid crystal layer. Note that the first polarizing plate 50213 and the second polarizing plate 50214 are provided so as to be in a cross nicol state.

The first polarizing plate 50213 may be provided on the top surface of the first substrate 50211. The second polarizing plate 50214 may be provided on the top surface of the second substrate 50212.

It is only necessary that at least one of the first electrode 50215 and the second electrode 50216 have transparency (a transmissive or reflective liquid crystal display device). Alternatively, both the first electrode 50215 and the second electrode 50216 may have transparency, and part of one of the electrodes may have reflectivity (a semi-transmissive liquid crystal display device).

FIG. 55C is a schematic view of a cross section in the case where voltage is applied to the first electrode 50215 and the second electrode 50216 (referred to as a vertical electric field mode). Since liquid crystal molecules are aligned so as to tilt toward the first protrusion 50217 and the second protrusion 50218, light emitted from a backlight is affected by birefringence of the liquid crystal molecules. In addition, since the first polarizing plate 50213 and the second polarizing plate 50214 are provided so as to be in a cross nicol state, light emitted from the backlight passes through the substrate. Therefore, white display is performed.

Note that by controlling voltage applied to the first electrode 50215 and the second electrode 50216, conditions of the liquid crystal molecules can be controlled. Therefore, since the amount of light emitted from the backlight passing through the substrate can be controlled, predetermined image display can be performed.

FIG. 55D is a schematic view of a cross section in the case where voltage is not applied to the first electrode 50215 and the second electrode 50216. Since liquid crystal molecules are aligned longitudinally, light emitted from a backlight is not affected by birefringence of the liquid crystal molecules. In addition, since the first polarizing plate 50213 and the second polarizing plate 50214 are provided so as to be in a cross nicol state, light emitted from the backlight does not pass through the substrate. Therefore, black display is performed. This is a so-called normally black mode.

A liquid crystal display device having a structure shown in FIG. 55C or FIG. 55D can perform full-color display by being provided with a color filter. The color filter can be provided over a first substrate 50211 side or a second substrate 50212 side.

It is only necessary that a known material be used for a liquid crystal material used for an MVA mode.

Figure 56A:
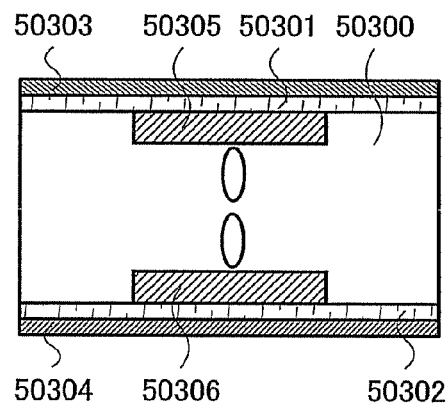
FIGS. 56A to 56D are views each illustrating an example of a cross-sectional view of a semiconductor device in accordance with the present invention.
Figure 56B:
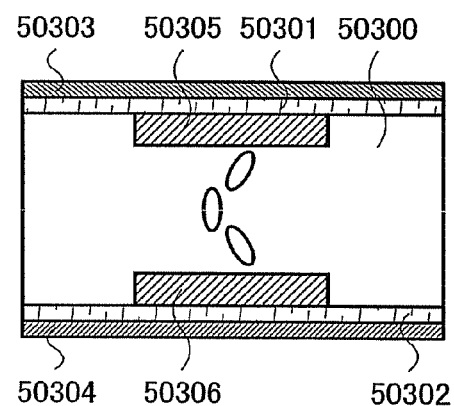

FIGS. 56A and 56B are schematic views of cross sections of an OCB mode. In the OCB mode, viewing angle dependency is low because alignment of liquid crystal molecules in a liquid crystal layer can be optically compensated. This state of the liquid crystal molecules is referred to as bend alignment.

A liquid crystal layer 50300 is held between a first substrate 50301 and a second substrate 50302 which are provided so as to be opposite to each other. A first electrode 50305 is formed on a top surface of the first substrate 50301. A second electrode 50306 is formed on a top surface of the second substrate 50302. A first polarizing plate 50303 is provided on a surface of the first substrate 50301, which does not face the liquid crystal layer 50300. A second polarizing plate 50304 is provided on a surface of the second substrate 50302, which does not face the liquid crystal layer 50300. Note that the first polarizing plate 50303 and the second polarizing plate 50304 are provided so as to be in a cross nicol state.

The first polarizing plate 50303 may be provided on the top surface of the first substrate 50301, i.e., may be provided between the first substrate 50301 and the liquid crystal layer. The second polarizing plate 50304 may be provided on the top surface of the second substrate 50302, i.e., may be provided between the second substrate 50302 and the liquid crystal layer.

It is only necessary that at least one of the first electrode 50305 and the second electrode 50306 have transparency (a transmissive or reflective liquid crystal display device). Alternatively, both the first electrode 50305 and the second electrode 50306 may have transparency, and part of one of the electrodes may have reflectivity (a semi-transmissive liquid crystal display device).

FIG. 56A is a schematic view of a cross section in the case where voltage is applied to the first electrode 50305 and the second electrode 50306 (referred to as a vertical electric field mode). Since liquid crystal molecules are aligned longitudinally, light emitted from a backlight is not affected by birefringence of the liquid crystal molecules. In addition, since the first polarizing plate 50303 and the second polarizing plate 50304 are provided so as to be in a cross nicol state, light emitted from the backlight does not pass through the substrate. Therefore, black display is performed.

Note that by controlling voltage applied to the first electrode 50305 and the second electrode 50306, conditions of the liquid crystal molecules can be controlled. Therefore, since the amount of light emitted from the backlight passing through the substrate can be controlled, predetermined image display can be performed.

FIG. 56B is a schematic view of a cross section in the case where voltage is not applied to the first electrode 50305 and the second electrode 50306. Since liquid crystal molecules are in a bend alignment state, light emitted from a backlight is affected by birefringence of the liquid crystal molecules. In addition, since the first polarizing plate 50303 and the second polarizing plate 50304 are provided so as to be in a cross nicol state, light emitted from the backlight passes through the substrate. Therefore, white display is performed. This is a so-called normally white mode.

A liquid crystal display device having a structure shown in FIG. 56A or FIG. 56B can perform full-color display by being provided with a color filter. The color filter can be provided over a first substrate 50301 side or a second substrate 50302 side.

It is only necessary that a known material be used for a liquid crystal material used for an OCB mode.

Figure 56C:
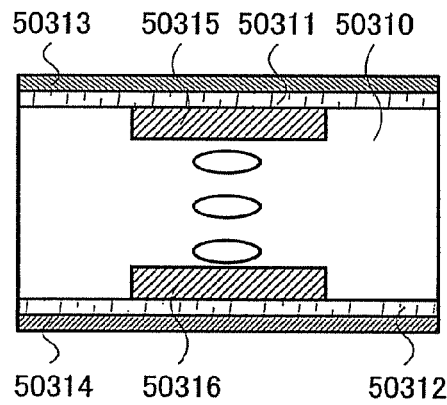
Figure 56D:
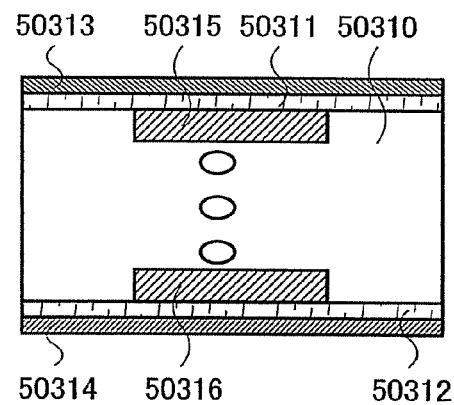

FIGS. 56C and 56D are schematic views of cross sections of an FLC mode or an AFLC mode.

A liquid crystal layer 50310 is held between a first substrate 50311 and a second substrate 50312 which are provided so as to be opposite to each other. A first electrode 50315 is formed on a top surface of the first substrate 50311. A second electrode 50316 is formed on a top surface of the second substrate 50312. A first polarizing plate 50313 is provided on a surface of the first substrate 50311, which does not face the liquid crystal layer. A second polarizing plate 50314 is provided on a surface of the second substrate 50312, which does not face the liquid crystal layer. Note that the first polarizing plate 50313 and the second polarizing plate 50314 are provided so as to be in a cross nicol state.

The first polarizing plate 50313 may be provided on the top surface of the first substrate 50311. The second polarizing plate 50314 may be provided on the top surface of the second substrate 50312.

It is only necessary that at least one of the first electrode 50315 and the second electrode 50316 have transparency (a transmissive or reflective liquid crystal display device). Alternatively, both the first electrode 50315 and the second electrode 50316 may have transparency, and part of one of the electrodes may have reflectivity (a semi-transmissive liquid crystal display device).

FIG. 56C is a schematic view of a cross section in the case where voltage is applied to the first electrode 50315 and the second electrode 50316 (referred to as a vertical electric field mode). Since liquid crystal molecules are aligned laterally in a direction which is deviated from a rubbing direction, light emitted from a backlight is affected by birefringence of the liquid crystal molecules. In addition, since the first polarizing plate 50313 and the second polarizing plate 50314 are provided so as to be in a cross nicol state, light emitted from the backlight passes through the substrate. Therefore, white display is performed.

Note that by controlling voltage applied to the first electrode 50315 and the second electrode 50316, conditions of the liquid crystal molecules can be controlled. Therefore, since the amount of light emitted from the backlight passing through the substrate can be controlled, predetermined image display can be performed.

FIG. 56D is a schematic view of a cross section in the case where voltage is not applied to the first electrode 50315 and the second electrode 50316. Since liquid crystal molecules are aligned laterally in a rubbing direction, light emitted from a backlight is not affected by birefringence of the liquid crystal molecules. In addition, since the first polarizing plate 50313 and the second polarizing plate 50314 are provided so as to be in a cross nicol state, light emitted from the backlight does not pass through the substrate. Therefore, black display is performed. This is a so-called normally black mode.

A liquid crystal display device having a structure shown in FIG. 56C or FIG. 56D can perform full-color display by being provided with a color filter. The color filter can be provided over a first substrate 50311 side or a second substrate 50312 side.

It is only necessary that a known material be used for a liquid crystal material used for an FLC mode or an AFLC mode.

Figure 57A:
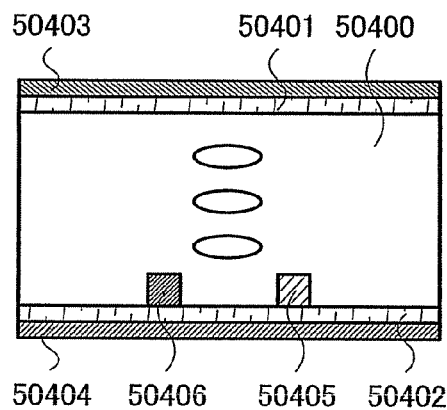
FIGS. 57A to 57D are views each illustrating an example of a cross-sectional view of a semiconductor device in accordance with the present invention.
Figure 57B:
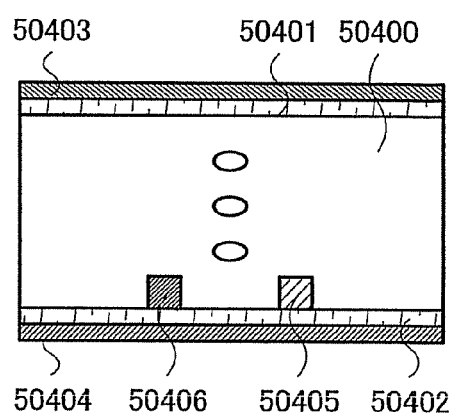

FIGS. 57A and 57B are schematic views of cross sections of an IPS mode. In the IPS mode, alignment of liquid crystal molecules in a liquid crystal layer can be optically compensated, the liquid crystal molecules are constantly rotated in a plane parallel to a substrate, and a horizontal electric field method in which electrodes are provided only on one substrate side is used.

A liquid crystal layer 50400 is held between a first substrate 50401 and a second substrate 50402 which are provided so as to be opposite to each other. A first electrode 50405 and a second electrode 50406 are formed on a top surface of the second substrate 50402. A first polarizing plate 50403 is provided on a surface of the first substrate 50401, which does not face the liquid crystal layer. A second polarizing plate 50404 is provided on a surface of the second substrate 50402, which does not face the liquid crystal layer. Note that the first polarizing plate 50403 and the second polarizing plate 50404 are provided so as to be in a cross nicol state.

The first polarizing plate 50403 may be provided on the top surface of the first substrate 50401. The second polarizing plate 50404 may be provided on the top surface of the second substrate 50402.

Both the first electrode 50405 and the second electrode 50406 may have transparency (a transmissive liquid crystal display device). Alternatively, part of one of the first electrode 50405 and the second electrode 50406 may have reflectivity (a semi-transmissive liquid crystal display device).

FIG. 57A is a schematic view of a cross section in the case where voltage is applied to the first electrode 50405 and the second electrode 50406 (referred to as a horizontal electric field mode). Since liquid crystal molecules are aligned along a line of electric force which is deviated from a rubbing direction, light emitted from a backlight is affected by birefringence of the liquid crystal molecules. In addition, since the first polarizing plate 50403 and the second polarizing plate 50404 are provided so as to be in a cross nicol state, light emitted from the backlight passes through the substrate. Therefore, white display is performed.

Note that by controlling voltage applied to the first electrode 50405 and the second electrode 50406, conditions of the liquid crystal molecules can be controlled. Therefore, since the amount of light emitted from the backlight passing through the substrate can be controlled, predetermined image display can be performed.

FIG. 57B is a schematic view of a cross section in the case where voltage is not applied to the first electrode 50405 and the second electrode 50406. Since liquid crystal molecules are aligned laterally in a rubbing direction, light emitted from a backlight is not affected by birefringence of the liquid crystal molecules. In addition, since the first polarizing plate 50403 and the second polarizing plate 50404 are provided so as to be in a cross nicol state, light emitted from the backlight does not pass through the substrate. Therefore, black display is performed. This is a so-called normally black mode.

A liquid crystal display device having a structure shown in FIG. 57A or FIG. 57B can perform full-color display by being provided with a color filter. The color filter can be provided over a first substrate 50401 side or a second substrate 50402 side.

It is only necessary that a known material be used for a liquid crystal material used for an IPS mode.

Figure 57C:
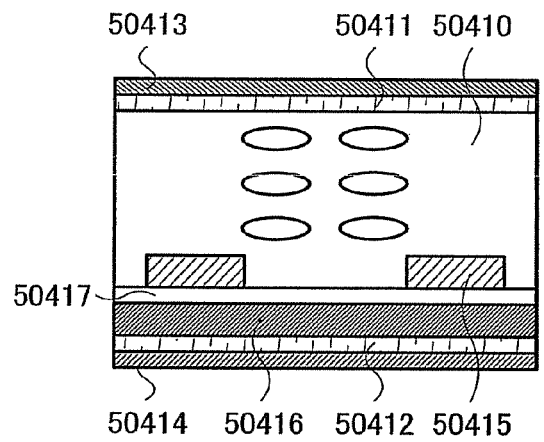
Figure 57D:
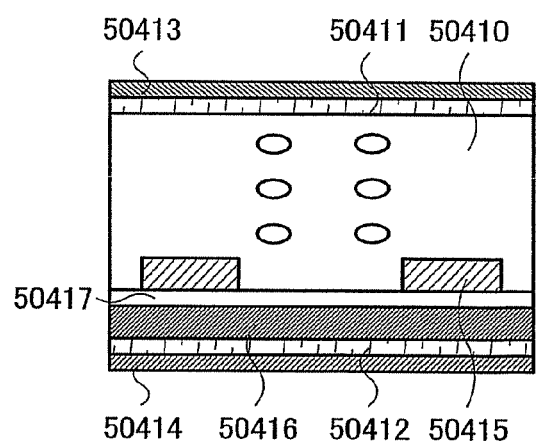

FIGS. 57C and 57D are schematic views of cross sections of an FFS mode. In the FFS mode, alignment of liquid crystal molecules in a liquid crystal layer can be optically compensated, the liquid crystal molecules are constantly rotated in a plane parallel to a substrate, and a horizontal electric field method in which electrodes are provided only on one substrate side is used.

A liquid crystal layer 50410 is held between a first substrate 50411 and a second substrate 50412 which are provided so as to be opposite to each other. A second electrode 50416 is formed on a top surface of the second substrate 50412. An insulating film 50417 is formed on a top surface of the second electrode 50416. A first electrode 50415 is formed over the insulating film 50417. A first polarizing plate 50413 is provided on a surface of the first substrate 50411, which does not face the liquid crystal layer 50410. A second polarizing plate 50414 is provided on a surface of the second substrate 50412, which does not face the liquid crystal layer 50410. Note that the first polarizing plate 50413 and the second polarizing plate 50414 are provided so as to be in a cross nicol state.

The first polarizing plate 50413 may be provided on the top surface of the first substrate 50411, i.e., may be provided between the first substrate 50411 and the liquid crystal layer. The second polarizing plate 50414 may be provided on the top surface of the second substrate 50412, i.e., may be provided between the second substrate 50412 and the liquid crystal layer.

It is only necessary that at least one of the first electrode 50415 and the second electrode 50416 have transparency (a transmissive or reflective liquid crystal display device). Alternatively, both the first electrode 50415 and the second electrode 50416 may have transparency, and part of one of the electrodes may have reflectivity (a semi-transmissive liquid crystal display device).

FIG. 57C is a schematic view of a cross section in the case where voltage is applied to the first electrode 50415 and the second electrode 50416 (referred to as a horizontal electric field mode). Since liquid crystal molecules are aligned along a line of electric force which is deviated from a rubbing direction, light emitted from a backlight is affected by birefringence of the liquid crystal molecules. In addition, since the first polarizing plate 50413 and the second polarizing plate 50414 are provided so as to be in a cross nicol state, light emitted from the backlight passes through the substrate. Therefore, white display is performed.

Note that by controlling voltage applied to the first electrode 50415 and the second electrode 50416, conditions of the liquid crystal molecules can be controlled. Therefore, since the amount of light emitted from the backlight passing through the substrate can be controlled, predetermined image display can be performed.

FIG. 57D is a schematic view of a cross section in the case where voltage is not applied to the first electrode 50415 and the second electrode 50416. Since liquid crystal molecules are aligned laterally in a rubbing direction, light emitted from the backlight is not affected by birefringence of the liquid crystal molecules. In addition, since the first polarizing plate 50413 and the second polarizing plate 50414 are provided so as to be in a cross nicol state, light emitted from the backlight does not pass through the substrate. Therefore, black display is performed. This is a so-called normally black mode.

A liquid crystal display device having a structure shown in FIG. 57C or FIG. 57D can perform full-color display by being provided with a color filter. The color filter can be provided over a first substrate 50411 side or a second substrate 50412 side.

It is only necessary that a known material be used for a liquid crystal material used for an FFS mode.

Next, various liquid crystal modes are described with reference to top plan views.

Figure 58:
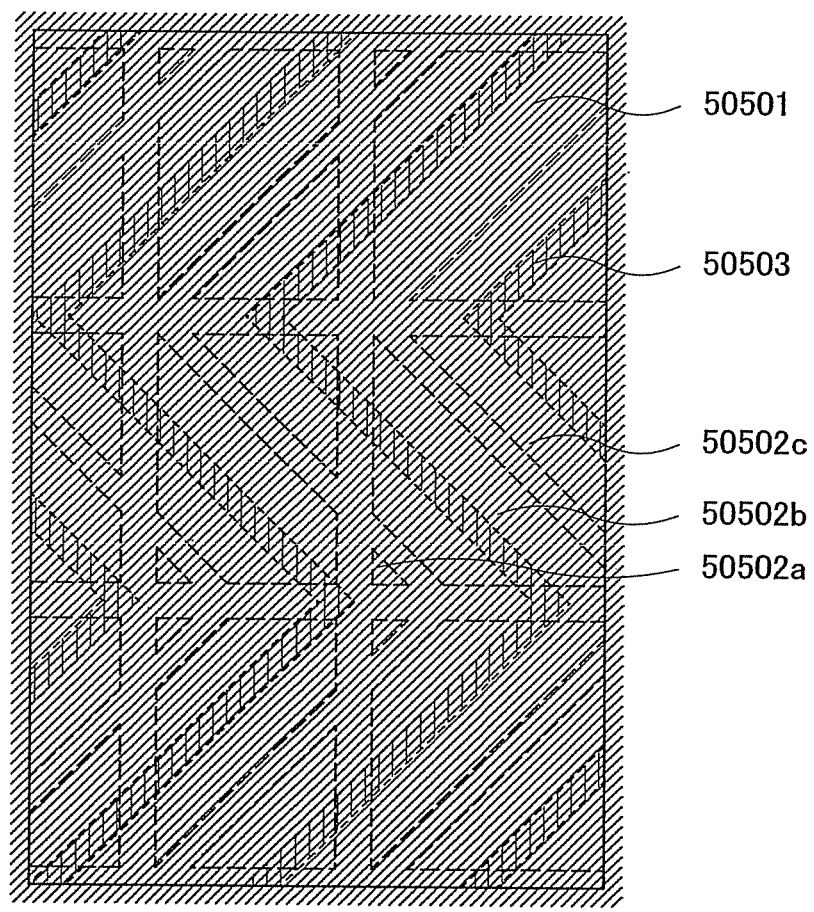
FIG. 58 is a view illustrating an example of a top plan view of a semiconductor device in accordance with the present invention.

FIG. 58 is a top plan view of a pixel portion to which an MVA mode is applied. In the MVA mode, viewing angle dependency of each portion is compensated by each other.

FIG. 58 shows a first electrode 50501, second electrodes (50502a, 50502b, and 50502c), and a protrusion 50503. The first electrode 50501 is formed over the entire surface of a counter substrate. The protrusion 50503 is formed so as to be a dogleg shape. In addition, the second electrodes (50502a, 50502b, and 50502c) are formed over the first electrode 50501 so as to have shapes corresponding to the protrusion 50503.

Opening portions of the second electrodes (50502a, 50502b, and 50502c) function like protrusions.

In the case where voltage is applied to the first pixel electrode 50501 and the second pixel electrodes (50502a, 50502b, and 50502c) (referred to as a vertical electric field mode), liquid crystal molecules are aligned so as to tilt toward the opening portions of the second pixel electrodes (50502a, 50502b, and 50502c) and the protrusion 50503. Since light emitted from a backlight passes through a substrate when a pair of polarizing plates is provided so as to be in a cross nicol state, white display is performed.

Note that by controlling voltage applied to the first electrode 50501 and the second electrodes (50502a, 50502b, and 50502c), conditions of the liquid crystal molecules can be controlled. Therefore, since the amount of light emitted from the backlight passing through the substrate can be controlled, predetermined image display can be performed.

In the case where voltage is not applied to the first pixel electrode 50501 and the second pixel electrodes (50502a, 50502b, and 50502c), the liquid crystal molecules are aligned longitudinally. Since light emitted from the backlight does not pass through a panel when the pair of polarizing plates is provided so as to be in the cross nicol state, black display is performed. This is a so-called normally black mode.

It is only necessary that a known material be used for a liquid crystal material used for an MVA mode.

FIGS. 59A to 59D are top plan views of a pixel portion to which an IPS mode is applied. In the TS mode, alignment of liquid crystal molecules in a liquid crystal layer can be optically compensated, the liquid crystal molecules are constantly rotated in a plane parallel to a substrate, and a horizontal electric field method in which electrodes are provided only on one substrate side is used.

In the IPS mode, a pair of electrodes is formed so as to have different shapes.

Figure 59A:
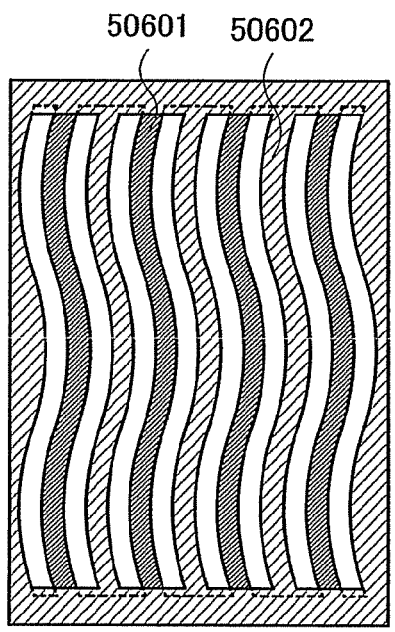
FIGS. 59A to 59D are views each illustrating an example of a top plan view of a semiconductor device in accordance with the present invention.

FIG. 59A shows a first pixel electrode 50601 and a second pixel electrode 50602. The first pixel electrode 50601 and the second pixel electrode 50602 are wavy shapes.

Figure 59B:
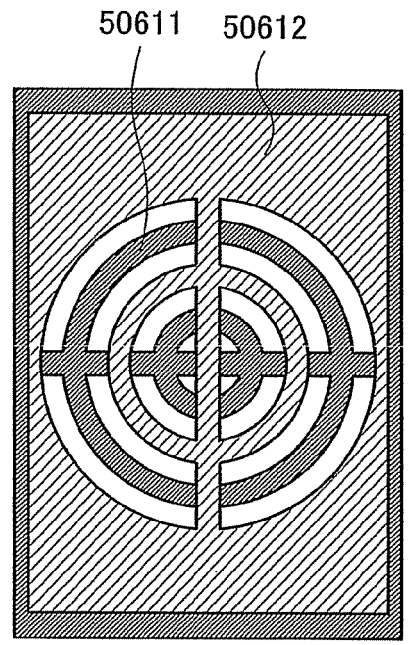

FIG. 59B shows a first pixel electrode 50611 and a second pixel electrode 50612. The first pixel electrode 50611 and the second pixel electrode 50612 have shapes having concentric openings.

Figure 59C:
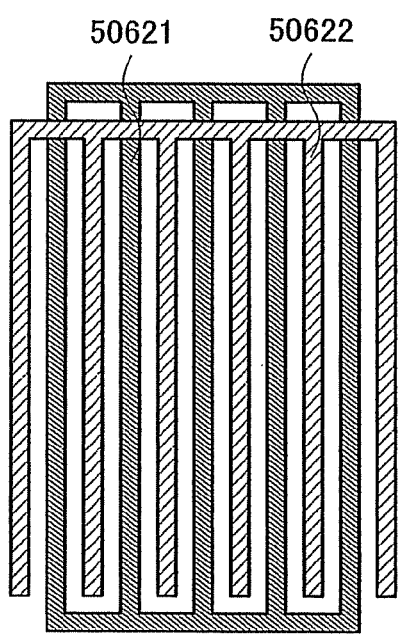

FIG. 59C shows a first pixel electrode 50621 and a second pixel electrode 50622. The first pixel electrode 50621 and the second pixel electrode 50622 are comb shapes and partially overlap with each other.

Figure 59D:
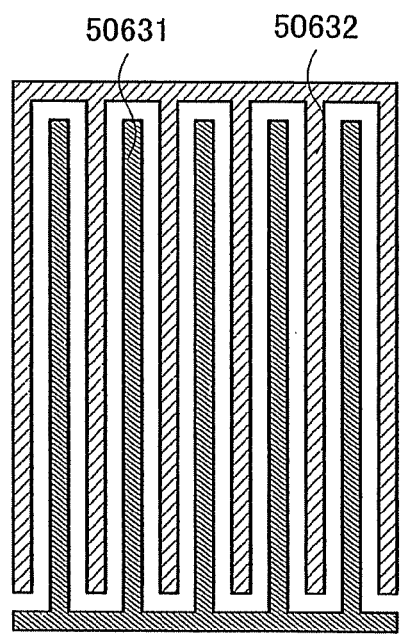

FIG. 59D shows a first pixel electrode 50631 and a second pixel electrode 50632. The first pixel electrode 50631 and the second pixel electrode 50632 are comb shapes in which electrodes engage with each other.

In the case where voltage is applied to the first pixel electrodes (50601, 50611, 50621, and 50631) and the second pixel electrodes (50602, 50612, 50622, and 50632) (referred to as a horizontal electric field mode), liquid crystal molecules are aligned along a line of electric force which is deviated from a rubbing direction. Since light emitted from a backlight passes through a substrate when a pair of polarizing plates is provided so as to be in a cross nicol state, white display is performed.

Note that by controlling voltage applied to the first pixel electrodes (50601, 50611, 50621, and 50631) and the second pixel electrodes (50602, 50612, 50622, and 50632), conditions of the liquid crystal molecules can be controlled. Therefore, since the amount of light emitted from the backlight passing through the substrate can be controlled, predetermined image display can be performed.

In the case where voltage is not applied to the first pixel electrodes (50601, 50611, 50621, and 50631) and the second pixel electrodes (50602, 50612, 50622, and 50632), the liquid crystal molecules are aligned laterally in the rubbing direction. Since light emitted from the backlight does not pass through the substrate when the pair of polarizing plates is provided so as to be in the cross nicol state, black display is performed. This is a so-called normally black mode.

It is only necessary that a known material be used for a liquid crystal material used for an IPS mode.

FIGS. 60A to 60D are top plan views of a pixel portion to which an FFS mode is applied. In the FFS mode, alignment of liquid crystal molecules in a liquid crystal layer can be optically compensated, the liquid crystal molecules are constantly rotated in a plane parallel to a substrate, and a horizontal electric field method in which electrodes are provided only on one substrate side is used.

In the FFS mode, a first electrode is formed over a top surface of a second electrode so as to be various shapes.

Figure 60A:
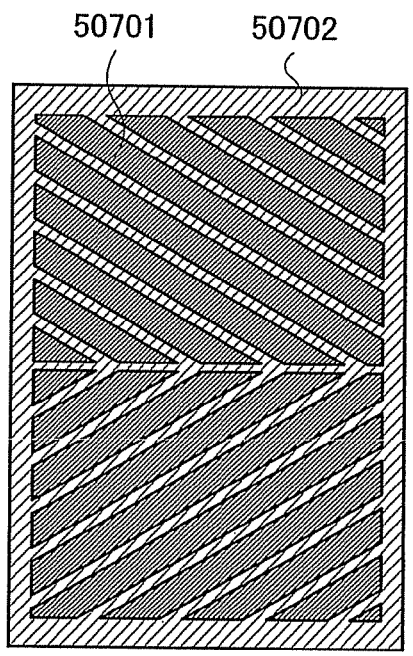
FIGS. 60A to 60D are views each illustrating an example of a top plan view of a semiconductor device in accordance with the present invention.

FIG. 60A shows a first pixel electrode 50701 and a second pixel electrode 50702. The first pixel electrode 50701 is a bent dogleg shape. The second pixel electrode 50702 is not necessarily patterned.

Figure 60B:
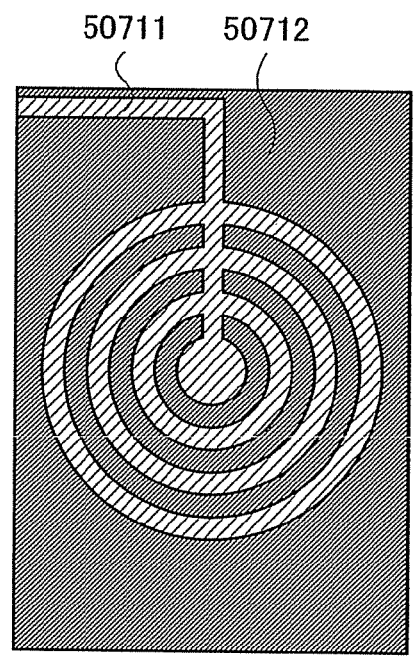

FIG. 60B shows a first pixel electrode 50711 and a second pixel electrode 50712. The first pixel electrode 50711 is a concentric shape. The second pixel electrode 50712 is not necessarily patterned.

Figure 60C:
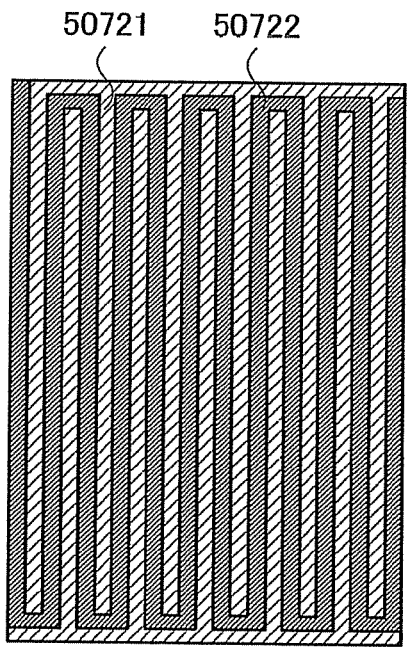

FIG. 60C shows a first pixel electrode 50721 and a second pixel electrode 50722. The first pixel electrode 50721 is a comb shape in which electrodes engage with each other. The second pixel electrode 50722 is not necessarily patterned.

Figure 60D:
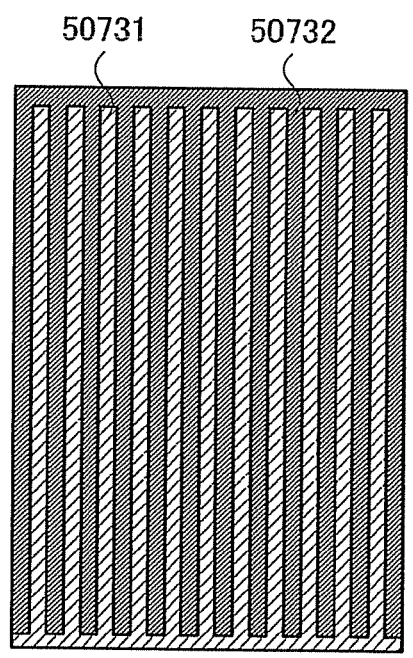

FIG. 60D shows a first pixel electrode 50731 and a second pixel electrode 50732. The first pixel electrode 50731 is a comb shape. The second pixel electrode 50732 is not necessarily patterned.

In the case where voltage is applied to the first pixel electrodes (50701, 50711, 50721, and 50731) and the second pixel electrodes (50702, 50712, 50722, and 50732) (referred to as a horizontal electric field mode), liquid crystal molecules are aligned along a line of electric force which is deviated from a rubbing direction. Since light emitted from a backlight passes through a substrate when a pair of polarizing plates is provided so as to be in a cross nicol state, white display is performed.

Note that by controlling voltage applied to the first pixel electrodes (50701, 50711, 50721, and 50731) and the second pixel electrodes (50702, 50712, 50722, and 50732), conditions of the liquid crystal molecules can be controlled. Therefore, since the amount of light emitted from the backlight passing through the substrate can be controlled, predetermined image display can be performed.

In the case where voltage is not applied to the first pixel electrodes (50701, 50711, 50721, and 50731) and the second pixel electrodes (50702, 50712, 50722, and 50732), the liquid crystal molecules are aligned laterally in the rubbing direction. Since light emitted from the backlight does not pass through the substrate when the pair of polarizing plates is provided so as to be in the cross nicol state, black display is performed. This is a so-called normally black mode.

It is only necessary that a known material be used for a liquid crystal material used for an FFS mode.

Although this embodiment mode is described with reference to various drawings, the contents (or may be part of the contents) described in each drawing can be freely applied to, combined with, or replaced with the contents (or may be part of the contents) described in another drawing. Further, even more drawings can be formed by combining each part with another part in the above-described drawings.

The contents (or may be part of the contents) described in each drawing of this embodiment mode can be freely applied to, combined with, or replaced with the contents (or may be part of the contents) described in a drawing in another embodiment mode. Further, even more drawings can be formed by combining each part with part of another embodiment mode in the drawings of this embodiment mode.

This embodiment mode shows an example of an embodied case of the contents (or may be part of the contents) described in other embodiment modes, an example of slight transformation thereof, an example of partial modification thereof, an example of improvement thereof, an example of detailed description thereof, an application example thereof, an example of related part thereof, or the like. Therefore, the contents described in other embodiment modes can be freely applied to, combined with, or replaced with this embodiment mode.

Embodiment Mode 10

In this embodiment mode, a pixel structure of a display device is described. In particular, a pixel structure of a display device using an organic EL element is described.

Figure 61A:
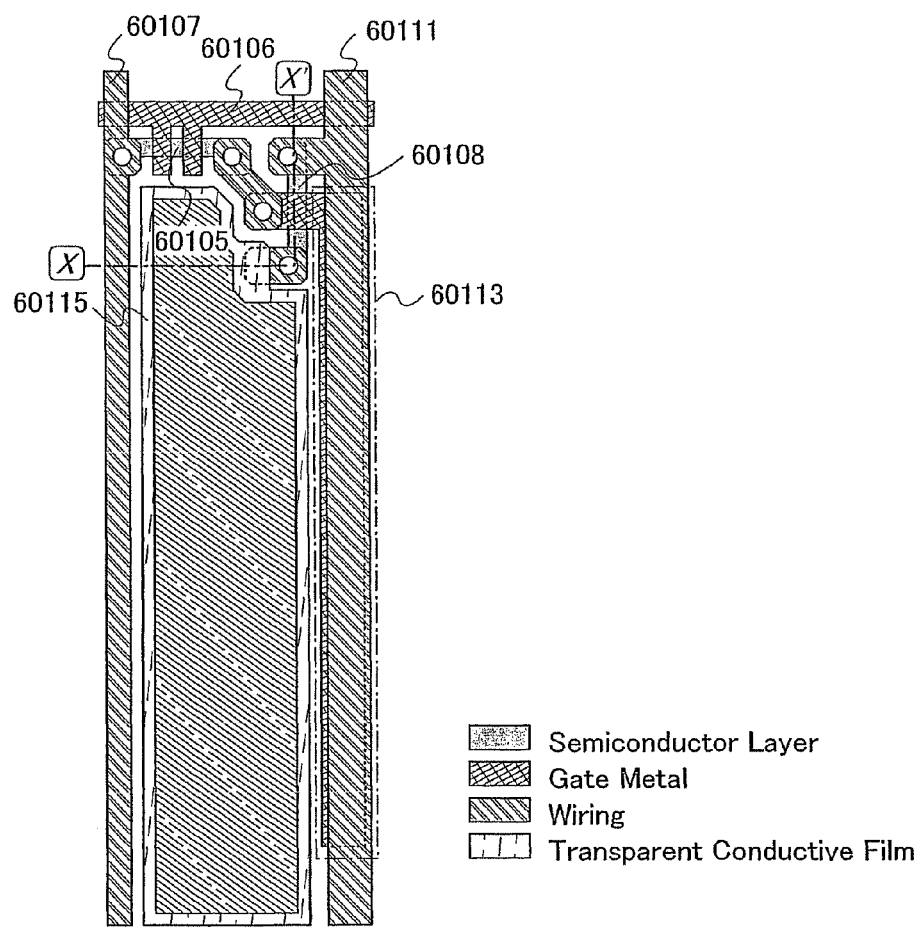
FIG. 61A is a view illustrating an example of a pixel layout of a semiconductor device in accordance with the present invention.
Figure 61B:
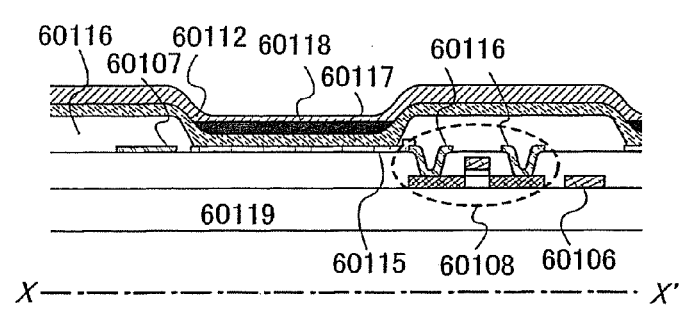
FIG. 61B is a view illustrating an example of a cross-sectional view thereof.

FIG. 61A shows an example of a top plan view (a layout diagram) of a pixel including two transistors. FIG. 61B shows an example of a cross-sectional view along X-X' in FIG. 61A.

FIG. 61A shows a first transistor 60105, a first wiring 60106, a second wiring 60107, a second transistor 60108, a third wiring 60111, a counter electrode 60112, a capacitor 60113, a pixel electrode 60115, a partition wall 60116, an organic conductive film 60117, an organic thin film 60118, and a substrate 60119. Note that it is preferable that the first transistor 60105 be used as a switching transistor, the first wiring 60106 as a gate signal line, the second wiring 60107 as a source signal line, the second transistor 60108 as a driving transistor, and the third wiring 60111 as a current supply line.

A gate electrode of the first transistor 60105 is electrically connected to the first wiring 60106. One of a source electrode and a drain electrode of the first transistor 60105 is electrically connected to the second wiring 60107. The other of the source electrode and the drain electrode of the first transistor 60105 is electrically connected to a gate electrode of the second transistor 60108 and one electrode of the capacitor 60113. Note that the gate electrode of the first transistor 60105 includes a plurality of gate electrodes. Accordingly, leakage current in the off state of the first transistor 60105 can be reduced.

One of a source electrode and a drain electrode of the second transistor 60108 is electrically connected to the third wiring 60111, and the other of the source electrode and the drain electrode of the second transistor 60108 is electrically connected to the pixel electrode 60115. Accordingly, current flowing to the pixel electrode 60115 can be controlled by the second transistor 60108.

The organic conductive film 60117 is provided over the pixel electrode 60115, and the organic thin film 60118 (an organic compound layer) is further provided thereover. The counter electrode 60112 is provided over the organic thin film 60118 (the organic compound layer). Note that the counter electrode 60112 may be formed over all pixels to be commonly connected to all the pixels, or may be patterned using a shadow mask or the like.

Light emitted from the organic thin film 60118 (the organic compound layer) is transmitted through either the pixel electrode 60115 or the counter electrode 60112.

In FIG. 61B, the case where light is emitted to the pixel electrode side, that is, a side on which the transistor and the like are formed is referred to as bottom emission; and the case where light is emitted to the counter electrode side is referred to as top emission.

In the case of bottom emission, it is preferable that the pixel electrode 60115 be formed of a transparent conductive film. On the other hand, in the case of top emission, it is preferable that the counter electrode 60112 be formed of a transparent conductive film.

In a light-emitting device for color display, EL elements having respective light emission colors of RGB may be separately formed, or an EL element with a single color may be formed over an entire surface and light emission of RGB can be obtained by using a color filter.

Note that the structures shown in FIGS. 61A and 61B are examples, and various structures can be employed for a pixel layout, a cross-sectional structure, a stacking order of electrodes of an EL element, and the like, as well as the structures shown in FIGS. 61A and 61B. Further, as a light-emitting element, various elements such as a crystalline element such as an LED, and an element formed of an inorganic thin film can be used as well as the element formed of the organic thin film shown in the drawing.

Figure 62A:
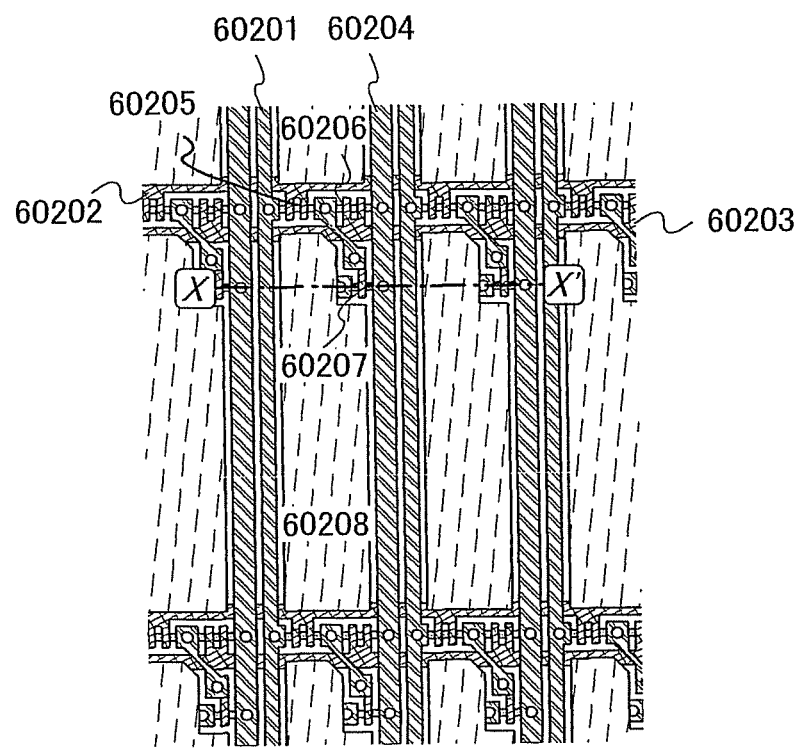
FIG. 62A is a view illustrating an example of a pixel layout of a semiconductor device in accordance with the present invention.
Figure 62B:
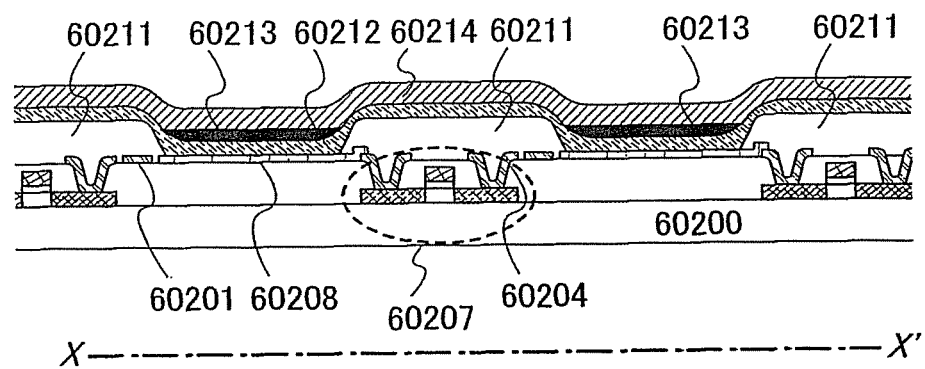
FIG. 62B is a view illustrating an example of a cross-sectional view thereof.

FIG. 62A shows an example of a top plan view (a layout diagram) of a pixel including three transistors. FIG. 62B shows an example of a cross-sectional view along X-X' in FIG. 62A.

FIG. 62A shows a substrate 60200, a first wiring 60201, a second wiring 60202, a third wiring 60203, a fourth wiring 60204, a first transistor 60205, a second transistor 60206, a third transistor 60207, a pixel electrode 60208, a partition wall 60211, an organic conductive film 60212, an organic thin film 60213, and a counter electrode 60214. Note that it is preferable that the first wiring 60201 be used as a source signal line, the second wiring 60202 as a gate signal line for writing, the third wiring 60203 as a gate signal line for erasing, the fourth wiring 60204 as a current supply line, the first transistor 60205 as a switching transistor, the second transistor 60206 as an erasing transistor, and the third transistor 60207 as a driving transistor.

A gate electrode of the first transistor 60205 is electrically connected to the second wiring 60202. One of a source electrode and a drain electrode of the first transistor 60205 is electrically connected to the first wiring 60201. The other of the source electrode and the drain electrode of the first transistor 60205 is electrically connected to a gate electrode of the third transistor 60207. Note that the gate electrode of the first transistor 60205 includes a plurality of gate electrodes. Accordingly, leakage current in the off state of the first transistor 60205 can be reduced.

A gate electrode of the second transistor 60206 is electrically connected to the third wiring 60203. One of a source electrode and a drain electrode of the second transistor 60206 is electrically connected to the fourth wiring 60204. The other of the source electrode and the drain electrode of the second transistor 60206 is electrically connected to the gate electrode of the third transistor 60207. Note that the gate electrode of the second transistor 60206 includes a plurality of gate electrodes. Accordingly, leakage current in the off state of the second transistor 60206 can be reduced.

One of a source electrode and a drain electrode of the third transistor 60207 is electrically connected to the fourth wiring 60204, and the other of the source electrode and the drain electrode of the third transistor 60207 is electrically connected to the pixel electrode 60208. Accordingly, current flowing to the pixel electrode 60208 can be controlled by the third transistor 60207.

The organic conductive film 60212 is provided over the pixel electrode 60208, and the organic thin film 60213 (an organic compound layer) is further provided thereover. The counter electrode 60214 is provided over the organic thin film 60213 (the organic compound layer). Note that the counter electrode 60214 may be formed over all pixels to be commonly connected to all the pixels, or may be patterned using a shadow mask or the like.

Light emitted from the organic thin film 60213 (the organic compound layer) is transmitted through either the pixel electrode 60208 or the counter electrode 60214.

In FIG. 62B, the case where light is emitted to the pixel electrode side, that is, a side on which the transistor and the like are formed is referred to as bottom emission; and the case where light is emitted to the counter electrode side is referred to as top emission.

In the case of bottom emission, it is preferable that the pixel electrode 60208 be formed of a transparent conductive film. On the other hand, in the case of top emission, it is preferable that the counter electrode 60214 be formed of a light-transmitting conductive film.

In a light-emitting device for color display, EL elements having respective light emission colors of RGB may be separately formed, or an EL element with a single color may be formed over an entire surface and light emission of RGB can be obtained by using a color filter.

Note that the structures shown in FIGS. 62A and 62B are examples, and various structures can be employed for a pixel layout, a cross-sectional structure, a stacking order of electrodes of an EL element, and the like, as well as the structures shown in FIGS. 62A and 62B. Further, as a light-emitting element, various elements such as a crystalline element such as an LED, and an element formed of an inorganic thin film can be used as well as the element formed of the organic thin film shown in the drawings.

Figure 63A:
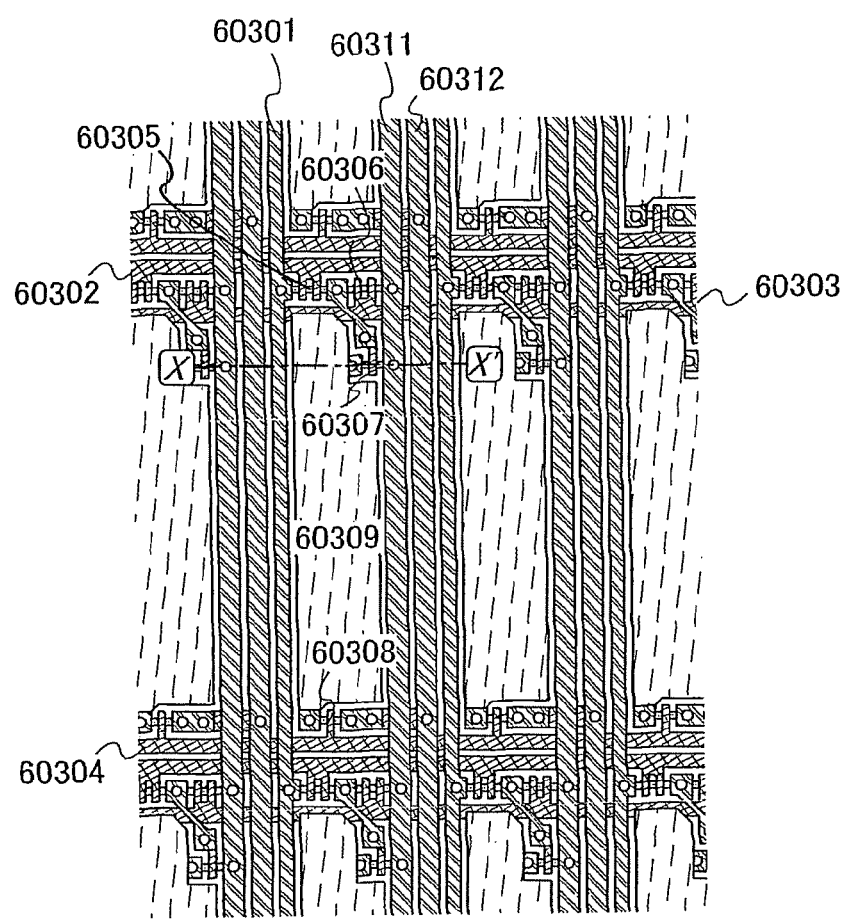
FIG. 63A is a view illustrating an example of a pixel layout of a semiconductor device in accordance with the present invention.
Figure 63B:
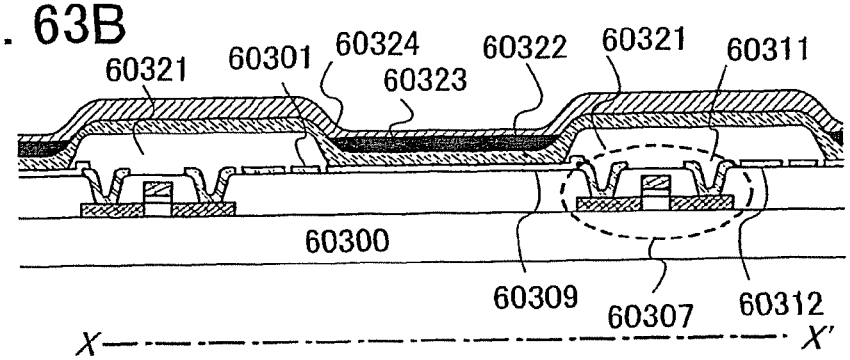
FIG. 63B is a view illustrating an example of a cross-sectional view thereof.

FIG. 63A shows an example of a top plan view (a layout diagram) of a pixel including four transistors. FIG. 63B shows an example of a cross-sectional view along X-X' in FIG. 63A.

FIG. 63A shows a substrate 60300, a first wiring 60301, a second wiring 60302, a third wiring 60303, a fourth wiring 60304, a first transistor 60305, a second transistor 60306, a third transistor 60307, a fourth transistor 60308, a pixel electrode 60309, a fifth wiring 60311, a sixth wiring 60312, a partition wall 60321, an organic conductive film 60322, an organic thin film 60323, and a counter electrode 60324. Note that it is preferable that the first wiring 60301 be used as a source signal line, the second wiring 60302 as a gate signal line for writing, the third wiring 60303 as a gate signal line for erasing, the fourth wiring 60304 as a signal line for reverse bias, the first transistor 60305 as a switching transistor, the second transistor 60306 as an erasing transistor, the third transistor 60307 as a driving transistor, the fourth transistor 60308 as a transistor for reverse bias, the fifth wiring 60311 as a current supply line, and the sixth wiring 60312 as a power supply line for reverse bias.

A gate electrode of the first transistor 60305 is electrically connected to the second wiring 60302. One of a source electrode and a drain electrode of the first transistor 60305 is electrically connected to the first wiring 60301. The other of the source electrode and the drain electrode of the first transistor 60305 is electrically connected to a gate electrode of the third transistor 60307. Note that the gate electrode of the first transistor 60305 includes a plurality of gate electrodes. Accordingly, leakage current in the off state of the first transistor 60305 can be reduced.

A gate electrode of the second transistor 60306 is electrically connected to the third wiring 60303. One of a source electrode and a drain electrode of the second transistor 60306 is electrically connected to the fifth wiring 60311. The other of the source electrode and the drain electrode of the second transistor 60306 is electrically connected to the gate electrode of the third transistor 60307. Note that the gate electrode of the second transistor 60306 includes a plurality of gate electrodes. Accordingly, leakage current in the off state of the second transistor 60306 can be reduced.

One of a source electrode and a drain electrode of the third transistor 60307 is electrically connected to the fifth wiring 60311, and the other of the source electrode and the drain electrode of the third transistor 60307 is electrically connected to the pixel electrode 60309. Accordingly, current flowing to the pixel electrode 60309 can be controlled by the third transistor 60307.

A gate electrode of the fourth transistor 60308 is electrically connected to the fourth wiring 60304. One of a source electrode and a drain electrode of the fourth transistor 60308 is electrically connected to the sixth wiring 60312. The other of the source electrode and the drain electrode of the fourth transistor 60308 is electrically connected to the pixel electrode 60309. Accordingly, a potential of the pixel electrode 60309 can be controlled by the fourth transistor 60308, so that a reverse bias can be applied to the organic conductive film 60322 and the organic thin film 60323. When a reverse bias is applied to a light-emitting element including the organic conductive film 60322, the organic thin film 60323, and the like, reliability of the light-emitting element can be significantly improved.

The organic conductive film 60322 is provided over the pixel electrode 60309, and the organic thin film 60323 (an organic compound layer) is further provided thereover. The counter electrode 60324 is provided over the organic thin film 60213 (the organic compound layer). Note that the counter electrode 60324 may be formed over all pixels to be commonly connected to all the pixels, or may be patterned using a shadow mask or the like.

Light emitted from the organic thin film 60323 (the organic compound layer) is transmitted through either the pixel electrode 60309 or the counter electrode 60324.

In FIG. 63B, the case where light is emitted to the pixel electrode side, that is, a side on which the transistor and the like are formed is referred to as bottom emission; and the case where light is emitted to the counter electrode side is referred to as top emission.

In the case of bottom emission, it is preferable that the pixel electrode 60309 be formed of a transparent conductive film. On the other hand, in the case of top emission, it is preferable that the counter electrode 60324 be formed of a light-transmitting conductive film.

In a light-emitting device for color display, EL elements having respective light emission colors of RGB may be separately formed, or an EL element with a single color may be formed over an entire surface and light emission of RGB can be obtained by using a color filter.

Note that the structures shown in FIGS. 63A and 63B are examples, and various structures can be employed for a pixel layout, a cross-sectional structure, a stacking order of electrodes of an EL element, and the like, as well as the structures shown in FIGS. 63A and 63B. Further, as a light-emitting element, various elements such as a crystalline element such as an LED, and an element formed of an inorganic thin film can be used as well as the element formed of the organic thin film shown in the drawings.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to; combined with, or replaced with this embodiment mode.

Embodiment Mode 11

In this embodiment mode, a structure and an operation of a pixel in a display device are described.

FIGS. 64A and 64B are timing charts showing an example of digital time gray scale drive. The timing chart of FIG. 64A shows a driving method when a signal writing period (an address period) to a pixel and a light-emitting period (a sustain period) are separated.

One frame period refers to a period for fully displaying an image for one display region. One frame period includes a plurality of subframe periods, and one subframe period includes an address period and a sustain period. Address periods Ta1 to Ta4 indicate time for writing signals to pixels in all rows, and periods Tb1 to Tb4 indicate time for writing signals to pixels in one row (or one pixel). Sustain periods Ts1 to Ts4 indicate time for maintaining a lighting state or a non-lighting state in accordance with a video signal written to the pixel, and a ratio of the length of the sustain periods is set to satisfy Ts1:Ts2:Ts3:Ts4=$2^3:2^2:2^1:2^0$=8:4:2:1. A gray scale is expressed depending on in which sustain period light emission is performed.

Here, the i-th pixel row is described with reference to FIG. 64B. First, in the address period Ta1, a pixel selection signal is input to a scan line in order from a first row, and in a period Tb1(*i*) in the address period Ta1, a pixel in the i-th row is selected. Then, while the pixel in the i-th row is selected, a video, signal is input to the pixel in the i-th row from a signal line. Then, when the video signal is written to the pixel in the i-th row, the pixel in the i-th row maintains the signal until a signal is input again. Lighting and non-lighting of the pixel in the i-th row in the sustain period Ts1 are controlled by the written video signal. Similarly, in the address periods Ta2, Ta3, and Ta4, a video signal is input to the pixel in the i-th row, and lighting and non-lighting of the pixel in the i-th row in the sustain periods Ts2, Ts3, and Ts4 are controlled by the video signal. Then, in each subframe period, a pixel to which a signal for not lighting in the address period and for lighting when the sustain period starts after the address period ends is written is lit.

Here, the case where a 4-bit gray scale is expressed is described; however, the number of bits and the number of gray scales are not limited thereto. Note that lighting is not needed to be performed in order of Ts1, Ts2, Ts3, and Ts4, and the order may be random or light emission may be performed in the period divided into a plurality of periods. A ratio of lighting time of Ts1, Ts2, Ts3, and Ts4 is not needed to be power-of-two, and may be the same length or slightly different from a power of two.

Next, a driving method when a signal writing period (an address period) to a pixel and a light-emitting period (a sustain period) are not separated is described. A pixel in a row in which a writing operation of a video signal is completed maintains the signal until another signal is written to the pixel (or the signal is erased). Data holding time refers to a period from the writing operation is performed until another signal is written to the pixel. In the data holding time, the pixel is lit or not lit in accordance with the video signal written to the pixel. The same operations are performed until the last row, and the address period ends. Then, an operation proceeds to a signal writing operation in a next subframe period sequentially from a row in which the data holding time ends.

As described above, in the case of a driving method in which a pixel is immediately lit or not lit in accordance with a video signal written to the pixel after the signal writing operation is completed and the data holding time starts, signals cannot be input to two rows at the same time. Accordingly, address periods need to be prevented from overlapping, so that the data holding time cannot be made shorter than the address period. As a result, it becomes difficult to perform high-level gray scale display.

Thus, the data holding time is set to be shorter than the address period by provision of an erasing period. A driving method when the data holding time is set shorter than the address period by provision of an erasing period is described with reference to FIG. 65A.

First, in the address period Ta1, a pixel scan signal is input to a scan line in order from a first row, and a pixel is selected. Then, while the pixel is selected, a video signal is input to the pixel from a signal line. Then, when the video signal is written to the pixel, the pixel maintains the signal until a signal is input again. Lighting and non-lighting of the pixel in the sustain period Ts1 are controlled by the written video signal. In a row in which a writing operation of a video signal is completed, a pixel is immediately lit or not lit in accordance with the written video signal. The same operations are performed until the last row, and the address period Ta1 ends. Then, an operation proceeds to a signal writing operation in a next subframe period sequentially from a row in which the data holding time ends. Similarly, in the address periods Ta2, Ta3, and Ta4, a video signal is input to the pixel, and lighting and non-lighting of the pixel in the sustain periods Ts2, Ts3, and Ts4 are controlled by the video signal. The end of the sustain period Ts4 is set by the start of an erasing operation. This is because when a signal written to a pixel in an erasing time Te of each row is erased, the pixel is forced to be not lit regardless of the video signal written to the pixel in the address period until another signal is written to the pixel. That is, the data holding time ends from a pixel in which the erasing time Te starts.

Figures 65A, 65B:
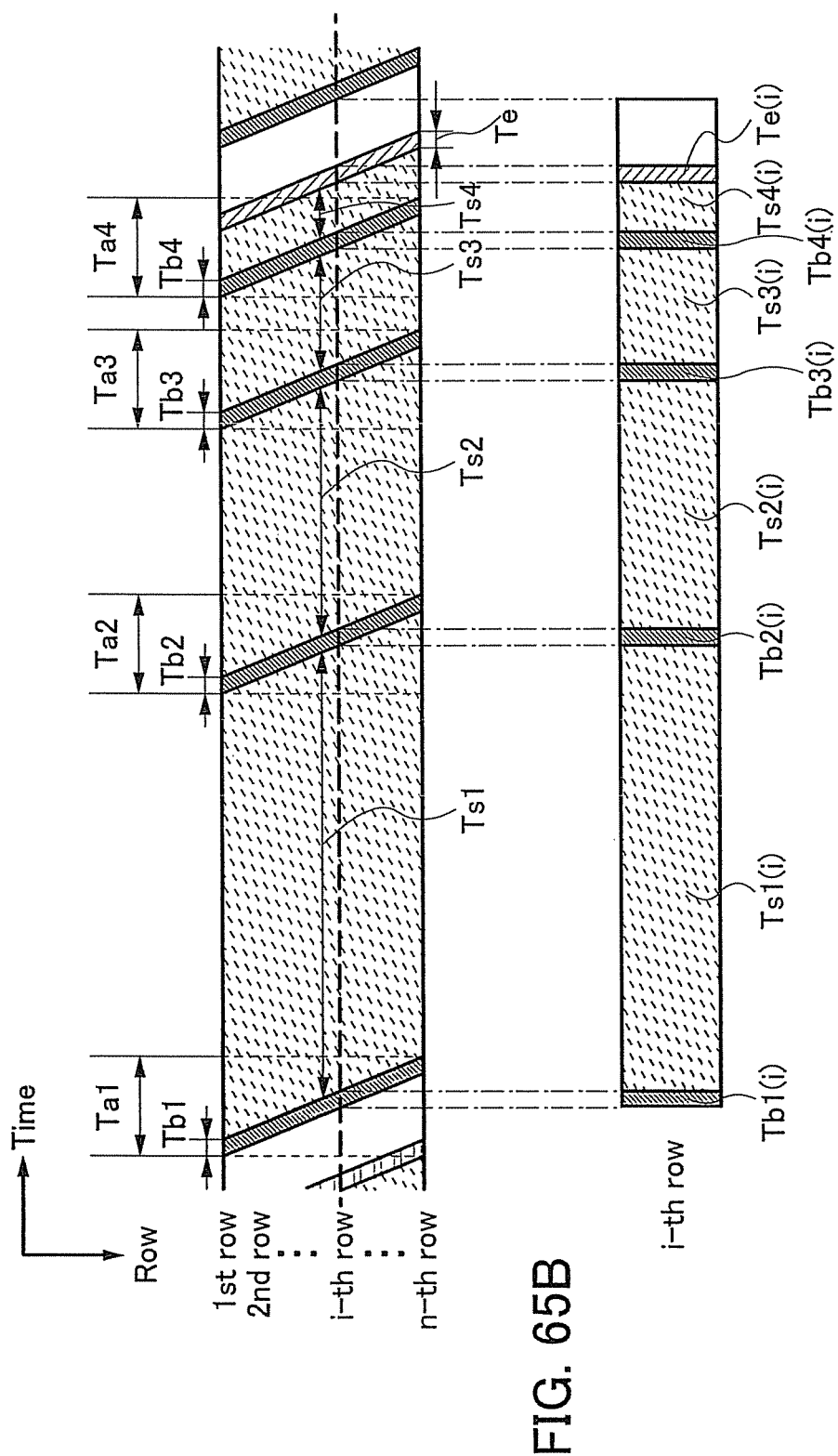
FIGS. 65A and 65B are diagrams each illustrating an example of a timing chart of a semiconductor device in accordance with the present invention.

Here, the i-th pixel row is described with reference to FIG. 65B. In the address period Ta1, a pixel scan signal is input to a scan line in order from a first row, and a pixel is selected. Then, in the period Tb1($i$), while the pixel in the i-th row is selected, a video signal is input to the pixel in the i-th row. Then, when the video signal is written to the pixel in the i-th row, the pixel in the i-th row maintains the signal until a signal is input again. Lighting and non-lighting of the pixel in the i-th row in a sustain period Ts1($i$) are controlled by the written video signal. That is, the pixel in the i-th row is immediately lit or not lit in accordance with the video signal written to the pixel after the writing operation of the video signal to the i-th row is completed. Similarly, in the address periods Ta2, Ta3, and Ta4, a video signal is input to the pixel in the i-th row, and lighting and non-lighting of the pixel in the i-th row in the sustain periods Ts2, Ts3, and Ts4 are controlled by the video signal. The end of a sustain period Ts4($i$) is set by the start of an erasing operation. This is because the pixel is forced to be not lit regardless of the video signal written to the pixel in the i-th row in an erasing time Te(i) in the i-th row. That is, the data holding time of the pixel in the i-th row ends when the erasing time Te(i) starts.

Thus, a display device with a high-level gray scale and a high duty ratio (a ratio of a lighting period in one frame period) can be provided, in which data holding time is shorter than an address period without separating the address period and a sustain period. Since instantaneous luminance can be lowered, reliability of a display element can be improved.

Here, the case where a 4-bit gray scale is expressed is described; however, the number of bits and the number of gray scales are not limited thereto. Note that lighting is not needed to be performed in order of Ts1, Ts2, Ts3, and Ts4, and the order may be random or light emission may be performed in the period divided into a plurality of periods. A ratio of lighting time of Ts1, Ts2, Ts3, and Ts4 is not needed to be power-of-two, and may be the same length or slightly different from a power of two.

Next, a structure and an operation of a pixel to which digital time gray scale drive can be applied are described.

Figure 66:
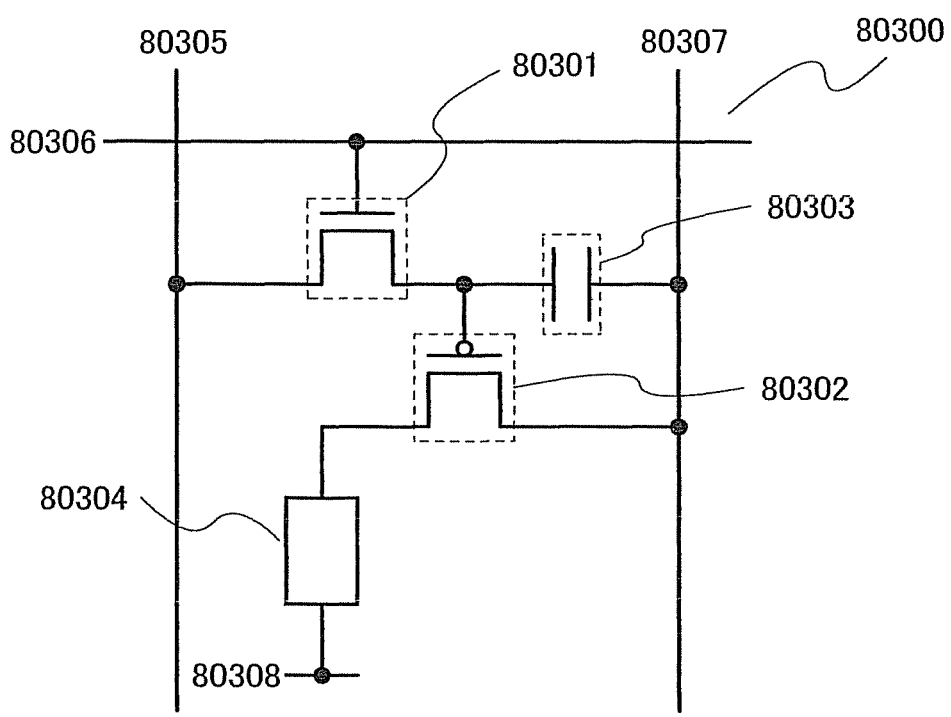
FIG. 66 is a diagram illustrating an example of a circuit structure of a semiconductor device in accordance with the present invention.

FIG. 66 is a diagram showing an example of a pixel structure to which digital time gray scale drive can be applied.

A pixel 80300 includes a switching transistor 80301, a driving transistor 80302, a light-emitting element 80304, and a capacitor 80303. A gate of the switching transistor 80301 is connected to a scan line 80306, a first electrode (one of a source electrode and a drain electrode) of the switching transistor 80301 is connected to a signal line 80305, and a second electrode (the other of the source electrode and the drain electrode) of the switching transistor 80301 is connected to a gate of the driving transistor 80302. The gate of the driving transistor 80302 is connected to a power supply line 80307 through the capacitor 80303, a first electrode of the driving transistor 80302 is connected to the power supply line 80307, and a second electrode of the driving transistor 80302 is connected to a first electrode (a pixel electrode) of the light-emitting element 80304. A second electrode of the light-emitting element 80304 corresponds to a common electrode 80308.

Note that the second electrode (the common electrode 80308) of the light-emitting element 80304 is set to a low power supply potential. The low power supply potential refers to a potential satisfying (the low power supply potential)<(a high power supply potential) based on the high power supply potential set to the power supply line 80307. As the low power supply potential, GND, 0 V, or the like may be set, for example. A potential difference between the high power supply potential and the low power supply potential is applied to the light-emitting element 80304, and current is supplied to the light-emitting element 80304. Here, in order to make the light-emitting element 80304 emit light, each potential is set so that the potential difference between the high power supply potential and the low power supply potential is forward threshold voltage or more.

Note that gate capacitance of the driving transistor 80302 may be used as a substitute for the capacitor 80303, so that the capacitor 80303 can be omitted. The gate capacitance of the driving transistor 80302 may be formed in a region where a source region, a drain region, an LDD region, or the like overlaps with the gate electrode. Alternatively, capacitance may be formed between a channel region and the gate electrode.

When a pixel is selected by the scan line 80306, that is, when the switching transistor 80301 is turned on, a video signal is input to the pixel from the signal line 80305. Then, a charge for voltage corresponding to the video signal is stored in the capacitor 80303, and the capacitor 80303 maintains the voltage. The voltage is voltage between the gate electrode and the first electrode of the driving transistor 80302 and corresponds to gate-source voltage Vgs of the driving transistor 80302.

An operation region of a transistor can be generally divided into a linear region and a saturation region. When drain-source voltage is denoted by Vds, gate-source voltage is denoted by Vgs, and threshold voltage is denoted by Vth, a boundary between the linear region and the saturation region sets so as to satisfy (Vgs−Vth)=Vds. In the case where (Vgs−Vth)>Vds is satisfied, a transistor operates in a linear region, and a current value is determined in accordance with the level of Vds and Vgs. On the other hand, in the case where (Vgs−Vth)<Vds is satisfied, a transistor operates in a saturation region and ideally, a current value hardly changes even when Vds changes. That is, a current value is determined only by the level of Vgs.

Here, in the case of voltage-input voltage driving method, a video signal is input to the gate of the driving transistor 80302 so that the driving transistor 80302 is in either of two states of being sufficiently turned on and turned off. That is, the driving transistor 80302 operates in a linear region.

Thus, when a video signal which makes the driving transistor 80302 turned on is input, a power supply potential VDD set to the power supply line 80307 without change is ideally set to the first electrode of the light-emitting element 80304.

That is, ideally, constant voltage is applied to the light-emitting element 80304 to obtain constant luminance from the light-emitting element 80304. Then, a plurality of subframe periods are provided in one frame period. A video signal is written to a pixel in each subframe period, lighting and non-lighting of the pixel are controlled in each subframe period, and a gray scale is expressed by the sum of lighting subframe periods.

Note that when the video signal by which the driving transistor 80302 operates in a saturation region is input, current can be supplied to the light-emitting element 80304. When the light-emitting element 80304 is an element luminance of which is determined in accordance with current, luminance decay due to deterioration of the light-emitting element 80304 can be suppressed. Further, when the video signal is an analog signal, current in accordance with the video signal can be supplied to the light-emitting element 80304. In this case, analog gray scale drive can be performed.

Figure 67:
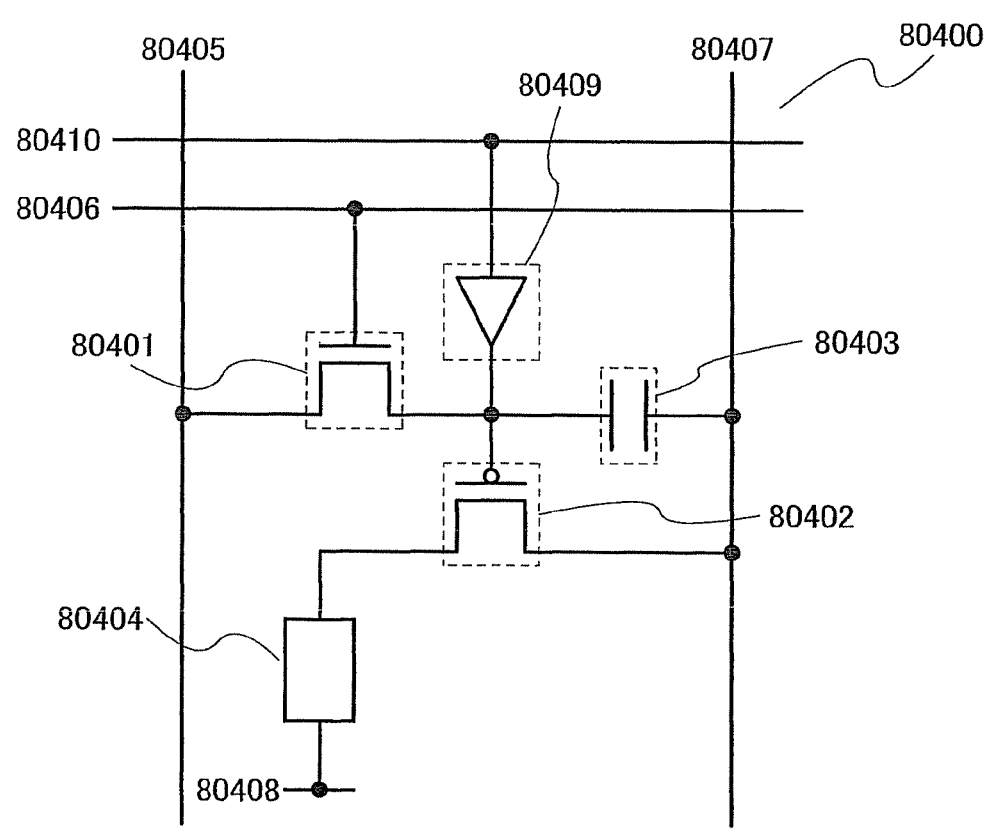
FIG. 67 is a diagram illustrating an example of a circuit structure of a semiconductor device in accordance with the present invention.

FIG. 67 is a diagram showing another example of a pixel structure to which digital time gray scale drive can be applied.

A pixel 80400 includes a switching transistor 80401, a driving transistor 80402, a capacitor 80403, a light-emitting element 80404, and a rectifying element 80409. A gate of the switching transistor 80401 is connected to a first scan line 80406, a first electrode (one of a source electrode and a drain electrode) of the switching transistor 80401 is connected to a signal line 80405, and a second electrode (the other of the source electrode and the drain electrode) of the switching transistor 80401 is connected to a gate of the driving transistor 80402. The gate of the driving transistor 80402 is connected to a power supply line 80407 through the capacitor 80403, and is also connected to a second scan line 80410 through the rectifying element 80409. A first electrode of the driving transistor 80402 is connected to the power supply line 80407, and a second electrode of the driving transistor 80402 is connected to a first electrode (a pixel electrode) of the light-emitting element 80404. A second electrode of the light-emitting element 80404 corresponds to a common electrode 80408.

The second electrode (the common electrode 80408) of the light-emitting element 80404 is set to a low power supply potential. Note that the low power supply potential refers to a potential satisfying (the low power supply potential)<(a high power supply potential) with respect to the high power supply potential set to the power supply line 80407. As the low power supply potential, GND, 0 V, or the like may be set, for example. In order to apply a potential difference between the high power supply potential and the low power supply potential to the light-emitting element 80404 and supply current to the light-emitting element 80404 so that the light-emitting element 80404 emits light, each potential is set so that the potential difference between the high power supply potential and the low power supply potential is equal to forward threshold voltage or more.

Gate capacitance of the driving transistor 80402 may be used as a substitute for the capacitor 80403, so that the capacitor 80403 can be omitted. The gate capacitance of the driving transistor 80402 may be formed in a region where a source region, a drain region, an LDD region, or the like overlaps with the gate electrode. Alternatively, capacitance may be formed between a channel region and the gate electrode.

As the rectifying element 80409, a diode-connected transistor can be used. A PN junction diode, a PIN junction diode, a Schottky diode, a diode formed of a carbon nanotube, or the like may be used other than a diode-connected transistor. A diode-connected transistor may be an n-channel transistor or a p-channel transistor.

The pixel 80400 is such that the rectifying element 80409 and the second scan line 80410 are added to the pixel shown in FIG. 66. Accordingly, the switching transistor 80401, the driving transistor 80402, the capacitor 80403, the light-emitting element 80404, the signal line 80405, the first scan line 80406, the power supply line 80407, and the common electrode 80408 shown in FIG. 67 correspond to the switching transistor 80301, the driving transistor 80302, the capacitor 80303, the light-emitting element 80304, the signal line 80305, the scan line 80306, the power supply line 80307, and the common electrode 80308 shown in FIG. 66. Accordingly, a writing operation and a light-emitting operation in FIG. 67 are similar to those described in FIG. 66, so that description thereof is omitted.

An erasing operation of the pixel shown in FIG. 67 is described. In an erasing operation, an H-level signal is input to the second scan line 80410. Thus, current is supplied to the rectifying element 80409, and a gate potential of the driving transistor 80402 held by the capacitor 80403 can be set to a certain potential. That is, the potential of the gate electrode of the driving transistor 80402 is set to a certain value, and the driving transistor 80402 can be forced to be turned off regardless of a video signal written to the pixel.

An L-level signal input to the second scan line 80410 has a potential such that current is not supplied to the rectifying element 80409 when a video signal for non-lighting is written to a pixel. An H-level signal input to the second scan line 80410 has a potential such that a potential to turn off the driving transistor 80302 can be set to the gate regardless of a video signal written to a pixel.

Figure 68:
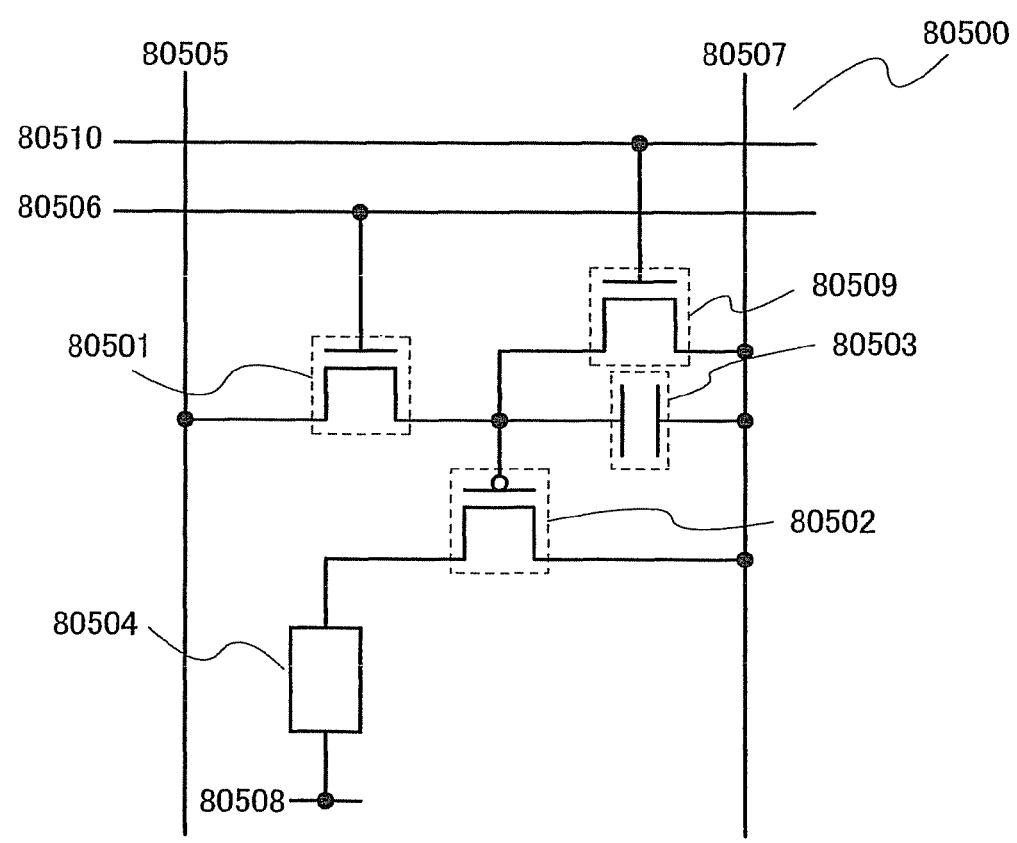
FIG. 68 is a diagram illustrating an example of a circuit structure of a semiconductor device in accordance with the present invention.

FIG. 68 is a diagram showing another example of a pixel structure to which digital time gray scale drive can be applied.

A pixel 80500 includes a switching transistor 80501, a driving transistor 80502, a capacitor 80503, a light-emitting element 80504, and an erasing transistor 80509. A gate of the switching transistor 80501 is connected to a first scan line 80506, a first electrode (one of a source electrode and a drain electrode) of the switching transistor 80501 is connected to a signal line 80505, and a second electrode (the other of the source electrode and the drain electrode) of the switching transistor 80501 is connected to a gate of the driving transistor 80502. The gate of the driving transistor 80502 is connected to a power supply line 80507 through the capacitor 80503, and is also connected to a first electrode of the erasing transistor 80509. A first electrode of the driving transistor 80502 is connected to the power supply line 80507, and a second electrode of the driving transistor 80502 is connected to a first electrode (a pixel electrode) of the light-emitting element 80504. A gate of the erasing transistor 80509 is connected to a second scan line 80510, and a second electrode of the erasing transistor 80509 is connected to the power supply line 80507. A second electrode of the light-emitting element 80504 corresponds to a common electrode 80508.

The second electrode (the common electrode 80508) of the light-emitting element 80504 is set to a low power supply potential. The low power supply potential refers to a potential satisfying (the low power supply potential)<(a high power supply potential) with respect to the high power supply potential set to the power supply line 80507. As the low power supply potential, GND, 0 V, or the like may be set, for example. In order to apply a potential difference between the high power supply potential and the low power supply potential to the light-emitting element 80504 and supply current to the light-emitting element 80504 so that the light-emitting element 80504 emits light, each potential is set so that the potential difference between the high power supply potential and the low power supply potential is equal to forward threshold voltage or more.

Gate capacitance of the driving transistor 80502 may be used as a substitute for the capacitor 80503, so that the capacitor 80503 can be omitted. The gate capacitance of the driving transistor 80502 may be formed in a region where a source region, a drain region, an LDD region, or the like overlaps with the gate electrode. Alternatively, capacitance may be formed between a channel region and the gate electrode.

As the erasing transistor 80509, a diode-connected transistor can be used. Further, a PN junction diode, a PIN junction diode, a Schottky diode, a diode formed of a carbon nanotube, or the like may be used other than a diode-connected transistor. A diode-connected transistor may be an n-channel transistor or a p-channel transistor.

The pixel 80500 is such that the erasing transistor 80509 and the second scan line 80510 are added to the pixel shown in FIG. 66. Accordingly, the switching transistor 80501, the driving transistor 80502, the capacitor 80503, the light-emitting element 80504, the signal line 80505, the first scan line 80506, the power supply line 80507, and the common electrode 80508 shown in FIG. 68 correspond to the switching transistor 80301, the driving transistor 80302, the capacitor 80303, the light-emitting element 80304, the signal line 80305, the scan line 80306, the power supply line 80307, and the common electrode 80308 shown in FIG. 66. Accordingly, a writing operation and a light-emitting operation in FIG. 68 are similar to those described in FIG. 66, so that description thereof is omitted.

An erasing operation of the pixel shown in FIG. 68 is described. In an erasing operation, an H-level signal is input to the second scan line 80510. Thus, the erasing transistor 80509 is turned on, and the gate electrode and the first electrode of the driving transistor can be made to have the same potential. That is, Vgs of the driving transistor 80502 can be 0 V. Accordingly, the driving transistor 80502 can be forced to be turned off.

Next, a structure and an operation of a pixel called a threshold voltage compensation pixel are described. A threshold voltage compensation pixel can be applied to digital time gray scale drive and analog gray scale drive.

Figure 69:
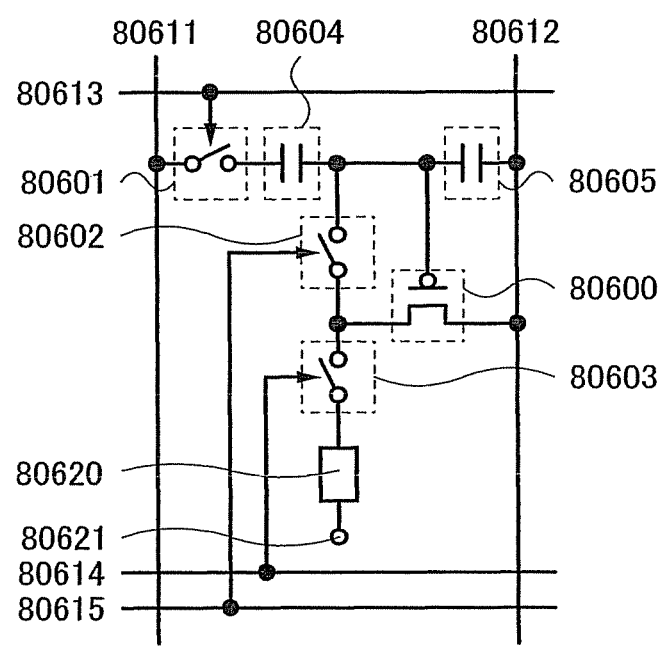
FIG. 69 is a diagram illustrating an example of a circuit structure of a semiconductor device in accordance with the present invention.

FIG. 69 is a diagram showing an example of a structure of a pixel called a threshold voltage compensation pixel.

The pixel in FIG. 69 includes a driving transistor 80600, a first switch 80601, a second switch 80602, a third switch 80603, a first capacitor 80604, a second capacitor 80605, and a light-emitting element 80620. A gate electrode of the driving transistor 80600 is connected to a signal line 80611 through the first capacitor 80604 and the first switch 80601 in this order. Further, the gate electrode of the driving transistor 80600 is connected to a power supply line 80612 through the second capacitor 80605. A first electrode of the driving transistor 80600 is connected to the power supply line 80612. A second electrode of the driving transistor 80600 is connected to a first electrode of the light-emitting element 80620 through the third switch 80603. Further, the second electrode of the driving transistor 80600 is connected to the gate electrode of the driving transistor 80600 through the second switch 80602. A second electrode of the light-emitting element 80620 corresponds to a common electrode 80621.

The second electrode of the light-emitting element 80620 is set to a low power supply potential. Note that the low power supply potential refers to a potential satisfying (the low power supply potential)<(a high power supply potential) based on the high power supply potential set to the power supply line 80612. As the low power supply potential, GND, 0 V, or the like may be set, for example. In order to apply a potential difference between the high power supply potential and the low power supply potential to the light-emitting element 80620 and supply current to the light-emitting element 80620 so that the light-emitting element 80620 emits light, each potential is set so that the potential difference between the high power supply potential and the low power supply potential is equal to forward threshold voltage or more. Note that gate capacitance of the driving transistor 80600 may be used as a substitute for the second capacitor 80605, so that the second capacitor 80605 can be omitted. The gate capacitance of the driving transistor 80600 may be formed in a region where a source region, a drain region, an LDD region, or the like overlaps with the gate electrode. Alternatively, capacitance may be formed between a channel region and the gate electrode. Note that on/off of the first switch 80601, the second switch 80602, and the third switch 80603 is controlled by a first scan line 80613, a second scan line 80615, and a third scan line 80614, respectively.

A method for driving the pixel shown in FIG. 69 is described in which an operation period is divided into an initialization period, a data writing period, a threshold detecting period, and a light-emitting period.

In the initialization period, the second switch 80602 and the third switch 80603 are turned on. Then, a potential of the gate electrode of the driving transistor 80600 is lower, than at least a potential of the power supply line 80612. At this time, the first switch 80601 may be in an on state or an off state. Note that the initialization period is not necessarily required.

In the threshold detecting period, a pixel is selected by the first scan line 80613. That is, the first switch 80601 is turned on, and a certain constant voltage is input from the signal line 80611. At this time, the second switch 80602 is turned on and the third switch 80603 is turned off. Accordingly, the driving transistor 80600 is diode-connected, and the second electrode and the gate electrode of the driving transistor 80600 are placed in a floating state. Then, a potential of the gate electrode of the driving transistor 80600 is a value obtained by subtracting threshold voltage of the driving transistor 80600 from the potential of the power supply line 80612. Thus, the threshold voltage of the driving transistor 80600 is held in the first capacitor 80604. A potential difference between the potential of the gate electrode of the driving transistor 80600 and the constant voltage input from the signal line 80611 is held in the second capacitor 80605.

In the data writing period, a video signal (voltage) is input from the signal line 80611. At this time, the first switch 80601 is kept on, the second switch 80602 is turned off, and the third switch 80603 is kept off. Since the gate electrode of the driving transistor 80600 is in a floating state, the potential of the gate electrode of the driving transistor 80600 changes depending on a potential difference between the constant voltage input from the signal line 80611 in the threshold detecting period and a video signal input from the signal line 80611 in the data writing period. For example, when (a capacitance value of the first capacitor 80604)<<(a capacitance value of the second capacitor 80605) is satisfied, the potential of the gate electrode of the driving transistor 80600 in the data writing period is approximately equal to the sum of a potential difference (the amount of change) between the potential of the signal line 80611 in the threshold detecting period and the potential of the signal line 80611 in the data writing period; and a value obtained by subtracting the threshold voltage of the driving transistor 80600 from the potential of the power supply line 80612. That is, the potential of the gate electrode of the driving transistor 80600 becomes a potential obtained by correcting the threshold voltage of the driving transistor 80600.

In the light-emitting period, current in accordance with a potential difference (Vgs) between the gate electrode of the driving transistor 80600 and the power supply line 80612 is supplied to the light-emitting element 80620. At this time, the first switch 80601 is turned off, the second switch 80602 is kept off, and the third switch 80603 is turned on. Note that current flowing to the light-emitting element 80620 is constant regardless of the threshold voltage of the driving transistor 80600.

Note that a pixel structure of the invention is not limited to that shown in FIG. 69. For example, a switch, a resistor, a capacitor, a transistor, a logic circuit, or the like may be added to the pixel in FIG. 69. For example, the second switch 80602 may include a p-channel transistor or an n-channel transistor, the third switch 80603 may include a transistor with polarity different from that of the second switch 80602, and the second switch 80602 and the third switch 80603 may be controlled by the same scan line.

A structure and an operation of a pixel called a current input pixel are described. A current input pixel can be applied to digital gray scale drive and analog gray scale drive.

Figure 70:
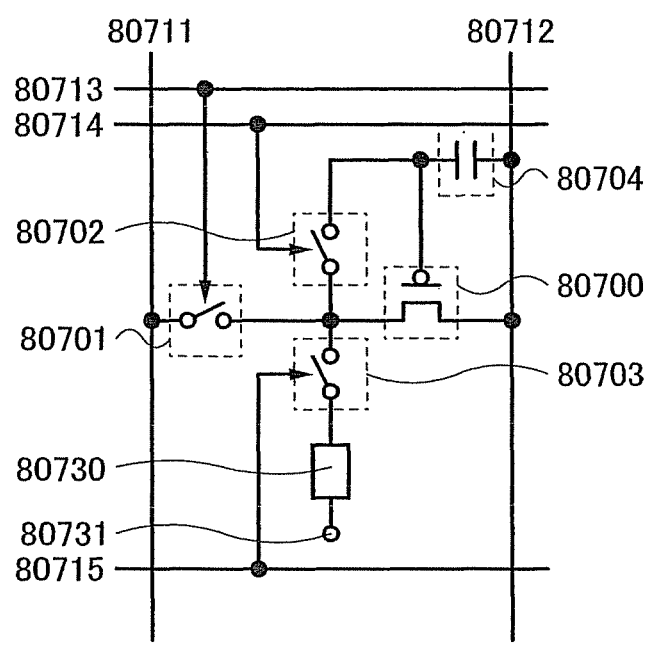
FIG. 70 is a diagram illustrating an example of a circuit structure of a semiconductor device in accordance with the present invention.

FIG. 70 is a diagram showing an example of a structure of a current input pixel.

The pixel shown in FIG. 70 includes a driving transistor 80700, a first switch 80701, a second switch 80702, a third switch 80703, a capacitor 80704, and a light-emitting element 80730. A gate electrode of the driving transistor 80700 is connected to a signal line 80711 through the second switch 80702 and the first switch 80701 in this order. Further, the gate electrode of the driving transistor 80700 is connected to a power supply line 80712 through the capacitor 80704. A first electrode of the driving transistor 80700 is connected to the power supply line 80712. A second electrode of the driving transistor 80700 is connected to the signal line 80711 through the first switch 80701. Further, the second electrode of the driving transistor 80700 is connected to a first electrode of the light-emitting element 80730 through the third switch 80703. A second electrode of the light-emitting element 80730 corresponds to a common electrode 80731.

The second electrode of the light-emitting element 80730 is set to a low power supply potential. Note that the low power supply potential refers to a potential satisfying (the low power supply potential)<(a high power supply potential) based on the high power supply potential set to the power supply line 80712. As the low power supply potential, GND, 0 V, or the like may be set, for example. In order to apply potential difference between the high power supply potential and the low power supply potential to the light-emitting element 80730 and supply current to the light-emitting element 80730 so that the light-emitting element 80730 emits light, each potential is set so that the potential difference between the high power supply potential and the low power supply potential is equal to forward threshold voltage or more. Note that gate capacitance of the driving transistor 80700 may be used as a substitute for the capacitor 80704, so that the capacitor 80704 can be omitted. The gate capacitance of the driving transistor 80700 may be formed in a region where a source region, a drain region, an LDD region, or the like overlaps with the gate electrode. Alternatively, capacitance may be formed between a channel region and the gate electrode. Note that on/off of the first switch 80701, the second switch 80702, and the third switch 80703 is controlled by a first scan line 80713, a second scan line 80714, and a third scan line 80715, respectively.

A method for driving the pixel shown in FIG. 70 is described in which an operation period is divided into a data writing period and a light-emitting period.

In the data writing period, a pixel is selected by the first scan line 80713. That is, the first switch 80701 is turned on, and current is input as a video signal from the signal line 80711. At this time, the second switch 80702 is turned on and the third switch 80703 is turned off. Accordingly, a potential of the gate electrode of the driving transistor 80700 becomes a potential in accordance with the video signal. That is, voltage between the gate electrode and the source electrode of the driving transistor 80700 which is such that the driving transistor 80700 supplies current same as the video signal is held in the capacitor 80704.

Next, in the light-emitting period, the first switch 80701 and the second switch 80702 are turned off, and the third switch 80703 is turned on. Thus, current with the same value as the video signal is supplied to the light-emitting element 80730.

Note that the invention is not limited to the pixel structure shown in FIG. 70. For example, a switch, a resistor, a capacitor, a transistor, a logic circuit, or the like may be added to the pixel in FIG. 70. For example, the first switch 80701 may include a p-channel transistor or an n-channel transistor, the second switch 80702 may include a transistor with the same polarity as that of the first switch 80701, and the first switch 80701 and the second switch 80702 may be controlled by the same scan line. The second switch 80702 may be provided between the gate electrode of the driving transistor 80700 and the signal line 80711.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 12

In this embodiment mode, a structure and a manufacturing method of a transistor are described.

Figure 71A:
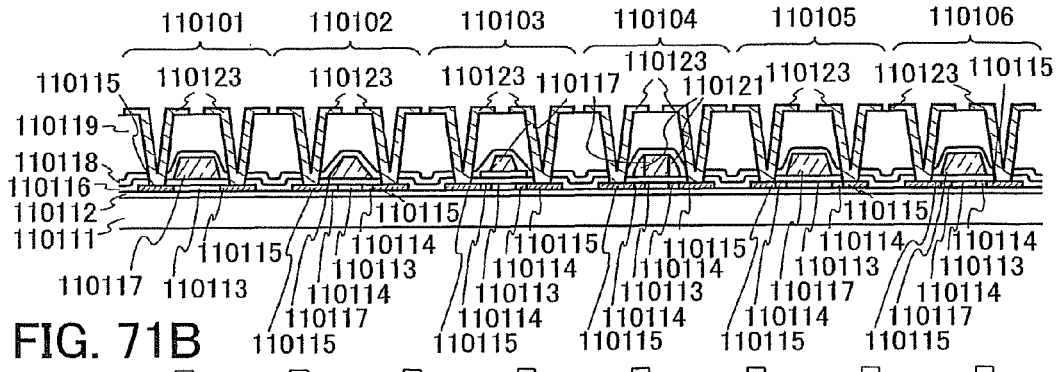
FIGS. 71A to 71G are cross-sectional views each illustrating a manufacturing process of a semiconductor device in accordance with the present invention.

FIGS. 71A to 71G show examples of structures and manufacturing methods of transistors included in a semiconductor device to which the invention can be applied. FIG. 71A shows structure examples of transistors included in a semiconductor device to which the invention can be applied. FIGS. 71B to 71G show an example of a manufacturing method of the transistors included in a semiconductor device to which the invention can be applied.

Note that the structure and the manufacturing method of the transistors included in a semiconductor device to which the invention can be applied are not limited to those shown in FIGS. 71A to 71G, and various structures and manufacturing methods can be employed.

First, structure examples of transistors included in a semiconductor device to which the invention can be applied are described with reference to FIG. 71A. FIG. 71A is a cross-sectional view of a plurality of transistors each having a different structure. Here, in FIG. 71A, the plurality of transistors each having a different structure are juxtaposed, which is for describing structures of the transistors. Accordingly, the transistors are not needed to be actually juxtaposed as shown in FIG. 71A and can be separately formed as needed.

Next, characteristics of each layer forming the transistor included in a semiconductor device to which the invention can be applied are described.

A substrate 110111 can be a glass substrate using barium borosilicate glass, aluminoborosilicate glass, or the like, a quartz substrate, a ceramic substrate, a metal substrate containing stainless steel, or the like. In addition, a substrate formed of plastics typified by polyethylene terephthalate (PET), polyethylene naphthalate (PEN), or polyethersulfone (PES), or a substrate formed of a flexible synthetic resin such as acrylic can also be used. By using a flexible substrate, a semiconductor device capable of being bent can be formed. A flexible substrate has no strict limitations on the area or a shape of the substrate. Accordingly, for example, when a substrate having a rectangular shape, each side of which is 1 meter or more, is used as the substrate 110111, productivity can be significantly improved. Such an advantage is highly favorable as compared with the case where a circular silicon substrate is used.

An insulating film 110112 functions as a base film and is provided to prevent alkali metal such as Na or alkaline earth metal from the substrate 110111 from adversely affecting characteristics of a semiconductor element. The insulating film 110112 can have a single-layer structure or a stacked-layer structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y). For example, when the insulating film 110112 is provided to have a two-layer structure, it is preferable that a silicon nitride oxide film be used as a first insulating film and a silicon oxynitride film be used as a second insulating film. Further, when the insulating film 110112 is provided to have a three-layer structure, it is preferable that a silicon oxynitride film be used as a first insulating film, a silicon nitride oxide film be used as a second insulating film, and a silicon oxynitride film be used as a third insulating film.

Semiconductor layers 110113, 110114, and 110115 can be formed using an amorphous semiconductor or a semi-amorphous semiconductor (SAS). Alternatively, a polycrystalline semiconductor layer may be used. SAS is a semiconductor having an intermediate structure between amorphous and crystalline (including single crystal and polycrystalline) structures and having a third state which is stable in free energy. Moreover, SAS includes a crystalline region with a short-range order and lattice distortion. A crystalline region of 0.5 to 20 nm can be observed at least in part of a film. When silicon is contained as a main component, Raman spectrum shifts to a wave number side lower than 520 cm$^{-1}$. The diffraction peaks of (111) and (220) which are thought to be contributed to a silicon crystalline lattice are observed by X-ray diffraction. SAS contains hydrogen or halogen of at least 1 atomic % or more to compensate dangling bonds. SAS is formed by glow discharge decomposition (plasma CVD) of a material gas. As the material gas, $Si_2H_6$, $SiH_2Cl_2$, $SiHCl_3$, $SiCl_4$, $SiF_4$, or the like as well as $SiH_4$ can be used. Alternatively, $GeF_4$ may be mixed. The material gas may be diluted with $H_2$, or $H_2$ and one or more kinds of rare gas elements selected from He, Ar, Kr, and Ne. A dilution ratio is in the range of 2 to 1000 times. Pressure is in the range of approximately 0.1 to 133 Pa, and a power supply frequency is 1 to 120 MHz, preferably 13 to 60 MHz. A substrate heating temperature may be 300° C. or lower. A concentration of impurities in atmospheric components such as oxygen, nitrogen, and carbon is preferably $1\times10^{20}$ cm$^{-1}$ or less as impurity elements in the film. In particular, an oxygen concentration is $5\times10^{19}$/cm$^3$ or less, preferably $1\times10^{19}$/cm$^3$ or less. Here, an amorphous semiconductor layer is formed using a material containing silicon (Si) as its main component (e.g., $Si_xGe_{1-x}$) by a known method (such as a sputtering method, an LPCVD method, or a plasma CVD method). Then, the amorphous semiconductor layer is crystallized by a known crystallization method such as a laser crystallization method, a thermal crystallization method using RTA or an annealing furnace, or a thermal crystallization method using a metal element which promotes crystallization.

An insulating film 110116 can have a single-layer structure or a stacked-layer structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y).

A gate electrode 110117 can have a single-layer structure of a conductive film or a stacked-layer structure of two or three conductive films. As a material for the gate electrode 110117, a known conductive film can be used. For example, a single film of an element such as tantalum (Ta), titanium (Ti), molybdenum (Mo), tungsten (W), chromium (Cr), or silicon (Si); a nitride film containing the aforementioned element (typically, a tantalum nitride film, a tungsten nitride film, or a titanium nitride film); an alloy film in which the aforementioned elements are combined (typically, a Mo—W alloy or a Mo—Ta alloy); a silicide film containing the aforementioned element (typically, a tungsten silicide film or a titanium silicide film); and the like can be used. Note that the aforementioned single film, nitride film, alloy film, silicide film, and the like can have a single-layer structure or a stacked-layer structure.

An insulating film 110118 can have a single-layer structure or a stacked-layer structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y); or a film containing carbon, such as a DLC (diamond-like carbon), by a known method (such as a sputtering method or a plasma CVD method).

An insulating film 110119 can have a single-layer structure or a stacked-layer structure of a siloxane resin; an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon, such as a DLC (diamond-like carbon); or an organic material such as epoxy, polyimide, polyamide, polyvinyl phenol, benzocyclobutene, or acrylic. Note that a siloxane resin corresponds to a resin having Si—O—Si bonds. Siloxane includes a backbone structure of a bond of silicon (Si) and oxygen (O). As a substituent, an organic group containing at least hydrogen (such as an alkyl group or an aryl group) is used. Alternatively, a fluoro group, or a fluoro group and an organic group containing at least hydrogen can be used as a substituent. Note that in a semiconductor device applicable to the invention, the insulating film 110119 can be directly provided so as to cover the gate electrode 110117 without provision of the insulating film 110118.

As a conductive film 110123, a single film of an element such as Al, Ni, C, W, Mo, Ti, Pt, Cu, Ta, Au, or Mn, a nitride film containing the aforementioned element, an alloy film in which the aforementioned elements are combined, a silicide film containing the aforementioned element, or the like can be used. For example, as an alloy containing the plurality of elements, an Al alloy containing C and Ti, an Al alloy containing Ni, an Al alloy containing C and Ni, an Al alloy containing C and Mn, or the like can be used. Further, when the conductive film has a stacked-layer structure, Al can be interposed between Mo, Ti, or the like; thus, resistance of Al to heat and chemical reaction can be improved.

Next, characteristics of each structure are described with reference to the cross-sectional view of the plurality of transistors each having a different structure in FIG. 71A.

Reference numeral 110101 denotes a single drain transistor. Since the single drain transistor can be formed by a simple method, it is advantageous in low manufacturing cost and high yield. Here, the semiconductor layers 110113 and 110115 have different concentrations of impurities, and the semiconductor layer 110113 is used as a channel region and the semiconductor layers 110115 are used as a source region and a drain region. By controlling the concentration of impurities in this manner, resistivity of the semiconductor layer can be controlled. Further, an electrical connection state of the semiconductor layer and the conductive film 110123 can be closer to ohmic contact. Note that as a method of separately forming the semiconductor layers each having different amount of impurities, a method can be used in which impurities are doped in a semiconductor layer using the gate electrode 110117 as a mask.

Reference numeral 110102 denotes a transistor in which the gate electrode 110117 is tapered at an angle of at least certain degrees. Since the transistor can be formed by a simple method, it is advantageous in low manufacturing cost and high yield. Here, a tapered angle is 45° or more and less than 95°, and preferably 60° or more and less than 95°. Note that the tapered angle may be less than 45°. The semiconductor layers 110113, 110114, and 110115 have different concentrations of impurities. The semiconductor layer 110113 is used as a channel region, the semiconductor layers 110114 as lightly doped drain (LDD) regions, and the semiconductor layers 110115 as a source region and a drain region. By controlling the amount of impurities in this manner, resistivity of the semiconductor layer can be controlled. Further, an electrical connection state of the semiconductor layer and the conductive film 110123 can be closer to ohmic contact. Moreover, since the transistor includes the LDD regions, a high electric field is hardly applied inside the transistor, so that deterioration of the element due to hot carriers can be suppressed. Note that as a method of separately forming the semiconductor layers having different amount of impurities, a method can be used in which impurities are doped in a semiconductor layer using the gate electrode 110117 as a mask. In the transistor 110102, since the gate electrode 110117 is tapered at an angle of at least certain degrees, gradient of the concentration of impurities doped in the semiconductor layer through the gate electrode 110117 can be provided, and the LDD region can be easily formed.

Reference numeral 110103 denotes a transistor in which the gate electrode 110117 is formed of at least two layers and a lower gate electrode is longer than an upper gate electrode. In this specification, a shape of the lower and upper gate electrodes is called a hat shape. When the gate electrode 110117 has a hat shape, an LDD region can be formed without addition of a photomask. Note that a structure where the LDD region overlaps with the gate electrode 110117, like the transistor 110103, is particularly called a GOLD (gate overlapped LDD) structure. As a method of forming the gate electrode 110117 with a hat shape, the following method may be used.

First, when the gate electrode 110117 is patterned, the lower and upper gate electrodes are etched by dry etching so that side surfaces thereof are inclined (tapered). Then, an inclination of the upper gate electrode is processed to be almost perpendicular by anisotropic etching. Thus, the gate electrode a cross section of which is a hat shape is formed. After that, impurity elements are doped twice, so that the semiconductor layer 110113 used as the channel region, the semiconductor layers 110114 used as the LDD regions, and the semiconductor layers 110115 used as a source electrode and a drain electrode are formed.

Note that part of the LDD region, which overlaps with the gate electrode 110117, is referred to as an Lov region, and part of the LDD region, which does not overlap with the gate electrode 110117, is referred to as an Loff region. The Loff region is highly effective in suppressing an off-current value, whereas it is not very effective in preventing deterioration in an on-current value due to hot carriers by relieving an electric field in the vicinity of the drain. On the other hand, the Lov region is effective in preventing deterioration in the on-current value by relieving the electric field in the vicinity of the drain, whereas it is not very effective in suppressing the off-current value. Thus, it is preferable to form a transistor having a structure appropriate for characteristics of each of the various circuits. For example, when a semiconductor device applicable to the invention is used for a display device, a transistor having an Loff region is preferably used as a pixel transistor in order to suppress the off-current value. On the other hand, as a transistor in a peripheral circuit, a transistor having an Lov region is preferably used in order to prevent deterioration in the on-current value by relieving the electric field in the vicinity of the drain.

Reference numeral 110104 denotes a transistor including a sidewall 110121 in contact with the side surface of the gate electrode 110117. When the transistor includes the sidewall 110121, a region overlapping with the sidewall 110121 can be made to be an LDD region.

Reference numeral 110105 denotes a transistor in which an LDD (Loff) region is formed by doping in the semiconductor layer with the use of a mask. Thus, the LDD region can surely be formed, and an off-current value of the transistor can be reduced.

Reference numeral 110106 denotes a transistor in which an LDD (Lov) region is formed by doping in the semiconductor layer with the use of a mask. Thus, the LDD region can surely be formed, and deterioration in an on-current value can be prevented by relieving the electric field in the vicinity of the drain of the transistor.

Next, an example of a method for manufacturing a transistor included in a semiconductor device to which the invention can be applied is described with reference to FIGS. 71B to 71G.

Note that a structure and a manufacturing method of a transistor included in a semiconductor device to which the invention can be applied are not limited to those in FIGS. 71A to 71G, and various structures and manufacturing methods can be used.

In this embodiment mode, a surface of the substrate 110111, a surface of the insulating film 110112, a surface of the semiconductor layer 110113, a surface of the semiconductor layer 110114, a surface of the semiconductor layer 110115, a surface of the insulating film 110116, a surface of the insulating film 110118, or a surface of the insulating film 110119 is oxidized or nitrided by using plasma treatment, so that the semiconductor layer or the insulating film can be oxidized or nitrided. By oxidizing or nitriding the semiconductor layer or the insulating film by plasma treatment in such a manner, the surface of the semiconductor layer or the insulating film is modified, and the insulating film can be formed to be denser than an insulating film formed by a CVD method or a sputtering method. Thus, a defect such as a pinhole can be suppressed, and characteristics and the like of a semiconductor device can be improved.

First, the surface of the substrate 110111 is washed using hydrofluoric acid (HF), alkaline, or pure water. The substrate 110111 can be a glass substrate using barium borosilicate glass, aluminoborosilicate glass, or the like, a quartz substrate, a ceramic substrate, a metal substrate containing stainless steel, or the like. In addition, a substrate formed of plastics typified by polyethylene terephthalate (PET), polyethylene naphthalate (PEN), or polyethersulfone (PES), or a substrate formed of a flexible synthetic resin such as acrylic can also be used. Here, the case where a glass substrate is used as the substrate 110111 is shown.

Figure 71B:
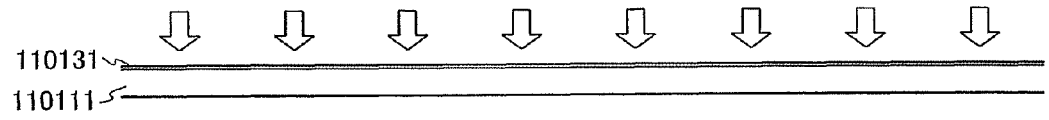

Here, an oxide film or a nitride film may be formed on the surface of the substrate 110111 by oxidizing or nitriding the surface of the substrate 110111 by plasma treatment (FIG. 71B). Hereinafter, an insulating film such as an oxide film or a nitride film formed by performing plasma treatment on the surface is also referred to as a plasma-treated insulating film. In FIG. 71B, an insulating film 110131 is a plasma-treated insulating film. In general, when a semiconductor element such as a thin film transistor is provided over a substrate formed of glass, plastic, or the like, an impurity element such as alkali metal (e.g., Na) or alkaline earth metal included in glass, plastic, or the like might be mixed into the semiconductor element so that the semiconductor element is contaminated; thus, characteristics of the semiconductor element may be adversely affected in some cases. Nitridation of a surface of the substrate formed of glass, plastic, or the like can prevent an impurity element such as alkali metal (e.g., Na) or alkaline earth metal included in the substrate from being mixed into the semiconductor element.

When the surface is oxidized by plasma treatment, the plasma treatment is performed in an oxygen atmosphere (e.g., in an atmosphere of oxygen ($O_2$) and a rare gas (containing at least one of He, Ne, Ar, Kr, and Xe), in an atmosphere of oxygen, hydrogen ($H_2$), and a rare gas, or in an atmosphere of dinitrogen monoxide and a rare gas). On the other hand, when the surface is nitrided by plasma treatment, the plasma treatment is performed in a nitrogen atmosphere (e.g., in an atmosphere of nitrogen ($N_2$) and a rare gas (containing at least one of He, Ne, Ar, Kr, and Xe), in an atmosphere of nitrogen, hydrogen, and a rare gas, or in an atmosphere of $NH_3$ and a rare gas). As a rare gas, Ar can be used, for example. Alternatively, a gas in which Ar and Kr are mixed may be used. Accordingly, the plasma-treated insulating film contains a rare gas (containing at least one of He, Ne, Ar, Kr, and Xe) used for plasma treatment. For example, the plasma-treated insulating film contains Ar when Ar is used.

In addition, it is preferable to perform plasma treatment in the atmosphere containing the aforementioned gas, with conditions of an electron density in the range of $1\times10^{11}$ to $1\times10^{13}$ cm$^{-3}$ and a plasma electron temperature in the range of 0.5 to 1.5 eV. Since the plasma electron density is high and the electron temperature in the vicinity of an object to be treated is low, damage by plasma to the object to be treated can be prevented. Further, since the plasma electron density, is as high as $1\times10^{11}$ cm$^{-3}$ or more, an oxide film or a nitride film formed by oxidizing or nitriding the object to be treated by plasma treatment is superior in its uniformity of thickness and the like as well as being dense, as compared with a film formed by a CVD method, a sputtering method, or the like. Alternatively, since the plasma electron temperature is as low as 1 eV or less, oxidation or nitridation can be performed at a lower temperature as compared with a conventional plasma treatment or thermal oxidation. For example, oxidation or nitridation can be performed sufficiently even when plasma treatment is performed at a temperature lower than a strain point of a glass substrate by 100 degrees or more. Note that as frequency for generating plasma, high frequency waves such as microwaves (2.45 GHz) can be used. Note that hereinafter, plasma treatment is performed using the aforementioned conditions unless otherwise specified.

Although FIG. 71B shows the case where the plasma-treated insulating film is formed by plasma treatment on the surface of the substrate 110111, this embodiment mode includes the case where a plasma-treated insulating film is not formed on the surface of the substrate 110111.

Although a plasma-treated insulating film formed by plasma treatment on the surface of the object to be treated is not shown in FIGS. 71C to 71G, this embodiment mode includes the case where a plasma-treated insulating film formed by plasma treatment exists on the surface of the substrate 110111, the insulating film 110112, the semiconductor layer 110113, the semiconductor layer 110114, the semiconductor layer 110115, the insulating film 110116, the insulating film 110118, or the insulating film 110119.

Figure 71C:

Next, the insulating film 110112 is formed over the substrate 110111 by a known method (such as a sputtering method, an LPCVD method, or a plasma CVD method) (FIG. 71C). For the insulating film 110112, silicon oxide (SiOx) or silicon oxynitride (SiOxNy) (x>y) can be used.

Here, a plasma-treated insulating film may be formed on the surface of the insulating film 110112 by oxidizing or nitriding the surface of the insulating film 110112 by plasma treatment. By oxidizing the surface of the insulating film 110112, the surface of the insulating film 110112 is modified, and a dense film with fewer defects such as a pinhole can be obtained. Further, by oxidizing the surface of the insulating film 110112, the plasma-treated insulating film containing a little amount of N atoms can be formed; thus, interface characteristics of the plasma-treated insulating film and a semiconductor layer are improved when the semiconductor layer is provided over the plasma-treated insulating film. The plasma-treated insulating film contains a rare gas (containing at least one of He, Ne, Ar, Kr, and Xe) used for plasma treatment. Note that the plasma treatment can be similarly performed under the aforementioned conditions.

Figure 71D:
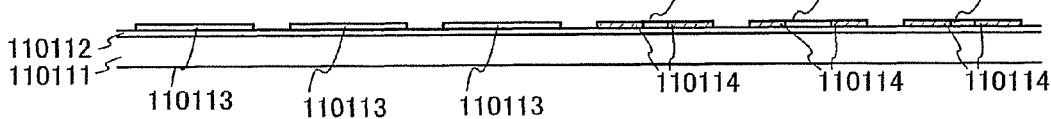

Next, the island-shaped semiconductor layers 110113 and 110114 are formed over the insulating film 110112 (FIG. 71D). The island-shaped semiconductor layers 110113 and 110114 can be formed in such a manner that an amorphous semiconductor layer is formed over the insulating film 110112 by using a material containing silicon (Si) as its main component (e.g., $Si_xGe_{1-x}$) or the like by a known method (such as a sputtering method, an LPCVD method, or a plasma CVD method), the amorphous semiconductor layer is crystallized, and the semiconductor layer is selectively etched. Note that crystallization of the amorphous semiconductor layer can be performed by a known crystallization method such as a laser crystallization method, a thermal crystallization method using RTA or an annealing furnace, a thermal crystallization method using a metal element which promotes crystallization, or a method in which these methods are combined. Here, end portions of the island-shaped semiconductor layers are provided with an angle of about 90° (θ=85 to 100°). Alternatively, the semiconductor layer 110114 to be a low concentration drain region may be formed by doping impurities with the use of a mask.

Here, a plasma-treated insulating film may be formed on the surfaces of the semiconductor layers 110113 and 110114 by oxidizing or nitriding the surfaces of the semiconductor layers 110113 and 110114 by plasma treatment. For example, when Si is used for the semiconductor layers 110113 and 110114, silicon oxide (SiOx) or silicon nitride (SiNx) is formed as the plasma-treated insulating film. Alternatively, after the semiconductor layers 110113 and 110114 are oxidized by plasma treatment, the semiconductor layers 110113 and 110114 may be nitrided by performing plasma treatment again. In this case, silicon oxide (SiOx) is formed in contact with the semiconductor layers 110113 and 110114, and silicon nitride oxide (SiNxOy) (x>y) is formed on the surface of the silicon oxide. Note that when the semiconductor layer is oxidized by plasma treatment, the plasma treatment is performed in an oxygen atmosphere (e.g., in an atmosphere of oxygen ($O_2$) and a rare gas (containing at least one of He, Ne, Ar, Kr, and Xe), in an atmosphere of oxygen, hydrogen ($H_2$), and a rare gas, or in an atmosphere of dinitrogen monoxide and a rare gas). On the other hand, when the semiconductor layer is nitrided by plasma treatment, the plasma treatment is performed in a nitrogen atmosphere (e.g., in an atmosphere of nitrogen ($N_2$) and a rare gas (containing at least one of He, Ne, Ar, Kr, and Xe), in an atmosphere of nitrogen, hydrogen, and a rare gas, or in an atmosphere of $NH_3$ and a rare gas). As a rare gas, Ar can be used, for example. Alternatively, a gas in which Ar and Kr are mixed may be used. Accordingly, the plasma-treated insulating film contains a rare gas (containing at least one of He, Ne, Ar, Kr, and Xe) used, for plasma treatment. For example, the plasma-treated insulating film contains Ar when Ar is used.

Figure 71E:
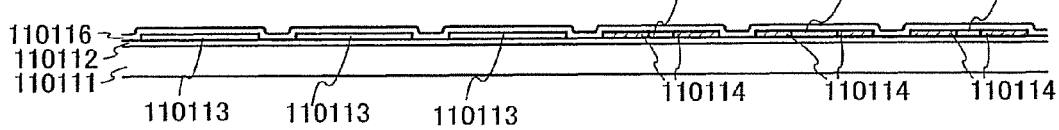

Next, the insulating film 110116 is formed (FIG. 71E). The insulating film 110116 can have a single-layer structure or a stacked-layer structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y), by a known method (such as a sputtering method, an LPCVD method, or a plasma CVD method). Note that when the plasma-treated insulating film is formed on the surfaces of the semiconductor layers 110113 and 110114 by plasma treatment to the surfaces of the semiconductor layers 110113 and 110114, the plasma-treated insulating film can be used as the insulating film 110116.

Here, the surface of the insulating film 110116 may be oxidized or nitrided by plasma treatment, so that a plasma-treated insulating film is formed on the surface of the insulating film 110116. Note that the plasma-treated insulating film contains a rare gas (containing at least one of He, Ne, Ar, Kr, and Xe) used for plasma treatment. The plasma treatment can be similarly performed under the aforementioned conditions.

Alternatively, after the insulating film 110116 is oxidized by plasma treatment once in an oxygen atmosphere, the insulating film 110116 may be nitrided by performing plasma treatment again in a nitrogen atmosphere. By oxidizing or nitriding the surface of the insulating film 110116 by plasma treatment in such a manner, the surface of the insulating film 110116 is modified, and a dense film can be formed. An insulating film obtained by plasma treatment is denser and has fewer defects such as a pinhole, as compared with an insulating film formed by a CVD method, a sputtering method, or the like. Thus, characteristics of a thin film transistor can be improved.

Figure 71F:
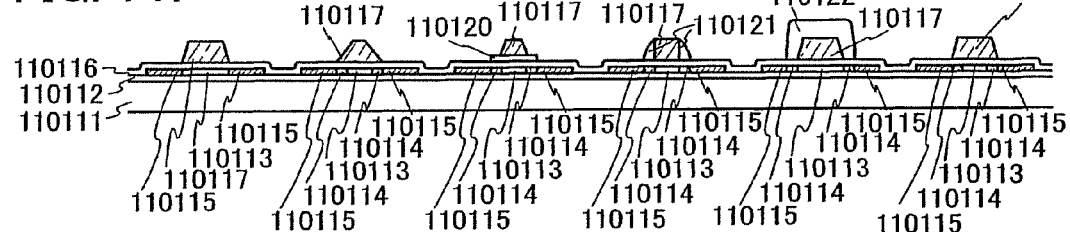

Next, the gate electrode 110117 is formed (FIG. 71F). The gate electrode 110117 can be formed by a known method (such as a sputtering method, an LPCVD method, or a plasma CVD method).

In the transistor 110101, the semiconductor layers 110115 used as the source region and the drain region can be formed by doping impurities after the gate electrode 110117 is formed.

In the transistor 110102, the semiconductor layers 110114 used as the LDD regions and the semiconductor layers 110115 used as the source region and the drain region can be formed by doping impurities after the gate electrode 110117 is formed.

In the transistor 110103, the semiconductor layers 110114 used as the LDD regions and the semiconductor layers 110115 used as the source region and the drain region can be formed by doping impurities after the gate electrode 110117 is formed.

In the transistor 110104, the semiconductor layers 110114 used as the LDD regions and the semiconductor layers 110115 used as the source region and the drain region can be formed by doping impurities after the sidewall 110121 is formed on the side surface of the gate electrode 110117.

Note that silicon oxide (SiOx) or silicon nitride (SiNx) can be used for the sidewall 110121. As a method of forming the sidewall 110121 on the side surface of the gate electrode 110117, a method can be used, for example, in which a silicon oxide (SiOx) film or a silicon nitride (SiNx) film is formed by a known method after the gate electrode 110117 is formed, and then, the silicon oxide (SiOx) film or the silicon nitride (SiNx) film is etched by anisotropic etching. Thus, the silicon oxide (SiOx) film or the silicon nitride (SiNx) film remains only on the side surface of the gate electrode 110117, so that the sidewall 110121 can be formed on the side surface of the gate electrode 110117.

In the transistor 110105, the semiconductor layers 110114 used as the LDD (Loff) regions and the semiconductor layer 110115 used as the source region and the drain region can be formed by doping impurities after a mask 110122 is formed to cover the gate electrode 110117.

In the transistor 110106, the semiconductor layers 110114 used as the LDD (Lov) regions and the semiconductor layers 110115 used as the source region and the drain region can be formed by doping impurities after the gate electrode 110117 is formed.

Figure 71G:
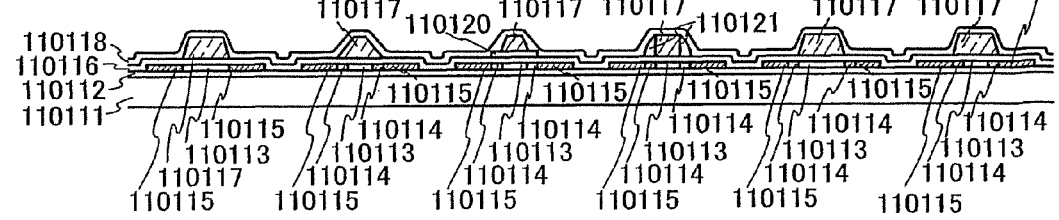

Next, the insulating film 110118 is formed (FIG. 71G). The insulating film 110118 can have a single-layer structure or a stacked-layer structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y); or a film containing carbon, such as a DLC (diamond-like carbon), by a known method (such as a sputtering method or a plasma CVD method).

Here, the surface of the insulating film 110118 may be oxidized or nitrided by plasma treatment, so that a plasma-treated insulating film is formed on the surface of the insulating film 110118. Note that the plasma-treated insulating film contains a rare gas (containing at least one of He, Ne, Ar, Kr, and Xe) used for plasma treatment. The plasma treatment can be similarly performed under the aforementioned conditions.

Next, the insulating film 110119 is formed. The insulating film 110119 can have a single-layer structure or a stacked-layer structure of an organic material such as epoxy, polyimide, polyamide, polyvinyl phenol, benzocyclobutene, or acrylic; or a siloxane resin, in addition to an insulating film containing oxygen or nitrogen, such as silicon oxide (SiOx), silicon nitride (SiNx), silicon oxynitride (SiOxNy) (x>y), or silicon nitride oxide (SiNxOy) (x>y); or a film containing carbon, such as a DLC (diamond-like carbon), by known method (such as a sputtering method or a plasma CVD method). Note that a siloxane resin corresponds to a resin having Si—O—Si bonds. Siloxane includes a skeleton structure of a bond of silicon (Si) and oxygen (O). As a substituent, an organic group containing at least hydrogen (such as an alkyl group or an aryl group) is used. Alternatively, a fluoro group, or a fluoro group and an organic group containing at least hydrogen can be used as a substituent. In addition, the plasma-treated insulating film contains a rare gas (containing at least one of He, Ne, Ar, Kr, and Xe) used for plasma treatment. For example, the plasma-treated insulating film contains Ar when Ar is used.

When an organic material such as polyimide, polyamide, polyvinyl phenol, benzocyclobutene, or acrylic, or a siloxane resin is used for the insulating film 110119, the surface of the insulating film 110119 can be modified by oxidizing or nitriding the surface of the insulating film by plasma treatment. Modification of the surface improves strength of the insulating film 110119, and physical damage such as a crack generated when an opening is formed, for example, or film reduction in etching can be reduced. Further, when the conductive film 110123 is formed over the insulating film 110119, modification of the surface of the insulating film 110119 improves adhesion to the conductive film. For example, when a siloxane resin is used for the insulating film 110119 and nitrided by plasma treatment, a plasma-treated insulating film containing nitrogen or a rare gas is formed by nitriding a surface of the siloxane resin, and physical strength is improved.

Next, a contact hole is formed in the insulating films 110119, 110118, and 110116 in order to form the conductive film 110123 which is electrically connected to the semiconductor layer 110115. Note that the contact hole may have a tapered shape. Thus, coverage with the conductive film 110123 can be improved.

Figure 75:
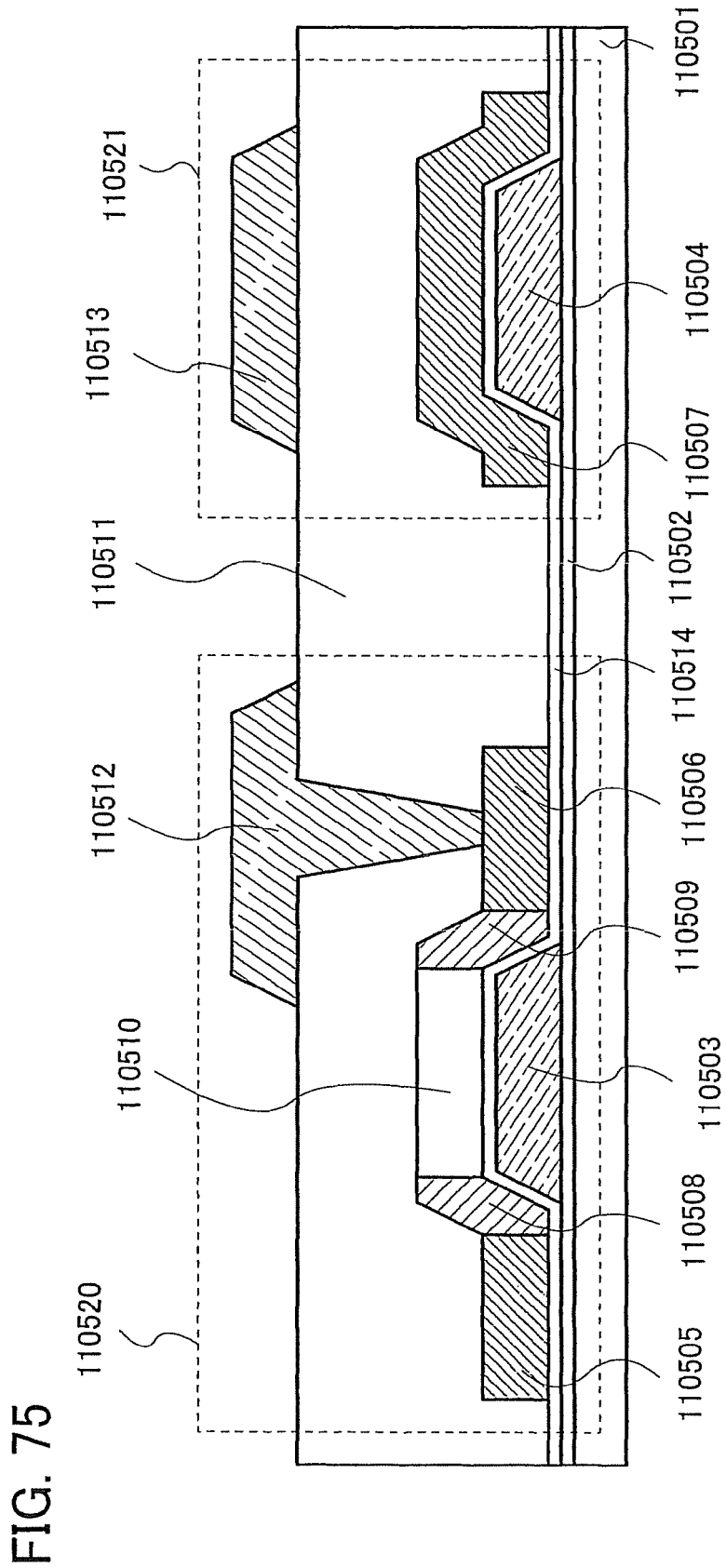
FIG. 75 is a view illustrating an example of a cross-sectional view of a semiconductor device in accordance with the present invention.

FIG. 75 shows cross-sectional structures of a bottom-gate transistor and a capacitor.

A first insulating film (an insulating film 110502) is formed over an entire surface of a substrate 110501. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or a stacked layer of a silicon oxide film, a silicon nitride film, a silicon oxynitride film (SiOxNy), or the like can be used.

A first conductive layer (conductive layers 110503 and 110504) is formed over the first insulating film. The conductive layer 110503 includes a portion functioning as a gate electrode of a transistor 110520. The conductive layer 110504 includes a portion functioning as a first electrode of a capacitor 110521. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, a stacked layer of these elements (including the alloy thereof) can be used.

A second insulating film (an insulating film 110514) is formed to cover at least the first conductive layer. The second insulating film functions as a gate insulating film. As the second insulating film, a single layer or a stacked layer of a silicon oxide film, a silicon nitride film, a silicon oxynitride film (SiOxNy), or the like can be used.

For a portion of the second insulating film, which is in contact with the semiconductor layer, a silicon oxide film is preferably used. This is because the trap level at the interface between the semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A semiconductor layer is formed in part of a portion over the second insulating film, which overlaps with the first conductive layer, by a photolithography method, an inkjet method, a printing method, or the like. Part of the semiconductor layer extends to a portion over the second insulating film, which does not overlap with the first conductive layer. The semiconductor layer includes a channel formation region (a channel formation region 110510), an LDD region (LDD regions 110508 and 110509), and an impurity region (impurity regions 110505, 110506, and 110507). The channel formation region 110510 functions as a channel formation region of the transistor 110520. The LDD regions 110508 and 110509 function as LDD regions of the transistor 110520. Note that the LDD regions 110508 and 110509 are not necessarily formed. The impurity region 110505 includes a portion functioning as one of a source electrode and a drain electrode of the transistor 110520. The impurity region 110506 includes a portion functioning as the other of the source electrode and the drain electrode of the transistor 110520. The impurity region 110507 includes a portion functioning as a second electrode of the capacitor 110521.

A third insulating film (an insulating film 110511) is entirely formed. A contact hole is selectively formed in part of the third insulating film. The insulating film 110511 functions as an interlayer film. As the third insulating film, an inorganic material (e.g., silicon oxide, silicon nitride, or silicon oxynitride), an organic compound material having a low dielectric constant (e.g., a photosensitive or nonphotosensitive organic resin material), or the like can be used. Alternatively, a material containing siloxane may be used. Note that siloxane is a material in which a skeleton structure is formed by a bond of silicon (Si) and oxygen (O). As a substitute, an organic group containing at least hydrogen (such as an alkyl group or an aryl group) is used. Alternatively, a fluoro group, or a fluoro group and an organic group containing at least hydrogen may be used as a substituent.

A second conductive layer (conductive layers 110512 and 110513) is formed over the third insulating film. The conductive layer 110512 is connected to the other of the source electrode and the drain electrode of the transistor 110520 through the contact hole formed in the third insulating film. Thus, the conductive layer 110512 includes a portion functioning as the other of the source electrode and the drain electrode of the transistor 110520. When the conductive layer 110513 is electrically connected to the conductive layer 110504, the conductive layer 110513 includes a portion functioning as the first electrode of the capacitor 110521. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, a stacked layer of these elements (including the alloy thereof) can be used.

Note that in steps after forming the second conductive layer, various insulating films or various conductive films may be formed.

Next, structures of a transistor and a capacitor are described in the case where an amorphous silicon (a-Si:H) film is used as a semiconductor layer of the transistor.

Figure 72:
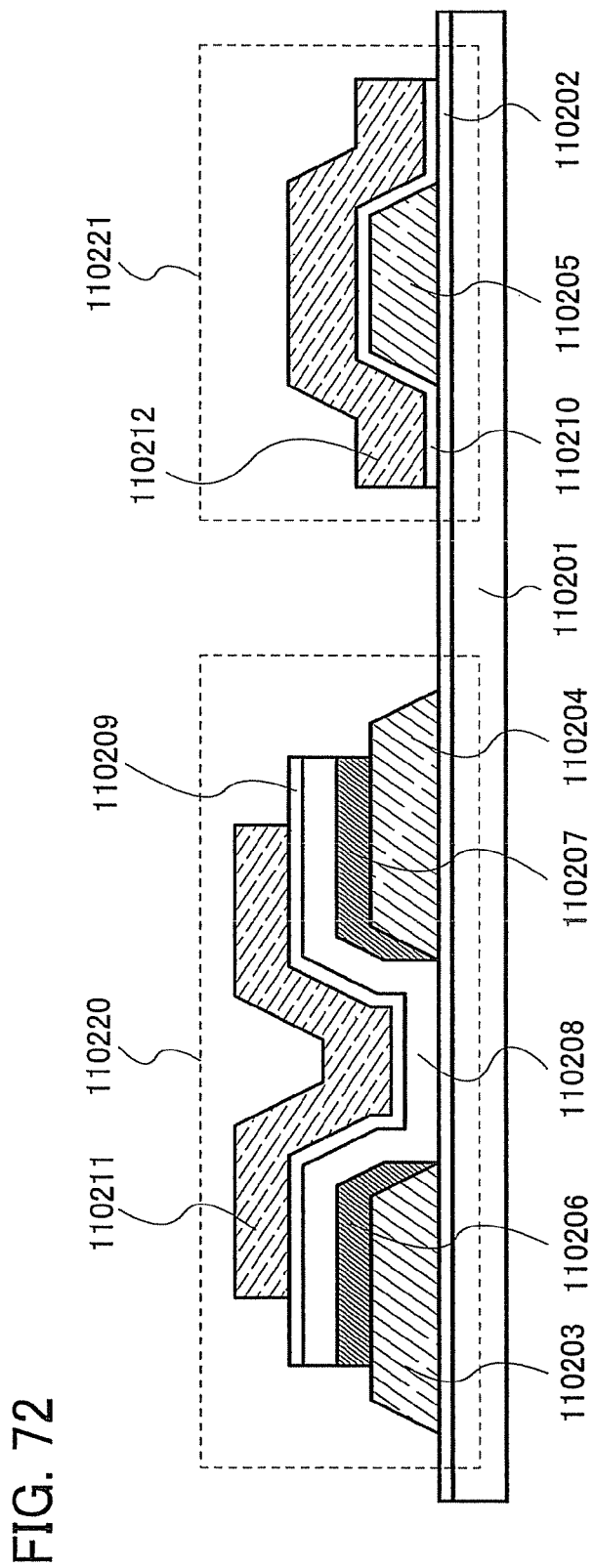
FIG. 72 is a view illustrating an example of a cross-sectional view of a semiconductor device in accordance with the present invention.

FIG. 72 shows cross-sectional structures of a top-gate transistor and a capacitor.

A first insulating film (an insulating film 110202) is formed over an entire surface of a substrate 110201. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or a stacked layer of a silicon oxide film, a silicon nitride film, a silicon oxynitride film (SiOxNy), or the like can be used.

Note that the first insulating film is not necessarily formed. When the first insulating film is not formed, reduction in the number of steps and manufacturing cost can be realized. Further, since the structure can be simplified, the yield can be improved.

A first conductive layer (conductive layers 110203, 110204, and 110205) is formed over the first insulating film. The conductive layer 110203 includes a portion functioning as one of a source electrode and a drain electrode of a transistor 110220. The conductive layer 110204 includes a portion functioning as the other of the source electrode and the drain electrode of the transistor 110220. The conductive layer 110205 includes a portion functioning as a first electrode of a capacitor 110221. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, a stacked layer of these elements (including the alloy thereof) can be used.

A first semiconductor layer (semiconductor layers 110206 and 110207) is formed above the conductive layers 110203 and 110204. The semiconductor layer 110206 includes a portion functioning as one of the source electrode and the drain electrode. The semiconductor layer 110207 includes a portion functioning as the other of the source electrode and the drain electrode. As the first semiconductor layer, silicon containing phosphorus or the like can be used, for example.

A second semiconductor layer (a semiconductor layer 110208) is formed over the first insulating film and between the conductive layer 110203 and the conductive layer 110204. Part of the semiconductor layer 110208 extends over the conductive layers 110203 and 110204. The semiconductor layer 110208 includes a portion functioning as a channel region of the transistor 110220. As the second semiconductor layer, a semiconductor layer having no crystallinity such as an amorphous silicon (a-Si:H) layer, a semiconductor layer such as a microcrystalline semiconductor (μ-Si:H) layer, or the like can be used.

A second insulating film (insulating films 110209 and 110210) is formed to cover at least the semiconductor layer 110208 and the conductive layer 110205. The second insulating film functions as a gate insulating film. As the second insulating film, a single layer or a stacked layer of a silicon oxide film, a silicon nitride film, a silicon oxynitride film (SiOxNy), or the like can be used.

For a portion of the second insulating film, which is in contact with the second semiconductor layer, a silicon oxide film is preferably used. This is because the trap level at the interface between the second semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A second conductive layer (conductive layers 110211 and 110212) is formed over the second insulating film. The conductive layer 110211 includes a portion functioning as a gate electrode of the transistor 110220. The conductive layer 110212 functions as a second electrode of the capacitor 110221 or a wiring. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, a stacked layer of these elements (including the alloy thereof) can be used.

Note that in steps after forming the second conductive layer, various insulating films or various conductive films may be formed.

Figure 73:
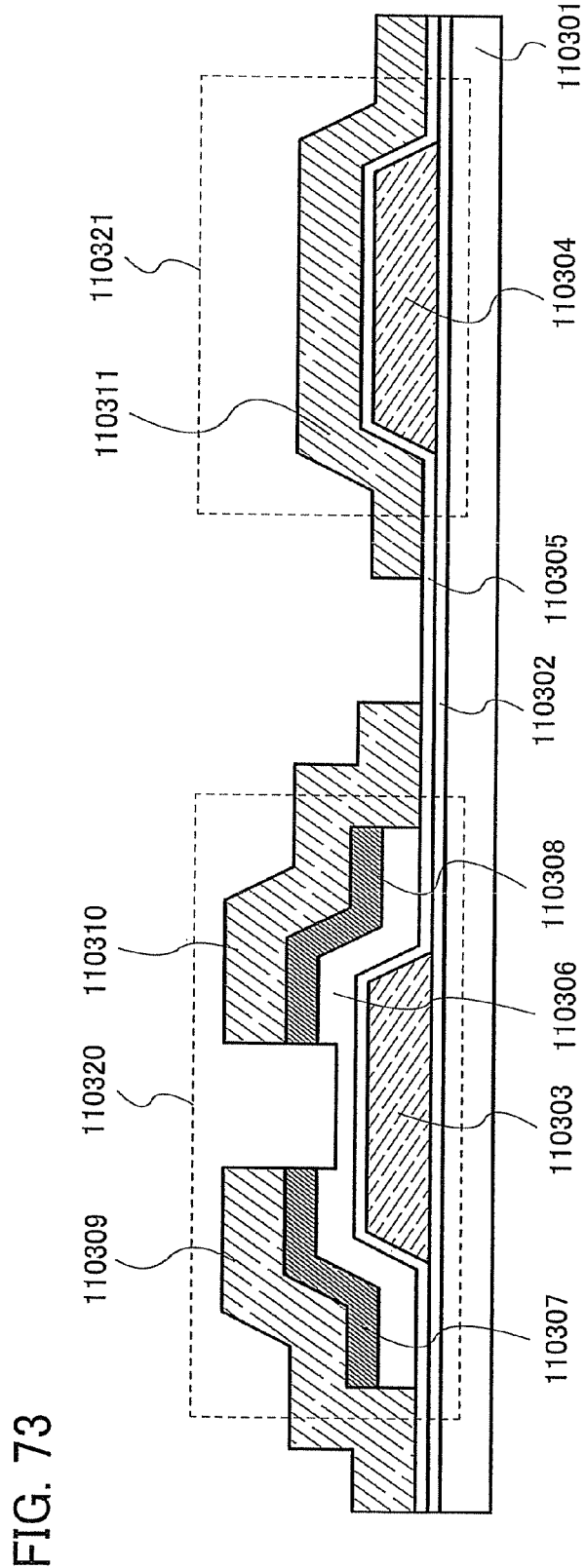
FIG. 73 is a view illustrating an example of a cross-sectional view of a semiconductor device in accordance with the present invention.

FIG. 73 shows cross-sectional structures of an inversely staggered (bottom gate) transistor and a capacitor. In particular, the transistor shown in FIG. 73 has a channel etch structure.

A first insulating film (an insulating film 110302) is formed over an entire surface of a substrate 110301. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or a stacked layer of a silicon oxide film, a silicon nitride film, a silicon oxynitride film (SiOxNy), or the like can be used.

Note that the first insulating film is not necessarily formed. When the first insulating film is not formed, reduction in the number of steps and manufacturing cost can be realized. Further, since the structure can be simplified, the yield can be improved.

A first conductive layer (conductive layers 110303 and 110304) is formed over the first insulating film. The conductive layer 110303 includes a portion functioning as a gate electrode of a transistor 110320. The conductive layer 110304 includes a portion functioning as a first electrode of a capacitor 110321. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, a stacked layer of these elements (including the alloy thereof) can be used.

A second insulating film (an insulating film 110305) is formed to cover at least the first conductive layer. The second insulating film functions as a gate insulating film. As the second insulating film, a single layer or a stacked layer of a silicon oxide film, a silicon nitride film, a silicon oxynitride film (SiOxNy), or the like can be used.

For a portion of the second insulating film, which is in contact with the semiconductor layer, a silicon oxide film is preferably used. This is because the trap level at the interface between the semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A first semiconductor layer (a semiconductor layer 110306) is formed in part of a portion over the second insulating film, which overlaps with the first conductive layer, by a photolithography method, an inkjet method, a printing method, or the like. Part of the semiconductor layer 110306 extends to a portion over the second insulating film, which does not overlap with the first conductive layer. The semiconductor layer 110306 includes a portion functioning as a channel region of the transistor 110320. As the semiconductor layer 110306, a semiconductor layer having no crystallinity such as an amorphous silicon (a-Si:H) layer, a semiconductor layer such as a microcrystalline semiconductor (μ-Si:H) layer, or the like can be used.

A second semiconductor layer (semiconductor layers 110307 and 110308) is formed over part of the first semiconductor layer. The semiconductor layer 110307 includes a portion functioning as one of a source electrode and a drain electrode. The semiconductor layer 110308 includes a portion functioning as the other of the source electrode and the drain electrode. As the second semiconductor layer, silicon containing phosphorus or the like can be used, for example.

A second conductive layer (conductive layers 110309, 110310, and 110311) is formed over the second semiconductor layer and the second insulating film. The conductive layer 110309 includes a portion functioning as one of the source electrode and the drain electrode of the transistor 110320. The conductive layer 110310 includes a portion functioning as the other of the source electrode and the drain electrode of the transistor 110320. The conductive layer 110311 includes a portion functioning as a second electrode of the capacitor 110321. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, a stacked layer of these elements (including the alloy thereof) can be used.

Note that in steps after forming the second conductive layer, various insulating films or various conductive films may be formed.

Here, an example of a step characteristic of a channel etch type transistor is described. The first semiconductor layer and the second semiconductor layer can be formed using the same mask. Specifically, the first semiconductor layer and the second semiconductor layer are continuously formed. Further, the first semiconductor layer and the second semiconductor layer are formed using the same mask.

Another example of a step characteristic of a channel etch type transistor is described. The channel region of the transistor can be formed without using an additional mask. Specifically, after the second conductive layer is formed, part of the second semiconductor layer is removed using the second conductive layer as a mask. Alternatively, part of the second semiconductor layer is removed by using the same mask as the second conductive layer. The first semiconductor layer below the removed second semiconductor layer serves as the channel region of the transistor.

Figure 74:
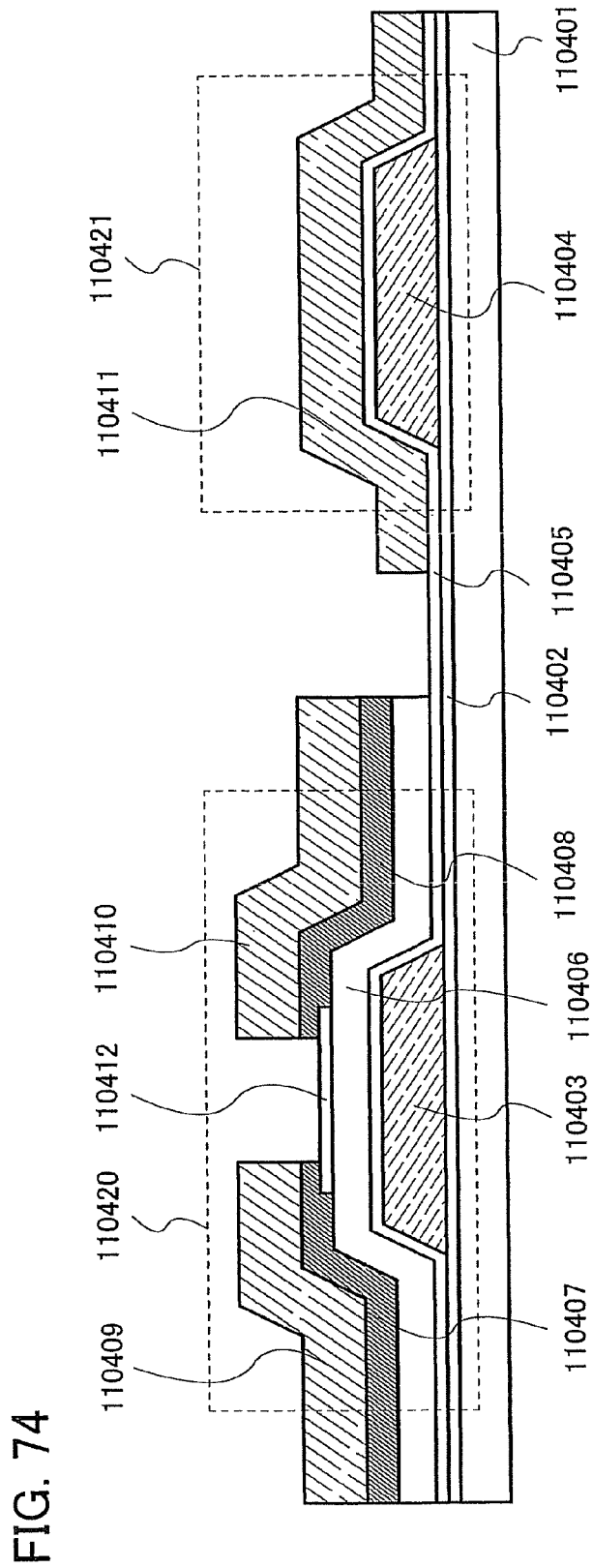
FIG. 74 is a view illustrating an example of a cross-sectional view of a semiconductor device in accordance with the present invention.

FIG. 74 shows cross-sectional structures of an inversely staggered (bottom gate) transistor and a capacitor. In particular, the transistor shown in FIG. 74 has a channel protection (channel stop) structure.

A first insulating film (an insulating film 110402) is formed over an entire surface of a substrate 110401. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or a stacked layer of a silicon oxide film, a silicon nitride film, a silicon oxynitride film (SiOxNy), or the like can be used.

Note that the first insulating film is not necessarily formed. When the first insulating film is not formed, reduction in the number of steps and manufacturing cost can be realized. Further, since the structure can be simplified, the yield can be improved.

A first conductive layer (conductive layers 110403 and 110404) is formed over the first insulating film. The conductive layer 110403 includes a portion functioning as a gate electrode of a transistor 110420. The conductive layer 110404 includes a portion functioning as a first electrode of a capacitor 110421. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternately, a stacked layer of these elements (including the alloy thereof) can be used.

A second insulating film (an insulating film 110405) is formed to cover at least the first conductive layer. The second insulating film functions as a gate insulating film. As the second insulating film, a single layer or a stacked layer of a silicon oxide film, a silicon nitride film, a silicon oxynitride film (SiOxNy), or the like can be used.

For a portion of the second insulating film, which is in contact with the semiconductor layer, a silicon oxide film is preferably used. This is because the trap level at the interface between the semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A first semiconductor layer (a semiconductor layer 110406) is formed in part of a portion over the second insulating film, which overlaps with the first conductive layer, by a photolithography method, an inkjet method, a printing method, or the like. Part of the semiconductor layer 110406 extends to a portion over the second insulating film, which does not overlap with the first conductive layer. The semiconductor layer 110406 includes a portion functioning as a channel region of the transistor 110420. As the semiconductor layer 110406, a semiconductor layer having no crystallinity such as an amorphous silicon (a-Si:H) layer, a semiconductor layer such as a microcrystalline semiconductor (μ-Si:H) layer, or the like can be used.

A third insulating film (an insulating film 110412) is formed over part of the first semiconductor layer. The insulating film 110412 prevents the channel region of the transistor 110420 from being removed by etching. That is, the insulating film 110412 functions as a channel protection film (a channel stop film). As the third insulating film, a single layer or a stacked layer of a silicon oxide film, a silicon nitride film, a silicon oxynitride film (SiOxNy), or the like can be used.

A second semiconductor layer (semiconductor layers 110407 and 110408) is formed over part of the first semiconductor layer and part of the third insulating film. The semiconductor layer 110407 includes a portion functioning as one of a source electrode and a drain electrode. The semiconductor layer 110408 includes a portion functioning as the other of the source electrode and the drain electrode. As the second semiconductor layer, silicon containing phosphorus or the like can be used, for example.

A second conductive layer (conductive layers 110409, 110410, and 110411) is formed over the second semiconductor layer. The conductive layer 110409 includes a portion functioning as one of the source electrode and the drain electrode of the transistor 110420. The conductive layer 110410 includes a portion functioning as the other of the source electrode and the drain electrode of the transistor 110420. The conductive layer 110411 includes a portion functioning as a second electrode of the capacitor 110421. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternately, a stacked layer of these elements (including the alloy thereof) can be used.

Note that in steps after forming the second conductive layer, various insulating films or various conductive films may be formed.

Here, an example of a step characteristic of a channel protection transistor is described. The first semiconductor layer, the second semiconductor layer, and the second conductive layer can be formed using the same mask. At the same time, the channel region can be formed. Specifically, the first semiconductor layer is formed, and next, the third insulating film (i.e., the channel protection film or the channel stop film) is patterned using a mask. Next, the second semiconductor layer and the second conductive layer are continuously formed. Then, after the second conductive layer is formed, the first semiconductor layer, the second semiconductor layer, and the second conductive film are patterned using the same mask. Note that part of the first semiconductor layer below the third insulating film is protected by the third insulating film, and thus is not removed by etching. This part (a part of the first semiconductor layer over which the third insulating film is formed) serves as the channel region.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 13

In this embodiment mode, a structure of an EL element is described. In particular, a structure of an inorganic EL element is described.

An inorganic EL element is classified as either a dispersion type inorganic EL element or a thin-film type inorganic EL element, depending on its element structure. These elements differ in that the former includes an electroluminescent layer in which particles of a light-emitting material are dispersed in a binder, whereas the latter includes an electroluminescent layer formed of a thin film of a light-emitting material. However, the former and the latter have in common in that they need electrons accelerated by a high electric field. Note that mechanisms for obtaining light emission are donor-acceptor recombination light emission which utilizes a donor level and an acceptor level; and localized light emission which utilizes inner-shell electron transition of a metal ion. In general, donor-acceptor recombination light emission is employed in dispersion type inorganic EL elements and localized light emission is employed in thin-film type inorganic EL elements in many cases.

A light-emitting material includes a base material and an impurity element to be a luminescence center. Light emission of various colors can be obtained by changing the impurity element to be included. The light-emitting material can be formed using various methods, such as a solid phase method or a liquid phase method (a coprecipitation method). Further, a liquid phase method such as a spray pyrolysis method, a double decomposition method, a method employing precursor pyrolysis, a reverse micelle method, a method in which one or more of these methods are combined with high-temperature baking, or a freeze-drying method, or the like can be used.

A solid phase method is a method in which a base material and an impurity element or a compound containing an impurity element are weighed, mixed in a mortar, and heated and baked in an electric furnace so as to be reacted; thus, the impurity element is included in the base material. The baking temperature is preferably 700 to 1500° C. This is because a solid-phase reaction does not proceed when the temperature is too low, and the base material decomposes when the temperature is too high. Note that although the materials may be baked in powder form, they are preferably baked in pellet form. Although a solid phase method needs a comparatively high temperature, it is a simple method, and thus has high productivity and is suitable for mass production.

A liquid phase method (a coprecipitation method) is a method in which a base material or a compound containing a base material, and an impurity element or a compound containing an impurity element are reacted in a solution, dried, and then baked. Particles of a light-emitting material are uniformly distributed, and the reaction can progress even when the particles are small and the baking temperature is low.

As a base material to be used for a light-emitting material, sulfide, oxide, or nitride can be used. As sulfide, zinc sulfide (ZnS), cadmium sulfide (CdS), calcium sulfide (CaS), yttrium sulfide ($Y_2S_3$), gallium sulfide ($Ga_2S_3$), strontium sulfide (SrS), barium sulfide (BaS), or the like can be used, for example. As oxide, zinc oxide (ZnO), yttrium oxide ($Y_2O_3$), or the like can be used, for example. As nitride, aluminum nitride (AlN), gallium nitride (GaN), indium nitride (InN), or the like can be used, for example. Further, zinc selenide (ZnSe), zinc telluride (ZnTe), or the like; or a ternary mixed crystal such as calcium gallium sulfide (CaGa$_2$S$_4$), strontium gallium sulfide (SrGa$_2$S$_4$), or barium gallium sulfide (BaGa$_2$S$_4$) may be used.

As a luminescence center for localized light emission, manganese (Mn), copper (Cu), samarium (Sm), terbium (Tb), erbium (Er), thulium (Tm), europium (Eu), cerium (Ce), praseodymium (Pr), or the like can be used. Note that a halogen element such as fluorine (F) or chlorine (Cl) may be added for charge compensation.

On the other hand, as a luminescence center for donor-acceptor recombination light emission, a light-emitting material including a first impurity element forming a donor level and a second impurity element forming an acceptor level can be used. As the first impurity element, fluorine (F), chlorine (Cl), aluminum (Al), or the like can be used, for example. As the second impurity element, copper (Cu), silver (Ag), or the like can be used, for example.

When the light-emitting material for donor-acceptor recombination light emission is synthesized using a solid phase method, a base material, the first impurity element or a compound containing the first impurity element, and the second impurity element or a compound containing the second impurity element are weighed, mixed in a mortar, and heated and baked in an electric furnace. As the base material, the aforementioned base material can be used. As the first impurity element or the compound containing the first impurity element, fluorine (F), chlorine (Cl), aluminum sulfide (Al$_2$S$_3$), or the like can be used, for example. As the second impurity element or the compound containing the second impurity element, copper (Cu), silver (Ag), copper sulfide (Cu$_2$S), silver sulfide (Ag$_2$S), or the like can be used, for example. The baking temperature is preferably 700 to 1500° C. This is because a solid-phase reaction does not proceed when the temperature is too low, and the base material decomposes when the temperature is too high. Note that although the materials may be baked in powder form, they are preferably baked in pellet form.

As the impurity element in the case of using a solid phase reaction, a compound formed of the first impurity element and the second impurity element may be used in combination. In this case, the impurity elements are easily diffused, and the solid phase reaction proceeds readily, so that a uniform light-emitting material can be obtained. Further, since an unnecessary impurity element is not included, a light-emitting material with high purity can be obtained. As the compound formed of the first impurity element and the second impurity element, copper chloride (CuCl), silver chloride (AgCl), or the like can be used, for example.

Note that the concentration of these impurity elements is in the range of 0.01 to 10 atomic %, and is preferably in the range of 0.05 to 5 atomic % with respect to the base material.

In the case of a thin-film type inorganic EL element, an electroluminescent layer includes the aforementioned light-emitting material, and can be formed using a vacuum evaporation method such as a resistance heating evaporation method or an electron beam evaporation (EB evaporation) method, a physical vapor deposition (PVD) method such as a sputtering method, a chemical vapor deposition (CVD) method such as a metal organic CVD method or a low-pressure hydride transport CVD method, an atomic layer epitaxy (ALE) method, or the like.

Figure 76A:
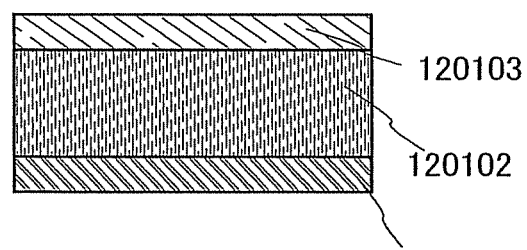
FIGS. 76A to 76C are cross-sectional views each illustrating an example of a display element of a semiconductor device in accordance with the present invention.
Figure 76B:
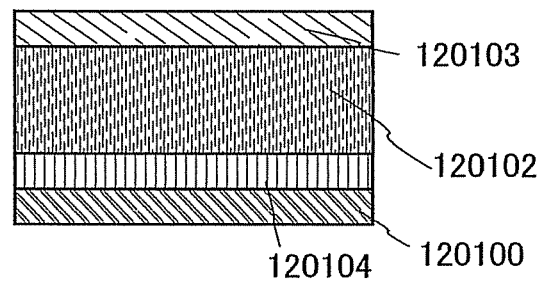
Figure 76C:
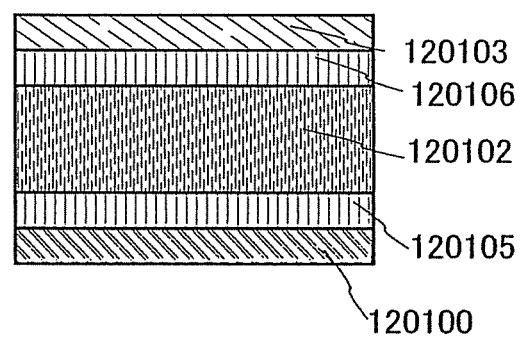

FIGS. 76A to 76C each show an example of a thin-film type inorganic EL element which can be used as the light-emitting element. In FIGS. 76A to 76C, a light-emitting element includes a first electrode layer 120100, an electroluminescent layer 120102, and a second electrode layer 120103.

The light-emitting elements in FIGS. 76B and 76C each have a structure where an insulating film is provided between the electrode layer and the electroluminescent layer in the light-emitting element in FIG. 76A. The light-emitting element in FIG. 76B includes an insulating film 120104 between the first electrode layer 120100 and the electroluminescent layer 120102. The light-emitting element in FIG. 76C includes an insulating film 120105 between the first electrode layer 120100 and the electroluminescent layer 120102, and an insulating film 120106 between the second electrode layer 120103 and the electroluminescent layer 120102. Accordingly, the insulating film may be provided between the electroluminescent layer and one of the electrode layers interposing the electroluminescent layer, or may be provided between the electroluminescent layer and each of the electrode layers interposing the electroluminescent layer. The insulating film may be a single layer or stacked layers including a plurality of layers.

Note that the insulating film 120104 is provided in contact with the first electrode layer 120100 in FIG. 76B; however, the insulating film 120104 may be provided in contact with the second electrode layer 120103 by reversing the order of the insulating film and the electroluminescent layer.

In the case of a dispersion type inorganic EL, a film-shaped electroluminescent layer is formed by dispersing particulate light-emitting materials in a binder. When particles with a desired size cannot be sufficiently obtained by a method of forming the light-emitting material, the light-emitting materials may be processed into particles by being crushed in a mortar or the like. The binder is a substance for fixing the particulate light-emitting material in a dispersed state and maintaining the shape as the electroluminescent layer. The light-emitting material is uniformly dispersed in the electroluminescent layer and fixed by the binder.

In the case of a dispersion type inorganic EL, as a method of forming the electroluminescent layer, a droplet discharging method by which the electroluminescent layer can be selectively formed, a printing method (such as screen printing or offset printing), a coating method such as a spin coating method, a dipping method, a dispenser method, or the like can be used. The thickness of the electroluminescent layer is not particularly limited, but preferably in the range of 10 to 1000 nm. In the electroluminescent layer including the light-emitting material and the binder, a ratio of the light-emitting material is preferably 50 wt % or more and 80 wt % or less.

Figure 77A:
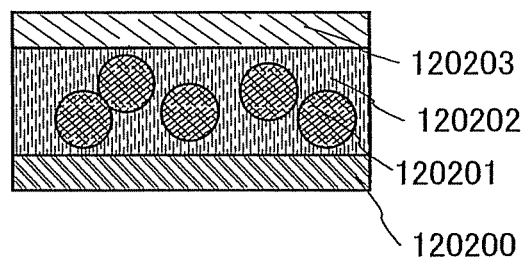
FIGS. 77A to 77C are cross-sectional views each illustrating an example of a display element of a semiconductor device in accordance with the present invention.
Figure 77B:
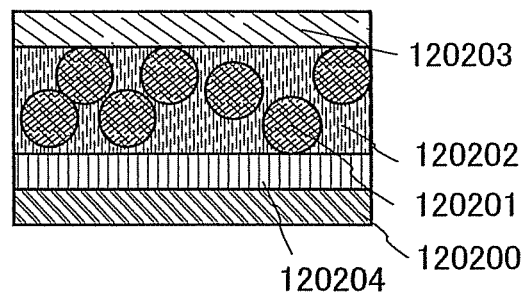
Figure 77C:
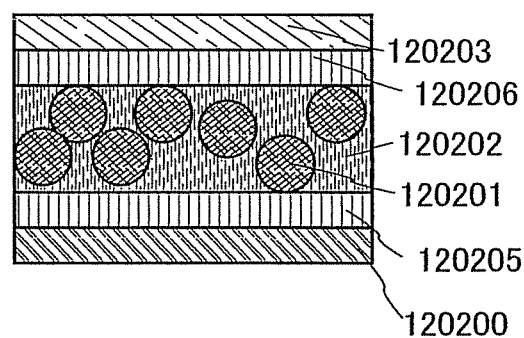

FIGS. 77A to 77C each show an example of a dispersion type inorganic EL element which can be used as the light-emitting element. A light-emitting element in FIG. 77A has a stacked-layer structure of a first electrode layer 120200, an electroluminescent layer 120202, and a second electrode layer 120203. The electroluminescent layer 120202 includes a light-emitting material 120201 held by a binder.

An insulating material is used for the binder. As the insulating material, an organic material or an inorganic material can be used. Alternatively, a mixed material containing an organic material and an inorganic material may be used. As the organic insulating material, a polymer having a comparatively high dielectric constant, such as a cyanoethyl cellulose based resin, or a resin such as polyethylene, polypropylene, a polystyrene based resin, a silicone resin, an epoxy resin, or vinylidene fluoride can be used. Alternatively, a heat-resistant polymer such as aromatic polyamide or polybenzimidazole, or a siloxane resin may be used. Note that a siloxane resin corresponds to a resin having Si—O—Si bonds. Siloxane includes a backbone structure of a bond of silicon (Si) and oxygen (O). As a substituent, an organic group containing at least hydrogen (such as an alkyl group or an aryl group) is used. Alternatively, a fluoro group, or a fluoro group and an organic group containing at least hydrogen may be used as a substituent. Further alternately, a resin material, for example, a vinyl resin such as polyvinyl alcohol or polyvinylbutyral, a phenol resin, a novolac resin, an acrylic resin, a melamine resin, an urethane resin, an oxazole resin (polybenzoxazole), or the like may be used. A dielectric constant can be adjusted by appropriately mixing these resins with fine particles having a high dielectric constant, such as barium titanate (BaTiO$_3$) or strontium titanate (SrTiO$_3$).

The inorganic insulating material included in the binder can be formed using silicon oxide (SiOx), silicon nitride (SiNx), silicon containing oxygen and nitrogen, aluminum nitride (AlN), aluminum containing oxygen and nitrogen, aluminum oxide (Al$_2$O$_3$) containing oxygen and nitrogen, titanium oxide (TiO$_2$), BaTiO$_3$, SrTiO$_3$, lead titanate (PbTiO$_3$), potassium niobate (KNbO$_3$), lead niobate (PbNbO$_3$), tantalum oxide (Ta$_2$O$_5$), barium tantalite (BaTa$_2$O$_6$), lithium tantalite (LiTaO$_3$), yttrium oxide (Y$_2$O$_3$), zirconium oxide (ZrO$_2$), ZnS, or a substance containing another inorganic insulating material. When an inorganic material having a high dielectric constant is included in the organic material (by addition or the like), the dielectric constant of the electroluminescent layer formed of the light-emitting material and the binder can be more effectively controlled, and the dielectric constant can be further increased.

In a manufacturing step, the light-emitting material is dispersed in a solution containing the binder. As a solvent for the solution containing the binder, it is acceptable as long as a solvent dissolves a binder material and can make a solution having a viscosity suitable for a method of forming the electroluminescent layer (various wet processes) and for desired film thickness. For example, an organic solvent or the like can be used as the solvent. When a siloxane resin is used as the binder, propylene glycol monomethyl ether, propylene glycol monomethyl ether acetate (also referred to as PGMEA), 3-methoxy-3-methyl-1-butanol (also referred to as MMB), or the like can be used as the solvent.

The light-emitting elements shown in FIGS. 77B and 77C each have a structure where an insulating film is provided between the electrode layer and the electroluminescent layer in the light-emitting element in FIG. 77A. The light-emitting element in FIG. 77B includes an insulating film 120204 between the first electrode layer 120200 and the electroluminescent layer 120202. The light-emitting element in FIG. 77C includes an insulating film 120205 between the first electrode layer 120200 and the electroluminescent layer 120202, and an insulating film 120206 between the second electrode layer 120203 and the electroluminescent layer 120202. Accordingly, the insulating film may be provided between the electroluminescent layer and one of the electrode layers interposing the electroluminescent layer, or may be provided between the electroluminescent layer and each of the electrode layers interposing the electroluminescent layer. The insulating film may be a single layer or stacked layers including a plurality of layers.

Although the insulating film 120204 is provided in contact with the first electrode layer 120200 in FIG. 77B, the insulating film 120204 may be provided in contact with the second electrode layer 120203 by reversing the order of the insulating film and the electroluminescent layer.

A material used for an insulating film such as the insulating film 120104 in FIG. 76B and the insulating film 120204 in FIG. 77B preferably has high withstand voltage and dense film quality. Further, the material preferably has a high dielectric constant. For example, silicon oxide (SiO$_2$), yttrium oxide (Y$_2$O$_3$), titanium oxide (TiO$_2$), aluminum oxide (Al$_2$O$_3$), hafnium oxide (HfO$_2$), tantalum oxide (Ta$_2$O$_5$), barium titanate (BaTiO$_3$), strontium titanate (SrTiO$_3$), lead titanate (PbTiO$_3$), silicon nitride (Si$_3$N$_4$), zirconium oxide (ZrO$_2$), or the like; or a mixed film of those materials or a stacked-layer film including two or more of those materials can be used. The insulating film can be formed by sputtering, evaporation, CVD, or the like. The insulating film may be formed by dispersing particles of the insulating material in a binder. A binder material may be formed using a material and a method similar to those of the binder contained in the electroluminescent layer. The thickness of the insulating film is not particularly limited, but preferably in the range of 10 to 1000 nm.

Note that the light-emitting element can emit light when voltage is applied between the pair of electrode layers interposing the electroluminescent layer. The light-emitting element can operate with DC drive or AC drive.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 14

In this embodiment mode, an example of a display device is described. In particular, the case where a display device is optically treated is described.

Figure 78A:
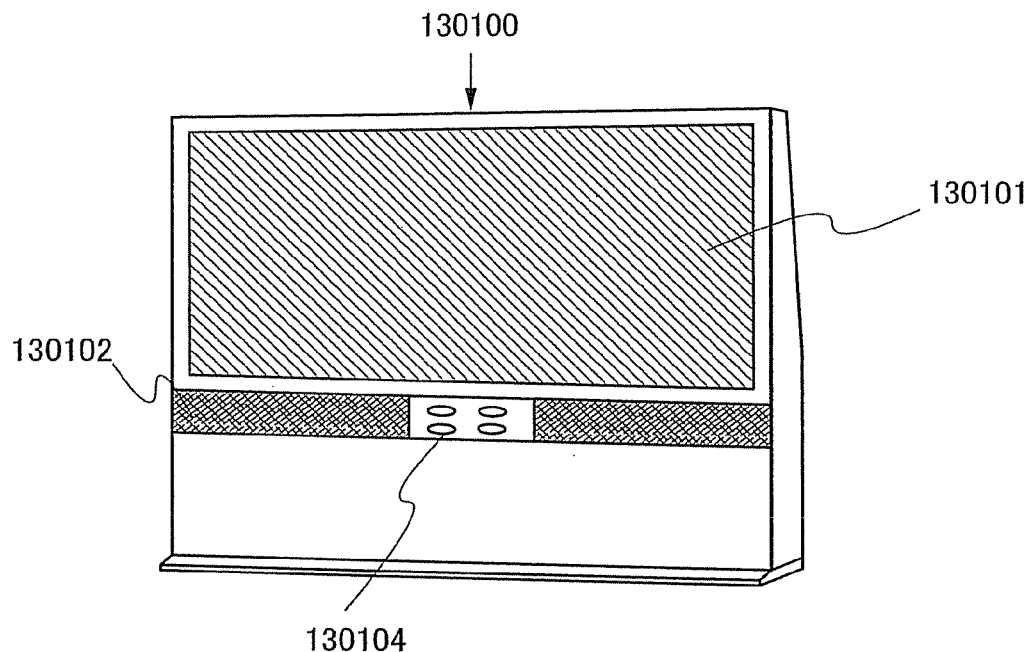
FIGS. 78A and 78B are views each illustrating an example of a structure of a semiconductor device in accordance with the present invention.
Figure 78B:
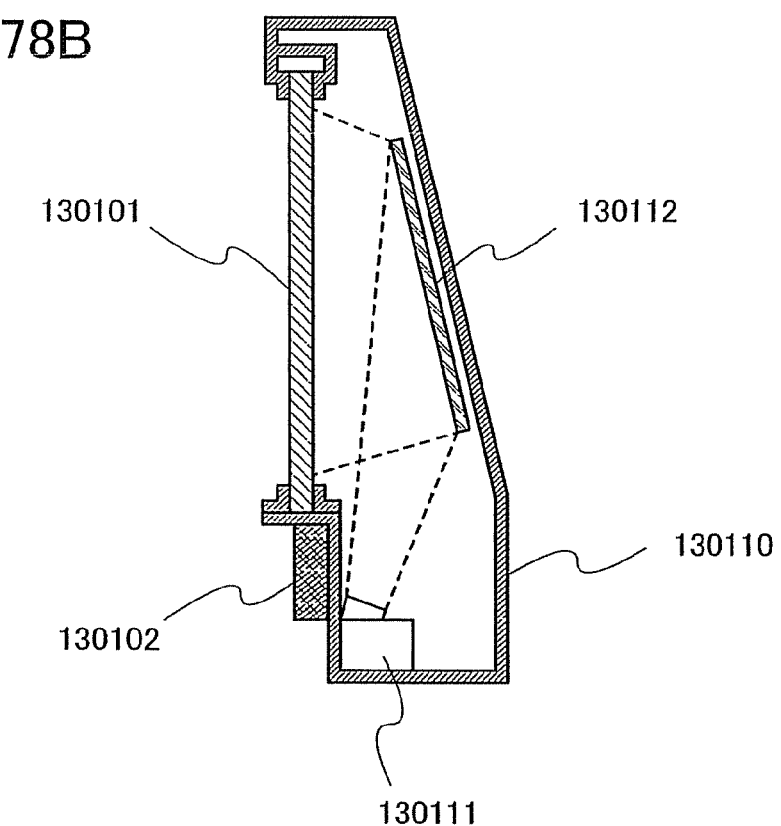

A rear projection display device 130100 in FIGS. 78A and 78B is provided with a projector unit 130111, a mirror 130112, and a screen panel 130101. The rear projection display device 130100 may also be provided with a speaker 130102 and operation switches 130104. The projector unit 130111 is provided at a lower portion of a housing 130110 of the rear projection display device 130100, and projects incident light which projects an image based on a video signal to the mirror 130112. The rear projection display device 130100 displays an image projected from a rear surface of the screen panel 130101.

Figure 79:
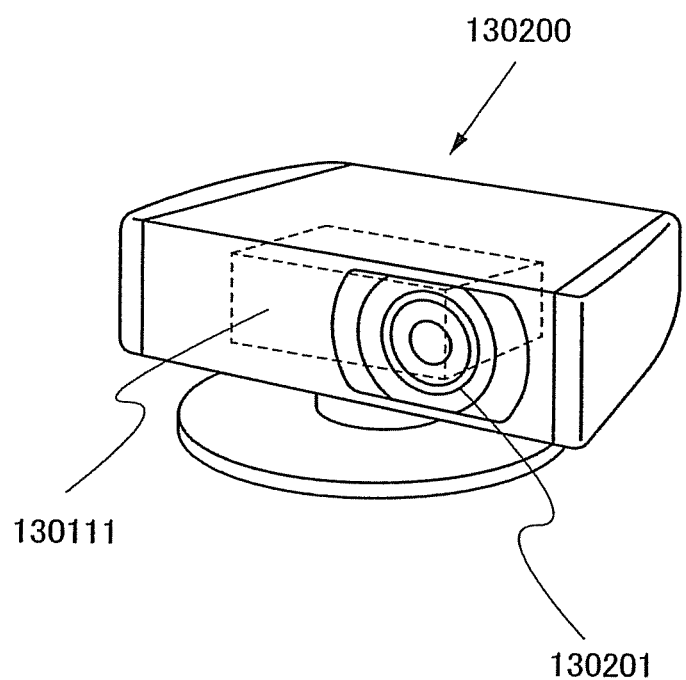
FIG. 79 is a view illustrating an example of a structure of a semiconductor device in accordance with the present invention.

FIG. 79 shows a front projection display device 130200. The front projection display device 130200 is provided with the projector unit 130111 and a projection optical system 130201. The projection optical system 130201 projects an image to a screen or the like provided at the front.

Hereinafter, a structure of the projector unit 130111 which is applied to the rear projection display device 130100 in FIGS. 78A and 78B and the front projection display device 130200 in FIG. 79 is described.

Figure 80:
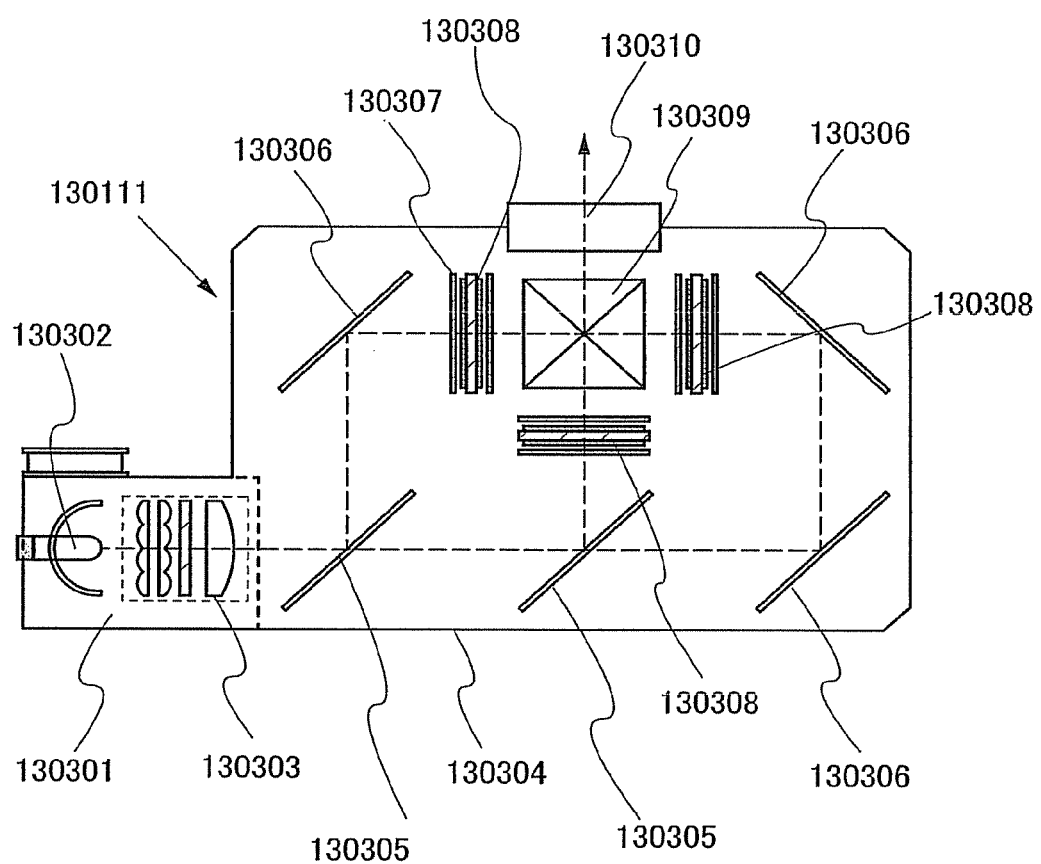
FIG. 80 is a view illustrating an example of a structure of a semiconductor device in accordance with the present invention.

FIG. 80 shows a structure example of the projector unit 130111. The projector unit 130111 is provided with a light source unit 130301 and a modulation unit 130304. The light source unit 130301 is provided with a light source optical system 130303 including lenses and a light source lamp 130302. The light source lamp 130302 is stored in a housing so that stray light is not scattered. As the light source lamp 130302, a high-pressure mercury lamp or a xenon lamp, for example, which can emit a large amount of light is used. The light source optical system 130303 is provided with an optical lens, a film having a function of polarizing light, a film for adjusting phase difference, an IR film, or the like as appropriate. The light source unit 130301 is provided so that emitted light is incident on the modulation unit 130304. The modulation unit 130304 is provided with a plurality of display panels 130308, a color filter, a dichroic mirror 130305, a total reflection mirror 130306, a retardation plate 130307, a prism 130309, and a projection optical system 130310. Light emitted from the light source unit 130301 is split into a plurality of optical paths by the dichroic mirror 130305.

Each optical path is provided with the display panel 130308 and a color filter which transmits light with a predetermined wavelength or wavelength range. The transmissive display panel 130308 modulates transmitted light based on a video signal. Light of each color transmitted through the display panel 130308 is incident on the prism 130309, and an image is displayed on a screen through the projection optical system 130310. Note that a Fresnel lens may be provided between the mirror and the screen. Projected light which is projected by the projector unit 130111 and reflected by the mirror is converted into generally parallel light by the Fresnel lens to be projected on the screen. Displacement between a chief ray and an optical axis of the parallel light is preferably ±10° or less, and more preferably, ±5° or less.

Figure 81:
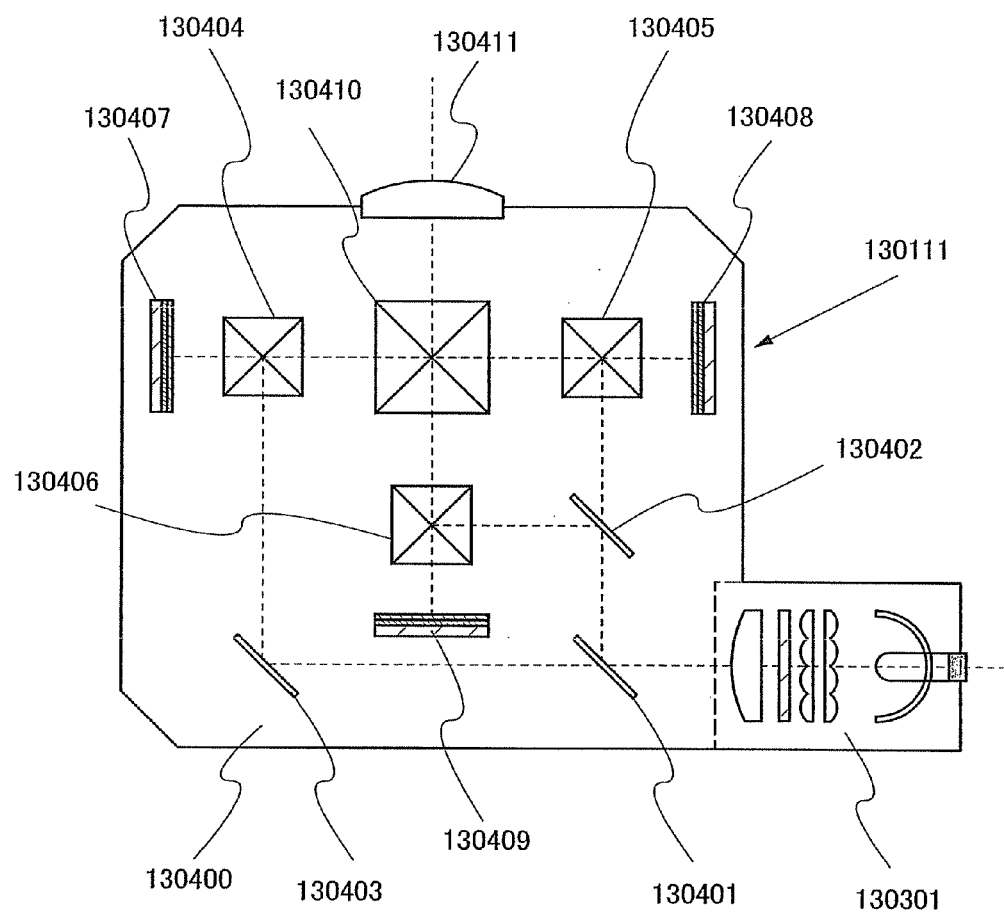
FIG. 81 is a view illustrating an example of a structure of a semiconductor device in accordance with the present invention.

FIG. 81 shows the projector unit 130111 provided with reflective display panels 130407, 130408, and 130409. Reference Numeral 130410 is a prism.

The projector unit 130111 in FIG. 81 is provided with the light source unit 130101 and a modulation unit 130400. The light source unit 130101 may have a structure similar to FIG. 80. Light from the light source unit 130101 is split into a plurality of optical paths by dichroic mirrors 130401 and 130402 and a total reflection mirror 130403 to be incident on polarization beam splitters 130404, 130405, and 130406. The polarization beam splitters 130404, 130405, and 130406 are provided corresponding to the reflective display panels 130407, 130408, and 130409 which correspond to respective colors. The reflective display panels 130407, 130408, and 130409 modulate reflected light based on a video signal. Light of each color which is reflected by the reflective display panels 130407, 130408, and 130409 is incident on the prism 130109 to be synthesized, and projected through a projection optical system 130411.

Among light emitted from the light source unit 130101, only light in a wavelength region of red is transmitted through the dichroic mirror 130401 and light in wavelength regions of green and blue is reflected by the dichroic mirror 130401. Further, only the light in the wavelength region of green is reflected by the dichroic mirror 130402. The light in the wavelength region of red, which is transmitted through the dichroic mirror 130401, is reflected by the total reflection mirror 130403 and incident on the polarization beam splitter 130404. The light in the wavelength region of blue is incident on the polarization beam splitter 130405. The light in the wavelength region of green is incident on the polarization beam splitter 130406. The polarization beam splitters 130404, 130405, and 130406 have a function of splitting incident light into p-polarized light and s-polarized light and a function of transmitting only p-polarized light. The reflective display panels 130407, 130408, and 130409 polarize incident light based on a video signal.

Only s-polarized light corresponding to each color is incident on the reflective display panels 130407, 130408, and 130409 corresponding to each color. Note that the reflective display panels 130407, 130408, and 130409 may be liquid crystal panels. In this case, the liquid crystal panel operates in an electrically controlled birefringence (ECB) mode. Liquid crystal molecules are vertically aligned with respect to a substrate at a certain angle. Accordingly, in the reflective display panels 130407, 130408, and 130409, when a pixel is in an off state, display molecules are aligned so as not to change a polarization state of incident light but to reflect the incident light. When the pixel is in an on state, alignment of the display molecules is changed, and the polarization state of the incident light is changed.

The projector unit 130111 in FIG. 81 can be applied to the rear projection display device 130100 in FIGS. 78A and 78B and the front projection display device 130200 in FIG. 79.

Figure 82A:
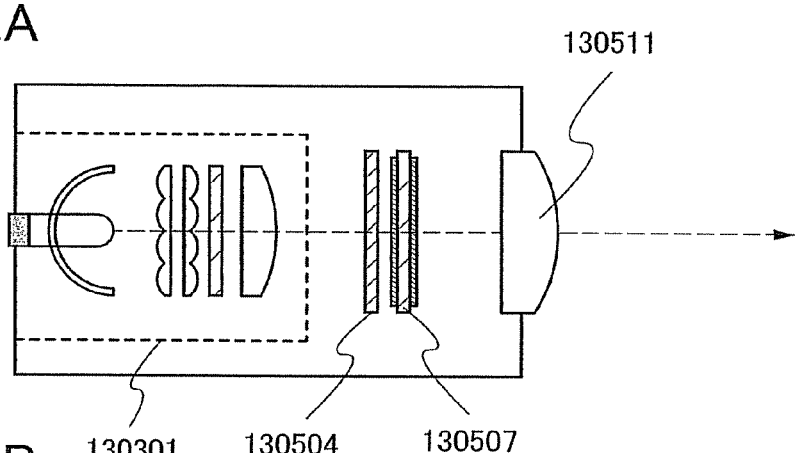
FIGS. 82A to 82C are views each illustrating an example of a structure of a semiconductor device in accordance with the present invention.
Figure 82B:
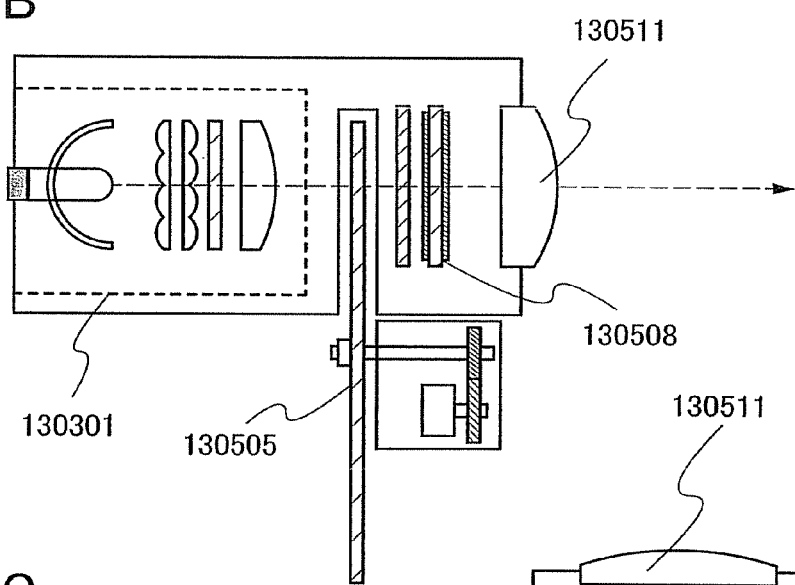
Figure 82C:
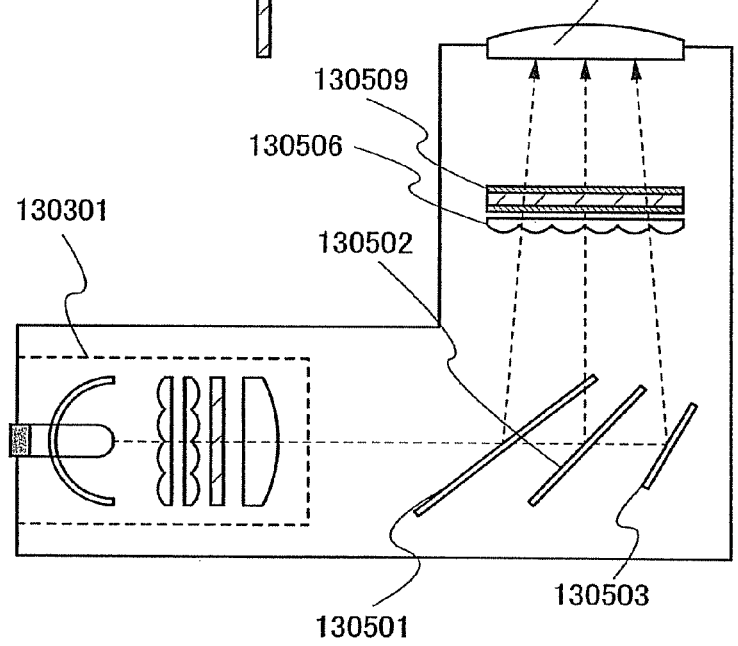

FIGS. 82A to 82C show single-panel type projector units. The projector unit shown in FIG. 82A is provided with the light source unit 130301, a display panel 130507, a projection optical system 130511, and a retardation plate 130504. The projection optical system 130511 includes one or a plurality of lenses. The display panel 130507 may be provided with a color filter.

FIG. 82B shows a structure of a projector unit operating in a field sequential mode. A field sequential mode refers to a mode in which color display is performed by light of respective colors such as red, green, and blue sequentially incident on a display panel with a time lag, without a color filter. High-definition image can be displayed particularly by combination with a display panel with high-speed response to change in input signal. In FIG. 82B, a rotating color filter plate 130505 including a plurality of color filters with red, green, blue, or the like is provided between the light source unit 130301 and a display panel 130508.

FIG. 82C shows a structure of a projector unit with a color separation method using a micro lens, as a color display method. This method corresponds to a method in which color display is realized by providing a micro lens array 130506 on a light incident side of a display panel 130509 and light of each color is lit from each direction. The projector unit employing this method has little loss of light due to a color filter, so that light from the light, source unit 130301 can be efficiently utilized. The projector unit in FIG. 82C is provided with dichroic mirrors 130501, 130502, and 130503 so that light of each color is lit to the display panel 130509 from each direction.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 15

In this embodiment mode, an operation of a display device is described.

Figure 83:
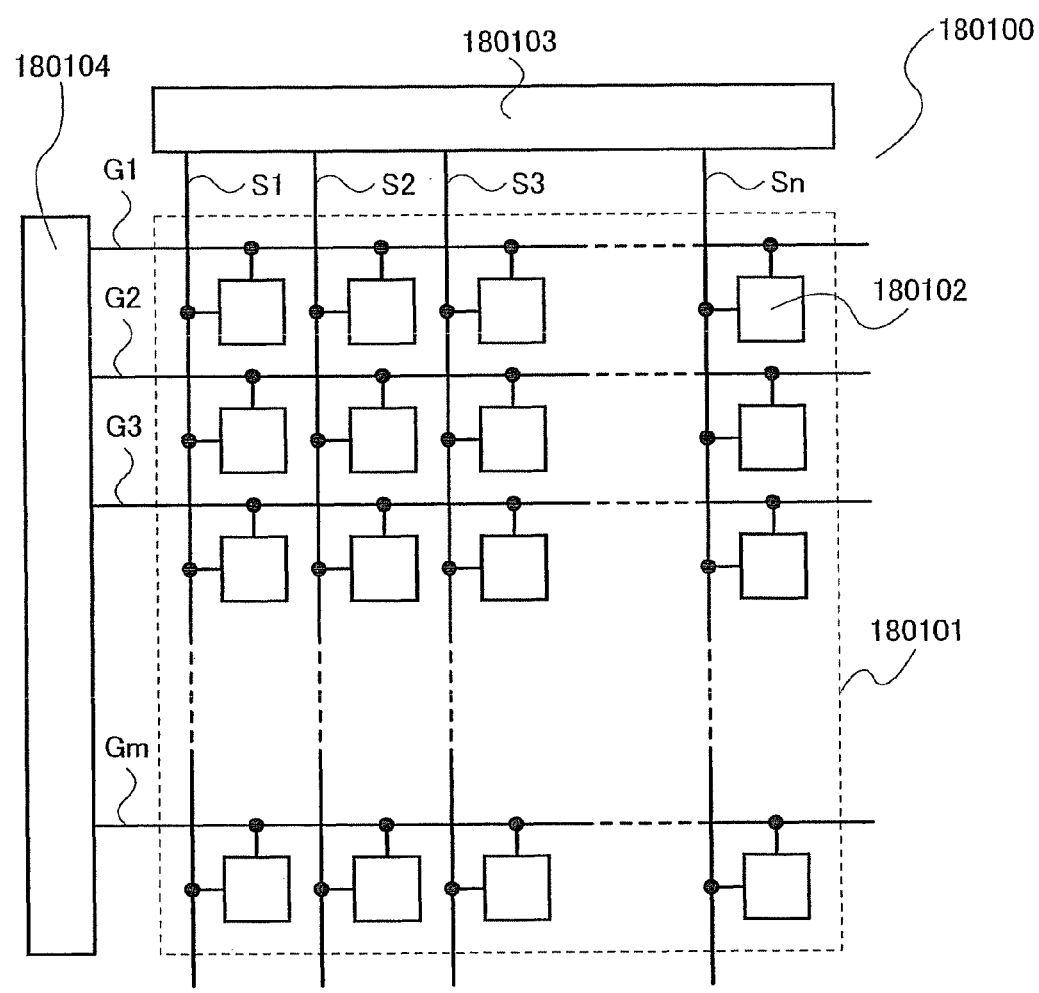
FIG. 83 is a diagram illustrating an example of a circuit structure of a semiconductor device in accordance with the present invention.

FIG. 83 shows a structure example of a display device.

A display device 180100 includes a pixel portion 180101, a signal line driver circuit 180103, and a scan line driver circuit 180104. In the pixel portion 180101, a plurality of signal lines S1 to Sn extend from the signal line driver circuit 180103 in a column direction. In the pixel portion 180101, a plurality of scan lines G1 to Gm extend from the scan line driver circuit 180104 in a row direction. Pixels 180102 are arranged in matrix at each intersection of the plurality of signal lines S1 to Sn and the plurality of scan lines G1 to Gm.

The signal line driver circuit 180103 has a function of outputting a signal to each of the signal lines S1 to Sn. This signal may be referred to as a video signal. The scan line driver circuit 180104 has a function of outputting a signal to each of the scan lines G1 to Gm. This signal may be referred to as a scan signal.

The pixel 180102 includes at least a switching element connected to the signal line. On/off of the switching element is controlled by a potential of a scan line (a scan signal). When the switching element is turned on, the pixel 180102 is selected. On the other hand, when the switching element is turned off, the pixel 180102 is not selected.

When the pixel 180102 is selected (a selection state), a video signal is input to the pixel 180102 from the signal line. A state (e.g., luminance, transmittance, or voltage of a storage capacitor) of the pixel 180102 is changed in accordance with the video signal input.

When the pixel 180102 is not selected (a non-selection state), the video signal is not input to the pixel 180102. Note that the pixel 180102 holds a potential corresponding to the video signal which is input when selected; thus, the pixel 180102 maintains the state (e.g., luminance, transmittance, or voltage of a storage capacitor) in accordance with the video signal.

Note that a structure of the display device is not limited to that shown in FIG. 83. For example, an additional wiring (such as a scan line, a signal line, a power supply line, a capacitor line, or a common line) may be added in accordance with the structure of the pixel 180102. As another example, a circuit having various functions may be added.

Figure 84:
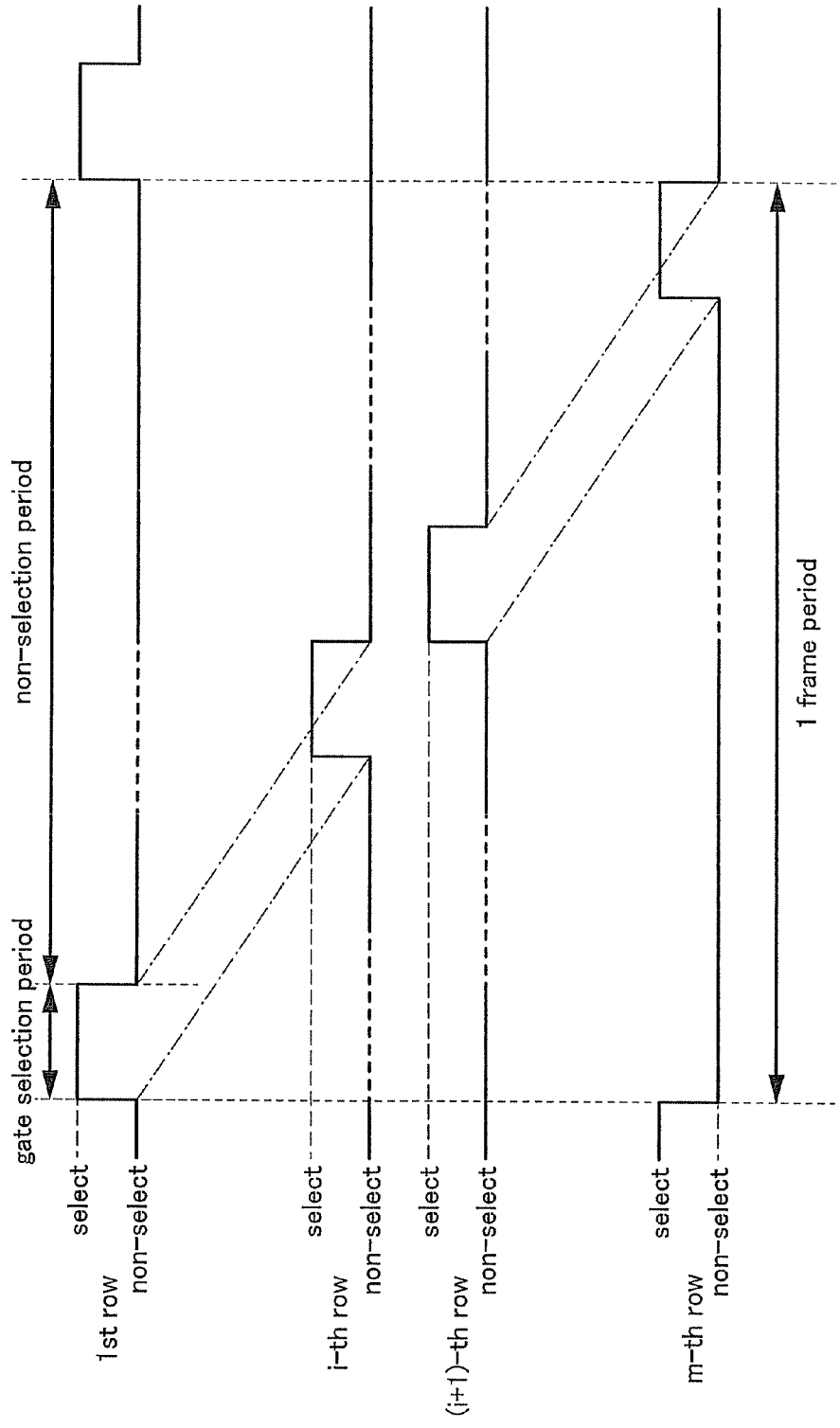
FIG. 84 is a diagram illustrating an example of a timing chart of a semiconductor device in accordance with the present invention.

FIG. 84 shows an example of a timing chart for describing an operation of a display device.

The timing chart of FIG. 84 shows one frame period corresponding to a period when an image of one screen is displayed. One frame period is not particularly limited, but one frame period is preferably 1/60 second or less so that a viewer does not perceive a flicker.

The timing chart of FIG. 84 shows timing for selecting the scan line G1 in the first row, the scan line Gi (one of the scan lines G1 to Gm) in the i-th row, the scan line Gi+1 in the (i+1)th row, and the scan line Gm in the m-th row.

At the same time as the scan line is selected, the pixel 180102 connected to the scan line is also selected. For example, when the scan line Gi in the i-th row is selected, the pixel 180102 connected to the scan line Gi in the i-th row is also selected.

The scan lines G1 to Gm are sequentially selected (hereinafter also referred to as scanned) from the scan line G1 in the first row to the scan line Gm in the m-th row. For example, while the scan line Gi in the i-th row is selected, the scan lines (G1 to Gi−1 and Gi+1 to Gm) other than the scan line Gi in the i-th row are not selected. Then, during the next period, the scan line Gi+1 in the (i+1)th row is selected. Note that a period during which one scan line is selected is referred to as one gate selection period.

Accordingly, when a scan line in a certain row is selected, video signals from the signal lines S1 to Sn are input to a plurality of pixels 180102 connected to the scan line, respectively. For example, while the scan line Gi in the i-th row is selected, given video signals from the signal lines S1 to Sn are input to the plurality of pixels 180102 connected to the scan line Gi in the i-th row, respectively. Thus, each of the plurality of pixels 180102 can be controlled individually by the scan signal and the video signal.

Next, the case where one gate selection period is divided into a plurality of subgate selection periods is described.

Figure 85:
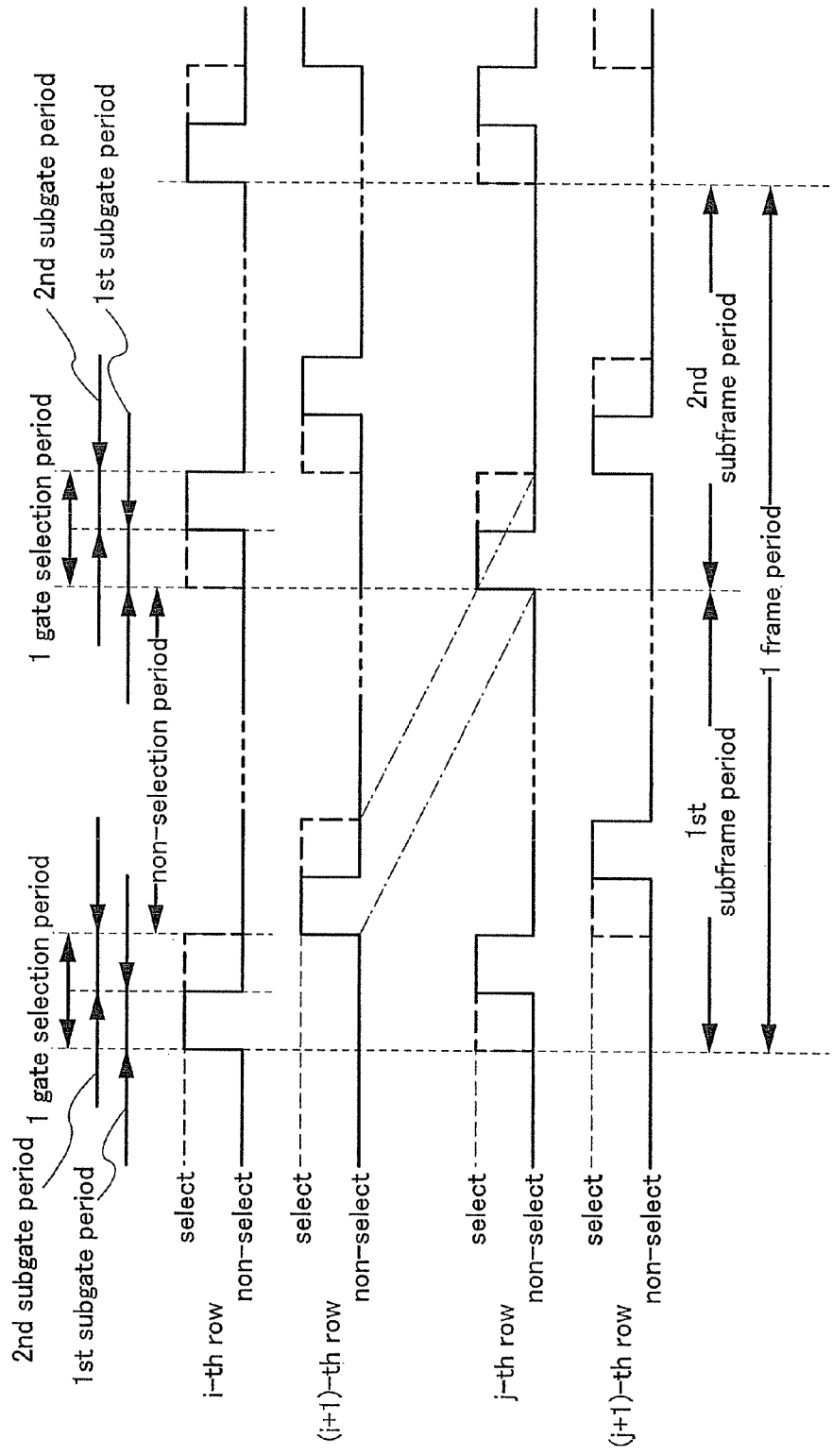
FIG. 85 is a diagram illustrating an example of a timing chart of a semiconductor device in accordance with the present invention.

FIG. 85 is a timing chart in the case where one gate selection period is divided into two subgate selection periods (a first subgate selection period and a second subgate selection period).

Note that one gate selection period may be divided into three or more subgate selection periods.

The timing chart of FIG. 85 shows one frame period corresponding to a period when an image of one screen is displayed. One frame period is not particularly limited, but one frame period is preferably 1/60 second or less so that a viewer does not perceive a flicker.

One frame is divided into two subframes (a first subframe and a second subframe).

The timing chart of FIG. 85 shows timing for selecting the scan line Gi in the i-th row, the scan line Gi+1 in the (i+1)th row, the scan line Gj (one of the scan lines Gi+1 to Gm) in the j-th row, and the scan line Gj+1 in the (j+1)th row.

At the same time as the scan line is selected, the pixel 180102 connected to the scan line is also selected. For example, when the scan line Gi in the i-th row is selected, the pixel 180102 connected to the scan line Gi in the i-th row is also selected.

The scan lines G1 to Gm are sequentially scanned in each subgate selection period. For example, in one gate selection period, the scan line Gi in the i-th row is selected in the first subgate selection period, and the scan line Gj in the j-th row is selected in the second subgate selection period. Thus, in one gate selection period, an operation can be performed as if the scan signals of two rows are selected. At this time, different video signals are input to the signal lines S1 to Sn in the first subgate selection period and the second subgate selection period. Accordingly, different video signals can be input to a plurality of pixels 180102 connected to the i-th row and a plurality of pixels 180102 connected to the j-th row.

Next, a driving method for displaying images with high quality is described.

Figure 86A:
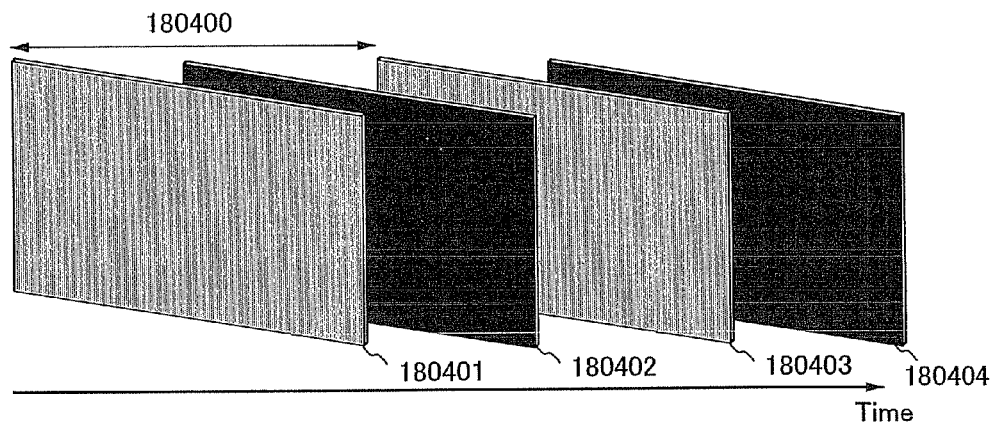
FIGS. 86A and 86B are views each illustrating an example of a driving method of a semiconductor device in accordance with the present invention.
Figure 86B:
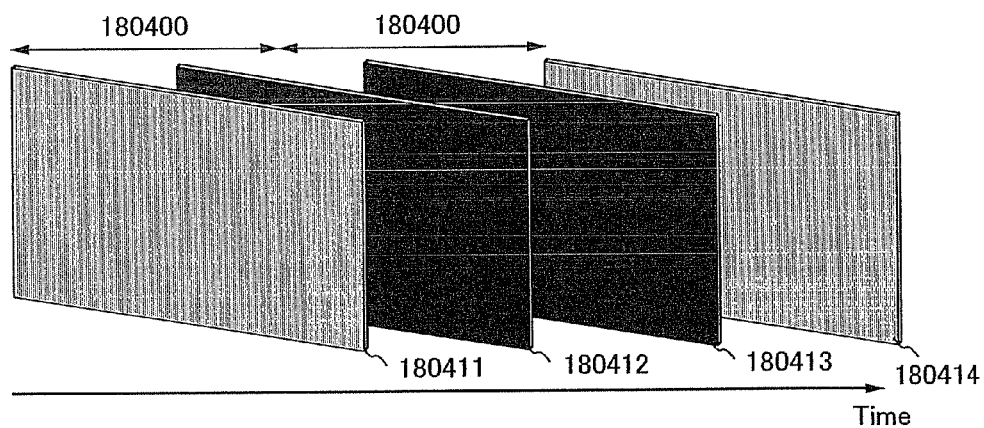

FIGS. 86A and 86B are views for describing high frequency driving.

FIG. 86A shows the case where one image and one intermediate image are displayed in one frame period 180400. Reference numerals 180401, 180402, 180403, and 180404 denote an image of one frame, an intermediate image of the frame, an image of the next frame, and an intermediate image of the next frame, respectively.

The intermediate image 180402 of the frame may be made based on image signals of the frame and the next frame. Alternatively, the intermediate image 180402 of the frame may be formed from the image 180401 of the frame, or may be a black image. Accordingly, the quality of a moving image in a hold-type display device can be improved. Further, when one image and one intermediate image are displayed in one frame period 180400, there is an advantage in that consistency with a frame rate of the video signal can be easily obtained and an image processing circuit is not complicated.

FIG. 86B shows the case where one image and two intermediate images are displayed in a period with two successive one frame periods 180400 (two frame periods). Reference numeral 180411, 180412, 180413, and 180414 denote an image of the frame, an intermediate image of the frame, an intermediate image of the next frame, an image of a frame after next, respectively.

Each of the intermediate image 180412 of the frame and the intermediate image 180413 of the next frame may be made based on video signals of the frame, the next frame, and the frame after next. Alternatively, each of the intermediate image 180412 of the frame and the intermediate image 180413 of the next frame may be a black image. When one image and two intermediate images are displayed in two frame periods, there is an advantage in that operating frequency of a peripheral driver circuit is not so high and image quality of a moving image can be effectively improved.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 16

In this embodiment mode, a structure of an EL element is described. In particular, a structure of an organic EL element is described.

A structure of a mixed junction EL element is described. As an example, a structure is described, which includes a layer (a mixed layer) in which a plurality of materials among a hole injecting material, a hole transporting material, a light-emitting material, an electron transporting material, an electron injecting material, and the like are mixed (hereinafter referred to as a mixed junction type EL element), which is different from a stacked-layer structure where a hole injecting layer formed of a hole injecting material, a hole transporting layer formed of a hole transporting material, a light-emitting layer formed of a light-emitting material, an electron transporting layer formed of an electron transporting material, an electron injecting layer formed of an electron injecting material, and the like are clearly distinguished.

FIGS. 87A to 87E are schematic views each showing a structure of a mixed junction type EL element. Note that a layer interposed between an anode 190101 and a cathode 190102 corresponds to an EL layer.

Figure 87A:
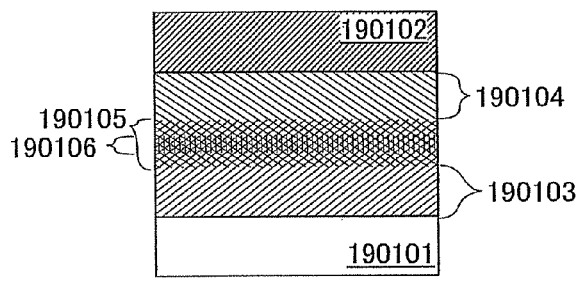
FIGS. 87A to 87E are cross-sectional views each illustrating an example of a display element of a semiconductor device in accordance with the present invention.

FIG. 87A shows a structure in which an EL layer includes a hole transporting region 190103 formed of a hole transporting material and an electron transporting region 190104 formed of an electron transporting material. The hole transporting region 190103 is closer to the anode than the electron transporting region 190104. A mixed region 190105 including both the hole transporting material and the electron transporting material is provided between the hole transporting region 190103 and the electron transporting region 190104.

In a direction from the anode 190101 to the cathode 190102, a concentration of the hole transporting material in the mixed region 190105 is decreased and a concentration of the electron transporting material in the mixed region 190105 is increased.

A concentration gradient can be freely set. For example, a ratio of concentrations of each functional material may be changed (a concentration gradient may be formed) in the mixed region 190105 including both the hole transporting material and the electron transporting material, without including the hole transporting layer 190103 formed of only the hole transporting material. Alternatively, a ratio of concentrations of each functional material may be changed (a concentration gradient may be formed) in the mixed region 190105 including both the hole transporting material and the electron transporting material, without including the hole transporting layer 190103 formed of only the hole transporting material and the electron transporting layer 190104 formed of only the electron transporting material. Further alternatively, a ratio of concentrations may be changed depending on a distance from the anode or the cathode. Note that the ratio of concentrations may be changed continuously.

A region 190106 to which a light-emitting material is added is included in the mixed region 190105. A light emission color of the EL element can be controlled by the light-emitting material. Further, carriers can be trapped by the light-emitting material. As the light-emitting material, various fluorescent dyes as well as a metal complex having a quinoline backbone, a benzoxazole backbone, or a benzothiazole backbone can be used. The light emission color of the EL element can be controlled by adding the light-emitting material.

As the anode 190101, an electrode material having a high work function is preferably used in order to inject holes efficiently. For example, a transparent electrode formed of indium tin oxide (ITO), indium zinc oxide (IZO), ZnO, $SnO_2$, $In_2O_3$, or the like can be used. When a transparency is not needed, the anode 190101 may be formed of an opaque metal material.

As the hole transporting material, an aromatic amine compound or the like can be used.

As the electron transporting material, a metal complex having a quinoline derivative, 8-quinolinol, or a derivative thereof as a ligand (especially tris(8-quinolinolato)aluminum ($Alq_3$)), or the like can be used.

As the cathode 190102, an electrode material having a low work function is preferably used in order to inject electrons efficiently. A metal such as aluminum, indium, magnesium, silver, calcium, barium, or lithium can be used by itself. Alternatively, an alloy of the aforementioned metal or an alloy of the aforementioned metal and another metal may be used.

Figure 87B:
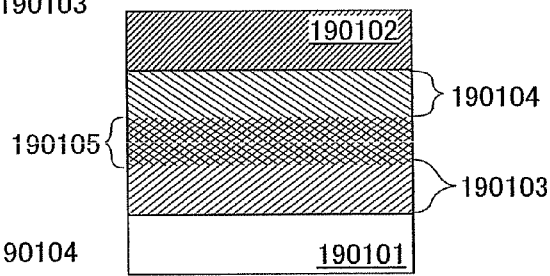

FIG. 87B is the schematic view of the structure of the EL element, which is different from that of FIG. 87A. Note that the same portions as those in FIG. 87A are denoted by the same reference numerals, and description thereof is omitted.

In FIG. 87B, a region to which a light-emitting material is added is not included. However, when a material (electron-transporting and light-emitting material) having both an electron transporting property and a light-emitting property, for example, tris(8-quinolinolato)aluminum ($Alq_3$) is used as a material added to the electron transporting region 190104, light emission can be performed.

Alternatively, as a material added to the hole transporting region 190103, a material (a hole-transporting and light-emitting material) having both a hole transporting property and a light-emitting property may be used.

Figure 87C:
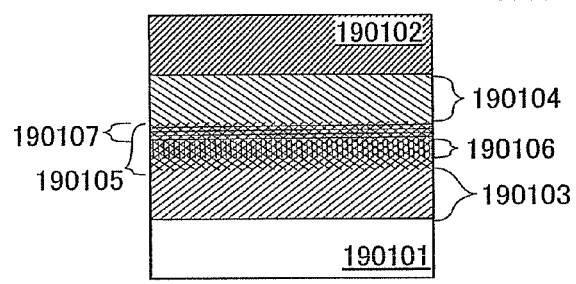

FIG. 87C is the schematic view of the structure of the EL element, which is different from those of FIGS. 87A and 87B. Note that the same portions as those in FIGS. 87A and 87B are denoted by the same reference numerals, and description thereof is omitted.

In FIG. 87C, a region 190107 included in the mixed region 190105 is provided, to which a hole blocking material having a larger energy difference between the highest occupied molecular orbital and the lowest unoccupied molecular orbital than the hole transporting material is added. The region 190107 to which the hole blocking material is added is provided closer to the cathode 190102 than the region 190106 in the mixed region 190105, to which the light-emitting material is added; thus, a recombination rate of carriers can be increased, and light emission efficiency can be increased. The structure provided with the region 190107 to which the hole blocking material is added is especially effective in an EL element which utilizes light emission (phosphorescence) by a triplet exciton.

Figure 87D:
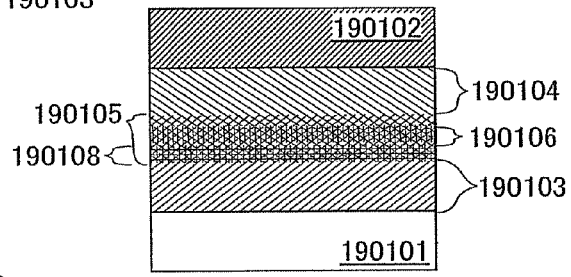

FIG. 87D is the schematic view of the structure of the EL element, which is different from those of FIGS. 87A to 87C. Note that the same portions as those in FIGS. 87A to 87C are denoted by the same reference numerals, and description thereof is omitted.

In FIG. 87D, a region 190108 included in the mixed region 190105 is provided, to which an electron blocking material having a larger energy difference between the highest occupied molecular orbital and the lowest unoccupied molecular orbital than the electron transporting material is added. The region 190108 to which the electron blocking material is added is provided closer to the anode 190101 than the region 190106 in the mixed region 190105, to which the light-emitting material is added; thus, a recombination rate of carriers can be increased, and light emission efficiency can be increased. The structure provided with the region 190108 to which the electron blocking material is added is especially effective in an EL element which utilizes light emission (phosphorescence) by a triplet exciton.

Figure 87E:
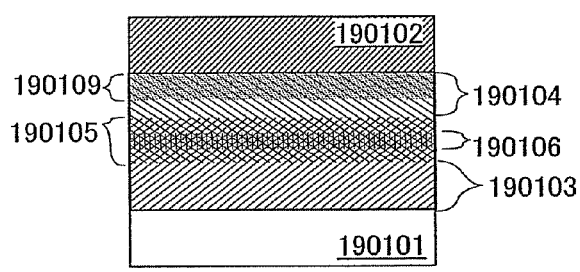

FIG. 87E is the schematic view of the structure of the mixed junction type EL element, which is different from those of FIGS. 87A to 87D. FIG. 87E shows an example of a structure where a region 190109 to which a metal material is added is included in part of an EL layer in contact with an electrode of the EL element. In FIG. 87E, the same portions as those in FIGS. 87A to 87D are denoted by the same reference numerals, and description thereof is omitted. In the structure shown in FIG. 87E, MgAg (an Mg—Ag alloy) may be used as the cathode 190102, and the region 190109 to which an Al (aluminum) alloy is added may be included in a region of the electron transporting region 190104 to which the electron transporting material is added, which is in contact with the cathode 190102, for example. By the aforementioned structure, oxidation of the cathode can be prevented, and electron injection efficiency from the cathode can be increased. Accordingly, the lifetime of the mixed junction type EL element can be extended. Further, driving voltage can be lowered.

As a method of forming the mixed junction type EL element, a co-evaporation method or the like can be used.

In the mixed junction type EL elements as shown in FIGS. 87A to 87E, a clear interface between the layers does not exist, and charge accumulation can be reduced. Accordingly, the lifetime of the EL element can be extended, and a driving voltage can be lowered.

Note that the structures shown in FIGS. 87A to 87E can be implemented in free combination with each other.

A structure of the mixed junction type EL element is not limited to those described above. A known structure can be freely used.

An organic material which forms an EL layer of an EL element may be a low molecular material or a high molecular material. Alternatively, both of the materials may be used. When a low molecular material is used as an organic compound material, a film can be formed by an evaporation method. When a high molecular material is used as the EL layer, the high molecular material is dissolved in a solvent and a film can be formed by a spin coating method or an inkjet method.

The EL layer may be formed of a middle molecular material. In this specification, a middle molecule organic light-emitting material refers to an organic light-emitting material without a sublimation property and with a polymerization degree of approximately 20 or less. When a middle molecular material is used as the EL layer, a film can be formed by an inkjet method or the like.

Note that a low molecular material, a high molecular material, and a middle molecular material may be used in combination.

An EL element may utilize either light emission (fluorescence) by a singlet exciton or light emission (phosphorescence) by a triplet exciton.

Next, an evaporation device for forming a display device applicable to the invention is described with reference to drawings.

A display device applicable to the invention may be manufactured to include an EL layer. The EL layer is formed including at least partially a material which exhibits electroluminescence. The EL layer may be formed of a plurality of layers having different functions. In this case, the EL layer may be formed of a combination of layers having different functions, which are also called a hole injecting and transporting layer, a light-emitting layer, an electron injecting and transporting layer, and the like.

Figure 88:
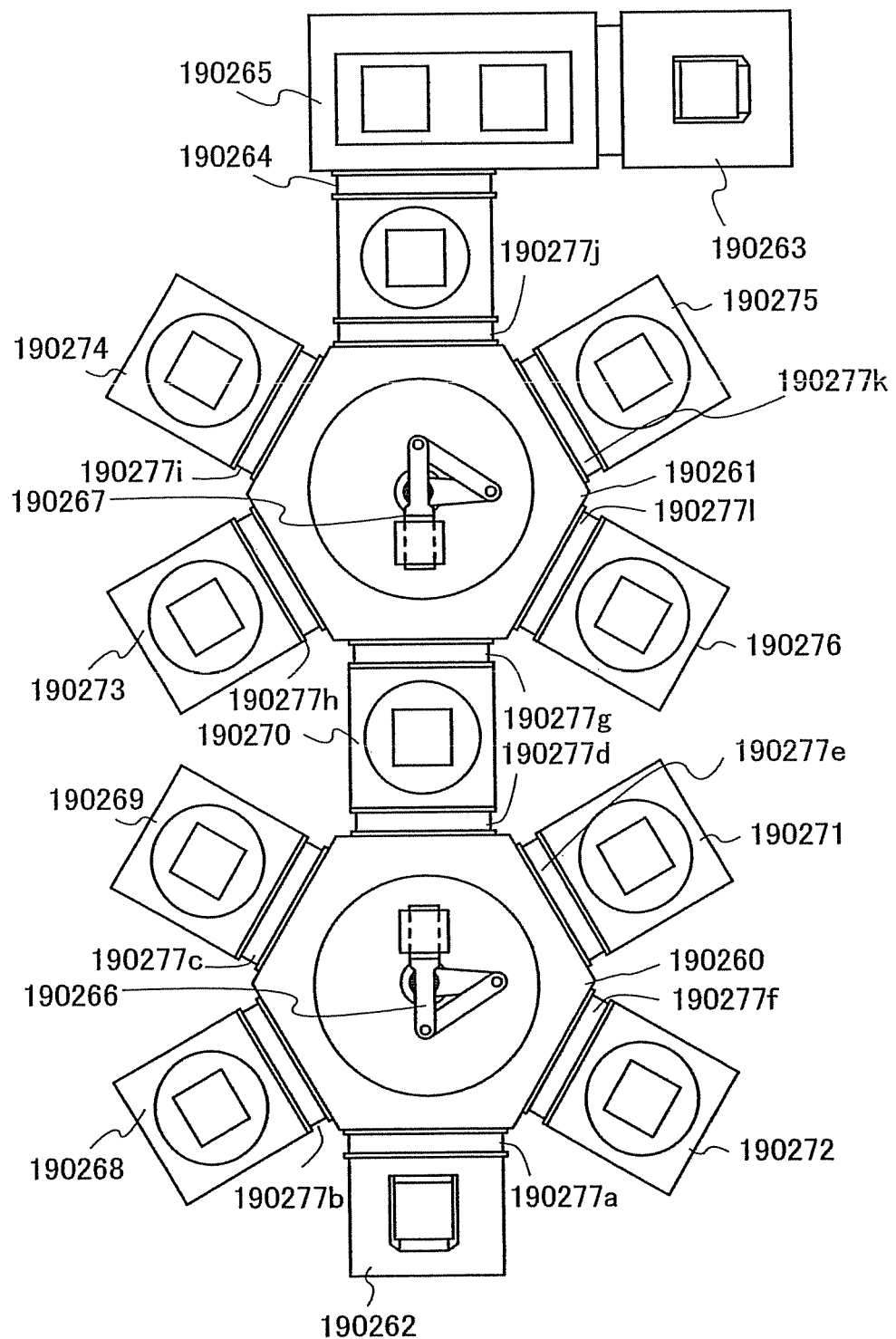
FIG. 88 is a view illustrating an example of a manufacturing apparatus of a semiconductor device in accordance with the present invention.

FIG. 88 shows a structure of an evaporation apparatus for forming an EL layer over an element substrate provided with a transistor. In the evaporation apparatus, a plurality of treatment chambers are connected to transfer chambers 190260 and 190261. Each treatment chamber includes a loading chamber 190262 for supplying a substrate, an unloading chamber 190263 for collecting the substrate, a heat treatment chamber 190268, a plasma treatment chamber 190272, deposition treatment chambers 190269 to 190271, 190273 to 190275 for depositing an EL material, and a deposition treatment chamber 190276 for forming a conductive film formed of aluminum or containing aluminum as its main component as one electrode of an EL element. Gate valves 190277*a* to 190277*l* are provided between the transfer chambers and the treatment chambers, so that the pressure in each treatment chamber can be controlled independently, and cross contamination between the treatment chambers is prevented.

A substrate introduced into the transfer chamber 190260 from the loading chamber 190262 is transferred to a predetermined treatment chamber by an arm type transfer means 190266 capable of rotating. The substrate is transferred from a certain treatment chamber to another treatment chamber by the transfer means 190266. The transfer chambers 190260 and 190261 are connected by the deposition treatment chamber 190270 at which the substrate is delivered by the transfer means 190266 and a transfer means 190267.

Each treatment chamber connected to the transfer chambers 190260 and 190261 is maintained in a reduced pressure state. Accordingly, in the evaporation apparatus, deposition treatment of an EL layer is continuously performed without exposing the substrate to the room air. A display panel in which formation of the EL layer is finished is deteriorated due to moisture or the like in some cases. Accordingly, in the evaporation apparatus, a sealing treatment chamber 190265 for performing sealing treatment before exposure to the room air in order to maintain quality is connected to the transfer chamber 190261. Since the sealing treatment chamber 190265 is under atmospheric pressure or reduced pressure near atmosphere pressure, an intermediate treatment chamber 190264 is also provided between the transfer chamber 190261 and the sealing treatment chamber 190265. The intermediate treatment chamber 190264 is provided for delivering the substrate and buffering the pressure between the chambers.

An exhaust means is provided in the loading chamber, the unloading chamber, the transfer chamber, and the deposition treatment chamber in order to maintain reduced pressure in the chamber. As the exhaust means, various vacuum pumps such as a dry pump, a turbo-molecular pump, and a diffusion pump can be used.

In the evaporation apparatus of FIG. 88, the number of treatment chambers connected to the transfer chambers 190260 and 190261 and structures thereof can be combined as appropriate in accordance with a stacked-layer structure of the EL element. An example of a combination is described below.

In the heat treatment chamber 190268, degasification treatment is performed by heating a substrate over which a lower electrode, an insulating partition wall, or the like is formed. In the plasma treatment chamber 190272, a surface of the lower electrode is treated with a rare gas or oxygen plasma. This plasma treatment is performed for cleaning the surface, stabilizing a surface state, or stabilizing a physical or chemical state (e.g., a work function) of the surface.

The deposition treatment chamber 190269 is for forming an electrode buffer layer which is in contact with one electrode of the EL element. The electrode buffer layer has a carrier injection property (hole injection or electron injection) and suppresses generation of a short-circuit or a black spot defect of the EL element. Typically, the electrode buffer layer is formed of an organic-inorganic hybrid material, has a resistivity of $5 \times 10^4$ to $1 \times 10^6$ $\Omega$cm, and is formed having a thickness of 30 to 300 nm. Note that the deposition treatment chamber 190271 is for forming a hole transporting layer.

A light-emitting layer in an EL element has a different structure between the case of emitting single color light and the case of emitting white light. A deposition treatment chamber in the evaporation apparatus is preferably provided depending on the structure. For example, when three kinds of EL elements each having a different light emission color are formed in a display panel, it is necessary to form light-emitting layers corresponding to respective light emission colors. In this case, the deposition treatment chamber 190270 can be used for forming a first light-emitting layer, the deposition treatment chamber 190273 can be used for forming a second light-emitting layer, and the deposition treatment chamber 190274 can be used for forming a third light-emitting layer. By using different deposition treatment chambers for respective light-emitting layers, cross contamination due to different light-emitting materials can be prevented, and throughput of the deposition treatment can be improved.

Note that three kinds of EL elements each having a different light emission color may be sequentially deposited in each of the deposition treatment chambers 190270, 190273, and 190274. In this case, evaporation is performed by moving a shadow mask in accordance with a region to be deposited.

When an EL element which emits white light is formed, the EL element is formed by vertically stacking light-emitting layers of different light emission colors. In this case also, the element substrate can be transferred through the deposition treatment chambers sequentially to form each light-emitting layer. Alternatively, different light-emitting layers can be formed continuously in the same deposition treatment chamber.

In the deposition treatment chamber 190276, an electrode is formed over the EL layer. The electrode can be formed by an electron beam evaporation method or a sputtering method, and preferably by a resistance heating evaporation method.

The element substrate in which formation of the electrode is finished is transferred to the sealing treatment chamber 190265 through the intermediate treatment chamber 190264. The sealing treatment chamber 190265 is filled with an inert gas such as helium, argon, neon, or nitrogen, and a sealing substrate is attached to a side of the element substrate where the EL layer is formed under the atmosphere to be sealed. In a sealed state, a space between the element substrate and the sealing substrate may be filled with the inert gas or a resin material. The sealing treatment chamber 190265 is provided with a dispenser which provides a sealing material, a mechanical element such as an arm or a fixing stage which fixes the sealing substrate to face the element substrate, a dispenser or a spin coater which fills the chamber with a resin material, and the like.

Figure 89:
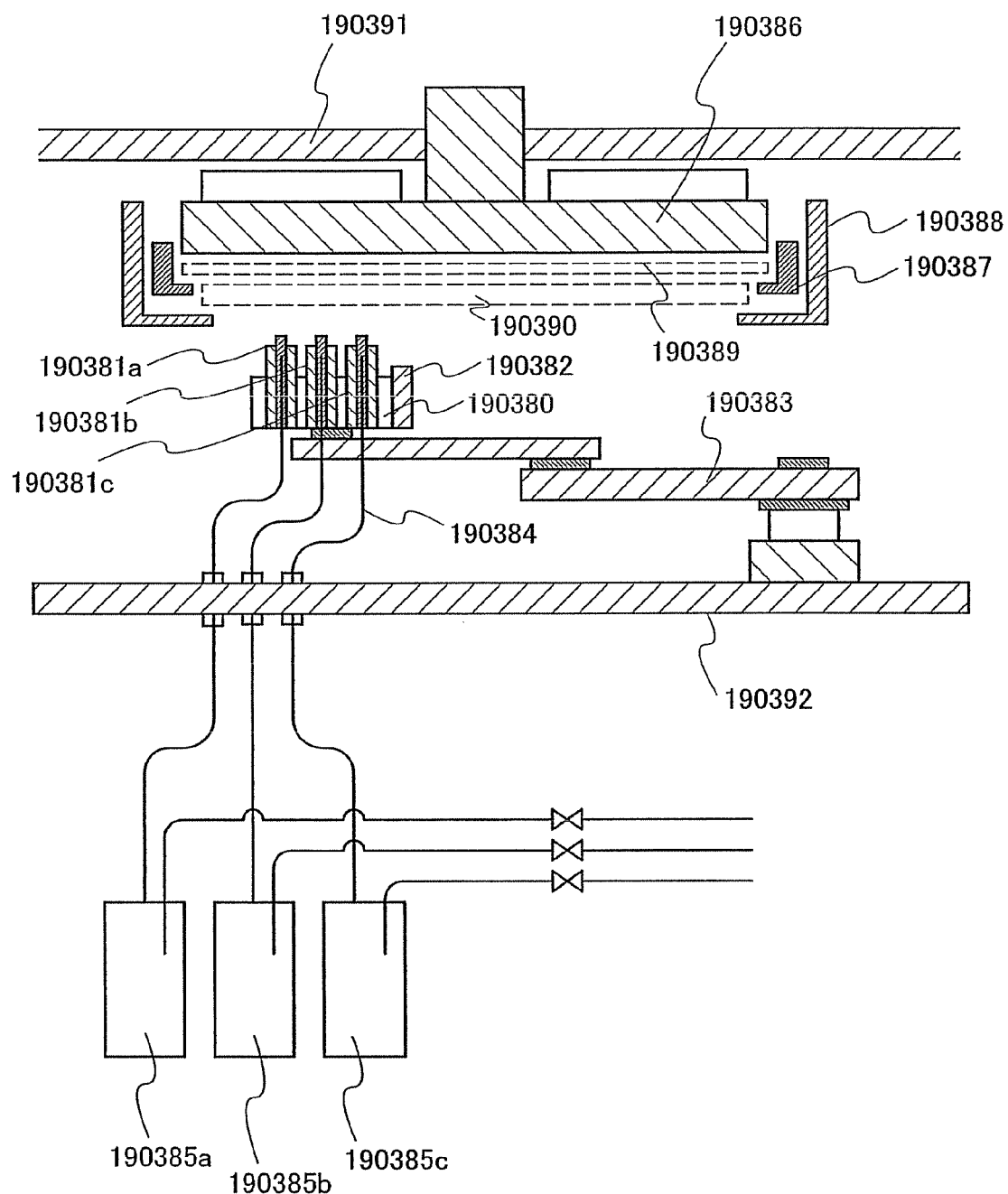
FIG. 89 is a view illustrating an example of a manufacturing device of a semiconductor device in accordance with the present invention.

FIG. 89 shows an internal structure of a deposition treatment chamber. The deposition treatment chamber is maintained in a reduced pressure state. In FIG. 89, a space interposed between a top plate 190391 and a bottom plate 190392 corresponds to an internal space of the chamber, which is maintained in a reduced pressure state.

One or a plurality of evaporation sources are provided in the treatment chamber. This is because a plurality of evaporation sources are preferably provided when a plurality of layers having different compositions are formed or when different materials are co-evaporated. In FIG. 89, evaporation sources 190381*a*, 190381*b*, and 190381*c* are attached to an evaporation source holder 190380. The evaporation source holder 190380 is held by a multi-joint arm 190383. The multi-joint arm 190383 allows the evaporation source holder 190380 to move within its movable range by stretching the joint. Alternatively, the evaporation source holder 190380 may be provided with a distance sensor 190382 to monitor a distance between the evaporation sources 190381*a* to 190381*c* and a substrate 190389 so that an optimal distance for evaporation may be controlled. In this case, the multi-joint arm may be capable of moving toward upper and lower directions (Z direction) as well.

The substrate 190389 is fixed by using a substrate stage 190386 and a substrate chuck 190387 together. The substrate stage 190386 may have a structure where a heater is incorporated so that the substrate 190389 can be heated. The substrate 190389 is transferred by tightening the substrate chuck 190387 while being fixed to the substrate stage 190386. At the time of evaporation, a shadow mask 190390 provided with an opening corresponding to a deposition pattern can be used when needed. In this case, the shadow mask 190390 is provided between the substrate 190389 and the evaporation sources 190381a to 190381c. The shadow mask 190390 is fixed to the substrate 190389 in close contact with each other or with a certain interval therebetween by a mask chuck 190388. When alignment of the shadow mask 190390 is needed, the alignment is performed by arranging a camera in the treatment chamber and providing the mask chuck 190388 with a positioning means which slightly moves in X-Y-θ directions.

The evaporation sources 190381a to 190381c include an evaporation material supply means which continuously supplies an evaporation material to the evaporation source. The evaporation material supply means includes evaporation material supply sources 190385a, 190385b, and 190385c, which are provided apart from the evaporation sources 190381a, 190381b, and 190381c, and a material supply pipe 190384 which connects between the evaporation source and the evaporation material supply source. Typically, the material supply sources 190385a to 190385c are provided corresponding to the evaporation sources 190381a to 190381c. In FIG. 89, the material supply source 190385a corresponds to the evaporation source 190381a, the material supply source 190385b corresponds to the evaporation source 190381b, and the material supply source 190385c corresponds to the evaporation source 190381c.

As a method for supplying an evaporation material, an airflow transfer method, an aerosol method, or the like can be employed. In an airflow transfer method, impalpable powder of an evaporation material is transferred in airflow to the evaporation sources 190381a to 190381c by using an inert gas or the like. In an aerosol method, evaporation is performed while material liquid in which an evaporation material is dissolved or dispersed in a solvent is transferred and aerosolized by an atomizer, and the solvent in the aerosol is vaporized. In each case, the evaporation sources 190381a to 190381c are provided with a heating means, and a film is formed over the substrate 190389 by vaporizing the evaporation material transferred thereto. In FIG. 89, the material supply pipe 190384 can be bent flexibly and is formed of a thin pipe which has enough rigidity not to be transformed even under reduced pressure.

When an airflow transfer method or an aerosol method is employed, film formation may be performed under atmospheric pressure or lower pressure in the deposition treatment chamber, and preferably performed under a reduced pressure of 133 to 13300 Pa. The pressure can be adjusted while an inert gas such as helium, argon, neon, krypton, xenon, or nitrogen fills the deposition treatment chamber or is supplied (and exhausted at the same time) to the deposition treatment chamber. Note that an oxidizing atmosphere may be employed by introducing a gas such as oxygen or nitrous oxide in the deposition treatment chamber where an oxide film is formed. Alternately, a reducing atmosphere may be employed by introducing a gas such as hydrogen in the deposition treatment chamber where an organic material is deposited.

As another method for supplying an evaporation material, a screw may be provided in the material supply pipe 190384 to continuously push the evaporation material toward the evaporation source.

With this evaporation apparatus, a film can be formed continuously with high uniformity even in the case of a large display panel. Since it is not necessary to supply an evaporation material to the evaporation source every time the evaporation material is run out, throughput can be improved.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

Embodiment Mode 17

In this embodiment mode, examples of electronic devices according to the invention are described.

Figure 90:
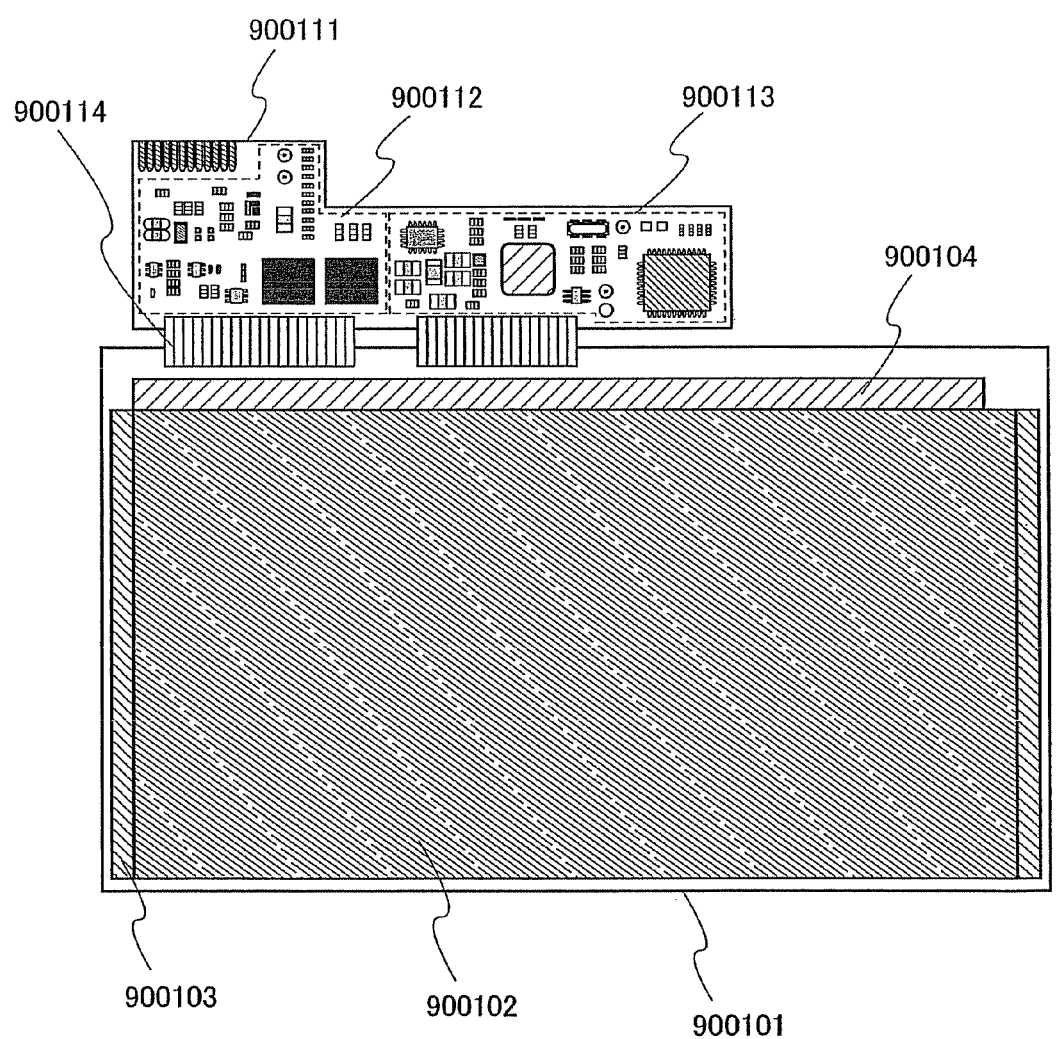
FIG. 90 is a view illustrating an example of a structure of a semiconductor device in accordance with the present invention.

FIG. 90 shows a display panel module combining a display panel 900101 and a circuit board 900111. The display panel 900101 includes a pixel portion 900102, a scan line driver circuit 900103, and a signal line driver circuit 900104. The circuit board 900111 is provided with a control circuit 900112, a signal dividing circuit 900113, and the like, for example. The display panel 900101 and the circuit board 900111 are connected to each other by a connection wiring 900114. An FPC or the like can be used as the connection wiring.

In the display panel 900101, the pixel portion 900102 and part of peripheral driver circuits (a driver circuit having a low operation frequency among a plurality of driver circuits) may be formed over the same substrate by using transistors, and another part of the peripheral driver circuits (a driver circuit having a high operation frequency among the plurality of driver circuits) may be formed over an IC chip. Then, the IC chip may be mounted on the display panel 900101 by COG (Chip On Glass) or the like. Thus, the area of the circuit board 900111 can be reduced, and a small display device can be obtained. Alternatively, the IC chip may be mounted on the display panel 900101 by using TAB (Tape Automated Bonding) or a printed wiring board. Thus, the area of the display panel 900101 can be reduced, and a display device with a narrower frame can be obtained.

For example, in order to reduce power consumption, a pixel portion may be formed over a glass substrate by using transistors, and all peripheral circuits may be fowled over an IC chip. Then, the IC chip may be mounted on a display device by COG or TAB.

Figure 91:
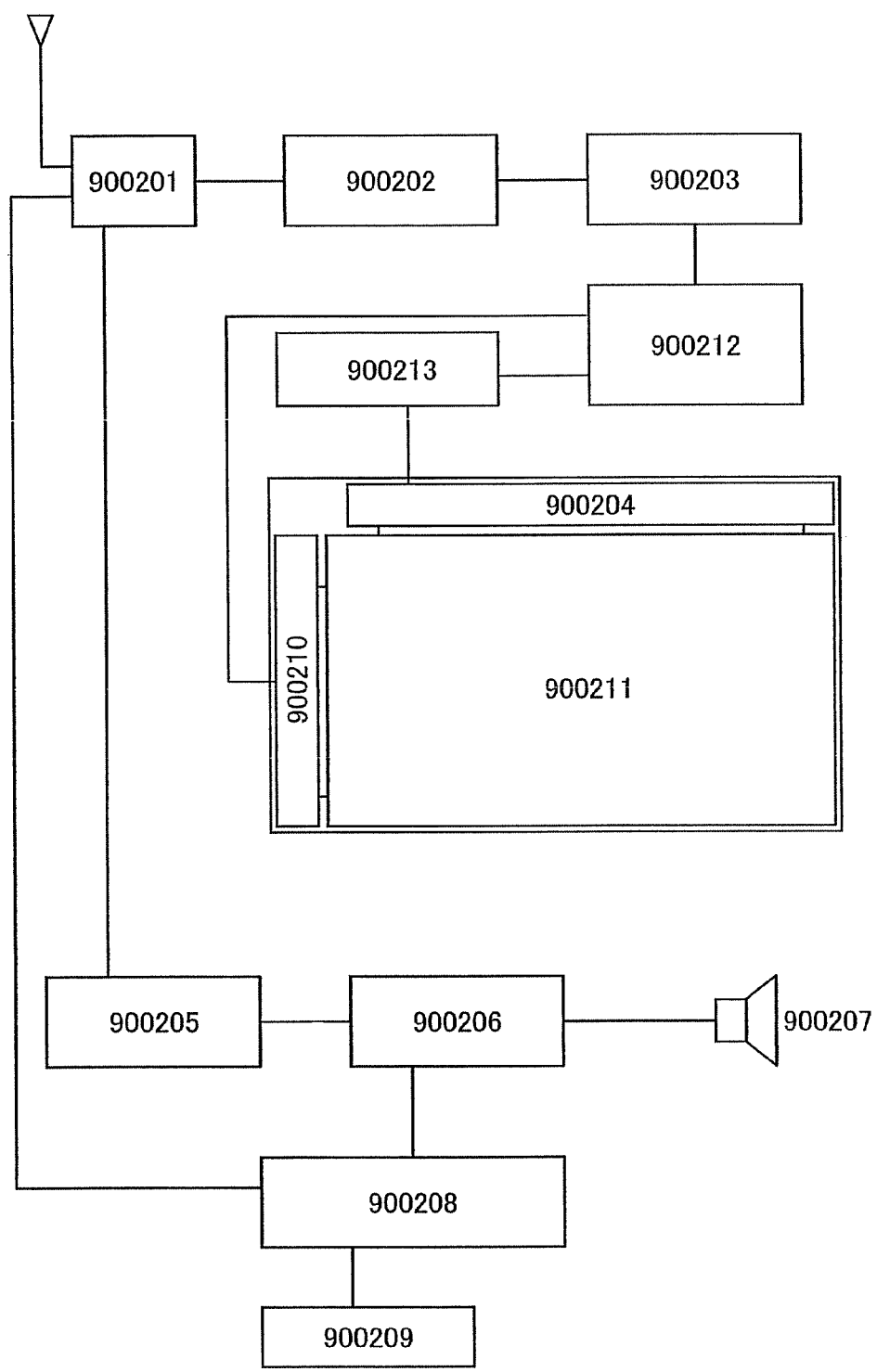
FIG. 91 is a view illustrating an example of a structure of a semiconductor device in accordance with the present invention.

By the display panel module shown in FIG. 90, a television receiver can be completed. FIG. 91 is a block diagram showing a main structure of a television receiver. A tuner 900201 receives a video signal and an audio signal. The video signals are processed by an video signal amplifier circuit 900202; a video signal processing circuit 900203 which converts a signal output from the video signal amplifier circuit 900202 into a color signal corresponding to each color of red, green, and blue; and a control circuit 900212 which converts the video signal into the input specification of a driver circuit. The control circuit 900212 outputs a signal to each of a scan line driver circuit 900210 and a signal line driver circuit 900204. The scan line driver circuit 900210 and the signal line driver circuit 900204 drive a display panel 900211. When digital drive is performed, a structure may be employed in which a signal dividing circuit 900213 is provided on the signal line side and an input digital signal is divided into m signals (m is a positive integer) to be supplied.

Among the signals received by the tuner 900201, an audio signal is transmitted to an audio signal amplifier circuit 900205, and an output thereof is supplied to a speaker 900207 through an audio signal processing circuit 900206. A control circuit 900208 receives control information on receiving station (receiving frequency) and volume from an input portion 900209 and transmits signals to the tuner 900201 or the audio signal processing circuit 900206.

Figure 92A:
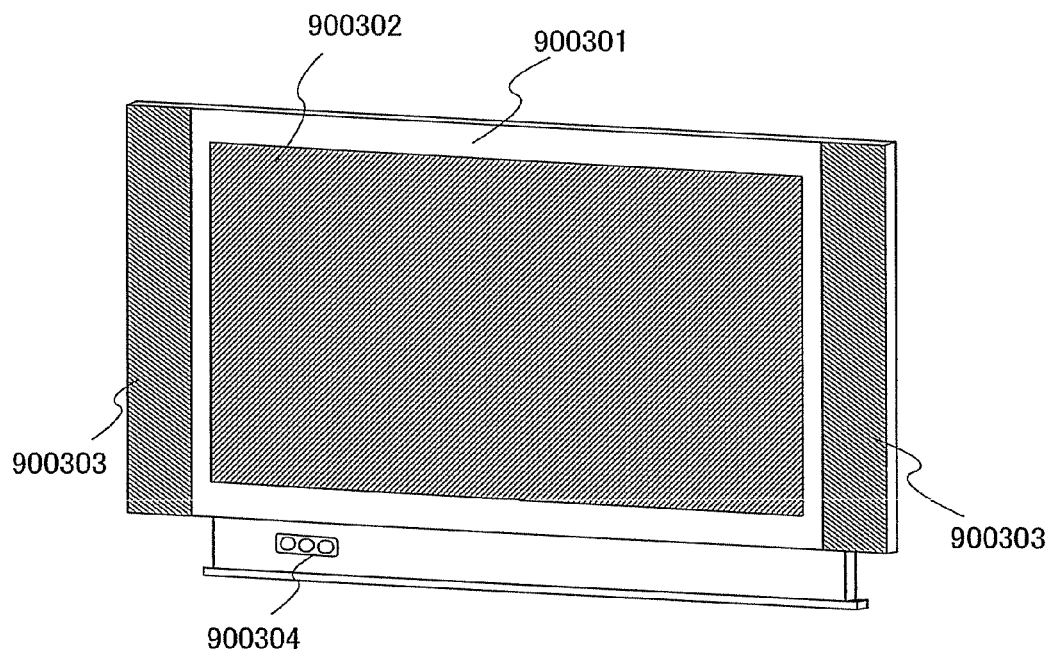
FIGS. 92A and 92B are views each illustrating an example of a structure of a semiconductor device in accordance with the present invention.

FIG. 92A shows a television receiver incorporated with a display panel module which is different from FIG. 91. In FIG. 92A, a display screen 900302 incorporated in a housing 900301 is formed using the display panel module. Note that speakers 900303, an operation switch 900304, and the like may be provided as appropriate.

Figure 92B:
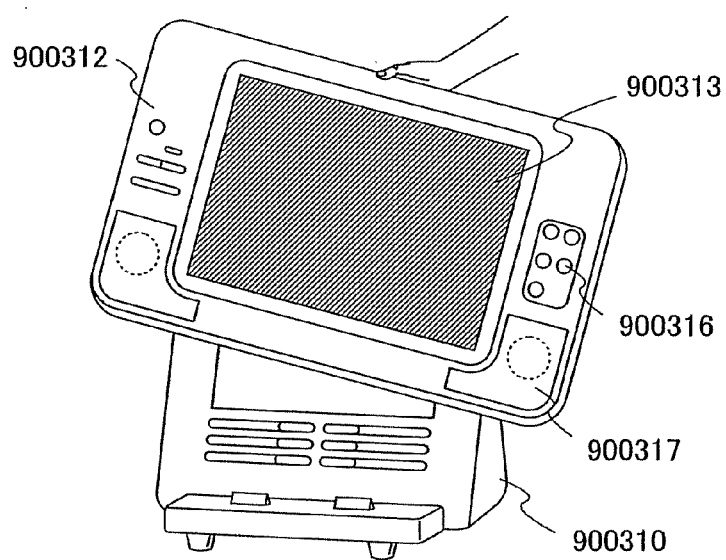

FIG. 92B shows a television receiver in which only a display can be carried wirelessly. A battery and a signal receiver are incorporated in a housing 900312. The battery drives a display portion 900313 or a speaker portion 900317. The battery can be repeatedly charged by a charger 900310. The charger 900310 can transmit and receive a video signal and transmit the video signal to the signal receiver of the display. The housing 900312 is controlled by an operation key 900316. Alternatively, the device shown in FIG. 92B can transmit a signal to the charger 900310 from the housing 900312 by operating the operation key 900316. That is, the device may be an image and audio interactive communication device. Further alternatively, by operating the operation key 900316, a signal is transmitted to the charger 900310 from the housing 900312, and another electronic device is made to receive a signal which can be transmitted from the charger 900310; thus, the device can control communication of another electronic device. That is, the device may be a general-purpose remote control device. The invention can be applied to the display portion 900313.

Figure 93A:
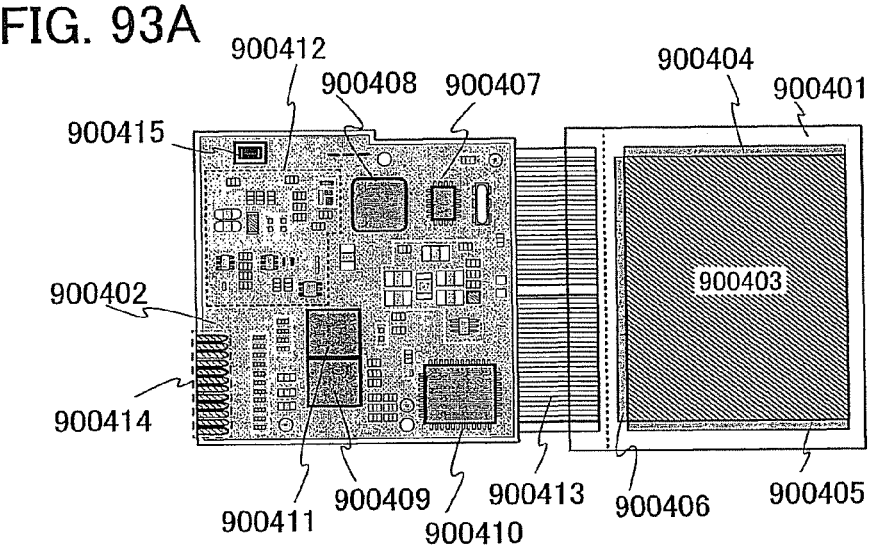
FIGS. 93A and 93B are views each illustrating an example of a structure of a semiconductor device in accordance with the present invention.

FIG. 93A shows a module combining a display panel 900401 and a printed wiring board 900402. The display panel 900401 may include a pixel portion 900403 provided with a plurality of pixels, a first scan line driver circuit 900404, a second scan line driver circuit 900405, and a signal line driver circuit 900406 which supplies a video signal to a selected pixel.

The printed wiring board 900402 is provided with a controller 900407, a central processing unit (CPU) 900408, a memory 900409, a power supply circuit 9004010, an audio processing circuit 900411, a transmitting/receiving circuit 900412, and the like. The printed wiring board 900402 and the display panel 900401 are connected by a flexible printed circuit (FPC) 900413. The flexible printed circuit (FPC) 900413 may have a structure where a capacitor, a buffer circuit, or the like is provided to prevent noise on power supply voltage or a signal, and increase in rise time of a signal. Note that the controller 900407, the audio processing circuit 900411, the memory 900409, the central processing unit (CPU) 900408, the power supply circuit 900410, or the like can be mounted to the display panel 900401 by using a COG (Chip On Glass) method. By using a COG method, the size of the printed wiring board 900402 can be reduced.

Various control signals are input and output through an interface (I/F) portion 900414 provided in the printed wiring board 900402. An antenna port 900415 for transmitting and receiving a signal to/from an antenna is provided in the printed wiring board 900402.

Figure 93B:
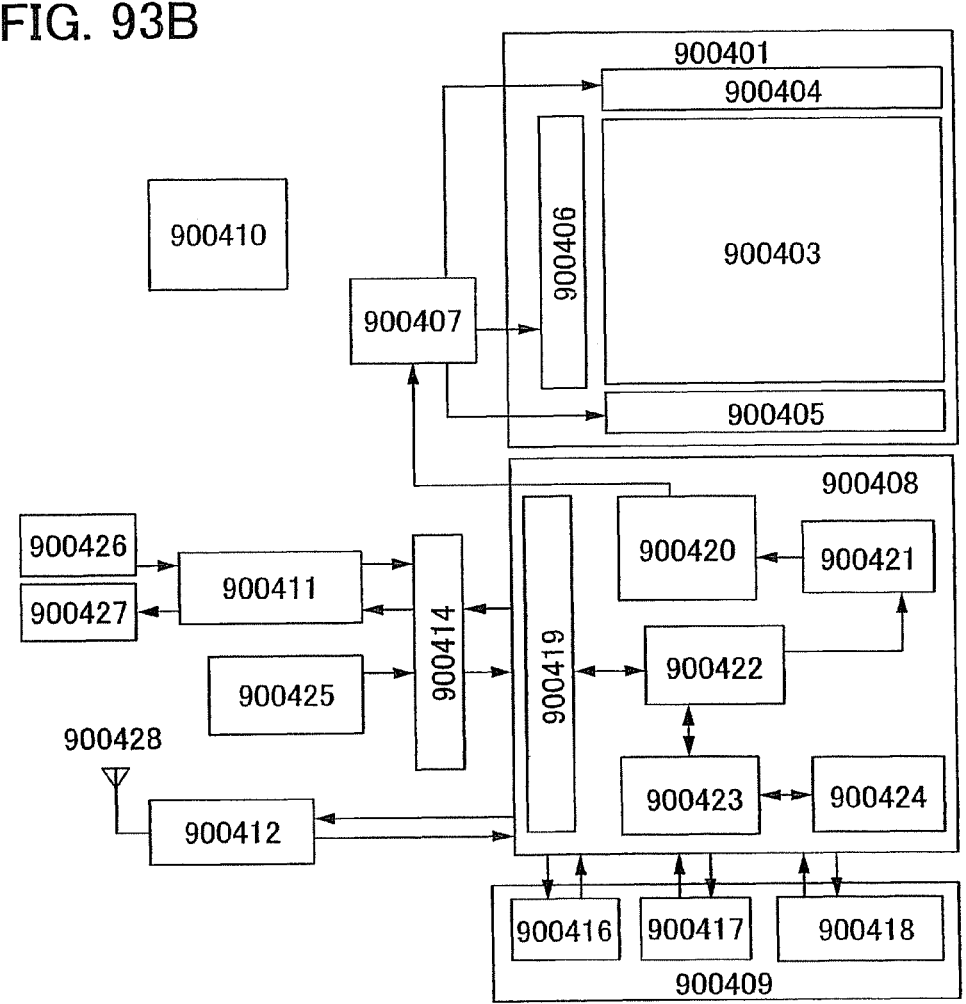

FIG. 93B is a block diagram of the module shown in FIG. 93A. The module includes a VRAM 900416, a DRAM 900417, a flash memory 900418, and the like as the memory 900409. The VRAM 900416 stores data on an image displayed on a panel, the DRAM 900417 stores video data or audio data, and the flash memory 900418 stores various programs.

The power supply circuit 900410 supplies electric power for operating the display panel 900401, the controller 900407, the central processing unit (CPU) 900408, the audio processing circuit 900411, the memory 900409, and the transmitting/receiving circuit 900412. Note that the power supply circuit 900410 may be provided with a current source depending on a panel specification.

The central processing unit (CPU) 900408 includes a control signal generation circuit 900420, a decoder 900421, a register 900422, an arithmetic circuit 900423, a RAM 900424, an interface (I/F) portion 900419 for the central processing unit (CPU) 900408, and the like. Various signals input to the central processing unit (CPU) 900408 via an interface (I/F) portion 900414 are once stored in the register 900422, and subsequently input to the arithmetic circuit 900423, the decoder 900421, or the like. The arithmetic circuit 900423 performs operation based on the signal input thereto so as to designate a location to which various instructions are sent. On the other hand, the signal input to the decoder 900421 is decoded and input to the control signal generation circuit 900420. The control signal generation circuit 900420 generates a signal including various instructions based on the signal input thereto, and transmits the signal to the location designated by the arithmetic circuit 900423, specifically the memory 900409, the transmitting/receiving circuit 900412, the audio processing circuit 900411, and the controller 900407, for example.

The memory 900409, the transmitting/receiving circuit 900412, the audio processing circuit 900411, and the controller 900407 operate in accordance with respective instructions. Hereinafter, the operation is briefly described.

A signal input from an input means 900425 is transmitted to the central processing unit (CPU) 900408 mounted to the printed wiring board via the interface (I/F) portion 900414. The control signal generation circuit 900420 converts image data stored in the VRAM 900416 into a predetermined format depending on the signal transmitted from the input means 900425 such as a pointing device or a keyboard, and transmits the converted data to the controller 900407.

The controller 900407 performs data processing of the signal including the image data transmitted from the central processing unit (CPU) 900408 in accordance with the panel specification, and supplies the signal to the display panel 900401. The controller 900407 generates an Hsync signal, a Vsync signal, a clock signal CLK, alternating voltage (AC Cont), and a switching signal L/R based on power supply voltage input from the power supply circuit 900410 or various signals input from the central processing unit (CPU) 900408, and supplies the signals to the display panel 900401.

The transmitting/receiving circuit 900412 processes a signal which is to be transmitted and received as an electric wave by an antenna 900428. Specifically, the transmitting/receiving circuit 900412 may include a high-frequency circuit such as an isolator, a band pass filter, a VCO (voltage controlled oscillator), an LPF (low pass filter), a coupler, or a balun. A signal including audio information among signals transmitted and received by the transmitting/receiving circuit 900412 is transmitted to the audio processing circuit 900411 in accordance with an instruction from the central processing unit (CPU) 900408.

The signal including the audio information which is transmitted in accordance with the instruction from the central processing unit (CPU) 900408 is demodulated into an audio signal by the audio processing circuit 900411 and transmitted to a speaker 900427. An audio signal transmitted from a microphone 900426 is modulated by the audio processing circuit 900411 and transmitted to the transmitting/receiving circuit 900412 in accordance with an instruction from the central processing unit (CPU) 900408.

The controller 900407, the central processing unit (CPU) 900408, the power supply circuit 900410, the audio processing circuit 900411, and the memory 900409 can be mounted as a package of this embodiment mode.

It is needless to say that this embodiment mode is not limited to a television receiver and can be applied to various uses, such as a monitor of a personal computer, and especially as a large display medium such as an information display board at the train station, the airport, or the like, or an advertisement display board on the street.

Figure 94:
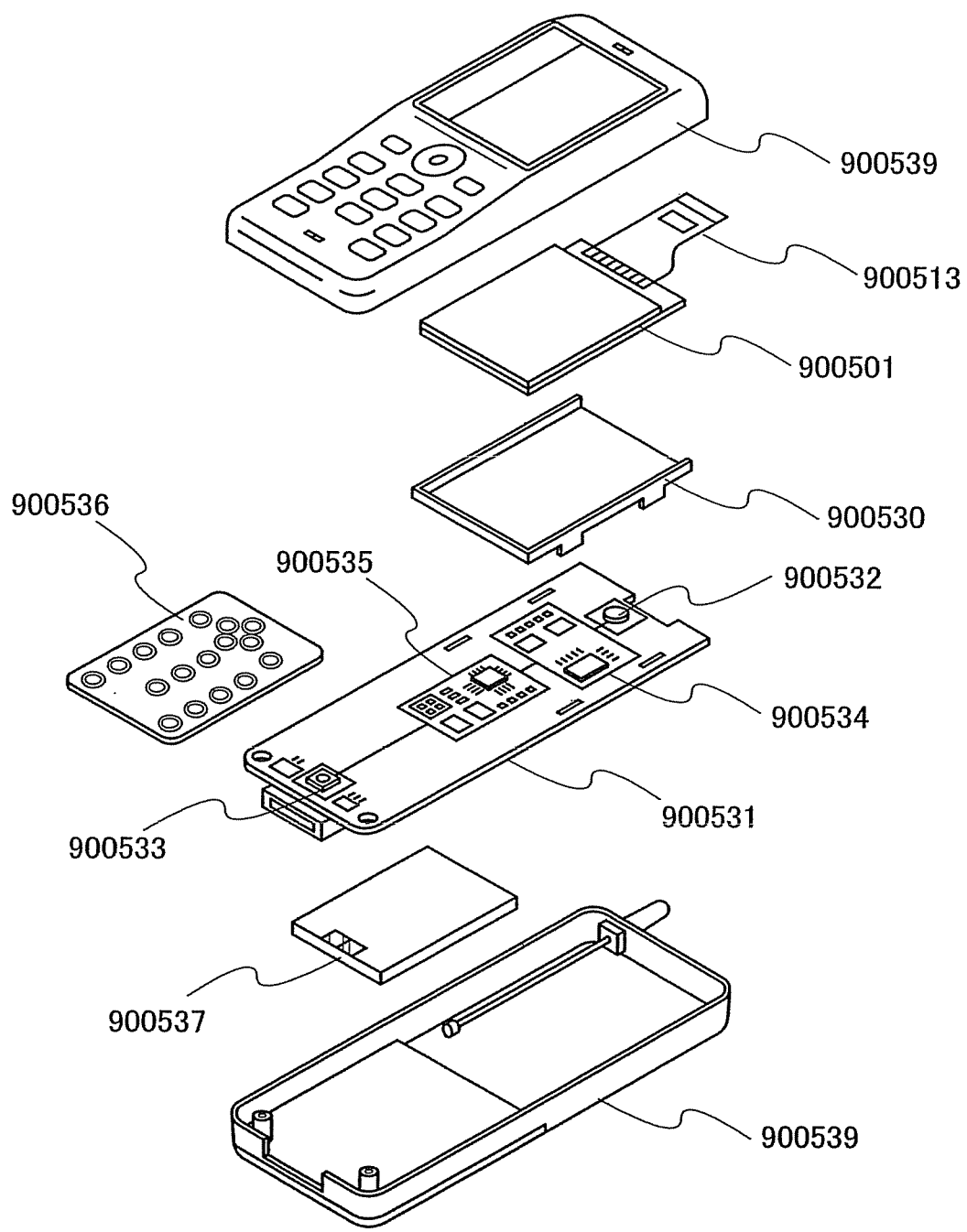
FIG. 94 is a view illustrating an example of a structure of a semiconductor device in accordance with the present invention.

Next, a structure example of a mobile phone according to the invention is described with reference to FIG. 94.

A display panel 900501 is detachably incorporated in a housing 900530. The shape or the size of the housing 900530 can be changed as appropriate in accordance with the size of the display panel 900501. The housing 900530 which fixes the display panel 900501 is fitted in a printed wiring board 900531 to be assembled as a module.

The display panel 900501 is connected to the printed wiring board 900531 through an FPC 900513. The printed wiring board 900531 is provided with a speaker 900532, a microphone 900533, a transmitting/receiving circuit 900534, and a signal processing circuit 900535 including a CPU, a controller, and the like. Such a module, an input means 900536, and a battery 900537 are combined and stored in a housing 900539. A pixel portion of the display panel 900501 is provided to be seen from an opening window formed in the housing 900539.

In the display panel 900501, the pixel portion and part of peripheral driver circuits (a driver circuit having a low operation frequency among a plurality of driver circuits) may be formed over the same substrate by using transistors, and another part of the peripheral driver circuits (a driver circuit having a high operation frequency among the plurality of driver circuits) may be formed over an IC chip. Then, the IC chip may be mounted on the display panel 900501 by COG (Chip On Glass). Alternatively, the IC chip may be connected to a glass substrate by using TAB (Tape Automated Bonding) or a printed wiring board. With such a structure, power consumption of a display device can be reduced, and operation time of the mobile phone per charge can be extended. Further, reduction in cost of the mobile phone can be realized.

Figure 95:
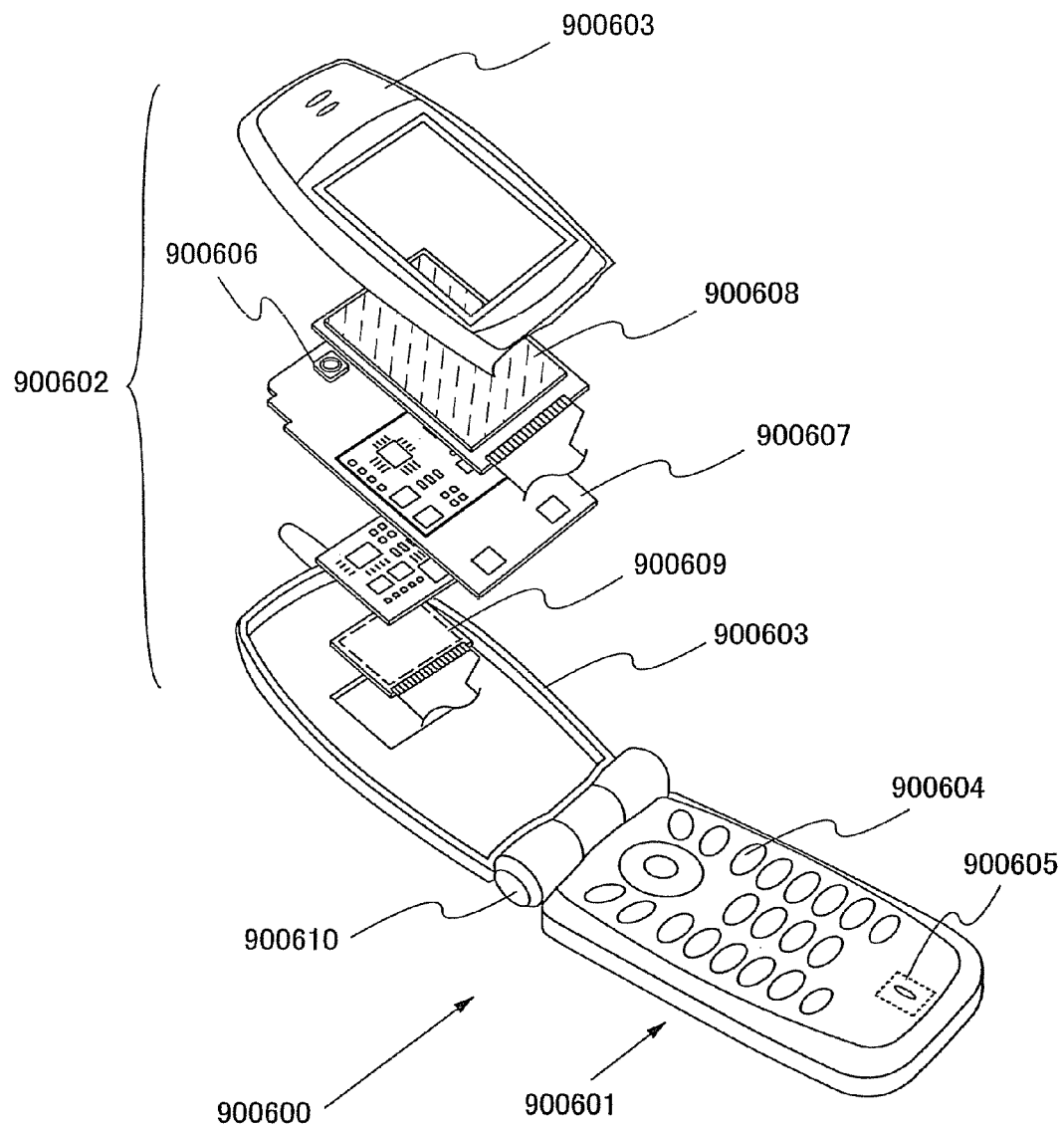
FIG. 95 is a view illustrating an example of a structure of a semiconductor device in accordance with the present invention.

In a mobile phone shown in FIG. 95, a main body (A) 900601 provided with operation switches 900604, a microphone 900605, and the like is connected to a main body (B) 900602 provided with a display panel (A) 900608, a display panel (B) 900609, a speaker 900606, and the like by using a hinge 900610 so that the mobile phone can be opened and closed. The display panel (A) 900608 and the display panel (B) 900609 are placed in a housing 900603 of the main body (B) 900602 together with a circuit board 900607. Pixel portions of the display panel (A) 900608 and the display panel (B) 900609 are arranged to be seen from an opening window formed in the housing 900603.

Specifications of the display panel (A) 900608 and the display panel (B) 900609, such as the number of pixels, can be set as appropriate in accordance with functions of a mobile phone 900600. For example, the display panel (A) 900608 used as a main screen and the display panel (B) 900609 used as a sub-screen can be combined.

A mobile phone according to this embodiment mode can be changed in various modes depending on functions or applications thereof. For example, it may be a camera-equipped mobile phone by incorporating an imaging element in the hinge 900610. When the operation switches 900604, the display panel (A) 900608, and the display panel (B) 900609 are placed in one housing, the aforementioned effects can be obtained. Further, a similar effect can be obtained when the structure of this embodiment mode is applied to an information display terminal equipped with a plurality of display portions.

The invention can be applied to various electronic devices. Specifically, the invention can be applied to a display portion of an electronic device. Examples of such electronic devices include cameras such as a video camera and a digital camera, a goggle-type display, a navigation system, an audio reproducing device (such as car audio components and audio components), a computer, a game machine, a portable information terminal (such as a mobile computer, a mobile phone, a mobile game machine, and an electronic book), and an image reproducing device provided with a recording medium (specifically, a device which reproduces a recording medium such as a digital versatile disc (DVD) and has a display for displaying the reproduced image).

Figure 96A:
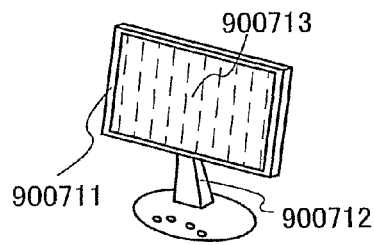
FIGS. 96A to 96H are views each illustrating an electronic device using a semiconductor device in accordance with the present invention.

FIG. 96A shows a display, which includes a housing 900711, a support base 900712, a display portion 900713, and the like.

Figure 96B:
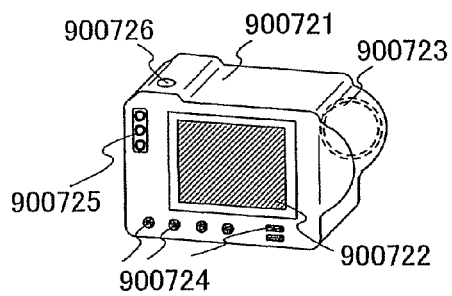

FIG. 96B shows a camera, which includes a main body 900721, a display portion 900722, an image receiving portion 900723, operation keys 900724, an external connection port 900725, a shutter button 900726, and the like.

Figure 96C:
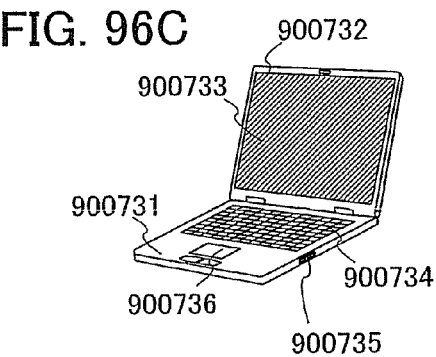

FIG. 96C shows a computer, which includes a main body 900731, a housing 900732, a display portion 900733, a keyboard 900734, an external connection port 900735, a pointing device 900736, and the like.

Figure 96D:
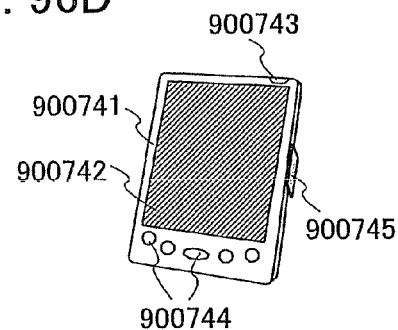

FIG. 96D shows a mobile computer, which includes a main body 900741, a display portion 900742, a switch 900743, operation keys 900744, an infrared port 900745, and the like.

Figure 96E:
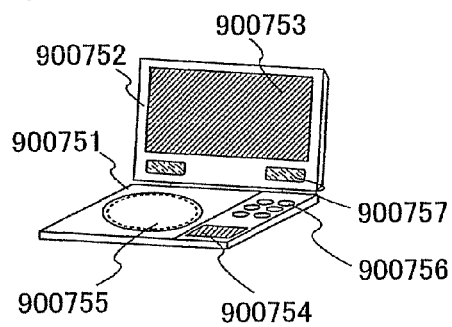

FIG. 96E shows a portable image reproducing device having a recording medium (e.g., a DVD reproducing device), which includes a main body 900751, a housing 900752, a display portion A 900753, a display portion B 900754, a recording medium (e.g., DVD) reading portion 900755, operation keys 900756, a speaker portion 900757, and the like. The display portion A 900753 can mainly display image information, and the display portion B 900754 can mainly display text information.

Figure 96F:
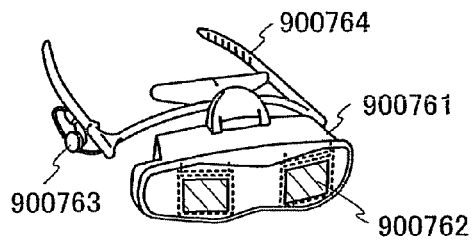

FIG. 96F shows a goggle-type display, which includes a main body 900761, a display portion 900762, an earphone 900763, a support portion 900764, and the like.

Figure 96G:
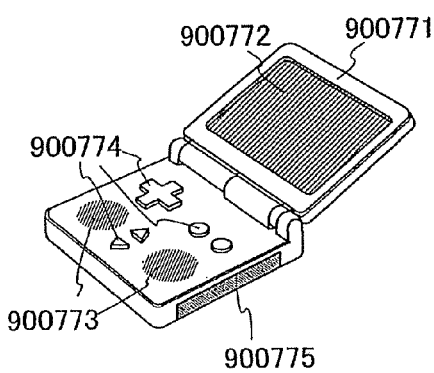

FIG. 96G shows a portable game machine, which includes a housing 900771, a display portion 900772, a speaker portion 900773, operation keys 900774, a recording medium insert portion 900775, and the like. The portable game machine in which the display device in the invention is used for the display portion 900772 can express bright colors.

Figure 96H:
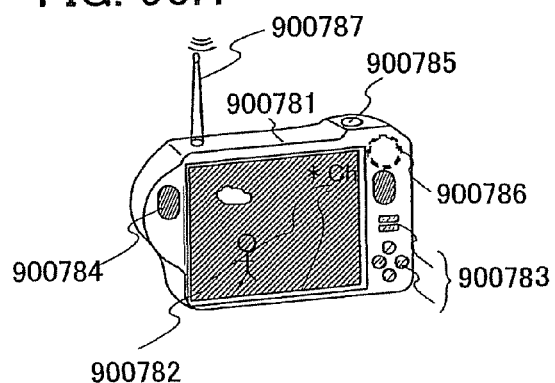

FIG. 96H shows a digital camera having a television reception function, which includes a housing 900781, a display portion 900782, operation keys 900783, a speaker 900784, a shutter button 900785, an image receiving portion 900786, an antenna 900787, and the like.

As shown in FIGS. 96A to 96H, the electronic device according to the invention includes a display portion for displaying some kind of information. The electronic device according to the invention has low power consumption, and can drive with a battery for a long time. Further, a moving image without motion blur can be displayed. Moreover, a manufacturing method is simple, and manufacturing cost can be reduced.

Next, application examples of a semiconductor device according to the invention are described.

Figure 97:
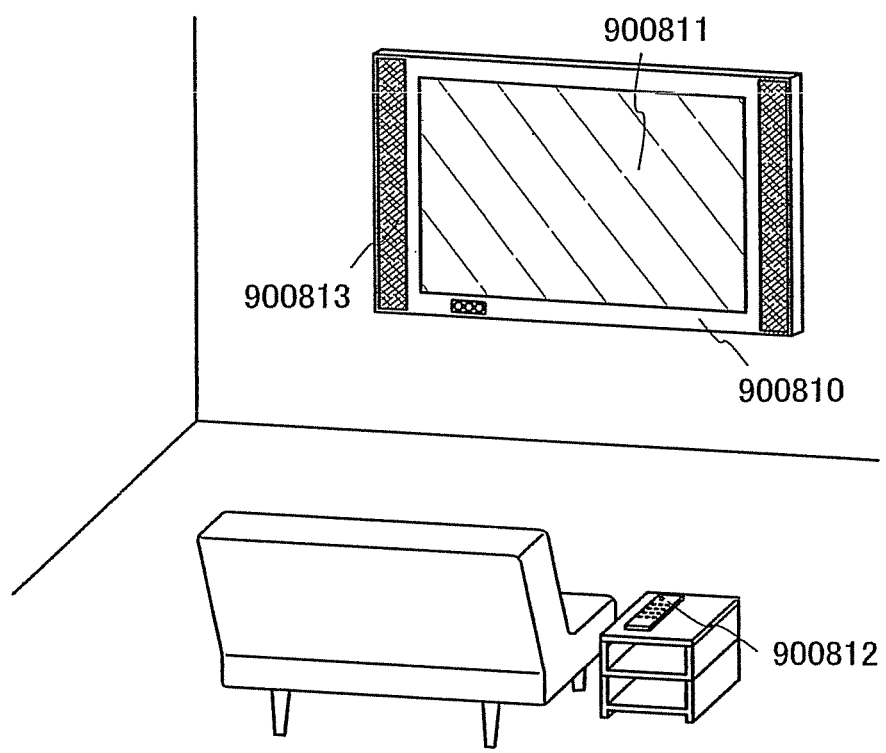
FIG. 97 is a view illustrating an electronic device using a semiconductor device in accordance with the present invention.

FIG. 97 shows an example where the semiconductor device according to the invention is incorporated in a constructed object. FIG. 97 shows a housing 900810, a display portion 900811, a remote control device 900812 which is an operation portion, a speaker portion 900813, and the like. The semiconductor device according to the invention is incorporated in the constructed object as a wall-hanging type and can be provided without requiring a large space.

Figure 98:
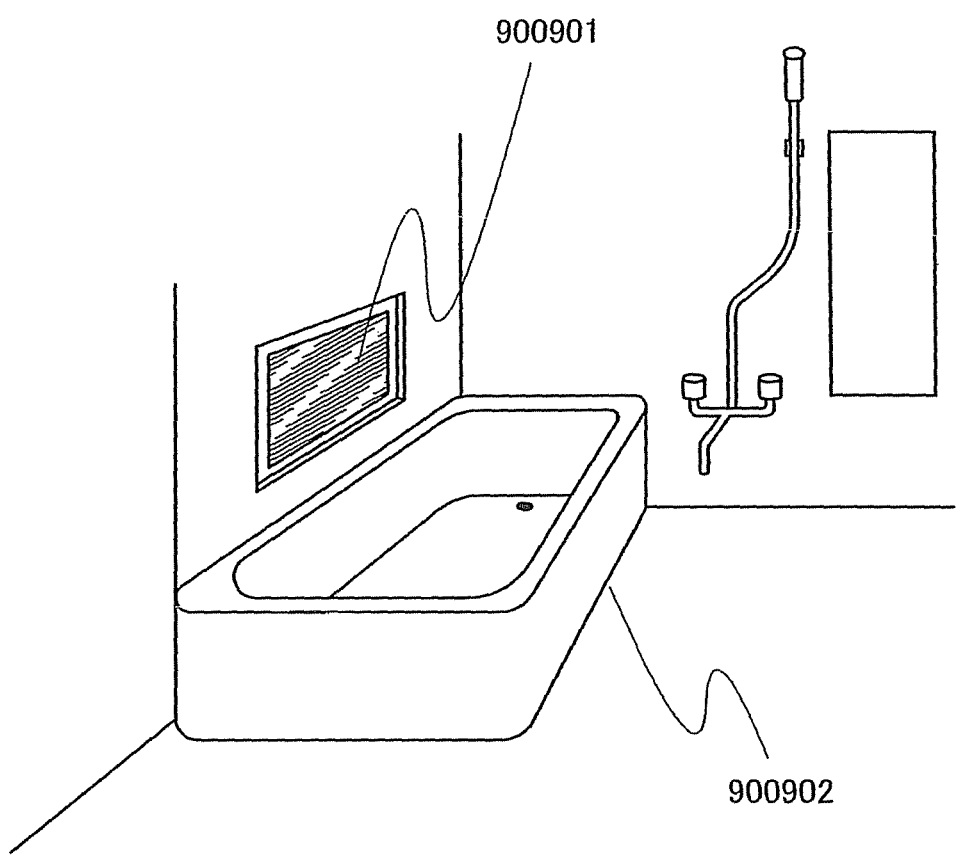
FIG. 98 is a view illustrating an electronic device using a semiconductor device in accordance with the present invention.

FIG. 98 shows another example where the semiconductor device according to the invention is incorporated in a constructed object. A display panel 900901 is incorporated with a prefabricated bath 900902, and a person who takes a bath can view the display panel 900901. The display panel 900901 has a function of displaying information by an operation by the person who takes a bath; and a function of being used as an advertisement or an entertainment means.

Note that the semiconductor device according to the invention can be provided not only to a side wall of the prefabricated bath 900902 as shown in FIG. 98, but also to various places. For example, the semiconductor device can be incorporated with part of a mirror, a bathtub itself, or the like. At this time, a shape of the display panel 900901 may be changed in accordance with a shape of the mirror or the bathtub.

Figure 99:
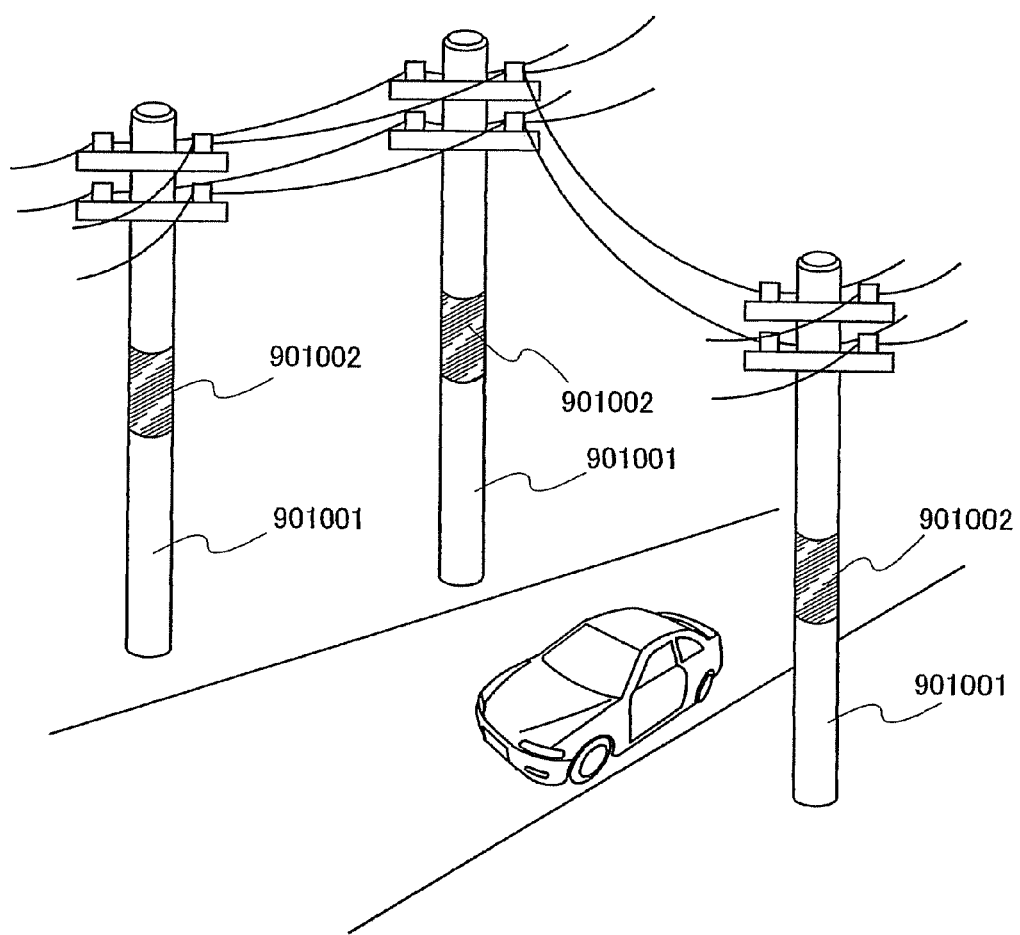
FIG. 99 is a view illustrating an electronic device using a semiconductor device in accordance with the present invention.

FIG. 99 shows another example where the semiconductor device according to the invention is incorporated in a constructed object. A display panel 901002 is bent and attached to a curved surface of a column-shaped object 901001. Note that here, a utility pole is described as the column-shaped object 901001.

The display panel 901002 shown in FIG. 99 is provided at a position higher than a human viewpoint. When the same images are displayed on the display panels 901002 provided in constructed objects which stand together in large numbers outdoors, such as utility poles, advertisement can be performed to an unspecified number of viewers. Since it is easy for the display panel 901002 to display the same images and instantly switch images by external control, highly efficient information display and advertisement effect can be realized. When provided with self-luminous display elements, the display panel 901002 can be useful as a highly visible display medium even at night. When the display panel 901002 is provided in the utility pole, a power supply means for the display panel 901002 can be easily obtained. In an emergency such as disaster, the display panel 901002 can also be used as a means to transmit correct information to victims rapidly.

Note that an example of the display panel 901002 includes a display panel in which a switching element such as an organic transistor is provided over a film-shaped substrate and a display element is driven so as to display an image.

Note that in this embodiment mode, a wall, a column-shaped object, and a prefabricated bath are shown as examples of constructed objects; however, this embodiment mode is not limited thereto, and various constructed objects can be provided with the semiconductor device according to the invention.

Next, examples where the semiconductor device according to the invention is incorporated with a moving object are described.

Figure 100:
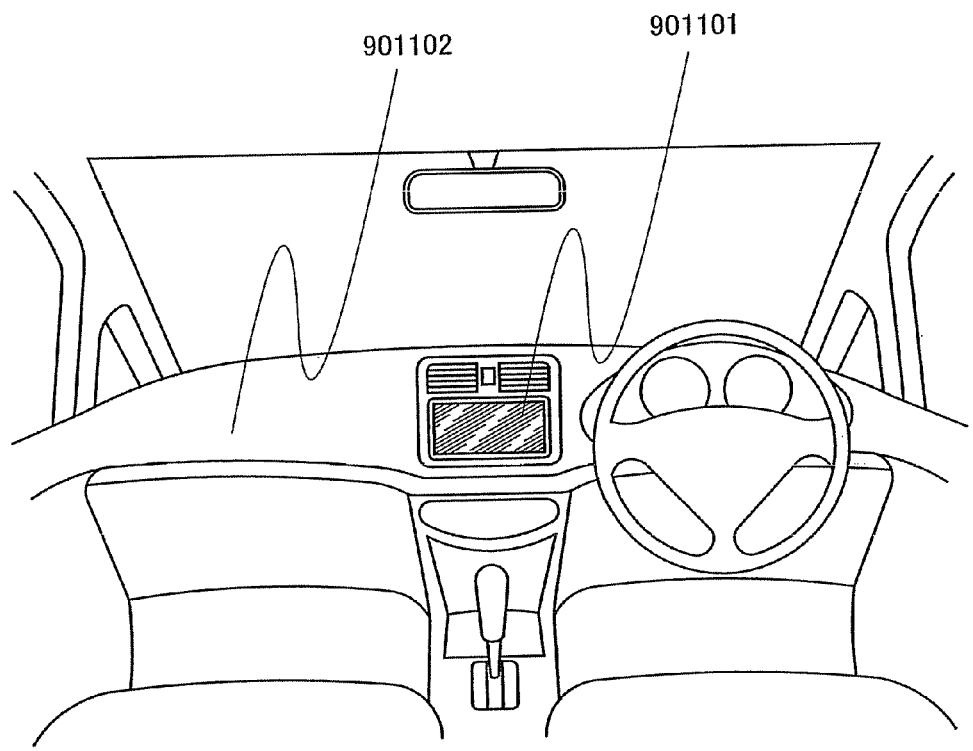
FIG. 100 is a view illustrating an electronic device using a semiconductor device in accordance with the present invention.

FIG. 100 shows an example where the semiconductor device according to the invention is incorporated with a car. A display panel 901101 is incorporated with a car body 901102, and can display an operation of the car body or information input from inside or outside the car body on demand. Note that a navigation function may be provided.

The semiconductor device according to the invention can be provided not only to the car body 901102 as shown in FIG. 100, but also to various places. For example, the semiconductor device can be incorporated with a glass window, a door, a steering wheel, a gear shift, a seat, a rear-view mirror, and the like. At this time, a shape of the display panel 901101 may be changed in accordance with a shape of an object provided with the semiconductor device.

Figure 101A:
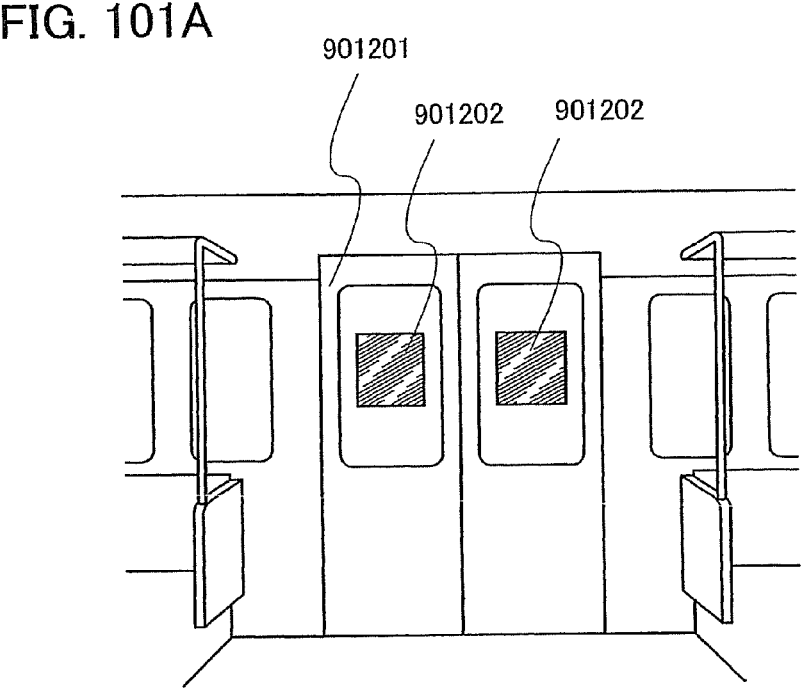
FIGS. 101A and 101B are views each illustrating an electronic device using a semiconductor device in accordance with the present invention.
Figure 101B:
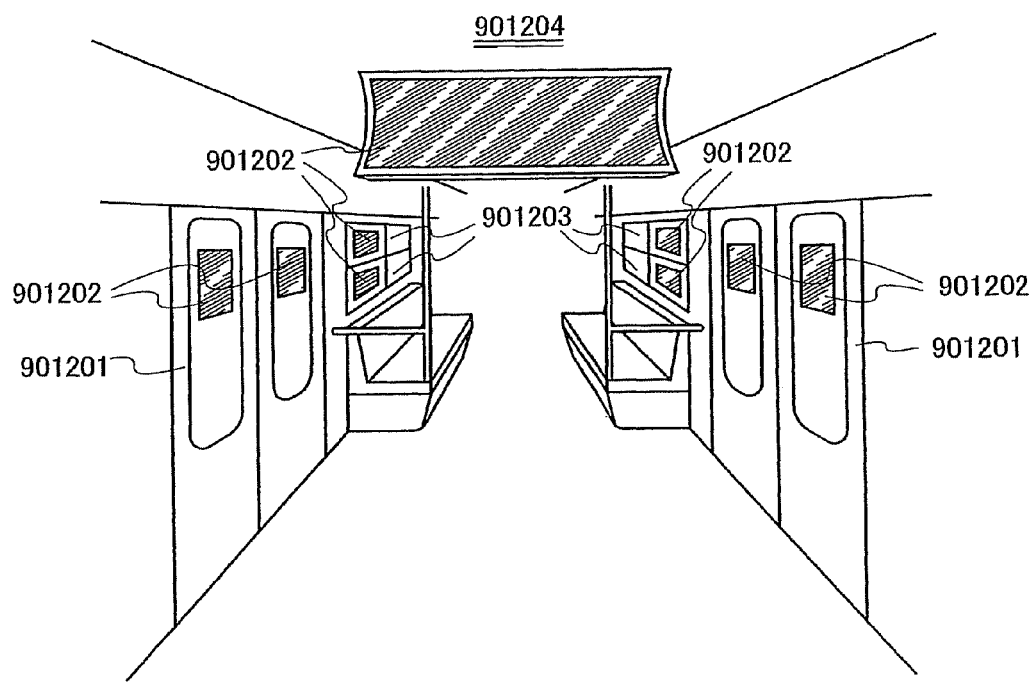

FIGS. 101A and 101B show examples where the semiconductor device according to the invention is incorporated with a train car.

FIG. 101A shows an example where a display panel 901202 is provided in glass of a door 901201 in a train car, which has an advantage compared with a conventional advertisement using paper in that labor cost for changing an advertisement is not necessary. Since the display panel 901202 can instantly switch images displaying on a display portion by an external signal, images on the display panel can be switched in every time period when types of passengers on the train are changed, for example. Thus, more effective advertisement effect can be realized.

FIG. 101B shows an example where the display panels 901202 are provided to a glass window 901203 and a ceiling 901204 as well as the glass of the door 901201 in the train car. In this manner, the semiconductor device according to the invention can be easily provided to a place where a semiconductor device has been difficult to be provided conventionally; thus, effective advertisement effect can be obtained. Further, the semiconductor device according to the invention can instantly switch images displayed on a display portion by an external signal; thus, cost and time for changing an advertisement can be reduced, and more flexible advertisement management and information transmission can be realized.

Note that the semiconductor device according to the invention can be provided not only to the door 901201, the glass window 901203, and the ceiling 901204 as shown in FIGS. 101A and 101B, but also to various places. For example, the semiconductor device can be incorporated with a strap, a seat, a handrail, a floor, and the like. At this time, a shape of the display panel 901202 may be changed in accordance with a shape of an object provided with the semiconductor device.

Figure 102A:
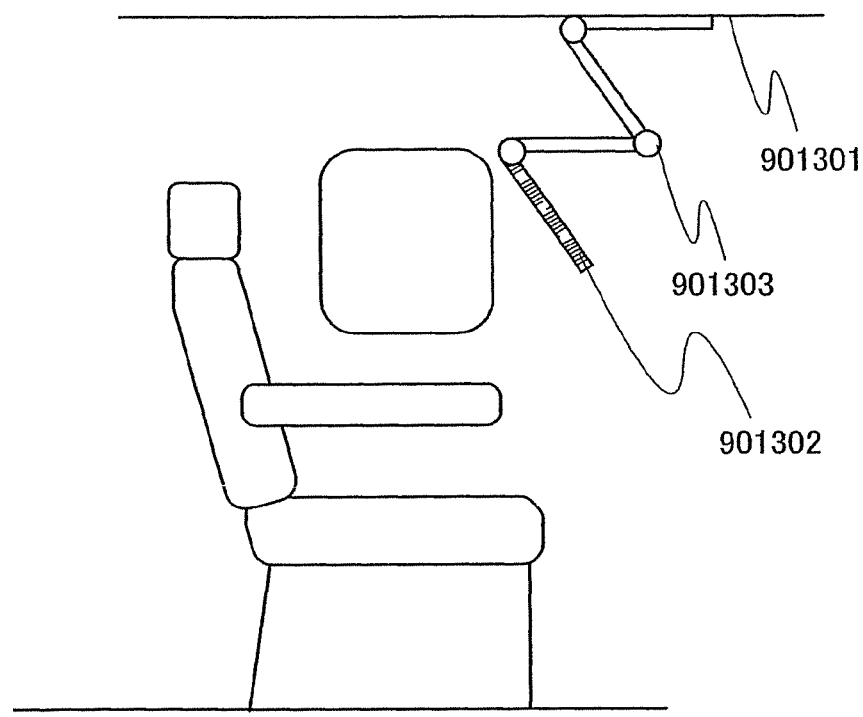
FIGS. 102A and 102B are views each illustrating an electronic device using a semiconductor device in accordance with the present invention.
Figure 102B:
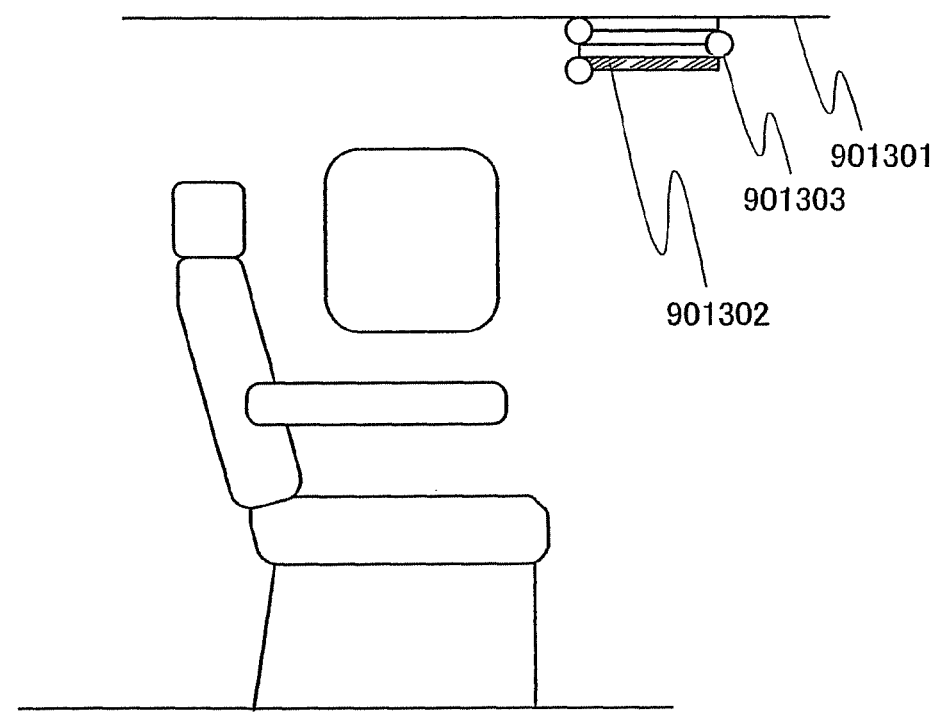

FIGS. 102A and 102B show an example where the semiconductor device according to the invention is incorporated with a passenger airplane.

FIG. 102A shows a shape of a display panel 901302 attached to a ceiling 901301 above a seat of the passenger airplane when the display panel 901302 is used. The display panel 901302 is incorporated with the ceiling 901301 with a hinge portion 901303, and a passenger can view the display panel 901302 by stretching of the hinge portion 901303. The display panel 901302 has a function of displaying information by an operation by the passenger and a function of being used as an advertisement or an entertainment means. As shown in FIG. 102B, the hinge portion is bent and the display panel is stored in the ceiling 901301, so that safety in taking-off and landing can be assured. Note that in an emergency, the display panel can also be used as an information transmission means and an evacuation light by lighting a display element in the display panel.

The semiconductor device according to the invention can be provided not only to the ceiling 901301 as shown in FIGS. 102A and 102B, but also to various places. For example, the semiconductor device can be incorporated with a seat, a table attached to a seat, an armrest, a window, and the like. A large display panel which a plurality of people can view may be provided at a wall of an airframe. At this time, a shape of the display panel 901302 may be changed in accordance with a shape of an object provided with the semiconductor device.

Note that in this embodiment mode, bodies of a train car, a car, and an airplane are shown as moving objects; however, the invention is not limited thereto, and the semiconductor device according to the invention can be provided to various objects such as a motorcycle, an four-wheel drive car (including a car, a bus, and the like), a train (including a monorail, a railroad car, and the like), and a vessel. Since the semiconductor device according to the invention can instantly switch images displayed on a display panel in a moving object by an external signal, the moving object provided with the semiconductor device according to the invention can be used as an advertisement display board for an unspecified number of customers, an information display board in disaster, and the like.

Although this embodiment mode is described with reference to various drawings, the contents (or part of the contents) described in each drawing can be freely applied to, combined with, or replaced with the contents (or part of the contents) described in another drawing. Further, much more drawings can be formed by combining each part with another part in the above-described drawings.

The contents (or part of the contents) described in each drawing in this embodiment mode can be freely applied to, combined with, or replaced with the contents (or part of the contents) described in a drawing in another embodiment mode. Further, much more drawings can be formed by combining each part in each drawing in this embodiment mode with part of another embodiment mode.

This embodiment mode shows examples of embodying, slightly transforming, partially modifying, improving, describing in detail, or applying the contents (or part of the contents) described in other embodiment modes, an example of related part thereof, or the like. Therefore, the contents described in other embodiment modes can be freely applied to, combined with, or replaced with this embodiment mode.

This application is based on Japanese Patent Application serial No. 2006-328670 filed with Japan Patent Office on Dec. 5, 2006, the entire contents of which are hereby incorporated by reference.

What is claimed is:

1. A driving method of a liquid crystal display device comprising a liquid crystal element, the driving method comprising the steps of:
    applying a first voltage to the liquid crystal element in a first subframe period of a first frame period;
    making transmittance of the liquid crystal element at the end of the first subframe period of the first frame period into a first transmittance;
    applying a second voltage to the liquid crystal element in a second subframe period of the first frame period;
    making transmittance of the liquid crystal element at the end of the second subframe period of the first frame period into a second transmittance;
    applying a third voltage to the liquid crystal element in a first subframe period of a second frame period;
    making transmittance of the liquid crystal element at the end of the first subframe period of the second frame period into a third transmittance; and
    adjusting a level of the third voltage in accordance with the first transmittance, a length of the second subframe period of the first frame period, and a length of the first subframe period of the second frame period.

2. The driving method of the liquid crystal display device according to claim 1,
    wherein the shorter the length of the first subframe period of the first frame period is, the larger the first voltage is.

3. The driving method of the liquid crystal display device according to claim 1,
    wherein the shorter the length of the second subframe period of the first frame period is, the smaller the third voltage is.

4. The driving method of the liquid crystal display device according to claim 1,
    wherein the shorter the length of the first subframe period of the second frame period is, the larger the third voltage is.

5. The driving method of the liquid crystal display device according to claim 1,
    wherein a level of the first voltage is different to the level of the third voltage.

6. The driving method of the liquid crystal display device according to claim 1, the liquid crystal display device further comprising a backlight,
    wherein the backlight is divided into a plurality of light-emitting regions.

7. A liquid crystal display device comprising:
    a liquid crystal element,
    wherein the liquid crystal element is configured to be supplied a first voltage in a first subframe period of a first frame period,
    wherein the liquid crystal element is configured to be supplied a second voltage in a second subframe period of the first frame period,
    wherein the liquid crystal element is configured to be supplied a third voltage in a first subframe period of a second frame period,
    wherein transmittance of the liquid crystal element at the end of the first subframe period of the first frame period is a first transmittance,
    wherein transmittance of the liquid crystal element at the end of the second subframe period of the first frame period is a second transmittance,
    wherein transmittance of the liquid crystal element at the end of the first subframe period of the second frame period is a third transmittance,
    wherein a level of the third voltage is adjusted in accordance with the first transmittance, a length of the second subframe period of the first frame period, and a length of the first subframe period of the second frame period.

8. The liquid crystal display device according to claim 7,
    wherein the shorter the length of the first subframe period of the first frame period is, the larger the first voltage is.

9. The liquid crystal display device according to claim 7,
    wherein the shorter the length of the second subframe period of the first frame period is, the smaller the third voltage is.

10. The liquid crystal display device according to claim 7,
    wherein the shorter the length of the first subframe period of the second frame period is, the larger the third voltage is.

11. The liquid crystal display device according to claim 7,
    wherein a level of the first voltage is different to the level of the third voltage.

12. The liquid crystal display device according to claim 7, further comprising a backlight,
    wherein the backlight is divided into a plurality of light-emitting regions.

* * * * *

UNITED STATES PATENT AND TRADEMARK OFFICE
CERTIFICATE OF CORRECTION

| | |
|---|---|
| PATENT NO. | : 8,766,906 B2 |
| APPLICATION NO. | : 13/677963 |
| DATED | : July 1, 2014 |
| INVENTOR(S) | : Yasunori Yoshida and Hajime Kimura |

It is certified that error appears in the above-identified patent and that said Letters Patent is hereby corrected as shown below:

In the Specification:

Column 1, Line 11; Change "method, of" to --method of--.

Column 12, Line 44; Change "Agate" to --A gate--.

Column 13, Line 36; Change "conductive, film, a wiring," to --conductive film, a wiring,--.

Column 23, Line 45; Change "$\tau_b$" to --$\tau_{bn}$--.

Column 46, Line 30; Change "function $\tau_1$ (G)." to --function T1 (G).--.

Column 63, Line 9; Change "$\tau_0 < \tau_b$" to --$\tau_a < \tau_b$--.

Column 66, Line 4; Change "$V_{S2302}$" to --$V_{S2301}$--.

Column 78, Line 55; Change "$l_{2501}$ and $l_{2502}$" to --$L_{2501}$ and $L_{2502}$--.

Column 101, Line 1; Change "across-sectional" to --a cross-sectional--.

Column 119, Line 16; Change "R, and B" to --R, G, and B--.

Column 119, Line 25; Change "R, and B" to --R, G, and B--.

Column 119, Line 28; Change "R, and B," to --R, G, and B,--.

Column 120, Line 48; Change "R, Q and B." to --R, G, and B.--.

Column 120, Line 67; Change "R, Q and B" to --R, G, and B--.

Column 127, Line 7; Change "mode; an" to --mode, an--.

Column 128, Line 11; Change "FPS" to --FFS--.

Column 140, Line 36; Change "TS" to --IPS--.

Column 146, Line 29; Change "to; combined" to --to, combined--.

Column 146, Line 58; Change "video, signal" to --video signal--.

Column 152, Line 66; Change "lower, than" to --lower than--.

Signed and Sealed this
Twenty-fifth Day of November, 2014

Michelle K. Lee
*Deputy Director of the United States Patent and Trademark Office*

CERTIFICATE OF CORRECTION (continued)
U.S. Pat. No. 8,766,906 B2

In the Specification:

Column 160, Line 37; Change "density, is" to --density is--.

Column 162, Line 4; Change "used, for" to --used for--.

Column 176, Line 45; Change "light, source" to --light source--.

Column 186, Line 52; Change "fowled" to --formed--.